US006850252B1

(12) United States Patent
Hoffberg

(10) Patent No.: US 6,850,252 B1
(45) Date of Patent: Feb. 1, 2005

(54) INTELLIGENT ELECTRONIC APPLIANCE SYSTEM AND METHOD

(76) Inventor: Steven M. Hoffberg, 29 Buckout Rd., West Harrison, NY (US) 10994

(*) Notice: Subject to any disclaimer, the term of this patent is extended or adjusted under 35 U.S.C. 154(b) by 538 days.

(21) Appl. No.: 09/680,049

(22) Filed: Oct. 5, 2000

Related U.S. Application Data
(60) Provisional application No. 60/157,829, filed on Oct. 5, 1999.

(51) Int. Cl.$^7$ .............................. G09G 5/00; H04K 1/02
(52) U.S. Cl. ..................... 345/716; 345/719; 345/727; 380/252
(58) Field of Search ................................ 345/760, 866, 345/717, 749, 716, 727; 380/201, 252; 713/776; 381/71, 72, 370, 371

(56) References Cited

U.S. PATENT DOCUMENTS

| | | | |
|---|---|---|---|
| 4,654,871 A | * 3/1987 | Chaplin et al. ............... 381/72 |
| 4,715,559 A | 12/1987 | Fuller |
| 5,018,202 A | * 5/1991 | Takahashi et al. ......... 381/71.5 |
| 5,267,320 A | 11/1993 | Fukumizu |
| 5,336,856 A | 8/1994 | Krider et al. |
| 5,502,869 A | 4/1996 | Smith et al. |
| 5,511,127 A | 4/1996 | Warnaka |
| 5,526,421 A | 6/1996 | Berger et al. |
| 5,526,432 A | 6/1996 | Denenberg |
| 5,583,943 A | 12/1996 | Ohashi et al. |
| 5,638,454 A | 6/1997 | Jones et al. |
| 5,692,054 A | 11/1997 | Parrella et al. |
| 5,715,320 A | 2/1998 | Allie et al. |
| 5,733,320 A | 3/1998 | Augustine |
| 5,781,640 A | 7/1998 | Nicolino |
| 5,815,582 A | 9/1998 | Claybaugh et al. |
| 5,828,768 A | 10/1998 | Eatwell et al. |
| 5,834,647 A | 11/1998 | Gaudriot et al. |
| 5,841,978 A | * 11/1998 | Rhoads ....................... 345/760 |
| 5,845,236 A | 12/1998 | Jolly et al. |
| 5,852,667 A | 12/1998 | Pan et al. |
| 5,917,919 A | 6/1999 | Rosenthal |
| 5,995,632 A | 11/1999 | Okada |
| 6,049,615 A | 4/2000 | Chou et al. |
| 6,061,456 A | 5/2000 | Andrea et al. |
| 6,084,971 A | 7/2000 | McLean |
| 6,188,770 B1 | 2/2001 | Okada |
| 6,232,994 B1 | 5/2001 | Wiklof |
| 6,275,592 B1 | 8/2001 | Vartiainen |
| 6,285,773 B1 | 9/2001 | Carme et al. |
| 6,324,573 B1 | * 11/2001 | Rhoads ....................... 345/749 |
| 2002/0006010 A1 | 1/2002 | Ding et al. |

FOREIGN PATENT DOCUMENTS

| | | | | |
|---|---|---|---|---|
| WO | WO 99/05998 | * | 2/1999 | ............... 381/71.6 |

* cited by examiner

Primary Examiner—Ba Huynh
Assistant Examiner—Truc T Chuong
(74) Attorney, Agent, or Firm—Milde & Hoffberg LLP

(57) ABSTRACT

An intelligent electronic appliance preferably includes a user interface, data input and/or output port, and an intelligent processor. A preferred embodiment comprises a set top box for interacting with broadband media streams, with an adaptive user interface, content-based media processing and/or media metadata processing, and telecommunications integration. An adaptive user interface models the user, by observation, feedback, and/or explicit input, and presents a user interface and/or executes functions based on the user model. A content-based media processing system analyzes media content, for example audio and video, to understand the content, for example to generate content-descriptive metadata. A media metadata processing system operates on locally or remotely generated metadata to process the media in accordance with the metadata, which may be, for example, an electronic program guide, MPEG 7 data, and/or automatically generated format. A set top box preferably includes digital trick play effects, and incorporated digital rights management features.

22 Claims, 28 Drawing Sheets

Existing Interface

New Interface

INTELLIGENT ELECTRONIC APPLIANCE SYSTEM AND METHOD

The present application is related to U.S. patent application Ser. Nos. 09/497,071; 09/304,536; 09/260,802; 09/304,536; 09/241,135; 08/469,589; and 60/157,829, and U.S. Pat. Nos. 6,081,750; 5,920,477; 5,903,454; 5,901,246; 5,875,108; 5,867.386; and 5,774,357. The present application claims benefit of priority from U.S. Provisional Patent Application No. 60/157,829 filed on Oct. 5, 1999.

A portion of the disclosure of this patent document and appendices contain material that is subject to copyright protection. The copyright owner has no objection to the facsimile reproduction by anyone of this patent document or the patent disclosure, as it appears in the U.S. Patent and Trademark Office patent file or records, but otherwise reserves all copyright rights whatsoever.

FIELD OF THE INVENTION

The present invention relates to the field of adaptive systems, and more particularly systems and methods which are adaptive to a human user input and/or a data environment, as well as applications for such systems and methods. More particularly, embodiments of the invention involve, for example, consumer electronics, personal computers, control systems, and professional assistance systems.

BACKGROUND OF THE INVENTION

The prior art is rich in various systems and methods for data analysis, as well as various systems and methods relating to useful endeavors. In general, most existing systems and methods provide concrete functions, which have a defined response to a defined stimulus. Such systems, while embodying the "wisdom" of the designer, have a particular shortcoming in that their capabilities, user interface and functionality are static.

Intelligent or learning systems are also known. These systems are typically limited by the particular paradigm employed, and rarely are the learning algorithms general enough to be applied without limitation to other fields. In fact, while the generic theory and systems which learn are well known, the application of such systems to particular problems often requires both a detailed description of the problem, as well as knowledge of the input and output spaces. Even once these factors are known, a substantial tuning effort may be necessary to enable acceptable operation.

Therefore, the present invention builds upon the prior art, which defines various problems to be addressed, intelligent systems and methods, tuning paradigms and user interfaces. Therefore, as set forth below, and in the attached appendix of references and abstracts, incorporated herein by reference, a significant number of references detail fundamental technologies which may be improved according to the present invention, or incorporated together to form a part of the present invention. Thus, the complete disclosure of these references, combined with the disclosure herein, and/or with each other, are a part of the present invention. The disclosure herein is not meant to be limiting as to the knowledge of a person of ordinary skill in the art. Thus, prior art cited herein is intended to (1) disclose information related to the application published before the filing or effective filing date hereof: (2) define the problem in the art to which the present invention is directed, (3) define prior art methods of solving various problems also addressed by the present invention; (4) define the state of the art with respect to methods disclosed or referenced herein; (5) detail technologies used to implement methods or apparatus in accordance with the present invention: and/or (6) define elements of the invention as disclosed in individual references, combinations of references, and/or combinations of disclosure of the references with the express disclosure herein.

Human Interface

Aspects of the present invention provide an advanced user interface. The subject of man-machine interfaces has been studied for many years, and indeed the entire field of ergonomics and human factors engineering revolves around optimization of human-machine interfaces. Typically, the optimization scheme optimizes the mechanical elements of a design, or seeks to provide a universally optimized interface. Thus, a single user interface is typically provided for a system, although some systems have multiple different interfaces which may be related or unrelated. In fact, some systems provide a variety of related interfaces, for example, novice, intermediate and advanced, to provide differing balances between available control and presented complexity. Further, adaptive and/or responsive human-machine computer interfaces are now well known. However, a typical problem presented is to define a self-consistent and useful (i.e., an improvement over a well-designed static interface) theory for altering the interface. Therefore, even where, in a given application, a theory for optimization exists, the theory is typically not generalizable to other applications. Therefore, one aspect of the present invention is to provide such an overall theory by which adaptive and/or responsive user interfaces may be constructed and deployed.

In a particular application, the user interface according to the present invention may be applied to general-purpose-type computer systems, for example, personal computers. While it might seem that a general-purpose-type computer system interface would necessarily be general purpose, and therefore not require modification for the many potential uses, this is not the case. In fact, the lack of application specificity may make such an interface difficult to use, decreasing efficiency of use and increasing user frustration and the probability of error. One aspect of the present invention thus relates to a programmable device that comprises a menu-driven interface in which the user enters information using a direct manipulation input device. An earlier type of interface scheme addressing this issue is disclosed in Verplank, William L., "Graphics in Human-Computer Communication: Principles of Graphical User-Interface Design", Xerox Office Systems. See the references cited therein: Foley, J. D., Wallace, V. L., Chan, P., "The Human Factor of Computer Graphics Interaction Techniques", IEEE CG&A, November 1984, pp. 13–48; Koch, H., "Ergonomische Betrachtung von Schreibtastaturen", Humane Production, 1, pp. 12–15 (1985): Norman, D. A., Fisher, D., "Why Alphabetic Keyboards Are Not Easy To Use: Keyboard Layout Doesn't Much Matter", Human Factors 24(5), pp. 509–519 (1982); Perspectives: High Technology 2, 1985; Knowlton, K., "Virtual Pushbuttons as a Means of Person-Machine Interaction", Proc. of Conf. Computer Graphics, Pattern Recognition and Data Structure, Beverly Hills, Calif., May 1975, pp. 350–352; "Machine Now Reads, enters Information 25 Times Faster Than Human Keyboard Operators", Information Display 9, p. 18 (1981); "Scanner Converts Materials to Electronic Files for PCs", IEEE CG&A, December 1984, p. 76; "New Beetle Cursor Director Escapes All Surface Constraints", Information Display 10, p. 12, 1984: Lu, C., "Computer Pointing Devices: Living With Mice", High Technology, January 1984, pp. 61–65; "Finger Painting", Information Display 12, p. 18, 1981; Kraiss, K. F., "Neuere Methoden der Interaktion an der Schnittstelle Mensch-Maschine", Z. F. Arbeitswissenschaft, 2, pp. 65–70, 1978; Hirzinger, G., Landzettel, K., "Sensory Feedback Structures for Robots with Supervised Learning", IEEE Conf. on Robotics and Automation, St. Louis, March 1985; Horgan, H. "Medical Electronics", IEEE Spectrum, January 1984, pp. 90–93.

A menu based remote control-contained display device is disclosed in Platte, Oberjatzas, and Voessing, "A New Intelligent Remote Control Unit for Consumer Electronic Device", IEEE Transactions on Consumer Electronics, Vol. CE-31, No. 1, February 1985, 59–68.

It is noted that in text-based applications, an input device that is accessible, without the necessity of moving the user's hands from the keyboard, may be preferred. Known manual input devices include the trackball, mouse, and joystick. In addition, other devices are known, including the so-called "J-cursor" or "mousekey" which embeds a two (x,y) or three (x,y,p) axis pressure sensor in a button conformed to a finger, present in a general purpose keyboard; a keyboard joystick of the type described in Electronic Engineering Times, Oct. 28, 1991, p. 62. "IBM Points a New Way"; a so-called "isobar" which provides a two axis input by optical sensors (θ, x), a two and one half axis (x, y, digital input) input device, such as a mouse or a "felix" device, infrared, acoustic, etc.; position sensors for determining the position of a finger or pointer on a display screen (touch-screen input) or on a touch surface, e.g. "GlidePoint" (ALPS/Cirque); goniometer input (angle position, such as human joint position detector), etc. Many of such suitable devices are summarized in Kraiss, K. F., "Alternative Input Devices For Human Computer Interaction", Forschunginstitut Für Anthropotecahnik, Werthhoven, F. R. Germany. Another device, which may also be suitable is the GyroPoint, available from Gyration Inc., which provides 2-D or 3-D input information in up to six axes of motion: height, length, depth, roll, pitch and yaw. Such a device may be useful to assist a user in inputting a complex description of an object, by providing substantially more degrees of freedom sensing than minimally required by a standard graphic user interface. The many degrees of freedom available thus provide suitable input for various types of systems, such as "Virtual Reality" or which track a moving object, where many degrees of freedom and a high degree of input accuracy is required. The Hallpot, a device which pivots a magnet about a Hall effect sensor to produce angular orientation information, a pair of which may be used to provide information about two axes of displacement, available from Elweco, Inc, Willoughby, Ohio, may also be employed as an input device.

User input devices may be broken down into a number of categories: direct inputs, i.e. touch-screen and light pen; indirect inputs, i.e. trackball, joystick, mouse, touch-tablet, bar code scanner (see, e.g., Atkinson, Terry. "VCR Programming: Making Life Easier Using Bar Codes"), keyboard, and multi-function keys; and interactive input, i.e. Voice activation/instructions (see, e.g., Rosch, Winn L., "Voice Recognition: Understanding the Master's Voice", PC Magazine, Oct. 27, 1987, 261–308); and eye tracker and data suit/data glove (see, e.g. Tello, Ernest R., "Between Man And Machine", Byte, September 1988, 288–293; products of EXOS, Inc; Data Glove). Each of the aforementioned input devices has advantages and disadvantages, which are known in the art.

Studies suggest that a "direct manipulation" style of interface has advantages for menu selection tasks. This type of interface provides visual objects on a display screen, which can be manipulated by "pointing" and "clicking" on them. For example, the popular Graphical User Interfaces ("GUIs"), such as Macintosh and Microsoft Windows, and others known in the art, use a direct manipulation style interface. A device such as a touch-screen, with a more natural selection technique, is technically preferable to the direct manipulation method. However, the accuracy limitations and relatively high cost make other inputs more commercially practical. Further, for extended interactive use, touchscreens are not a panacea for office productivity applications. In addition, the user must be within arms' length of the touch-screen display. In a cursor positioning task, Albert (1982) found the trackball to be the most accurate pointing device and the touch-screen to be the least accurate when compared with other input devices such as the light pen, joystick, data tablet, trackball, and keyboard. Epps (1986) found both the mouse and trackball to be somewhat faster than both the touch-pad and joystick, but he concluded that there were no significant performance differences between the mouse and trackball as compared with the touch-pad and joystick.

A particular focus of the present invention is the application of the principles herein to consumer electronic devices and simple controls. The videocassette recorder (VCR) device exemplifies many of the issues presented. There have been many proposals and implementations seeking to improve the operation of the VCR control system. For example, a directional or direct manipulation-type sensor based infrared remote control is disclosed in Zeisel, Tomas, Tomaszewski, "An Interactive Menu-Driven Remote Control Unit for TV-Receivers and VC-Recorders". IEEE Transactions on Consumer Electronics, Vol. 34, No. 3, 814–818 (1988), which relates to a control for programming with the West German Videotext system. This implementation differs from the Videotext programming system than described in Bensch, U., "VPV—VIDEOTEXT PROGRAMS VIDEORECORDER", IEEE Transactions on Consumer Electronics, Vol. 34, No. 3, 788–792 (1988), which describes the system of Video Program System Signal Transmitters, in which the VCR is programmed by entering a code for the Video Program System signal, which is emitted by television stations in West Germany. Each separate program has a unique identifier code, transmitted at the beginning of the program, so that a user need only enter the code for the program, and the VCR will monitor the channel for the code transmission, and begin recording when the code is received, regardless of schedule changes. The Videotext Programs Recorder (VPV) disclosed does not intelligently interpret the transmission, rather the system reads the transmitted code as a literal label, without any analysis or determination of a classification of the program type.

The following references are also relevant to the interface aspects of the present invention:

Hoffberg, Linda 1, "AN IMPROVED HUMAN FACTORED INTERFACE FOR PROGRAMMABLE DEVICES: A CASE STUDY OF THE VCR" Master's Thesis, Tufts University (Master of Sciences in Engineering Design, November, 1990).

"Bar Code Programs VCR", Design News, Feb. 1, 1988, 26.

"How to find the best value in VCRs", Consumer Reports, March 1988, 135–141.

"Low-Cost VCRs: More For Less", Consumer Reports, March 1990, 168–172.

"Nielsen Views VCRs", Television Digest, Jun. 23, 1988, 15.

"The Highs and Lows of Nielsen Homevideo Index", Marketing & Media Decisions, November 1985, 84–86+.

"The Quest for 'User Friendly'", U.S. News & World Report, Jun. 13, 1988, 54–56.

"The Smart House: Human Factors in Home Automation", Human Factors in Practice, December 1990, 1–36.

"VCR, Camcorder Trends", Television Digest, Vol. 29:16 (Mar. 20, 1989).

"VCR's: A Look At The Top Of The Line", Consumer Reports, March 1989, 167–170.

"VHS Videocassette Recorders", Consumer Guide, 1990, 17–20.

Abedini, Kamran, "An Ergonomically-improved Remote Control Unit Design", Interface '87 Proceedings, 375–380.

Abedini, Kamran, and Hadad, George, "Guidelines For Designing Better VCRs", Report No. IME 462, Feb. 4, 1987.

Bensch, U., "VPV—VIDEOTEXT PROGRAMS VIDEORECORDER", IEEE Transactions on Consumer Electronics. 34(3): 788–792.

Berger, Ivan, "Secrets of the Universals", Video, February 1989, 45–47+.

Beringer, D. B., "A Comparative Evaluation of Calculator Watch Data Entry Technologies: Keyboards to Chalkboards", Applied Ergonomics, December 1985, 275–278.

Bier, E. A. et al. "MMM: A User Interface Architecture for Shared Editors on a Single Screen," Proceedings of the ACM Symposium on User Interface Software and Technology, Nov. 11–13, 1991, p. 79.

Bishop, Edward W., and Guinness, G. Victor Jr., "Human Factors Interaction with Industrial Design", Human Factors, 8(4):279–289 (August 1966).

Brown, Edward, "Human Factors Concepts For Management", Proceedings of the Human Factors Society, 1973, 372–375.

Bulkeley, Debra, "The Smartest House in America", Design News, Oct. 19, 1987, 56–61.

Card, Stuart K., "A Method for Calculating Performance times for Users of Interactive Computing Systems", IEEE, 1979, 653–658.

Carlson, Mark A., "Design Goals for an Effective User Interface", Electro/82 Proceedings, Mar. 1, 2001–Mar. 1, 2004.

Carlson, Mark A., "Design Goals for an Effective User Interface", Human Interfacing with Instruments, Session 3.

Carroll, Paul B., "High Tech Gear Draws Cries of "Uncle"", Wall Street Journal, Apr. 27, 1988, 29.

Cobb, Nathan, "I don't get it", Boston Sunday Globe Magazine, Mar. 25, 1990, 23–29.

Davis, Fred, "The Great Look-and-Feel Debate", A+, 5:9–11 (July 1987).

Dehning, Waltraud, Essig Heidrun, and Maass, Susanne, The Adaptation of Virtual Man-Computer Interfaces to User Requirements in Dialogs, Germany: Springer-Verlag, 1981.

Ehrenreich, S. L., "Computer Abbreviations—Evidence and Synthesis", Human Factors, 27(2):143–155 (April 1985).

Friedman, M. B., "An Eye Gaze Controlled Keyboard", Proceedings of the 2nd International Conference on Rehabilitation Engineering, 1984, 446–447.

Gilfoil, D., and Mauro, C. L., "Integrating Human Factors and Design: Matching Human Factors Methods up to Product Development", C. L. Mauro Assoc., Inc., 1–7.

Gould, John D., Boies, Stephen J., Meluson, Antonia, Rasammy, Marwan, and Vosburgh, Ann Marie, "Entry and Selection Methods For Specifying Dates". Human Factors, 32(2):199–214 (April 1989).

Green, Lee, "Thermo Tech: Here's a common sense guide to the new thinking thermostats", Popular Mechanics, October 1985, 155–159.

Grudin, Jonathan, "The Case Against User Interface Consistency", MCC Technical Report Number ACA-HI-002-89, January 1989.

Harvey, Michael G., and Rothe, James T., "VideoCassette Recorders: Their Impact on Viewers and Advertisers", Journal of Advertising, 25:19–29 (December/January 1985).

Hawkins, William J., "Super Remotes", Popular Science, February 1989, 76–77.

Henke, Lucy L., and Donohue, Thomas R., "Functional Displacement of Traditional TV Viewing by VCR Owners", Journal of Advertising Research, 29:18–24 (April–May 1989).

Hoban, Phoebe, "Stacking the Decks", New York, Feb. 16, 1987, 20:14.

Howard, Bill, "Point and Shoot Devices", PC Magazine, 6:95–97 (August 1987).

Jane Pauley Special, NBC TV News Transcript, Jul. 17, 1990, 10:00 PM.

Kolson, Ann, "Computer wimps drown in a raging sea of technology", The Hartford Courant, May 24, 1989, B1.

Kreifeldt, J. G., "A Methodology For Consumer Product Safety Analysis", The 3rd National Symposium on Human Factors in Industrial Design in Consumer Products, August 1982, 175–184.

Kreifeldt, John, "Human Factors Approach to Medical Instrument Design", Electro/82 Proceedings, Mar. 3, 2001–Mar. 3, 2006.

Kuocheng, Andy Poing, and Ellingstad, Vernon S., "Touch Tablet and Touch Input", Interface '87, 327.

Ledgard, Henry, Singer, Andrew, and Whiteside, John, Directions in Human Factors for Interactive Systems, New York, Springer-Verlag, 1981.

Lee, Eric, and MacGregor, James, "Minimizing User Search Time Menu Retrieval Systems", Human Factors, 27(2):157–162 (April 1986).

Leon, Carol Boyd, "Selling Through the VCR", American Demographics, December 1987, 40–43.

Long, John, "The Effect of Display Format on the Direct Entry of Numerical Information by Pointing", Human Factors, 26(1):3–17 (February 1984).

Mantei, Marilyn M., and Teorey, Toby J., "Cost/Benefit Analysis for Incorporating Human Factors in the Software Lifecycle", Association for Computing Machinery, 1988.

Meads, Jon A., "Friendly or Frivolous", Datamation, Apr. 1, 1988, 98–100.

Moore, T. G. and Dartnall, "Human Factors of a Microelectronic Product: The Central Heating Timer/Programmer", Applied Ergonomics, 1983, 13(1):15–23.

Norman, Donald A., "Infuriating By Design", Psychology Today, 22(3):52–56 (March 1988).

Norman, Donald A., The Psychology of Everyday Things, New York, Basic Book, Inc. 1988.

Platte, Hans-Joachim, Oberjatzas, Gunter, and Voessing, Walter, "A New Intelligent Remote Control Unit for Consumer Electronic Device", IEEE Transactions on Consumer Electronics, Vol. CE-31(1):59–68 (February 1985).

Rogus, John G. and Armstrong, Richard, "Use of Human Engineering Standards in Design", Human Factors, 19(1):15–23 (February 1977).

Rosch, Winn L., "Voice Recognition: Understanding the Master's Voice", PC Magazine, Oct. 27, 1987, 261–308.

Sarver, Carleton, "A Perfect Friendship", High Fidelity, 39:42–49 (May 1989).

Schmitt. Lee, "Let's Discuss Programmable Controllers", Modern Machine Shop, May 1987, 90–99.

Schniederman, Ben, Designing the User Interface: Strategies for Effective Human-Computer Interaction, Reading, Mass., Addison-Wesley, 1987.

Smith, Sidney J., and Mosier, Jane N., Guidelines for Designing User Interface Software, Bedford, Mass., MITRE, 1986.

Sperling, Barbara Bied, Tullis Thomas S., "Are You a Better 'Mouser' or 'Trackballer'? A Comparison of Cursor—Positioning Performance", An Interactive/Poster Session at the CHI+GI'87 Graphics Interface and Human Factors in Computing Systems Conference.

Streeter, L. A., Ackroff, J. M., and Taylor, G. A. "On Abbreviating Command Names", The Bell System Technical Journal, 62(6):1807–1826 (July/August 1983).

Swanson, David, and Klopfenstein, Bruce, "How to Forecast VCR Penetration", American Demographic, December 1987, 44–45.

Tello, Ernest R., "Between Man And Machine", Byte, September 1988, 288–293.

Thomas, John, C., and Schneider, Michael L., Human Factors in Computer Systems, New Jersey, Ablex Publ. Co., 1984.

Trachtenberg, Jeffrey A., "How do we confuse thee? Let us count the ways", Forbes, Mar. 21, 1988, 159–160.

Tyldesley, D. A., "Employing Usability Engineering in the Development of Office Products", The Computer Journal", 31(5):431–436 (1988).

Verplank, William L., "Graphics in Human-Computer Communication: Principles of Graphical User-Interface Design", Xerox Office Systems.

Voyt, Carlton F., "PLC's Learn New Languages", Design News, Jan. 2, 1989, 78.

Whitefield, A. "Human Factors Aspects of Pointing as an Input Technique in Interactive Computer Systems", Applied Ergonomics, June 1986, 97–104.

Wiedenbeck, Susan, Lambert, Robin, and Scholtz, Jean, "Using Protocol Analysis to Study the User Interface", Bulletin of the American Society for Information Science, June/July 1989, 25–26.

Wilke, William. "Easy Operation of Instruments by Both Man and Machine". Electro/82 Proceedings, Mar. 2, 2001–Mar. 2, 2004.

Yoder, Stephen Kreider, "U.S. Inventors Thrive at Electronics Show", The Wall Street Journal, Jan. 10, 1990, B1.

Zeisel, Gunter, Tomas, Philippe, Tomaszewski, Peter, "An Interactive Menu-Driven Remote Control Unit for TV-Receivers and VC-Recorders", IEEE Transactions on Consumer Electronics, 34(3):814–818.

Agent Technologies

Presently well known human computer interfaces include so-called agent technology, in which the computer interface learns a task defined (inherently or explicitly) by the user and subsequently executes the task or negotiates with other systems to achieve the results desired by the user. The user task may be defined explicitly, by defining a set of rules to be followed, or implicitly, by observation of the user during completion of the specified task, and generalizing to a generalized construct or "agent". Such systems are available from Firefly (www.firefly.com), and are commercially present in some on-line commerce systems, such as Amazon.com (www.amazon.com). There is some debate in the art as to what constitutes an "agent". Herein, such "agent" technology shall be interpreted to encompass any automated method or system which embodies decision-making capability defined by or derived from the user, and which may vary between different users. See:

"ABI WHAP, Web Hypertext Applications Processor," http://alphabase.com/abi3/whapinfo.html#profiling, (1996, Jul. 11).

"AdForce Feature Set", http://www.imgis.com/index.html/core/p2—2html (1997, Apr. 11).

"IPRO," http://www.ipro.com/, Internet profiles Corporation Home and other Web Pages (1996, Jul. 11).

"Media Planning is Redefined in a New Era of Online Advertising," PR Newswire, (1996, Feb. 5).

"My Yahoo! news summary for My Yahoo! Quotes", http://my.yahoo.com, (1997, Jan. 27).

"NetGravity Announces Adserver 2.1", http://www.netgravity.com/news/pressrel/launch21.html (1997, Apr. 11).

"Netscape & NetGravity: Any Questions?", http://www.netgravity.com/, (1996, Jul. 11).

"Network Site Main", http://www.doubleclick.net/frames/general/nets2set.htm (1997, Apr. 11).

"Real Media," http://www.realmedia.com/index.html, (1996, Jul. 11).

"The Front Page", http://live.excite.com/?aBb (1997, Jan. 27) and (1997, Apr. 11).

"The Pointcast Network," http:/www.pointcast.com/, (1996, Spring).

"The Power of PenPoint", Can et al., 1991, p. 39, Chapter 13, pp. 258–260.

"Welcome to Lycos," http://www.lycos.com, (1997, Jan. 27).

Abatemarco, Fred, "From the Editor", Popular Science, September 1992, p. 4

Berniker, M., "Nielsen plans Internet Service," Broadcasting & Cable, 125(30):34 (1995, Jul. 24).

Berry, Deanne, et al. In an Apr. 10, 1990 news release, Symantec announced a new version of MORE (TM).

Betts, M., "Sentry cuts access to naughty bits," Computers and Security, vol. 14, No. 7, p. 615 (1995).

Boy, Guy A., Intelligent Assistant Systems, Harcourt Brace Jovanovich, 1991, uses the term "Intelligent Assistant Systems".

Bussey, H. E., et al., "Service Architecture, Prototype Description, and Network Implications of a Personalized Information Grazing Service," IEEE Multiple Facets of Integration Conference Proceedings, vol. 3, No. Conf. 9, Jun. 3, 1990, pp. 1046–1053.

Donnelley, J. E., "WWW media distribution via Hopewise Reliabe Multicast," Computer Networks and ISDN Systems, vol. 27, No. 6, pp. 81–788 (April, 1995).

Edwards, John R., "Q&A: Integrated Software with Macros and an Intelligent Assistant", Byte Magazine, January 1986, vol. 11, Issue 1, pp. 120–122, critiques the Intelligent Assistant by Symantec Corporation.

Elofson, G. and Konsynski, B., "Delegation Technologies: Environmental Scanning with Intelligent Agents". Journal of Management Information Systems, Summer 1991, vol. 8, Issue 1, pp. 37–62.

Garretson, R., "IBM Adds 'Drawing Assistant' Design Tool to Graphics Series", PC Week, Aug. 13, 1985, vol. 2, Issue 32, p. 8.

Gessler, S. and Kotulla A., "PDAs as mobile WWW browsers," Computer Networks and ISDN Systems, vol. 28, No. 1–2, pp. 53–59 (December 1995).

Glinert-Stevens, Susan, "Microsoft Publisher: Desktop Wizardry", PC Sources, February, 1992, vol. 3, Issue 2, p. 357.

Goldberg, Cheryl, "IBM Drawing Assistant: Graphics for the EGA", PC Magazine, Dec. 24, 1985, vol. 4, Issue 26, p. 255.

Hendrix, Gary G. and Walter, Brett A., "The Intelligent Assistant: Technical Considerations Involved in Designing Q&A's Natural-language Interface", Byte Magazine, December 1987, vol. 12, Issue 14, p. 251.

Hoffman, D. L. et al., "A New Marketing Paradigm for Electronic Commerce," (1996, Feb. 19), http://www2000.ogsm.vanderbilt.edu novak/new.marketing.paradigm.html.

Information describing BroadVision One-to-One Application System: "Overview," p. 1; Further Resources on One-To-One Marketing, p. 1; BroadVision Unleashes the Power of the Internet with Personalized Marketing and Selling, pp. 1–3; Frequently Asked Questions, pp. 1–3; Products, p. 1; BroadVision One-To-One(.TM.), pp. 1–2; Dynamic Command Center, p. 1; Architecture that Scales, pp. 1–2; Technology, pp. 1; Creating a New Medium for Marketing and Selling BroadVision One-To-One and the World Wide Web a White Paper, pp. 1–15; http://www.broadvision.com (1996, January–March).

Jones, R., "Digital's World-Wide Web server: A case study," Computer Networks and ISDN Systems, vol. 27, No. 2, pp. 297–306 (November 1994).

McFadden, M., "The Web and the Cookie Monster," Digital Age, (1996, Aug.).

Nadoli, Gajanana and Biegel, John, "Intelligent Agents in the Simulation of Manufacturing Systems", Proceedings of the SCS Multiconference on AI and Simulation, 1989.

Nilsson, B. A., "Microsoft Publisher is an Honorable Start for DTP Beginners", Computer Shopper, February 1992, vol. 12, Issue 2, p. 426, evaluates Microsoft Publisher and Page Wizard.

O'Connor, Rory J., "Apple Banking on Newton's Brain", San Jose Mercury News, Wednesday, Apr. 22, 1992.

Ohsawa, I. and Yonezawa, A., "A Computational Model of an Intelligent Agent Who Talks with a Person", Research Reports on Information Sciences, Series C, April 1989, No. 92, pp. 1–18.

Pazzani, M. et al., "Learning from hotlists and coldlists: Towards a WWW Information Filtering and Seeking Agent," Proceedings International Conference on Tools with Artificial Intelligence, January 1995, pp. 492–495.

Poor, Alfred, "Microsoft Publisher", PC Magazine, Nov. 26, 1991, vol. 10, Issue 20, p. 40, evaluates Microsoft Publisher.

PRNewswire, information concerning the PointCast Network (PCN) (1996, Feb. 13) p. 213.

Raggett, D., "A review of the HTML+document format," Computer Networks and ISDN Systems, vol. 27, No. 2, pp. 35–145 (November 1994).

Rampe, Dan, et al. In a Jan. 9, 1989 news release, Claris Corporation announced two products, SmartForm Designer and SmartForm Assistant, which provide "Intelligent Assistance", such as custom help messages, choice lists, and data-entry validation and formatting.

Ratcliffe, Mitch and Gore, Andrew, "Intelligent Agents take U.S. Bows.", MacWeek, Mar. 2, 1992, vol. 6, No. 9, p. 1.

Sharif Heger, A. and Koen, B. V., "KNOWBOT: an Adaptive Data Base Interface", Nuclear Science and Engineering, February 1991, vol. 107, No. 2, pp. 142–157.

Soviero, Marcelle M., "Your World According to Newton", Popular Science, September 1992, pp. 45–49.

Upendra Shardanand, "Social Information Filtering for Music Recommendation" September 1994, pp. 1–93, Massachusetts Institute of Technology, Thesis.

Weber, Thomas E., "Software Lets Marketers Target Web Ads," The Wall Street Journal, Apr. 21, 1997

Weiman, Liza and Moran, Tom, "A Step toward the Future". Macworld, August 1992, pp. 129–131.

Yan, T. W. and Garcia-Molina, H., "SIFT—A Tool for Wide-Area Information Dissemination," Paper presented at the USENIX Technical Conference, New Orleans, La. (1995, Jan.), pp. 177–186.

See, also Virtual Library Jam Project, http://www.cs.mu.oz.au/agentlab/VL/VL-JAM.html:

Akoulchina, Irina, and Jean-Gabriel Ganascia (1997) SATELIT-Agent: An Adaptive Interface Based on Learning Interface Agents Technology. In Proceedings of the Sixth International Conference on User Modeling. http://www.cs.mu.oz.au/agentlab/VL/ps/AkoulchinaI.ps Ambrosini, Leonardo., Vincenzo Cirillo, and Alessandro Micarelli (1997). A Hybrid Architecture for User-Adapted Information Filtering on the World Wide Web. In Proceedings of the Sixth International Conference on User Modeling. http://www.cs.mu.oz.au/agentlab/VL/ps/AmbrosiniL.ps Arocena, Gustavo O., Alberto O. Mendelzon, George A. Mihaila (1996). Applications of a Web query language. In Hyper Proceeding of the Sixth International World Wide Web Conference. http://www.cs.mu.oz.au/agentlab/VL/html/PAPER267.html.

Benaki, Eftihia., Vangelis A. Karkaletsis, and Constantine D. Spyropoulos (1997) Integrating User Modeling Into Information Extraction: The UMIE Prototype. In Proceedings of the Sixth International Conference on User Modeling. http://www.cs.mu.oz.au/agentlab/VL/ps/BenakiE.ps Jeffrey M. Bradshaw, Peter D. Holm, John H. Boose, Douglas Skuce, Timothy C. Lethbridge (1992) Sharable Ontologies as a Basis for Communication and Collaboration in Conceptual Modeling. In Proceedings of the Seventh Knowledge Acquisition for Knowledge-Based Systems Workshop, Banff. http://www.cs.mu.oz.au/agentlab/VL/html/KAW92SharableOntologies.html Jeffrey M. Bradshaw, Kenneth M. Ford, Jack R. Adams-Webber, John H. Boose (1993) Beyond the Repertory Grid: New Approaches to Constructivist Knowledge Acquisition Tool Development. In K. M. Ford & J. M. Bradshaw (Ed.) Knowledge Acquisition as Modeling. Wiley. http://www.cs.mu.oz.au/agentlab/VL/html/BeyondtheRepGrid.html.

Bradshaw, Jeffrey M.; John H. Boose (1991) Mediating Representations for Knowledge Acquisition. In Proceedings of the AAAI '92 Knowledge Acquisition: From Science to Techniques to Tools Workshop Anaheim, Calif., July, 1991. http://www.cs.mu.oz.au/agentlab/VL/html/MediatingRepsforKA.html.

Boose, John H.; Brian R. Gaines (1989) Knowledge Acquisition for Knowledge-Based Systems: Notes on the State-of-the-Art. In Machine Learning Journal, 4, pp. 377–394. http://www.cs.mu.oz.au/agentlab/VL/html/MLJEditorialNotes.html.

Boose, John H. (1990) Knowledge Acquisition Tools, Methods, and Mediating Representations. In John H. Boose. In Motoda, H., Mizoguchi, R., Boose, J. H., and Gaines, B. R. (Eds.) Knowledge Acquisition Tools, Methods, and Mediating Representations (1990). Proceedings of the First Japanese Knowledge Acquisition for Knowledge-Based Systems Workshop: JKAW-90, Ohmsha, Ltd: Japan http://www.cs.mu.oz.au/agentlab/VL/html/JKAW90KATechsMedReps.html Chekuri, Chandra, Michael H. Goldwasser, Prabhakar Raghaven & Eli Upfal (1996) Web search using automatic classification. In Report to Computer Science Department, Stanford University. http://www.cs.mu.oz.au/agentlab/VL/html/WebSearch.html De Carolis, Berardina & Sebastiano Pizzutilo (1997) From Discourse Plans to User-Adapted Hypermedia. In Proceedings of the Sixth International Conference on User Modeling. http://www.cs.mu.oz.au/agentlab/VL/ps/DeCarolisB.ps Fink, Josef, Alfred Kobsa, and Andreas Nill (1997) Adaptable and Adaptive Information Access for All Users, Including the Disabled and the Elderly. In Proceedings of the Sixth International Conference on User Modeling. http://www.cs.mu.oz.au/agentlab/VL/ps/FinkJ.ps Gaines, Brian R.; Mildred L G Shaw (1992) Integrated Knowledge Acquisition Architectures. In Journal for Intelligent Information Systems 1(1) 9–34, 1992. http://www.cs.mu.oz.au/agentlab/VL/ps/IntegArchKA.ps Gaines, Brian R.; Mildred L G Shaw (1993) Eliciting Knowledge and Transferring it Effectively to a Knowledge-Based System. In IEEE Transactions on Knowledge and Data Engineering 5(1) 4–14, 1993. http://www.cs.mu.oz.au/agentlab/VL/ps/KSSO.ps Gaines, Brian R.; Mildred L G Shaw (1993) Knowledge Acquisition Tools based on Personal Construct Psychology. In Knowledge Engineering Review, 8(1) 49–85, 1993. http://www.cs.mu.oz.au/agentlab/VL/ps/KER93.ps Gaines, Brian R.; Mildred L G Shaw (1995) Concept Maps as Hypermedia Components. In International Journal of Human-Computer Studies, 1995. http://www.cs.mu.oz.au/agentlab/VL/ps/ConceptMaps.ps Gaines, Brian R. (1991) An Interactive Visual Language for Term Subsumption Languages. In IJCAI91: Proceedings of the Twelfth International Joint Conference on Artificial Intelligence. pp. 817–823 San Mateo, Calif.: Morgan Kaufmann. 1991. http://www.cs.mu.oz.au/agentlab/VL/ps/IJCAI91.ps Gaines, Brian R. (1994) The Collective Stance in Modeling Expertise in Individuals and Organizations. In (short version in—International Journal of Expert Systems 7(1) 21–51, 1994). http://www.cs.mu.oz.au/agentlab/VL/ps/Collective.ps Gaines, Brian R. Between Neuron, Culture and Logic: Explicating the Cognitive Nexus. In ICO: Intelligence Artificielle et Sciences Cognitives au Quebec, 3(2) 47–61, 1991. http://www.cs.mu.oz.au/agentlab/VL/ps/ICO91.ps Gori, Marco., Marco Maggini, and Enrico Martinelli (1997) Web-Browser Access Through Voice Input and Page Interest Prediction. In Proceedings of the Sixth International Conference on User Modeling. http://www.cs.mu.oz.au/agentlab/VL/ps/GoriM.ps Guarino, Nicola (1994) The Ontological Level. In R. Casati, B. Smith; G. White (eds.) Philosophy and the Cognitive Sciences, Vienna: Hulder-Pichler-Tempsky.

Harmelen van, Frank, Ramon Lopez de Mantaras, Jacek Malec, Jan Treur (1993) Comparing Formal Specification Languages for Complex Reasoning Systems. In Jackson, Peter (1990) Introduction to expert systems—2nd ed. Wokingham: Addison-Wesley.

Maglio, Paul P. and Rob Barrett (1997) How to Build Modeling Agents to Support Web Searchers. In Proceedings of the Sixth International Conference on User Modeling. http://www.cs.mu.oz.au/agentlab/VL/ps/MaglioP.ps Marchiori, Massimo (1996) The quest for correct information on the Web: hyper search engines. In Hyper Proceeding of the Sixth International World Wide Web Conference. http://www.cs.mu.oz.au/agentlab/VL/html/PAPER222.html Mills, Timothy, Ken Moody, Kerry Rodin (1997) Cobra: A new approach to IR system design. In Proceedings of RIAO '97, pp425–449. http://www.cs.mu.oz.au/agentlab/VL/ps/Cobra-riao.ps Mukherjea, Sougata, Kyoji Hirata; Yoshinori Hara (1996) Towards a multimedia world-wide web information retrieval engine. In Hyper Proceeding of the Sixth International World Wide Web Conference. http://www.cs.mu.oz.au/agentlab/VL/html/PAPER3.html Newell, A. (1982) The Knowledge Level. In Artificial Intelligence, vol. 18, no. 1, pp. 87–127.

Prerau, David S. (1990) Developing and managing expert systems: proven techniques for business and industry. Mass: Addison-Wesley.

Ramscar, Michael., Helen Pain, and John Lee (1997) Do We Know What the User Knows, and Does It Matter? The Epistemics of User Modelling. In Proceedings of the Sixth International Conference on User Modeling. http://www.cs.mu.oz.au/agentlab/VL/ps/RamscarM.ps Saracevic, Tefko., Amanda Spink, and Mei—Mei Wu (1997) Users and Intermediaries in Information Retrieval: What Are They Talking About? In Proceedings of the Sixth International Conference on User Modeling. http://www.cs.mu.oz.au/agentlab/VL/ps/SaracevicT.ps Seta, Kazuhisa., Mitsuru Ikeda, Osamu Kakusho, and Riichiro Mizoguchi (1997) Capturing a Conceptual Model for End-User Programming: Task Ontology as a Static User Model. In Proceedings of the Sixth International Conference on User Modeling. http://www.cs.mu.oz.au/agentlab/VL/ps/SetaK.ps Shakes, Jonathan, Mark Langheinrich; Oren Etzioni (1996) Dynamic reference shifting: a case study in the homepage domain. In Hyper Proceeding of the Sixth International World Wide Web Conference. http://www.cs.mu.oz.au/agentlab/VL/html/PAPER39.html Shaw, Mildred L. G.; Brian R Gaines (1992) Kelly's Geometry of Psychological Space and its Significance for Cognitive Modeling. In The New Psychologist, October 1992, 23–31. http://www.cs.mu.oz.au/agentlab/VL/ps/NewPsych92.ps Shaw, Mildred L. G.; Brian R Gaines (1995) Comparing Constructions through the Web. In Proceedings of CSCL95: Computer Supported Cooperative Learning. Bloomington, October, 1995. http://www.cs.mu.oz.au/agentlab/VL/ps/CSCL95WG.ps Simons, Joel (1997) Using a Semantic User Model to Filter the World Wide Web Proactively. In Proceedings of the Sixth International Conference on User Modeling. http://www.cs.mu.oz.au/agentlab/VL/ps/SimonsJ.ps Spertus, Ellen (1996) ParaSite: mining the structural information on the Web. In Hyper Proceeding of the Sixth International World Wide Web Conference. http://www.cs.mu.oz.au/agentlab/VL/html/PAPER206.html Staff, Christopher (1997) HyperContext: A Model for Adaptive Hypertext. In Proceedings of the Sixth International Conference on User Modeling. http://www.cs.mu.oz.au/agentlab/VL/ps/StaffC.ps Stefik, Mark (1995) Introduction to Knowledge Systems. San Francisco: Morgan Kaufmann.

Vassileva, Julita (1997) A New View of Interactive Human-Computer Environments. In Proceedings of the Sixth International Conference on User Modeling. http://www.cs.mu.oz.au/agentlab/VL/ps/VassilevaJ.ps Weber, Gerhard.; Marcus Specht (1997) User Modeling and Adaptive Navigation Support in WWW-Based Tutoring Systems. In Proceedings of the Sixth International Conference on User Modeling. http://www.cs.mu.oz.au/agentlab/VL/ps/WeberG.ps Industrial Controls Industrial control systems are well known. Typically, a dedicated reliable hardware module controls a task using a conventional algorithm, with a low level user interface. These devices are programmable, and therfore a high level software program may be provided to translate user instructions into the low level commands, and to analyze any return data. See, U.S. Pat. No. 5,506,768, expressly incorporated herein by reference. See, also:

A. B. Corripio, "Tuning of Industrial Control Systems", Instrument Society of America, Research Triangle Park, N.C. (1990) pp. 65–81.

C. J. Harris & S. A. Billings, "Self-Tuning and Adaptive Control: Theory and Applications", Peter Peregrinus LTD (1981) pp. 20–33.

C. Rohrer & Clay Nesler, "Self-Tuning Using a Pattern Recognition Approach", Johnson Controls, Inc., Research Brief 228 (Jun. 13, 1986).

D. E. Seborg, T. F. Edgar, & D. A. Mellichamp, "Process Dynamics and Control", John Wiley & Sons, NY (1989) pp. 294–307, 538–541.

E. H. Bristol & T. W. Kraus, "Life with Pattern Adaptation". Proceedings 1984 American Control Conference, pp. 888–892, San Diego, Calif. (1984).

Francis Schied, "Shaum's Outline Series-Theory & Problems of Numerical Analysis", McGraw-Hill Book Co., NY (1968) pp. 236, 237, 243, 244, 261.

K. J. Astrom and B. Wittenmark, "Adaptive Control", Addison-Wesley Publishing Company (1989) pp. 105–215.

K. J. Astrom, T. Hagglund, "Automatic Tuning of PID Controllers", Instrument Society of America, Research Triangle Park, N.C. (1988) pp. 105–132.

R. W. Haines, "HVAC Systems Design Handbook", TAB Professional and Reference Books, Blue Ridge Summit, Pa. (1988) pp. 170–177.

S. M. Pandit & S. M. Wu, "Timer Series & System Analysis with Applications", John Wiley & Sons, Inc. NY (1983) pp. 200–205.

T. W. Kraus 7 T. J. Myron, "Self-Tuning PID Controller Uses Pattern Recognition Approach", Control Engineering, pp. 106–111, June 1984.

Pattern Recognition

Another aspect of some embodiments of the invention relates to signal analysis and complex pattern recognition. This aspect encompasses analysis of any data set presented to the system: internal, user interface, or the environment in which it operates. While semantic, optical and audio analysis systems are known, the invention is by no means limited to these types of data.

Pattern recognition involves examining a complex data set to determine similarities (in its broadest context) with other data sets, typically data sets that have been previously characterized. These data sets may comprise multivariate inputs-, sequences in time or other dimension, or a combination of both multivariate data sets with multiple dimensions.

The following cited patents and publications are relevant to pattern recognition and control aspects of the present invention, and are herein expressly incorporated by reference:

U.S. Pat. No. 5,067,163, incorporated herein by reference, discloses a method for determining a desired image signal range from an image having a single background, in particular a radiation image such as a medical X-ray. This reference teaches basic image enhancement techniques.

U.S. Pat. No. 5,068,664, incorporated herein by reference, discloses a method and device for recognizing a target among a plurality of known targets, by using a probability based recognition system. This patent document cites a number of other references, which are relevant to the problem of image recognition:

Appriou, A., "Interet des theories de l'incertain en fusion de donnees", Colloque International sur le Radar Paris, 24–28 avril 1989.

Appriou, A., "Procedure d'aide a la decision multi-informateurs. Applications a la classification multi-capteurs de cibles", Symposium de l'Avionics Panel (AGARD) Turquie, 25–29 avril 1988.

Arrow, K. J., "Social choice and individual valves", John Wiley and Sons Inc. (1963).

Bellman, R. E., L. A. Zadeh, "Decision making in a fuzzy environment", Management Science, 17(4) (December 1970).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Blair, D., R. Pollack, "La logique du choix collectif" Pour la Science (1983).

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Dempster, A. P., "A generalization of Bayesian inference", Journal of the Royal Statistical Society, Vol. 30, Series B (1968).

Dempster, A. P., "Upper and lower probabilities induced by a multivalued mapping", Annals of mathematical Statistics, no. 38 (1967).

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Duda, R. O., P. E. Hart, M. J. Nilsson, "Subjective Bayesian methods for rule-based inference systems", Technical Note 124-Artificial Intelligence Center-SRI International.

Fua, P. V., "Using probability density functions in the framework of evidential reasoning Uncertainty in knowledge based systems", B. Bouchon, R. R. Yager. Eds. Springer Verlag (1987).

Ishizuka, M., "Inference methods based on extended Dempster and Shafer's theory for problems with uncertainty/fuzziness", New Generation Computing, 1:159–168 (1983), Ohmsha, Ltd, and Springer Verlag.

Jeffrey, R. J., "The logic of decision", The University of Chicago Press, Ltd., London (1983)(2nd Ed.).

Kaufmann, A., "Introduction a la theorie des sous-ensembles flous", Vol. 1, 2 et 3-Masson-Paris (1975).

Keeney, R. L., B. Raiffa, "Decisions with multiple objectives: Preferences and value tradeoffs", John Wiley and Sons, New York (1976).

Ksienski et al., "Low Frequency Approach to Target Identification", Proc. of the IEEE, 63(12):1651–1660 (December 1975).

Kyburg, H. E., "Bayesian and non Bayesian evidential updating", Artificial Intelligence 31:271–293 (1987).

Roy, B., "Classements et choix en presence de points de vue multiples". R.I.R.O.-2eme annee-no. 8, pp. 57–75 (1968).

Roy, B. "Electre III: un algorithme de classements fonde sur une representation floue des preferences en presence de criteres multiples". Cahiers du CERO, 20(1):3–24 (1978).

Scharlic, A., "Decider sur plusieurs criteres. Panorama de l'aide a la decision multicritere" Presses Polytechniques Romandes (1985).

Shafer, G., "A mathematical theory of evidence", Princeton University Press, Princeton, N.J. (1976).

Sugeno, M., "Theory of fuzzy integrals and its applications". Tokyo Institute of Technology (1974).

Vannicola et al, "Applications of Knowledge based Systems to Surveillance", Proceedings of the 1988 IEEE National Radar Conference, 20–21 April 1988, pp. 157–164.

Yager, R. R., "Entropy and specificity in a mathematical theory of Evidence", Int. J. General Systems, 9:249–260 (1983).

Zadeh, L. A., "Fuzzy sets as a basis for a theory of possibility", Fuzzy sets and Systems 1:3–28 (1978).

Zadeh, L. A., "Fuzzy sets", Information and Control, 8:338–353 (1965).

Zadeh, L. A., "Probability measures of fuzzy events", Journal of Mathematical Analysis and Applications, 23:421–427 (1968).

U.S. Pat. No. 5,067,161, incorporated herein by reference relates to a video image pattern recognition system, which recognizes objects in near real time.

U.S. Pat. Nos. 4,817,176 and 4,802,230, both incorporated herein by reference, relate to harmonic transform methods of pattern matching of an undetermined pattern to known patterns, and are useful in the pattern recognition method of the present invention. U.S. Pat. No. 4,998,286, incorporated herein by reference, relates to a harmonic transform method for comparing multidimensional images, such as color images, and is useful in the present pattern recognition methods.

U.S. Pat. No. 5,067,166, incorporated herein by reference, relates to a pattern recognition system, in which a local optimum match between subsets of candidate reference label sequences and candidate templates. It is clear that this method is useful in the pattern recognition aspects of the present invention. It is also clear that the interface and control system of the present invention are useful adjuncts to the method disclosed in U.S. Pat. No. 5,067,166.

U.S. Pat. No. 5,048,095, incorporated herein by reference, relates to the use of a genetic learning algorithm to adaptively segment images, which is an initial stage in image recognition. This patent has a software listing for this method. It is clear that this method is useful in the pattern recognition aspects of the present invention. It is also clear that the interface and control system of the present invention are useful adjuncts to the method disclosed in U.S. Pat. No. 5,048,095.

Fractal-Based Image Processing

Fractals are a relatively new field of science and technology that relate to the study of order and chaos. While the field of fractals is now very dense, a number of relevant principles are applicable. First, when the coordinate axes of a space are not independent, and are related by a recursive algorithm, then the space is considered to have a fractional dimensionality. One characteristic of such systems is that a mapping of such spaces tends to have self-similarity on a number of scales. Interestingly, natural systems have also been observed to have self-similarity over several orders of magnitude, although as presently believed, not over an unlimited range of scales. Therefore, one theory holds that images of natural objects may be efficiently described by iterated function systems (IFS), which provide a series of parameters for a generic formula or algorithm, which, when the process is reversed, is visually similar to the starting image. Since the "noise" of the expanded data is masked by the "natural" appearance of the result, visually acceptable image compression may be provided at relatively high compression ratios accompanied by substantial loss of true image information. This theory remains the subject of significant debate, and, for example, wavelet algorithm advocates claim superior results for a more general set of starting images. It is noted that, on a mathematical level, wavelets and fractal constructs are similar or overlapping.

U.S. Pat. No. 5,065,447, and 4,941,193, both incorporated herein by reference, relate to the compression of image data by using fractal transforms. These are discussed in detail below. U.S. Pat. No. 5,065,447 cites a number of references, relevant to the use of fractals in image processing:

U.S. Pat. No. 4,831,659.

"A New Class of Markov Processes for Image Encoding", School of Mathematics, Georgia Inst. of Technology (1988), pp. 14–32.

"Construction of Fractal Objects with Iterated Function Systems", Siggraph '85 Proceedings, 19(3):271–278 (1985).

"Data Compression: Pntng by Numbrs", The Economist, May 21, 1988.

"Fractal Geometry-Understanding Chaos", Georgia Tech Alumni Magazine, p. 16 (Spring 1986).

"Fractal Modelling of Biological Structures", Perspectives in Biological Dynamics and Theoretical Medicine, Koslow, Mandell, Shlesinger, eds., Annals of New York Academy of Sciences, vol. 504, 179–194 (date unknown).

"Fractal Modelling of Real World Images, Lecture Notes for Fractals: Introduction, Basics and Perspectives", Siggraph (1987).

"Fractals—A Geometry of Nature", Georgia Institute of Technology Research Horizons, p. 9 (Spring 1986).

A. Jacquin, "A Fractal Theory of Iterated Markov Operators with Applications to Digital Image Coding ", PhD Thesis, Georgia Tech, 1989.

A. Jacquin, "Image Coding Based on a Fractal Theory of Iterated Contractive Image Transformations "p. 18, January 1992 (Vol 1 Issue 1) of IEEE Trans on Image Processing.

A. Jacquin, 'Fractal image coding based on a theory of iterated contractive image transformations', Proc. SPIE Visual Communications and Image Processing, 1990, pages 227–239.

A. E. Jacquin, 'A novel fractal block-coding technique for digital images', Proc. ICASSP 1990.

Baldwin, William, "Just the Bare Facts, Please", Forbes Magazine, Dec. 12, 1988.

Barnsley et al., "A Better Way to Compress Images", Byte Magazine, January 1988, pp. 213–225.

Barnsley et al., "Chaotic Compression", Computer Graphics World, November 1987.

Barnsley et al., "Harnessing Chaos For Images Synthesis", Computer Graphics, 22(4):131–140 (August, 1988).

Barnsley et al., "Hidden Variable Fractal Interpolation Functions", School of Mathematics, Georgia Institute of Technology, Atlanta, Ga. 30332, July, 1986.

Barnsley, M. F., "Fractals Everywhere", Academic Press, Boston, Mass., 1988.

Barnsley, M. F., and Demko, S., "Iterated Function Systems and The Global Construction of Fractals", Proc. R. Soc. Lond., A399:243–275 (–1985).

Barnsley, M. F., Ervin, V., Hardin, D., Lancaster, J., "Solution of an Inverse Problem for Fractals and Other Sets", Proc. Natl. Acad. Sci. U.S.A., 83:1975–1977 (April 1986).

Beaumont J M, "Image data compression using fractal techniques ", British Telecom Technological Journal 9(4):93–108 (1991).

Byte Magazine, January 1988, supra, cites:

D. S. Mazel, Fractal Modeling of Time-Series Data, PhD Thesis, Georgia Tech, 1991. (One dimensional, not pictures).

Derra, Skip, "Researchers Use Fractal Geometry," Research and Development Magazine, March 1988.

Elton, J., "An Ergodic Theorem for Iterated Maps", Journal of Ergodic Theory and Dynamical Systems, 7 (1987).

Fisher Y, "Fractal image compression", Siggraph 92.

Fractal Image Compression Michael F. Barnsley and Lyman P. Hurd ISBN 0-86720-457-5, ca. 250 pp.

Fractal Image Compression: Theory and Application, Yuval Fisher (ed.), Springer Verlag, New York, 1995. ISBN number 0-387-94211-4.

Fractal Modelling of Biological Structures, School of Mathematics, Georgia Institute of Technology (date unknown).

G. E. Oien, S. Lepsoy & T. A. Ramstad, 'An inner product space approach to image coding by contractive transformations', Proc. ICASSP 1991, pp 2773–2776.

Gleick, James, "Making a New Science", pp. 215, 239, date unknown.

Graf S, "Barnsley's Scheme for the Fractal Encoding of Images ", Journal Of Complexity, V8, 72–78 (1992).

Jacobs, E. W., Y. Fisher and R. D. Boss. "Image Compression: A study of the Iterated Transform Method. Signal Processing 29, (1992) 25–263.

M. Barnsley, L. Anson, "Graphics Compression Technology, SunWorld, October 1991, pp. 42–52.

M. F. Barnsley, A. Jacquin, F. Malassenet, L. Reuter & A. D. Sloan, 'Harnessing chaos for image synthesis', Computer Graphics, vol 22 no 4 pp 131–140, 1988.

M. F. Barnsley, A. E. Jacquin, 'Application of recurrent iterated function systems to images', Visual Comm. and Image Processing, vol SPIE-1001, 1988.

Mandelbrot, B., "The Fractal Geometry of Nature", W. H. Freeman & Co., San Francisco, Calif., 1982, 1977.

Monro D M and Dudbridge F, "Fractal block coding of images ", Electronics Letters 28(11):1053–1054 (1992).

Monro D. M. & Dudbridge F. 'Fractal approximation of image blocks', Proc ICASSP 92, pp. III: 485–488.

Monro D. M. 'A hybrid fractal transform', Proc ICASSP 93, pp. V: 169–72.

Monro D. M., Wilson D., Nicholls J. A. 'High speed image coding with the Bath Fractal Transform', IEEE International Symposium on Multimedia Technologies Southampton, April 1993.

Peterson, Ivars, "Packing It In-Fractals . . . ", Science News, 131(18):283–285 (May 2, 1987).

S. A. Hollatz, "Digital image compression with two-dimensional affine fractal interpolation functions ", Department of Mathematics and Statistics. University of Minnesota-Duluth, Technical Report 91-2. (a nuts-and-bolts how-to-do-it paper on the technique).

Stark, J., "Iterated function systems as neural networks ", Neural Networks, Vol 4, pp 679–690, Pergamon Press, 1991.

Vrscay, Edward R. "Iterated Function Systems: Theory, Applications, and the Inverse Problem. *Fractal Geometry and Analysis.* J. Belair and S. Dubuc (eds.) Kluwer Academic, 1991. 405–468.

U.S. Pat. No. 5,347,600, incorporated herein by reference, relates to a method and apparatus for compression and decompression of digital image data. Using fractal methods. According to this method, digital image data is automatically processed by dividing stored image data into domain blocks and range blocks. The range blocks are subjected to processes such as a shrinking process to obtain mapped range blocks. The range blocks or domain blocks may also be processed by processes such as affine transforms. Then, for each domain block, the mapped range block which is most similar to the domain block is determined, and the address of that range block and the processes the blocks were subjected to are combined as an identifier which is appended to a list of identifiers for other domain blocks. The list of identifiers for all domain blocks is called a fractal transform and constitutes a compressed representation of the input image. To decompress the fractal transform and recover the input image, an arbitrary input image is formed into range blocks and the range blocks processed in a manner specified by the identifiers to form a representation of the original input image.

"Image Compression Using Fractals and Wavelets", Final Report for the Phase II Contract Sponsored by the Office of Naval Research, Contract No. N00014-91-C-0117, Netrologic Inc., San Diego, Calif. (Jun. 2, 1993), relates to various methods of compressing image data, including fractals and wavelets. This method may also be applicable in pattern recognition applications. This reference provides theory and comparative analysis of compression schemes.

A fractal-processing method based image extraction method is described in Kim, D. H.; Caulfield, H. J.; Jannson, T.; Kostrzewski, A.; Savant, G, "Optical fractal image processor for noise-embedded targets detection", *Proceedings of the SPIE—The International Society for Optical Engineering*, Vol. 2026, p. 144–9 (1993) (SPIE Conf: Photonics for Processors, Neural Networks, and Memories 12–15 July 1993, San Diego, Calif., USA). According to this paper, a fractal dimensionality measurement and analysis-based automatic target recognition (ATR) is described. The ATR is a multi-step procedure, based on fractal image processing, and can simultaneously perform preprocessing, interest locating, segmenting, feature extracting, and classifying. See also, Cheong, C. K.; Aizawa, K.; Saito, T.; Hatori, M., "Adaptive edge detection with fractal dimension", *Transactions of the Institute of Electronics. Information and Communication Engineers D-II*, J76D-II(11):2459–63 (1993); Hayes, H. I.; Solka, J. L.; Priebe, C. E.: "Parallel computation of fractal dimension", *Proceedings of the SPIE—The International Society for Optical Engineering,* 1962:219–30 (1993); Priebe, C. E.; Solka, J. L.; Rogers, G. W., "Discriminant analysis in aerial images using fractal based features". *Proceedings of the SPIE— The International Society for Optical Engineering,* 1962:196–208 (1993). See also, Anson, L., "Fractal Image Compression", Byte, October 1993, pp. 195–202; "Fractal Compression Goes On-Line", Byte, September 1993.

Methods employing other than fractal-based algorithms may also be used. See, e.g., Liu, Y., "Pattern recognition using Hilbert space", *Proceedings of the SPIE—The International Society for Optical Engineering,* 1825:63–77 (1992), which describes a learning approach, the Hilbert learning. This approach is similar to Fractal learning, but the Fractal part is replaced by Hilbert space. Like the Fractal learning, the first stage is to encode an image to a small vector in the internal space of a learning system. The next stage is to quantize the internal parameter space. The internal space of a Hilbert learning system is defined as follows:

a pattern can be interpreted as a representation of a vector in a Hilbert space. Any vectors in a Hilbert space can be expanded. If a vector happens to be in a subspace of a Hilbert space where the dimension L of the subspace is low (order of 10), the vector can be specified by its norm, an L-vector, and the Hermitian operator which spans the Hilbert space, establishing a mapping from an image space to the internal space P. This mapping converts an input image to a 4-tuple: t in P=(Norm, T, N, L-vector), where T is an operator parameter space, N is a set of integers which specifies the boundary condition. The encoding is implemented by mapping an input pattern into a point in its internal space. The system uses local search algorithm, i.e., the system adjusts its internal data locally. The search is first conducted for an operator in a parameter space of operators, then an error function delta (t) is computed. The algorithm stops at a local minimum of delta (t). Finally, the input training set divides the internal space by a quantization procedure. See also, Liu, Y., "Extensions of fractal theory", *Proceedings of the SPIE—The International Society for Optical Engineering*, 1966:255–68(1993).

Fractal methods may be used for pattern recognition. See, Sadjadi, F., "Experiments in the use of fractal in computer pattern recognition", *Proceedings of the SPIE—The International Society for Optical Engineering*, 1960:214–22 (1993). According to this reference, man-made objects in infrared and millimeter wave (MMW) radar imagery may be recognized using fractal-based methods. The technique is based on estimation of the fractal dimensions of sequential blocks of an image of a scene and slicing of the histogram of the fractal dimensions computed by Fourier regression. The technique is shown to be effective for the detection of tactical military vehicles in IR, and of airport attributes in MMW radar imagery.

In addition to spatial self-similarity, temporal self-similarity may also be analyzed using fractal methods. See, Reusens, E., "Sequence coding based on the fractal theory of iterated transformations systems", *Proceedings of the SPIE—The International Society for Optical Engineering*, 2094(pt. 1):132–40(1993). This reference describes a scheme based on the iterated functions systems theory that relies on a 3D approach in which the sequence is adaptively partitioned. Each partition block can be coded either by using the spatial self-similarities or by exploiting temporal redundancies. Audio and Radar data are typically susceptible to such analysis to produce particularly useful results, due to the existence of echoes and relatively transfer functions (including resonant features).

Fractal compression methods may be used for video data for transmission. See, Hurtgen, B.; Buttgen, P., "Fractal approach to low rate video coding", *Proceedings of the SPIE—The International Society for Optical Engineering*, 2094(pt. 1):120–31(1993). This reference relates to a method for fast encoding and decoding of image sequences on the basis of fractal coding theory and the hybrid coding concept. The DPCM-loop accounts for statistical dependencies of natural image sequences in the temporal direction. Those regions of the original image where the prediction, i.e. motion estimation and compensation, fails are encoded using an advanced fractal coding scheme, suitable for still images, and whose introduction instead of the commonly used Discrete Cosine Transform (DCT)-based coding is advantageous especially at very low bit rates (8–64 kbit/s). In order to increase reconstruction quality, encoding speed and compression ratio, some additional features such as hierarchical codebook search and multilevel block segmentation may be employed. This hybrid technique may be used in conjunction with the present adaptive interface or other features of the present invention.

Fractal methods may be used to segment an image into objects having various surface textures. See, Zhi-Yan Xie; Brady, M., "Fractal dimension image for texture segmentation", ICARCV '92. Second International Conference on Automation, Robotics and Computer Vision, p. CV-4.3/1–5 vol. 1, (1992). According to this reference, the fractal dimension and its change over boundaries of different homogeneous textured regions is analyzed and used to segment textures in infrared aerial images. Based on the fractal dimension, different textures map into different fractal dimension image features, such that there is smooth variation within a single homogeneous texture but sharp variation at texture boundaries. Since the fractal dimension remains unchanged under linear transformation, this method is robust for dismissing effects caused by lighting and other extrinsic factors. Morphology is the only tool used in the implementation of the whole process: texture feature extraction, texture segmentation and boundary detection. This makes possible parallel implementations of each stage of the process.

Rahmati, M.; Hassebrook, L. G. "Intensity- and distortion-invariant pattern recognition with complex linear morphology", *Pattern Recognition*, 27 (4):549–68(1994) relates to a unified model based pattern recognition approach is introduced which can be formulated into a variety of techniques to be used for a variety of applications. In this approach, complex phasor addition and cancellation are incorporated into the design of filter(s) to perform implicit logical operations using linear correlation operators. These implicit logical operations are suitable to implement high level gray scale morphological transformations of input images. In this way non-linear decision boundaries are effectively projected into the input signal space yet the mathematical simplicity of linear filter designs is maintained. This approach is applied to the automatic distortion- and intensity-invariant object recognition problem. A set of shape operators or complex filters is introduced which are logically structured into a filter bank architecture to accomplish the distortion and intensity-invariant system. This synthesized complex filter bank is optimally sensitive to fractal noise representing natural scenery. The sensitivity is optimized for a specific fractal parameter range using the Fisher discriminant. The output responses of the proposed system are shown for target, clutter, and pseudo-target inputs to represent its discrimination and generalization capability in the presence of distortion and intensity variations. Its performance is demonstrated with realistic scenery as well as synthesized inputs.

Sprinzak, J.; Werman, M., "Affine point matching", *Pattern Recognition Letters*, 15(4):337–9(1994), relates to a pattern recognition method. A fundamental problem of pattern recognition, in general, is recognizing and locating objects within a given scene. The image of an object may have been distorted by different geometric transformations such as translation, rotation, scaling, general affine transformation or perspective projection. The recognition task involves finding a transformation that superimposes the model on its instance in the image. This reference proposes an improved method of superimposing the model.

Temporal Image Analysis

Temporal image analysis is a well-known field. This field holds substantial interest at present for two reasons. First, by temporal analysis of a series of two-dimensional images, objects and object planes (including motion planes) may be defined, which provide basis for efficient yet general algorithms for video compression, such as the Motion Picture Experts Group (MPEG) series of standards. Second, temporal analysis has applications in signal analysis for an understanding and analysis of the signal itself.

U.S. Pat. No. 5,280,530, incorporated herein by reference, relates to a method and apparatus for tracking a moving object in a scene, for example the face of a person in videophone applications, comprises forming an initial template of the face, extracting a mask outlining the face, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients and performing an affine transform to produce an updated template and updated mask.

U.S. Pat. No. 5,214,504 relates to a moving video image estimation system, based on an original video image of time n and time n+1, the centroid, the principal axis of inertia, the moment about the principal axis of inertia and the moment about the axis perpendicular to the principal axis of inertia are obtained. By using this information, an affine transformation for transforming the original video image at time n to the original video image at time n+1 is obtained. Based on the infinitesimal transformation (A), $\{e^{At}, \text{ and } e^{A(t-1)}\}$ obtained by making the affine transformation continuous with regard to time is executed on the original video image at time n and time n+1. The results are synthesized to perform an interpolation between the frames. $\{e^{(a(t-1))}\}$ is applied to the original video system time n+1. The video image after time n+1 is thereby protected.

U.S. Pat. No. 5,063,603, incorporated herein by reference, relates to a dynamic method for recognizing objects and image processing system therefor. This reference discloses a method of distinguishing between different members of a class of images, such as human beings. A time series of successive relatively high-resolution frames of image data, any frame of which may or may not include a graphical representation of one or more predetermined specific members (e.g., particular known persons) of a given generic class (e.g. human beings), is examined in order to recognize the identity of a specific member; if that member's image is included in the time series. The frames of image data may be examined in real time at various resolutions, starting with a relatively low resolution, to detect whether some earlier-occurring frame includes any of a group of image features possessed by an image of a member of the given class. The image location of a detected image feature is stored and then used in a later-occurring, higher resolution frame to direct the examination only to the image region of the stored location in order to (1) verify the detection of the aforesaid image feature, and (2) detect one or more other of the group of image features, if any is present in that image region of the frame being examined. By repeating this type of examination for later and later occurring frames, the accumulated detected features can first reliably recognize the detected image region to be an image of a generic object of the given class, and later can reliably recognize the detected image region to be an image of a certain specific member of the given class. Thus, a human identity recognition feature of the present invention may be implemented in this manner. Further, it is clear that this recognition feature may form an integral part of certain embodiments of the present invention. It is also clear that the various features of the present invention would be applicable as an adjunct to the various elements of the system disclosed in U.S. Pat. No. 5,063,603.

U.S. Pat. No. 5,067,160, incorporated herein by reference, relates to a motion-pattern recognition apparatus, having adaptive capabilities. The apparatus recognizes a motion of an object that is moving and is hidden in an image signal, and discriminates the object from the background within the signal. The apparatus has an image-forming unit comprising non-linear oscillators, which forms an image of the motion of the object in accordance with an adjacent-mutual-interference-rule, on the basis of the image signal. A memory unit, comprising non-linear oscillators, stores conceptualized meanings of several motions. A retrieval unit retrieves a conceptualized meaning close to the motion image of the object. An altering unit alters the rule, on the basis of the conceptualized meaning. The image forming unit, memory unit, retrieval unit and altering unit form a holonic-loop. Successive alterations of the rules by the altering unit within the holonic loop change an ambiguous image formed in the image forming unit into a distinct image. U.S. Pat. No. 5,067,160 cites the following references, which are relevant to the task of discriminating a moving object in a background:

U.S. Pat. No. 4,710,964.

Shimizu et al, "Principle of Holonic Computer and Holovision", Journal of the Institute of Electronics, Information and Communication, 70(9):921–930 (1987).

Omata et al, "Holonic Model of Motion Perception", IEICE Technical Reports, Mar. 26, 1988, pp. 339–346.

Ohsuga et al, "Entrainment of Two Coupled van der Pol Oscillators by an External Oscillation", Biological Cybernetics, 51:225–239 (1985).

U.S. Pat. No. 5,065,440, incorporated herein by reference, relates to a pattern recognition apparatus, which compensates for, and is thus insensitive to pattern shifting, thus being useful for decomposing an image or sequence of images, into various structural features and recognizing the features. U.S. Pat. No. 5,065,440 cites the following references, incorporated herein by reference, which are also relevant to the present invention: U.S. Pat. Nos. 4,543,660, 4,630,308, 4,677,680, 4,809,341, 4,864,629, 4,872,024 and 4,905,296.

Recent analyses of fractal image compression techniques have tended to imply that, other than in special circumstances, other image compression methods are "better" than a Barnsley-type image compression system, due to the poor performance of compression processors and lower than expected compression ratios. Further, statements attributed to Barnsley have indicated that the Barnsley technique is not truly a "fractal" technique, but rather a vector quantization process that employs a recursive library. Nevertheless, these techniques and analyses have their advantages. As stated hereinbelow, the fact that the codes representing the compressed image are hierarchical represents a particular facet exploited by the present invention.

Another factor which makes fractal methods and analysis relevant to the present invention is the theoretical relation to optical image processing and holography. Thus, while such optical systems may presently be cumbersome and economically unfeasible, and their implementation in software models slow, these techniques nevertheless hold promise and present distinct advantages.

Biometric Analysis

Biometric analysis comprises the study of the differences between various organisms, typically of the same species. Thus, the intraspecies variations become the basis for differentiation and identification. In practice, there are many applications for biometric analysis systems, for example in security applications, these allow identification of a particular human.

U.S. Pat. No. 5,055,658, incorporated herein by reference, relates to a security system employing digitized personal characteristics, such as voice. The following references are cited:

"Voice Recognition and Speech Processing", Elektor Electronics, September 1985, pp. 56–57.

Naik et al., "High Performance Speaker Verification.", ICASSP 86, Tokyo, CH2243-4/86/0000-0881, IEEE 1986, pp. 881–884.

Shinan et al., "The Effects of Voice Disguise.", ICASSP 86. Tokyo, CH2243-4/86/0000-0885, IEEE 1986, pp. 885–888.

Parts of this system relating to speaker recognition may be used to implement a voice recognition system of the present invention for determining an actor or performer in a broadcast.

Neural Networks

Neural networks are a particular type of data analysis tool. There are characterized by the fact that the network is represented by a set of "weights", which are typically scalar values, which are derived by a formula which is designed to reduce the error between the a data pattern representing a known state and the network's prediction of that state. These networks, when provided with sufficient complexity and an appropriate training set, may be quite sensitive and precise. Further, the data pattern may be arbitrarily complex (although the computing power required to evaluate the output will also grow) and therefore these systems may be employed for video and other complex pattern analysis.

U.S. Pat. No. 5,067,164, incorporated herein by reference, relates to a hierarchical constrained automatic learning neural network for character recognition, and thus represents an example of a trainable neural network for pattern recognition, which discloses methods which are useful for the present invention. This Patent cites various references of interest:

U.S. Pat. Nos. 4,760,604, 4,774,677 and 4,897,811.

LeCun, Y., Connectionism in Perspective, R. Pfeifer. Z. Schreter, F. Fogelman, L. Steels, (Eds.), 1989, "Generalization and Network Design Strategies", pp. 143–55.

LeCun, Y., et al., "Handwritten Digit Recognition: Applications of Neural.", IEEE Comm. Magazine, pp. 41–46 (November 1989).

Lippmann, R. P., "An Introduction to Computing with Neural Nets", IEEE ASSP Magazine, 4(2):4–22 (April 1987).

Rumelhart, D. E., et al., Parallel Distr. Proc.: Explorations in Microstructure of Cognition, vol. 1, 1986, "Learning Internal Representations by Error Propagation", pp. 318–362.

U.S. Pat. Nos. 5,048,100, 5.063,601 and 5,060,278, all incorporated herein by reference, also relate to neural network adaptive pattern recognition methods and apparatuses. It is clear that the methods of 5,048,100, 5,060,278 and 5,063,601 may be used to perform the adaptive pattern recognition functions of the present invention. More general neural networks are disclosed in U.S. Pat. Nos. 5,040,134 and 5,058,184, both incorporated herein be reference, which provide background on the use of neural networks. In particular, U.S. Pat. No. 5,058,184 relates to the use of the apparatus in information processing and feature detection applications.

U.S. Pat. No. 5,058,180, incorporated herein by reference, relates to neural network apparatus and method for pattern recognition, and is thus relevant to the intelligent pattern recognition functions of the present invention. This patent cites the following documents of interest:

U.S. Pat. Nos. 4,876,731 and 4,914,708.

Carpenter, G. A., S. Grossberg, "The Art of Adaptive Pattern Recognition by a Self-Organizing Neural Network," IEEE Computer, March 1988, pp. 77–88.

Computer Visions, Graphics, and Image Processing 1987, 37:54–115.

Grossberg, S., G. Carpenter, "A Massively Parallel Architecture for a Self-Organizing Neural Pattern Recognition Machine," Computer Vision, Graphics, and Image Processing (1987, 37, 54–115), pp. 252–315.

Gullichsen E., E. Chang, "Pattern Classification by Neural Network: An Experiment System for Icon Recognition." ICNN Proceeding on Neural Networks, March 1987, pp. IV-725–32.

Jackel, L. D., H. P. Graf, J. S. Denker, D. Henderson and I. Guyon; "An Application of Neural Net Chips: Handwritten Digit Recognition," ICNN Proceeding, 1988, pp. II-107–15.

Lippman, R. P., "An Introduction to Computing with Neural Nets," IEEE ASSP Magazine, April 1987, pp. 4–22.

Pawlicki, T. F., D. S. Lee, J. J. Hull and S. N. Srihari, "Neural Network Models and their Application to Handwritten Digit Recognition," ICNN Proceeding, 1988, pp. II-63–70.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering,* 2026:472–82 (1993), relates to an optoelectronic neural network based upon the Neocognitron paradigm which has been implemented and successfully demonstrated for automatic target recognition for both focal plane array imageries and range-Doppler radar signatures. A particular feature of this neural network architectural design is the use of a shift-invariant multichannel Fourier optical correlation as a building block for iterative multilayer processing. A bipolar neural weights holographic synthesis technique was utilized to implement both the excitatory and inhibitory neural functions and increase its discrimination capability. In order to further increase the optoelectronic Neocognitron's self-organization processing ability, a wavelet preprocessor was employed for feature extraction preprocessing (orientation, size, location, etc.). A multichannel optoelectronic wavelet processor using an e-beam complex-valued wavelet filter is also described.

Neural networks are important tools for extracting patterns from complex input sets. These systems do not require human comprehension of the pattern in order to be useful, although human understanding of the nature of the problem is helpful in designing the neural network system, as is known in the art. Feedback to the neural network is integral to the training process. Thus, a set of inputs is mapped to a desired output range, with the network minimizing an "error" for the training data set. Neural networks may differ based on the computation of the "error", the optimization process, the method of altering the network to minimize the error, and the internal topology. Such factors are known in the art.

Optical Pattern Recognition

Optical image processing holds a number of advantages. First, images are typically optical by their nature, and therefore processing by this means may (but not always) avoid a data conversion. Second, many optical image processing schemes are inherently or easily performed in parallel, improving throughput. Third, optical circuits typically have response times shorter than electronic circuits, allowing potentially short cycle times. While many optical phenomena may be modeled using electronic computers, appropriate applications for optical computing, such as pattern recognition, hold promise for high speed in systems of acceptable complexity.

U.S. Pat. No. 5,060,282, incorporated herein by reference, relates to an optical pattern recognition architecture implementing the mean-square error correlation algorithm. This method allows an optical computing function to perform pattern recognition functions. U.S. Pat. No. 5,060,282 cites the following references, which are relevant to optical pattern recognition:

Kellman, P., "Time Integrating Optical Signal Processing", Ph. D. Dissertation, Stanford University, 1979, pp. 51–55.

Molley, P., "Implementing the Difference-Squared Error Algorithm Using An Acousto-Optic Processor", SPIE, 1098:232–239, (1989).

Molley, P., et al., "A High Dynamic Range Acousto-Optic Image Correlator for Real-Time Pattern Recognition", SPIE, 938:55–65 (1988).

Psaltis, D., "Incoherent Electro-Optic Image Correlator", Optical Engineering, 23(1):12–15 (January/February 1984).

Psaltis, D., "Two-Dimensional Optical Processing Using One-Dimensional Input Devices", Proceedings of the IEEE, 72(7):962–974 (July 1984).

Rhodes, W., "Acousto-Optic Signal Processing: Convolution and Correlation", Proc. of the IEEE, 69(1):65–79 (January 1981).

Vander Lugt, A., "Signal Detection By Complex Spatial Filtering", IEEE Transactions On Information Theory, IT-10, 2:139–145 (April 1964).

U.S. Pat. Nos. 5,159,474 and 5,063.602, expressly incorporated herein by reference, also relate to optical image correlators. Also of interest is Li, H. Y., Y. Qiao and D. Psaltis, Applied Optics (April, 1993). See also. Bains. S., "Trained Neural Network Recognizes Faces", Laser Focus World, June, 1993, pp. 26–28; Bagley, H. & Sloan. J., "Optical Processing: Ready For Machine Vision?", Photonics Spectra, August 1993, pp. 101–106.

Optical pattern recognition has been especially applied to two-dimensional patterns. In an optical pattern recognition system, an image is correlated with a set of known image patterns represented on a hologram, and the product is a pattern according to a correlation between the input pattern and the provided known patterns. Because this is an optical technique, it is performed nearly instantaneously, and the output information can be reentered into an electronic digital computer through optical transducers known in the art. Such a system is described in Casasent, D., Photonics Spectra, November 1991, pp. 134–140. The references cited therein provide further details of the theory and practice of such a system: Lendaris, G. G., and Stanely, G. L., "Diffraction Pattern Sampling for Automatic Target Recognition", Proc. IEEE 58:198–205 (1979); Ballard, D. H., and Brown, C. M., Computer Vision, Prentice Hall, Englewood Cliffs, N.J. (1982); Optical Engineering 28:5 (May 1988) (Special Issue on product inspection); Richards J., and Casasent, D., "Real Time Hough Transform for Industrial Inspection" Proc. SPIE Technical Symposium, Boston 1989 1192:2–21 (1989); Maragos, P., "Tutorial Advances in Morphological Image Processing" Optical Engineering 26:7:623–632 (1987); Casasent, D., and Tescher, A., Eds., "Hybrid Image and Signal Processing II", Proc. SPIE Technical Symposium, April 1990, Orlando Fla. 1297 (1990); Ravichandran, G. and Casasent, D., "Noise and Discrimination Performance of the MINACE Optical Correlation Filter", Proc. SPIE Technical Symposium, April 1990, Orlando Fla., 1471 (1990); Weshsler, H. Ed., "Neural Nets For Human and Machine Perception", Academic Press, New York (1991).

By employing volume holographic images, the same types of paradigms may be applied to three dimensional images.

Query by Image Content

Query by image content, a phrase coined by IBM researchers, including Dr. Ramesh Jain, relates to a system for retrieving image data stored in a database on the basis of the colors, textures, morphology or objects contained within the image. Therefore, the system characterizes the stored images to generate a metadata index, which can then be searched. Unindexed searching is also possible.

A number of query by image content systems are known, including both still and moving image systems, for example from IBM (QBIC), Apple (Photobook), Belmont Research Inc. (Steve Gallant), BrainTech Inc.; Center for Intelligent Information Retrieval (Umass Amherst), Virage, Inc. Informix Software, Inc. (Illustra). Islip Media, Inc., Magnifi, Numinous Technologies, Columbia University VisualSeek/WebSeek (Chang et al., John R. Smith), Monet (CWI and UvA), Visual Computing Laboratory, UC San Diego (ImageGREP, White and Jain). See also, ISO/IEC MPEG-7 literature, Content Based Recognition (CBR) and Content Based Image Recognition (CBIR) literature.

See, Jacobs, et al., "Fast Multiresolution Image Querying", Department of Computer Science, University of Washington, Seattle Wash.

U.S. Pat. No. 5,655,117, expressly incorporated herein by reference, relates to a method and apparatus for indexing multimedia information streams for content-based retrieval. See also:

Gong et al, "An Image Database System with Content Capturing and Fast Image Indexing Abilities". PROC of the International Conference on Multimedia Computing and Systems, pp. 121–130 May 19, 1994.

Hongjiang, et al., Digital Libraries, "A Video Database System for Digital Libraries", pp. 253–264, May 1994.

S. Abe and Y. Tonomura, Systems and Computers in Japan, vol. 24, No. 7, "Scene Retrieval Method Using Temporal Condition Changes", pp. 92–101, 1993.

Salomon et al, "Using Guides to Explore Multimedia Databases", PROC of the Twenty-Second Annual Hawaii International Conference on System Sciences, vol. IV, 3–6 January 1989, pp. 3–12 vol. 4. Jan. 6, 1989.

Stevens, "Next Generation Network and Operating System Requirements for Continuous Time Media", in Herrtwich (Ed.), Network and Operating System Support for Digital Audio and Video, pp. 197–208, November 1991.

U.S. Pat. No. 5,606,655, expressly incorporated herein by reference, relates to a method for representing contents of a single video shot using frames. The method provides a representative frame (Rframe) for a group of frames in a video sequence, selecting a reference frame from the group of frames and storing the reference frame in a computer memory. This system defines a peripheral motion tracking region along an edge of the reference frame and successively tracks movement of boundary pixels in the tracking region, symbolizing any of the length of the shot and the presence of any caption. See, also:

"A Magnifier Tool for Video Data", Mills et al., Proceedings of ACM Computer Human Interface (CHI), May 3–7, 1992, pp. 93–98.

"A New Family of Algorithms for Manipulating Compressed Images", Smith et al., IEEE Computer Graphics and Applications, 1993.

"Anatomy of a Color Histogram", Novak et al., Proceeding of Computer Vision and Pattern Recognition, Champaign, Ill., June 1992, pp. 599–605.

"Automatic Structure Visualization for Video Editing", Ueda et al., InterCHI'93 Conference Proceedings, Amsterdam, The Netherlands, 24–29 Apr. 1993, pp. 137–141.

"Automatic Video Indexing and Full-Video Search for Object Appearances", Nagasaka et al. Proceedings of the IFIP TC2/WG2.6 Second Working Conference on Visual Database Systems. North Holland, Sep. 30–Oct. 3, 1991, pp. 113–127.

"Color Indexing", Swain et al., International Journal of Computer Vision, vol. 7, No. 1, 1991, pp. 11–32.

"Content Oriented Visual Interface Using Video Icons for Visual Database Systems", Tonomura et al., Journal of Visual Languages and Computing (1990) 1, pp. 183–198.

"Developing Power Tools for Video Indexing and Retrieval", Zhang et al., Proceedings of SPIE Conference on Storage and Retrieval for Image and Video Databases, San Jose, Calif., 1994.

"Image Information Systems: Where Do We Go From Here?", Chang et al., IEEE Transactions on Knowledge and Data Engineering, vol. 4, No. 5, October 1992, pp. 431–442.

"Image Processing on Compressed Data for Large Video Databases", Arman et al., Proceedings of First ACM International Conference on Multimedia, Anaheim, Calif., 1–6 August 1993, pp. 267–272.

"Image Processing on Encoded Video Sequences", Arman et al., ACM Multimedia Systems Journal, to appear 1994.

"Impact: An Interactive Natural-Motion-Picture Dedicated Multimedia Authoring System", Ueda et al., Proceedings of Human Factors in Computing Systems (CHI 91), New Orleans, La., Apr. 27–May 2, 1991, pp. 343–350.

"MPEG: A Video Compression Standard for Multimedia Applications", Le Gall, Communications of the ACM, vol. 34, No. 4, April 1991, pp. 47–58.

"News On-Demand for Multimedia Networks", Miller et al., ACM International Conference on Multimedia, Anaheim, Calif., 1–6, August 1993, pp. 383–392.

"Overview of the px64 kbit/s Video Coding Standard", Liou. Communications of the ACM, vol. 34, No. 4, April 1991, pp. 60–63.

"Pattern Recognition by Moment Invariants", Hu et al., Proc. IRE, vol. 49, 1961, p. 1428.

"Pattern Recognition Experiments in the Mandala/Cosine Domain", Hsu et al., IEEE Transactions on Pattern Analysis and Machine Intelligence, vol. PAMI-5, No. 5, September 1983, pp. 512–520.

"The JPEG Still Picture Compression Standard", Wallace, Communications of the ACM, vol. 34, No. 4, April 1991, pp. 31–44.

"The Revised Fundamental Theorem of Moment Invariants", Reiss, IEEE Transactions on Pattern Analysis and Machine Intelligence, vol. 13, No. 8, August 1991, pp. 830–834.

"VideoMAP and VideoSpaceIcon: Tools for Anatomizing Video Content", Tonomura et al., Inter CHI'93 Conference Proceedings, Amsterdam, The Netherlands, 24–29 April, 1993, pp. 131–136.

"Visual Pattern Recognition by Moment Invariants", IRE Trans. Inform. Theory, vol. 8, February 1962, pp. 179–187.

"Watch-Grab-Arrange-See: Thinking with Motion Images via Streams and Collages", Elliott, Ph.D. Thesis, MIT, February 1993.

Book entitled Digital Image Processing, by Gonzalez et al., Addison-Wesley, Readings, Mass., 1977.

Book entitled Digital Picture Processing by Rosenfeld et al., Academic Press, Orlando, Fla., 1982.

Book entitled Discrete Cosine Transform—Algorithms, Advantages, Applications, by Rao et al., Academic Press, Inc., 1990.

Book entitled Sequential Methods in Pattern Recognition and Machine Learning, Fu, Academic, NY, N.Y. 1968.

C.-C. J. Kuo (ed), "Multimedia Storage and Archiving Systems", SPIE Proc. Vol. 2916 (Nov. 18–Nov. 22, 1996).

U.S. Pat. No. 5,600,775, expressly incorporated herein by reference, relates to a method and apparatus for annotating full motion video and other indexed data structures. U.S. Pat. No. 5,428,774, expressly incorporated herein by reference relates to a system of updating an index file of frame sequences so that it indexes non-overlapping motion image frame sequences. U.S. Pat. No. 5,550,965, expressly incorporated herein by reference, relates to a method and system for operating a data processor to index primary data in real time with iconic table of contents. U.S. Pat. No. 5,083,860, expressly incorporated herein by reference, relates to a method for detecting change points in motion picture images. U.S. Pat. No. 5,179,449, expressly incorporated herein by reference, relates to a scene boundary detecting apparatus. See also:

"A show and tell of the QBIC technology—Query By Image Content (QBIC)", IBM QBIC Almaden web site, pp. 1–4.

"Chaos & Non-Linear Models in Economics".

"Chaos Theory in the Financial Markets. Applying Fractals, Fuzzy Logic, Genetic Algorithms".

"Evolutionary Economics & Chaos Theory".

"Four Eyes", MIT Media Lab web site, pp. 1–2.

"Frequently asked questions about visual information retrieval", Virage Incorporated web site, pp. 1–3.

"IBM Ultimedia Manager 1.1 and Clinet Search", IBM software web site, pp. 1–4.

"Image Detection and Registration", Digital Image Processing, Pratt, Wiley, New York, 1991.

"Jacob Methodology" @ http://WWCSAI.diepa.unipa.it/research/projects/jacob/jacob-method.html.

"Market Analysis. Applying Chaos Theory to Invstment & Economics".

"Photobook", MIT Media Lab web site; Aug. 7, 1996; pp. 1–2.

"Profiting from Chaos. Using Chaos Theory for Market Timing, Stock Selection & Option".

"Shape Analysis", Digital Image Processing, Pratt, Wiley, N.Y., 1991.

"The QBIC Project", IBM QBIC Almaden web site, home page (pp. 1–2).

"Virage—Visual Information Retrieval", Virage Incorporated, home page.

"Virage Products", Virage Incorporated web site; pp. 1–2.

"Visual Information Retrieval: A Virage Perspective Revision 3", Virage Incorporated web site; 1995; pp. 1–13.

"Workshop Report: NSF—ARPA Workshop on Visual Information Management Systems", Virage Incorporated web. site; pp. 1–15.

A. D. Bimbo, et al, "3-D Visual Query Language for Image Databases", Journal Of Visual Languages & Computing, 1992, pp. 257–271.

A. E. Cawkell, "Current Activities in Image Processing Part III: Indexing Image Collections", CRITique, vol. 4, No. 8, May 1992, pp. 1–11, ALSIB, London.

A. Pizano et al, "Communicating with Pictorial Databases", Human-Machine Interactive Systems, pp. 61–87, Computer Science Dept, UCLA, 1991.

A. Yamamoto et al, "Extraction of Object Features from Image and its Application to Image Retrieval", IEEE 9th International Conference On Pattern Recognition, 1988, 988–991.

A. Yamamoto et al, "Image Retrieval System Based on Object Features", IEEE Publication No. CH2518-9/87/0000-0132, 1987, pp. 132–134.

A. Yamamoto et al., "Extraction of Object Features and Its Application to Image Retrieval", Trans. of IEICE, vol. E72, No. 6. 771–781 (June 1989).

A. Yamamoto et al., "Extraction of Object Features from Image and Its Application to Image Retrieval", Proc. 9th Annual Conference on Pattern Recognition, vol. 11, pp. 988–991 (November 1988).

A. Soffer and H. Samet. Retrieveal by content in symbolic-image databases. In Symposium on Electronic Imaging: Science and Technology—Storage & Retrieval for Image and Video Databases IV, pages 144–155. IS&T/SPIE, 1996.

Abadi, M., et al, "Authentication and Delegation with Smart-cards", Oct. 22, 1990, revised Jul. 30, 1992 Report 67, Systems Research Center, Digital Equipment Corp., Palo Alto, Calif.

Advertisement for "TV Decision," CableVision, Aug. 4, 1986.

American National Standard, "Financial Institution Retail Message Authentication", ANSI X9.19 1986.

American National Standard, "Interchange Message Specification for Debit and Credit Card Message Exchange Among Financial Institutions", ANSI X9.2-1988.

Antonofs, M., "Stay Tuned for Smart TV," Popular Science, November 1990, pp. 62–65.

Arman et al., "Feature Management for Large Video Databases", 1993. (Abstract Only).

ASIAN TECHNOLOGY INFORMATION PROGRAM (ATIP) REPORT: ATIP95.65: Human Computer Interface International, 7/95 Yokohama.

Barber et al. "Ultimedia Manager: Query by Image Content and it's Applications" IEE, 1994, pp. 424–429, January 1994.

Barros, et al. "Indexing Multispectral Images for Content-Based Retrieval", Proc. 23rd AIPR Workshop on Image and Information Retrieval, Proc. 23rd Workshop, Washington, D.C., October 1994, pp. 25–36.

Belkin, N.J., Croft, W. B., "Information Filtering And Information Retrieval: Two Sides of the Same Coin?". Communications of the ACM, December 1992, vol. 35, No. 12, pp. 29–38.

Benoit Mandelbrot: "Fractal Geometry of Nature", W H Freeman and Co., New York, 1983 (orig ed 1977).

Benoit Mandelbrot: "Fractals—Form, Chance and Dimensions", W H Freeman and Co., San Francisco, 1977.

Bimbo et al., "Sequence Retrieval by Contents through Spatio Temporal Indexing", IEEE on CD-ROM, pp. 88–92, Aug. 24, 1993.

Bolot, J.; Turletti, T. & Wakeman, I.; "Scalable Feedback Control for Multicast Video Distribution In the Internet", Computer Communication Review, vol. 24, No. 4 Oct. 1994, Proceedings of SIGCOMM 94, pp. 58–67.

Bos et al., "SmartCash: a Practical Electronic Payment System", pp. 1–8; August 1990.

Branko Pecar: "Business Forecasting for Management". McGraw-Hill Book Co., London, 1994.

Brian H Kaye: "A Random Walk Through Fractal Dimensions", VCH Verlagsgesellschaft. Weinheim, 1989.

Brugliera, Vito, "Digital On-Screen Display—A New Technology for the Consumer Interface", Symposium Record Cable Sessions. Jun. 11, 1993, pp. 571–586.

Burk et al, "Value Exchange Systems Enabling Security and Unobservability", Computers & Security, 9 1990, pp. 715–721.

C. Chang et al, "Retrieval of Similar Pictures on Pictorial Databases", Pattern Recognition, vol. 24, No. 7, 1991, pp. 675–680.

C. Chang, "Retrieving the Most Similar Symbolic Pictures from Pictorial Databases", Information Processing & Management, vol. 28, No. 5, 1992.

C. Faloutsos et al, "Efficient and Effective Querying by Image Content", Journal of Intelligent Information Systems:Integrating Artificial Intelligence and Database Technologies, vol. 3–4, No. 3, July 1994, pp. 231–262.

C. Goble et al, "The Manchester Multimedia Information System". Proceedings of IEEE Conference, Eurographics Workshop, April, 1991, pp. 244–268.

C. C. Chang and S. Y. Lee. Retrieval of similar pictures on pictorial databases. Pattern Recog., 24(7), 1991.

Case Study: The CIRRUS Banking Network, Comm. ACM 8, 28 pp. 7970–8078, August 1985.

Chalmers, M., Chitson, P., "Bead: Explorations In Information Visualization", 15th Ann. Int'l SIGIR 92/Denmark—June 1992, pp. 330–337.

Chang et al. "Intelligent Database Retrieval by Visual Reasoning", PROC Fourteenth Annual International Computer Software and Application Conference, 31 Oct.–1 Nov. 1990, pp. 459–464.

Chang, Yuh-Lin, Zeng, Wenjun, Kamel, Ibrahim, Alonso, Rafael, "Integrated Image and Speech Analysis for Content-Based Video Indexing".

Chaum et al, "Untraceable Electronic Cash", Advances in Cryptology, 1988, pp. 319–327.

Chaum et al; "Achieving Electronic Privacy", Scientific American, pp. 319–327; 1988.

Chaum, D. "Security without Identification: Card Computers to Make Big Brother Obsolete", Communications of the ACM, 28(10), October 1985, pp. 1030–1044.

Chaum, D. "Untraceable Electronic Mail, Return Addresses, and Digital Pseudonyms", Communications of the ACM, vol. 24, No. 2, February, 1981.

Chaum, D., "Achieving Electronic Privacy", Scientific American, August 1992, pp. 96–101.

Chaum, D. L. et al.; "Implementing Capability-Based Protection Using Encryption"; Electronics Research Laboratory, College of Engineering, University of California, Berkeley, Calif.; Jul. 17, 1978.

Cliff Pickover, Spiral Symmetry (World Scientific).

Cliff Pickover, Chaos in Wonderland: Visual Adventures in a Fractal World (St. Martin's Press).

Cliff Pickover, Computers and the Imagination (St. Martin's Press) Cliff Pickover, Mazes for the Mind: Computers and the Unexpected (St. Martin's Press).

Cliff Pickover, Computers, Pattern, Chaos, and Beauty (St. Martin's Press).

Cliff Pickover, Frontiers of Scientific Visualization (Wiley).

Cliff Pickover, Visions of the Future: Art, Technology, and Computing in the 21st Century (St. Martin's Press).

Cohen, Danny: "Computerized Commerce"; ISI Reprint Series ISI/RS-89/243; October, 1989; Reprinted from Information Processing 89, Proceedings of the IFIP World Computer Congress, held Aug. 28–Sep. 1, 1989.

Cohen, Danny; "Electronic Commerce"; University of Southern Calif., Information Sciences Institute, Research Report ISI/RR-89–244; October, 1989.

Common European Newsletter, Multimedia Content manipulation and Management, http://ww.esat.kuleuven.ac.be/~konijin/ . . . .

CompuServe Information Service Users Guide, CompuServe International, 1986, pp. 109–114.

Computer Shopper, November 1994, "Internet for Profit", pp. 180–182, 187, 190–192, 522–528, 532, 534.

Computer, Vol. 28(9), September 1995.

Compuvid Sales Manual (date unknown).

Corporate Overview, Virage Incorporated web site; pp. 1–4.

Cox, Ingemar J., et al., "PicHunter: Bayesian Relevance Feedback for Image Retrieval," Proc. of the ICPR '96, IEEE, pp. 361–369.

Cutting, D. R.; Karger, D. R.; Pedersen, J. O. & Tukey, J. W. "Scatter/Gather: A Cluster-based Approach to Browsing Large Document Collections", 15 Ann. Int'l SIGIR '92, ACM, 1992, pp. 318–329.

D K Arrowsmith & C M Place: "An Introduction to Dynamical Systems", Cambridge University Press, Cambridge, 1990.

Damashek, M., Gauging Similarity via N-Grams: Language-Independent Sorting, Categorization, and Retrieval of Text, pp. 1–11, Jan. 24, 1995.

Data Partner 1.0 Simplifies DB Query Routines, PC Week, Sep. 14, 1992, pp. 55 & 58.

David E Rumelhart & James L McClelland: "Parallel Distributed Processing", Vol 1., The MIT Press, Cambridge, Mass., 1986.

Deering, S.; Estrin, D.; Farinacci, D.; Jacobson, V.; Liu, C.; Wei, L; "An Architecture for Wide-Area Multicast Routing", Computer Communication Review, vol. 24, No. 4, October 1994, Proceedings of SIGCOMM 94, pp. 126–135.

Donal Daly: "Expert Systems Introduced", Chartwell-Bratt, Lund, 1988.

Dukach, Seymon; Prototype Implementation of the SNPP Protocol; allspic.lcs.mit.edu; 1992.

E. Binaghi et al, "Indexing and Fuzzy Logic Based Retrieval of Color Images", Visual Database Systems. 11, 1992, pp. 79–92.

E. Binaghi et al., "A Knowledge-Based Environment for Assessment of Color Similarity", Proc. 2nd Annual Conference on Topics for A1, pp. 268–285 (1990).

E. Lee, "Similarity Retrieval Techniques", Pictorial Information Systems, Springer Verlag, 1980 pp. 128–176.

E. G. M. Petrakis and C. Faloutsos. Similarity searching in large image databases. Technical Report 3388, Department of Computer Science, University of Maryland, 1995.

Edward Reitman: "Exploring the Geometry of Nature", Windcrest Books, Blue Ridge Summit, 1989.

Even et al; "Electronic Wallet"; pp. 383–386;1983.

F. J. Varela and P. Bourgine (eds.): Proceedings of the first European Conference on Artificial Life. Cambridge, Mass: MIT Press. (1991).

Fassihi, Theresa & Bishop, Nancy, "Cable Guide Courting National Advertisers," Adweek, Aug. 8, 1988.

Flickner, et al. "Query by Image and Video Content, the QBIC System", IEEE Computer 28(9); 23–32, 1995.

Foltz, P. W., Dumais, S. T., "Personalized Information Delivery: An Analysis Of Information Filtering Methods", Communications of the ACM, December 1992, vol. 35, No. 12, pp. 51–60.

Frank Pettit: "Fourier Transforms in Action", Chartwell-Bratt, Lund, 1985.

G F Page, J B Gomm & D Williams: "Application of Neural Networks to Modelling and Control", Chapman & Hall, London, 1993.

G. Mannes, "Smart Screens", Video Magazine, December 1993) (2 Pages).

G. Tortora et al, "Pyramidal Algorithms", Computer Vision, Graphics and Images Processing, 1990, pp. 26–56.

Gautama, S., D'Haeyer, J. P. F., "Context Driven Matching in Structural Pattern Recognition".

Gautama, S., Haeyer, J. D., "Learning Relational Models of Shape: A Study of the Hypergraph Formalism".

Gene F Franklin, J David Powell & Abbas Emami-Naeini: "Feedback Control of Dynamic Systems". Addison-Wesley Publishing Co. Reading, 1994.

George E P Box & Gwilym M Jenkins: "Time Series Analysis: Forecasting and Control", Holden Day, San Francisco, 1976.

Gifford, D. "Notes on Community Information Systems", MIT LCS TM-419, December 1989.

Gifford, David K.; "Cryptographic Sealing for Information Secrecy and Authentication"; Stanford University and Xerox Palo Alto Research Center; Communication of the ACM; vol. 25, No. 4; April, 1982.

Gifford, David K.; "Digital Active Advertising"; U.S. patent application Ser. No. 08/168,519: filed Dec. 16, 1993.

Gligor, Virgil D. et al.; "Object Migration and Authentication"; IEEE Transactions on Software Engineering; vol. SE-5, No. 6; November 1979.

Gong et al. "An Image Database System with Content Capturing and Fast Image Indexing Abilities" IEEE, 1994, pp. 121–130, May 1994.

Gregory L Baker & Jerry P Gollub: "Chaotic Dynamics: An Introduction", Cambridge University Press, Cambridge, 1990.

Gupta, Amamath; Weymount, Terry & Jain, Ramesh, "Semantic Queries With Pictures: The VIMSYS Model", Proceedings of the 17th International Conference on Very Large Data Bases, pp. 69–79, Barcelona, September, 1991.

H. Tamura et al, "Image Database Systems: A Survey", Pattern Recognition, vol. 17, No. 1, 1984, pp. 29–34.

H. Tamura, et al. "Textural Features Corresponding to Visual Perception, "IEEE Transactions on System, Man, and Cyb., vol. SMC-8, No. 6, pp. 460–473 (1978).

H. Samet. The quadtree and related hierarchical data structures. ACM Computing Surveys. 16(2):187–260, 1984.

Hans Lauwerier: "Fractals—Images of Chaos", Penguin Books, London, 1991.

Harty et al., "Case Study: The VISA Transaction Processing System," 1988.

Heinz-Otto Peitgen & Deitmar Saupe: "The Science of Fractal Images", Springer-Verlag, New York, 1988.

Heinz-Otto Peitgen, Hartmut Jurgens & Deitmar Saupe: "Fractals for the Classroom", Springer-Verlag, 1992.

Hirata, et al. "Query by Visual Example, Content Based Image Retrieval" Advance in Database Technology-EDBT '92, Springer-Verlag, Berlin 1992, pp. 56–71

Hirzalla et al., "A Multimedia Query User-Interface", IEEE on CD-ROM, pp. 590–593, Sep. 5, 1995.

Hooge, Charles, "Fuzzy logic Extends Pattern Recognition Beyond Neural Networks", Vision Systems Design, January 1998, pp. 32–37.

Hou et al., "Medical Image Retrieval by Spatial Features", IEEE on CD-ROM, pp. 1364–1369, Oct. 18, 1992.

Iino et al., "An Object-Oriented Model for Spatio-Temporal Synchronization of Multimedia Information", May, 1994.

Information Network Institute. Carnegie Mellon University, Internet Billing Server, Prototype Scope Document, Oct. 14, 1993.

Ingemar J. Cox et al., "Target Testing and the Pic Hunter Bayesian Multimedia Retrieval System," Proc. of the 3d Forum on Research and Technology Advances in Digital Libraries, ADL '96, IEEE, pp. 66–75.

Intel Corporation, iPower Technology, Marketing Brochure, date unknown.

Intuit Corp. Quicken User's Guide, "Paying Bills Electronically", pp. 171–192; undated.

ISO/IEC JTC1/SC29/WG11 N1735, MPEG97, July 1997—Stockholm, "MPEG-7 Applications Document".

ISO/IEC JTC1/SC29/WG11 N2460, MPEG98, October 1998 "MPEG-7 Context and Objectives (v.10—Atlantic City)"; ISO/IEC JTC1/SC29/WG11 N1920, MPEG97, October 1997 "MPEG-7 Context and Objectives (v.5—Fribourg)"; ISO/IEC JTC1/SC29/WG11 N1733, MPEG97, July 1997, "MPEG-7 Context and Objectives (v.4—Stockholm)".

ISO/IEC JTC1/SC29/WG11 N2461, MPEG98, October 1998—Atlantic City, "MPEG-7 Requirements".

ISO/IEC JTC1/SC29/WG11 N2462, MPEG98, October 1998—Atlantic City, "MPEG-7 Applications".

ISO/IEC JTC1/SC29/WG11 N2467, MPEG98, October 1998—Atlantic City, "MPEG-7 Content Set".

Itzhak Wilf, "Computer, Retrieve For Me the Video Clip of the Winning Goal", Advanced Imaging, August 1998, pp. 53–55.

Ivar Ekeland: "Mathematics and the Unexpected", The University of Chicago Press, Chicago, 1988

Kenneth Falconer: "Fractal Geometry", John Wiley & Sons, Chichester, 1990.

Ivars Peterson: "The Mathematical Tourist". W H Freeman, New York, 1988.

Iyengar et al., "Codes Designs for Image Browsing", 1994.

J W Bruce & P J Giblin: "Curves and Singularities", Cambridge University Press, Cambridge, 1992.

J. Hasegawa et al, "Intelligent Retrieval of Chest X-Ray Image Database Using Sketches", System And Computers In Japan, 1989, pp. 29–42.

J. M. Chassery, et al., "An Interactive Segmentation Method Based on Contextual Color and Shape Criterion", IEEE Transactions on Pattern Analysis and Machine Intelligence, vol. PAMI-6, No. 6, (November 1984).

J. Wachman, "A Video Browser that Learns by Example", Masters Thesis, Massachusetts Institute of Technology: 1996; also appears as MIT Media Laboratory Technical Report No. 383.

J. Hafner, H. S. Sawhney, W. Equitz, M. Flickner, and W. Niblack. Efficient color histogram indexing for quadratic form distance functions. IEEE Trans. Pattern Anal. Machine Intell., July 1995.

J. R. Bach, C. Fuller, A. Gupta, A. Hampapur, B. Horowitz, R. Humphrey, R. C. Jain, and C. Shu. Virage image search engine: an open framework for image management. In Symposium on Electronic Imaging: Science and Technology—Storage & Retrieval for Image and Video Databases IV, pages 76–87. IS&T/SPIE, 1996.

J. R. Smith and S.-F. Chang. Querying by color regions using the VisualSEEk content-based visual query system. In M. T. Maybury, editor, Intelligent Multimedia Information Retrieval. IJCAI, 1996.

J. R. Smith and S.-F. Chang. Tools and techniques for color image retrieval. In Symposium on Electronic Imaging: Science and Technology—Storage & Retrieval for Image and Video Databases IV, volume 2670, San Jose, Calif., February 1996. IS&T/SPIE.

Jacobs, Charles E., Finkelstein, Adam, Salesin, David H., "Fast Multiresolution Image Querying".

James Gleick: "Chaos—Making a New Science", Heinemann, London, 1988.

Jane Hunter, "The Application of Metadata Standards to Video Indexing" http://www.dtsc.edu.au/RDU/staff/jane-hunter/EuroDL/final.html (<Dec. 24, 1998).

Jim Binkley & Leslie Young, Rama: An Architecture for Internet Information Filtering, Journal of Intelligent Information Systems: Integrating Artificial Intelligence and Database Technologies, vol. 5, No. 2, September 1995, pp. 81–99.

Jonathan Berry, "A Potent New Tool for Selling Database Marketing", Business Week. Sep. 5, 1994, pp. 34–40.

Joseph L McCauley: "Chaos, Dymanics, and Fractals", Cambridge University Press, Cambridge, 1993.

JPL New Technology Report NPO-20213, Nasa Tech Brief Vol. 22, No. 4, Item #156 (April 1998).

Judith H. Irven et al., "Multi-Media Information Services: A Laboratory Study", IEEE Communications Magazine, vol. 26, No. 6, June, 1988, pp. 24–44.

K V Mardia. J T Kent & J M Bibby: "Multivariate Analysis". Academic Press, London, 1979.

K. Hirata et al, "Query by Visual Example Content Based Image Retrieval", Advances In Database Technology, March, 1992, pp. 57–71.

K. Wakimoto et al, "An Intelligent User Interface to an Image Database using a Figure interpretation Method", IEEE Publication No. CH2898-5/90/0000/0516, 1990, pp. 516–520.

K. Woolsey, "Multimedia Scouting", IEEE Computer Graphics And Applications, July 1991 pp. 26–38.

Kelly et al. "Efficiency Issues Related to Probability Density Function Comparison", SPIE vol. 2670, pp. 42–49 January 1996.

Kelly, P. M., et al. "Candid Comparison Algorithm for Navigating Digital Image Databases", Proceedings 7th International Working Conference on Scientific and Statistical Database Management, pp. 252–258, 1994.

Krajewski, M. et al, "Applicability of Smart Cards to Network User Authentication", Computing Systems, vol. 7, No. 1, 1994.

Krajewski, M., "Concept for a Smart Card Kerberos", 15th National Computer Security Conference, October 1992.

Krajewski, M., "Smart Card Augmentation of Kerberos, Privacy and Security Research Group Workshop on Network and Distributed System Security", February 1993.

Lampson, Butler: Abadi, Martin; Burrows, Michael; and Wobber, Edward; "Authentication in Distributed Systems: Theory and Practice"; ACM Transactions on Computer Systems; vol. 10, No. 4; November, 1992; pp. 265–310.

Landis, Sean, "Content-Based Image Retrieval Systems for Interior Design", http://www.tc.cornell.edu/Visualization/Education/cs718/fall1995/landis/index.html.

Langton C G (ed): Artificial Life; Proceedings of the first international conference on Artificial life, Redwood City: Addison-Wessley (1989).

Lee et al., "Video Indexing—An Approach based on Moving Object and Track", Proceedings of Storage and Retrieval for Image and Video Databases, pp. 25–36. February 1993.

Lee, Denis, et al., "Query by Image Content Using Multiple Objects and Multiple Features: User Interface Issues," 1994 Int'l Conf. on Image Processing, IEEE, pp. 76–80.

Lennart Ljung & Torsten Soderstrom: "Theory and Practice of Recursive Identification", The MIT Press, Cambridge, Mass., 1983.

Lennart Ljung: "System Identification; Theory for the User". Prentice-Hall Englewood Cliffs, N.J., 1987.

Loeb, S., "Architecting Personalized Delivery of Multimedia Information", Communications of the ACM, December 1992, vol. 35, No. 12, pp. 39–50.

M V Berry, I C Persival & N O Weiss: "Dynamical Chaos", The Royal Society, London, 1987, Proceedings of a Royal Society Discussion Meeting held on 4 & 5 Feb. 1987.

M. Bender, "EFTS: Electronic Funds Transfer Systems", Kennikat Press, Port Washington, New York, pp. 43–46 1975.

M. H. O'Docherty et al, "Multimedia Information System—The Management and Semantic Retrieval of all Electronic Data Types", The Computer Journal, vol. 34, No. 3, 1991.

M. Ioka, "A Method of Defining the Similarity of Images on the Basis of Color Information", Bulletin Of The National Museum Of Ethnology Special Issue, pp. 229–244, No. 17, November 1992.

M. Kurokawa, "An Approach to Retrieving Images by Using their Pictorial Features", IBM Research, Japan, September 1989.

M. Swain et al, "Color Indexing". International Journal Of Computer Vision, 1991, pp. 12–32.

M. Stricker and A. Dimai. Color indexing with weak spatial constraints. In Symposium on Electronic Imaging: Science and Technology—Storage & Retrieval for Image and Video Databases IV, pages 29–41. IS&T/SPIE, 1996.

M. Stricker and M. Orengo. Similarity of color images. In Storage and Retrieval for Image and Video Databases III, volume SPIE Vol. 2420, February 1995.

Mackay et al., "Virtual Video Editing in Interactive Multimedia Applications", 1989.

Manners, George, "Smart Screens; Development of Personal Navigation Systems for TV Viewers," Video Magazine, December 1993.

Martin Casdagli & Stephen Eubank: "Nonlinear Modelling and Forecasting", Addison-Wesley Publishing Co., Redwood City, 1992.

Martinez et al. "Imagenet: A Global Distribution Database for Color Image Storage and Retrieval in Medical Imaging Systems" IEEE, 1992, 710–719, May 1992.

Marvin A. Sirbu; Internet Billing Service Design And Prototype Implementation; pp. 1–19: An Internet Billing Server.

Masahiro Morita & Yoichi Shinoda, Information Filtering Based on User Behavior Analysis and Best Match Text Retrieval, Proceedings of the Seventeenth Annual International ACM-SIGIR Conference on Research and Development in Information Retrieval, Dublin, Jul. 36, 1994, Pages Title Page (272)-281.

Medvinsy et al, "NetCash: A Design for Practical Electronic Currency on the Internet", Proc. 1st ACM Conf. on Comp. and Comm. Security, November 1993.

Medvinsy et al., "Electronic Currency for the Internet", Electronic Markets, pp. 30–31, September 1993.

Meyer, J. A., Roitblat, H. L., Wilson, W. (eds.): From Animals to Animats. Proceedings of the Second International Conference on Simulation of Adaptive Behaviour. Cambridge, Mass: MIT Press. (1991).

Middleton, G. V. ed., 1991, Nonlinear Dynamics, Chaos and Fractals, with Applications to Geological Systems. Geol. Assoc. Canada Short Course Notes Vol. 9 (available from the GAC at Memorial University of Newfoundland, St. John's NF A1B 3x5).

Mills, "Media Composition for Casual Users", 1992.

Minneman et al., "Where Were We: making and using near-synchronous, pre-narrative video", Multimedia '93, pp. 1–11. December 1993.

N. Hutheesing, "Interactivity for the passive", Forbes magazine Dec. 6, 1993 (@ Forbes Inc. 1993) (2 pages).

N. S. Chang et al., "Query-by-Pictorial Example", IEEE Transactions on Software Engineering, vol. SE-6, No. 6, pp. 519–524 (November 1980).

N. S. Chang, et al., "Picture Query Languages for Pictorial Data-Base Systems", Computer vol. 14, No. 11, pp. 23–33 (November 1981).

Nagasaka et al., "Automatic Video Indexing and Full-Video Search for Object Appearances", Visual Database Systems, (Knuth et al., eds.), pp. 113–126. January 1992.

National Westminster Bank Group Brochure; pp. 1–29: undated.

Needham, Roger M. and Schroeder, Michael D.; "Using Encryption for Authentication in Large Networks of Computers"; Communications of the ACM; vol. 21, No. 12; December, 1978; pp. 993–999.

Needham, Roger M.; "Adding Capability Access to Conventional File Servers"; Xerox Palo Alto Research Center; Palo Alto, Calif.

Newman, B. C., "Proxy-Based Authorization and Accounting for Distributed Systems", Proc. 13th Int. Conf. on Dist. Comp. Sys., May 1993.

Niblack, W. et al., "The QBIC Project: Querying Images by Content Using Color, Texture, and Shape", IBM Computer Science Research Report, pp. 1–20 (Feb. 1, 1993).

Nussbaumer et al., "Multimedia Delivery on Demand: Capacity Analysis and Implications", Proc 19th Conference on Local Computer Networks, 2–5 October 1994, pp. 380–386.

O. Guenther and A. Buchmann. Research issues in spatial databases. In ACM SIGMOD Record, volume 19, December 1990.

Okamoto et al; "Universal Electronic Cash", pp. 324–337; 1991.

Ono, Atsushi, et al., "A Flexible Content-Based Image Retrieval System with Combined Scene Description Keyword," Proc. of Multimedia '96, IEEE, pp. 201–208.

Otis Port, "Wonder Chips-How They'll Make Computing Power Ultrafast and Ultracheap", Business Week, Jul. 4, 1994, pp. 86–92.

P G Drazin: "Nonlinear System", Cambridge University Press, Cambridge, 1992.

P. Stanchev et al, "An Approach to Image Indexing of Documents", Visual Database Systems. II, 1992, pp. 63–77.

Peter J Diggle: "Time Series: A Biostatistical Introduction", Clarendon Press, Oxford, 1990.

Peters:"Chaos and Order in the Capital Markets", Wiley, 1991 Gershenfeld & Weigend: "The Future of Time Series", Addison-Wesley, 1993.

Pfitzmann et al; "How to Break and Repair a Provably Secure Untraceable Payment System"; pp. 338–350; 1991.

Phillips, "MediaView: a general multimedia digital publication system", Comm. of the ACM, v. 34, n. 7, pp. 75–83. July 1991.

Predrag Cvitanovic: "Universality in Chaos", Adam Hilger, Bristol, 1989.

R. Mehrotra et al, "Shape Matching Utilizing Indexed Hypotheses Generation and Testing", IEEE Transactions On Robotics, vol. 5, No. 1, February 1989, pp. 70–77.

R. Price, et al., "Applying Relevance Feedback to a Photo Archival System", Journal of Information Science 18, pp. 203–215 (1992).

R. W. Picard et al, "finding Similar Patterns in Large Image Databases", IEEE ICASSP, Minneapolis, Minn., vol. V, pp. 161–164, April 1993; also appears in MIT Media Laboratory Technical Report No. 205.

Rangan et al., "A Window-based Editor for Digital Video and Audio", January 1992.

Richards et al., "The Interactive Island", IEE Revies, July/August 1991 pp. 259–263.

Rivest, R.; "The MD5 Message-Digest Algorithm"; MIT Laboratory for Computer Science and RSA Data Security, Inc.; April, 1992.

Rivest, R. L. et al., "A Method for Obtaining Digital Signatures and Public-Key Cryptosystems," Laboratory for Computer Science, Massachusetts Institute of Technology, Cambridge, Mass.

Rivest, R. L.; Shamir, A. & Adleman, L.; "A Method for Obtaining Digital Signatures and Public-Key Cryptosystems", Communications of the ACM, February 1978, vol. 21, No. 2, pp. 120–126.

Robert Brown: "Statistical Forecasting for Inventory Control", McGraw-Hill Book Co., New York, 1958.

Robinson, G., and Loveless, W., "Touch-Tone' Teletext—A Combined Teletext-Viewdata System," IEEE Transactions on Consumer Electronics, vol. CE-25, No. 3, July 1979, pp. 298–303.

Roizen, Joseph, "Teletext in the USA," SMPTE Journal, July 1981, pp. 602–610.

Rose, D. E.; Mander, R.; Oren, T., Ponceleon, D. B.; Salomon, G. & Wong, Y. Y. "Content Awareness in a File System Interface Implementing the 'Pile' Metaphor for Organizing Information", 16 Ann. Int'l SIGIR '93, ACM, pp. 260–269.

Ross Anderson, "Why Cryptosystems Fail", Proc. 1st Conf. Computer and Comm. Security, pp. 215–227, November 1993.

Ross J. Anderson. "UEPS—A Second Generation Electronic Wallet", Proc. of the Second European Symposium on Research in Computer Security (ESORICS), Touluse, France, pp. 411–418, Toulouse, France.

Rui, Yong, Huang, Thomas S., Chang. Shih-Fu, "Image Retrieval: Past Present and Future".

Rui, Yong, Huang, Thomas S., Mehotra, Sharad, "Browsing and retrieving Video Content in a Unified Framework".

Rui, Yong, Huang, Thomas S., Ortega, Michael, Mehotra, Sharad, "Relevance Feedback: A Power Tool for Interactive Content-Based Image Retrieval".

S. Chang et al, "An Intelligent Image Database System", IEEE Transactions On Software Engineering, vol. 14, No. 5, May 1988, pp. 681–688.

S. Chang et al, "Iconic Indexing by 2-D Strings", IEEE Transactions On Pattern Analysis And Machine Intelligence, vol. PAMI-9, No. 3, May 1987.

S. Chang et al, "Iconic Indexing by 2-D Strings", IEEE Transactions On Pattern Analysis And Machine Intelligence, vol. 9, No. 3, May 1987, pp. 413–427.

S. Charles et al, "Using Depictive Queries to Search Pictorial Databases". Human Computer Interaction, 1990, pp. 493–498.

S. Lee et al, "2D C-string: A New Spatial Knowledge Representation for Image Database Systems", Pattern Recognition, vol. 23, 1990, pp. 1077–1087.

S. Lee et al, "Similarity Retrieval of Iconic Image Database". Pattern Recognition, vol. 22. No. 6 1989, pp. 675–682.

S. Lee et al, "Spatial Reasoning and Similarity Retrieval of Images Using 2D C-string Knowledge Representation", Pattern Recognition, 1992, pp. 305–318.

S. Negahdaripour et al "Challenges in Computer Vision: Future Research Direction", IEEE Transactions On Systems, Man And Cybernetics, pp. 189–199, 1992, at Conference on Computer Vision and Pattern Recognition.

S. Tanaka et al, "Retrieval Method for an Image Database based on Topological Structure", SPIE, vol. 1153, 1989, pp. 318–327.

S.-F. Chang. Compressed-domain techniques for image/video indexing and manipulation. In Proceedings, I.E.E.E. International Conference on Image Processing, Washington, D.C., October 1995, invited paper to the special session on Digital Library and Video on Demand.

S.-K. Chang, Q. Y. Shi, and C. Y. Yan. Iconic indexing by 2-D strings. IEEE Trans. Pattern Anal. Machine Intell., 9(3):413–428, May 1987.

S.-K. Chang. Principles of Pictorial Information Systems Design. Prentice Hall, 1989.

Salton, G., "Developments in Automatic Text Retrieval", Science, vol. 253, pp. 974–980, Aug. 30, 1991.

Schamuller-Bichl, I., "IC-Cards in High-Security Applications", in Selected Papers from the Smart Card 2000 Conference, Springer Verlag, 1991, pp. 177–199.

Semyon Dukach, "SNPP: A Simple Network Payment Protocol", MIT Laboratory for Computer Science. Cambridge, Mass., 1993.

Shann et al. "Detection of Circular Arcs for Content-Based Retrieval from an Image Database" IEE Proc.—Vis. Image Signal Process, vol. 141, No. 1, February 1994, pp. 49–55.

Sheldon G Lloyd & Gerald D Anderson: "Industrial Process Control", Fisher Controls Co., Marshalltown, 1971.

Sheth et al., "Evolving Agents for Personalized Information Filtering", 1–5 March 1993, pp. 345–352.

Sheth, B. & Maes, P. "Evolving Agents For Personalized Information Filtering", Proc. 9th IEEE Conference, 1993 pp. 345–352.

Sincoskie, W. D. & Cotton C. J. "Extended Bridge Algorithms for Large Networks", IEEE Network, January 1988-vol. 2, No. 1, pp. 16–24.

Smith, J. et al. "Quad-Tree Segmentation for Texture-Based Image Query" Proceeding ACM Multimedia 94, pp. 1–15, San Francisco, 1994.

Smoliar, S. et al., "Content-Based Video Indexing and Retrieval", IEEE Multimedia, pp. 62–72 (Summer 1994).

Society for Worldwide Interbank Financial Telecommunications S. C., "A.S.W.I.F.T. Overview", undated.

Spyros Makridakis & Steven Wheelwright: "The Handbook of Forecasting", John Wiley, New York, 1982.

Steven C Chapra & Raymond P Canale: "Numerical Methods for Engineers", McGraw-Hill Book Co., New York, 1988.

T. Arndt, "A Survey of Recent Research in Image Database Management", IEEE Publication No. TH0330-1/90/0000/0092, pp. 92–97, 1990.

T. Gevers et al, "Enigma: An Image Retrieval System", IEEE 11th IAPR International Conference On Pattern Recognition, 1992, pp. 697–700.

T. Gevers et al, "Indexing of Images by Pictorial Information", Visual Database Systems, II. 1992 IFIP, pp. 93–101.

T. Kato et al, "A Cognitive Approach Interaction", International Conference Of Multimedia Information Systems, January, 1991, pp. 109–119.

T. Kato et al, "Trademark: Multimedia Database with Abstracted Representation on Knowledge Base", Proceedings Of The Second International Symposium On Interoperable Information Systems, pp. 245–252, November 1988.

T. Kato et al, "Trademark: Multimedia Image Database System with Intelligent Human Interface", System And Computers In Japan, 1990, pp. 33–46.

T. Kato. "A Sketch Retrieval Method for Full Color Image Database-Query by Visual Example", IEEE, Publication No. 0-8186-2910-X/92, 1992, pp. 530–533.

T. Kato, "Intelligent Visual Interaction with Image Database Systems Toward the Multimedia Personal Interface", Journal Of Information Processing, vol. 14, No. 2, 1991, pp. 134–143.

T. Minka, "An Image Database Browser that Learns from User Interaction", Masters Thesis, Massachusetts Institute of Technology; 1996: also appears as MIT Media Laboratory Technical Report 365.

T.-S. Chua, S.-K. Lim, and H.-K. Pung. Content-based retrieval of segmented images. In Proc. ACM Intern. Conf. Multimedia, October 1994.

Tak W. Yan & Hector Garcia-Molina, SIFT—A Tool for Wide-Area Information Dissemination, 1995 USENIX Technical Conference, New Orleans. LA., Jan. 16–20, pp. 177–186.

Tanton, N. E., "UK Teletext—Evolution and Potential," IEEE Transactions on Consumer Electronics, vol. CE-25, No. 3, July 1979, pp. 246–250.

Tenenbaum, Jay M. and Schiffman, Allan M.; "Development of Network Infrastructure and Services for Rapid Acquisition"; adapted from a white paper submitted to DARPA by MCC in collaboration with EIT and ISI.

Training Computers To Note Images, New York Times, Apr. 15, 1992.

Turcotte, Donald L., 1992, Fractals and Chaos in Geology and Geophysics. Cambridge U.P.

TV Communications Advertisement for MSI Datacasting Systems, January 1973.

V. Gudivada et al, "A Spatial Similarity Measure for Image Database Applications", Technical Report 91-1, Department of Computer Science, Jackson, Miss., 39217, 1990–1991.

V. N. Gudivada and V. V. Raghavan. Design and evaluation of algorithms for image retrieval by spatial similarity. ACM Trans. on Information Systems, 13(2), April 1995.

Vittal. J., "Active Message Processing: Message as Messengers", pp. 175–195; 1981.

Voydock, Victor et al.; "Security Mechanisms in High-Level Network Protocols"; Computing Surveys; vol. 15, No. 2; June 1981.

W Gellert, H Kustner, M Hellwich & H Kastner: "The VNR Concise Encyclopedia of Mathematics", Van Nostrand Reinhols Co., New York, 1975.

W. Grosky et al, "A Pictorial Index Mechanism for Model-based Matching", Data 7 Knowledge Engineering 8, 1992, pp. 309–327.

W. Grosky et al, "Index-based Object Recognition in Pictorial Data Management Computer Vision, 1990, pp. 416–436.

W. Niblack et al, "Find me the Pictures that Look Like This: IBM'S Image Query Project", Advanced Imaging, April 1993, pp. 32–35.

W. Niblack, R. Barber, W. Equitz, M. Flickner, E. Glasman, D. Petkovic, P. Yanker, and C. Faloutsos. The QBIC project: Querying images by content using color, texture, and shape. In Storage and Retrieval for Image and Video Databases, volume SPIE Vol. 1908, February 1993.

W. T. Freeman et al, "The Design and Use of Steerable Filters", IEEE Transactions on Pattern Analysis and Machine Intelligence, vol. 15, No. 9, September 1991, pp. 891–906.

Weber et al., "Marquee: A Tool for Real-Time Video Logging", CHI '94. April 1994.

Willett, P., "Recent Trends in Hierarchic Document Clustering: A Critical Review", Information Processing & Management, vol. 24, No. 5, pp. 557–597, 1988

William L. Thomas, "Electronic Program Guide Applications—The Basics of System Design", 1994 NCTA Technical Papers, pp. 15–20.

X. Zhang, et al, "Design of a Relational Image Database Management System: IMDAT", IEEE Publication No. TH0166-9/87/0000-0310, 1987, pp. 310–314.

Y. Okada, et al., "An Image Storage and Retrieval System for Textile Pattern Adaptable to Color Sensation of the Individual", Trans. Inst. Elec. Inf. Comm., vol. J70D, No. 12, pp. 2563–2574, December 1987 (Japanese w/English Abstract).

Y. Yoshida et al, "Description of Weather Maps and Its Application to Implementation of Weather Map Database". IEEE 7th International Conference On Pattern Recognition, 1984, pp. 730–733.

Yan et al., "Index Structures for Information Filtering Under the Vector Space Model". PROC the 10th International Conference on Data Engineering, pp. 14–18 of DRD203RW User's Manual relating to the DSS Digital System.

Z. Chen et al, "Computer Vision for Robust 3D Aircraft Recognition with Fast Library Search". Pattern Recognition, vol. 24, No. 5, pp. 375–390, 1991, printed in Great Britain.

Zhuang, Yueting, Rui, Yong, Huang, Thomas S., Mehotra, Sharad, "Applying Semantic Association to Support Content-Based Video Retrieval".

Video on Demand

Video on demand has long been sought as a means for delivering personalized media content. The practical systems raise numerous issues, including data storage formats, retrieval software, server hardware architecture, multitasking and buffering arrangements, physical communications channel, logical communications channel, receiver and decoder system, user interface, etc. In addition, typically a pay-per-view concept may be employed, with concomitant subscription, royalty collection and accounting issues. See, e.g.:

A. D. Gelman, et al.: A Store-And-Forward Architecture For Video-On-Demand Service; ICC 91 Conf.: June 1991: pp. 842–846.

Caitlin Bestler: Flexible Data Structures and Interface Rituals For Rapid Development of OSD Applications; 93 NCTA Tech. Papers; Jun. 6, 1993; pp. 223–236.

Consumer Digest advertisement: Xpand Your TV's Capability: Fall/Winter 1992; p. 215.

Daniel M. Moloney: Digital Compression in Todays Addressable Enviroment: 1993 NCTA Technical Papers; Jun. 6, 1993: pp. 308–316.

Great Presentations advertisement: Remote, Remote; 1987: p. 32H.

Henrie van den Boom: An Interactive Videotex System for Two-Way CATV Networks; AEU, Band 40; 1986; pp. 397–401.

Hong Kong Enterprise advertisement: Two Innovative New Consumer Products From SVI; November 1988; p. 379.

IEEE Communications Magazine; vol. 32, No. 5, May 1994 New York, N.Y., US, pp. 68–80, XP 000451097 Chang et al "An Open Systems Approach to Video on Demand".

Proceedings of the IEEE, vol. 82, No. 4, Apr. 1994 New York, N.Y., US, pp. 585–589, XP 000451419 Miller "A Scenario for the Deployment of Interactive Multimedia Cable Television Systems in the United States in the 1990's".

Reimer, "Memories in my Pocket", Byte, pp. 251–258, February 1991.

Sharpless, "Subscription teletext for value added services", August 1985.

Demographically Targeted Advertising Through Electronic Media

Since the advent of commercially subsidized print media, attempts have been made to optimize the placement and compensation aspects relating to commercial messages or advertisements in media. In general, advertisers subsidize a large percentage of the cost of mass publications and communications, in return for the inclusion and possibly strategic placement of advertisements in the publication. Therefore, the cost of advertising in such media includes the cost of preparation of the advertisement, a share of the cost of publication and a profit for the content provider and other services. Since the advertiser must bear some of the cost of production and distribution of the content, in addition to the cost of advertisement placement itself, the cost may be substantial. The advertiser justifies this cost because the wide public reception of the advertisement, typically low cost per consumer "impression", with a related stimulation of sales due to commercial awareness of the advertisers' products and services. Therefore, the advertisement is deemed particularly effective if either the audience is very large, with ad response proportionate to the size of the audience, or if it targets a particularly receptive audience, with a response rate higher than the general population.

On the other hand, the recipient of the commercial publication is generally receptive of the advertisement, even though it incurs a potential inefficiency in terms of increased data content and inefficiencies in receiving the content segment, for two reasons. First, the advertisements subsidize the publication, lowering the monetary cost to the recipient. Second, it is considered economically efficient for a recipient to review commercial information relating to prospective purchases or expenditures, rather than directly soliciting such information from the commercial source. i.e., "push" is better than "pull". For this reason specialty publications are produced, including commercial messages appropriate for the particular content of the media or the intended recipients. In fact, in some forms of publications, most, if not all the information content is paid advertisements, with few editorial or independently produced pieces.

Mass media, on the other hand, tends not to include specialty commercial messages, because the interested population is too disperse and the resulting response rate from an advertisement too low, and further because the majority of the audience will be disinterested or even respond negatively to certain messages. Thus, mass media generally includes a majority of retail advertisements, with specialty advertisements relegated, if at all, to a classified section which is not interspersed with other content.

This is the basis for a "least common denominator" theory of marketing, that mass media must merchandise to the masses, while specialty media merchandises to selected subpopulations. As a corollary, using such types of media, it may be difficult to reach certain specialized populations who do not consistently receive a common set of publications or who receive primarily publications which are unspecialized or directed to a different specialty.

Where a recipient has limited time for reviewing media, he or she must divide his or her available time between mass media and specialty media. Alternatively, publication on demand services have arisen which select content based on a user's expressed interests. Presumably, these same content selection algorithms may be applied to commercial messages. However, these services are primarily limited distribution, and have content that is as variable as commercial messages. Likewise, mass media often has regionally variable content, such as local commercials on television or cable systems, or differing editions of print media for different regions. Methods are known for demographic targeting of commercial information to consumers; however, both the delivery methods and demographic targeting methods tend to be suboptimal.

Sometimes, however, the system breaks down, resulting in inefficiencies. These result where the audience or a substantial proportion thereof is inappropriate for the material presented, and thus realize a low response rate for an advertiser or even a negative response for the media due to the existence of particular commercial advertisers. The recipients are bombarded with inappropriate information, while the advertiser fails to realize optimal return on its advertising expenditures. In order to minimize the occurrence of these situations, services are available, including A. C. Nielsen Co. and Arbitron, Inc., which seek to determine the demographics of the audience of broadcast media.

U.S. Pat. No. 5,436,653, incorporated herein by reference, relates to a broadcast segment recognition system in which a signature representing a monitored broadcast segment is compared with broadcast segment signatures in a data base representing known broadcast segments to determine whether a match exists. Therefore, the broadcast viewing habits of a user may be efficiently and automatically monitored, without pre-encoding broadcasts or the like.

U.S. Pat. No. 5,459,306, incorporated herein by reference, relates to a method for delivering targeting information to a prospective individual user. Personal user information is gathered, as well as information on a user's use of a product, correlated and stored. Classes of information potentially relevant to future purchases are then identified, and promotions and recommendations delivered based on the information and the user information.

U.S. Pat. No. 5,483,278, incorporated herein by reference, relates to a system having a user interface which can access downloaded electronic programs and associated information records, and which can automatically correlate the program information with the preferences of the user, to create and display a personalized information database based upon the results of the correlation. Likewise, U.S. Pat. No. 5,223,914, expressly incorporated herein by reference, relates to a system and method for automatically correlating user preferences with a T.V. program information database.

U.S. Pat. No. 5,231,494, expressly incorporated herein by reference, relates to a system that selectively extracts one of a plurality of compressed television signals from a single channel based on viewer characteristics.

U.S. Pat. No. 5,410,344 relates to a system for selecting video programs based on viewers preferences, based on content codes of the programs.

U.S. Pat. No. 5,485,518, incorporated herein by reference, relates to a system for electronic media program recognition and choice, allowing, for example, parental control of the individual programs presented, without requiring a transmitted editorial code.

WO 00/49801, WO 00/033,224 and U.S. Patent Application Nos. 60/110,301, 60/120,722 and Ser. 09/449,887, expressly incorporated herein by reference, relates to a demographically targeted advertising insertion system.

Targeted Advertising

The current wide-ranging use of computer systems provides a relatively large potential market to providers of electronic content or services. A cost, however, is involved with providing electronic information to individual consumers. For example, hardware and maintenance costs are involved in establishing and maintaining information servers and networks, as well as service costs for installation and customer service. One source that can be secured to provide the monetary resources necessary to establish and maintain such an electronic information distribution network includes commercial advertisers. These advertisers provide electronic information to end users of the system by way of electronically delivered advertisements, in an attempt to sell products and services to the end users.

The value of a group of end users, however, may be different for each of the respective advertisers, based on the product or services each advertiser is trying to sell and the class or classification of the user. Thus, it would be beneficial to provide a system, which allows individual advertisers to pay all, or part of the cost of such a network, based on the value each advertiser places on the end users the advertiser is given access to. In addition, advertisers often desire to target particular audiences for their advertisements. These targeted audiences are the audiences that an advertiser believes is most likely to be influenced by the advertisement or otherwise provide revenues or profits. By selectively targeting particular audiences the advertiser is able to expend his or her advertising resources in an efficient manner. Thus, it would be beneficial to provide a system that allows electronic advertisers to target specific audiences, and thus not require advertisers to provide an single advertisement to the entire population, the majority of which may have no interest whatsoever in the product or service being advertised or susceptibility to the advertisement.

Currently, advertisers are able to implement a limited form of targeted advertising over the Internet. For example, Doubleclick implements such a method. This is accomplished by sending a block of data, such as a "cookie," from a remote host or server (i.e., a Web server) maintained by an advertiser to a computer (i.e., a client system) that has access to the remote server via the World Wide Web. A cookie, as used in network and Internet communication, is a block of data or state object that a Web server stores on a client system. When the client system accesses a Web site within a limited range of domain names, the client system automatically transmits a copy of the cookie to the Web server that serves the Web site. The cookie may include a unique cookie number corresponding to the client system. Thus, the cookie can be used to identify the client system (by identifying the Web browser) and to instruct the server to send a customized copy of the requested Web page to the Web browser.

Since cookies are also used to track a consumer's online activity, a Web server can deliver targeted advertisements to a consumer's Web browser, based on the consumer's online activity. For example, if a cookie tracks the various IP addresses accessed by the consumer's computer, the Web server can deliver ad banners to the consumer's Web browser based on the IP addresses the Web browser has accessed. Thus, the cookie can be used to record the online activity of a consumer, and information regarding the consumer's tastes and tendencies can be inferred from the consumer's online activity. Using this inference, an advertiser can try to target specific advertisements to specific computer consumers, based on the record of the computer consumers' online activities. That is, the advertiser can try to expose the computer consumers to advertisements designed to appeal to their particular tastes and interests.

The targeted advertisement can be implemented in several manners. For example, the advertiser can generate Internet banners that contain targeted ads and are visible to the consumer when the consumer accesses the advertiser's server, and/or the advertiser can automatically generate e-mail messages and send them to the consumer if the advertiser has the consumer's e-mail address.

Advertisers are generally willing to pay more to deliver an impression (e.g., a banner ad or other type of advertisement) to users who are especially sensitive to advertisements for their products or are seeking to purchase products corresponding to those sold by the advertisers, and the economic model often provides greater compensation in the event of a "click through", which is a positive action taken by the user to interact with the ad to receive further information. This principle, of course, actually operates correspondingly in traditional media. For example, a gardening tool manufacturer in generally is willing to pay more per subscriber to place advertisements in a magazine having content directed to gardeners than in a general interest or urban-directed publication.

Although a few search engines for the mass market exist that charge a fee for use, this model has not been popular or successful. Instead, most search engines offer free access, subject to user tolerating background advertising or pitches for electronic commerce sales or paid links to sites that offer goods and services, including the aforementioned banner ads. These advertisements are typically paid for by sponsors on a per impression basis (each time a user opens the page on which the banner ad appears) or on a "click-through basis" (normally a higher charge, because user has decided to select the ad and "open it up" by activating an underlying hyper-link). Newer network marketing schemes provide a contingent compensation based on complete sale or transaction with the user, making the content owner partially responsible for properly targeting the advertisement to an appropriate consumer. In addition, most search engines seek "partners" with whom they mutually share hyperlinks to each other's sites.

It is well known that by optimizing the presentation of advertising to potential consumers, a higher effectiveness of advertising will be achieved, termed the "ad response rate." It is believed that the probability that a potential consumer will purchase a particular item is correlated with certain personal characteristics, including demographic characteristics, of the person or family unit. The field is called demographically targeted advertising. Thus, by predicting the ad response rate for a person, the most highly valued advertisement may be selected for the person. This optimization allows the service provider to charge a higher ad rate, while the advertiser gains more effectiveness for marketing dollars.

Accordingly, a conditional probability of a subsequent action by the user may be assessed for each interaction, and that, on the basis of that probability, an economic parameter may be altered. Thus, for example, the selection of a hyperlink by the user through a browser may be associated with a calculated probability that the user will subsequently purchase a good or service. This probability may then be used to calculate an advertiser charge for delivery of an advertisement, or to prioritize the advertisements sent to the user in order to, for example, maximize the utility to the selected advertiser, the advertisement serving system operator, to the user, or some combination thereof. This calculated probability may also be used to adapt the information subsequently presented to the user. This probability may be calculated, for example, based on a population statistic plus a recent history of the particular user, a collaborative filtering scheme, a long-term monitoring of the user through the use, for example, of cookies and a database, or other scheme, or through express input of user characteristics, such as demographic profile, survey response, or a direct user communication. The logic used to predict the probability may be formal Bayesean, fuzzy logic, a multiple regression equation, neural networks, or other known logic.

U.S. Pat. No. 5,724,521 (Dedrick), expressly incorporated herein by reference, provides a method and apparatus for providing electronic advertisements to end users in a consumer best-fit pricing manner, which includes an index database, a user profile database, and a consumer scale matching process. The index database provides storage space for the titles of electronic advertisements. The user profile database provides storage for a set of characteristics that corresponds to individual end users of the apparatus. The consumer scale matching process is coupled to the content database and the user profile database and compares the characteristics of the individual end users with a consumer scale associated with the electronic advertisement. The apparatus then charges a fee to the advertiser, based on the comparison by the matching process. In one embodiment, a consumer scale is generated for each of multiple electronic advertisements. These advertisements are then transferred to multiple yellow page servers, and the titles associated with the advertisements are subsequently transferred to multiple metering servers. At the metering servers, a determination is made as to where the characteristics of the end users served by each of the metering servers fall on the consumer scale. The higher the characteristics of the end users served by a particular metering server fall, the higher the fee charged to the advertiser.

In the system of U.S. Pat. No. 5,724,521, each client system is provided with an interface, such as a graphic user interface (GUI), that allows the end user to participate in the system. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables, or user profile data, refer to information such as marital status, color preferences, favorite sizes and shapes, preferred learning modes, employer, job title, mailing address, phone number, personal and business areas of interest, the willingness to participate in a survey, along with various lifestyle information. The end user initially enters the requested data and the non-identifying information is transferred to the metering server. That is, the information associated with the end user is compiled and transferred to the metering server without any indication of the identity of the user (for example, the name and phone number are not included in the computation). The GUI also allows the user to receive inquiries, request information and consume information by viewing, storing, printing, etc. The client system may also be provided with tools to create content, advertisements, etc. in the same manner as a publisher/advertiser.

U.S. Pat. No. 5,890,152 (Rapaport et al.), expressly incorporated herein by reference, relates to a Personal Feedback browser and Personal Profile database for obtaining media files from the Internet. A Personal Feedback browser selects media files based on user-specified information stored in the Personal Profile database. The Personal Profile database includes Profile Objects that represent the interests, attitude/aptitude, reading comprehension and tastes of a user. Profile Objects are bundles of key words/key phrases having assigned weight values. Profile Objects can be positioned a specified distance from a Self Object. The distance from the Profile Object to the Self Object represents the effect the Profile Object has in filtering and/or selecting media files for that user. The Personal Feedback browser includes a media evaluation software program for evaluating media files based on a personal profile database. The Personal Profile database is also adjusted based upon user selection and absorption of media files.

U.S. Pat. No. 4,602,279 (Freeman), expressly incorporated herein by reference, relates to a method for providing targeted profile interactive CATV displays. An interactive communication system is described, such as an interactive cable television system, for providing an interactive information output over a common output channel from a plurality of remotely transmitted different information inputs and, more particularly, a method for interactively creating a selection profile for a subscriber and interactively selecting in real time one of a plurality of messages, such as television commercials or game scores, based upon the selection profile whereby multiple users of a one-way television signal distribution network, to obtain an individualized or tailored program information content for a television programming sequence. The selection profile may be created in advance of transmission of the television program or commercial or during transmission of a given program and may be varied from the head end. In this manner, highly tailored information may be provided to particular subscribers based on their individual profiles as recognized by the system. In addition, selection profiles comprising subsets of a group of parameters may also be created with the tailored programming based on the subsets as well.

U.S. Pat. No. 5,283,731 (Lalonde, et al.), expressly incorporated herein by reference, relates to a computer-based classified ad system and method. The system comprises a data processor including means for creating an ad database comprising a plurality of ads, each ad containing text data describing an item to be made available through the system. In a first aspect, the data processor also includes means for receiving profile data describing an item sought from others through the system, and for comparing the profile data to the ads and for generating text output data when matches are found. An interactive voice response system converts the text output data into a voice message. In a second aspect, the data processor includes means for creating a want ad database comprising want ads that contain data describing items sought through the system and delivery data such as a buyer's phone number. When a new ad is placed in the ad database, it is also compared to the want-ads. If a match is found, the system generates output data that includes the new ad and the delivery data for the matching want ad.

U.S. Pat. Nos. 5,794,210 and 5,855,008 (Goldhaber, et al.), expressly incorporated herein by reference, relate to an attention brokerage. The system provides for the immediate payment to computer and other users for paying attention to an advertisement or other "negatively priced" information distributed over a computer network such as the Internet. Called Attention Brokerage, this is the business of brokering the buying and selling of the "attention" of users. Another aspect, Orthogonal Sponsorship, allows advertisers to detach their messages from program content and explicitly target their audience. A special icon or other symbol displayed on a computer screen may represent compensation and allow users to choose whether they will view an ad or other negatively priced information and receive associated compensation. Targeting users may be provided by reference to a database of digitally stored demographic profiles of potential users. Information can be routed to users based on demographics, and software agents can be used to actively seek out users on a digital network. Private profiles may be maintained for different users and user information may be released to advertisers and other marketers only based on user permission. Users may be compensated for allowing their information to be released. Competing advertisers may "bid" for the attention of users using automatic electronic systems. e.g., "an auction" protocol and these concepts can be generalized to provide an electronic trading house where buyers and sellers can actively find each other and negotiate transactions. In this system, the user is compensated for paying attention to an ad. This compensation has a monetary value. Contact information data is separated from customer profile data. Interest agents search the Net and find targeted ads for the user. If the user does not like the ads, then her feedback is taken into account and ads are tailored accordingly.

U.S. Pat. No. 5,974,398 (Hanson), expressly incorporated herein by reference, relates to a method and apparatus enabling valuation of user access of advertising carried by interactive information and entertainment services. Interactive information and entertainment service customers see advertisers' bids for their attention that which are displayed on their display screens and choose which advertisements to view. For each advertisement viewed, the advertisers' bid amount would pay for a portion of the user's service or usage charge. A display on the user's terminal screen includes the advertisers most willing to pay for the user's attention and the dollar amount bid. If the user chooses to see a particular advertiser's message, then the user is reimbursed, or a credit is applied to the user's service account for the amount of the bid promised by the advertiser whose message was viewed. Customer interest profiles and service usage data collected by the service provider are used to identify particular user characteristics to advertisers. Advertisers define user characteristics of particular desirability and place a dollar value on having messages viewed by individual users based on the desirability of the user.

This patent thus discloses targeted interactive advertising, where the viewer is rewarded for watching an ad. The invention provides sufficient information to the user so that the user can select which ad is seen, but the complete ad is not presented until the user takes an affirmative action. The system includes a database-marketing portion and an auction (for the customer's attention) portion. The patent also describes the use of various databases that are used to profile customer data including advertiser access to these databases. The auction display region may be sized and positioned in a convenient location on the user's electronic workspace.

U.S. Pat. No. 5,155,591 (Wachob), expressly incorporated herein by reference, relates to a method and apparatus for providing demographically targeted television commercials. Different commercial messages are broadcast to different demographically targeted audiences in a cable television system or the like. A first television channel contains television programs and periodic commercial messages. A second television channel contains alternate commercial messages. Demographic characteristics of a viewer are identified, and commercial messages are selectively provided from the first or second channel, depending upon the viewer's demographic characteristics. Demographic data can be input by a viewer via a remote control, downloaded to a subscriber's converter from a remote headend, or programmed into the converter at installation. Prioritization of the demographic characteristics of a plurality of television viewers watching a program together enables commercials to be targeted to the viewer having highest priority. Statistical data can be maintained concerning the number and identity of subscribers viewing specific commercials.

U.S. Pat. No. 5,191,410 (McCalley, et al.), expressly incorporated herein by reference, relates to an interactive multimedia presentation and communications system for interactively and selectively communicating particular multimedia presentations to each of a plurality of subscribers along a CATV cable network. The subscriber communicates his selections, both for viewing particular presentations from a menu and for transactions with respect to the information and products being viewed, by entering codes on his Touch-Tone telephone pad. Subscriber input signals are communicated as digital signals through the intercommunications network and response signals are generated, ultimately as analog TV signals for viewing by the subscriber.

U.S. Pat. No. 5,305,195 (Murphy), expressly incorporated herein by reference, relates to interactive advertising system for on-line terminals, for providing advertising information into an interactive system having a plurality of remotely located terminals. Each terminal includes a video display unit, logic and a video storage medium such as a hard disc in addition to the normal functions of the interactive system of which an ATM is an example. A remote centrally located commercial computer capable of transmitting digitized signals representing commercial offerings and compressed digitized video signals for display on the video unit communicates with each of the remotely located terminals. The compressed digitized video signals are stored on the hard disc of each terminal for display on the video unit at times determined by the use of the terminal. The user selects the services or goods offered by the terminal in the conventional manner. During the waiting time inherent in the operation of the terminal a high quality video advertising message is displayed on the video unit from the hard disc. The message will last for less then 15 seconds and the user selected function will continue at the conclusion of the message. The advertising message will be changed, updated and varied directly from the central computer.

U.S. Pat. No. 5,201,010 (Deaton, et al.), expressly incorporated herein by reference, relates to a method and system for building a database and performing marketing based upon prior shopping history. A method and system is disclosed for performing targeted marketing on infrequent shoppers. A check reader is provided for automatically reading the MICR code of a plurality of checks drawn on a plurality of different banking institutions. Circuitry detects the customer's checking account number in the MICR code of the checks. A terminal enters data relating to the customer's shopping habits. A database of the store's customers is created in response to the check reader, circuitry for detecting, and terminal. The selection is then made of a list of customers from the database who have not shopped at the store since a preselected date.

U.S. Pat. No. 5,515,098 (Carles), expressly incorporated herein by reference, relates to a system and method for selectively distributing commercial messages over a communications network to an individually addressable subscriber terminal ("converter") on a network. A server, located on the network, selectively tags commercial messages with routing information and converter addresses, and transmits the messages on the network to be received and displayed by the addressed converters. The addresses are selected based on information stored in a database related to demographic and other information relating to the members of the household of the subscriber. The server sends selected commercial messages to selected households.

U.S. Pat. No. 5,948,061 (Merriman, et al.), expressly incorporated herein by reference, relates to a method of delivery, targeting, and measuring advertising over networks, such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisement based upon profiling of users and networks.

U.S. Pat. No. 6,006,197 (d'Eon, et al.), expressly incorporated herein by reference, relates to a system and method for assessing effectiveness of an Internet marketing campaign, which correlates the number of impressions of Web advertisements with post-impression transactional activity to measure the effectiveness of the advertisements. When a user clicks on a banner advertisement, an impression is established and the user's identification is recorded. Then, when the user undertakes post-impression transactional activity such as downloading software related to the advertisement, ordering products and services related to the advertisement, and so on, the transactional activity along with the user's identification is recorded. Based on the user identifications, the number of impressions associated with the advertisements are correlated to the post-impression transactional activity as a measure of effectiveness of each advertisement.

U.S. Pat. No. 6,009,409 (Adler, et al.), expressly incorporated herein by reference, relates to a system and method for scheduling and controlling delivery of advertising in a communications network and a communications network and remote computer program employing the system or the method. The system includes: (1) a time allocation controller that allocates time available in a particular advertising region in a display device of a remote computer between at least two advertisements as a function of one of a desired user frequency, a desired time frequency, or a desired geometry, for each of the at least two advertisements and (2) data communication controller, coupled to the time allocation controller, that delivers the at least two advertisements to said remote computer for display in the advertising region according to the allocating of the time.

U.S. Pat. No. 5,893,075 (Plainfield, et al.), expressly incorporated herein by reference, relates to an interactive system and method for surveying and targeting customers. An interactive, customer-accessible data processing system embodied in a programmed personal computer that induces customers of a restaurant, store or other business to enter information about themselves into the system. The information, which may include names, addresses, dates and answers to survey questions, is entered into data fields displayed on a display screen. The system enables a business to generate promotional messages tailored to customers based on the customer-entered information. For example, a business can readily generate birthday offer letters to customers based on their name, address, and birth date simply by selecting an option provided by the system. To induce customers to enter the necessary information, the system flashes an incentive message on the computer display screen. The message may offer to enter a customer into a drawing or other contest in return for the customer entering the necessary information into the system.

U.S. Pat. No. 5,937,392 (Alberts), expressly incorporated herein by reference, relates to a banner advertising display system and method with frequency of advertisement control. An Internet advertising system has a database, a controller, and an ad server operating as part of a web server. The database has advertising campaign information, including identification information and frequency information for how often the ad is to be served. The ad server uses the campaign information from the database to control the relative ratios of serving ads, the distribution of ads throughout the day, and any triggering mechanisms for controlling what ads are served.

U.S. Pat. No. 5,887,243 (Harvey et al.), expressly incorporated herein by reference, relates to a system for processing and delivering personalized media on demand.

U.S. Pat. No. 5,872,588 (Aras et al.), expressly incorporated herein by reference, relates to a method and apparatus for monitoring audio-visual materials presented to a media subscriber, based on delivered content codes.

U.S. Pat. No. 5,774,170 (Hite et al.), expressly incorporated herein by reference, relates to a system and method for delivering targeted audio or video advertisements to consumers.

U.S. Pat. No. 5.636, 346 (Saxe), expressly incorporated herein by reference, relates to a method and system for selectively targeting advertisements and programming, e.g. based on demographic information.

U.S. Pat. No. 5,870,724 (Lawlor et al.), expressly incorporated herein by reference, relates to a targeted advertising in a home retail banking delivery service.

U.S. Pat. No. 5,724,424 (Gifford), expressly incorporated herein by reference, relates to a digital active advertising system, including transaction processing and an interface to an external financial system network.

U.S. Pat. No. 5,838,314 (Neel, et al.), expressly incorporated herein by reference, relates to a digital video services system with interactive advertisement capabilities.

U.S. Pat. No. 5,231,494 (Wachob), expressly incorporated herein by reference, relates to a system for selection of compressed television signals from a single channel allocation based on viewer characteristics.

U.S. Pat. No. 5,974,398 (Hanson, et al.), expressly incorporated herein by reference, relates to a system that allows advertisers to bid for placement in front of particular users based on customer interest profiles.

U.S. Pat. No. 5,933,811 (Angles, et al.), expressly incorporated herein by reference, relates to a system for delivering customized advertisements within interactive communications systems.

U.S. Pat. No. 6,006,265 (Rangan, et al.), expressly incorporated herein by reference, relates to a streaming digital hypervideo system, for transmitting video over the Internet, including targeted streaming advertisements.

U.S. Pat. No. 6,005,561 (Hawkins, et al.), expressly incorporated herein by reference, relates to an interactive information delivery system, for example delivering video clips to a user.

U.S. Pat. No. 6,009,410 (LeMole et al.), expressly incorporated herein by reference, relates to a method for presenting customized advertising to a user on the World Wide Web, including static images, steaming banners, 3-D images, animation, or video and/or audio clips.

U.S. Pat. No. 6,053,554 (Hendricks, et al.), expressly incorporated herein by reference, relates to a television program delivery system for delivery of video on demand through a digital network.

U.S. Pat. No. 5,991,740 (Messer), expressly incorporated herein by reference, relates to a system for integrated tracking and management of commerce-related activities on a public access network.

Data Mining of Consumer Data

In recent years, the field of data mining, or extracting useful information from bodies of accumulated raw data, has provided a fertile new frontier for database and software technologies. While numerous types of data may make use of data mining technology, a few particularly illuminating examples have been those of mining information, useful to retail merchants, from databases of customer sales transactions, and mining information from databases of commercial passenger airline travel. Customer purchasing patterns over time can provide invaluable marketing information for a wide variety of applications. For example, retailers can create more effective store displays, and can more effectively control inventory, than otherwise would be possible, if they know that, given a consumer's purchase of a first set of items, the same consumer can be expected, with some degree of probability, to purchase a particular second set of items along with the first set. In other words, it would be helpful from a marketing standpoint to know association rules between item-sets (different products) in a transaction (a customer shopping transaction). To illustrate, it would be helpful for a retailer of automotive parts and supplies to be aware of an association rule expressing the fact that 90% of the consumers who purchase automobile batteries and battery cables also purchase battery post brushes and battery post cleanser. (In the terminology of the data mining field, the latter are referred to as the "consequent.") It will be appreciated that advertisers, too, can benefit from a thorough knowledge of such consumer purchasing tendencies. Still further, catalogue companies can conduct more effective mass mailings if they know the tendencies of consumers to purchase particular sets of items with other sets of items.

It is possible to build large databases of consumer transactions. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. As alluded to above, however, building a transaction database is only part of the marketing challenge. Another important part is the mining of the database for useful information. Such database mining becomes increasingly problematic as the size of databases expands into the gigabyte, and indeed the terabyte, range. Much work, in the data-mining field, has gone to the task of finding patterns of measurable levels of consistency or predictability, in the accumulated data. For instance, where the data documents retail customer purchase transactions, purchasing tendencies, and, hence, particular regimes of data mining can be classified many ways. One type of purchasing tendency has been called an "association rule."

In a conventional data mining system, working on a database of supermarket customer purchase records, there might be an association rule that, to a given percent certainty, a customer buying a first product (say, Brie cheese) will also buy a second product (say, Chardonnay wine). It thus may generally be stated that a conventional association rule states a condition precedent (purchase of the first product) and a condition subsequent or "consequent" (purchase of the second product), and declares that, with, say 80% certainty, if the condition precedent is satisfied, the consequent will be satisfied, also. Methods for mining transaction databases to discover association rules have been disclosed in Agrawal et al., "Mining Association Rules Between Sets of Items in Large Databases", Proc. of the ACM SigMod Conf. on Management of Data, May 1993, pp. 207–216, and in Houtsma et al., "Set-Oriented Mining of Association Rules", IBM Research Report RJ 9567. October, 1993. See also, Agrawal et al., U.S. Pat. Nos. 5,615,341, 5,794,209, 5,742,811, 5,724,573, 5,819,266, 5,842,200, 6,061,682; and 5,812,997 (Morimoto et al.). However, association rules have been limited in scope, in the sense that the conditions precedent and subsequent fall within the same column or field of the database. In the above example, for instance, cheese and wine both fall within the category of supermarket items purchased.

U.S. Pat. No. 5,884,305 (Kleinberg, et al.), expressly incorporated herein by reference, relates to a system and method for extracting highly correlated elements (a "categorical cluster") from a body of data. It is generally understood that the data includes a plurality of records, the records contain elements from among a set of common fields, the elements have respective values, and some of the values are common to different ones of the records. In an initialization step, for each of the elements in the records, an associated value, having an initial value, is assigned. Then, a computation is performed, to update the associated values based on the associated values of other elements. The computation is preferably iteratively to produce the next set of updated values. After the computation is completed, or after all the desired iterations are completed, the final results, i.e., the updated associated values are used to derive a categorical cluster rule. The categorical cluster rule provides the owner of the data with advantageously useful information from the data.

User Modeling

User modeling means to create a model of the user that contains information about the user that is relevant for a particular system. Thus, the user modeling system seeks to define sufficient characteristics of the user to determine the prospective actions or preferences of the user, and employ these characteristics to make predictions. Often, the user modeling system is used interactively with the user, facilitating the use of the system by intelligently predicting the user's inputs.

The scope of the user model may include, for example, characteristics of the user which are independent of content, such as language, reading level, fields of expertise, physical impairments, and the like, as well as content specific characteristics, such as the user's taste and interests for motion picture entertainment, for example as part of a film recommending system, or the user's knowledge of a given academic subject, for an educational or testing system. User preferences may be time dependent, and therefore diurnal or seasonal variations may be important factors in defining an accurate model of the user, i.e., the predicting the intent and/or desires of the user in a respective context.

Different systems use different techniques for constructing and implementing a user model. The simplest and most straightforward is a technique of a user survey, requiring some dedicated activity of the user toward defining the user model. A second technique monitors the activities of the user to detect patterns and actions indicative of user characteristics.

Intelligent agents can be constructed by monitoring or observing the user's actions with the system, and thereby determining characteristics, habits, tendencies or features of the user. This is closely associated with machine learning, which means that the system learns the common actions and preferences of the user. This often requires the user to give the system some initial values about his or her knowledge, goals, experience etc. The initial values, or default values if not explicitly given by the user, are used for building a user model that will be altered when the agent discovers new things about the user.

Another way of creating a user model is through the use of collaborative filtering. In this case, the user provides some initial information as well. For a collaborative filter, the user typically identifies himself or herself with a class of users, wither by predefined or adaptive categories. Thus, the emphasis of information gathering is not on the user's own knowledge or goals, but rather personal data such as age, profession or interests. The system then compares this user to other users and looks for users with similar answers to these questions. A user model is then created based on the profiles of similar users. Thus, collaborative filtering techniques typically require that a broad range of user characteristics be acquired and stored without aggregation, for later analysis and correlation to a given pattern.

The particular profiles are, for example, defined by a logical analysis of the decision space, or defined by an analysis of a population of users, with each profile representing a cluster within the scope of the decision space. In the former case, it is often difficult to make presumptions about the user outside of the particular decision process; in the later case, by identifying a set of individuals within the population with broadly correlated characteristics with the user, it may be possible to infer user characteristics unrelated to the decision process.

Typically, after an explicit process of defining user characteristics, the system evolves into an adaptive mode of operation wherein the profiles are modified or updated to more accurately correspond to the specific user. Further, as the characteristics of the user become more fully available, collaborative filtering may be employed to make better presumptions regarding unknown characteristics of the user. It is also noted that the system preferably does not presume that the user has a consistent set of characteristics, and thus allows for changes over time and cyclic variations. Preferably, these changes or cyclic variations are analyzed and employed to extrapolate a future state.

There are two common ways of representing users' knowledge in an adaptive hypermedia system. The most often used model is the overlay model that divides the hypermedia universe into different subject domains. For each subject domain in the hypermedia universe, the user's knowledge is specified in some way. The user's knowledge of a particular subject domain can be given the value known or unknown, or for instance a fuzzy semantic variable such as good, average or poor. On the other hand, a numeric or continuous metric may be provided. The user's knowledge may also be represented as a value of the probability that the user knows the subject. An overlay model of the user's knowledge can then be represented as a set of concept-value pairs, one pair for each subject. Overlay models were originally developed in the area of intelligent tutoring systems and student modeling, Greer, J. E., & McCalla, G. I. (Eds.): "Student Modeling: The Key to Individualized Knowledge-Based Instruction" NATO ASI Series F Vol. 125 (1993) Berlin: Springer-Verlag, but are also very useful for adaptive hypermedia systems. The main advantage of the overlay model is that users' knowledge on different topics can be measured independently. See, also Gaines, Brian R., and Shaw, Mildred L. G. "Concept Maps as Hypermedia Components", (Internet); Akoulchina, Irina, and Ganascia, Jean-Gabriel, "SATELIT-Agent: An Adaptive Interface Based on Learning Agents Interface Technology", In Anthony Jameson, Cecile Paris and Carlo Tasso (Eds), User Modeling: Proc. Of the Sixth Intl. Conf. UM97, Vienna, N.Y.: Springer Wein, N.Y. (1997): Benaki, Eftihia, Karkaletis, Vangelis A., Spyropoulos, Constantine D, "Integrating User Modeling Into Information Extraction: The UMIE Prototype", In Anthony Jameson, Cecile Paris and Carlo Tasso (Eds), User Modeling: Proc. Of the Sixth Intl. Conf. UM97, Vienna, N.Y.: Springer Wein, N.Y. (1997): Maglio, Paul P., and Barret. Rob, "How To Build Modeling Agents to Support Web Searchers" In Anthony Jameson, Cecile Paris and Carlo Tasso (Eds) User Modeling: Proc. Of the Sixth Intl. Conf. UM97, Vienna, N.Y.: Springer Wein, N.Y. (1997).

The other approach, apart from the overlay model, is the stereotype user model, in which every user is classified as one of a number of stereotypes concerning a particular subject or area. There can be several subareas or subjects, so one user can be classified as a different stereotype for different subjects. For instance, a novice stereotype, an intermediate stereotype and an expert stereotype can be defined for one subject in a system, and every user is therefore classified as one of an expert, novice or intermediate on that particular subject. This scheme is much simpler to implement, but caries the disadvantage of not being able to tailor the appearance of the system to every individual user. Hohl, H., Böcker, H., Gunzenhäuser R.: "Hypadapter: An adaptive hypertext system for exploratory learning and programming", User Modeling and user adapted Interaction 6, 2–3, (1996) 131–156, have shown that overlay modeling and stereotype modeling can be combined in a successful way. The stereotype model is used for new users to quickly create a reasonably good user model. Then the overlay model is used with initial values set by the stereotype model.

The user's preferences are used in adaptive information retrieval systems mostly where they are the only stored data in the user model. Users' preferences are considered special among user modeling components, since they cannot be deducted by the system itself. The user has to inform the system directly, or by giving simple feedback to the system's actions. This suggests that users' preferences are more useful in adaptable systems than in adaptive systems. However, users' preferences can be used by adaptive hypermedia systems as well, as shown by Höök, K., Karlgren, J., Waern, A., Dahlbäck, N., Jansson, C. G., Karlgren, K. and Lemaire, B.: "A glassbox approach to adaptive hypermedia"; User Modeling and User-Adapted Interaction, 6, 2–3, (1996) 157–184. Höök et al. have found that adaptive hypermedia systems can generalize the user's preferences and apply them on new contexts. Preferences are often stored as numeric values in the user profile, contrary to the case for other data, which is often represented symbolically. This makes it possible to combine several users' preferences, in order to formulate group user models. Group models are useful when creating a starting model for a new user, where this user can define his or her preferences, and then a user model is created based on the user models of other users who are in the same "preference group".

U.S. Pat. No. 5,966,533 (Moody), expressly incorporated herein by reference, relates to a method and system for dynamically synthesizing a computer program based on user context data. Thus, according to the present invention, objects that incompletely define the desired functionality, are more completely defined based on personalization data. In accordance with the present invention, this personalization may be performed at the server, before execution in the client, or based on separate data files which define functionality within a generic computing environment, or using a hybrid technique.

U.S. Pat. No. 6,055,573 (Gardenswartz, et al.), expressly incorporated herein by reference, relates to a system and method for communicating with a computer based on an updated purchase behavior classification of a particular consumer, for delivering a targeted advertisement. A first identifier, such as a cookie, corresponding to a first computer is received from the first computer. A targeted advertisement is delivered to the first computer in response to receiving the first identifier from the first computer. The targeted advertisement is based on the observed offline purchase history of a consumer associated with the first identifier. The invention includes the delivery of a promotional incentive for a consumer to comply with a particular behavioral pattern. The behavioral pattern may be a predefined change in purchase behavior or continuance of an established purchase behavior. The targeted advertisements sent to consumers may be changed and/or refined based on changes in consumers' purchase history behaviors.

U.S. Pat. No. 5,819,285 (Damico, et al.), expressly incorporated herein by reference, relates to an apparatus for capturing, storing and processing co-marketing information associated with a user of an on-line computer service using the world-wide-web. An apparatus for capturing and storing a co-marketer identification symbol representing an identity of an entity that has referred a user on a user station to a computer service, wherein the user station is coupled to the computer service by a communications path, is provided. A database is provided for storing a plurality of user records. Each of the user records includes a user identification field for storing information uniquely associating each of the user records with a user, and a co-marketer identification field for storing identity information representing the identity of an entity that directed the user to the computer service. An enrollment means is coupled to the communications path and the database, and is provided for enrolling a user on the computer service. The enrollment means includes means for determining a co-marketer that directed the user to the computer service, and means for assigning a unique user identification number to the user. The enrollment means further includes means for storing a co-marketer identification symbol representative of a co-marketer and the unique user identification number of a user in the co-marketer identification and user identification fields, respectively, of one of the user records.

U.S. Pat. No. 6,012,051 (Sammon, et al.), expressly incorporated herein by reference, relates to a system for processing user profiles to determine product choices likely to be of interest.

U.S. Pat. No. 6,006,218 (Breese, et al.), expressly incorporated herein by reference, relates to a method and apparatus for retrieving, sorting and/or processing information based on an estimate of the user's knowledge or familiarity with an object.

U.S. Pat. No. 6,012,052 (Altschuler, et al.), expressly incorporated herein by reference, relates to a method and apparatus for building resource transition probability models for use in various manners.

U.S. Pat. No. 6,014,638 (Burge, et al.), expressly incorporated herein by reference, relates to a system for customizing computer displays in accordance with user preferences. In accordance with the present invention, the user displays may thus be customized in accordance with a past history of use, including navigational choices, and personal characteristics and preferences.

U.S. Pat. No. 5,991,735 (Gerace, et al.), expressly incorporated herein by reference, relates to a computerized system for determining a user behavioral profile. This profile may be used, for example, to demographically target advertisements.

U.S. Pat. No. 5,978,766 (Luciw), expressly incorporated herein by reference, relates to a system and method for suggesting nodes within a choice space to a user based on explicitly defined and/or observed preferences of the user.

U.S. Pat. No. 5,977,964 (Williams, et al.), expressly incorporated herein by reference, relates to a method and apparatus for automatically configuring a system based on a user's monitored system interaction.

U.S. Pat. No. 5,974,412 (Hazelhurst, et al.), expressly incorporated herein by reference, relates to an intelligent query system for automatically indexing information in a database and automatically categorizing users.

U.S. Pat. No. 5,963,645 (Kigawa, et al.), expressly incorporated herein by reference, relates to a system for receiving and employing personalized broadcast program metadata.

U.S. Pat. No. 5,801,747 (Bedard), expressly incorporated herein by reference, relates to a method and apparatus for monitoring a user's content consumption, to infer user preferences therefrom.

U.S. Pat. No. 5,758,259 (Lawler), expressly incorporated herein by reference, also relates to a user preference profile determination system which monitors user activity.

U.S. Pat. No. 5,945,988 (Williams, et al.), expressly incorporated herein by reference, further relates to a similar system for dynamically updating inferred user preferences based on user activity.

U.S. Pat. No. 6,005,597 (Barrett, et al.), expressly incorporated herein by reference, relates to a system and method for monitoring user content consumption and creating a dynamic profile based thereon, which is then used to sort future available content.

U.S. Pat. No. 5,973,683 (Cragun, et al.), expressly incorporated herein by reference, relates to a system for the dynamic regulation of television viewing content based on viewer profile and viewer history.

U.S. Pat. No. 5,946,490 (Lieberherr, et al.), expressly incorporated herein by reference, relates to an automata-theroretic approach compiler for adaptive software. Such a compiler could be used, for example, to produce customized applets for users representing a set of search results, or incorporating user profile data.

U.S. Pat. No. 5,446,919 (Wilkins), expressly incorporated herein by reference, relates to a communication system and method with demographically or psychographically defined audiences.

U.S. Pat. No. 4,970,681 (Bennett), expressly incorporated herein by reference, relates to a method and apparatus for furnishing the identification of potential customers that may be interested in a specific product in response to a search request. A first database contains information on, for instance, books and serials in print, in which each individual book or serial is classified. Individuals requesting information regarding specific books or serials identify themselves, along with their product interests. A second database is built up on the first enquirers, including their identification and product interests. The second database enables book publishers to determine the identification of potential customers and of their specific product interests.

U.S. Pat. No. 5,710,887 (Chelliah, et al.), expressly incorporated herein by reference, relates to a system for facilitating commercial transactions, between a plurality of customers and at least one supplier of items over a computer driven network capable of providing communications between the supplier and at least one customer site associated with each customer. Each site includes an associated display and an input device through which the customer can input information into the system. At least one supplier is presented on the display for selection by the customer using the input device. Similarly items from a supplier can be displayed for the customer to observe. Associated with a supplier of such items is an item database including information on presented items. Pricing subsystem receives information from the item database to determine the cost associated with a presented item. In addition a customer information database stores information relating to the customer. Associated with each customer is a customer monitoring object for each customer. The customer monitoring object is created by referencing information, relating to that customer; which-had been stored in the customer information database and when the customer selects a supplier. The customer monitoring object is configured to operate by responding to customer enquiries regarding a presented item by retrieving information relating to the item and presenting the information to the customer; receiving a customer's selection of a presented item; receiving customer communications, indicating a desire to receive the item; and passing a communication to initiate the delivery of the item to the customer.

U.S. Pat. No. 5,438,355 (Palmer), expressly incorporated herein by reference, relates to an interactive system for processing viewer responses to television programming, which includes a central exchange and a plurality of consoles variously located at residences of viewers of TV programming. Each console includes a code reader capable of reading program codes, which are broadcasted with the TV signals of programs as unique identifiers thereof. A viewer, upon seeing a TV program of interest, actuates a button, and the console transmits to the central exchange an uniquely identifying console code together with the program code currently being read by the code reader. The central exchange then initiates a facsimile transmission or a datafile transmission of program data, retrieved from a database and associated with the received program code, to the console identified by the received console code.

U.S. Pat. No. 5,895,454 (Harrington), expressly incorporated herein by reference, relates to an integrated interface for vendor/product oriented Internet websites. A method of effecting commerce in a networked computer environment in a computerized system is disclosed. A database of vendor product data and an associated database interface is established on a first computer. The interface allows remote access by one or more user(s). A local user interacts with the database by querying the database to specify a local users product/service specification. The database provides the local user with a selection of remote vendor network sites, where the selection is determined on the basis of the user querying the database. After the local user interactively connects with one or more of the remote vendor network sites, the user selects products/services from the information provided on the remote vendor network site. The selection of a particular product/service triggers a transaction notification which records the users selection and associated financial transaction data which is transmitted to the database and associated database interface. The local user may connect to subsequent remote vendor network sites, and each selection of a product/service also triggers a transaction notification which is transmitted to the database. The database and associated database interface provides information relating to the users realtime selection of products/services. During or at the conclusion of a local users shopping session, the user confirms the selection(s) whereby the database and associated database interface transmits purchase/ordering data to the remote vendor sites corresponding to the users selection.

See, also:

Boyle C. and Encarnacion A. O.: "MetaDoc: an adaptive hypertext reading system"; User modeling and User-Adapted Interaction, 4 (1994) 1–21.

Brusilovsky, P., Eklund, J.: "A study of user model based link annotation in educational hypermedia"; Journal of Universal Computer Science, Vol. 4 No 4 (1998) 429–448.

Chin, D.: "User Modeling in UC: the Unix Consultant"; Proceedings of the CHI-86 Conference, Boston (1986)

Moore, J. D. & Swartout, W. R.: "Pointing: A way toward explanation dialogue"; Eight National Conference on Artificial Intelligence, (1989) 457–464.

[AVANTI homepage] http://zeus.gmd.de/projects/avanti.html

Fink, J., Kobsa, A., Schreck, J.: "Personalized hypermedia information provision through adaptive and adaptable system features: User modeling, privacy and security issues".

http://zeus.gmd.de/UM97/Fink/Fink.html

Eftihia Benaki, Vangelis A. Karkaletsis, Constantine D. Spyropoulos, "Adaptive Systems and User Modeling on the World Wide Web", Proceedings of the workshop, Sixth International Conference on User Modeling, Chia Laguna, Sardinia, 2–5 Jun. 1997 Brajnik, G., Guida, G., Tasso, C., (1990): User modeling in Expert Man-Machine Interfaces: A case study in Intelligent Information Retrieval, in IEEE Transactions on systems, man, and cybernetics, 20:166–185.

Brajnik Giorgio and Carlo Tasso, (1994): A shell for developing non-monotonic user modeling systems in International Journal of Human Computer Studies, 40:31–62.

Croft, B. and Thompson, R., (1986): An overview of the IR Document Retrieval System, in Proceedings of the 2nd Conference on Computer Interfaces and Interaction for Information Retrieval.

Karkaletsis, E., Benaki, E., Spyropoulos, C., Collier, R., (1996): D-1.3.1: Defining User Profiles and Domain Knowledge Format, ECRAN.

Kay, J., (1995): The um toolkit for Cooperative User Modeling, in User Modeling and User-Adapted Interaction, 4:146–196.

Jon Orwant, (1993): Doppelganger Goes to School: Machine Learning for User Modeling, M.Sc. thesis at MIT.

J. Orwant, "For want of a bit the user was lost: Cheap user modeling", MIT Media Lab, Vol. 35, No. 3&4 (1996).

Rich, E., (1983): "Users are individuals: individualising user models". International Journal of Man-Machine Studies, 18:199–214

Collaborative Filtering

Collaborative filtering is a process that seeks to determine common habits for a group of individuals having a common characteristic. The information is commercially valuable, for example, because knowing what a consumer has purchased, it is possible to statistically predict what else he or she might buy, and to suggest such a purchase to the consumer. This collaborative filtering is preferably used in conjunction with a past history of the user himself, providing a powerful tool for predicting consumer behavior and preferences.

Collaborative filters presume characteristics of the user based on a class identification of the user. A collaborative filter may be adaptive, meaning that it is updated based on actions subsequent to the classification of the user relating to the success or quality of the classification.

Collaborative filtering is often used in systems that continuously present new things to their users such as film recommending systems and personally adapted news. If the user does not like one suggestion from the system, he or she tells the system that this material is not interesting and the user profile is updated. Typically, the weight afforded to adaptive features is low, and indeed the feedback from one user is just one input to the system, and thus will typically not cause a major change in the user profile, since most of it still is valid. Systems that adapt the user interface to different users' needs often need to give the user more control over the adaptation process. It is much more difficult to predict the user's preferences correctly in these systems since they may vary with time.

Collaborative filters and user profiles necessarily require that personal user information be employed. This personal information may include private user information, such as demographics, preferences, past purchase history, media consumption habits, and the like, or confidential information including trade secrets, or information otherwise not intended for publication. The unrestricted release and distribution of this private user information, or the risk of dissemination, is typically undesirable, from the user's viewpoint. In the case of collaborative filtering systems, this information must be stored centrally, thereby creating a risk of breach. In the case of adaptive personal profile systems, client-side filtering may be employed; however, this necessarily entails transmission of a greater amount of information to the user than is presented to the user. Client-side filtering requires that all information be transferred to the client system, prior to filtering, which is often expensive or untenable. In general, any time valuable personal profile information exists, even in when physically in a client system, a risk of misuse or misappropriation exists.

The release and distribution of private user information, such as demographics, preferences, past purchase history, media consumption habits, and the like, typically is avoided, and may be limited by law or contract. Therefore, one option available for filtering or processing information based on this information is at the client system, where the private information need not be released or distributed. For example, see Metabyte Inc., www.mbtv.com, PCT/99/65237, expressly incorporated herein by reference, which disclose systems for determining user preference profiles for television programs, implementing a client-side filter. However, this requires that all (unfiltered) information be transferred to the client system, for subsequent filtering, which is often expensive or untenable. Further, this requires computational resources at the client for filtering the content. However, in various circumstances, such techniques may be employed.

Marketing Research

U.S. Pat. Nos. 4,546,382 and 4,658,290 (McKenna, et al.), expressly incorporated herein by reference, relate to a television and market research data collection system and method. A data gathering system includes a plurality of remote units which are controlled from a central location. Each of the remote units is attached to a television receiver that is generally but not necessarily attached to a cable system. Each of the remote units functions to determine which of several TV modes is in use as well as to store TV channel selector data and data from an optical input device. All this data is stored for later transmission by each of the remote units to a central data collecting point. A video message for a TV viewer, such as a survey, may be transmitted from the central location and stored at the remote units, for later display on the TV receiver associated with the remote units. Substitution of alternate programming information may also be achieved by the central control point on selected of the remote units.

U.S. Pat. No. 4,630,108 (Gomersall), expressly incorporated herein by reference, relates to a preprogrammed over-the-air marketing research system, which includes transmission facilities for delivering a regularly scheduled television signal and a low power, microwave transmitter or satellite transponder for delivering a special over-the-air television signal, including substitute programming, to cooperating households. Each household has an antenna for receiving the special television signal, a down converter and a television control unit that includes a small household stored program computer. The computer receives in advance and stores a substitute programming schedule and other instructions for a broadcast period from a command and control computer, records the "on-off" condition of the television receiver and the channel being watched, and controls the condition of a three-way switch that enables members of a particular household to view the normal television signal or substitute programming from the special television signal or text or music from the household computer in accordance with the stored schedule. In this manner, the command and control computer establishes test panels consisting of one or more cooperating households in advance by instructions transmitted to each household computer by the command and control computer. Responses of cooperating households to marketing research tests may be obtained from automatic household purchasing response apparatus installed in each cooperating household or from cooperating retail stores and are transmitted to the command and control computer for analysis.

U.S. Pat. No. 4,646,145 (Percy), expressly incorporated herein by reference, relates to a television viewer reaction determining system, which generates distinct signals indicative of different viewer reactions to television programs. These systems generate a further signal identifying any of the mentioned distinct signals as indicative of a viewer reaction to an unspecified person appearing in any video program. The mentioned distinct and further signals are gathered, and the unspecified person is identified from such gathered signals. The gathering of the mentioned signals is preferably effected in real time within a tolerance corresponding to an average rate of change of persons appearing in the video programs.

Consumer Incentives

Frequency programs have been developed by the travel industry to promote customer loyalty. An example of such a program is a "frequent flyer" program. According to such a program, when a traveler books a flight, a certain amount of "mileage points" is calculated by a formula using the distance of the destination as a parameter. However, the mileage points are not awarded until the traveler actually takes the flight. When a traveler has accumulated a sufficient number of mileage points, he may redeem these points for an award chosen from a specific list of awards specified by the program. Thus, for example, the traveler may redeem the points for a free flight ticket or a free rental car. In order to redeem the accumulated points, the traveler generally needs to request a certificate, and use the issued certificate as payment for the free travel. While the above program may induce customer loyalty, it has the disadvantage that the selection of prizes can be made only from the limited list of awards provided by the company. For example, a traveler may redeem the certificate for flights between only those destinations to which the carrier has a regular service. Another disadvantage is that the customer generally needs to plan ahead in sufficient time to order and receive the award certificate.

According to another type of frequency and award program, a credit instrument is provided and credit points are accumulated instead of the mileage points. In such programs, bonus points are awarded by using a formula in which the price paid for merchandise is a parameter. Thus, upon each purchase a certain number of bonus points are awarded, which translate to dollar credit amount. According to these programs, the customer receives a credit instrument that may be acceptable by many enrolled retailers, so that the selection of prizes available is enhanced. An example of such a program is disclosed in E.P.A. 308,224. However, while such programs may enhance the selection of prizes, there is still the problem of obtaining the credit instrument for redeeming the awarded points. In addition, the enrollee must allow for processing time before the bonus points are recorded and made available as redeemable credit. Thus, the immediacy effect of the reward is lacking in these conventional incentive programs.

U.S. Pat. No. 5,774,870 (Storey), expressly incorporated herein by reference, provides an on-line access to product information, product purchases using an on-line electronic order form, award catalogs, and award redemption using an on-line electronic redemption form. Bonus points are awarded immediately upon purchase of the merchandise, and are immediately made available for redemption.

These reward programs have the direct consequence that the user has an incentive to uniquely identify himself in order to be able to collect the reward after a number of uses, and to use the services associated with the reward program in distinction to similar services provided by others. Therefore, by providing a reward program, the value of personalization is increased for the user, thereby incentivizing the user to comply with the acquisition of personal information by the system.

U.S. Pat. No. 6,014,634 (Scroggie, et al.), expressly incorporated herein by reference, relates to a system and method for delivering purchasing incentives and the like to a user, especially using a cookie and associated personal web page.

U.S. Pat. No. 4,799,156 (Shavit), expressly incorporated herein by reference, relates to an interactive market management system for interactive on-line electronic communications and processing of business transactions between a plurality of different types of independent users including at least a plurality of sellers, and a plurality of buyers, as well as financial institutions, and freight service providers. Each user can communicate with the system from remote terminals adapted to access communication links and the system may include remote terminals adapted for storage of a remote database. The system includes a database that contains user information. The database is accessed via a validation procedure to permit business transactions in an interactive on-line mode between users during interactive business transaction sessions wherein one party to the transaction is specifically selected by the other party. The system permits concurrent interactive business transaction sessions between different users.

U.S. Pat. No. 5,227,874 (Von Kohorn), expressly incorporated herein by reference, relates to a method for measuring the effectiveness of stimuli, such as broadcast commercials intended to promote purchases by shoppers. The methods quantify the effectiveness of controlled variables of stimuli and of inducements associated therewith. The immediate impact and degree of erosion of the impact of stimuli on families and on individual household members are measured. Inducements can take the form of printouts, such as monetary coupons, dispensed in homes of broadcast audience members who have responded to a task. The system and method for evaluating responses to broadcast or telephone programs, such as television programs, includes an instructional signal, such as a signal modulated onto a signal transmitted concurrently with the television program, or time-multiplexed therewith. At each of a plurality of remote receiving stations, one or more members of an audience has the opportunity to respond to a situation presented in the program by entering a response or a selection on a keyboard. The system includes at each remote receiving station a memory responsive to the instructional signal for storing acceptable responses, and a comparison circuit for comparing responses entered at the keyboard with those stored in the memory. Also provided is electronic circuitry for scoring the responses in accordance with commands from the instructional signal, and a recording device for providing a permanent record. A prize-winning respondent can select a product from a listing and apply the value of a prize to the purchase price of the selected product.

U.S. Pat. No. 5,502,636 (Clarke), expressly incorporated herein by reference, relates to a personalized coupon generating and processing system which includes a coupon dispensing source that communicates with responsive consumers through a communications interface. The availability of preselected coupons is communicated to the consumers by an availability communications means, and consumer responses are communicated to the coupon-dispensing source by consumer response means. Consumer requested coupons are personalized and distributed to the responsive consumers. Redemption of the coupons is communicated to the coupon-dispensing source by redemption data means.

U.S. Pat. No. 5,287,181 (Holman), expressly incorporated herein by reference, relates to relates to an electronic redeemable coupon system and television. The coupon generating system includes: an encoder for encoding coupon-related data in a television signal transmission, the transmission including picture information for display on a television monitor screen; a decoder for receiving the television signal transmission and extracting the coupon-related data therefrom; and a recording device for recording the extracted coupon-related data on a recording medium for subsequent readout and redemption. In a preferred embodiment of the invention, the decoder includes a display driver for displaying indicia on a television monitor screen responsive to coupon-related data being encoded in the television signal transmission. Upon observing the indicia on the television monitor screen, the user can manually and selectively extract the coupon-related data from the television signal transmission. After an optional editing function, the extracted coupon-related data is stored on a recording medium such as a magnetically striped card. The decoder may be part of the standard circuitry of a closed-caption adapted or modified television set. Provisions are made for electronically entering paper coupon information into the system.

U.S. Pat. No. 5,983,196 (Wendkos), expressly incorporated herein by reference, relates to an interactive computerized methods and apparatus for conducting an incentive awards program. A participant in the awards system calls or connects to an interactive platform for registering and/or redeeming credits preferably described in uniquely identified certificates. In a telephone environment, the interactive platform is connected to a toll free telephone number where a participant's call is handled by a computer controlled voice response unit. In a computer network environment, a computer user connects to the interactive platform over the network. The participant receives awards credits based on the unique identification of certificates. Award credits for a participant are accumulated in a stored record associated with the participant until redeemed. Award credits can also be acquired as an instant winner based on a random or algorithmic selection of callers to receive such credits. Awards include electronic prizes such as free long distance telephone time, electronic cash and/or service credits. Connection to the interactive platform may occur during execution of an application program such as an electronic game or electronic shopping.

Videoconferencing Technologies

Videoconferencing systems are well known in the art. A number of international standards have been defined, providing various telecommunication bandwidth and communication link options. For example, H.320, H.323 and H.324 are known transport protocols over ISDN, packet switched networks and public switched telephone networks, respectively. H.324 provides a multimedia information communication and videoconferencing standard for communication over the standard "plain old telephone system" network ("POTS"), in which the video signal is compressed using DCT transforms and motion compensation for transmission over a v.80 synchronous v.34-type modem link. The video image is provided as a video window with relatively slow frame rate. This image, in turn, may be presented on a computer monitor or television system, with appropriate signal conversion. See, Andrew W. Davis, "Hi Grandma!: Is It Time for TV Set POTS Videoconferencing?", *Advanced Imaging*, pp. 45–49 (March 1997); Jeff Child, "H.324 Paves Road For Mainstream Video Telephony", *Computer Design*, January 1997, pp. 107–110. A newly proposed set of extensions to H.324, called H.324/M, provides compatibility with mobile or impaired telecommunications systems, and accommodates errors and distortions in transmissions, reduced or variable transmission rates and other anomalies of known available mobile telecommunications systems, such as Cellular, GSM, and PCS.

Four common standards are employed, which are necessary for videoconferencing stations to communicate with each other under common standards. The first is called h.320, and encompasses relatively high bandwidth systems, in increments of 64 kbits/sec digital communication with a synchronous communication protocol. Generally, these systems communicate with 128 kbits/sec, 256 kbits/sec or 384 kbits/sec, over a number of "bonded" ISDN B-channels. The second standard h.324, employs a standard POTS communication link with a v.80/v.34bis modem, communicating at 33.6 kbits/sec synchronous. The third standard, is the newly established H.321 standard, which provides for videoconferencing over a packet switched network, such as Ethernet, using IPX or TCP/IP. Finally, there are so-called Internet videophone systems, such as Intel Proshare. See, Andrew W. Davis, "The Video Answering Machine: Intel ProShare's Next Step", *Advanced Imaging*, pp. 28–30 (March 1997).

In known standards-based videoconferencing systems, the image is generally compressed using a discrete cosine transform, which operates in the spatial frequency domain. In this domain, visually unimportant information, such as low frequencies and high frequency noise are eliminated, leaving visually important information. Further, because much of the information in a videoconference image is repeated in sequential frames, with possible movement, this redundant information is transmitted infrequently and filtered from the transmitted image stream, and described with motion vector information. This motion vector information encodes objects which are fixed or move somewhat between frames. Such known techniques include H.261, with integer pixel motion estimation, and H.263, which provides ½ pixel motion estimation. Other techniques for video compression are known or have been proposed, such as H.263+, and MPEG-4 encoding. Many standard videoconferencing protocols require the initial transmission of a full frame image, in order to set both transmitting and receiving stations to the same encoding state. The digital data describing this image is typically Huffman encoded for transmission. Multiple frames may be combined and coded as a unit, for example as so-called PB frames. Other techniques are also known for reducing image data transmission bandwidth for various applications, including video conferencing.

Each remote videoconference terminal has an interface system, which receives the digital data, and separates the video information (H.261, H.263), audio information (G.711, G.723, G.723.1), data protocol information (HDLC, V.14, LAPM, etc.) and control information (H.245, H.221/H.223) into discrete streams, which are processed separately. Likewise, each terminal interface system also assembles the audio information, video information, data protocols and control data for transmission. The control information consists of various types of information; the standard control protocol which addresses the data format, error correction, exception handling, and other types of control; and the multipoint control information, such as which remote videoconference terminal(s) to receive audio information from, selective audio muting, and such. Generally, the standard, low level control information is processed locally, at the codec interface system, and filtered from the remainder of the multipoint control system, with only the extracted content information made available to the other stations.

The ITU has developed a set of multipoint videoconferencing standards or recommendations, T.120-T.133, T.RES series, H.231, H.243, etc. These define control schemes for multiple party video conferences. Typically, these protocols are implemented in systems that either identically replicate the source image data stream from one source to a plurality of destinations, or completely decode and reencode the image in a different format in a "transcoder" arrangement, to accommodate incompatible conference stations. The ITU standards also allow optional data fields which may be used to communicate digital information essentially outside the videoconference scheme, and provide data conferencing capabilities, which allow videoconferencing and data conferencing to proceed simultaneously. See, ITU T.120–T.127, T.130–T.133, T.RES, T.Share and T.TUD recommendations, expressly incorporated herein by reference.

There are a number of known techniques for transmitting and displaying alphanumeric data on a television, the most common of which are teletext, used primarily in Europe, and closed caption, which is mandated in television sets larger than 13 inches by the Television Decoder Circuitry Act of 1990, and Section 305 of the Telecommunications Act of 1996, and Federal Communication Commission (FCC) regulations. The American closed caption standard is EIA 608. The later is of particular interest because many current generation televisions, especially larger sizes, include a closed caption decoder, and thus require no external hardware or connections, separate from the hardware and cabling for supplying the video signal. See, TCC Tech Facts, Vols. 1–4, (www.wgbh.org, rev. September 1995) expressly incorporated herein by reference. The closed caption signal is distributed on Line 21 of the vertical blanking interval (VBI). The existing standard supports 480 bits/sec, with a potential increase to 9600 bits/sec in the forthcoming ATSC standard.

Electronic Program Guide (EPG) information and advertising information is presently being transmitted during the VBI in the U.S. by NBC affiliates, using the Gemstar system. Proposals exist for distributing such information using a 900 MHz paging network to wireless receivers associated with television viewing apparatus, and further to provide bi-directional capabilities and electronic commerce integration.

Known systems provide a videoconferencing system which resides in a "set top box", i.e. a stand-alone hardware device suitable for situation on top of a television set, providing all of the necessary functionality of a videoconferencing system employing the television as the display and possibly audio speaker functions. These systems, however, do not integrate the television functions, nor provide interaction between the video and videoconferencing systems. C-Phone Inc., Wilmington N.C., provides a C-Phone Home product line which provides extensions to H.324 and/or H.320 communications in a set-top box.

Other known videophone and videoconferencing devices are disclosed, e.g., in U.S. Pat. Nos. 5,600,646; 5,565.910; 5,564,001; 5,555,443; 5,553,609; 5,548,322; 5,542,102; 5,537,472; 5,526,405; 5,509,009; 5,500,671; 5,490,208; 5,438,357; 5,404,579; 5,374,952; 5,224,151; 4,543,665; 4,491,694; 4,465,902; 4,456,925; 4,427,847; 4,414.432; 4,377,729; 4,356,509; 4,349,701; 4,338,492; 4,008,376 and 3,984,638 each of which is expressly incorporated herein by reference.

Known Web/TV devices (from Sony/Magnavox/Philips) allow use of a television to display alphanumeric data, as well as audiovisual data, but formats this data for display outside the television. In addition, embedded Web servers are also known. See, Richard A. Quinell, "Web Servers in embedded systems enhance user interaction", EDN. Apr. 10, 1997, pp. 61–68, incorporated herein by reference. Likewise, combined analog and digital data transmission schemes are also known. See. U.S. Pat. No. 5,404,579.

A class of computing devices, representing a convergence of personal computers and entertainment devices, and which provide network access to the Internet (a publicly available network operating over TCP/IP). ITU standards for communications systems allow the selective addition of data, according to T.120–T.133, T.RES series of protocols, as well as HDLC, V.14, LAPM, to the videoconference stream, especially where excess bandwidth is available for upload or download.

A system may be provided with features enabling it to control a so-called smart house and/or to be a part of a security and/or monitoring system, with imaging capability. These functions are provided as follows. As discussed above, various data streams may be integrated with a videoconference data stream over the same physical link. Therefore, external inputs and outputs may be provided to the videophone or videoconference terminal, which maybe processed locally and/or transmitted over the telecommunications link. The local device, in this case, is provided with a continuous connection or an autodial function, to create a communications link as necessary. Therefore, heating ventilation and air conditioning control (HVAC), lighting, appliances, machinery, valves, security sensors, locks, gates, access points, etc., may all be controlled locally or remotely through interfaces of the local system, which may include logic level signals, relays, serial ports, computer networks, fiber optic interfaces, infrared beams, radio frequency signals, transmissions through power lines, standard-type computer network communications (twisted pair, coaxial cable, fiber optic cable), acoustic transmissions and other known techniques. Likewise, inputs from various devices and sensors, such as light or optical, temperature, humidity, moisture, pressure, fluid level, security devices, radio frequency, acoustic, may be received and processed locally or remotely. A video and audio signal transmission may also be combined with the data signals, allowing enhanced remote monitoring and control possibilities. This information, when transmitted through the telecommunication link, may be directed to another remote terminal, for example a monitoring service or person seeking to monitor his own home, or intercepted and processed at a central control unit or another device. Remote events may be monitored, for example, on a closed caption display mode of a television attached to a videophone.

While the preferred embodiments of the invention adhere to established standards, the present invention also encompasses communications that deviate from or extend beyond such standards, and thus may engage in proprietary communications protocols, between compatible units.

Rights-based Access to Database Records

U.S. Pat. No. 5,987,440 (O'Neil, et al., Nov. 16, 1999), expressly incorporated herein by reference, relates to a personal information security and exchange tool. Utilization of the E-Metro Community and Personal Information Agents assure an effective and comprehensive agent-rule based command and control of informational assets in a networked computer environment. The concerns of informational privacy and informational self-determination are addressed squarely by affording persons and entities a trusted means to author, secure, search, process, and exchange personal and/or confidential information in a networked computer environment. The formation of trusted electronic communities wherein members command and control their digital persona, exchanging or brokering for value the trusted utility of their informational assets is made possible. The system provides for the trusted utilization of personal data in electronic markets, providing both communities and individuals aggregate and individual rule-based control of the processing of their personal data.

U.S. Pat. No. 6,029,160 (Cabrera, et al., Feb. 22, 2000), expressly incorporated herein by reference, relates to a system and method for linking a database system with a system for filing data. Extensions to a database system provide linkage between data in the database system and files in a system for filing data that is external to the database system ("the filing system"). The linkage includes an external file reference (efr) data type, which is defined in the database system for reference to files that are stored in the filing system. When entries are made in the database system that include efr data-type references to files in the filing system, control information is provided by the database system to the filing system. The control information causes the filing system to control processing of referenced files according to referential constraints established in the database system.

U.S. Pat. No. 6,038,563 (Bapat, et al., Mar. 14, 2000), expressly incorporated herein by reference, relates to a system and method for restricting database access to managed object information using a permissions table that specifies access rights corresponding to user access rights to the managed objects. An access control database has access control objects that collectively store information that specifies access rights by users to specified sets of the managed objects. The specified access rights include access rights to obtain management information from the network. An access control server provides users access to the managed objects in accordance with the access rights specified by the access control database. An information transfer mechanism sends management information from the network to a database management system (DBMS) for storage in a set of database tables. Each database table stores management information for a corresponding class of managed objects. An access control procedure limits access to the management information stored in the database tables using at least one permissions table. A permissions table defines a subset of rows in the database tables that are accessible to at least one of the users. The set of database table rows that are accessible corresponds to the managed object access rights specified by the access control database. A user access request to access management information in the database is intercepted, and the access control procedure is invoked when the user access request is a select statement. The database access engine accesses information in the set of database tables using the permissions tables such that each user is allowed access only to management information in the set of database tables that the user would be allowed by the access control database to access.

U.S. Pat. No. 6,041,411 (Wyatt, Mar. 21, 2000), expressly incorporated herein by reference, relates to a method for defining and verifying user access rights to computer information. A method is provided for minimizing the potential for unauthorized use of digital information, particularly software programs, digital content and other computer information, by verifying user access rights to electronically transmitted digital information. A second computer system transmits requested digital information to a requesting first computing system in wrapped form, which includes digital instructions that must be successfully executed, or unwrapped, before access to the digital information is allowed. Successful unwrapping requires that certain conditions must be verified in accordance with the digital instructions, thereby allowing access to the digital information. In one embodiment, verification includes locking the digital information to the requesting computer system by comparing a generated digital fingerprint associated with the digital information to a digital fingerprint previously generated which is unique to the requesting computer system.

U.S. Pat. No. 6,044,401 (Harvey, Mar. 28, 2000), expressly incorporated herein by reference, relates to a network sniffer for monitoring and reporting network information that is not privileged beyond a user's privilege level. Nodes in the network include a network sniffer and an access sniffer. The access sniffer includes an access element and an access interface. The access element preferably includes a memory and a database. The access element accesses the network sniffer and filters out unavailable information by using information such as address and port numbers gathered by the network sniffer. Unavailable information includes information which is non-public or beyond the privilege level of the particular user. The access element evaluates data streams that are public information to determine if the data streams meet a predetermined criterion. If the data streams meet the predetermined criteria, then the data is saved in the database. The access element transfers only the information available to the particular user to the access interface. The access element can time itself for a limited amount of time for execution. Once the predetermined time period has expired, the access element is complete and it can save and transfer the appropriate information to the access interface.

U.S. Pat. No. 6,052,688 (Thorsen, Apr. 18, 2000), expressly incorporated herein by reference, relates to a computer-implemented control of access to atomic data items. The method comprises the steps of initiating and maintaining data access nodes in a variable access structure. Each access node is provided with references to other access nodes and/or to data items representing an object, each data item carrying only the amount of information that is relevant for its purpose. The data items or the references are provided with a time parameter thus enabling version control and the possibility to handle static or slowly changing data and frequently changed and updated data in a corresponding manner. The access nodes comprise access control parameters for access control from a safety point of view as well as for enabling different views of the access structure and underlying data and objects.

U.S. Pat. No. 6,073,106 (Rozen, et al., Jun. 6, 2000), expressly incorporated herein by reference, relates to a method of managing and controlling access to personal information. A participant is prompted to provide a constant identifier and a selected password via Internet communications or via phone/fax/mail. Emergency and confidential categories of medical information are identified, and the participant is prompted to provide personal information in each of the categories and a different personal identification number (E-PIN, C-PIN) for each category. The participant is also prompted to provide an instruction to disclose or to not disclose the personal information in the emergency category in the event a requester of the information is an emergency medical facility and is unable to provide the participant's E-PIN. Alteration of any of the participant's medical information is enabled upon presentation of the participant's identifier and password by the requester. The emergency information or the confidential information is disclosed upon presentation of the participant's identifier and E-PIN or C-PIN. In addition, the emergency information is disclosed to an emergency medical facility verified as such by a service provider in the event the participant has provided an instruction to disclose the emergency information. Storage and access to health related documents such as healthcare power of attorney, consent for treatment, and eyeglass prescription is also provided.

U.S. Pat. No. 6,073,234 (Kigo, et al., Jun. 6, 2000), expressly incorporated herein by reference, relates to a device and method for authenticating user's access rights to resources. Both of a user side and a protect side such as a programmer of an application programmer need not handle a large number of inherent information such as authentication keys. An access ticket generation device generates an access ticket from user unique identifying information and access rights authentication feature information. As unique security characteristic information, there is used a secret key of an elliptic curve encryption or an ElGamal encryption. A proof data generation device receives the access ticket, converts authentication data received from a proof data verification device into proof data by use of the access ticket and the user unique identifying information, and returns the resultant proof data to the proof data verification device. The proof data generation device or the proof data verification device decrypts the above-mentioned encryption. The proof data verification device verifies the access rights as correct only when a combination of an access ticket and user unique identifying information used in the proof data generation device is correct.

Secure Networks

U.S. Pat. No. 5,933,498 (Schneck, et al., Aug. 3, 1999), expressly incorporated herein by reference, relates to a system for controlling access and distribution of digital property represented as data. Portions of the data are protected and rules concerning access rights to the data are determined. Access to the protected portions of the data is prevented, other than in a non-useable form; and users are provided access to the data only in accordance with the rules as enforced by a mechanism protected by tamper detection. A method is also provided for distributing data for subsequent controlled use of those data. The method includes protecting portions of the data; preventing access to the protected portions of the data other than in a non-useable form; determining rules concerning access rights to the data; protecting the rules; and providing a package including: the protected portions of the data and the protected rules. A user is provided controlled access to the distributed data only in accordance with the rules as enforced by a mechanism protected by tamper protection. A device is provided for controlling access to data having protected data portions and rules concerning access rights to the data. The device includes means for storing the rules; and means for accessing the protected data portions only in accordance with the rules, whereby user access to the protected data portions is permitted only if the rules indicate that the user is allowed to access the portions of the data.

U.S. Pat. No. 5,978,918 (Scholnick, et al., Nov. 2, 1999), expressly incorporated herein by reference, relates to a practical method and system for supplementing or replacing current security protocols used on public networks involving the distribution of a proprietary system for use on a public network access provider's network. The proprietary system includes processing hardware and proprietary software. The proprietary system transmits private data, outside the Internet, over proprietary lines to a back-end process. When a "sender" sends private data it is sent over the proprietary system to a back-end process. The back-end process returns a time sensitive token that the "sender" sends to the "receiver". The "receiver" takes the time sensitive token and uses it to either retrieve the private data, over a proprietary system, or initiate a transaction with a financial institution. Encryption is used to allow authentication of the participants. This method can be used in conjunction with Secure Socket Layer (SSL) encryption and/or the Secure Electronic Transaction (SET) protocol.

U.S. Pat. No. 6,005,943 (Cohen, et al., December 21, 1999), expressly incorporated herein by reference, relates to electronic identifiers for network terminal devices. The generation of electronic identifiers for network interface units connected to a data network for use in detecting unauthorized decryption of encrypted data transmitted over the data network. A random number is generated for use as a private key decryption code and is stored in memory in each network interface unit. A public key is calculated from the stored private key using a non-invertible mathematical formula. If the calculated public key is unique, then a portion of the public key (e.g. a subset of its bits) is stored in a data provider database as an electronic identifier for use in detecting unauthorized decryption of data by the interface unit.

U.S. Pat. No. 6,009,526 (Choi, December 28, 1999), expressly incorporated herein by reference, relates to an information security system for tracing information outflow from a remotely accessible computer or computer network. The system includes an internal communication system that has at least one internal computer for transmitting security information by tracing data through communication equipment, outputting the data to an external output means, and connecting the internal computer to an external network. A communication monitoring device stores information regarding the data that is to be transmitted by applying a security policy according to a security grade assigned to the destination to which the data is to be transmitted. The communication-monitoring device is configured for extracting the identification of the destination from the transmitted data. It also includes a communication-monitoring server for storing and displaying predetermined information about the data to be transmitted and for determining whether the tracing information is stored according to the security grade for the identified destination. A method of operating the disclosed system is also described.

U.S. Pat. No. 6,021,202 (Anderson, et al., Feb. 1, 2000), expressly incorporated herein by reference, relates to a method and system for processing electronic documents, which includes a markup language according to the SGML standard in which document type definitions are created under which electronic documents are divided into blocks that are associated with logical fields that are specific to the type of block. Each of many different types of electronic documents can have a record mapping to a particular environment, such as a legacy environment of a banking network, a hospital's computer environment for electronic record keeping, a lending institution's computer environment for processing loan applications, or a court or arbitrator's computer system. Semantic document type definitions for various electronic document types (including, for example, electronic checks, mortgage applications, medical records, prescriptions, contracts, and the like) can be formed using mapping techniques between the logical content of the document and the block that is defined to include such content. Also, the various document types are preferably defined to satisfy existing customs, protocols and legal rules.

U.S. Pat. No. 6,021,491 (Renaud, Feb. 1, 2000), expressly incorporated herein by reference, relates to digital signatures for data streams and data archives. Methods, apparatuses and products are provided for verifying the authenticity of data within one or more data files. Each data file is provided with an identifier, such as a one-way hash function or cyclic redundancy checksum. A signature file, that includes the identifiers for one or more data files, is provided with a digital signature created with a signature algorithm. The data file(s) and signature file are then transferred, or otherwise provided to a user. The user verifies the digital signature in the signature file using a signature-verifying algorithm. Once verified as being authentic, the signature file can be used to verify each of the data files. Verification of the data files can be accomplished by comparing the identifier for each data file with the corresponding identifier in the signature file. If the identifiers in the data and signature files match, then the data file can be marked as authentic. If the identifiers do not match then the data file can be rejected or otherwise dealt with accordingly.

U.S. Pat. No. 6,021,497 (Bouthillier, et al., Feb. 1, 2000), expressly incorporated herein by reference, relates to a secured network system which will allow only authorized users of the seed network system to access classified data provided by a secured network server. The secured network system includes a readykey controller, which has connected thereto a plurality of card readers. A user of the secured network system inserts a microchip embedded card into one of the card readers which then provides an authorization signal to the readykey controller indicating that the user is authorized to use one of a plurality of computers within the secured network system to receive and process classified data. The readykey controller sends an enable signal to a data relay switch enabling a data line associated with the card reader and the computer selected by the user allowing classified data to be transmitted from the secured network server through the data relay switch to the selected computer. Each of the three computers also has a power relay switch connected thereto which is activated by the readykey controller whenever authorization to activate the computer is provided to the readykey controller from another of the plurality of card readers.

U.S. Pat. No. 6,023,762 (Dean, et al., February 8, 2000), expressly incorporated herein by reference, relates to a data access and retrieval system which comprises a plurality of user data sources each storing electronic data signals describing data specific to a user, or enabling services selected by a user; an agent device which is configurable to select individual ones of the user data sources and present selections of user data and service data to a set of callers who may interrogate the agent device remotely over a communications network; a plurality of service terminals capable of communicating with the agent device over a communications network the service terminals operable by callers: and a plurality of key devices, storing caller information and security code information for enabling remote access of selections of user data and/or services to be transmitted over a communications network to a caller located at a service terminal.

U.S. Pat. No. 6,029,245 (Scanlan, Feb. 22, 2000), expressly incorporated herein by reference, relates to a method and system for dynamically assigning security parameters to hypertext markup language (HTML) pages of an information provider on the worldwide web, whereby only one set of HTML pages need be stored and maintained for retrieval by client computers using differing security protocols. A security injection profile is provided for storing security parameters for each respective security protocol. When a browser enabled with a particular security protocol requests one of the HTML pages in the secure set, the page is accessed from web server storage, security parameters of the particular protocol are accessed and injected into the accessed page, and the page is sent to the requesting browser.

U.S. Pat. No. 6,049,875 (Suzuki, et al., Apr. 11, 2000), expressly incorporated herein by reference, relates to a security apparatus and method. A service is supplied to a user while maintaining the security of the service. A person discrimination section discriminates the user to be supplied the service. A user situation decision section decides whether the user is authorized to use the service. An infringement situation decision section detects whether a non-user intrudes into a use area of the service in order to decide whether the security of the service is infringed. A service control section supplies the service to the user in case the person discrimination section discriminates the user, and controls a supply of the service if the use situation decision section decides the user is not under the situation to use the service or the infringement situation decision section decides that the security of the service is infringed.

U.S. Pat. No. 6,055,508 (Naor, et al., Apr. 25, 2000), expressly incorporated herein by reference, relates to a method for secure accounting and auditing on a communications network. A method for secure accounting and auditing of a communications network operates in an environment in which many servers serve an even larger number of clients (e.g. the web), and are required to meter the interaction between servers and clients (e.g. counting the number of clients that were served by a server). The method (metering process) is very efficient and does not require extensive usage of any new communication channels. The metering is secure against fraud attempts by servers that inflate the number of their clients and against clients that attempt to disrupt the metering process. Several secure and efficient constructions of this method are based on efficient cryptographic techniques, are also very accurate, and preserve the privacy of the clients.

U.S. Pat. No. 6,065,119 (Sandford, II, et al., May 16, 2000), expressly incorporated herein by reference, relates to a method of authenticating digital data such as measurements made for medical, environmental purposes, or forensic purpose, and destined for archival storage or transmission through communications channels in which corruption or modification in part is possible. Authenticated digital data contain data-metric quantities that can be constructed from the digital data by authorized persons having a digital key. To verify retrieved or received digital data, the data-metrics constructed from the retrieved or received data are compared with similar data-metrics calculated for the retrieved or received digital data. The comparison determines the location and measures the amount of modification or corruption in the retrieved or received digital data.

U.S. Pat. No. 6,073,240 (Kurtzberg, et al., Jun. 6, 2000), expressly incorporated herein by reference, relates to a method and apparatus for realizing computer security. The method includes the steps of establishing an authorization window for enabling computer system actions consistent with an authorization rule; and, monitoring the actions as an indicia of conformance to the authorization rule. The method preferably provides a pattern of system actions as an indicia of compliance with an authorization rule, and provides notification of predetermined patterns.

U.S. Pat. No. 6,075,860 (Ketcham, Jun. 13, 2000), expressly incorporated herein by reference, relates to an apparatus and method for authentication and encryption of a remote terminal over a wireless link. A method and system is provided for authenticating an authorized user of a remote terminal attempting to interconnect with a computer network over a wireless modem is provided. An encrypted wireless communication channel is established between a remote terminal and a network server for facilitating the authentication process. An authorized user presents an authentication card containing credentials including a user identifier and an authentication encryption key to a remote terminal. The remote terminal establishes a wireless communication channel with a network server that provides a firewall between unauthenticated users and a computer network. The network server and the remote terminal then exchange encrypted information thus verifying the authenticity of each party. The remote terminal and the network server each independently generate a data encryption key for use in establishing a secure encrypted wireless communication channel therebetween.

U.S. Pat. No. 6,075,861 (Miller, II, Jun. 13, 2000), expressly incorporated herein by reference, relates to a security access system, having an entry access system that includes a locking mechanism enabling authorized entry at a secured entry point to a closed access area or computing device. Entry is approved in response to an interaction between an intended entrant and the entry access system that involves an interchange of multidigit numbers and use of ID and PINs for generation of a multidigit check number to establish authenticity of a request for entry.

Cryptographic Technology

U.S. Pat. No. 5,956,408 (Arnold, Sep. 21, 1999), expressly incorporated herein by reference, relates to an apparatus and method for secure distribution of data. Data, including program and software updates, is encrypted by a public key encryption system using the private key of the data sender. The sender also digitally signs the data. The receiver decrypts the encrypted data, using the public key of the sender, and verifies the digital signature on the transmitted data. The program interacts with basic information stored within the confines of the receiver. As result of the interaction, the software updates are installed within the confines of the user, and the basic information stored within the confines of the user is changed.

U.S. Pat. No. 5,982,891 (Ginter, et al., Nov. 9, 1999); U.S. Pat. No. 5,949,876 (Ginter. et al. Sep. 7, 1999); and U.S. Pat. No. 5,892,900 (Ginter, et al., Apr. 6, 1999), expressly incorporated herein by reference, relate to systems and methods for secure transaction management and electronic rights protection. Electronic appliances, such as computers, help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway."

U.S. Pat. No. 6,009,177 (Sudia, Dec. 28, 1999), expressly incorporated herein by reference, relates to a cryptographic system and method with a key escrow feature that uses a method for verifiably splitting users' private encryption keys into components and for sending those components to trusted agents chosen by the particular users, and provides a system that uses modern public key certificate management, enforced by a chip device that also self-certifies. The methods for key escrow and receiving an escrow certificate are also applied herein to a more generalized case of registering a trusted device with a trusted third party and receiving authorization from that party enabling the device to communicate with other trusted devices. Further preferred embodiments provide for rekeying and upgrading of device firmware using a certificate system, and encryption of stream-oriented data.

U.S. Pat. No. 6,052,467 (Brands, Apr. 18, 2000), expressly incorporated herein by reference, relates to a system for ensuring that the blinding of secret-key certificates is restricted, even if the issuing protocol is performed in parallel mode. A cryptographic method is disclosed that enables the issuer in a secret-key certificate issuing protocol to issue triples consisting of a secret key, a corresponding public key, and a secret-key certificate of the issuer on the public key, in such a way that receiving parties can blind the public key and the certificate, but cannot blind a predetermined non-trivial predicate of the secret key even when executions of the issuing protocol are performed in parallel.

U.S. Pat. No. 6,052,780 (Glover, Apr. 18, 2000), expressly incorporated herein by reference, relates to a computer system and process for accessing an encrypted and self-decrypting digital information product while restricting access to decrypted digital information. Some of these problems with digital information protection systems may be overcome by providing a mechanism that allows a content provider to encrypt digital information without requiring either a hardware or platform manufacturer or a content consumer to provide support for the specific form of corresponding decryption. This mechanism can be provided in a manner that allows the digital information to be copied easily for back-up purposes and to be transferred easily for distribution, but which should not permit copying of the digital information in decrypted form. In particular, the encrypted digital information is stored as an executable computer program that includes a decryption program that decrypts the encrypted information to provide the desired digital information, upon successful completion of an authorization procedure by the user. In combination with other mechanisms that track distribution, enforce royalty payments and control access to decryption keys, an improved method is provided for identifying and detecting sources of unauthorized copies. Suitable authorization procedures also enable the digital information to be distributed for a limited number of uses and/or users, thus enabling per-use fees to be charged for the digital information.

See also, U.S. Pat. No. 4,200,770 (Cryptographic apparatus and method); U.S. Pat. No. 4,218,582 (Public key cryptographic apparatus and method); U.S. Pat. No. 4,264,782 (Method and apparatus for transaction and identity verification): U.S. Pat. No. 4,306,111 (Simple and effective public-key cryptosystem); U.S. Pat. No. 4,309,569 (Method of providing digital signatures); U.S. Pat. No. 4.326,098 (High security system for electronic signature verification); U.S. Pat. No. 4,351,982 (RSA Public-key data encryption system having large random prime number generating microprocessor or the like); U.S. Pat. No. 4,365,110 (Multiple-destinational cryptosystem for broadcast networks); U.S. Pat. No. 4,386,233 (Crytographic key notarization methods and apparatus); U.S. Pat. No. 4,393,269 (Method and apparatus incorporating a one-way sequence for transaction and identity verification); U.S. Pat. No. 4,399,323 (Fast real-time public key cryptography); U.S. Pat. No. 4,405,829 (Cryptographic communications system and method); U.S. Pat. No. 4,438,824 (Apparatus and method for cryptographic identity verification); U.S. Pat. No. 4,453,074 (Protection system for intelligent cards); U.S. Pat. No. 4,458,109 (Method and apparatus providing registered mail features in an electronic communication system); U.S. Pat. No. 4,471,164 (Stream cipher operation using public key cryptosystem); U.S. Pat. No. 4,514,592 (Cryptosystem); U.S. Pat. No. 4,528,588 (Method and apparatus for marking the information content of an information carrying signal); U.S. Pat. No. 4,529,870 (Cryptographic identification, financial transaction, and credential device); U.S. Pat. No. 4,558,176 (Computer systems to inhibit unauthorized copying, unauthorized usage, and automated cracking of protected software); U.S. Pat. No. 4,567,600 (Method and apparatus for maintaining the privacy of digital messages conveyed by public transmission): U.S. Pat. No. 4,575,621 (Portable electronic transaction device and system therefor); U.S. Pat. No. 4,578,531 (Encryption system key distribution method and apparatus); U.S. Pat. No. 4,590,470 (User authentication system employing encryption functions); U.S. Pat. No. 4,595,950 (Method and apparatus for marking the information content of an information carrying signal); U.S. Pat. No. 4,625,076 (Signed document transmission system); U.S. Pat. No. 4,633,036 (Method and apparatus for use in public-key data encryption system); U.S. Pat. No. 6,026,379 (System, method and article of manufacture for managing transactions in a high availability system): U.S. Pat. No. 6,026,490 (Configurable cryptographic processing engine and method); U.S. Pat. No. 6,028,932 (Copy prevention method and apparatus for digital video system); U.S. Pat. No. 6,028,933 (Encrypting method and apparatus enabling multiple access for multiple services and multiple transmission modes over a broadband communication network); U.S. Pat. No. 6,028,936 (Method and apparatus for authenticating recorded media); U.S. Pat. No. 6,028,937 (Communication device which performs two-way encryption authentication in challenge response format); U.S. Pat. No. 6,028,939 (Data security system and method); U.S. Pat. No. 6,029,150 (Payment and transactions in electronic commerce system); U.S. Pat. No. 6,029,195 (System for customized electronic identification of desirable objects), U.S. Pat. No. 6,029,247 (Method and apparatus for transmitting secured data); U.S. Pat. No. 6,031,913 (Apparatus and method for secure communication based on channel characteristics); U.S. Pat. No. 6,031,914 (Method and apparatus for embedding data, including watermarks, in human perceptible images); U.S. Pat. No. 6,034,618 (Device authentication system which allows the authentication function to be changed); U.S. Pat. No. 6,035,041 (Optimal-resilience, proactive, public-key cryptographic system and method); U.S. Pat. No. 6,035,398 (Cryptographic key generation using biometric data); U.S. Pat. No. 6,035,402 (Virtual certificate authority); U.S. Pat. No. 6,038,315 (Method and system for normalizing biometric variations to authenticate users from a public database and that ensures individual biometric data privacy); U.S. Pat. No. 6,038,316 (Method and system for protection of digital information); U.S. Pat. No. 6,038,322 (Group key distribution); U.S. Pat. No. 6,038,581 (Scheme for arithmetic operations in finite field and group operations over elliptic curves realizing improved computational speed); U.S. Pat. No. 6,038,665 (System and method for backing up computer files over a wide area computer network); U.S. Pat. No. 6,038,666 (Remote identity verification technique using a personal identification device); U.S. Pat. No. 6,041,122 (Method and apparatus for hiding cryptographic keys utilizing autocorrelation timing encoding and computation); U.S. Pat. No. 6,041,123 (Centralized secure communications system); U.S. Pat. No. 6,041,357 (Common session token system and protocol); U.S. Pat. No. 6,041,408 (Key distribution method and system in secure broadcast communication); U.S. Pat. No. 6,041,410 (Personal identification fob); U.S. Pat. No. 6,044,131 (Secure digital x-ray image authentication method); U.S. Pat. No. 6,044,155 (Method and system for securely archiving core data secrets); U.S. Pat. No. 6,044,157 (Microprocessor suitable for reproducing AV data while protecting the AV data from illegal copy and image information processing system using the microprocessor); U.S. Pat. No. 6,044,205 (Communications system for transferring information between memories according to processes transferred with the information); U.S. Pat. No. 6,044,349 (Secure and convenient information storage and retrieval method and apparatus): U.S. Pat. No. 6,044,350 (Certificate meter with selectable indemnification provisions); U.S. Pat. No. 6,044,388 (Pseudorandom number generator); U.S. Pat. No. 6,044,462 (Method and apparatus for managing key revocation); U.S. Pat. No. 6,044,463 (Method and system for message delivery utilizing zero knowledge interactive proof protocol); U.S. Pat. No. 6,044,464 (Method of protecting broadcast data by fingerprinting a common decryption function); U.S. Pat. No. 6,044,466 (Flexible and dynamic derivation of permissions); U.S. Pat. No. 6,044,468 (Secure transmission using an ordinarily insecure network communication protocol such as SNMP); U.S. Pat. No. 6,047,051 (Implementation of charging in a telecommunications system): U.S. Pat. No. 6,047,066 (Communication method and device); U.S. Pat. No. 6,047,067 (Electronic-monetary system); U.S. Pat. No. 6,047,072 (Method for secure key distribution over a nonsecure communications network); U.S. Pat. No. 6,047,242 (Computer system for protecting software and a method for protecting software); U.S. Pat. No. 6,047,268 (Method and apparatus for billing for transactions conducted over the internet); U.S. Pat. No. 6,047,269 (Self-contained payment system with circulating digital vouchers); U.S. Pat. No. 6,047,374 (Method and apparatus for embedding authentication information within digital data); U.S. Pat. No. 6,047,887 (System and method for connecting money modules); U.S. Pat. No. 6,049,610 (Method and apparatus for digital signature authentication); U.S. Pat. No. 6,049,612 (File encryption method and system); U.S. Pat. No. 6,049,613 (Method and apparatus for encrypting, decrypting, and providing privacy for data values); U.S. Pat. No. 6,049,671 (Method for identifying and obtaining computer software from a network computer); U.S. Pat. No. 6,049,785 (Open network payment system for providing for authentication of payment orders based on a confirmation electronic mail message); U.S. Pat. No. 6,049,786 (Electronic bill presentment and payment system which deters cheating by employing hashes and digital signatures); U.S. Pat. No. 6,049,787 (Electronic business transaction system with notarization database and means for conducting a notarization procedure); U.S. Pat. No. 6,049.838 (Persistent distributed capabilities); U.S. Pat. No. 6,049,872 (Method for authenticating a channel in large-scale distributed systems); U.S. Pat. No. 6,049,874 (System and method for backing up computer files over a wide area computer network); U.S. Pat. No. 6,052,466 (Encryption of data packets using a sequence of private keys generated from a public key exchange); U.S. Pat. No. 6,052,467 (System for ensuring that the blinding of secret-key certificates is restricted, even if the issuing protocol is performed in parallel mode): U.S. Pat. No. 6,052,469 (Interoperable cryptographic key recovery system with verification by comparison): U.S. Pat. No. 6,055,314 (System and method for secure purchase and delivery of video content programs): U.S. Pat. No. 6,055,321 (System and method for hiding and extracting message data in multimedia data); U.S. Pat. No. 6,055,508 (Method for secure accounting and auditing on a communications network); U.S. Pat. No. 6,055,512 (Networked personal customized information and facility services); U.S. Pat. No. 6,055,636 (Method and apparatus for centralizing processing of key and certificate life cycle management): U.S. Pat. No. 6,055,639 (Synchronous message control system in a Kerberos domain); U.S. Pat. No. 6,056,199 (Method and apparatus for storing and reading data): U.S. Pat. No. 6,057,872 (Digital coupons for pay televisions): U.S. Pat. No. 6,058,187 (Secure telecommunications data transmission): U.S. Pat. No. 6,058,188 (Method and apparatus for interoperable validation of key recovery information in a cryptographic system); U.S. Pat. No. 6,058,189 (Method and system for performing secure electronic monetary transactions); U.S. Pat. No. 6,058,193 (System and method of verifying cryptographic postage evidencing using a fixed key set); U.S. Pat. No. 6,058,381 (Many-to-many payments system for network content materials); U.S. Pat. No. 6,058,383 (Computationally efficient method for trusted and dynamic digital objects dissemination); U.S. Pat. No. 6,061,448 (Method and system for dynamic server document encryption); U.S. Pat. No. 6,061,454 (System, method, and computer program for communicating a key recovery block to enable third party monitoring without modification to the intended receiver); U.S. Pat. No. 6,061,692 (System and method for administering a meta database as an integral component of an information server); U.S. Pat. No. 6,061,789 (Secure anonymous information exchange in a network); U.S. Pat. No. 6,061,790 (Network computer system with remote user data encipher methodology); U.S. Pat. No. 6,061,791 (Initial secret key establishment including facilities for verification of identity); U.S. Pat. No. 6,061,792 (System and method for fair exchange of time-independent information goods over a network); U.S. Pat. No. 6,061,794 (System and method for performing secure device communications in a peer-to-peer bus architecture); U.S. Pat. No. 6,061,796 (Multi-access virtual private network); U.S. Pat. No. 6,061,799 (Removable media for password based authentication in a distributed system); U.S. Pat. No. 6,064,723 (Network-based multimedia communications and directory system and method of operation); U.S.

Pat. No. 6,064,738 (Method for encrypting and decrypting data using chaotic maps); U.S. Pat. No. 6,064,740 (Method and apparatus for masking modulo exponentiation calculations in an integrated circuit); U.S. Pat. No. 6,064,741 (Method for the computer-aided exchange of cryptographic keys between a user computer unit U and a network computer unit N); U.S. Pat. No. 6,064,764 (Fragile watermarks for detecting tampering in images); U.S. Pat. No. 6,064,878 (Method for separately permissioned communication); U.S. Pat. No. 6,065,008 (System and method for secure font subset distribution); U.S. Pat. No. 6,067,620 (Stand alone security device for computer networks); U.S. Pat. No. 6,069,647 (Conditional access and content security method); U.S. Pat. No. 6,069,952 (Data copyright management system); U.S. Pat. No. 6,069,954 (Cryptographic data integrity with serial bit processing and pseudo-random generators); U.S. Pat. No. 6,069,955 (System for protection of goods against counterfeiting); U.S. Pat. No. 6,069,969 (Apparatus and method for electronically acquiring fingerprint images); U.S. Pat. No. 6,069,970 (Fingerprint sensor and token reader and associated methods); U.S. Pat. No. 6,070,239 (System and method for executing verifiable programs with facility for using non-verifiable programs from trusted sources); U.S. Pat. No. 6,072,870 (System, method and article of manufacture for a gateway payment architecture utilizing a multichannel, extensible, flexible architecture); U.S. Pat. No. 6,072,874 (Signing method and apparatus using the same); U.S. Pat. No. 6,072,876 (Method and system for depositing private key used in RSA cryptosystem); U.S. Pat. No. 6,073,125 (Token key distribution system controlled acceptance mail payment and evidencing system): U.S. Pat. No. 6,073,160 (Document communications controller); U.S. Pat. No. 6,073,172 (Initializing and reconfiguring a secure network interface); U.S. Pat. No. 6,073,234 (Device for authenticating user's access rights to resources and method); U.S. Pat. No. 6,073,236 (Authentication method, communication method, and information processing apparatus); U.S. Pat. No. 6,073,237 (Tamper resistant method and apparatus); U.S. Pat. No. 6,073,238 (Method of securely loading commands in a smart card); U.S. Pat. No. 6,073,242 (Electronic authority server); U.S. Pat. No. 6,075,864 (Method of establishing secure, digitally signed communications using an encryption key based on a blocking set cryptosystem); U.S. Pat. No. 6,075,865 (Cryptographic communication process and apparatus); U.S. Pat. No. 6,076,078 (Anonymous certified delivery); U.S. Pat. No. 6,076,162 (Certification of cryptographic keys for chipcards); U.S. Pat. No. 6,076,163 (Secure user identification based on constrained polynomials); U.S. Pat. No. 6,076,164 (Authentication method and system using IC card); U.S. Pat. No. 6,076,167 (Method and system for improving security in network applications); U.S. Pat. No. 6,078,663 (Communication apparatus and a communication system); U.S. Pat. No. 6,078,665 (Electronic encryption device and method); U.S. Pat. No. 6,078,667 (Generating unique and unpredictable values); U.S. Pat. No. 6,078,909 (Method and apparatus for licensing computer programs using a DSA signature); U.S. Pat. No. 6,079,018 (System and method for generating unique secure values for digitally signing documents); U.S. Pat. No. 6,079,047 (Unwrapping system and method for multiple files of a container); U.S. Pat. No. 6,081,597 (Public key cryptosystem method and apparatus); U.S. Pat. No. 6,081,598 (Cryptographic system and method with fast decryption); U.S. Pat. No. 6,081,610 (System and method for verifying signatures on documents): U.S. Pat. No. 6,081,790 (System and method for secure presentment and payment over open networks); U.S. Pat. No. 6,081,893 (System for supporting secured log-in of multiple users into a plurality of computers using combined presentation of memorized password and transportable passport record), each of which is expressly incorporated herein by reference.

Challenge-Response Authentication

A number of modern systems implement challenge-response authentication, which provide enhanced security for encryption keys and encrypted content. See, for example, U.S. Pat. Nos. 6,028,937 (Tatebayashi et al.), U.S. Pat. No. 6,026,167 (Aziz), U.S. Pat. No. 6,009,171 (Ciacelli et al.) (Content Scrambling System, or "CSS"), U.S. Pat. No. 5,991,399 (Graunke et al.), U.S. Pat. No. 5,948,136 (Smyers) (IEEE 1394-1995), and U.S. Pat. No. 5,915,018 (Aucsmith), expressly incorporated herein by reference, and Jim Wright and Jeff Robillard (Philsar Semiconductor), "Adding Security to Portable Designs", Portable Design, March 2000, pp. 16–20. The Kerberos system and Microsoft Windows 2000 authentication systems also rely on challenge-response technology.

Watermarking

U.S. Pat. No. 5,699,427 (Chow, et al., Dec. 16, 1997), expressly incorporated herein by reference, relates to a method to deter document and intellectual property piracy through individualization, and a system for identifying the authorized receiver of any particular copy of a document. More specifically, each particular copy of a document is fingerprinted by applying a set of variations to a document, where each variation is a change in data contents, but does not change the meaning or perusal experience of the document. A database associating a set of variants to a receiver is maintained. Thus any variant or copy of that variant can be traced to an authorized receiver.

See also, U.S. Pat. No. 4,734,564 (Transaction system with off-line risk assessment); U.S. Pat. No. 4,812,628 (Transaction system with off-line risk assessment); U.S. Pat. No. 4,926,325 (Apparatus for carrying out financial transactions via a facsimile machine); U.S. Pat. No. 5,235,166 (Data verification method and magnetic media therefor); U.S. Pat. No. 5,254,843 (Securing magnetically encoded data using timing variations in encoded data); U.S. Pat. No. 5,341,429 (Transformation of ephemeral material); U.S. Pat. No. 5,428,683 (Method and apparatus for fingerprinting and authenticating magnetic media); U.S. Pat. No. 5,430,279 (Data verification method and magnetic media therefor); U.S. Pat. No. 5,521,722 (Image handling facilitating computer aided design and manufacture of documents); U.S. Pat. No. 5,546,462 (Method and apparatus for fingerprinting and authenticating various magnetic media); U.S. Pat. No. 5,606,609 (Electronic document verification system and method); U.S. Pat. No. 5,613,004 (Steganographic method and device); U.S. Pat. No. 5,616,904 (Data verification method and magnetic media therefor); U.S. Pat. No. 5,636,292 (Steganography methods employing embedded calibration data); U.S. Pat. No. 5,646,997 (Method and apparatus for embedding authentication information within digital data); U.S. Pat. No. 5,659,726 (Data embedding); U.S. Pat. No. 5,664,018 (Watermarking process resilient to collusion attacks); U.S. Pat. No. 5,687,236 (Steganographic method and device); U.S. Pat. No. 5,710,834 (Method and apparatus responsive to a code signal conveyed through a graphic image): U.S. Pat. No. 5,727,092 (Compression embedding); U.S. Pat. No. 5,734,752 (Digital watermarking using stochastic screen patterns); U.S. Pat. No. 5,740,244 (Method and apparatus for improved fingerprinting and authenticating various magnetic media); U.S. Pat. No. 5,745,569 (Method for stega-cipher protection of computer code); U.S. Pat. No. 5,745,604 (Identification/authentication system using robust, distributed coding); U.S. Pat. No. 5,748,763 (Image steganography system featuring perceptually adaptive and globally scalable signal embedding); U.S. Pat. No. 5,748,783 (Method and apparatus for robust information coding); U.S. Pat. No. 5,761,686 (Embedding encoded information in an iconic version of a text image); U.S. Pat. No. 5,765,152 (System and method for managing copyrighted electronic media); U.S. Pat. No. 5,768,426 (Graphics processing system employing embedded code signals); U.S. Pat. No. 5,778,102 (Compression embedding); U.S. Pat. No. 5,790,703 (Digital watermarking using conjugate halftone screens); U.S. Pat. No. 5,819,289 (Data embedding employing degenerate clusters of data having differences less than noise value); U.S. Pat. No. 5,822,432 (Method for human-assisted random key generation and application for digital watermark system); U.S. Pat. No. 5,822,436 (Photographic products and methods employing embedded information); U.S. Pat. No. 5,832,119 (Methods for controlling systems using control signals embedded in empirical data); U.S. Pat. No. 5,841,886 (Security system for photographic identification); U.S. Pat. No. 5,841,978 (Network linking method using steganographically embedded data objects); U.S. Pat. No. 5,848,155 (Spread spectrum watermark for embedded signalling); U.S. Pat. No. 5,850,481 (Steganographic system); U.S. Pat. No. 5,862,260 (Methods for surveying dissemination of proprietary empirical data); U.S. Pat. No. 5,878,137 (Method for obtaining authenticity identification devices for using services in general, and device obtained thereby); U.S. Pat. No. 5,889,868 (Optimization methods for the insertion, protection, and detection of digital watermarks in digitized data); U.S. Pat. No. 5,892,900 (Systems and methods for secure transaction management and electronic rights protection); U.S. Pat. No. 5,905,505 (Method and system for copy protection of on-screen display of text); U.S. Pat. No. 5,905,800 (Method and system for digital watermarking); U.S. Pat. No. 5,915,027 (Digital watermarking); U.S. Pat. No. 5,920,628 (Method and apparatus for fingerprinting and authenticating various magnetic media); U.S. Pat. No. 5,930,369 (Secure spread spectrum watermarking for multimedia data); U.S. Pat. No. 5,933,498 (System for controlling access and distribution of digital property); U.S. Pat. No. 5,943,422 (Steganographic techniques for securely delivering electronic digital rights management control information over insecure communication channels); U.S. Pat. No. 5,946,414 (Encoding data in color images using patterned color modulated image regions); U.S. Pat. No. 5,949,885 (Method for protecting content using watermarking); U.S. Pat. No. 5,974,548 (Media-independent document security method and apparatus); U.S. Pat. No. 5,995,625 (Electronic cryptographic packing); U.S. Pat. No. 6,002,772 (Data management system); U.S. Pat. No. 6,004,276 (Open architecture cardiology information system): U.S. Pat. No. 6,006,328 (Computer software authentication, protection, and security system); U.S. Pat. No. 6,006,332 (Rights management system for digital media); U.S. Pat. No. 6,018,801 (Method for authenticating electronic documents on a computer network); U.S. Pat. No. 6,026,193 (Video steganography); U.S. Pat. No. 6,044,464 (Method of protecting broadcast data by fingerprinting a common decryption function); U.S. Pat. No. 6,047,374 (Method and apparatus for embedding authentication information within digital data); U.S. Pat. No. 6,049,627 (Covert digital identifying indicia for digital image): U.S. Pat. No. 6,061,451 (Apparatus and method for receiving and decrypting encrypted data and protecting decrypted data from illegal use); U.S. Pat. No. 6,064,737 (Anti-piracy system for wireless telephony); U.S. Pat. No. 6,064,764 (Fragile watermarks for detecting tampering in images); U.S. Pat. No. 6,069,914 (Watermarking of image data using MPEG/JPEG coefficients): U.S. Pat. No. 6,076,077 (Data management system); U.S. Pat. No. 6,081,793 (Method and system for secure computer moderated voting), each of which is expressly incorporated herein by reference.

Computer System Security

U.S. Pat. No. 5,881,225 (Worth. Mar. 9, 1999), expressly incorporated herein by reference, relates to a security monitor for controlling functional access to a computer system. A security monitor controls security functions for a computer system. A user desiring access to the system inputs a user identification and password combination, and a role the user to assume is selected from among one or more roles defined in the system. Upon being validated as an authorized user performing a particular role, the user is then authorized to perform certain functions and tasks specifically and to see information associated with that role (and optimally the work group the user is assigned). For some users, no role or a "null" roll is chosen, and authorization for certain functions and tasks is accomplished due to that particular user having been predefined by an administrator as being allowed to perform those functions and tasks, usually due to the predefined privileges associated with the work group(s) to which the user belongs.

U.S. Pat. No. 5,937,068 (Audebert, Aug. 10, 1999), expressly incorporated herein by reference, relates to a system and method for user authentication employing dynamic encryption variables. The system includes a first card-like unit adapted to communicate with a second unit giving only conditionally access to a function. Both units are capable of running software for generating a password by means of encryption of a plurality of dynamic variables produced separately but in concert (so as to have a predetermined relationship, such as identity, with one another) in the units. The encryption is carried out in each unit by a public algorithm using a dynamically varying encryption key. Each time an access request is issued by a card user, the key is modified as a function of the number of access requests previously formulated by the card user. Access to the function is granted when the passwords generated in the units have a predetermined relationship (such as identity) with each other. In a "virtual token" implementation, the first unit can be a smart card, which stores the dynamic key and the variable representing the number of formulated authentication requests and executes an encryption algorithm, a smart card reader and a computer such as a personal computer. Either the smart card reader or the personal computer can generate the time dependent variable. In a "software token" implementation, the functions of the first unit are performed by a personal computer, thus eliminating the need for a smart card or a smart card reader.

U.S. Pat. No. 5,949,882 (Angelo, Sep. 7, 1999), expressly incorporated herein by reference, relates to a method and apparatus for allowing access to secured computer resources by utilizing a password and an external encryption algorithm. A method for permitting access to secured computer resources based upon a two-piece user verification process is provided. In one embodiment, the user verification process is carried out during a secure power-up procedure. At some point during the secure power-up procedure, the computer user is required to provide an external token or smart card that is coupled to the computer through specialized hardware. The token or smart card is used to store an encryption algorithm furnished with an encryption key that is unique or of limited production. The computer user is then required to enter a plain text user password. Once entered, the user password is encrypted using the encryption algorithm contained in the external token to create a peripheral password. The peripheral password is compared to a value stored in either secure system memory or in memory contained within a secured resource itself. If the two values match, access to the secured resource is permitted. In an alternate embodiment, the two-piece authentication process is conducted during normal computer operation outside of the secure power-on sequence. In this embodiment, the user password is entered by means of a secure keyboard communications channel. In either embodiment, the two-piece nature of the authorization process requires the presence of both the user password and the external token in order to generate the peripheral password.

U.S. Pat. No. 5,953,419 (Lohstroh, et al., Sep. 14, 1999), expressly incorporated herein by reference, relates to a cryptographic file labeling system for supporting secured access by multiple users. A system is disclosed for automatically distributing secured versions of a file decryption key to a plurality of file users by way of the file's security label. The label is defined to contain a plurality of Access-Control-Entries Records (ACER's) where each ACER includes a respective secured version of the file decryption key. Each such secured version is decipherable by a respective ACER private key. Each ACER may include respective other data such as: (a) ACER-unique identifying data for uniquely identifying the ACER or an associated user; (b) decryption algorithm identifying data for identifying the decryption process to be used to decrypt the encrypted data portion of the file: and (c) special handling code for specifying special handling for the code-containing ACER. The label is preferably covered by a digital signature but includes an extension buffer that is not covered by the digital signature. Users who wish to have an ACER of their own added to the label may submit add-on requests by writing to the extension buffer.

U.S. Pat. No. 5,956,400 (Chaum, et al., Sep. 21, 1999), expressly incorporated herein by reference, relates to partitioned information storage systems with controlled retrieval. An information storage system includes one or more information update terminals, a mapper, one or more partial-databases, and one or more query terminals, exchanging messages over a set of communication channels. An identifier-mapping mechanism provides (to an update terminal) a method for delegating control over retrieval of the data stored at the partial-databases to one or more mappers, typically operated by one or more trusted third parties. Update terminals supply information, which is stored in fragmented form by the partial-databases. Data-fragment identifiers and pseudonyms are introduced, preventing unauthorized de-fragmentation of information—thus providing compliance to privacy legislation—while at the same time allowing query terminals to retrieve (part of) the stored data or learn properties of the stored data. The mapper is necessarily involved in both operations, allowing data access policies to be enforced and potential abuse of stored information to be reduced. Introduction of multiple mappers acts to distribute information retrieval control among multiple trusted third parties. Introducing so-called "groupers" increases the efficiency of data retrieval for a common set of queries and further reduces potential abuse of information.

U.S. Pat. No. 5,958,050 (Griffin, et al., Sep. 28, 1999), expressly incorporated herein by reference, relates to a trusted delegation system. A trust manager examines each new class before it is allowed to execute by examining a policy file which includes data structures defining security policies of the user system, a certificate repository for storing a plurality of certificates, a certificate being a data record which is digitally signed and which certifies claims relevant to a security evaluation, a code examiner adapted to analyze the portion of code to determine potential resource use of the portion of code and a trust evaluator adapted to evaluate certificate requirements of the portion of code based on policy rules extracted from the policy file and the potential resource use specified by the code examiner. The trust evaluator also determines, from certificates from the certificate repository and a code identifier identifying the portion of code, whether execution of the portion of code is allowed by the policy rules given the potential resource use, the code supplier and applicable certificates. Certificates and policies can be specified in hierarchical form, so that some levels of security can be delegated to trusted entities.

U.S. Pat. No. 5,978,475 (Schneier, et al., Nov. 2, 1999), expressly incorporated herein by reference, relates to an event auditing system. In many computer applications, sensitive information must be kept on an untrusted machine. Such information must be protected against attackers, as well as against partially trusted entities to be given partial, but not total, access to the stored information. A method, apparatus and computer-readable data structure are provided for inhibiting an attacker from accessing or corrupting information stored by an untrusted machine. More specifically, in a log file generated during a process in which the untrusted machine is in limited communication with a trusted machine, entries generated prior to the attack remain secure (they cannot be modified without detection), even though subsequent entries can not be trusted. One embodiment also allows a partially trusted verifier to read and verify entries in the log file, but not to change them without detection. In another embodiment, operating with or without the trusted machine, the untrusted machine's log file can also incorporate log files of other processes.

U.S. Pat. No. 5,991,878 (McDonough, et al., Nov. 23, 1999), expressly incorporated herein by reference, relates to a system and method for controlling access to information in a distributed computing system. A request for the information is received and is accompanied by encrypted session state data. Based on the encrypted session state data, it is determined whether to pass the request on to a source of the information. In a memory buffer, old data is replaced by overwriting with a unique identifier. After the memory buffer has received new data and a procedure has been executed for copying the contents of the memory buffer to a destination, it is determined whether the unique identifier may be found at the destination.

U.S. Pat. No. 6,070,239 (McManis, May 30, 2000), expressly incorporated herein by reference, relates to a system and method for executing verifiable programs with facility for using non-verifiable programs from trusted sources. A computer system includes a program executer that executes verifiable architecture neutral programs and a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. In the preferred embodiment, verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

U.S. Pat. No. 6,079,021 (Abadi, et al., Jun. 20, 2000), expressly incorporated herein by reference, relates to a method and apparatus for strengthening passwords for protection of computer systems. A computer-implemented method provides access to processes and data using strengthened password. During an initialization phase, an access code is stored in a memory of a computer system. The access code is an application of a one-way hash function to a concatenation of a password and a password supplement. The size of the password supplement is a fixed number of bits. During operation of the system, a user enters a password, and the one-way hash function is applied to concatenations of the password and possible values having the size of the password supplement to yield trial access codes. Access is granted when one of the trial access codes is identical to the stored access code.

See also, U.S. Pat. No. 6,073,242 (Electronic authority server); U.S. Pat. No. 6,073,240 (Method and apparatus for realizing computer security); U.S. Pat. No. 6,064,977 (Web server with integrated scheduling and calendaring); U.S. Pat. No. 6,055,637 (System and method for accessing enterprise-wide resources by presenting to the resource a temporary credential); U.S. Pat. No. 6,044,466 (Flexible and dynamic derivation of permissions); U.S. Pat. No. 6,041,349 (System management/network correspondence display method and system therefore): U.S. Pat. No. 6,014,666 (Declarative and programmatic access control of component-based server applications using roles); U.S. Pat. No. 5,991,877 (Object-oriented trusted application framework); U.S. Pat. No. 5,978,475 (Event auditing system); U.S. Pat. No. 5,949,866 (Communications system for establishing a communication channel on the basis of a functional role or task); U.S. Pat. No. 5,925,126 (Method for security shield implementation in computer system's software); U.S. Pat. No. 5,911,143 (Method and system for advanced role-based access control in distributed and centralized computer systems); U.S. Pat. No. 5.797,128 (System and method for implementing a hierarchical policy for computer system administration); U.S. Pat. No. 5,761,288 (Service context sensitive features and applications); U.S. Pat. No. 5,751,909 (Database system with methods for controlling object interaction by establishing database contracts between objects); U.S. Pat. No. 5,748,890 (Method and system for authenticating and auditing access by a user to non-natively secured applications); U.S. Pat. No. 5,621,889 (Facility for detecting intruders and suspect callers in a computer installation and a security system including such a facility): U.S. Pat. No. 5,535,383 (Database system with methods for controlling object interaction by establishing database contracts between objects); U.S. Pat. No. 5,528,516 (Apparatus and method for event correlation and problem reporting); U.S. Pat. No. 5,481,613 (Computer network cryptographic key distribution system); U.S. Pat. No. 5,347,578 (Computer system security); U.S. Pat. No. 5,265,221 (Access restriction facility method and apparatus), each of which is expressly incorporated herein by reference.

Computer Security Devices

U.S. Pat. No. 5,982,520 (Weiser, et al., Nov. 9, 1999), expressly incorporated herein by reference, relates to a personal storage device for receipt, storage, and transfer of digital information to other electronic devices has a pocket sized crush resistant casing with a volume of less than about ten cubic centimeters. A processor is positioned within the casing cavity and attached to the crush resistant casing, while a memory module also positioned within the casing cavity is configured to store received executable applications and data. An infrared transceiver is mounted on the crush resistant casing and in electronic communication with the processor and memory module to provide for receipt and storage of executable applications, and receipt, storage, and transfer of digital information to other electronic devices. The digital information stored by the personal storage device can be intermittently synchronized with other electronic devices.

U.S. Pat. No. 5,991,519 (Benhammou, et al., Nov. 23, 1999), expressly incorporated herein by reference, relates to a secure memory having multiple security levels. A secured memory comprises a first level security zone having an access code controlling access to the secured memory prior to an issuer fuse being blown, a security code attempts counter preventing access to the secured memory when a predetermined number of attempts at matching the access code have been made prior to resetting the security code attempts counter, a plurality of application zones, each of the plurality of application zones comprising: a storage memory zone, an application security zone having an application zone access code controlling access to the storage memory zone after an issuer fuse has been blown, an application zone security code attempts counter preventing access to the application zone when a predetermined number of attempts at matching the application zone access code have been made prior to resetting the application zone security code attempts counter, an erase key partition having an erase key code controlling erase access to the storage memory zone after an issuer fuse has been blown, and an erase key attempts counter preventing erase access to the application zone when a predetermined number of attempts at matching the erase key code have been made prior to resetting the erase key attempts counter.

U.S. Pat. No. 5,999,629 (Heer, et al., Dec. 7, 1999), expressly incorporated herein by reference, relates to a data encryption security module. Encryption keys used to encrypt such messages need to be managed in a highly secure manner. A unique device encryption key is generated, a cryptographic key formed from a unique identification key and an associated public key, and at least one program encryption key, in which the public key is generated as a function of the unique identification key. The module then encrypts the unique identification key and program encryption key using said device encryption key and stores the encrypted result in memory internal to security module, thereby securing the keys against misappropriation. In addition, the module provides a mechanism for using the program encryption key to encrypt information that it receives from an external source and store the encrypted information in memory external to the security module, and responsive to receiving from a requester a request for the program encryption key, encrypting the program encryption key, using a symmetrical encryption key generated as a function of a public key generated by a security module associated with the requester. The former security module then supplies the encrypted program encryption key to the requester.

U.S. Pat. No. 6,034,618 (Tatebayashi, et al., Mar. 7, 2000), expressly incorporated herein by reference, relates to a device authentication system that allows the authentication function to be changed. A decoder apparatus generates a random number for authenticating the optical disc drive apparatus and sends it to the optical disc drive apparatus as the challenge data. The optical disc drive apparatus selects one out of sixteen claimant functions stored in the claimant function unit and calculates the function value, which it sends to the decoder apparatus as the response data. The decoder apparatus compares the response data with sixteen function values to that are obtained using the sixteen verification functions stored in the verification function unit, and authenticates the optical disc drive apparatus when at least one of the function values matches the response data.

U.S. Pat. No. 6,041,412 (Timson, et al., Mar. 21, 2000), expressly incorporated herein by reference, relates to an apparatus and a method for providing access to a secured data or area, includes at least two secure data modules which contain security data and other information and which belong to a particular security scheme and a dual module reader for reading data and permissions instructions contained on the secure data modules. The two secure data modules include an enabling module and an interrogatable module. The interrogatable module and the enabling module communicate with each other via a dual module reader. Communication between the two modules is allowed as long as the two modules are members of the same security scheme. A scheme is defined by suitable proprietary encryption keys for enabling communication and data transfer between the two modules belonging to a common scheme and for preventing communication and data transfer between two modules belonging to different schemes. The communication between the two modules provides an improved data security and access control system that eliminates the need for multiple passwords for various operations and also prevents problems associated with conventional access cards that are used in conjunction with passwords.

U.S. Pat. No. 6,061,451 (Muratani, et al., May 9, 2000), expressly incorporated herein by reference, relates to an apparatus and method for receiving and decrypting encrypted data and protecting decrypted data from illegal use. A data receiving apparatus is formed of a set top unit connected to a network and a security module. Digital video data, supplied from the network and scrambled according to a first system, is scrambled according to a second system in a scramble circuit in the set top unit, and is supplied to the security module. The data is descrambled according to the first system in a descramble circuit in the security module, and is transferred back to the set top unit. The data is descrambled according to the second system in a descramble circuit in the set top unit, and is outputted to an image display terminal via an MPEG decoder.

U.S. Pat. No. 6,069,647 (Sullivan, et al., May 30, 2000), expressly incorporated herein by reference, relates to a conditional access and content security method. An interface unit, connected to a programmable unit, is capable of containing a time-sensitive key. The programmable unit is allowed to receive digital content from the interface unit upon establishing that the time-sensitive key is also contained therein.

Computer Network Firewall

U.S. Pat. No. 5,944,823 (Jade, et al., Aug. 31, 1999), expressly incorporated herein by reference, relates to a system and method for providing outside access to computer resources through a firewall. A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The system provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside. These applications use the table to effect connections through the firewall in response to outside requests identifying valid table entries.

U.S. Pat. No. 5,968,176 (Nessett, et al., Oct. 19, 1999), expressly incorporated herein by reference, relates to a multilayer firewall system. A system provides for establishing security in a network that includes nodes having security functions operating in multiple protocol layers. Multiple network devices, such as remote access equipment, routers, switches, repeaters and network cards having security functions are configured to contribute to implementation of distributed firewall functions in the network. By distributing firewall functionality throughout many layers of the network in a variety of network devices, a pervasive firewall is implemented. The pervasive, multilayer firewall includes a policy definition component that accepts policy data that defines how the firewall should behave. The policy definition component can be a centralized component, or a component that is distributed over the network. The multilayer firewall also includes a collection of network devices that are used to enforce the defined policy. The security functions operating in this collection of network devices across multiple protocol layers are coordinated by the policy definition component so that particular devices enforce that part of the policy pertinent to their part of the network.

U.S. Pat. No. 5,983,350 (Minear, et al., Nov. 9, 1999), expressly incorporated herein by reference, relates to a secure firewall supporting different levels of authentication based on address or encryption status. A system and method is provided for regulating the flow of messages through a firewall having a network protocol stack, wherein the network protocol stack includes an Internet Protocol (IP) layer, the method comprising establishing a security policy, determining, at the IP layer, if a message is encrypted, if the message is not encrypted, passing the unencrypted message up the network protocol stack to an application level proxy, and if the message is encrypted, decrypting the message and passing the decrypted message up the network protocol stack to the application level proxy, wherein decrypting the message includes executing a process at the IP layer to decrypt the message.

U.S. Pat. No. 6,009,475 (Shrader, Dec. 28, 1999), expressly incorporated herein by reference, relates to a system and method for filter rule validation and administration for firewalls. Filter rules on a firewall between a secure computer network and a nonsecure computer network are validated from a user interface. A user interface is presented in which a test packet can be defined. The user interface includes controls for defining values for attributes of the test packet, wherein the attributes of the test packet are selected from a set of attributes of normal packets normally sent between the secure and nonsecure computer networks. A defined test packet is validated against a set of filter rules in the firewall or matched against the filter rules to determine those filter rules with matching attributes to the defined packet. When validating, responsive to the failure of the test packet in the validating step, the filter rule in the set of filter rules that denied the test packet is displayed.

U.S. Pat. No. 6,052,788 (Wesinger, Jr., et al., Apr. 18, 2000), expressly incorporated herein by reference, relates to a firewall, providing enhanced network security and user transparency, for improved network security and maximum user convenience. The firewall employs "envoys" that exhibit the security robustness of prior-art proxies and the transparency and ease-of-use of prior-art packet filters, combining the best of both worlds. No traffic can pass through the firewall unless the firewall has established an envoy for that traffic. Both connection-oriented (e.g., TCP) and connectionless (e.g., UDP-based) services may be handled using envoys. Establishment of an envoy may be subjected to a myriad of tests to "qualify" the user, the requested communication, or both. Therefore, a high level of security may be achieved. The usual added burden of prior-art proxy systems is avoided in such a way as to achieve full transparency—the user can use standard applications and need not even know of the existence of the firewall. To achieve full transparency, the firewall is configured as two or more sets of virtual hosts. The firewall is, therefore, "multi-homed," each home being independently configurable. One set of hosts responds to addresses on a first network interface of the firewall. Another set of hosts responds to addresses on a second network interface of the firewall. In one aspect, programmable transparency is achieved by establishing DNS mappings between remote hosts to be accessed through one of the network interfaces and respective virtual hosts on that interface. In another aspect, automatic transparency may be achieved using code for dynamically mapping remote hosts to virtual hosts in accordance with a technique referred to herein as dynamic DNS, or DDNS.

U.S. Pat. No. 6,061,797 (Jade, et al., May 9, 2000), expressly incorporated herein by reference, relates to a system and method for providing outside access to computer resources through a firewall. A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The system provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside.

U.S. Pat. No. 6,061,798 (Coley, et al., May 9, 2000), expressly incorporated herein by reference, relates to a firewall system for protecting network elements connected to a public network. The firewall operates on a stand-alone computer connected between the public network and the network elements to be protected such that all access to the protected network elements must go through the firewall. The firewall application running on the stand-alone computer is preferably the only application running on that machine. The application includes a variety of proxy agents that are specifically assigned to an incoming request in accordance with the service protocol (i.e., port number) indicated in the incoming access request. An assigned proxy agent verifies the authority of an incoming request to access a network element indicated in the request. Once verified, the proxy agent completes the connection to the protected network element on behalf of the source of the incoming request.

See also, U.S. Pat. No. 6,075,860 (Apparatus and method for authentication and encryption of a remote terminal over a wireless link); U.S. Pat. No. 6,061,798 (Firewall system for protecting network elements connected to a public network); U.S. Pat. No. 6,061,797 (Outside access to computer resources through a firewall); U.S. Pat. No. 6,052,788 (Firewall providing enhanced network security and user transparency); U.S. Pat. No. 6,047,322 (Method and apparatus for quality of service management): U.S. Pat. No. 6,041,355 (Method for transferring data between a network of computers dynamically based on tag information): U.S. Pat. No. 6,012,088 (Automatic configuration for internet access device); U.S. Pat. No. 6,003,084 (Secure network proxy for connecting entities); U.S. Pat. No. 5,999,973 (Use of web technology for subscriber management activities); U.S. Pat. No. 5,991,731 (Method and system for interactive prescription and distribution of prescriptions in conducting clinical studies); U.S. Pat. No. 5,983,350 (Secure firewall supporting different levels of authentication based on address or encryption status); U.S. Pat. No. 5,968,176 (Multilayer firewall system); U.S. Pat. No. 5,960,177 (System for performing remote operation between firewall-equipped networks or devices); U.S. Pat. No. 5,958,016 (Internet-web link for access to intelligent network service control); U.S. Pat. No. 5,950,195 (Generalized security policy management system and method); U.S. Pat. No. 5,944,823 (Outside access to computer resources through a firewall); U.S. Pat. No. 5,928,333 (Electronic mail management system for operation on a host computer system); U.S. Pat. No. 5,918,227 (Online directory service with a plurality of databases and processors); U.S. Pat. No. 5,915,087 (Transparent security proxy for unreliable message exchange protocols); U.S. Pat. No. 5,915,008 (System and method for changing advanced intelligent network services from customer premises equipment); U.S. Pat. No. 5,909,493 (Method and system for diagnosis and control of machines using connectionless modes of communication); U.S. Pat. No. 5,898,830 (Firewall providing enhanced network security and user transparency); U.S. Pat. No. 5,870,744 (Virtual people networking); U.S. Pat. No. 5,845,267 (System and method for billing for transactions conducted over the internet from within an intranet): U.S. Pat. No. 5,835,726 (System for securing the flow of and selectively modifying packets in a computer network); U.S. Pat. No. 5,826,029 (Secured gateway interface); U.S. Pat. No. 5,826,014 (Firewall system for protecting network elements connected to a public network); U.S. Pat. No. 5,812,398 (Method and system for escrowed backup of hotelled world wide web sites); U.S. Pat. No. 5,805,803 (Secure web tunnel); U.S. Pat. No. 5,784,463 (Token distribution, registration, and dynamic configuration of user entitlement for an application level security system and method); U.S. Pat. No. 5,632,011 (Electronic mail management system for operation on a host computer system); U.S. Pat. No. 5,623,601 (Apparatus and method for providing a secure gateway for communication and data exchanges between networks), each of which is expressly incorporated herein by reference.

Virtual Private Network

U.S. Pat. No. 6,079,020 (Liu, Jun. 20, 2000), expressly incorporated herein by reference, relates to a method and an apparatus for managing a virtual private network operating over a public data network. This public data network has been augmented to include a plurality of virtual private network gateways so that communications across the virtual private network are channeled through the virtual private network gateways. One embodiment includes a system that operates by receiving a command specifying an operation on the virtual private network. The system determines which virtual private network gateways are affected by the command. The system then automatically translates the command into configuration parameters for virtual private network gateways affected by the command. These configuration parameters specify how the virtual private network gateways handle communications between specific groups of addresses on the public data network. The system then transmits the configuration parameters to the virtual private network gateways affected by the command, so that the virtual private network gateways are configured to implement the command.

See also, U.S. Pat. No. 6,081,900 (Secure intranet access); U.S. Pat. No. 6,081,533 (Method and apparatus for an application interface module in a subscriber terminal unit); U.S. Pat. No. 6,079,020 (Method and apparatus for managing a virtual private network); U.S. Pat. No. 6,078,946 (System and method for management of connection oriented networks); U.S. Pat. No. 6,078,586 (ATM virtual private networks): U.S. Pat. No. 6,075,854 (Fully flexible routing service for an advanced intelligent network); U.S. Pat. No. 6,075,852 (Telecommunications system and method for processing call-independent signalling transactions); U.S. Pat. No. 6,073,172 (Initializing and reconfiguring a secure network interface); U.S. Pat. No. 6,061,796 (Multi-access virtual private network); U.S. Pat. No. 6,061,729 (Method and system for communicating service information in an advanced intelligent network); U.S. Pat. No. 6,058,303 (System and method for subscriber activity supervision); U.S. Pat. No. 6,055,575 (Virtual private network system and method); U.S. Pat. No. 6,052,788 (Firewall providing enhanced network security and user transparency); U.S. Pat. No. 6,047,325 (Network device for supporting construction of virtual local area networks on arbitrary local and wide area computer networks); U.S. Pat. No. 6,032,118 (Virtual private network service provider for asynchronous transfer mode network); U.S. Pat. No. 6,029,067 (Virtual private network for mobile subscribers); U.S. Pat. No. 6,016,318 (Virtual private network system over public mobile data network and virtual LAN); U.S. Pat. No. 6,009,430 (Method and system for provisioning databases in an advanced intelligent network); U.S. Pat. No. 6,005,859 (Proxy VAT-PSTN origination); U.S. Pat. No. 6,002,767 (System, method and article of manufacture for a modular gateway server architecture); U.S. Pat. No. 6,002,756 (Method and system for implementing intelligent telecommunication services utilizing self-sustaining, fault-tolerant object oriented architecture), each of which is expressly incorporated herein by reference.

Biometric Authentication

U.S. Pat. No. 6,035,406 (Moussa, et al., Mar. 7, 2000), expressly incorporated herein by reference, relates to a plurality-factor security system. The method and system provide for simultaneously authenticating a user using two or more factors, such as both a password and a physical token or both a password and biometric information. The user presents a physical token including a storage device to a processor and attempts to log in using a first password; the processor includes a login service which receives the first password, accesses the storage device to transform the first password into a second password, and authenticates the second password using an operating system for the processor. The storage device includes encrypted information regarding the second password which can be relatively easily determined in response to the first password, but which cannot be relatively easily determined without the first password. The system or the storage device may also store information for biometric authentication of the user.

U.S. Pat. No. 6,052,468 (Hillhouse, Apr. 18, 2000), expressly incorporated herein by reference, relates to a method is disclosed for improving portability of secure encryption key data files. The method provides for re-securing key data files according to different security processes for mobility. For porting an encryption key secured using a fingerprint authentication process to a system having only a password authentication process, a user selects password authentication process, provides a fingerprint and is authorized, provides a new password and then the encryption key is accessed according to the fingerprint authentication process and secured according to the password authentication process. This allows the use of specialized security hardware at one location while retaining an ability to transport encryption keys in a secure fashion to other locations, which do not have similar security hardware. U.S. Pat. No. 6,052,468 therefore provides a system and method for increasing portability of secure access codes, by providing a system comprising a cryptographic key encrypted and stored in a key data file and a secured key for decrypting the cryptographic key wherein the secured key is stored in a secured fashion, a method of securing the secured key comprising the steps of a) accessing stored data associated with the secured key, the data indicative of an access method from a plurality of access methods for accessing the secured key; b) executing the indicated access method to access the secured key; c) selecting a method from the plurality of methods for securing the accessed secured key; d) securing the accessed secured key according to the selected access method; and, e) storing data associated with the secured key, the data indicative of the selected access method. The key may be secured by providing user authentication information; deriving from the user authentication information a second cryptographic key; encrypting the accessed secured key using the second cryptographic key; and the secured key is accessed by the steps of: providing user authentication information; deriving from the user authentication information a third cryptographic key; and, decrypting the secured key using the third cryptographic key. A method of accessing a secured cryptographic key is provided comprising the steps of: a) accessing data associated with the secured cryptographic key to determine an authorization method necessary to access the secured cryptographic key; b) providing user authorization information; and c) executing the determined authorization method to access the secured cryptographic key based on the user authorization information provided. A further method is provided for securing portable key data including encryption key information comprising the steps of: a) selecting a first authorization process from a plurality of authorization processes for securing the portable key data; b) authenticating access to the secured portable key data according to a different authorization process, removing the security from the portable key data; and c) implementing security of the portable key data according to the first authorization process.

U.S. Pat. No. 6,076,167 (Borza, Jun. 13, 2000), expressly incorporated herein by reference, relates to a method of enhancing network security for a communication session initiated between a first computer and a second other computer. From the first computer to the second computer in communications therewith a process for securing communications therebetween is transmitted. One such process is a biometric characterization process for characterizing fingerprints. The process is for execution on the second computer and is selected to be compatible therewith. Communications from the second computer to the first computer are secured using the transmitted process on the second computer and using, on the first computer, a compatible process to the transmitted process. The host computer can modify or replace the process or data particular to the process before each session, during a session, or at intervals.

See also, U.S. Pat. No. 6,081,900 (Secure intranet access); U.S. Pat. No. 6,081,750 (Ergonomic man-machine interface incorporating adaptive pattern recognition based control system); U.S. Pat. No. 6,081,199 (Locking device for systems access to which is time-restricted); U.S. Pat. No. 6,079,621 (Secure card for E-commerce and identification); U.S. Pat. No. 6,078,265 (Fingerprint identification security system); U.S. Pat. No. 6,076,167 (Method and system for improving security in network applications); U.S. Pat. No. 6,075,455 (Biometric time and attendance system with epidermal topographical updating capability); U.S. Pat. No. 6,072,894 (Biometric face recognition for applicant screening); U.S. Pat. No. 6,070,141 (System and method of assessing the quality of an identification transaction using an identification quality score); U.S. Pat. No. 6,068,184 (Security card and system for use thereof); U.S. Pat. No. 6,064,751 (Document and signature data capture system and method); U.S. Pat. No. 6,056,197 (Information recording method for preventing alteration, information recording apparatus, and information recording medium); U.S. Pat. No. 6,052,468 (Method of securing a cryptographic key); U.S. Pat. No. 6,045,039 (Cardless automated teller transactions); U.S. Pat. No. 6,044,349 (Secure and convenient information storage and retrieval method and apparatus); U.S. Pat. No. 6,044,155 (Method and system for securely archiving core data secrets): U.S. Pat. No. 6,041,410 (Personal identification fob); U.S. Pat. No. 6,040,783 (System and method for remote, wireless positive identity verification); U.S. Pat. No. 6,038,666 (Remote identity verification technique using a personal identification device); U.S. Pat. No. 6,038,337 (Method and apparatus for object recognition); U.S. Pat. No. 6,038,315 (Method and system for normalizing biometric variations to authenticate users from a public database and that ensures individual biometric data privacy); U.S. Pat. No. 6,037,870 (Detector system for access control, and a detector assembly for implementing such a system); U.S. Pat. No. 6,035,406 (Plurality-factor security system); U.S. Pat. No. 6,035,402 (Virtual certificate authority); U.S. Pat. No. 6,035,398 (Cryptographic key generation using biometric data); U.S. Pat. No. 6,031,910 (Method and system for the secure transmission and storage of protectable information); U.S. Pat. No. 6,026,166 (Digitally certifying a user identity and a computer system in combination): U.S. Pat. No. 6,018,739 (Biometric personnel identification system); U.S. Pat. No. 6,016,476 (Portable information and transaction processing system and method utilizing biometric authorization and digital certificate security); U.S. Pat. No. 6,012,049 (System for performing financial transactions using a smartcard); U.S. Pat. No. 6,012,039 (Tokenless biometric electronic rewards system); U.S. Pat. No. 6,011,858 (Memory card having a biometric template stored thereon and system for using same); U.S. Pat. No. 6,009,177 (Enhanced cryptographic system and method with key escrow feature); U.S. Pat. No. 6,006,328 (Computer software authentication, protection, and security system); U.S. Pat. No. 6,003,135 (Modular security device); U.S. Pat. No. 6,002,770 (Method for secure data transmission between remote stations): U.S. Pat. No. 5,999,637 (Individual identification apparatus for selectively recording a reference pattern based on a correlation with comparative patterns); U.S. Pat. No. 5,999,095 (Electronic security system); U.S. Pat. No. 5,995,630 (Biometric input with encryption); U.S. Pat. No. 5,991,431 (Mouse adapted to scan biometric data); U.S. Pat. No. 5,991,429 (Facial recognition system for security access and identification); U.S. Pat. No. 5,991,408 (Identification and security using biometric measurements); U.S. Pat. No. 5,987,155 (Biometric input device with peripheral port); U.S. Pat. No. 5,987,153 (Automated verification and prevention of spoofing for biometric data); U.S. Pat. No. 5,986,746 (Topographical object detection system); U.S. Pat. No. 5,984,366 (Unalterable self-verifying articles); U.S. Pat. No. 5,982,894 (System including separable protected components and associated methods); U.S. Pat. No. 5,979,773 (Dual smart card access control electronic data storage and retrieval system and methods); U.S. Pat. No. 5,978,494 (Method of selecting the best enroll image for personal identification); U.S. Pat. No. 5,974,146 (Real time bank-centric universal payment system); U.S. Pat. No. 5,970,143 (Remote-auditing of computer generated outcomes, authenticated billing and access control, and software metering system using cryptographic and other protocols); U.S. Pat. No. 5,966,446 (Time-bracketing infrastructure implementation); U.S. Pat. No. 5,963,908 (Secure logon to notebook or desktop computers); U.S. Pat. No. 5,963,657 (Economical skin-pattern-acquisition and analysis apparatus for access control; systems controlled thereby); U.S. Pat. No. 5,954,583 (Secure access control system); U.S. Pat. No. 5,952,641 (Security device for controlling the access to a personal computer or to a computer terminal); U.S. Pat. No. 5,951,055 (Security document containing encoded data block); U.S. Pat. No. 5,949,881 (Apparatus and method for cryptographic companion imprinting); U.S. Pat. No. 5,949,879 (Auditable security system for the generation of cryptographically protected digital data); U.S. Pat. No. 5,949,046 (Apparatus for issuing integrated circuit cards); U.S. Pat. No. 5,943,423 (Smart token system for secure electronic transactions and identification); U.S. Pat. No. 5,935,071 (Ultrasonic biometric imaging and identity verification system); U.S. Pat. No. 5,933,515 (User identification through sequential input of fingerprints); U.S. Pat. No. 5,933,498 (System for controlling access and distribution of digital property); U.S. Pat. No. 5,930,804 (Web-based biometric authentication system and method); U.S. Pat. No. 5,923,763 (Method and apparatus for secure document timestamping); U.S. Pat. No. 5,920,477 (Human factored interface incorporating adaptive pattern recognition based controller apparatus); U.S. Pat. No. 5,920,384 (Optical imaging device); U.S. Pat. No. 5,920,058 (Holographic labeling and reading machine for authentication and security applications); U.S. Pat. No. 5,915,973 (System for administration of remotely-proctored, secure examinations and methods therefor); U.S. Pat. No. 5,913,196 (System and method for establishing identity of a speaker); U.S. Pat. No. 5,913,025 (Method and apparatus for proxy authentication); U.S. Pat. No. 5,912,974 (Apparatus and method for authentication of printed documents); U.S. Pat. No. 5,912,818 (System for tracking and dispensing medical items); U.S. Pat. No. 5,910,988 (Remote image capture with centralized processing and storage); U.S. Pat. No. 5,907,149 (Identification card with delimited usage); U.S. Pat. No. 5,901,246 (Ergonomic man-machine interface incorporating adaptive pattern recognition based control system); U.S. Pat. No. 5,898,154 (System and method for updating security information in a time-based electronic monetary system); U.S. Pat. No. 5,897,616 (Apparatus and methods for speaker verification/identification/classification employing non-acoustic and/or acoustic models and databases); U.S. Pat. No. 5,892,902 (Intelligent token protected system with network authentication); U.S. Pat. No. U.S. Pat. No. 5,892,838 (Biometric recognition using a classification neural network); U.S. Pat. No. 5,892,824 (Signature capture/verification systems and methods); U.S. Pat. No. 5,890,152 (Personal feedback browser for obtaining media files); U.S. Pat. No. 5,889,474 (Method and apparatus for transmitting subject status information over a wireless communications network); U.S. Pat. No. 5,881,226 (Computer security system); U.S. Pat. No. 5,878,144 (Digital certificates containing multimedia data extensions); U.S. Pat. No. 5,876,926 (Method, apparatus and system for verification of human medical data); U.S. Pat. No. 5,875,108 (Ergonomic man-machine interface incorporating adaptive pattern recognition based control system); U.S. Pat. No. 5,872,849 (Enhanced cryptographic system and method with key escrow feature); U.S. Pat. No. 5,872,848 (Method and apparatus for witnessed authentication of electronic documents); U.S. Pat. No. 5,872,834 (Telephone with biometric sensing device): U.S. Pat. No. 5,870,723 (Tokenless biometric transaction authorization method and system); U.S. Pat. No. 5,869,822 (Automated fingerprint identification system); U.S. Pat. No. 5,867,802 (Biometrically secured control system for preventing the unauthorized use of a vehicle); U.S. Pat. No. 5,867,795 (Portable electronic device with transceiver and visual image display); U.S. Pat. No. 5,867,578 (Adaptive multi-step digital signature system and method of operation thereof); U.S. Pat. No. 5,862,260 (Methods for surveying dissemination of proprietary empirical data); U.S. Pat. No. 5,862,246 (Knuckle profile identity verification system): U.S. Pat. No. 5,862,223 (Method and apparatus for a cryptographically-assisted commercial network system designed to facilitate and support expert-based commerce); U.S. Pat. No. 5,857,022 (Enhanced cryptographic system and method with key escrow feature); U.S. Pat. No. 5,850,451 (Enhanced cryptographic system and method with key escrow feature); U.S. Pat. No. 5,850,442 (Secure world wide electronic commerce over an open network); U.S. Pat. No. 5,848,231 (System configuration contingent upon secure input); U.S. Pat. No. 5,844,244 (Portable identification carrier); U.S. Pat. No. 5,841,907 (Spatial integrating optical correlator for verifying the authenticity of a person, product or thing); U.S. Pat. No. 5,841,886 (Security system for photographic identification); U.S. Pat. No. 5,841,865 (Enhanced cryptographic system and method with key escrow feature), U.S. Pat. No. 5,841,122 (Security structure with electronic smart card access thereto with transmission of power and data between the smart card and the smart card reader performed capacitively or inductively); U.S. Pat. No. 5,838,812 (Tokenless biometric transaction authorization system); U.S. Pat. No. 5,832,464 (System and method for efficiently processing payments via check and electronic funds transfer); U.S. Pat. No. 5,832,119 (Methods for controlling systems using control signals embedded in empirical data); U.S. Pat. No. 5,828,751 (Method and apparatus for secure measurement certification); U.S. Pat. No. 5,825,880 (Multi-step digital signature method and system); U.S. Pat. No. 5,825,871 (Information storage device for storing personal identification information); U.S. Pat. No. 5,815,577 (Methods and apparatus for securely encrypting data in conjunction with a personal computer); U.S. Pat. No. 5,815,252 (Biometric identification process and system utilizing multiple parameters scans for reduction of false negatives); U.S. Pat. No. 5,805,719 (Tokenless identification of individuals); U.S. Pat. No. 5,802,199 (Use sensitive identification system); U.S. Pat. No. 5,799,088 (Non-deterministic public key encryption system); U.S. Pat. No. 5,799,086 (Enhanced cryptographic system and method with key escrow feature); U.S. Pat. No. 5,799,083 (Event verification system); U.S. Pat. No. 5,790,674 (System and method of providing system integrity and positive audit capabilities to a positive identification system); U.S. Pat. No. 5,790,668 (Method and apparatus for securely handling data in a database of biometrics and associated data); U.S. Pat. No. 5,789,733 (Smart card with contactless optical interface); U.S. Pat. No. 5,787,187 (Systems and methods for biometric identification using the acoustic properties of the ear canal); U.S. Pat. No. 5,784,566 (System and method for negotiating security services and algorithms for communication across a computer network); U.S. Pat. No. 5,784,461 (Security system for controlling access to images and image related services); U.S. Pat. No. 5,774,551 (Pluggable account management interface with unified login and logout and multiple user authentication services); U.S. Pat. No. 5,771,071 (Apparatus for coupling multiple data sources onto a printed document); U.S. Pat. No. 5,770,849 (Smart card device with pager and visual image display); U.S. Pat. No. 5,768,382 (Remote-auditing of computer generated outcomes and authenticated billing and access control system using cryptographic and other protocols); U.S. Pat. No. 5,767,496 (Apparatus for processing symbol-encoded credit card information); U.S. Pat. No. 5,764,789 (Tokenless biometric ATM access system); U.S. Pat. No. 5,763,862 (Dual card smart card reader); U.S. Pat. No. 5,761,298 (Communications headset with universally adaptable receiver and voice transmitter); U.S. Pat. No.

5,757,916 (Method and apparatus for authenticating the location of remote users of networked computing systems); U.S. Pat. No. 5,757,431 (Apparatus for coupling multiple data sources onto a printed document); U.S. Pat. No. 5,751,836 (Automated, non-invasive iris recognition system and method); U.S. Pat. No. 5,751,809 (Apparatus and method for securing captured data transmitted between two sources); U.S. Pat. No. 5,748,738 (System and method for electronic transmission, storage and retrieval of authenticated documents); U.S. Pat. No. 5,745,573 (System and method for controlling access to a user secret): U.S. Pat. No. 5,745,555 (System and method using personal identification numbers and associated prompts for controlling unauthorized use of a security device and unauthorized access to a resource); U.S. Pat. No. 5,742,685 (Method for verifying an identification card and recording verification of same); U.S. Pat. No. 5,742,683 (System and method for managing multiple users with different privileges in an open metering system); U.S. Pat. No. 5,737,420 (Method for secure data transmission between remote stations); U.S. Pat. No. 5,734,154 (Smart card with integrated reader and visual image display); U.S. Pat. No. 5,719,950 (Biometric, personal authentication system); U.S. Pat. No. 5,712,914 (Digital certificates containing multimedia data extensions); U.S. Pat. No. 5,712,912 (Method and apparatus for securely handling a personal identification number or cryptographic key using biometric techniques); U.S. Pat. No. 5,706,427 (Authentication method for networks); U.S. Pat. No. 5,703,562 (Method for transferring data from an unsecured computer to a secured computer); U.S. Pat. No. 5,696,827 (Secure cryptographic methods for electronic transfer of information); U.S. Pat. No. 5,682,142 (Electronic control system/network); U.S. Pat. No. 5,682,032 (Capacitively coupled identity verification and escort memory apparatus); U.S. Pat. No. 5,680,460 (Biometric controlled key generation); U.S. Pat. No. 5,668,878 (Secure cryptographic methods for electronic transfer of information); U.S. Pat. No. 5,666,400 (Intelligent recognition); U.S. Pat. No. 5,659,616 (Method for securely using digital signatures in a commercial cryptographic system); U.S. Pat. No. 5,647,364 (Ultrasonic biometric imaging and identity verification system); U.S. Pat. No. 5,647,017 (Method and system for the verification of handwritten signatures); U.S. Pat. No. 5,646,839 (Telephone-based personnel tracking system); U.S. Pat. No. 5,636,282 (Method for dial-in access security using a multimedia modem); U.S. Pat. No. 5,633,932 (Apparatus and method for preventing disclosure through user-authentication at a printing node); U.S. Pat. No. 5,615,277 (Tokenless security system for authorizing access to a secured computer system); U.S. Pat. No. 5,613,012 (Tokenless identification system for authorization of electronic transactions and electronic transmissions); U.S. Pat. No. 5,608,387 (Personal identification devices and access control systems); U.S. Pat. No. 5,594,806 (Knuckle profile identity verification system); U.S. Pat. No. 5,592,408 (Identification card and access control device); U.S. Pat. No. 5,588,059 (Computer system and method, for secure remote communication sessions); U.S. Pat. No. 5,586,171 (Selection of a voice recognition data base responsive to video data); U.S. Pat. No. 5,583,950 (Method and apparatus for flash correlation); U.S. Pat. No. 5,583,933 (Method and apparatus for the secure communication of data); U.S. Pat. No. 5,578,808 (Data card that can be used for transactions involving separate card issuers); U.S. Pat. No. 5,572,596 (Automated, non-invasive iris recognition system and method); U.S. Pat. No. 5,561,718 (Classifying faces); U.S. Pat. No. 5,559,885 (Two stage read-write method for transaction cards); U.S. Pat. No. 5,557,765 (System and method for data recovery); U.S. Pat. No. 5,553,155 (Low cost method employing time slots for thwarting fraud in the periodic issuance of food stamps, unemployment benefits or other governmental human services); U.S. Pat. No. 5,544,255 (Method and system for the capture, storage, transport and authentication of handwritten signatures); U.S. Pat. No. 5,534,855 (Method and system for certificate based alias detection): U.S. Pat. No. 5,533,123 (Programmable distributed personal security); U.S. Pat. No. 5,526,428 (Access control apparatus and method); U.S. Pat. No. 5,523,739 (Metal detector for control of access combined in an integrated form with a transponder detector); U.S. Pat. No. 5,497,430 (Method and apparatus for image recognition using invariant feature signals); U.S. Pat. No. 5,485,519 (Enhanced security for a secure token code); U.S. Pat. No. 5,485,312 (Optical pattern recognition system and method for verifying the authenticity of a person, product or thing); U.S. Pat. No. 5,483,601 (Apparatus and method for biometric identification using silhouette and displacement images of a portion of a person's hand); U.S. Pat. No. 5,478,993 (Process as safety concept against unauthorized use of a payment instrument in cashless payment at payment sites); U.S. Pat. No. 5,475,839 (Method and structure for securing access to a computer system); U.S. Pat. No. 5,469,506 (Apparatus for verifying an identification card and identifying a person by means of a biometric characteristic); U.S. Pat. No. 5,457,747 (Anti-fraud verification system using a data card); U.S. Pat. No. 5,455,407 (Electronic-monetary system); U.S. Pat. No. 5,453,601 (Electronic-monetary system); U.S. Pat. No. 5,448,045 (System for protecting computers via intelligent tokens or smart cards); U.S. Pat. No. 5,432,864 (Identification card verification system); U.S. Pat. No. 5,414,755 (System and method for passive voice verification in a telephone network); U.S. Pat. No. 5,412,727 (Anti-fraud voter registration and voting system using a data card); U.S. Pat. No. 5,363,453 (Non-minutiae automatic fingerprint identification system and methods); U.S. Pat. No. 5,347,580 (Authentication method and system with a smartcard); U.S. Pat. No. 5,345,549 (Multimedia based security systems); U.S. Pat. No. 5,341,428 (Multiple cross-check document verification system); U.S. Pat. No. 5,335,288 (Apparatus and method for biometric identification); U.S. Pat. No. 5,291,560 (Biometric personal identification system based on iris analysis); U.S. Pat. No. 5,283,431 (Optical key security access system); U.S. Pat. No. 5,280,527 (Biometric token for authorizing access to a host system); U.S. Pat. No. 5,272,754 (Secure computer interface); U.S. Pat. No. 5,245,329 (Access control system with mechanical keys which store data); U.S. Pat. No. 5,229,764 (Continuous biometric authentication matrix); U.S. Pat. No. 5,228,094 (Process of identifying and authenticating data characterizing an individual); U.S. Pat. No. 5,224,173 (Method of reducing fraud in connection with employment, public license applications, social security, food stamps, welfare or other government benefits); U.S. Pat. No. 5,208,858 (Method for allocating useful data to a specific originator); U.S. Pat. No. 5,204,670 (Adaptable electric monitoring and identification system); U.S. Pat. No. 5,191,611 (Method and apparatus for protecting material on storage media and for transferring material on storage media to various recipients); U.S. Pat. No. 5,163,094 (Method for identifying individuals from analysis of elemental shapes derived from biosensor data); U.S. Pat. No. 5,155,680 (Billing system for computing software); U.S. Pat. No. 5,131,038 (Portable authentification system); U.S. Pat. No. 5,073,950 (Finger profile identification system); U.S. Pat.

No. 5,067,162 (Method and apparatus for verifying identity using image correlation); U.S. Pat. No. 5,065,429 (Method and apparatus for protecting material on storage media); U.S. Pat. No. 5,056,147 (Recognition procedure and an apparatus for carrying out the recognition procedure); U.S. Pat. No. 5,056,141 (Method and apparatus for the identification of personnel); U.S. Pat. No. 5,036,461 (Two-way authentication system between user's smart card and issuer-specific plug-in application modules in multi-issued transaction device); U.S. Pat. No. 5,020,105 (Field initialized authentication system for protective security of electronic information networks); U.S. Pat. No. 4,993,068 (Unforgettable personal identification system); U.S. Pat. No. 4,972,476 (Counterfeit proof ID card having a scrambled facial image); U.S. Pat. No. 4,961,142 (Multi-issuer transaction device with individual identification verification plug-in application modules for each issuer); U.S. Pat. No. 4,952,928 (Adaptable electronic monitoring and identification system); U.S. Pat. No. 4,941,173 (Device and method to render secure the transfer of data between a videotex terminal and a server); U.S. Pat. No. 4,926,480 (Card-computer moderated systems); U.S. Pat. No. 4,896,363 (Apparatus and method for matching image characteristics such as fingerprint minutiae); U.S. Pat. No. 4,890,323 (Data communication systems and methods); U.S. Pat. No. 4,868,376 (Intelligent portable interactive personal data system); U.S. Pat. No. 4,827,518 (Speaker verification system using integrated circuit cards); U.S. Pat. No. 4,819,267 (Solid state key for controlling access to computer systems and to computer software and/or for secure communications); U.S. Pat. No. 4,752,676 (Reliable secure, updatable "cash" card system); U.S. Pat. No. 4,736,203 (3D hand profile identification apparatus); U.S. Pat. No. 4,731,841 (Field initialized authentication system for protective security of electronic information networks); U.S. Pat. No. 4,564,018 (Ultrasonic system for obtaining ocular measurements), each of which is expressly incorporated herein by reference.

Content-based Query Servers

U.S. Pat. No. 5,987,459 (Swanson, et al. Nov. 16, 1999), expressly incorporated herein by reference, relates to an image and document management system for content-based retrieval support directly into the compressed files. The system minimizes a weighted sum of the expected size of the compressed files and the expected query response time. Object searching of documents stored by the system is possible on a scalable resolution basis. The system includes a novel object representation based on embedded prototypes that provides for high-quality browsing of retrieval images at low bit rates.

U.S. Pat. No. 6,038,560 (Wical, Mar. 14, 2000), expressly incorporated herein by reference, relates to a concept knowledge base search and retrieval system, which includes factual knowledge base queries and concept knowledge base queries, is disclosed. A knowledge base stores associations among terminology/categories that have a lexical, semantic or usage association. Document theme vectors identify the content of documents through themes as well as through classification of the documents in categories that reflects what the documents are primarily about. The factual knowledge base queries identify, in response to an input query, documents relevant to the input query through expansion of the query terms as well as through expansion of themes. The concept knowledge base query does not identify specific documents in response to a query, but specifies terminology that identifies the potential existence of documents in a particular area.

U.S. Pat. No. 6,067,466 (Selker, et al., May 23, 2000), expressly incorporated herein by reference, relates to a diagnostic tool using a predictive instrument. A method is provided for evaluating a medical condition of a patient including the steps of monitoring one or more clinical features of a patient; based on the monitored features, computing a primary probability of a medical outcome or diagnosis; computing a plurality of conditional probabilities for a selected diagnostic test, the computed conditional probabilities including a first probability of the medical outcome or diagnosis assuming the selected diagnostic test produces a first outcome and a second probability of the medical outcome or diagnosis assuming the selected diagnostic test produces a second outcome; and displaying the computed primary probability as well as the plurality of computed conditional probabilities to a user as an aid to determining whether to administer the selected diagnostic test to the patient.

E-Commerce Systems

U.S. Pat. No. 5,946,669 (Polk, Aug. 31, 1999), expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939 (Fortenberry, et al., Dec. 21, 1999), expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484 (Williams, et al., Jan. 18, 2000), expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150 (Kravitz, Feb. 22, 2000), expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269 (Biffar, Apr. 4, 2000), expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices that are linked to a central system. The central system can e linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

Micropayments

U.S. Pat. No. 5,999,919 (Jarecki, et al., Dec. 7, 1999), expressly incorporated herein by reference, relates to an efficient micropayment system. Existing software proposals for electronic payments can be divided into "on-line" schemes which require participation of a trusted party (the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs. The following U.S. Patents, expressly incorporated herein by reference, define aspects of micropayment, digital certificate, and on-line payment systems: U.S. Pat. No. 5,930,777 (Barber, Jul. 27, 1999, Method of charging for pay-per-access information over a network); U.S. Pat. No. 5,857,023 (Jan. 5, 1999, Demers et al. Space efficient method of redeeming electronic payments); U.S. Pat. No. 5,815,657 (Sep. 29, 1998, Williams, System, method and article of manufacture for network electronic authorization utilizing an authorization instrument); U.S. Pat. No. 5,793,868 (Aug. 11, 1998, Micali, Certificate revocation system), U.S. Pat. No. 5,717,757 (Feb. 10, 1998, Micali, Certificate issue lists); U.S. Pat. No. 5,666,416 (Sep. 9, 1997, Micali, Certificate revocation system); U.S. Pat. No. 5,677,955 (Doggett et al., Electronic funds transfer instruments); U.S. Pat. No. 5,839,119 (Nov. 17, 1998, Krsul; et al., Method of electronic payments that prevents double-spending); U.S. Pat. No. 5,915,093 (Berlin et al.); U.S. Pat. No. 5,937,394 (Wong, et al.); U.S. Pat. No. 5,933,498 (Schneck et al.); U.S. Pat. No. 5,903,880 (Biffar); U.S. Pat. No. 5,903,651 (Kocher); U.S. Pat. No. 5,884,277 (Khosla); U.S. Pat. No. 5,960,083 (Sep. 28, 1999, Micali, Certificate revocation system); U.S. Pat. No. 5,963,924 (Oct. 5, 1999, Williams et al., System, method and article of manufacture for the use of payment instrument holders and payment instruments in network electronic commerce); U.S. Pat. No. 5,996,076 (Rowney et al., System, method and article of manufacture for secure digital certification of electronic commerce); U.S. Pat. No. 6,016,484 (Jan. 18, 2000, Williams et al., System, method and article of manufacture for network electronic payment instrument and certification of payment and credit collection utilizing a payment); U.S. Pat. No. 6,018,724 (Arent); U.S. Pat. No. 6,021,202 (Anderson et al., Method and system for processing electronic documents); U.S. Pat.

No. 6,035,402 (Vaeth et al.); U.S. Pat. No. 6,049,786 (Smorodinsky); U.S. Pat. No. 6,049,787 (Takahashi, et al.); U.S. Pat. No. 6,058,381 (Nelson, Many-to-many payments system for network content materials); U.S. Pat. No. 6,061,448 (Smith, et al.); U.S. Pat. No. 5,987,132 (Nov. 16, 1999, Rowney, System, method and article of manufacture for conditionally accepting a payment method utilizing an extensible, flexible architecture); U.S. Pat. No. 6,057,872 (Candelore); and U.S. Pat. No. 6,061,665 (May 9, 2000, Bahreman, System, method and article of manufacture for dynamic negotiation of a network payment framework). See also, Rivest and Shamir, "PayWord and MicroMint: Two Simple Micropayment Schemes" (May 7, 1996); Micro PAYMENT transfer Protocol (MPTP) Version 0.1 (22 Nov. 1995) et seq., http://www.w3.org/pub/WWW/TR/WD-mptp: Common Markup for web Micropayment Systems, http://www.w3.org/TR/WD-Micropayment-Markup (9 Jun. 1999); "Distributing Intellectual Property: a Model of Microtransaction Based Upon Metadata and Digital Signatures", Olivia, Maurizio, http:// olivia.modlang.denison.edu/~olivia/RFC/09/, all of which are expressly incorporated herein by reference.

See, also: U.S. Pat. No. 4,977,595 (Dec. 11, 1990, Method and apparatus for implementing electronic cash); U.S. Pat. No. 5,224,162 (Jun. 29, 1993, Electronic cash system); U.S. Pat. No. 5,237,159 (Aug. 17, 1993, Electronic check presentment system); U.S. Pat. No. 5,392,353 (February 1995, Morales, TV Answer, Inc. Interactive satellite broadcast network); U.S. Pat. No. 5,511,121 (Apr. 23, 1996, Efficient electronic money); U.S. Pat. No. 5,621,201 (April 1997, Langhans et al., Visa International Automated purchasing control system); U.S. Pat. No. 5,623,547 (Apr. 22, 1997, Value transfer system); U.S. Pat. No. 5,679,940 (October 1997, Templeton et al., TeleCheck International. Inc. Transaction system with on/off line risk assessment); U.S. Pat. No. 5,696,908 (December 1997, Muehlberger et al., Southeast Phonecard, Inc. Telephone debit card dispenser and method); U.S. Pat. No. 5,754,939 (May 1998, Herz et al., System for generation of user profiles for a system for customized electronic identification of desirable objects); U.S. Pat. No. 5,768,385 (Jun. 16, 1998, Untraceable electronic cash); U.S. Pat. No. 5,799,087 (Aug. 25, 1998, Electronic-monetary system); U.S. Pat. No. 5,812,668 (Sep. 22, 1998, System, method and article of manufacture for verifying the operation of a remote transaction clearance system utilizing a multichannel, extensible, flexible architecture); U.S. Pat. No. 5,828,840 (Oct. 27, 1998, Server for starting client application on client if client is network terminal and initiating client application on server if client is non network terminal); U.S. Pat. No. 5,832,089 (Nov. 3, 1998, Off-line compatible electronic cash method and system); U.S. Pat. No. 5,850,446 (Dec. 15, 1998, System, method and article of manufacture for virtual point of sale processing utilizing an extensible, flexible architecture); U.S. Pat. No. 5,889,862 (Mar. 30, 1999, Method and apparatus for implementing traceable electronic cash); U.S. Pat. No. 5,889,863 (Mar. 30, 1999, System, method and article of manufacture for remote virtual point of sale processing utilizing a multichannel, extensible, flexible architecture); U.S. Pat. No. 5,898,154 (Apr. 27, 1999, System and method for updating security information in a time-based electronic monetary system); U.S. Pat. No. 5,901,229 (May 4, 1999, Electronic cash implementing method using a trustee); U.S. Pat. No. 5,920,629 (Jul. 6, 1999, Electronic-monetary system); U.S. Pat. No. 5,926,548 (Jul. 20, 1999, Method and apparatus for implementing hierarchical electronic cash); U.S. Pat. No. 5,943,424 (Aug. 24, 1999, System, method and article of manufacture for processing a plurality of transactions from a single initiation point on a multichannel, extensible, flexible architecture); U.S. Pat. No. 5,949,045 (Sep. 7, 1999, Micro-dynamic simulation of electronic cash transactions); U.S. Pat. No. 5,952,638 (Sep. 14, 1999, Space efficient method of electronic payments); U.S. Pat. No. 5,963,648 (Oct. 5, 1999, Electronic-monetary system); U.S. Pat. No. 5,978,840 (System, method and article of manufacture for a payment gateway system architecture for processing encrypted payment transactions utilizing a multichannel, extensible, flexible architecture); U.S. Pat. No. 5,983,208 (Nov. 9, 1999, System, method and article of manufacture for handling transaction results in a gateway payment architecture utilizing a multichannel, extensible, flexible architecture); U.S. Pat. No. 5,987,140 (Nov. 16, 1999, System, method and article of manufacture for secure network electronic payment and credit collection); U.S. Pat. No. 6,002,767 (Dec. 14, 1999, System, method and article of manufacture for a modular gateway server architecture); U.S. Pat. No. 6,003,765 (Dec. 21, 1999, Electronic cash implementing method with a surveillance institution, and user apparatus and surveillance institution apparatus for implementing the same); U.S. Pat. No. 6,021,399 (Feb. 1, 2000, Space efficient method of verifying electronic payments); U.S. Pat. No. 6,026,379 (Feb. 15, 2000, System, method and article of manufacture for managing transactions in a high availability system); U.S. Pat. No. 6,029,150 (Feb. 22, 2000, Payment and transactions in electronic commerce system); U.S. Pat. No. 6,029,151 (Feb. 22, 2000, Method and system for performing electronic money transactions); U.S. Pat. No. 6,047,067 (Apr. 4, 2000, Electronic-monetary system); U.S. Pat. No. 6,047,887 (Apr. 11, 2000, System and method for connecting money modules); U.S. Pat. No. 6,055,508 (Apr. 25, 2000, Method for secure accounting and auditing on a communications network); U.S. Pat. No. 6,065,675 (May 23, 2000, Processing system and method for a heterogeneous electronic cash environment); U.S. Pat. No. 6,072,870 (Jun. 6, 2000, System, method and article of manufacture for a gateway payment architecture utilizing a multichannel, extensible, flexible architecture); U.S. Pat. No. 6,119,946 (Sep. 19, 2000, Countable electronic monetary system and method), each of which is expressly incorporated herein by reference.

Other References

In addition, the following patents are considered relevant to the data compression and pattern recognition functions of the apparatus and interface of the present invention and are incorporated herein by reference: U.S. Pat. Nos. 3,609,684; 3,849,760;3,950,733; 3,967,241; 4,025,851; 4,044,243; 4,100,370; 4,118,730; 4,148,061; 4,213,183; 4,225,850; 4,228,421; 4,230,990; 4,245,245; 4,254,474; 4,264,924; 4,264,925; 4,305,131; 4,326,259; 4,331,974; 4,338,626; 4,390,904; 4,395,780; 4,420.769; 4,442,544; 4,449,240; 4,450,531; 4,468,704; 4,491,962; 4,499,601; 4,501,016; 4,511,918; 4,543,660; 4,546,382; 4,547,811; 4,547,899; 4,581,762; 4,593,367; 4,602,279; 4,630,308; 4,646,250; 4,656,665; 4,658,429; 4,658,370; 4,660,166; 4,677,466; 4,697,209; 4,672,683; 4,677,680; 4,682,365; 4,685,145; 4,695,975; 4,710,822; 4,710,964; 4,716,404; 4,719,591; 4,731,863; 4,734,786; 4,736,439; 4,739,398; 4,742,557; 4,747,148; 4,752,890; 4,653,109; 4,760,604; 4,764,971; 4,764,973; 4,771,467; 4,773,024; 4,773,099; 4,774,677; 4,775,935; 4,783,752; 4,783,754; 4,783,829; 4,789,933; 4,790,025; 4,799,270; 4,802,103; 4,803,103; 4,803,736; 4,805,224; 4,805,225; 4,805,255; 4,809,331; 4,809,341; 4,817,171; 4,817,176; 4,821,333; 4,823,194; 4,829,453; 4,831,659; 4,833,637; 4,837,842; 4,843,562; 4,843,631;

4,845,610; 4,864,629; 4,872,024; 4,876,731; 4,881,270; 4,884,217; 4,887,304; 4,888,814; 4,891,762; 4,893,346; 4,897,811; 4,905,162; 4,905,286; 4,905,296; 4,906,099; 4,906,940; 4,908,758; 4,914,708; 4,920,499; 4,926,491; 4,930,160; 4,931,926; 4,932,065; 4,933,872; 4,941,193; 4,944,023; 4,949,187; 4,956,870; 4,958,375; 4,958,375; 4,964,077; 4,965,725; 4,967,273; 4,972,499; 4,979,222; 4,987,604; 4,989,256; 4,989,258; 4,992,940; 4,995,078; 5,012,334; 5,014,219; 5,014,327; 5,018,218; 5,018,219; 5,019,899; 5,020,112; 5,020,113; 5,022,062; 5,027,400; 5,031,224; 5,033,101; 5,034,991; 5,038,379; 5,038,390; 5,040,134; 5,046,121; 5,046,122; 5,046,179; 5,047,867; 5,048,112; 5,050,223; 5,051,840; 5,052,043; 5,052,045; 5,052,046; 5,053,974; 5,054,093; 5,054,095; 5,054,101; 5,054,103; 5,055,658; 5,055,926; 5,056,147; 5,058,179; 5,058,180; 5,058,183; 5,058,186; 5,059,126; 5,060,276; 5,060,277; 5,060,279; 5,060,282; 5,060,285; 5,061,063; 5,063,524; 5,063,525; 5,063,603; 5,063,605; 5,063,608; 5,065,439; 5,065,440; 5,065,447; 5,067,160; 5,067,161; 5,067,162; 5,067,163; 5,067,164; 5,068,664; 5,068,723; 5,068,724; 5,068,744; 5,068,909; 5,068,911; 5,076,662; 5,099,422; 5,103,498; 5,109,431; 5,111,516; 5,119,507; 5,122,886; 5,130,792; 5,132,992; 5,133,021; 5,133,079; 5,134,719; 5,148,497; 5,148,522; 5,155,591; 5,159,474; 5,161,204; 5,168,529; 5,173,949; 5,177,796; 5,179,652; 5,202,828; 5,220,420; 5,220,648; 5,223,924; 5,231,494; 5,239,617; 5,247,347; 5,247,651; 5,259,038; 5,274,714; 5,283,641; 5,303,313; 5,305,197; 5,307,421; 5,315,670; 5,317,647; 5,317,677; 5,343,251; 5,351,078; 5,357,276; 5,381,158; 5,384,867; 5,388,198; 5,390,125; 5,390,281; 5,410,343; 5,410,643; 5,416,856; 5,418,951; 5,420,975; 5,421,008; 5,428,559; 5,428,727; 5,428,730; 5,428,774; 5,430,812; 5,434,933; 5,434,966; 5,436,653; 5,436,834; 5,440,400; 5,446,891; 5,446,919; 5,455,892; 5,459,517; 5,461,699; 5,465,308; 5,469,206; 5,477,447; 5,479,264; 5,481,294; 5,481,712; 5,483,278; 5,485,219; 5,485,518; 5,487,132; 5,488,425; 5,488,484; 5,495,292; 5,496,177; 5,497,314; 5,502,774; 5,504,518; 5,506,768; 5,510,838; 5,511,134; 5,511,153; 5,515,098; 5,515,099; 5,515,173; 5,515,453; 5,515,471; 5,517,598; 5,519,452; 5,521,841; 5,521,984; 5,522,155; 5,523,796; 5,524,065; 5,526,427; 5,535,302; 5,541,638; 5,541,662; 5,541,738; 5,543,929; 5,544,254; 5,546,475; 5,548,667; 5,550,575; 5,550,928; 5,550,965; 5,552,833; 5,553,221; 5,553,277; 5,554,983; 5,555,495; 5,557,728; 5,559,548; 5,560,011; 5,561,649; 5,561,718; 5,561,796; 5,566,274; 5,572,604; 5,574,845; 5,576,950; 5,579,471; 5,581,658; 5,586,218; 5,588,074; 5,592,560; 5,574,845; 5,579,471; 5,581,665; 5,581,800; 5,583,560; 5,586,025; 5,594,661; 5,594,911; 5,596,705; 5,600,733; 5,600,775; 5,604,542; 5,604,820; 5,604,823; 5,606,655; 5,611,020; 5,613,032; 5,614,940; 5,617,483; 5,617,565; 5,621,454; 5,621,484; 5,621,579; 5,621,903; 5,625,715; 5,625,783; 5,627,915; 5,634,849; 5,635,986; 5,642,434; 5,644,686; 5,644,735; 5,654,771; 5,655,117; 5,657,397; 5,659,653; 5,659,368; 5,659,732; 5,664,046; 5,668,897; 5,671,343; 5,671,411; 5,682,437; 5,696,964; 5,701,369; 5,710,601; 5,710,833; 5,710,834; 5,715,400; 5,717,814; 5,724,424; 5,724,472; 5,729,741; 5,734,893; 5,737,444; 5,740,274; 5,745,126; 5,745,640; 5,745,710; 5,751,286; 5,751,831; 5,754,938; 5,758,257; 5,761,655; 5,764,809; 5,767,893; 5,767,922; 5,768,421; 5,768,426; 5,768,437; 5,778,181; 5,797,001; 5,798,785; 5,799,109; 5,801,750; 5,801,753; 5,805,763; 5,809,471; 5,819,288; 5,828,809; 5,835,087; 5,850,352; 5,852,823; 5,857,181; 5,862,260; H 331; and Re. 33,316. The aforementioned patents, some of which are mentioned elsewhere in this disclosure, and which form a part of this disclosure, may be applied in known manner by those skilled in the art in order to practice various embodiments of the present invention.

The following scientific articles, some of which are discussed elsewhere herein, are understood by those skilled in the art and relate to the pattern recognition and image compression functions of the apparatus and interface of the present invention:

"Fractal Geometry-Understanding Chaos", Georgia Tech Alumni Magazine, p. 16 (Spring 1986).

"Fractal Modelling of Biological Structures", School of Mathematics, Georgia Institute of Technology (date unknown).

"Fractal Modelling of Real World Images", Lecture Notes for Fractals: Introduction, Basics and Perspectives, Sig-graph (1987).

"Fractals Yield High Compression", Electronic Engineering Times, Sep. 30, 1991, p. 39.

"Fractals—A Geometry of Nature", Georgia Institute of Technology Research Horizons, p. 9 (Spring 1986).

"Voice Recognition and Speech Processing", Elektor Electronics, September 1985, pp. 56–57.

Aleksander, I., "Guide to Pattern Recognition Using Random-Access Memories", Computers and Digital Techniques, 2(1):29–40 (February 1979).

Anderson, F., W. Christiansen, B. Kortegaard, "Real Time, Video Image Centroid Tracker", Apr. 16–20, 1990.

Anson, L., M. Barnsley, "Graphics Compression Technology", SunWorld, pp. 43–52 (October 1991).

Appriou, A., "Interet des theories de l'incertain en fusion de donnees", Colloque International sur le Radar Paris, 24–28 avril 1989.

Appriou, A., "Procedure d'aide a la decision multi-informateurs. Applications a la classification multi-capteurs de cibles", Symposium de l'Avionics Panel (AGARD) Turquie, 25–29 avril 1988.

Arrow, K. J., "Social choice and individual valves", John Wiley and Sons Inc. (1963).

Barnsley et al., "A Better Way to Compress Images", Byte Magazine, January 1988.

Barnsley et al., "Harnessing Chaos For Images Systhesis", Computer Graphics, 22(4) (August 1988).

Barnsley et al., "Hidden Variable Fractal Interpolation Functions", School of Mathematics, Georgia Institute of Technology, Atlanta, Ga. 30332, July, 1986.

Batchelor, B. G., "Pattern Recognition, Ideas in Practice", Plenum Press, London and New York, (1978).

Batchelor, B. G., "Practical Approach to Pattern Classification", Plenum Press, London and New York, (1974).

Bellman, R. E., L. A. Zadeh, "Decision making in a fuzzy environment", Management Science, 17(4) (December 1970).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Blair, D., R. Pollack, "La logique du choix collectif", Pour la Science (1983).

Burr, D. J., "A Neural Network Digit Recognizer", Proceedings of the 1986 IEEE International Conference of Systems, Man and Cybernetics, Atlanta, Ga., pp. 1621–1625.

Caffery, B., "Fractal Compression Breakthrough for Multimedia Applications", Inside, Oct. 9, 1991.

Carpenter, G. A., S. Grossberg, "The Art of Adaptive Pattern Recognition by a Self-Organizing Neural Network", IEEE Computer, March 1988, pp. 77–88.

Casasent, D., et al., "General I and Q Data Processing on a Multichannel AO System". Applied Optics, 25(18):3217–24 (Sep. 15, 1986).

Caudill, M., "Neural Networks Primer-Part III", AI Expert, June 1988, pp. 53–59.

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering*, 2026:472–82(1993).

Chen et al., "Adaptive Coding of Monochrome and Color Images", November 1977, pp. 1285–1292.

Cheong, C. K.; Aizawa, K.; Saito, T.; Hatori, M., "Adaptive edge detection with fractal dimension", *Transactions of the Institute of Electronics, Information and Communication Engineers D-II*, J76D-II(11):2459–63 (1993).

Computer Visions, Graphics, and Image Processing, 1987, 37:54–115.

Computers and Biomedical Research 5, 388–410 (1972).

Cooper, L. N., "A Possible Organization of Animal Memory and Learning", Nobel 24, (1973). Collective Properties of Physical Systems, pp. 252–264.

Crawford et al., "Adaptive Pattern Recognition Applied To An Expert System For Fault Diagnosis In Telecommunications Equipment", pp. 10/1–8 (Inspec. Abstract No. 86C010699, Inspec IEE (London) & IEE Coll. on "Adaptive Filters", Digest No. 76, Oct. 10, 1985).

Danielsson, Erik, et al., "Computer Architectures for Pictorial Inf. Systems", IEEE Computer, November, 1981, pp. 53–67.

Dempster, A. P., "A generalization of Bayesian inference", Journal of the Royal Statistical Society, Vol. 30, Series B (1968).

Dempster, A. P., "Upper and lower probabilities induced by a multivalued mapping", Annals of mathematical Statistics, no. 38 (1967).

Denker, 1984 International Test Conf., October 1984, Philadelphia, Pa., pp. 558–563.

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Duda, R. O., P. E. Hart, M. J. Nilsson, "Subjective Bayesian methods for rule-based inference systems", Technical Note 124, Artificial Intelligence Center, SRI International.

Dunning, B. B., "Self-Learning Data-Base For Automated Fault Localization", IEEE, 1979, pp. 155–157.

Farrelle, Paul M. and Jain, Anil K., "Recursive Block Coding—A New Approach to Transform Coding", IEEE Transactions on Communications, Com. 34(2) (February 1986).

Fitzpatrick, J. M., J. J. Grefenstette, D. Van Gucht, "Image Registration by Genetic Search", Conf. Proc., IEEE Southeastcon 1984, pp. 460–464.

Fua, P. V., "Using probability density functions in the framework of evidential reasoning Uncertainty in knowledge based systems", B. Bouchon, R. R. Yager, Eds. Springer Verlag (1987).

Gogoussis et al., Proc. SPIE Intl. Soc. Opt. Eng., November 1984, Cambridge, Mass., pp. 121–127.

Grossberg, S., G. Carpenter, "A Massively Parallel Architecture for a Self-Organizing Neural Pattern Recognition Machine", Computer Vision, Graphics, and Image Processing, 1987, 37, 54–115, 252–315.

Gullichsen, E., E. Chang, "Pattern Classification by Neural Network: An Experiment System for Icon Recognition", ICNN Proceeding on Neural Networks, March 1987, pp. IV-725–32.

Haruki, K. et al., "Pattern Recognition of Handwritten Phonetic Japanese Alphabet Characters", International Joint Conference on Neural Networks, Washington, D.C., January 1990, pp. II-515 to II-518.

Hayashi, Y., et al., "Alphanumeric Character Recognition Using a Connectionist Model with the Pocket Algorithm", Proceedings of the International Joint Conference on Neural Networks. Washington, D.C. Jun. 18–22, 1989, vol. 2, pp. 606–613.

Hayes, H. I.; Solka, J. L.; Priebe, C. E.; "Parallel computation of fractal dimension", *Proceedings of the SPIE—The International Society for Optical Engineering*, 1962:219–30 (1993).

Hinton et al., "Boltzmann Machines: Constraint Satisfaction Networks that Learn", Tech. Report CMU-CS-85-119, Carnegie-Mellon Univ, May 1984.

Hoare, F.; de Jager, G., "Neural networks for extracting features of objects in images as a pre-processing stage to pattern classification", Proceedings of the 1992 South African Symposium on Communications and Signal Processing. COMSIG '92 (Cat. No.92TH0482-0). Inggs, M. (Ed.), p. 239–42 (1992).

Hopfield et al., "Computing with Neural Circuits: A Model". Science, 233:625–633 (8 Aug. 1986).

Hopfield, "Neural Networks and Physical Systems with Emergent Collective Computational Abilities", Proc. Natl. Acad. Sci. USA, 79:2554–2558 (April 1982).

Hopfield, "Neurons with graded response have collective computational properties like those of two-state neurons", Proc. Natl. Acad. Sci. USA, 81:3088–3092 (May 1984).

Hurtgen, B.; Buttgen, P., "Fractal approach to low rate video coding", *Proceedings of the SPIE—The International Society for Optical Engineering*, 2094(pt.1):120–31 (1993).

Information Processing 71, North-Holland Publishing Company (1972) pp. 1530–1533.

Ishizuka, M., "Inference methods based on extended Dempster and Shafer's theory for problems with uncertainty/fuzziness", New Generation Computing, Ohmsha, Ltd, and Springer Verlag, 1:159–168 (1983).

Jackel, L. D., H. P. Graf, J. S. Denker, D. Henderson and I. Guyon, "An Application of Neural Net Chips: Handwritten Digit Recognition", ICNN Proceeding, 1988, pp. II-107–15.

Jean, J. S. N., et al., "Input Representation and Output Voting Considerations for Handwritten Numeral Recognition with Backpropagation". International Joint Conference on Neural Networks, Washington, D.C., January 1990, pp. I-408 to I-411.

Jeffrey, R. J., "The logic of decision", The University of Chicago Press, Ltd., London (1983) (2nd Ed.).

Kaufmann, A., "Introduction a la theorie des sous-ensembles flous", Vol. 1, 2 et 3, Masson, Paris (1975).

Keeney, R. L., B. Raiffa, "Decisions with multiple objectives: Preferences and value tradeoffs", John Wiley and Sons, New York (1976).

Kellman, P., "Time Integrating Optical Signal Processing", Ph. D. Dissertation, Stanford University, 1979, pp. 51–55.

Kim, D. H.; Caulfield, H. J.; Jannson, T.; Kostrzewski, A.; Savant, G, "Optical fractal image processor for noise-embedded targets detection", Proceedings of the SPIE—The International Society for Optical Engineering, Vol: 2026 p. 144–9 (1993) (SPIE Conf: Photonics for Processors, Neural Networks, and Memories 12–15 Jul. 1993, San Diego, Calif., USA).

Kohonen, "Self-Organization & Memory", Second Ed., 1988, Springer-Verlag, pp. 199–209.

Kortegaard, B. L., "PAC-MAN, a Precision Alignment Control System for Multiple Laser Beams Self-Adaptive Through the Use of Noise", Los Alamos National Laboratory, date unknown.

Kortegaard, B. L., "Superfine Laser Position Control Using Statistically Enhanced Resolution in Real Time", Los Alamos National Laboratory, SPIE-Los Angeles Technical Symposium, Jan. 23–25, 1985.

Ksienski et al., "Low Frequency Approach to Target Identification". Proc. of the IEEE, 63(12):1651–1660 (December 1975).

Kyburg, H. E., "Bayesian and non Bayesian evidential updating", Artificial Intelligence 31:271–293 (1987).

LeCun, Y. et al., "Handwritten Digit Recognition: Applications of Neural.", IEEE Comm. Magazine, November 1989, pp. 41–46.

LeCun, Y., "Connectionism in Perspective", in R. Pfeifer, Z. Schreter, F. Fogelman, L. Steels (Eds.), 1989, "Generalization and Network Design Strategies", pp. 143–155.

Liepins, G. E., M. R. Hilliard, "Genetic Algorithms: Foundations & Applications", Annals of Operations Research, 21:31–58 (1989).

Lin, H. K., et al., "Real-Time Screen-Aided Multiple-Image Optical Holographic Matched-Filter Correlator", Applied Optics, 21(18):3278–3286 (Sep. 15, 1982).

Lippman, R. P., "An Introduction to Computing with Neural Nets". IEEE ASSP Magazine, April 1987, pp. 4–22.

Lippmann, R. P., "An Introduction to Computing with Neural Nets", IEEE ASSP Magazine, vol. 4(2):4–22 (April 1987).

Liu, Y., "Extensions of fractal theory". Proceedings of the SPIE—The International Society for Optical Engineering, 1966:255–68(1993).

Liu, Y., "Pattern recognition using Hilbert-space", Proceedings of the SPIE—The International Society for Optical Engineering, 1825:63–77 (1992).

Mahalanobis, A., et al., "Minimum Average Correlation Energy Filters", Applied Optics, 26(17):3633–40 (Sep. 1, 1987).

Martin, G. L. et al., "Recognizing Hand-Printed Letters and Digits Using Backpropagation Learning", Technical Report of the MCC, Human Interface Laboratory, Austin, Tex., January 1990, pp. 1–9.

McAulay, A. D., J. C. Oh, "Image Learning Classifier System Using Genetic Algorithms", IEEE Proc. of the National Aerospace & Electronics Conference, 2:705–710 (1989).

Miller, R. K., Neural Networks ((c) 1989: Fairmont Press, Lilburn, Ga.), pp. 2–12 and Chapter 4, "Implementation of Neural Networks", pp. 4-1 to 4-26.

Molley, P., "Implementing the Difference-Squared Error Algorithm Using An Acousto-Optic Processor", SPIE, 1098:232–239 (1989).

Molley, P., et al., "A High Dynamic Range Acousto-Optic Image Correlator for Real-Time Pattern Recognition", SPIE, 938:55–65 (1988).

Mori, "Towards the construction of a large-scale neural network", Electronics Information Communications Association Bulletin PRU 88-59, pp. 87–94.

Naik et al., "High Performance Speaker Verification.", ICASSP 86, Tokyo, CH2243-4/86/0000-0881, IEEE 1986, pp. 881–884.

Ney, H., et al., "A Data Driven Organization of the Dynamic Programming Beam Search for Continuous Speech Recognition", Proc. ICASSP 87, pp. 833–836, 1987.

Nilsson, N.J., The Mathematical Foundations of Learning Machines ((c) 1990: Morgan Kaufmann Publishers, San Mateo, Calif.) and particularly section 2.6 "The Threshold Logic Unit (TLU)", pp. 21–23 and Chapter 6, "Layered Machines" pp. 95–114.

Ohsuga et al., "Entrainment of Two Coupled van der Pol Oscillators by an External Oscillation", Biological Cybernetics, 51:225–239 (1985).

Omata et al., "Holonic Model of Motion Perception", IEICE Technical Reports, Mar. 26, 1988, pp. 339–346.

O'Neal et al., "Coding Isotropic Images", November 1977, pp. 697–707.

Pawlicki, T. F., D. S. Lee, J. J. Hull and S. N. Srihari, "Neural Network Models and their Application to Handwritten Digit Recognition", ICNN Proceeding, 1988, pp. II-63–70.

Perry et al., "Auto-Indexing Storage Device", IBM Tech. Disc. Bulletin, 12(8):1219 (January 1970).

Peterson, Ivars, "Packing It In", Science News, 131(18):283–285 (May 2, 1987).

Priebe, C. E.; Solka, J. L.; Rogers, G. W., "Discriminant analysis in aerial images using fractal based features", Proceedings of the SPIE—The International Society for Optical Engineering, 1962:196–208(1993).

Proceedings, 6th International Conference on Pattern Recognition 1982, pp. 152–136.

Psaltis, D., "Incoherent Electro-Optic Image Correlator", Optical Engineering, 23(1):12–15 (January/February 1984).

Psaltis, D., "Two-Dimensional Optical Processing Using One-Dimensional Input Devices", Proceedings of the IEEE, 72(7):962–974 (July 1984).

Rahmati, M.; Hassebrook, L. G., "Intensity- and distortion-invariant pattern recognition with complex linear morphology", Pattern Recognition, 27 (4):549–68(1994).

Reusens, E., "Sequence coding based on the fractal theory of iterated transformations systems", Proceedings of the SPIE—The International Society for Optical Engineering, 2094(pt. 1): 132–40(1993).

Rhodes, W., "Acousto-Optic Signal Processing: Convolution and Correlation", Proc. of the IEEE, 69(1):65–79 (January 1981).

Rosenfeld, Azriel and Avinash C. Kak, Digital Picture Processing, Second Edition, Volume 2, Academic Press, 1982.

Roy, B., "Classements et choix en presence de points de vue multiples", R.I.R.O.-2eme annee-no. 8, pp. 57–75 (1968).

Roy, B., "Electre III: un algorithme de classements fonde sur une representation floue des preferences en presence de criteres multiples", Cahiers du CERO, 20(1):3–24 (1978).

Rumelhart, D. E., et al., "Learning Internal Representations by Error Propagation", Parallel Distr. Proc.: Explorations in Microstructure of Cognition, 1:318–362 (1986).

Rumelhart, D. E., et al., Parallel Distributed Processing, ((c) 1986: MIT Press, Cambridge, Mass.), and specifically Chapter 8 thereof, "Learning Internal Representations by Error Propagation", pp. 318–362.

Rutherford, H. G., F. Taub and B. Williams, "Object Identification and Measurement from Images with Access to the Database to Select Specific Subpopulations of Special Interest", May 1986.

Rutter et al. "The Timed Lattice—A New Approach To Fast Converging Equalizer Design", pp. VIII/1–5 (Inspec. Abstract No. 84C044315, Inspec IEE (London) & IEE Saraga Colloquium on Electronic Filters, May 21, 1984).

Sadjadi, F., "Experiments in the use of fractal in computer pattern recognition", *Proceedings of the SPIE—The International Society for Optical Engineering,* 1960:214–22 (1993).

Sakoe, H., "A Generalization of Dynamic Programming Based Pattern Matching Algorithm Stack DP-Matching", Transactions of the Committee on Speech Research, The Acoustic Society of Japan, p. S83-23, 1983.

Sakoe, H., "A Generalized Two-Level DP-Matching Algorithm for Continuous Speech Recognition", Transactions of the IECE of Japan, E65(11):649–656 (November 1982).

Scharlic, A., "Decider sur plusieurs criteres. Panorama de l'aide a la decision multicritere", Presses Polytechniques Romandes (1985).

Schurmann, J., "Zur Zeichen und Worterkennung beim Automatischen Anschriftenlesen", Wissenschaftlichl, Berichte, 52(1/2) (1979).

Scientific American, "Not Just a Pretty Face", March 1990, pp. 77–78.

Shafer, G., "A mathematical theory of evidence", Princeton University Press, Princeton, N.J. (1976).

Shimizu et al., "Principle of Holonic Computer and Holovision". Journal of the Institute of Electronics, Information and Communication, 70(9):921–930 (1987).

Shinan et al., "The Effects of Voice Disguise.", ICASSP 86. Tokyo, CH2243-4/86/0000-0885, IEEE 1986, pp. 885–888.

Silverston et al., "Spectral Feature Classification and Spatial Pattern Rec.", SPIE 201:17–26, Optical Pattern Recognition (1979).

Simpson, W. R., C. S. Dowling. "WRAPLE: The Weighted Repair Assistance Program Learning Extension", IEEE Design & Test, 2:66–73 (April 1986).

Specht, IEEE Internatl. Conf. Neural Networks, 1:1525–1532 (July 1988), San Diego, Calif.

Sprageu, R. A., "A Review of Acousto-Optic Signal Correlators", Optical Engineering, 16(5):467–74 (September/October 1977).

Sprinzak, J.; Werman, M., "Affine point matching", *Pattern Recognition Letters,* 15(4):337–9(1994).

Stanley R. Sternberg, "Biomedical Image Processing", IEEE Computer, 1983, pp. 22–34.

Stewart, R. M., "Expert Systems For Mechanical Fault Diagnosis", IEEE, 1985, pp. 295–300.

Sugeno, M., "Theory of fuzzy integrals and its applications". Tokyo Institute of Technology (1974).

Svetkoff et al., Hybrid Circuits (GB), No. 13, May 1987, pp. 5–8.

Udagawa, K., et al, "A Parallel Two-Stage Decision Method for Statistical Character Recognition.", Electronics and Communications in Japan (1965).

Vander Lugt, A., "Practical Considerations for the Use of Spatial Carrier-Frequency Filters", Applied Optics, 5(11):1760–1765 (November 1966).

Vander Lugt, A., "Signal Detection By Complex Spatial Filtering", IEEE Transactions On Information Theory. IT-10, 2:139–145 (April 1964).

Vander Lugt, A., et al., "The Use of Film Nonlinearites in Optical Spatial Filtering", Applied Optics. 9(1):215–222 (January 1970).

Vannicola et al., "Applications of Knowledge Based Systems to Surveillance", Proceedings of the 1988 IEEE National Radar Conference, 20–21 Apr. 1988, pp. 157–164.

Vitols, "Hologram Memory for Storing Digital Data", IBM Tech. Disc. Bulletin 8(11):1581–1583 (April 1966).

Wald, Sequential Analysis, Dover Publications Inc., 1947, pp. 34–43.

Wasserman, Philip D., "Neural Computing-Theory & Practice", 1989, pp. 128–129.

Willshaw et al., "Non-Holographic Associative Memory", Nature, 222:960–962 (Jun. 7, 1969).

Yager, R. R., "Entropy and specificity in a mathematical theory of Evidence", Int. J. General Systems, 9:249–260 (1983).

Yamada et. al., "Character recognition system using a neural network". Electronics Information Communications Association Bulletin PRU 88-58, pp. 79–86.

Yamane et al., "An Image Data Compression Method Using Two-Dimensional Extrapolative Prediction-Discrete Sine Transform", Oct. 29–31, 1986, pp. 311–316.

Zadeh, L. A., "Fuzzy sets as a basis for a theory of possibility", Fuzzy sets and Systems, 1:3–28 (1978).

Zadeh, L. A., "Fuzzy sets", Information and Control, 8:338–353 (1965).

Zadeh, L. A., "Probability measures of fuzzy events", Journal of Mathematical Analysis and Applications, 23:421–427 (1968).

Zhi-Yan Xie; Brady, M., "Fractal dimension image for texture segmentation", ICARCV '92. Second International Conference on Automation. Robotics and Computer Vision, p. CV-4.3/1–5 vol. 1, (1992).

Zhu, X., et al., "Feature Detector and Application to Handwritten Character Recognition", International Joint Conference on Neural Networks, Washington, D.C., January 1990, pp. II-457 to II-460.

The above-mentioned references are exemplary, and are not meant to be limiting in respect to the resources and/or technologies available to those skilled in the art. Of course it should be realized that the hardware for implementing a system may be integrally related to the choice of specific method or software algorithm for implementing the system, and therefore these together form a system. It is noted that in view of the present disclosure, it is within the skill of the artisan to combine in various fashions the available methods and apparatus to achieve the advanced interface and control system of the present invention.

SUMMARY AND OBJECTS OF THE INVENTION

The present invention provides, according to one embodiment, an adaptive user interface which changes in response to the context, past history and status of the system. The strategy employed preferably seeks to minimize, for an individual user at any given time, the search and acquisition time for the entry of data through the interface.

The interface may therefore provide a model of the user, which is employed in a predictive algorithm. The model parameters may be static (once created) or dynamic, and may be adaptive to the user or alterations in the use pattern.

The present invention also provides a model-based pattern recognition system, for determining the presence of an object within an image. By providing models of the objects within an image, the recognition process is relatively unaffected by perspective, and the recognition may take place in a higher dimensionality space than the transmitted media. Thus, for example, a motion image may include four degrees of freedom; x, y, chroma/luma, and time. A model of an object may include further dimensions, including z, and axes of movement. Therefore, the model allows recognition of the object in its various configurations and perspectives.

According to a particular embodiment of the invention, an image or scene, expressed as an ordered set of coefficients of an algorithm, wherein the coefficients relate to elements of defined variation in scale, and the resulting set of coefficients is related to the underlying image morphology, is exploited in order to provide a means for pattern analysis and recognition without requiring transformation to an orthogonal coordinate space (e.g., pixels). Typically, the expression of the image is compressed with loss of information.

A major theme of the present invention is the use of intelligent, adaptive pattern recognition in order to provide the operator with a small number of high probability choices, which may be complex, without the need for explicit definition of each atomic instruction comprising the desired action. The interface system predicts a desired action based on the user input, a past history of use, a context of use, and a set of predetermined or adaptive rules.

Because the present invention emphasizes adaptive pattern recognition of both the input of the user and data that may be available, the interface system proposes the extensive use of advanced signal processing and neural networks. These processing systems may be shared between the interface system and the functional system, and therefore a controller for a complex system may make use of the intrinsic processing power available rather than requiring additional computing power, although this unification is not required. In the case where the user interface employs common hardware elements, it is further preferred that the interface subsystem employ common models of the underlying data structures on which the device functionally operates.

In fact, while hardware efficiency dictates common hardware for the interface system and the operational routine, other designs may separate the interface system from the operational system, allowing portability and efficient application of a single interface system for a number of operational systems. Thus, the present invention also proposes a portable human interface system which may be used to control a number of different devices. In this case, a web browser metaphor is preferred, as it has become a standard for electronic communications.

A portable interface may, for example, take the form of a personal digital assistant or downloaded JAVA applet, with the data originating in a web server. The data from a web server or embedded web server may include a binary file, a generic HTML/XML file, or other data type. The interface receives the data and formats it based, at least in part, on parameters specific to the client or user. Thus, the presentation of data is responsive to the user, based on user preferences, as opposed to hardware limitations or compatibility issues. In a preferred embodiment, the data is transmitted separately from the presentation definition. The presentation definition, on the other hand, provides a set of parameters that propose or constrain the data presentation. The user system also provides a set of parameters that set preferences on presentation. Further, the data itself is analyzed for appropriate presentation parameters. These three sets of considerations are all inputs into a "negotiation" for an ultimate presentation scheme. Thus, the presentation is adaptive to server parameters, user parameters, and the data itself. For example, in a typical web-context, the color, size, typestyle, and layout of text may be modified based on these considerations. Other factors that may be altered include frame size and layout, size of hotspots, requirement for single or double clicks for action, and the like.

The adaptive nature of the present invention derives from an understanding that people learn most efficiently through the interactive experiences of doing, thinking, and knowing. For ease-of-use, efficiency, and lack of frustration of the user, the interface of the device should be intuitive and self explanatory, providing perceptual feedback to assist the operator in communicating with the interface, which in turn allows the operational system to receive a description of a desired operation. Another important aspect of man-machine interaction is that there is a learning curve, which dictates that devices which are especially easy to master become frustratingly elemental after continued use, while devices which have complex functionality with many options are difficult to master and may be initially rejected, or the user stops exploring. One such system which addresses this problem is U.S. Pat. No. 5,005,084, expressly incorporated herein by reference. The present invention addresses these issues by determining the most likely instructions of the operator, and presenting these as easily available choices, by analyzing the past history data and by detecting the "sophistication" of the user in performing a function, based on all information available to it. The context of use may also be a significant factor. The interface seeks to optimize the relevant portion of the interface adaptively and immediately in order to balance and optimize the interface for both quantitative and qualitative factors. This functionality may greatly enhance the quality of interaction between man and machine, allowing a higher degree of overall system sophistication to be tolerated and a greater value added than other interface designs. See, Commaford, C., "User-Responsive Software Must Anticipate Our Needs", PC Week, May 24, 1993.

The present interface system analyzes data from the user, which may be both the selections made by the user in context, as well as the efficiency by which the user achieves the selection. Thus, information concerning both the endpoints and time-dependent path of the process are considered and analyzed by the interface system.

The interface of the present invention may be advantageously applied to an operational system that has a plurality of functions, certain of which are unnecessary or are rarely used in various contexts, while others are used with greater frequency. In such systems, the functionality use is usually predictable. Therefore, the present invention provides an optimized interface system which, upon recognizing a context, dynamically reconfigures the availability or ease of availability of functions and allow various subsets to be used through "shortcuts". The interface presentation will therefore vary over time, use and the particular user.

The advantages to be gained by using an intelligent data analysis interface for facilitating user control and operation of the system are more than merely reducing the average number of selections or time to access a given function. Rather, advantages also arise from providing a means for access and availability of functions not necessarily previously existing or known to the user, therefore improving the perceived quality and usefulness of the product. Further advantages over prior interfaces accrue due to the availability of pattern recognition functionality as a part of the interface system.

In those cases where the pattern recognition functions are applied to large amounts of data or complex data sets, in order to provide a sufficient advantage and acceptable response time, powerful computational resources, such as advanced DSPs or neural network processors are made available to the interface system. On the other hand, where the data is simple or of limited scope, aspects of the technology may be easily implemented as added software functionality as improvements of existing products having limited computational resources.

The application of these technologies to multimedia systems provides a new model for performing image pattern recognition on multimedia data and for the programming of applications including such data. The ability of the interface of the present invention to perform abstractions and make decisions regarding a closeness of presented data to selection criteria makes the interface suitable for use in a programmable control, i.e., determining the existence of certain conditions and taking certain actions on the occurrence of detected events. Such advanced technologies might be especially valuable for disabled users.

In a multimedia environment, a user often wishes to perform an operation on a multimedia data event. Past systems have required explicit indexing of images and events. The present technologies, however, allow an image, diagrammatic, abstract or linguistic description of the desired event to be acquired by the interface system from the user and applied to identify or predict the multimedia event(s) desired without requiring a separate manual indexing or classification effort. These technologies may also be applied to single media data.

The interface system according to the present invention is not limited to a single data source, and may analyze data from many different sources for its operation. This data may be stored data or present in a data stream. Thus, in a multimedia system, there may be a real-time data stream, a stored event database, as well as an exemplar or model database. Further, since the device is adaptive, information relating to past experience of the interface, both with respect to exposure to data streams and user interaction, is also stored. This data analysis aspect of the operation of the present interface system may be substantially processor intensive, especially where the data includes abstract or linguistic concepts or images to be analyzed. Interfaces which do not relate to the processing of such data may be implemented on simpler hardware. On the other hand, systems which handle complex data types may necessarily include sophisticated processors, adaptable for use with the interface system, thus minimizing the additional computing power necessary in order to implement the interface according to the present invention. A portion of the data analysis may also overlap the functional analysis of the data for operation.

A fractal-based image processing system exemplifies one application of the technologies. A fractal-based system includes a database of image objects, which may be preprocessed in a manner which makes them suitable for comparison to a fractal-transformed image representation of an image to be analyzed. Thus, corresponding "fractal" transforms are performed on the unidentified image or a portion thereof and on an exemplar of a database. A degree of relatedness is determined in this "fractal transform domain", and the results used to identify objects within the image. The system then makes decisions based on the information content of the image, i.e. the objects contained therein.

The fractal-based image processing system presents many advantages. First, fractal-processed images may have dramatically reduced storage size requirements as compared to traditional methods while substantially retaining information important for image recognition. The process may be parallelized, and the exemplars may be multidimensional, further facilitating the process of identifying a two-dimensional projection of an object. The efficient storage of information allows the use of inexpensive storage media, i.e., CD-ROM, or the use of an on-line database through a serial data link, while allowing acceptable throughput. See, Zenith Starsight Telecast brochure, (1994); U.S. Pat. No. 5,353,121, expressly incorporated herein by reference.

As applied to a multimedia database storage and retrieval system, the user programs, through an adaptive user interface according to the present invention, the processing of data, by defining a criteria and the actions to be taken based on the determination of the criteria. The criteria, it is noted, need not be of a predefined type, and in fact this is a particular feature of the present invention. A pattern recognition subsystem is employed to determine the existence of selected criteria. To facilitate this process, a database of image objects may be stored as two counterparts: first, the data is stored in a compressed format optimized for normal use, such as human viewing on a video monitor, using, e.g., MPEG-2 or Joint Photographic Experts Group (JPEG) compression; second, it is stored in a preprocessed and highly compressed format adapted to be used with the pattern recognition system. Because the preprocessed data is highly compressed and used directly by the pattern recognition system, great efficiencies in storage and data transmission are achieved. The image preprocessing may include Fourier, DCT, wavelet, Gabor, fractal, or model-based approaches, or a combination thereof.

The potential significant hardware requirement for image processing and pattern recognition is counterbalanced by the enhanced functionality available by virtue of the technologies. When applied to multimedia devices, the interface system allows the operator to define complex criteria with respect to image, abstract or linguistic concepts, which would otherwise be difficult or impossible to formulate. Thus, the interface system becomes part of a computational system that would otherwise be too cumbersome for use. It is noted that, in many types of media streams, a number of "clues" are available defining the content, including close caption text, electronic program guides, simulcast data, related Internet web sites, audio tracks, image information, and the like. The latter two data types require difficult processing in order to extract a semantic content, while the former types are inherently semantic data.

A pattern recognition subsystem allows a "description" of an "event" without explicit definition of the data representing the "event". Thus, instead of requiring explicit programming, an operator may merely define parameters of the desired "event". This type of system is useful, for example, where a user seeks a generic type of data representing a variety of events. This eliminates the need for preindexing or standardized characterization of the data. The interface system therefore facilitates the formulation of a request, and then searches the database for data which corresponds to the request. Such preindexing or standardized characterization is extremely limiting with image and multimedia data, because "a picture is worth a thousand words", and without a priori knowing the ultimate search criteria, all possible criteria must be accounted for. Pattern recognition systems do not require initial translation of visual aspects into linguistic concepts, thus allowing broader searching capability. Of course, a pattern recognition system may be used in conjunction with other searching schemes, to mutual advantage.

The pattern recognition functionality of the interface system is not limited to multimedia data, and may be applied to data of almost any type, e.g., real-time sensor data, distributed control, linguistic data, etc.

It is noted that, in consumer electronics and particularly entertainment applications, the reliability of the system need not be perfect, and errors may be tolerable. On the other hand, in industrial control applications, reliability must be much higher, with fail-safe backup systems in place, as well as advanced error checking. One way to address this issue is to allow the advanced user interface to propose an action to the user, without actually implementing the action. However, in this case, the action and its proposed basis are preferably presented to the user in a sophisticated manner, to allow the basis for the action to be independently assessed by the user. Therefore, in a complex, multistep process, the user interface may be simplified by permitting a three step process: the user triggers a proposed response, analyzes the proposal and rationale, and confirms the proposal. Therefore, single step processes are inferior candidates for intelligent assistance.

Another notable aspect of the technologies is the contextual analysis. Often, multimedia data often includes a data component that closely corresponds to a format of a search criteria. Thus, while a search may seek a particular image, other portions of the datastream correlate well with the aspect of the image being searched, and may be analyzed by proxy, avoiding the need for full image analysis. The resulting preselected reduced number of images may then be fully analyzed, if necessary. Thus, especially as with respect to consumer electronics applications, where absolute accuracy may not be required, the processing power available for pattern recognition need not be sufficient for compete real-time signal analysis of all data. The present invention therefore proposes use of a variety of available data in order to achieve the desired level functionality at minimum cost.

One aspect of the present invention therefore relates to a mechanism for facilitating a user interaction with a programmable device. The interface and method of use of the present invention serves to minimize the learning and searching times, better reflect users' expectations, provide better matching to human memory limits, be usable by both novices and experienced users, reduce intimidation of novice users by the device, reduce errors and simplify the entering of programming data. The present invention optimizes the input format scheme for programming an event-driven device, and can also be applied to many types of programmable devices. Thus, certain human factors design concepts, heretofore unexploited in the design of consumer electronics devices and industrial controls, have been incorporated, and new precepts developed. Background and theory of various aspects of the present invention is disclosed in "AN IMPROVED HUMAN FACTORED INTERFACE FOR PROGRAMMABLE DEVICES: A CASE STUDY OF THE VCR", Master's Thesis, Tufts University (Master of Sciences in Engineering Design, November, 1990, publicly available January, 1991), by Linda I. Hoffberg. This thesis, and cited references, are incorporated herein by reference, and attached hereto as an appendix. Also referenced are: Hoffberg, Linda I., "Designing User Interface Guidelines For Time-Shift Programming of a Video Cassette Recorder (VCR)". Proc. of the Human Factors Soc. 35th Ann. Mtg. pp. 501–504 (1991); and Hoffberg, Linda I., "Designing a Programmable Interface for a Video Cassette Recorder (VCR) to Meet a User's Needs", Interface 91 pp. 346–351 (1991). See also, U.S. patent application Ser. No. 07/812,805, filed Dec. 23, 1991, incorporated herein by reference in its entirety, including appendices and incorporated references.

The present invention extends beyond simple predictive schemes which present exclusively a most recently executed command or most recently opened files. Thus, the possible choices are weighted in a multifactorial method, e.g., history of use, context and system status, rather than a single simple criterion alone. Known simple predictive criteria often exclude choices not previously selected, rather than weighing these choices in context with those which have been previously selected. While the system according to the present invention may include initial weightings, logical preferences or default settings, through use, the derived weightings are obtained adaptively based on an analysis of the status, history of use and context. It is noted that not all of the possible choices need be weighted, but rather merely a subset thereof.

For a given system, status, history of use and context may be interrelated factors. For example, the status of the machine is determined by the prior use, while the status also intersects context. The intended meaning of status is information relating to a path independent state of the machine at a given point in time. History of use is intended to implicate more than the mere minimum instructions or actions necessary to achieve a given state, and therefore includes information unnecessary to achieve a given state, i.e., path dependent information. Context is also related to status, but rather is differentiated in that context refers to information relating to the environment of use, e.g., the variable inputs or data upon which the apparatus acts or responds. Status, on the other hand, is a narrower concept relating more to the internal and constant functionality of the apparatus, rather than the particularities of its use during specific circumstances.

U.S. Pat. No. 5,187,797 relates to a machine interface system having hierarchical menus, with a simple (three button) input scheme. The choice(s) presented relate only to the system status, and not the particular history of use employed to obtain the system status nor the context of the choice. This system has a predetermined hierarchical menu structure, which is invariant with usage. The goal of this interface system is not to provide a learning interface, but rather to teach the user about or conform the user to the dictates of the predetermined and invariant interface of the device. While many types of programmable devices are known to exist, normally, as provided in U.S. Pat. No. 5,187,797, instructions are entered and executed in a predetermined sequence, with set branch points based on input conditions or the environment. See also U.S. Pat. Nos. 4,878,179, 5.124.908, and 5,247,433.

An aspect of the present invention provides a device having a predetermined or a generic style interface upon initial presentation to the user, with an adaptive progression in which specialized features become more easily available to a user who will likely be able to make use of them, while unused features are or remain "buried" within the interface. The interface also extracts behavioral information from the user and to alter the interface elements to optimize the efficiency of the user.

A videocassette recorder is a ubiquitous example of a programmable device, and therefore forms the basis of much of the discussion herein. It should, of course, be realized that many of the aspects of the present invention could be applied by one of ordinary skill in the art to a variety of controls having human interfaces, and that these other applications are included within the scope of the present invention.

The VCR apparatus typically involves a remote control entry device, and the interface of the present invention contains a graphical interface displayed for programming programmable devices. This aspect of the present invention seeks more accurate programming through the use of program verification to ensure that the input program is both valid and executable. Thus, it has a mechanism to store and check to verify that there are no conflicting programs. An apparatus according to the present invention can be connected, for example, to any infrared programmable device in order to simplify the programming process. Byway of example only, an improved VCR interface forms the basis of a disclosed example. It is, of course, realized that the present method and apparatus may be applied to any programmable controller, i.e., any device which monitors an event or sensor and causes an event when certain conditions or parameters are met, and may also be used in other programming environments, which are not event driven. While the present interface is preferably learning and adaptive, it may also detect events and make decisions based on known or predetermined characteristics. Where a number of criteria are evaluated for making a decision, conflicts among the various criteria are resolved based on a strength of an evaluated criteria, a weighting of the criteria, an interactivity function relating the various criteria, a user preference, either explicitly or implicitly determined, and a contextual analysis. Thus, a user override or preference input may be provided to assist in resolving conflicts.

The present invention may incorporate an intelligent program recognition and characterization system, making use of any of the available cues, which allows an intelligent determination of the true nature of the broadcast and therefore is able to make a determination of whether parameters should be deemed met even with an inexact match to the specified parameters. Therefore, in contradistinction with VPV, the present invention provides, for example, intelligence. The VPV is much more like the "VCR Plus" device, known to those skilled in the art, which requires that a broadcast be associated with a predetermined code, with the predetermined code used as a criteria for initiating recording. Some problems with VCR Plus include identification of the codes which identify channel and time, post scheduling changes, incorrect VCR clock setting, and irregular schedules. VCR Plus also is limiting with respect to new technologies and cable boxes.

The videotext signal of the prior art includes a digitally encoded text message that may be displayed in conjunction with the displayed image, similar to the closed caption system. The aforementioned West German system demonstrates one way in which the transmitted signal may be received by a device and interpreted to provide useful information other than the transmitted program itself. However, the prior art does not disclose how this signal may be used to index and catalog the contents of a tape, nor does it disclose how this signal may be used to classify or interpret the character of the broadcast. In other words, in one embodiment of the present invention, the videotext or closed caption signal is not only interpreted as a literal label, as in the prior art, but is also further processed and analyzed to yield data about the content of the broadcast, other than merely an explicit identification of the simultaneously broadcast information.

Beyond or outside the visible region of an U.S. National Television Standards Committee (NTSC) broadcast video frame are a number of scan lines which are dedicated to presenting digital information, rather than analog picture information. Various known coding schemes are available for transmitting and receiving information in this non-viewing portion of the video transmission, and indeed standard exist defining the content of these information fields. Of course, various other transmission schemes provide a format for transmitting data. For example, standard frequency modulation (FM) transmissions may be associated with digital data transmissions in a subcarrier. Likewise, satellite transmissions may include digital data along with an audio data stream or within a video frame, which may be in analog format or digitally encoded.

Cable systems may transmit information either in the broadcast band or in a separate band. HDTV schemes also generally provide for the transmission of digital data of various sorts. Thus, known audio and video transmission systems may be used, with little or no modifications to provide enhanced functionality, according to the present invention. It is therefore possible to use known and available facilities for transmitting additional information relating to the broadcast information, in particular, the characteristics of the video broadcast, and doing so could provide significant advantages, used in conjunction with the interface and intelligent pattern recognition controller of the present invention. If this information were directly available, there would be a significantly reduced need for advanced image recognition functions, such advanced image recognition functions requiring costly hardware devices, while still maintaining the advantages of the present invention.

It is noted, however, that the implementation of a system in which characterization data of the broadcast is transmitted along therewith might require a new set of standards and the cooperation of broadcasters, as well as possibly the government regulatory and approval agencies. The present invention does not require, in all of its aspects, such standardization, and therefore may advantageously implement substantial data processing locally to the receiver. It is nevertheless within the scope of the invention to implement such a broadcast system with broadcast of characterization data in accordance with the present invention. Such broadcast characterization data may include characterizations as well as preprocessed data useful for characterizing according to flexible criteria in the local receiving device.

According to the present invention, if such characterizations are broadcast, they may, as stated above, be in band or out of band, e.g., making use of unused available spectrum bandwidth within the NTSC channel space, or other broadcast system channel space, or may be "simulcast" on a separate channel, such as an FM sideband or separate transmission channel. Use of a separate channel would allow a separate organization, other than the network broadcasters, to provide the characterization data for distribution to users of devices that make use of the present intelligent system for controlling a VCR or other broadcast information processing device. Thus, the characterization generating means need not be directly linked to the local user machine in order to fall within the scope of the present invention. The present invention also provides a mechanism for copyright holders or other proprietary interests to be protected, by limiting access to information be encryption or selective encryption, and providing an accounting system for determining and tracking license or broadcast fees.

Research has been performed relating to VCR usability, technology, implementation, programming steps, current technology, input devices, and human mental capacity. This research has resulted in a new paradigm for the entry of programming data into a sequential program execution device, such as a VCR, by casual users.

Four major problems in the interfaces of VCRs were found to exist. The first is that users spend far too much time searching for necessary information, which is necessary in order to complete the programming process. Second, many people do not program the VCR to record at a later time (time-shift) frequently, and thus forget the programming steps in the interim, i.e., the inter-session decay of the learning curve is significant. Third, the number of buttons on many remote control devices has become overwhelming. Fourth, people have become reluctant to operate or program VCRs because of their difficult operation. It was found that, by minimizing the learning and searching times, the user's programming time and frustration level can be greatly reduced. If VCRs are easier to program, users might program them more frequently. This would allow more efficiency and flexibility in broadcast scheduling, especially late night for time shift viewing. The present invention therefore provides an enhanced VCR programming interface having a simplified information structure, an intuitive operational structure, simplified control layout and enhanced automated functionality.

A new class of consumer device has been proposed, which replaces the videotape of a traditional videotape recorder with a random-access storage device, such as a magnetic hard disk drive. Multimedia data is converted through a codec (if necessary), and stored in digital form. Such systems are proposed by Tivo, Inc., Philips Electronics (Personal TV), Replay Networks, Inc. and Metabyte, Inc. Some of these systems employ a user preference based programming/recording method similar to that of the present invention.

In these systems, typically a content descriptive data stream formulated by human editors accompanies the broadcast or is available for processing and analysis. Based on a relation of the user preferences, which may be implied by actual viewing habits or input through simple accept/veto user feedback, selected media events may be recorded. However, such systems rely on a correspondence between the factors of interest to users and those encoded in the data stream, e.g., a "program guide". This is not always the case. However, where the available data describing the program maps reasonably well into the user preference space, such a system may achieve acceptable levels of performance, or stated otherwise, the program material selected by the system will be considered acceptable.

One particular aspect of these time-shifting consumer media recording devices is how they deal with advertising materials that accompany program material. In many instances, the user seeks to avoid "commercials", and the device may be programmed to oblige. However, as such devices gain wider acceptance, advertisers will be reluctant to subsidize broadcasts. Therefore, an advertising system may be integrated into the playback device that seeks to optimize the commercial messages presented to a viewer. By optimizing the messages or advertisements, the viewer is more receptive to the message, and economic implications ensue. For example, a viewer may be compensated, directly or indirectly, for viewing the commercials, which may be closely monitored and audited, such as by taking pictures of the audience in front of a "set-top box". The acquired data, including viewer preferences, may be transmitted back to commercial sponsors, allowing detailed demographic analysis.

In order to ensure privacy, the preference information and/or images may be analyzed by a proxy, with the raw data separated from the commercial users of such data. Thus, for example, the particular users of a system may register their biometric characteristics, e.g., face. Thereafter, the imager captures facial images and correlates these with its internal database. The image itself therefore need not be stored or transmitted. Viewer preferences and habits, on the other hand, likely must be transmitted to a central processing system for analysis.

Because the system is intelligent, copy protection and royalty accounting schemes may readily be implemented. Thus, broadcasters and content providers may encode broadcasts in such a way as to control the operation of the consumer device. For example, an IEEE-1394-type encryption key support (e.g., DTCP or XCA)/copy protection or DIVX scheme may be implemented. Further, certain commercial sponsors may be able to avoid deletion of their advertisement, while others may allow truncation. The acceptability of this to the consumer may depend on subsidies. In other words, a company is willing to pay for advertising. Instead of paying for placements directly to the media, a portion is paid to a service provider, based on consumer viewing. The media, on the other hand, may seek to adopt a pay-per-view policy, at least with respect to the service provider, in lieu of direct advertising revenues. The service provider will account to both advertisers and content providers for use. With sufficient viewing of commercials, the entire service charge for a system might be covered for a user. On the other hand, a viewer might prefer to avoid all commercials, and not get the benefit of a subsidy. The service provider performs the economically efficient function of delivering optimized, substituted commercials for the almost random commercials which flood the commercial broadcast networks, and thus can accrue greater profits, even after paying content providers a reasonable fee. An advertiser, by selecting a particular audience, may pay less than it would otherwise pay to a broadcaster. The content providers may also charge more for the privilege of use of their works.

As stated above, the content may be copy protected by the use of encryption and/or lockout mechanisms. Thus, by providing an alternative to an analog VCR, a full end-to-end encrypted signal may be provided, such as that proposed for the IEEE-1394 copy protection scheme. Because enhanced recording capabilities are provided to the consumer, the acceptance will be high. Because of the encryption, lack of portability and continued royalty accounting, content provider acceptance will also likely be high.

IEEE 1394 provides for Digital Content Protection. See. Bill Pearson "1394 Digital Content Protection, *Multimedia Systems* Design, (November 1998). Techniques such as encryption and authentication/key exchange maintain content quality without degradation while preventing unauthorized copying. The IEEE 1394 content protection system provides four elements of digital content protection: Copy control information (CCI); Authentication and key exchange (AKE); Content encryption; and System renewability.

In an IEEE 1394 system, there are source devices and sink devices. The source device transmits a copy protection system stream of content. A source device is one that can send a stream of content and a sink device is one that can receive a stream of content. Multifunction devices such as PCs and record/playback devices such as digital VCRs can be both source and sink devices. The following is a step-by-step description of the interaction source and sink devices: The source device initiates the transmission of a stream of content marked with the appropriate copy protection status (e.g. "copy once," "copy never," or "no more copies") via the EMI bits. Upon receiving the content stream, the sink device inspects the EMI bits to determine the copy protection status of the content. If the content is marked "copy never," the sink device requests that the source device initiate full AKE. If the content is marked "copy once" or "no more copies," the sink device will request full AKE if it is supported, or restricted AKE if it isn't. If the sink device has already performed the appropriate authentication, it can then proceed. When the source device receives the authentication request, it proceeds with the type of authentication requested by the sink device, unless full AKE is requested but the source device can only support restricted AKE, in which case restricted AKE is performed. Once the devices have completed the required AKE procedure, a content-channel encryption key (content key) can be exchanged between them. This key is used to encrypt the content at the source device and decrypt the content at the sink.

The first element in the content protection scheme is the copy control information (CCI). CCI is a way for content owners to specify how their content can be used. Some examples are "copy never," "copy once," "no more copies," and "copy free." The content protection system is capable of securely communicating copy control information between devices. Two different CCI mechanisms are supported and are discussed below. In the event that conflicting copy protection requirements are specified by the different mechanisms, sink devices should follow the most restrictive CCI available. Embedded CCI is carried as part of the content stream. Many content formats (including MPEG) have fields allocated for carrying the CCI associated with the stream. The integrity of the embedded CCI is ensured since tampering with the content stream results in erroneous decryption of the content.

The encryption mode indicator (EMI) provides easily accessible yet secure transmission of CCI to bit stream recording devices (such as digital VCRs) that know nothing beyond the content. The EMI is placed in an easily accessible location. For 1394 buses, this location is the most significant two bits of the synch field of the isochronous packet header. Devices can then immediately determine the CCI of the content stream without needing to decode the content transport format to extract the embedded CCI. This ability is critical for enabling bit stream recording devices that do not recognize and cannot decode specific content formats. If the EMI bits are tampered with, the encryption and decryption modes will not match, resulting in erroneous decryption of the content.

The proposed system is based on robust and accepted cryptographic techniques that have evolved over the past 20 years to serve critical military, governmental, and commercial applications. These techniques have been thoroughly evaluated by hackers and by legitimate cryptography experts, and have proven their ability to withstand attack. The robustness and cryptographic stability of the system are derived from the proven strength of the underlying technologies, rather than merely how well a certain algorithm can be kept secret. Before sharing valuable information, a connected device must first verify that another connected device is authentic. In an effort to balance the protection requirements of the film and recording industries with the real-world requirements of PC and CE users, the proposal includes a choice of two authentication levels, full and restricted. Full authentication can be used with all content protected by the system. Restricted authentication enables the protection of "copy-once" content only.

The full authentication system employs the public key-based Digital Signature Standard (Dss) and Diffie-Hellman key exchange algorithms. Dss is a method for digitally signing and verifying the signatures of digital documents to verify the integrity of the data. Both the Dss and Diffie-Hellman implementations for the proposed system employ elliptic curve cryptography. This technique offers superior performance compared to systems based on calculating discrete logarithms in a finite field.

The next element of content protection is known as authentication and key exchange (AKE). Before sharing valuable information, a connected device must first verify that another connected device is authentic. To balance the protection requirements of the content industries and the real-world requirements of PC and CE users, the specification includes a choice of two authentication levels: full and restricted. Full authentication can be used with all content protected by the system. Restricted authentication enables the protection of "copy once" content only.

All compliant devices must be assigned a unique public/private key pair that is generated by the DTLA. The private key must be stored within the device in such a way as to prevent its disclosure. The preferred method of storing the key would be to use a highly integrated device, such as a microcontroller with built-in EPROM. Compliant devices must also be given a device certificate by the DTLA. This certificate is stored in the compliant device and used during the authentication process. In addition, the compliant device will need to store the other constants and keys necessary to implement the cryptographic protocols. Full authentication uses the public key-based digital signature standard (DSS) and Diffie-Hellman (DH) key-exchange algorithms. DSS is a method for digitally signing and verifying the signatures of digital documents to verify the integrity of the data. DH key exchange is used during full authentication to establish control-channel symmetric cipher keys, which allows two or more parties to generate a shared key. Developed more than 20 years ago, the algorithm is considered secure when it is combined with digital signatures to prevent a so-called "man-in-the-middle" attack. A man-in-the-middle attack is when one person places himself between two others who are communicating. He can imitate either of the participants, modify and delete messages, or generate new ones entirely. A shared key helps prevent this type of attack because each message contains a digital signature signed with the private key of the source. The receiver of the message can easily verify that the message came from the intended source.

The full authentication protocol begins when the sink device initiates the authentication protocol by sending a request to the source device. The first step of the full authentication procedure is for the devices to exchange device certificates. Next, they exchange random challenges. Then each device calculates a DH key-exchange first-phase value. The devices then exchange signed messages that contain the following elements: The other device's random challenge; and The DH key-exchange first-phase value; The renewability message version number of the newest system renewability message (SRM) stored by the device. The devices process the messages they receive by first checking the message signature using the other device's public key to verify that the message has not been tampered with. The device also verifies the integrity of the other device's certificate. If these signatures cannot be verified, the device refuses to continue. Each device also examines the certificate revocation list embedded in its SRM to verify that the other device's certificate has not been revoked. In addition, by comparing the exchanged renewability version numbers, devices can invoke the SRM upgrade mechanisms at a later time. If no errors have occurred during the authentication process, the two devices have successfully authenticated each other and established an authorization key.

System renewability messages are not particularly used to disable source devices, but rather sink devices. For example, if a person manages to get a hold of a device ID for a digital television, and then modifies a digital VCR to have the device ID of his digital television. Then, when any device is talking with the modified digital VCR, it will think it is talking to a digital TV and will send data to the device, allowing a person to copy protected content. This is detected when a pirate device is discovered. Once one of these pirate devices is detected, they can all easily be disabled because they all share the same device ID. Once the device ID has been disabled, the SRM will propagate itself to other devices. Then, no legitimate device will allow protected content to be sent to the pirate device. The memory required for this function is limited to insure that it is reasonable to implement in low-cost consumer devices.

Restricted authentication is used between source devices and sink devices for the exchange of "copy once" and "copy no more" contents. Devices that only support "copy once" and "copy no more" content such as digital VCRs typically have limited computational resources. Restricted authentication relies on the use of a shared secret and hash functions to respond to a random challenge. It is based on a device being able to prove that it holds a secret shared with other devices. One device authenticates another by issuing a random challenge that is responded to by modifying it with the shared secret and multiple hashings. The restricted authentication protocol begins when the sink device initiates the authentication protocol by sending a request to the source device. The source device then requests the device ID of the sink device. After receiving the device ID, the source device generates a random challenge and sends it to the sink device. After receiving a random challenge back from the source device, the sink device computes a response using its license key (assigned by the DTLA and a function of the device ID and service key) and sends it to the source. After the sink device returns a response, the source device compares this response with similar information generated at the source side using its service key and the ID of the sink device. If the comparison matches its own calculation, the sink device has been verified and authenticated. The source and sink devices then each calculate an authorization key.

The following steps are common to both full and restricted authentication. The source device generates a random number for an exchange key, scrambles it using its calculated authorization key, and sends it to the sink device. The sink device then descrambles the exchange key using its own calculation of the authorization key. This exchange key can be repeatedly used to set up and manage the security of copyrighted content streams without further authentication.

The cipher used to encrypt the content must be robust enough to protect the content, yet efficient enough to implement on a variety of platforms. To ensure interoperability, all compliant devices must support the baseline cipher and possibly additional, optional ciphers for protecting the content. Ciphers can be used in the converted-cipher block-chaining mode. Cipher block-chaining is a technique that adds feedback into the input of the cipher. Converted-cipher block-chaining provides greater security than ordinary cipher block-chaining by using secretly converted ciphertext (ciphertext is the output of a cipher—plaintext in, ciphertext out) as feedback rather than known ciphertext on a public channel. Therefore, known-plaintext attacks and key-exhaustive searches become more difficult.

The M6 cipher is tentatively selected as the baseline cipher while DES, Blowfish, and others can be used as optional ciphers. The M6 cipher is a common-key block-cipher algorithm based on permutation-substitution. It is a rotation-based algorithm like Hitachi's MULT12 encryption algorithm currently used as an encryption standard for a Japanese digital satellite broadcasting system. The M6 cipher is simpler than MULTI2 and uses the same type of algorithm seen in hash functions MD5 and SHA-1 that have shown their ability to withstand cryptographic attack.

Devices that support full authentication can receive and process SRMs that are created by the DTLA and distributed with content. System renewability is used to ensure the long-term system integrity by revoking the device IDs of compromised devices. SRMs can be updated from other compliant devices that have a newer list, from media with prerecorded content, or via compliant devices with external communication capability (i.e., over the Internet, phone lines, cable system, or network). There are several components of an SRM. Some of the most important are: A monotonically increasing system renewability version number is used to ensure that only the newest message is used, and is essentially a counter that increases but never decreases. A certificate revocation list (CRL) is used to revoke the certificates of devices whose security has been compromised. Some devices may have limited nonvolatile memory available to store the CRL and thus may only support a subset of the list. Therefore, the entries in the CRL should be ordered according to their perceived threat to content. This will ensure that entries for devices that are the greatest threat to content can be stored by compliant devices that support certificate revocation, but only have limited storage space for SRMs. A DTLA signature (a value calculated using the DTLA private key) of these components, which is used to ensure the integrity of the SRM.

The version number of a new SRM is examined. If the message is newer than the current information, the system verifies the integrity of the message. If the message is valid and intact, then the system updates its information. The system may revoke a device authorization, based on the SRM. First, the set-top box (STB) receives updated SRM with a particular device ID on its CRL. The STB then passes the SRM to the digital TV (DTV) when the next cable movie is watched. The DTV passes the SRM on to the DVD player when the next DVD movie is watched. Once all devices in the current environment have received the SRM, that device ID is fully revoked.

The user interface concepts according to the present invention are easily applied to other special purpose programmable devices, and also to general-purpose programmable devices wherein the programming paradigm is event-driven, as well as other programming systems. It should also be noted that it is within the scope of the present invention to provide an improved interface and programming environment for all types of programmable devices, and in this regard, the present invention incorporates adaptive features that optimize the programming environment for both the level of the user and the task to be programmed.

In optimizing the interface, four elements are particularly important: the input device, the display format, the sequence of the programming operation, and the ability of the device to properly interpret the input as the desired program sequence.

The present invention proceeds from an understanding that an absence of user frustration with respect to a programmable consumer or industrial device or interface, may be particularly important with respect to achieving the maximum potential functionality thereof. The interface must be designed to minimize the user's frustration level. This can be accomplished by clearly furnishing the possible choices, presenting the data in a logical sequence, and leading the user through the steps necessary to program the device.

When applied to other than audiovisual and/or multimedia application, the pattern recognition function may be used to control the execution of a program or selectively control execution of portions of the software. For example, in a programmable temperature controller application, a sensor or sensor array could be arranged to detect a "door opening". On the occurrence of the door opening, the system would recognize this pattern, i.e. a mass of air at a different temperature entering the environment from a single location, or a loss of climate controlled air through a single location. In either event, the system would take appropriate action, including: halt of normal climate control and impose a delay until the door is closed; after closure, set a time constant for maintenance of a steady state of the replaced air with the climate controlled air; based on the actual climatic condition after assimilation, or a predicted climatic condition after assimilation, begin a climate compensation control; optionally, during the door opening, control a pressure or flow of air to counterbalance the normal flow through the door, by using a fan or other device. The climate may differ in temperature, humidity, pollutants, or the like, and appropriate sensors may be employed.

The present invention also allows a dynamic user preference profile determination based on explicit or implicit desires, e.g., moods, which assist in processing data to make decisions which conform to the user preference at a given point in time. For example, voice patterns, skin temperature, heat pulse rate, external context, skin resistance (galvanic skin response), blood pressure, stress, as determined by EMG, EEG or other known methods, spontaneous motor activity or twitching, may be detected in order to determine or infer a user mood, which may be used as a dynamic influence on the user preference. These dynamic influences are preferably stored separately from static influences of the preferences, so that a resultant determined preference includes a dynamic influence based on a determined mood or other temporally varying factor and a static influence associated with the user.

When a group of people are using the system simultaneously, the system must make a determination of a composite preference of the group. In this case, the preferences of the individuals of the group, if known, may be correlated to produce an acceptable compromise. Where individual preferences are not a priori known, individual or group "interviews" may be initially conducted to assist in determining the best composite group preference.

It is therefore an object according to the present invention to provide a radio receiver or video receiver device, having a plurality of different available program sources, determining a program preference for one or more individuals subject to a presented program, comparing the determined program preference and a plurality of different program sources, and selects at least one program based on the comparison.

In formulating a group preference, individual dislikes may be weighted more heavily than likes, so that the resulting selection is tolerable by all and preferable to most group members. Thus, instead of a best match to a single preference profile for a single user, a group system provides a most acceptable match for the group. It is noted that this method is preferably used in groups of limited size, where individual preference profiles may be obtained, in circumstances where the group will interact with the device a number of times, and where the subject source program material is the subject of preferences. Where large groups are present, demographic profiles may be employed, rather than individual preferences. Where the device is used a small number of times by the group or members thereof, the training time may be very significant and weigh against automation of selection. Where the source material has little variety, or is not the subject of strong preferences, the predictive power of the device as to a desired selection is limited.

The present invention provides a system and method for making use of the available broadcast media forms for improving an efficiency of matching commercial information to the desires and interests of a recipient, improving a cost effectiveness for advertisers, improving a perceived quality of commercial information received by recipients and increasing profits and reducing required information transmittal by publishers and media distribution entities.

This improved advertising efficiency is accomplished by providing a system for collating a constant or underlying published content work with a varying, demographically or otherwise optimized commercial information content. This commercial information content therefore need not be predetermined or even known to the publisher of the underlying works, and in fact may be determined on an individual receiver basis. It is also possible to integrate the demographically optimized information within the content. For example, overlays in traditional media, and electronic substitutions or edits in new media, may allow seamless integration. The content alteration need not be only based on commercial information, and therefore the content may vary based on the user or recipient.

U.S. Pat. No. 5,469,206, expressly incorporated herein by reference, relates to a system that automatically correlates user preferences with electronic shopping information to create a customized database for the user.

Therefore, the granularity of demographic marketing may be very fine, on a receiver-by-receiver basis. Further, the accounting for advertisers will be more accurate, with a large sample and high quality information. In fact, in a further embodiment, an interactive medium may be used allowing immediate or real time communication between recipient and advertiser. This communication may involve the Internet, private networks or dial-up connections. Because the commercial messages are particularly directed to recipients, communication with each selected recipient is more valuable to an advertiser and that advertiser is willing to pay more for communication with each selected recipient. Recipients may therefore be selected to receive the highest valued appropriate commercial message(s). Thus, advertisers will tend to pay less and media producers will gain more revenues. Recipients will gain the benefit of selected and appropriate media, and further, may provide feedback for determining their preferences, which will likely correspond with their purchasing habits. Thus, the recipient will benefit by receiving optimized information.

Likewise, a recipient may place a value on receiving certain information, which forms the basis for "pay-per-view" systems. In this case, the recipient's values may also be considered in defining the programming.

This optimization is achieved by providing a device local to the recipient which selectively presents commercial information to the recipient based on characteristics individual to the recipient, which may be input by the recipient, the publisher, the advertiser, and/or learned by the system based on explicit or implicit feedback. The local device either has a local memory for advertising materials, or a telereception link for receiving commercial information for presentation, either on a real time basis or stored for later presentation. In a further embodiment, a user may control the content and/or commercial information received. In this case, the accounting system involves the user's account, and, for example, the recipient may be denied the subsidy from the commercial advertiser, and pay for the privilege of commercial free content.

It is also possible to employ the methods and systems according to the present invention to create a customized publication, which may be delivered physically to the recipient, for example as print media, facsimile transmission, e-mail, R-CD-ROM, floppy disk, or the like, without having a device local to the consumer.

It is noted that this system and method is usable for both real time media, such as television, radio and on-line telecommunication, as well as manually distributed periodicals, such as newspapers, magazines, CD-ROMs, diskettes, etc. Therefore, the system and method according to the present invention includes a set of related systems with varying details of implementation, with the underlying characteristic of optimization of variable material presentation at the recipient level rather than the publisher level.

The system and method according to the present invention preferably includes an accounting system which communicates information relating to receipt of commercial advertising information by a recipient to a central system for determination of actual receipt of information. This feedback system allows verification of receipt and reduces the possibility of fraud or demographic inaccuracies.

The accounting system, for example, may place value on the timeslot, associated content, the demographics of the user, user's associated valuation, competition for placement, past history (number of impressions made to same recipient) and exclusivity.

A preferred embodiment includes a subscription television system having a plurality of received channels. At least one of these channels is associated with codes to allow determination of content from variable segments. It is also possible to identify these variable segments without these codes, although the preferred system includes use of such codes. These codes also allow simple identification of the content for accounting purposes. Upon detection of a variable segment, a commercial advertisement is selected for presentation to the recipient. This variable segment is selected based on the characteristics of the recipient(s), the history of use of the device by the recipient(s), the context of use, the arrangements made by the commercial information provider(s) for presentation of information, and the availability of information for presentation. Other factors may include the above-mentioned accounting system factors. Typically, the local device will include a store of commercial information, downloaded or otherwise transmitted to the recipient (e.g., a CD-ROM or DVD with MPEG-2 compressed images). A telecommunication link may also be provided to control the process, provide parameters for the presentation or the information itself. This telecommunication link may be provided through the public telephone network, Internet, private network (real or virtual) cable network, or a wireless network, for example. Generally, the underlying work will have a gap of fixed length, so that the commercial information must be selected to fit in this gap. Where the gap is of variable length, such as might occur in live coverage, the commercial information is interrupted or the underlying work buffered and delayed to prevent loss. Thus, the presentation to the user is constructed from pieces, typically at the time of presentation, and may include invariable content, variable content, invariable messages, variable messages, targeted content and/or messages, and hypervariable content. Hypervariable content includes, for example, transition material selected based on the stream of information present, and other presentations which my optionally include useful information which are individualized for the particular recipient or situation.

According to another embodiment, a recording, such as on a videotape, is retained by a recipient which includes proprietary content. This may include a commercial broadcast, a private broadcast, or distributed media. In the case of a commercial broadcast, some or all of the commercial advertising or other time-sensitive information is old and/or stale. Therefore, in operation, this old or time sensitive information is eliminated and substituted with new and/or different information. Thus, the presentation system freshens the presentation, editing and substituting where necessary.

By such a method, content distributed even through private channels may include advertisements, and thus be subsidized by advertisers. The advertisements and other added content are generally more acceptable to the audience because they are appropriately targeted.

For example, where the broadcaster has a high degree of control over the initial broadcast, e.g., pay per view under license, or where the broadcaster may claim substantial continuing rights in the work after recording, the enforcement of a proprietary replay system may be accepted. For example, a work is broadcast as an encrypted digital data stream, with selective decryption at the recipient's receiver, under license from the broadcaster. In this case, a recording system is provided which retains the encryption characteristics, ensuring the integrity of the accounting process. During presentation of the recorded work, commercial information is appropriately presented to the recipient during existing or created gaps, or in an associated output separate from the content presentation. The recipient, as a result, receives the benefit of the original subsidy, or may receive a new subsidy.

Therefore, similar to the known DIVX system, an encrypted media may be mass distributed, which requires authorization for display. Instead, however, of requiring the recipient to pay for the initial and subsequent displays of the content, the player integrates advertising content into the output, which may vary based on the audience, time and past history, as well as other factors discussed herein. Given the interactive and variable nature of the presentation, the user or audience may even veto ("fast forward through") a particular commercial. In this case, the use may have to account for a fee, or other advertisers may tack up the slack. The veto provides information regarding the desires of the viewer, and may be used to help select future messages to the displayed or presented.

According to another embodiment, a radio transmission/reception system is provided which broadcasts content, an overlay track and variable commercial information. The invariant works are preferably prerecorded music. The overlay track is preferably a "DJ", who provides information regarding the invariant works, commercial information or news. The commercial information in this instance therefore refers to prerecorded segments. In this instance, the goal is to allow the invariant works to be received by the recipient and presented with improved optimization of the commercial information content and other messages presented at the time of output. Further, this system allows optimization of the presentation of the invariant portions as well, i.e., the commercial information and the program content may be independently selected at the receiver, with appropriate accounting for commercial subsidy. In a mobile receiver, it is preferable to include as a factor in the selection of commercial information a location of the receiver, as might be obtained from a GPS system, cellular location system, intelligent highway system or the like. This would allow geographically appropriate selection of commercial information, and possibly overlay information as well, e.g., traffic reports.

Another embodiment according to the present invention provides a hypertext linked media or multimedia environment, such as HTML/World Wide Web, wherein information transmitted and/or displayed is adaptively selected based on the particular user or the user's receiving system. Thus, various elements may be dynamically substituted during use.

Therefore, it is an object according to the present invention to provide adaptive man-machine interfaces, especially computer graphic user interfaces, which are ergonomically improved to provide an optimized environment. Productivity of computer operators is limited by the time necessary to communicate a desired action through the user interface to the device. To reduce this limitation, most likely user actions are predicted and presented as easily available options. The technologies also extend beyond this core theme in many differing ways, depending on the particular application.

The system also provides an intelligent, adaptive pattern recognition function in order to provide the operator with a small number of high probability choices, which may be complex, without the need for explicit definition of each atomic instruction comprising the desired action. The interface system predicts a desired action based on the user input, a past history of use, and a context of use.

In yet another embodiment, a present mood of a user is determined, either explicitly or implicitly, and the device selects program material that assists in a desired mood transition. The operation of the device may additionally acquire data relating to an individual and the respective moods, desires and characteristics, altering the path provided to alter the mood based on the data relating to the individual. As stated above, in a group setting, a most acceptable path is presented rather than a most desirable path as presented for an individual.

In determining mood, a number of physiologic parameters may be detected. In a training circumstance, these set of parameters are correlated with a temporally associated preference. Thus, when a user inputs a preference into the system as feedback, mood data is also obtained. Invariant preferences may be separated, and analyzed globally, without regard for temporal variations, while varying preferences are linked with information regarding the surrounding circumstances and stored. For example, the preference data may be used to train a neural network, e.g. using backpropagation of errors or other known methods. The inputs to the neural network include available data about surrounding context, such as time, environmental brightness, and persons present; source program choices, which may be raw data, preprocessed data, and abstracted data; explicit user input; and, in this embodiment, mood parameters, which may be physiological or biometric data, voice pattern, or implicit inputs. An example of an implicit input is an observation of a man-machine interaction, such as a video game. The manner in which a person plays a video game or otherwise interacts with a machine may provide valuable data for determining a mood or preference.

According to one embodiment of the invention, the image is preprocessed to decompose the image into object-elements, with various object-elements undergoing separate further processing. For example, certain backgrounds may be aesthetically modeled using simple fractal equations. While, in such circumstances the results may be inaccurate in an absolute sense, they may be adequate in a performance sense. Faces, on the other hand, have common and variable elements. Therefore, a facial model may be based on parameters having distinguishing power, such as width between eyes, mouth, shape of ears, and other proportions and dimensions. Thus, along with color and other data, a facial image may be stored as a reference to a facial model with the distinguishing parameters for reconstruction. Such a data processing scheme may produce a superior reconstructed image and allow for later recognition of the face, based on the stored parameters in reference to the model. Likewise, many different elements of an image may be extracted and processed in accordance with specific models to produce differentiating parameters, wherein the data is stored as a reference to the particular model along with the particular data set derived from the image. Such a processing scheme allows efficient image storage along with ease of object recognition, i.e., distinction between objects of the same class. This preprocessing provides a highly asymmetric scheme, with a far greater processing complexity to initially process the image than to subsequently reconstruct or otherwise later employ the data.

By employing a model-based object extraction system, the available bandwidth may be efficiently used, so that objects which fall within the scope of an available model may be identified with a model identification and a series of parameters, and objects not within the scope of a model may be allocated a comparatively greater bandwidth for general image description, e.g. JPEG, MPEG-1/MPEG-2, wavelet, standard fractal image compression (FIC), or other image processing schemes. In a worst case, therefore, the bandwidth required will be only slightly greater than that required for a corresponding standard method, due only to the additional overhead to define data types, as necessary. However, by employing a model based-object decomposition processing system, recognized elements may be described using only a small amount of data and a greater proportion of data used to describe unrecognized elements. Further, the models available may be dynamically updated, so that, as between a communicating transmitted and receiver, retransmission of unrecognized elements will be eliminated as a model is constructed.

Where image processing systems may produce artifacts and errors, an error minimization function may also be provided which compares an original image with a decomposed-recomposed image and produces an error function which allows correction for these errors. This error function may be transmitted with the processed data to allow more faithful reproduction. In a pattern recognition context, the error function may provide useful data relating to the reliability of a pattern correlation, or may provide useful data outside of the model and associated parameters for pattern recognition.

Thus, in the case of an object-extraction model-based processing system, the resulting data stream may be appropriate for both viewing and recognition. Of course, acoustic data may be likewise processed using acoustic models with variable parameters. However, in such a system, information for pattern recognition may be filtered, such as eliminating the error function or noise data. Further, certain types of objects may be ignored, for example, under normal circumstances, clouds in the sky provide little information for pattern recognition and may be removed. In such a system, data intended for viewing or listening will likely contain all objects in the original data stream, with as much original detail as possible given data storage and bandwidth constraints.

An object extraction model based processing system also allows for increased noise rejection, such as over terrestrial broadcast channels. By transmitting a model, the receiving system may interpolate or extrapolate data to fill in for missing data. By extrapolate, it is meant that past data is processed to predict a subsequent condition. By interpolate, it is meant that data presentation is delayed, and missing data may therefore be predicted from both past and subsequent data transmission. Missing portions of images may also be reconstructed from existing portions. This reconstruction process is similar to that described in U.S. Pat. No. 5,247,363, to reconstruct MPEG images; except that where model data is corrupted, the corruption must be identified and the corrupt data eliminated and replaced with predicted data.

It is therefore an object according to the present invention to provide a programmable control, having a status, responsive to an user input and a signal received from a signal source, comprising a controller, for receiving the user input and the signal and producing a control output; a memory for storing data relating to an activity of the user; a data processing system for adaptively predicting a most probable intended action of the user based on the stored data relating to the activity of the user and derived weighing of at least a subset of possible choices, the derivation being based on a history of use, a context of a respective choice and the status of the control; and a user feedback data presenting system comprising an output device for presentation of a variable sequence of programming options to the user, including the most probable intended action of the user, in a plurality of output messages, the output messages differing in available programming options.

The programmable control may be employed for performing an action based on user input and an information content of a signal received from a signal source, wherein the output device includes a display device, further comprising a user controlled direct manipulation-type input device, associated with the display device, having a device output, the device output being the user input; a plant capable of performing the action, being responsive to an actuator signal; and the controller, being for receiving data from the device output of the input device and the signal, and displaying user feedback data on the display device, the logical sequence of the user feedback data including at least one sequence of options sufficient to define an operable control program, and a presentation of additional programming options if the control program is not operable.

The programmable control may further comprise a user input processing system for adaptively determining a viewer preference based on the user input received by the controller; a program material processing system for characterizing the program material based on its content; a correlator for correlating the characterized content of the program material with the determined viewer preference to produce a correlation index; and a processor, selectively processing the program material based on the correlation index, the data processing system receiving an input from the processor.

It is noted that a metadata stream associated with the content may be employed to characterize the content, relieving the receiver or client device from the need for characterizing the content. This metadata may be structured or unstructured. The metadata and data relating to the use or consumption of the content is then used to determine or update the user profile. It is noted that the content may be of any type, and therefore need no be video or multimedia. In the case of a structured metadata, the updating of the user profile may include a simple time-weighted decay (e.g., a simple infinite impulse response filter with exponential decay or diurnal variations, or other type) for correlation with future metadata records, or a more complex algorithm.

The programmable control may also comprise a plurality of stored profiles, a processor for characterizing the user input to produce a characterized user input; and means for comparing the characterized user input with at least one of the plurality of stored profiles to produce a comparison index, wherein the variable sequence of programming options is determined on the basis of the comparison index. The processor for characterizing may perform an algorithm on the signal comprising a transform selected from the group consisting of an Affine transformation, a Fourier transformation, a discrete cosine transformation and a wavelet transformation.

It is a further object according to the present invention to provide a programmable controller for controlling a recording device for recording an analog signal sequentially on a recording medium having a plurality of uniquely identifiable storage locations, further comprising a sequential recording device for recording the analog signal, and a memory for storing, in a directory location on the recording medium which is separate from the storage location of the analog signal, information relating to the signal, processed to selectively retain characterizing information, and an identifier of a storage location on the recording medium in which the analog signal is recorded.

It is another object according to the present invention to provide a control, wherein program material is encrypted, further comprising a decryption system for decrypting the program material if it is selected to produce unencrypted program material and optionally an associated decryption event; a memory for storing data relating to the occurrence of the decryption event; and a central database for storing data relating to the occurrence of the decryption event in association with data relating to the viewer.

It is still another object according to the present invention to provide a control wherein the user input processing system monitors a pattern of user activity and predicts a viewer preference; the program material processing system comprising a processor for preprocessing the program material to produce a reduced data flow information signal substantially retaining information relating to the abstract information content of the program material and selectively eliminating data not relating to the abstract information content of the program material and for characterizing the information signal based on the abstract information content; and a comparing system for determining if the correlation index is indicative of a probable high correlation between the characterization of the information signal and the viewer preference and causing the stored program material to be processed by the processing means based on the determination. The system according to this aspect of the present invention preferably comprises an image program material storage and retrieval system.

The present invention further provides a control further comprising a memory for storing a characterization of the program material; an input for receiving a feedback signal from the viewer indicating a degree of agreement with the correlation index determination, wherein the feedback signal and the stored characterization are used by the viewer preference predicting means to predict a new viewer preference.

According to another aspect of the invention, it is an object to provide an image information retrieval apparatus, comprising a memory for storing compressed data representing a plurality of images; a data storage system for retrieving compressed data representing at least one of the plurality of images and having an output; a memory for storing characterization data representing a plurality of image types, having an output; and an image processor, receiving as inputs the outputs from the data storage system and the characterization data memory, and producing a signal corresponding to a relation between at least one of the plurality of images of the compressed data and at least one of the image types of the characterization data.

It is a still further aspect of the present invention to provide a video interface device for a user comprising a data transmission system for simultaneously transmitting data representing a plurality of programs; a selector for selecting at least one of the plurality of programs, being responsive to an input; a program database containing information relating to the plurality of programs, having an output; a graphical user interface for defining commands, comprising (a) an image display device having at least two dimensions of display, being for providing visual image feedback: and (b) a multidimensional input device having at least two dimensions of operability, adapted to correspond to the two dimensions of the display device, and having an output, so that the user may cause the input device to produce a corresponding change in an image of the display device by translating an indicator segment of the display in the at least two dimensions of display, based on the visual feedback received from the display device, the indicator segment being moved to a translated location of the display device corresponding to a user command; and a controller for controlling the graphical user interface and for producing the input of the selector, receiving as a control the output of the multidimensional input device, the controller receiving the output of the program database and presenting information relating to at least one of the plurality of programs on the display device associated with a command, the command being interpreted by the control means as the user command to produce the input of the selector to select the at least one of the plurality of programs associated with the command.

Another object of the present invention is to provide an apparatus, receiving as an input from a human user having a user characteristic, comprising an input device, producing an input signal from the human user input; a display for displaying information relating to the input from the user and feedback on a current state of the apparatus, having an alterable image type; an input processor for extracting an input instruction relating to a desired change in a state of the apparatus from the input signal; a detector for detecting one or more temporal-spatial user characteristics of the input signal, independent of the input instruction, selected from the group consisting of a velocity component, an efficiency of input, an accuracy of input, an interruption of input and a high frequency component of input; a memory for storing data related to the user characteristics; and a controller for altering the image type based on the user characteristics. The controller may alter the image type based on an output of the detector and the stored data so that the display displays an image type that corresponds to the detected user characteristics. The controller may further be for controlling the causation of an action on the occurrence of an event, further comprising a control for receiving the input instruction and storing a program instruction associated with the input instruction, the control having a memory sufficient for storing program instructions to perform an action on the occurrence of an event; and a monitor for monitoring an environment of the apparatus to determine the occurrence of the event, and causing the performance of the action on the occurrence of the event. The controller may also alters the image type based on an output of the detector and the stored data so that the display means displays an image type which corresponds to the detected user characteristics.

It is another object of the present invention to provide an adaptive programmable apparatus having a plurality of states, being programmable by a programmer and operating in an environment in which a plurality of possible events occur, each of the events being associated with different data, comprising an data input for receiving data; an programmer input, producing an input signal from the programmer; a memory for storing data relating to the data input or the input signal; a feedback device for adaptively providing information relating to the input signal and a current status of the apparatus to the programmer, based on the data input or the programmer input, the stored data, and derived weighing of at least a subset of possible choices, the derived weighing being based on a history of use, a context of a respective choice and the current status of the apparatus; a memory for storing programming data associated with the input signal; and a processor, having a control output, for controlling the response of the apparatus relating to the detection of the input signal or the data in accordance with the stored programming data, the processor: (a) processing the at least one of the input signal or the data to reduce an amount of information while substantially retaining an abstract portion of the information; (b) storing a quantity of the abstracted information; (c) processing the abstract portion of the information in conjunction with the stored quantity of abstracted information; and (d) providing the control output based on the processed abstract portion of the information and the stored programming data. The apparatus may further comprise an input for receiving a programming preference from the programmer indicating a plurality of possible desired events; the processor further including a correlator for correlating the programming preference with the data based on an adaptive algorithm and for determining a likelihood of occurrence of at least one of the desired events, producing the control output. The apparatus may further comprise an input for receiving feedback from the programmer indicating a concurrence with the control output of the processor, and modifying the response control based on the received feedback to increase a likelihood of concurrence. The apparatus may still further verify the programming data to ensure that the programming data comprise a complete and consistent set of instructions; and include a feedback system for interactively modifying the programming data. The apparatus may also comprise a chronological database and an accessing system for accessing the chronological database on the basis of the programming data stored in the memory.

It is also an object according to the present invention to provide an apparatus comprising an input for receiving a programming preference from the programmer indicating a plurality of possible desired events; and a correlator for correlating the programming preference with the data based on an adaptive algorithm and for determining a likelihood of occurrence of at least one of the desired events, producing the output, the output being associated with the initiation of the response.

The present invention also provides as an object an apparatus comprising an input for receiving feedback from the programmer indicating a concurrence with the output of the correlator, and modifying the algorithm based on the received feedback, the feedback device comprising a display and the input device is remote from the display, and providing a direct manipulation of display information of the display.

According to an aspect of the present invention, a processor of the programmable apparatus verifies the program instructions to ensure that the program instructions are valid and executable by the processor; an output for providing an option, selectable by the programmer input for changing an instruction stored by the processor, such that the apparatus enters a state wherein a new instruction may be input to substitute for the instruction, wherein the processor verifies the instructions such that the instructions are valid; and wherein the feedback device further presents information requesting confirmation from the programmer of the instructions associated with the input signal. The apparatus may further comprise a chronological database and an accessing system for accessing the chronological database on the basis of the program instructions stored in the memory.

The processor of the programmable apparatus may receive information from the input signal and/or from the data input; and may further comprise an input signal memory for storing at least a portion of the input signal or the data, a profile generator for selectively generating a profile of the input signal or the data, and an input signal profile memory for storing the profile of the input signal or the data separately from the input signal or the data in the input signal memory. The programmable apparatus may further comprise a processor for comparing the input signal or the data with the stored profile of the input signal or the data to determine the occurrence of an event, and the data optionally comprises image data and the processor for comparing performs image analysis. The image data may comprise data having three associated dimensions obtained by a method selected from the group consisting of synthesizing a three dimensional representation based on a machine based model derived from two dimensional image data, synthesizing a three dimensional representation derived from a time series of pixel images, and synthesizing a three dimensional representation based on a image data representing a plurality of parallax views each having at least two dimensions.

A user feedback data presenting device according to the present invention may comprise a display having a plurality of display images, the display images differing in available programming options.

According to another aspect of the present invention, a program material processing system is provided comprising means for storing template data; means for storing the image data; means for generating a plurality of domains from the stored image data, each of the domains representing different portions of the image information: means for creating, from the stored image data, a plurality of addressable mapped ranges corresponding to different subsets of the stored image data, the creating means including means for executing, for each of the mapped ranges, a procedure upon the one of the subsets of the stored image data which corresponds to the mapped range; means for assigning identifiers to corresponding ones of the mapped ranges, each of the identifiers specifying for the corresponding mapped range an address of the corresponding subset of stored image data; means for selecting, for each of the domains, the one of the mapped ranges which most closely corresponds according to predetermined criteria; means for representing at least a portion of the image information as a set of the identifiers of the selected mapped ranges; and means for selecting, from the stored templates, a template which most closely corresponds to the set of identifiers representing the image information. The means for selecting may comprise means for selecting, for each domain, the mapped range which is the most similar, by a method selected from at least one of the group consisting of selecting a minimum Hausdorff distance from the domain, selecting the highest cross-correlation with the domain and selecting the lowest mean square error of the difference between the mapped range and the domain. The means for selecting may also comprise, for each domain, the mapped range with the minimum modified Hausdorff distance calculated as D[db,mrb]+D[1−db,1−mrb], where D is a distance calculated between a pair of sets of data each representative of an image, db is a domain, mrb is a mapped range, 1−db is the inverse of a domain, and 1−mrb is an inverse of a mapped range. The means for representing may further comprise means for determining a feature of interest of the image data, selecting a mapped range corresponding to the feature of interest, storing the identifiers of the selected mapped range, selecting a further mapped range corresponding to a portion of image data having a predetermined relationship to the feature of interest and storing the identifiers of the further mapped range.

According to an embodiment of the present invention, the image data comprises data having three associated dimensions obtained by a method selected from the group consisting of synthesizing a three dimensional representation based on a machine based prediction derived from two dimensional image data, synthesizing a three dimensional representation derived from a time series of pixel images, and synthesizing a three dimensional representation based on a image data representing a plurality of parallax views having at least two dimensions.

It is therefore an object of the present invention to provide a programmable apparatus for receiving instructions from a programmer and causing an action to occur on the happening of an event, comprising an input device, producing an input instruction signal; a control means for receiving the input instruction signal, and storing a program instruction associated with the input instruction signal, the control means storing sufficient program instructions to perform an action on the occurrence of an event, the control means monitoring a status of the apparatus to determine the occurrence of various events, comparing the determined events with the program instructions, and performing the action on the occurrence of the event; a display means for interactively displaying information related to the instructions to be received, and responsive thereto, controlled by the control means, so that the programmer is presented with feedback on a current state of the apparatus and the program instruction; wherein the control means further comprises means for detecting one or more characteristics of the input instruction signal independent of the program instruction selected from the group consisting of a velocity component, an efficiency of input, an accuracy of input, an interruption of input, a high frequency component of input and a past history of input by the programmer, whereby when the control means detects a characteristic indicating that the display means is displaying information in a suboptimal fashion, the control means controls the display means to display information in a more optimal fashion.

It is also an object of the present invention to provide a programmable apparatus for receiving instructions from a programmer and causing an action to occur on the happening of an event, comprising an input device, producing an input instruction signal; a control means for receiving the input instruction signal, and storing a program instruction associated with the input instruction signal, the control means storing sufficient program instructions to perform an action on the occurrence of an event, the control means monitoring a status of the apparatus to determine the occurrence of various events, comparing the determined events with the program instructions, and performing the action on the occurrence of the event; a display means for interactively displaying information related to the instructions to be received, and responsive thereto, controlled by the control means, so that the programmer is presented with feedback on a current state of the apparatus and the program instruction; wherein the control means further comprises means for detecting a need by the programmer for more detailed information displayed on the display means, by detecting one or more characteristics of the input instruction signal independent of the program instruction selected from the group consisting of a velocity component, an efficiency of input, an accuracy of input, an interruption of input, a high frequency component of input and a past history of input by the programmer, whereby when the control means detects a characteristic indicating that the display means is insufficiently detailed information, the control means controls the display means to display more detailed information.

It is a further object of the present invention to provide a programmable apparatus having a data input, the apparatus receiving instructions from a programmer and causing an action to occur on the receipt of data indicating an event, comprising an input device, producing an input instruction signal; a control means for receiving the input instruction signal, and storing a program instruction associated with the input instruction signal, the control means storing sufficient program instructions to perform an action on the receipt of data indicating an event, the control means monitoring the data input; a display means for interactively displaying information related to the instructions to be received, and responsive thereto, controlled by the control means, so that the programmer is presented with feedback on a current state of the apparatus and the program instruction: wherein the control means receives a programming preference indicating a desired event from the input device which does not unambiguously define the event, and the control means monitors the data and causes the occurrence of the action when a correlation between the programming preference and the monitored data is above a predetermined threshold, indicating a likely occurrence of the desired event. It is also object of the present invention to provide the programmable aforementioned apparatus, wherein the input device is remote from the display means, and provides a direct manipulation of display information of the display means, further comprising means for verifying the program instructions so that the program instructions are executable by the control means. The control means may further comprise a calendar or other chronological database.

Another object of the present invention provides a programmable information storage apparatus having a data input, for receiving data to be stored, the apparatus receiving instructions from a programmer and causing an action to occur on the receipt of data indicating an event, comprising means for storing data from the data input; an input device, producing an input instruction signal; a control means for receiving the input instruction signal, and storing a program instruction associated with the input instruction signal, the control means storing sufficient program instructions to perform an action on the receipt of data from the data input indicating an event, the control means monitoring the data input to determine the occurrence of various events, comparing the determined events with the program instructions, and performing for storing the data the action on the occurrence of the event; wherein the control means receives identifying data from at least one of the input device and the data input, the identifying data being stored separately from the input data on a storage medium. The programmable information storage apparatus may also include means for reading the identifying data stored separately on the storage medium, and may also receive as an input the identifying data.

It is also an object of the present invention- to provide a programmable apparatus, wherein the control means provides an option, selectable by the input means in conjunction with the display means, for changing an input program instruction prior to execution by the control means, so that the apparatus enters a state wherein a new program instruction may be input to substitute for the changed input step, wherein the control means verifies the program instructions so that the program instructions are executable by the control means.

It is still another object of the present invention to provide a programmable apparatus, wherein the control means further causes the display means to display a confirmation screen after the program instructions are input, so that the programmer may confirm the program instructions.

Another object of the present invention is to provide a programmable information storage apparatus, wherein the control means further comprises means for recognizing character data present in a data stream of the input data, the identifying data comprising the recognized character data.

It is a still further object of the present invention to provide a video tape recording apparatus, comprising a video signal receiving device, a recording device for recording the video signal, wherein the control analyzes the video signal for the presence of a symbol, and recognizes the symbol as one of a group of recognized symbols, and the control stores the recognized symbol separately from the video signal.

Another object of the present invention is to provide a recording device for recording an analog signal sequentially on a recording medium, comprising means for characterizing the analog signal, wherein data representing the characterization and a location of the analog signal on the recording medium are stored in a directory location on the recording medium separately from the analog signal.

It is a further object of the present invention to provide an interface for a programmable control for input of a program for a controller to execute, which performs an action based on an external signal, comprising an input device, a controller for receiving data from the input device and from an external stimulus, a plant being controlled by the controller based on an input from the input device and the external stimulus, and a display device being controlled by the controller, for providing visual feedback to a user operating the input device, wherein a predetermined logical sequence of programming options is presented to the user on the display device, in a plurality of display screens, each of the display screens differing in available programming choices; the logical sequence including a correct sequence of choices to set an operable control program, so that no necessary steps are omitted; the external stimulus comprises a timing device, and the display comprises a display option for programming the plant to perform an action at a time which is input through the input device as a relative position on the display device, the relative position including a means for displaying an absolute time entry and means for displaying a relative time entry, the display also comprising a display option means for performing an action at a time; the control comprises means for presenting the user, on the display device, with a most probable action, which may be selected by the user through activation of the input device without entering data into the controller through the input device relating to both the action and the event; the display also comprising means for indicating completion of entry of a programming step, which means indicates to the user an indication that the programming step is not completed if information necessary for execution of the step is not available to the controller; and the controller being capable of controlling the display device to present information to the user relating to the use of the apparatus if necessary for use of the device by the user.

Another object of the present invention provides a system for presenting a program to a viewer, comprising a source of program material; means for determining a viewer preference, the viewer preference optionally being context sensitive; means for receiving the program material from the source; means for characterizing the program material based on its content; means for correlating the characterized content of the program material with the determined viewer preference to produce a correlation index; and means for presenting the program material to the viewer, if the correlation index indicates a probable high correlation between the characterization of the program material and the viewer preference.

Another object of the present invention is to provide a system for presenting a program to a viewer, comprising a source of program material; means for determining a viewer preference; means for receiving the program material from the source; means for storing the program material; means for preprocessing the program material to produce a reduced data flow information signal retaining information relating to a character of the program material and eliminating data not necessary to characterize the program material; means for characterizing the information signal based on its content; means for correlating the characterized content of the information signal with the determined viewer preference to produce a correlation index; and means for presenting the stored program material to the viewer, if the correlation index indicates a probable high correlation between the characterization of the information signal and the viewer preference. The system may also include a means for storing the information signal, wherein the characterizing means characterizes the stored information signal, and also a memory for storing the program material while the characterizing means produces characterized content and the correlating means produces the correlation index.

Still another object of the present invention is to provide a system, wherein the program material is encrypted, further comprising means for decrypting the program material to produce a decryption event; and means for charging an account of the viewer based on the occurrence of a decryption event. Thus, a decryption processor and an accounting database are provided for these purposes.

Another object of the present invention is to allow the means for characterizing the program material to operate without causing a decryption event. Thus, the data stream may include characterization data specifically suitable for processing by a characterizing system, or the decryption processor may be provided with multiple levels of functionality, or both. Further, the system may comprise a memory for storing the program material while the characterizing means produces characterized content and the correlating means produces the correlation index. The characterizing means may also characterize the program material stored in memory, and the program material stored in memory may be compressed.

Another object of the present invention is to provide a controller for controlling a plant, having a sensor for sensing an external event and producing a sensor signal, an actuator, responsive to an actuator signal, for influencing the external event, and a control means for receiving the sensor signal and producing an actuator signal, comprising means for inputting a program; means for storing the program; means for characterizing the sensor signal to produce a characterized signal; and means for comparing the characterized signal with a pattern stored in a memory to produce a comparison index, wherein the actuator signal is produced on the basis of the comparison index and the program, wherein the characterization comprises an Affine transformation of the sensor signal. The characterization may comprise one or more transformation selected from the group consisting of an Affine transformation, a Fourier transformation, a Gabor transformation, and a wavelet transformation.

It is another object of the present invention to provide a method for automatically recognizing digital image data consisting of image information, the method comprising the steps performed by a data processor of storing a plurality of templates; storing the image data in the data processor; generating a plurality of addressable domains from the stored image data, each of the domains representing a portion of the image information; creating, from the stored image data, a plurality of addressable mapped ranges corresponding to different subsets of the stored image data, the creating step including the substep of (a) executing, for each of the mapped ranges, a corresponding procedure upon the one of the subsets of the stored image data which corresponds to the mapped ranges; (b) assigning identifiers to corresponding ones of the mapped ranges, each of the identifiers specifying for the corresponding mapped range a procedure and a address of the corresponding subset of the stored image data; (c) optionally subjecting a domain to a transform selected from the group consisting of a predetermined rotation, an inversion, a predetermined scaling, and a predetermined preprocessing in the time, frequency, and/or wavelet domain; (d) selecting, for each of the domains or transformed domains, the one of the mapped ranges which most closely corresponds according to predetermined criteria; (e) representing the image information as a set of the identifiers of the selected mapped ranges; and (f) selecting, from the stored templates, a template which most closely corresponds to the set of identifiers representing the image information. The step of selecting the mapped ranges may also include the substep of selecting, for each domain, a most closely corresponding one of the mapped ranges.

It is another object of the present invention to provide a method wherein the step of selecting the most closely corresponding one of the mapped ranges includes the step of selecting, for each domain, the mapped range which is the most similar, by a method selected from one or more of the group consisting of selecting minimum Hausdorff distance from the domain, selecting the highest cross-correlation with the domain, selecting the highest fuzzy correlation with the domain and selecting the minimum mean square error with the domain.

Another object of the present invention provides a method wherein the step of selecting the most closely corresponding one of mapped ranges includes the step of selecting, for each domain, the mapped range with the minimum modified Hausdorff distance calculated as $D[db,mrb]+D[1-db,1-mrb]$, where D is a distance calculated between a pair of sets of data each representative of an image, db is a domain, mrb is a mapped range, 1−db is the inverse of a domain, and 1−mrb is an inverse of a mapped range.

Another object of the present invention provides a method wherein the digital image data consists of a plurality of pixels each having one of a plurality of associated color map values, further comprising the steps of optionally transforming the color map values of the pixels of each domain by a function including at least one scaling function for each axis of the color map, each of which may be the same or different, and selected to maximize the correspondence between the domains and ranges to which they are to be matched; selecting, for each of the domains, the one of the mapped ranges having color map pixel values which most closely correspond to the color map pixel values of the domain according to a predetermined criteria, wherein the step of representing the image color map information includes the substep of representing the image color map information as a set of values each including an identifier of the selected mapped range and the scaling functions; and selecting a most closely corresponding stored template, based on the identifier of the color map mapped range, the scaling functions and the set of identifiers representing the image information. The first criteria may comprise minimizing the Hausdorff distance between each domain and the selected range.

Another object of the present invention is to provide a method further comprising the steps of storing delayed image data, which represents an image of a moving object differing in time from the image data in the data processor; generating a plurality of addressable further domains from the stored delayed image data, each of the further domains representing a portion of the delayed image information, and corresponding to a domain; creating, from the stored delayed image data, a plurality of addressable mapped ranges corresponding to different subsets of the stored delayed image data; matching the further domain and the domain by subjecting a further domain to one or both of a corresponding transform selected from the group consisting of a null transform, a rotation, an inversion, a scaling, a translation and a frequency domain preprocessing, which corresponds to a transform applied to a corresponding domain, and a noncorresponding transform selected from the group consisting of a rotation, an inversion, a scaling, a translation and a frequency domain preprocessing, which does not correspond to a transform applied to a corresponding domain; computing a motion vector between one of the domain and the further domain, or the set of identifiers representing the image information and the set of identifiers representing the delayed image information, and storing the motion vector; compensating the further domain with the motion vector and computing a difference between the compensated further domain and the domain; selecting, for each of the delayed domains, the one of the mapped ranges which most closely corresponds according to predetermined criteria; representing the difference between the compensated further domain and the domain as a set of difference identifiers of a set of selected mapping ranges and an associated motion vector and representing the further domain as a set of identifiers of the selected mapping ranges; determining a complexity of the difference based on a density of representation; and when the difference has a complexity below a predetermined threshold, selecting, from the stored templates, a template which most closely corresponds to the set of identifiers of the image data and the set of identifiers of the delayed image data.

Another object of the present invention provides an apparatus for automatically recognizing digital image data consisting of image information, comprising means for storing template data; means for storing the image data; means for generating a plurality of addressable domains from the stored image data, each of the domains representing a different portion of the image information; means for creating, from the stored image data, a plurality of addressable mapped ranges corresponding to different subsets of the stored image data, the creating means including means for executing, for each of the mapped ranges, a procedure upon the one of the subsets of the stored image data which corresponds to the mapped range; means for assigning identifiers to corresponding ones of the mapped ranges, each of the identifiers specifying for the corresponding mapped range an address of the corresponding subset of stored image data; means for selecting, for each of the domains, the one of the mapped ranges which most closely corresponds according to predetermined criteria; means for representing the image information as a set of the identifiers of the selected mapped ranges; and means for selecting, from the stored templates, a template which most closely corresponds to the set of identifiers representing the image information.

It is also an object of the present invention to provide a method and system for processing broadcast material having a first portion and a second portion, wherein the first portion comprises an content segment and the second portion comprises a commercial segment, in order to allow alteration in the presentation of commercial segments, based on the recipient, commercial sponsor, and content provider, while providing means for accounting for the entire broadcast.

Another object of an embodiment of the present invention provides an apparatus comprising a user interface, receiving a control input and a user attribute from the user; a memory system, storing the control input and user attribute; an input for receiving content data; means for storing data describing elements of the content data; means for presenting information to the user relating to the content data, the information being for assisting the user in defining a control input, the information being based on the stored user attribute and the data describing elements of the content data; and means for processing elements of the content data in dependence on the control input, having an output. This apparatus according to this embodiment may be further defined as a terminal used by users of a television program delivery system for suggesting programs to users, wherein the user interface comprises means for gathering the user specific data to be used in selecting programs; the memory system comprises means, connected to the gathering means, for storing the user specific data; the input for receiving data describing elements of the content data comprises means for receiving the program control information containing the program description data; and the processing means comprises program selection means, operably connected to the storing means and the receiving means, for selecting one or more programs using a user's programming preferences and the program control information. In this case, the program selection means may comprise a processor, wherein the user programming preferences are generated from the user specific data; and means, operably connected to the program selection means, for suggesting the selected programs to the user. The apparatus processing means selectively may records the content data based on the output of the processing means. Further, the presenting means presents information to the user in a menu format. The presenting means may comprises means for matching the user attribute to content data.

The data describing elements of an associated data stream may, for example, comprise a program guide generated remotely from the apparatus and transmitted in electronically accessible form; data defined by a human input, and/or data defined by an automated analysis of the content data.

According to another embodiment, the present invention comprises a method, comprising the steps of receiving data describing an user attribute; receiving a content data stream, and extracting from the content data stream information describing a plurality of program options; and processing the data describing a user attribute and the information describing a plurality of program options to determine a likely user preference; selectively processing a program option based on the likely user preference. The method may be embodied in a terminal for a television program delivery system for suggesting programs to users for display on a television using program control information and user specific data. In that case, the step of receiving data describing an user attribute may comprise gathering user specific data to be used in selecting programs, and storing the gathered user specific data; the step of receiving a content data stream, may comprise receiving both programs and program control information for selecting programs as the information describing a plurality of program options; the selectively processing step may comprise selecting one or more programs using a user's programming preferences and the received program control information, wherein the user programming preferences are generated from the user specific data; and the method further including the step of presenting the program or information describing a program option for the selected programs to the user.

The user attribute may comprise a semantic description of a preference, or some other type of description, for example a personal profile, a mood, a genre, an image representing or relating to a scene, a demographic profile, a past history of use by the user, a preference against certain types of media, or the like. In the case of a semantic preference, the data processing step may comprise determining a semantic relationship of the user preference to the information describing a plurality of program options. The program options may, for example, be transmitted as an electronic program guide, the information being in-band with the content (being transmitted on the same channel), on a separate channel or otherwise out of band, through a separate communications network, e.g., the Internet, dial-up network, or other streaming or packet based communications system, or by physical transfer of a computer-readable storage medium, such as a CD-ROM or floppy disk. The electronic program guide may include not only semantic or human-readable information, but also other types of metadata relating to or describing the program content.

In a further embodiment of the present invention, it is an object to provide a device for identifying a program in response to user preference data and program control information concerning available programs, comprising means for gathering the user preference data; means, connected to the gathering means, for storing the gathered user preference data; means for accessing the program control information; and means, connected to the storing means and accessing means, for identifying one or more programs based on a correspondence between a user's programming preferences and the program control information. For example, the identifying means identifies a plurality of programs, a sequence of identifications transmitted to the user being based on a degree of correspondence between a user's programming preferences and the respective program control information of the identified program. The device my selectively record or display the program, or identify the program for the user, who may then define the appropriate action by the device. Therefore, a user may, instead of defining "like" preferences, may define "dislike" preference, which are then used to avoid or filter certain content. Thus, this feature may be used for censoring or parental screening, or merely to avoid unwanted content. Thus, the device comprises a user interface adapted to allow interaction between the user and the device for response to one or more of the identified programs. The device also preferably comprises means for gathering the user specific data comprises means for monitoring a response of the user to identified programs.

It is a further object of the invention to provide a device which serves as a set top terminal used by users of a television program delivery system for suggesting programs to users using program control information containing scheduled program description data, wherein the means for gathering the user preference data comprising means for gathering program watched data; the means, connected to the gathering means, for storing the gathered user preference data comprising means, connected to the gathering means, for storing the program watched data; the means for accessing the program control information comprising means for receiving the program control information comprising the scheduled program description data; the means, connected to the storing means and accessing means, for identifying one or more programs based on a correspondence between a user's programming preferences and the program control information, being for selecting at least one program for suggestion to the viewer, comprising: means for transforming the program watched data into preferred program indicators, wherein a program indicator comprises a program category with each program category having a weighted value; means for comparing the preferred program indicators with the scheduled program description data, wherein each scheduled program is assigned a weighted value based on at least one associated program category; means for prioritizing the scheduled programs from highest weighted value programs to lowest weighted value programs; means for indicating one or more programs meeting a predetermined weight threshold, wherein all other programs are excluded from program suggestion; and means, operably connected to the program selection means, for displaying for suggestion the selected programs to the user.

It is a further aspect of the invention to provide device a device comprising: a data selector, for selecting a program from a data stream; an encoder, for encoding programs in a digitally compressed format; a mass storage system, for storing and retrieving encoded programs; a decoder, for decompressing the retrieved encoded programs; and an output, for outputting the decompressed programs.

Therefore, the present invention provides a system and method for making use of the available broadcast media forms for improving an efficiency of matching commercial information to the desires and interests of a recipient, improving a cost effectiveness for advertisers, improving a perceived quality of commercial information received by recipients and increasing profits and reducing required information transmittal by publishers and media distribution entities.

This improved advertising efficiency is accomplished by providing a system for collating a constant or underlying published content work with a varying, demographically or otherwise optimized commercial information content. This commercial information content therefore need not be predetermined or even known to the publisher of the underlying works, and in fact may be determined on an individual receiver basis. It is also possible to integrate the demographically optimized information within the content. For example, overlays in traditional media, and electronic substitutions or edits in new media, may allows seamless integration. The content alteration need not be only based on commercial information, and therefore the content may vary based on the user or recipient.

The technologies emphasize adaptive pattern recognition of both the user input and data, with possible use of advanced signal processing and neural networks. These systems may be shared between the interface and operational systems, and therefore a controller for a complex system may make use of the intrinsic processing power available, rather than requiring additional computing resources, although this unification is not required. In fact, while hardware efficiency dictates that near term commercial embodiments employ common hardware for the interface system and the operational system, future designs may successfully separate the interface system from the operational system, allowing portability and efficient application of a single interface system for a number of operational systems.

The adaptive nature of the technologies derive from an understanding that people learn most efficiently through the interactive experiences of doing, thinking, and knowing. Users change in both efficiency and strategy over time. To promote ease-of-use, efficiency, and lack of frustration of the user, the interface of the device is intuitive and self explanatory, providing perceptual feedback to assist the operator in communicating with the interface, which in turn allows the operational system to identify of a desired operation. Another important aspect of man-machine interaction is that there is a learning curve, which dictates that devices which are especially easy to master become frustratingly elemental after continued use, while devices which have complex functionality with many options are difficult to master and may be initially rejected, or used only at the simplest levels. The present technologies address these issues by determining the most likely instructions of the operator, and presenting these as easily available choices, by analyzing the past history data and by detecting the "sophistication" of the user in performing a function, based on all information available to it. The context of use is also a factor in many systems. The interface seeks to optimize the interface adaptively and immediately in order to balance and optimize both quantitative and qualitative factors. This functionality may greatly enhance the quality of interaction between man and machine, allowing a higher degree of overall system sophistication to be tolerated.

The interface system analyzes data from the user, which may be both the selections made by the user in context, as well as the efficiency by which the user achieves the selection. Thus, information concerning both the endpoints and path are considered and analyzed by the human user interface system.

The interface may be advantageously applied to an operational system that has a plurality of functions, certain of which are unnecessary or are rarely used in various contexts, while others are used with greater frequency. In such systems, the application of functionality may be predictable. Therefore, the present technologies provide an optimized interface system that, upon recognizing a context, dynamically reconfigures the availability or ease of availability of functions and allows various functional subsets to be used through "shortcuts". The interface presentation will therefore vary over time, use and the particular user.

The advantages to be gained by using an intelligent data analysis interface for facilitating user control and operation of the system are more than merely reducing the average number of selections or time to access a given function. Rather, advantages also accrue from providing a means for access and availability of functions not necessarily previously existing or known to the user, improving the capabilities and perceived quality of the product.

Further improvements over prior interfaces are also possible due to the availability of pattern recognition functionality as a part of the interface system. In those cases where the pattern recognition functions are applied to large amounts of data or complex data sets, in order to provide a sufficient advantage and acceptable response time, powerful computational resources, such as powerful RISC processors, advanced DSPs or neural network processors are made available to the interface system. On the other hand, where the data is simple or of limited scope, aspects of the technology may be easily implemented as added software-based functionality in existing products having limited computational resources.

The application of these technologies to multimedia data processing systems provides a new model for performing image pattern recognition and for the programming of applications including such data. The ability of the interface to perform abstractions and make decisions regarding a closeness of presented data to selection criteria makes the interface suitable for use in a programmable control, i.e. determining the existence of certain conditions and taking certain actions on the occurrence of detected events. Such advanced technologies might be especially valuable for disabled users.

In a multimedia environment, it may be desirable for a user to perform an operation on a multimedia data event. Past systems have required explicit indexing or identification of images and events. The present technologies, however, allow an image, diagrammatic, abstract or linguistic description of the desired event to be acquired by the interface system from the user and applied to identify or predict the multimedia event(s) desired, without requiring a separate manual indexing or classification effort. These technologies may also be applied to single media data.

The interface system analyzes data from many different sources for its operation. Data may be stored or present in a dynamic data stream. Thus, in a multimedia system, there may be a real-time video feed, a stored event database, as well as an exemplar or model database. Further, since the device is adaptive, information relating to past experience of the interface, both with respect to exposure to data streams and user interaction, is also stored.

This data analysis aspect of the interface system may be substantially processor intensive, especially where the data includes abstract or linguistic concepts or images to be analyzed. Interfaces that do not relate to the processing of such data may be implemented with simpler hardware. On the other hand, systems that handle complex data types may necessarily include sophisticated processors, adaptable for use by the interface system. A portion of the data analysis may also overlap the functional analysis of the data for the operational system.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

Embodiments of the present invention are shown in the figures in the drawings, in which.

DETAILED DESCRIPTION OF THE PREFERRED EMBODIMENTS

Figure 1:
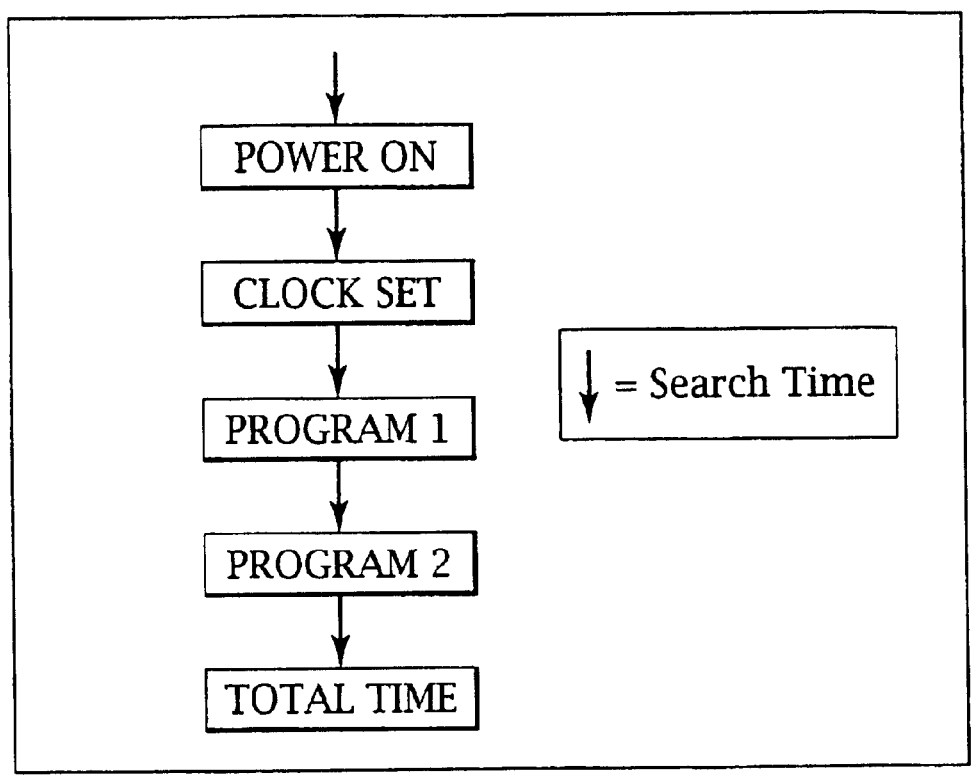
FIG. 1 is a flow chart of the steps required to set a VCR.
Figure 2:
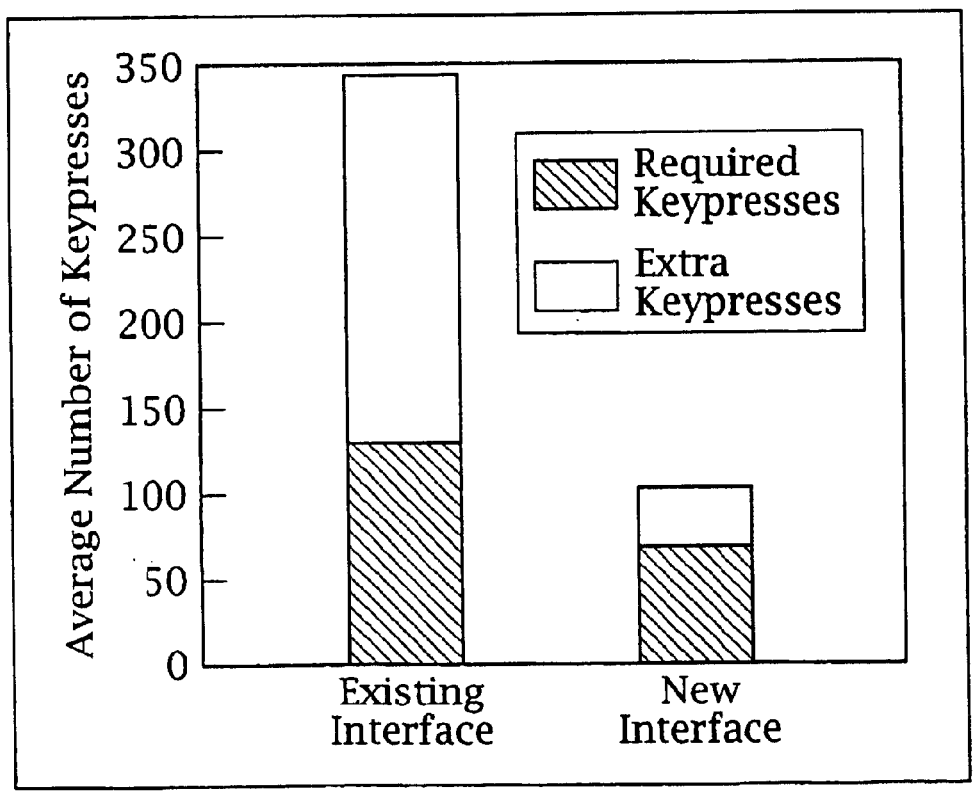
FIG. 2 shows a graphical comparison of required and extra keypresses for the prior art and the interface of the present invention.
Figure 3:
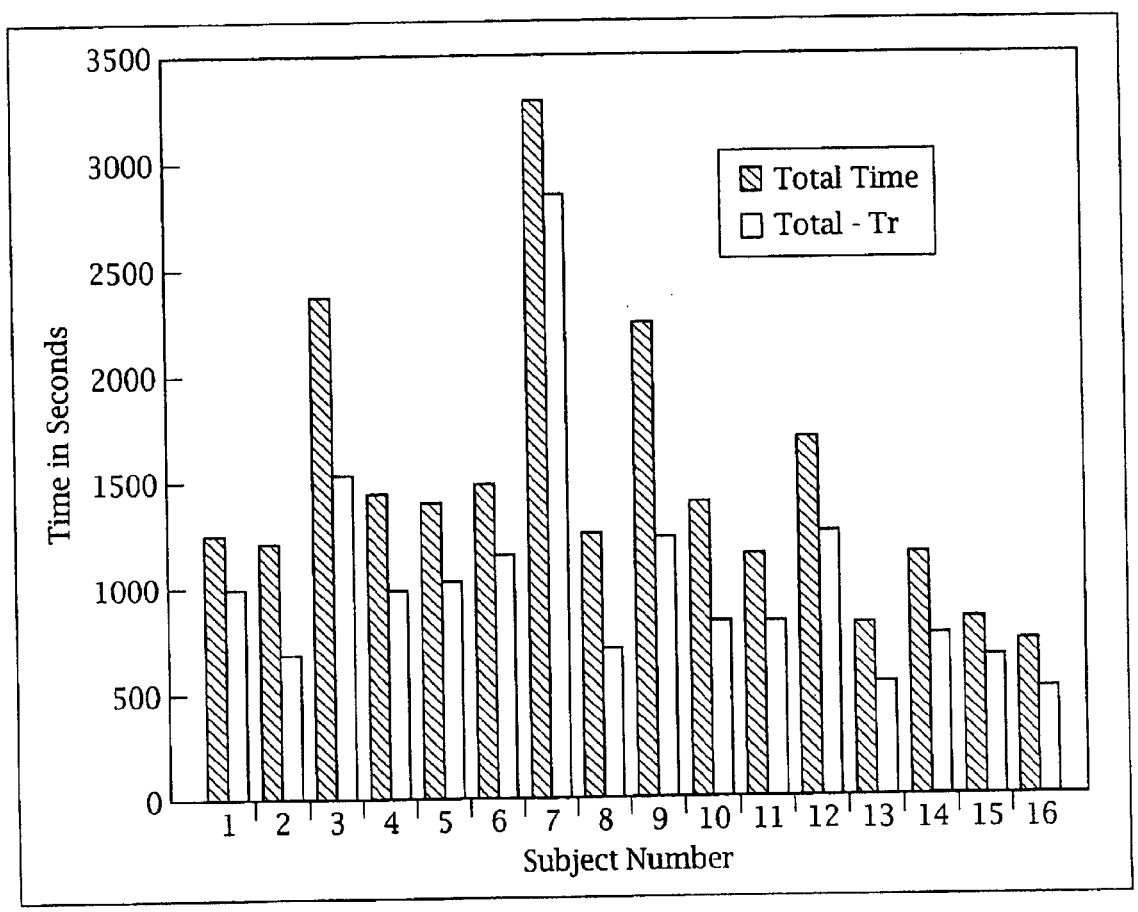
FIG. 3 graphically shows the differences in seconds between total time for the prior art for each user.
Figure 4:
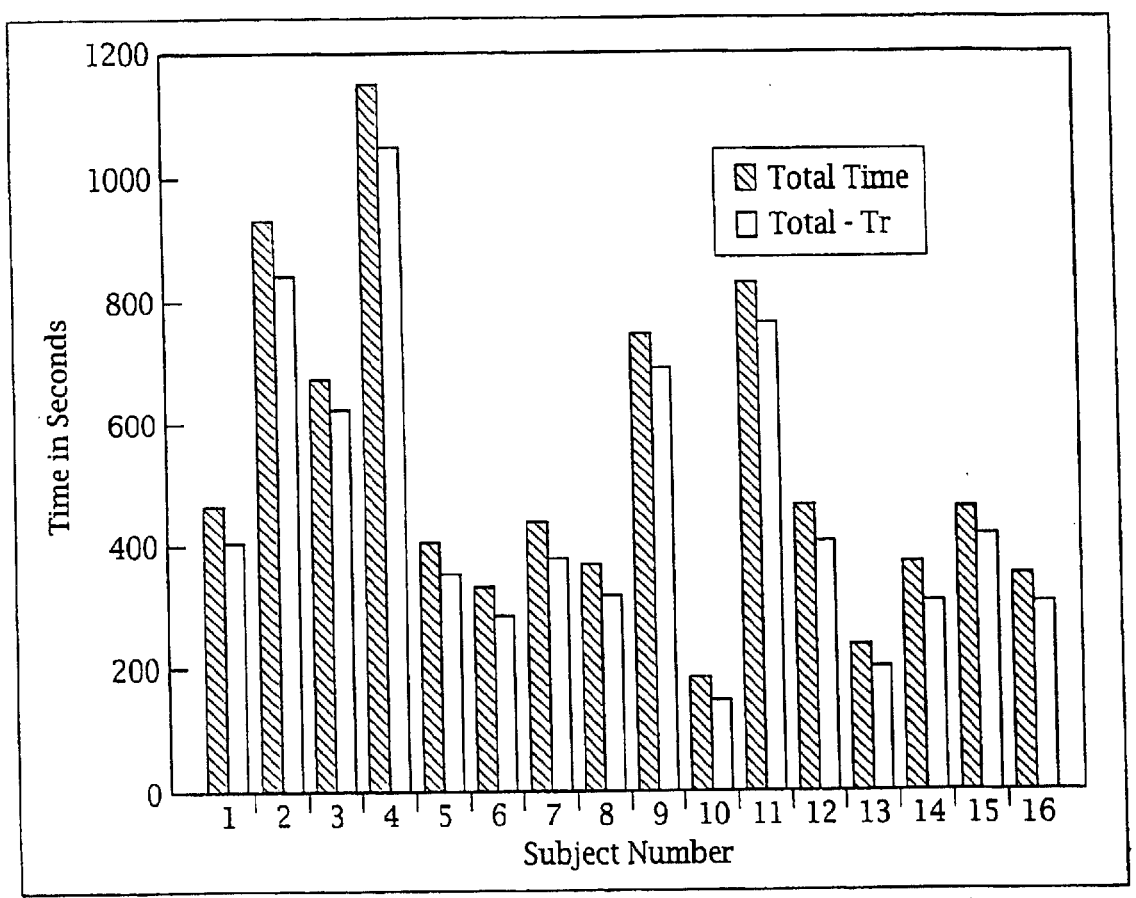
FIG. 4 graphically shows the differences in seconds between total time for the interface of the present invention for each user.
Figure 5:
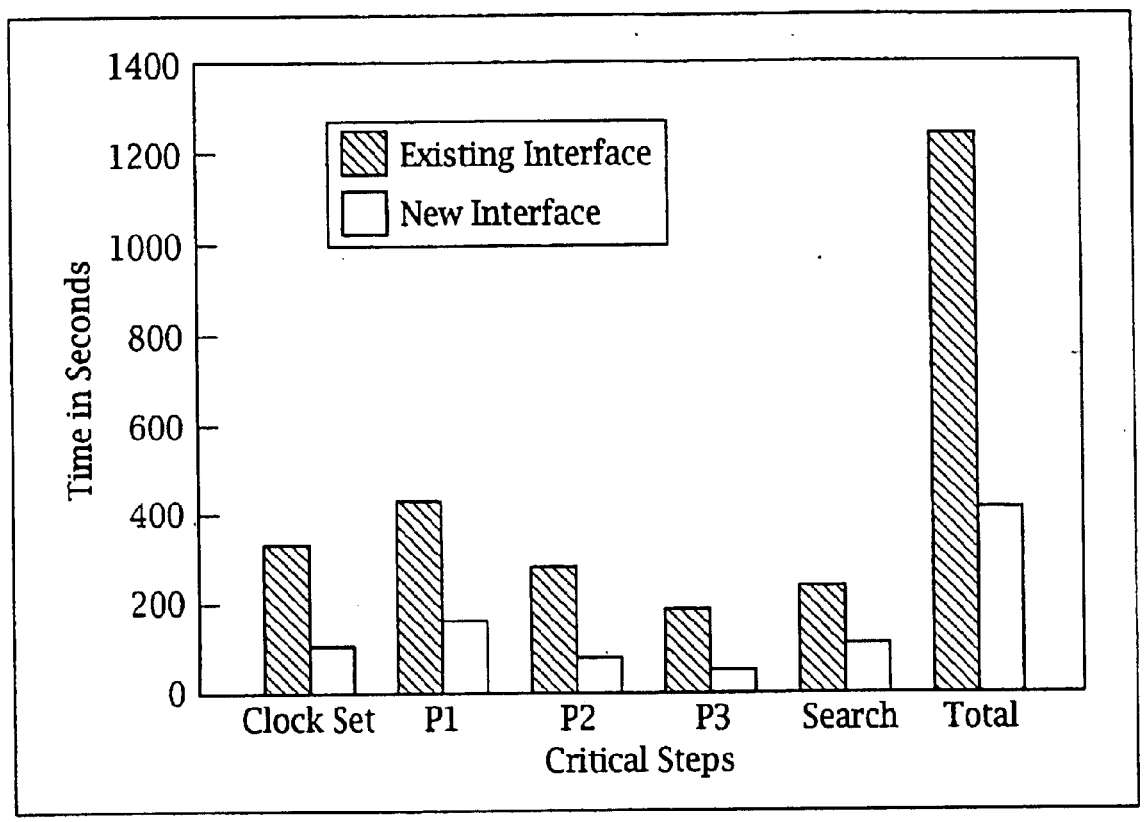
FIG. 5 graphically shows the programming steps for the comparison of the prior art and the interface of the present invention.
Figure 6:
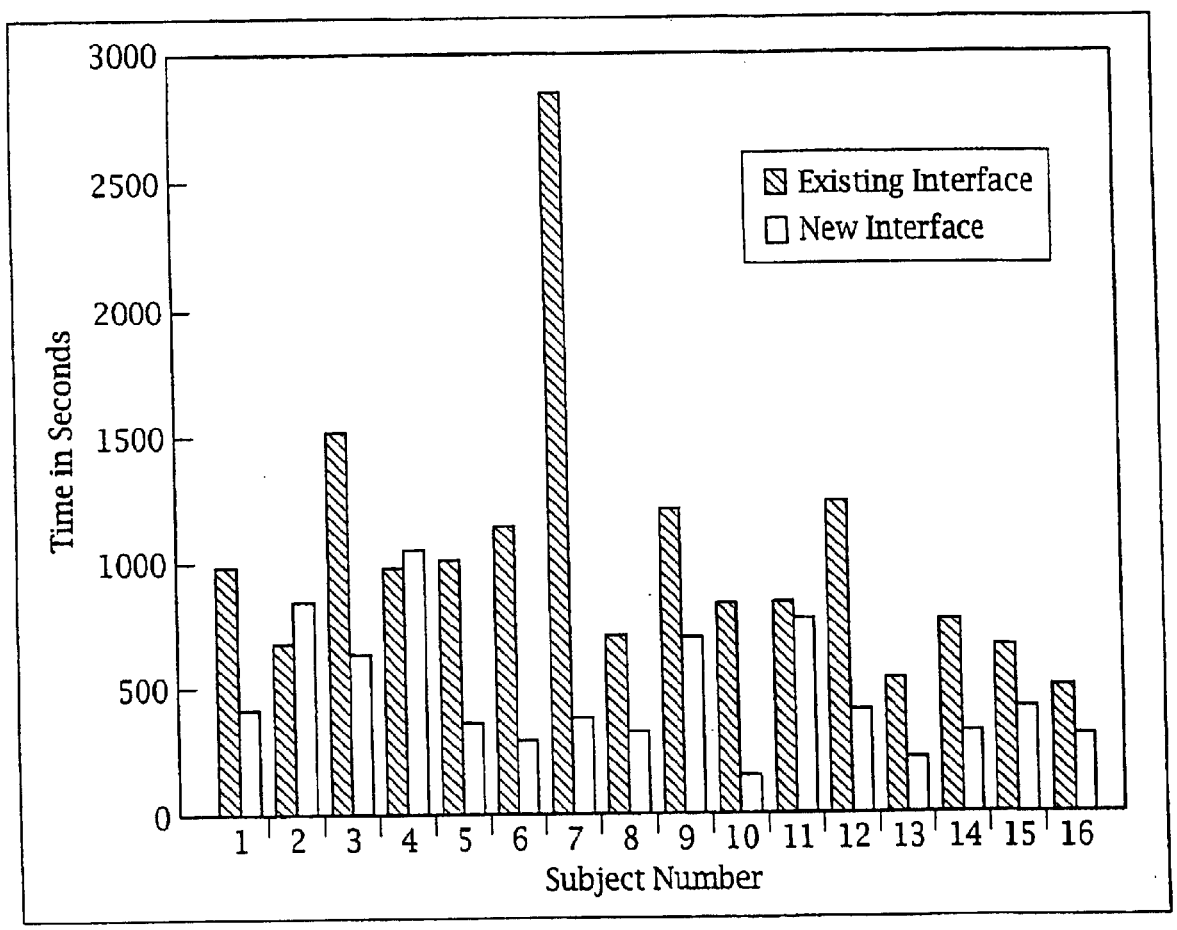
FIG. 6 graphically shows comparative statistics by user comparing the prior art and the interface of the present invention.
Figure 7:
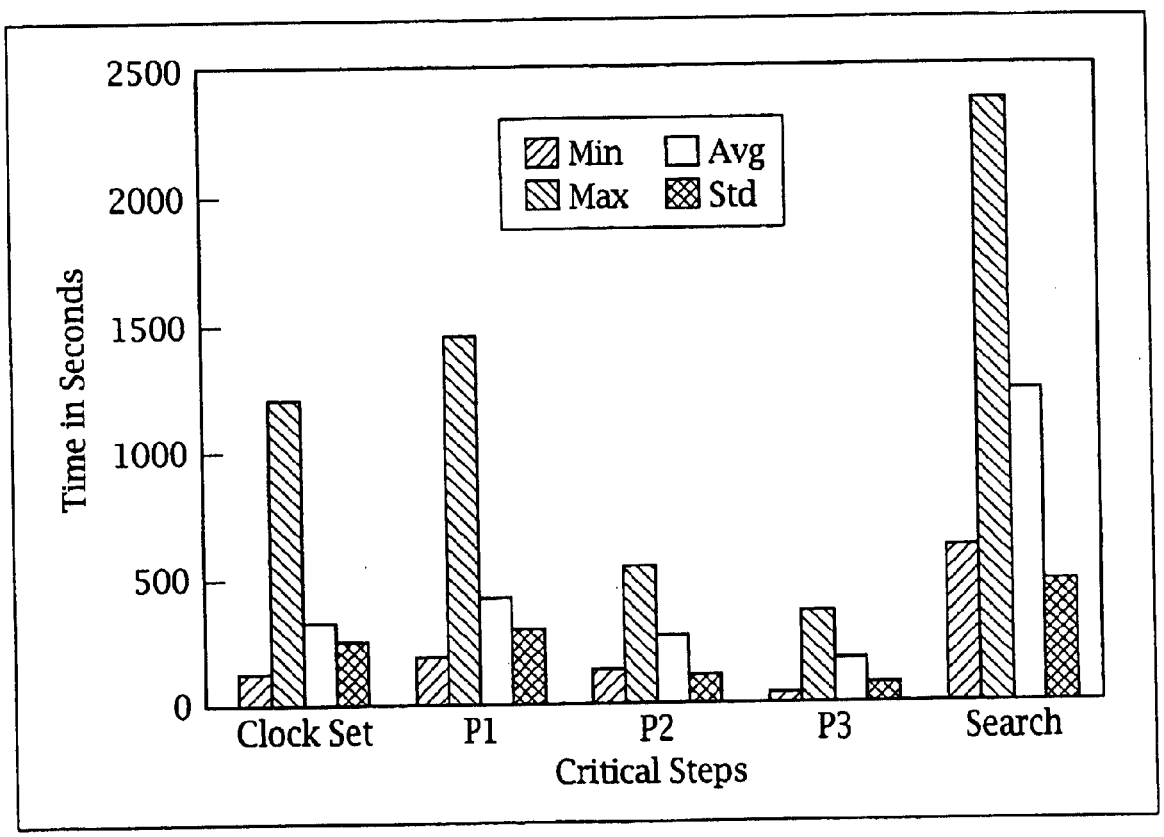
FIGS. 7 and 8 graphically show the critical steps in programming the prior art and the interface of the present invention.
Figure 8:
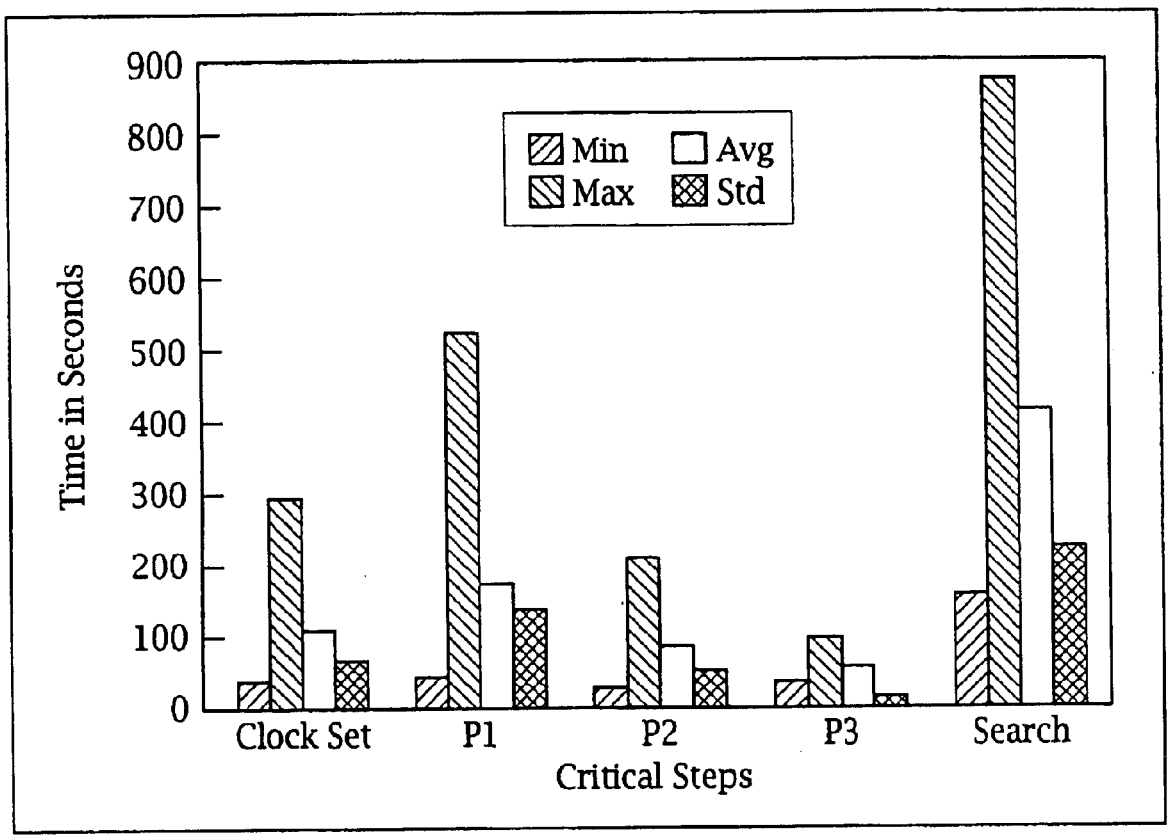
Figure 9:
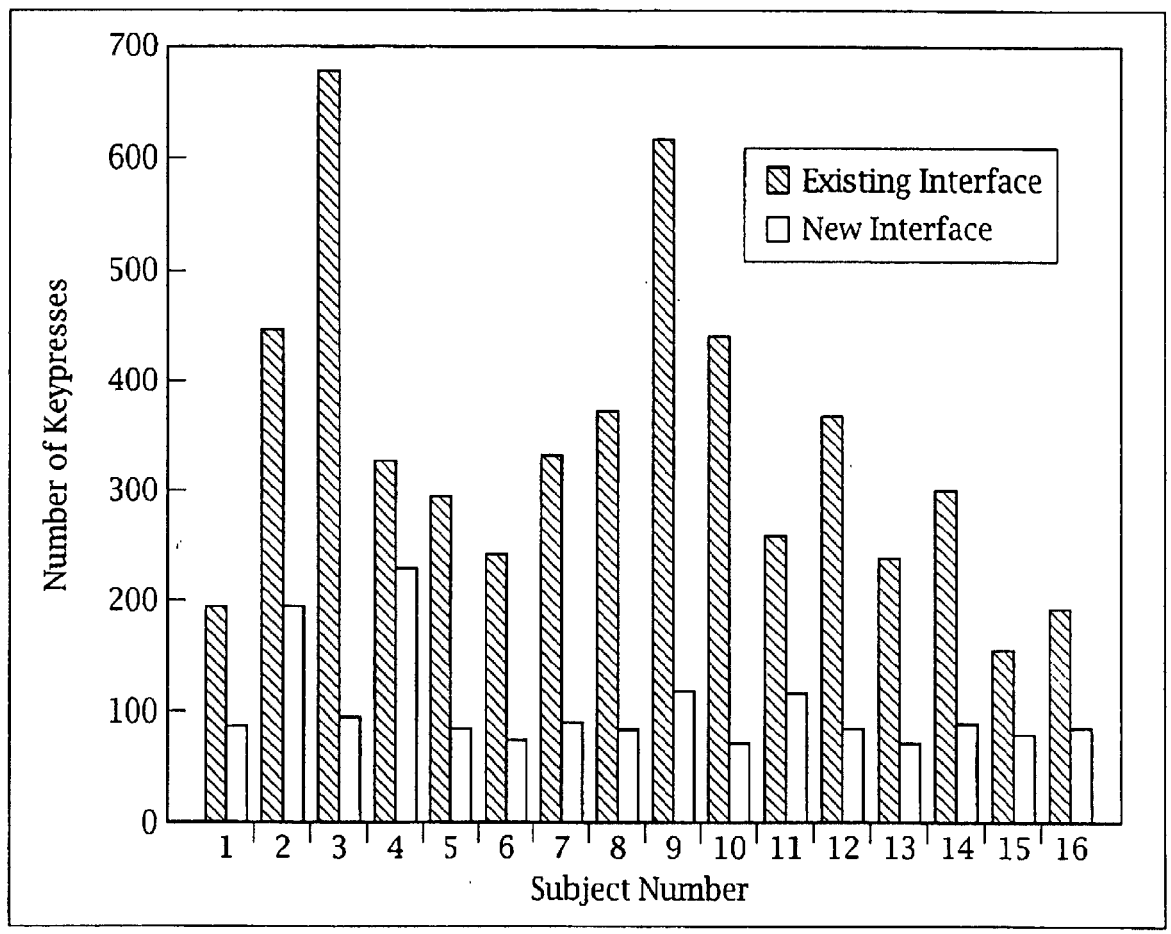
FIG. 9 graphically shows the number of keypresses made by test participants comparing the prior art and the interface of the present invention.
Figure 10:
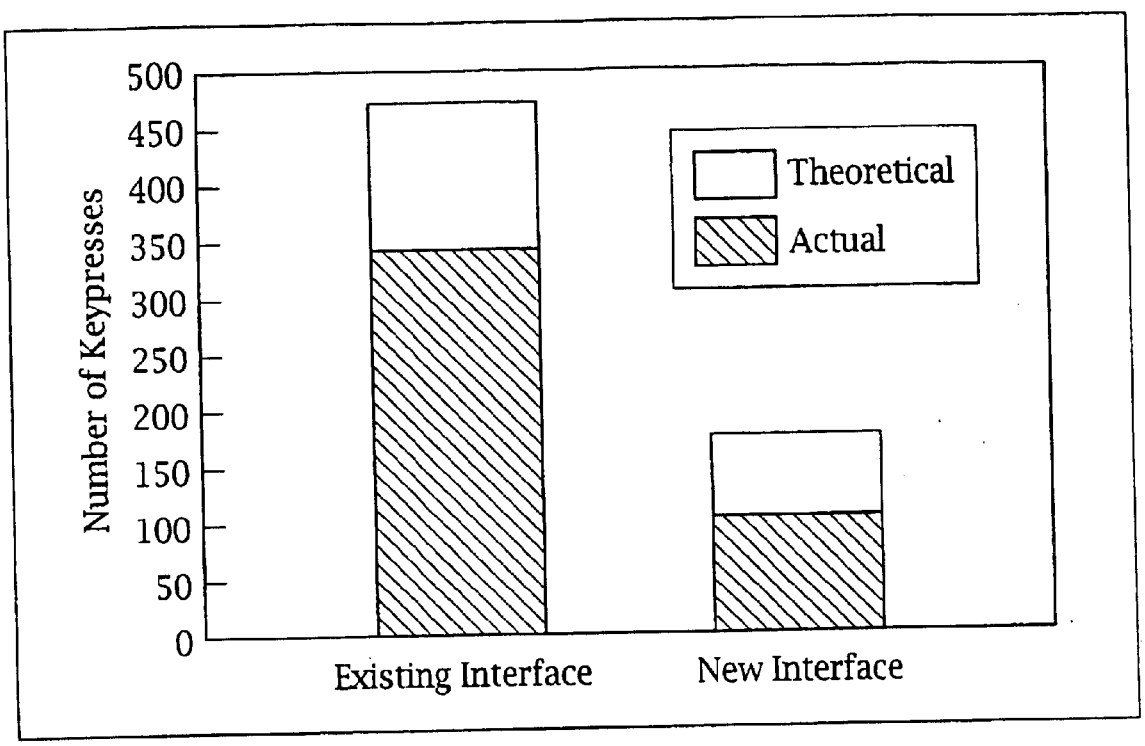
FIG. 10 graphically shows the comparison of the actual and theoretical number of keypresses necessary for programming the prior art and the interface of the present invention.
Figure 11:
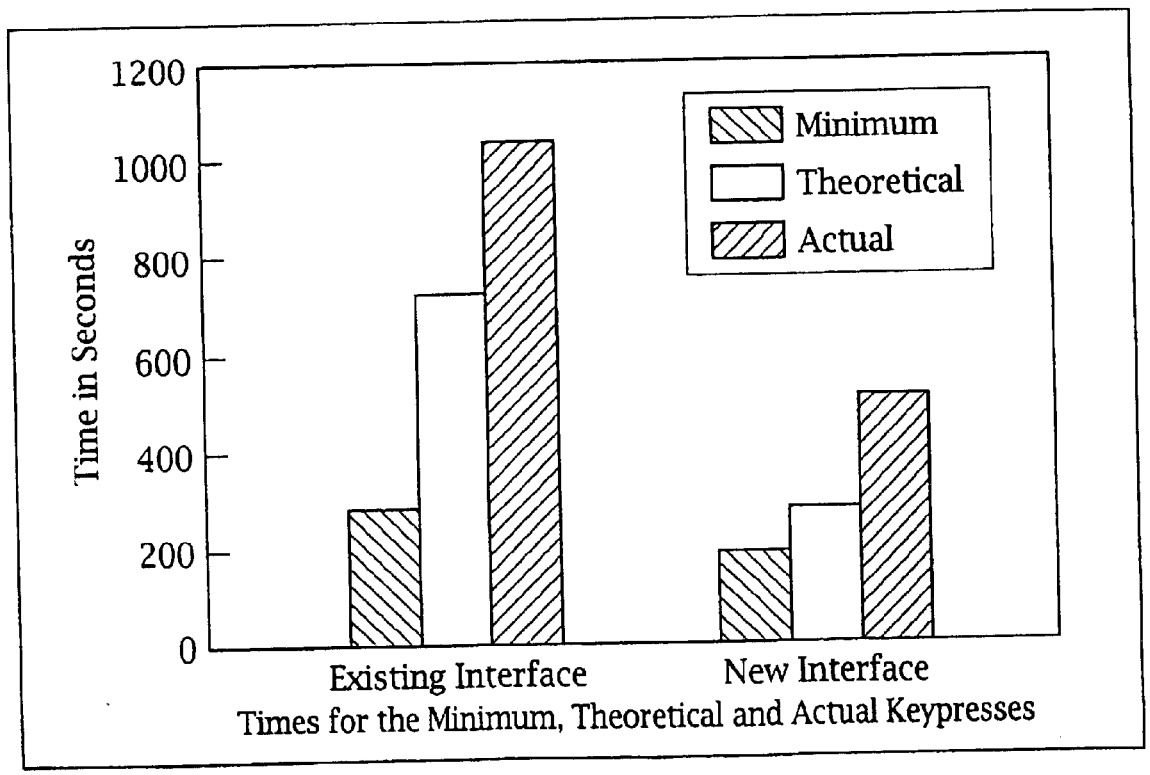
FIG. 11 graphically compares the actual and theoretical time necessary for programming the prior art and the interface of the present invention.
Figure 12A:
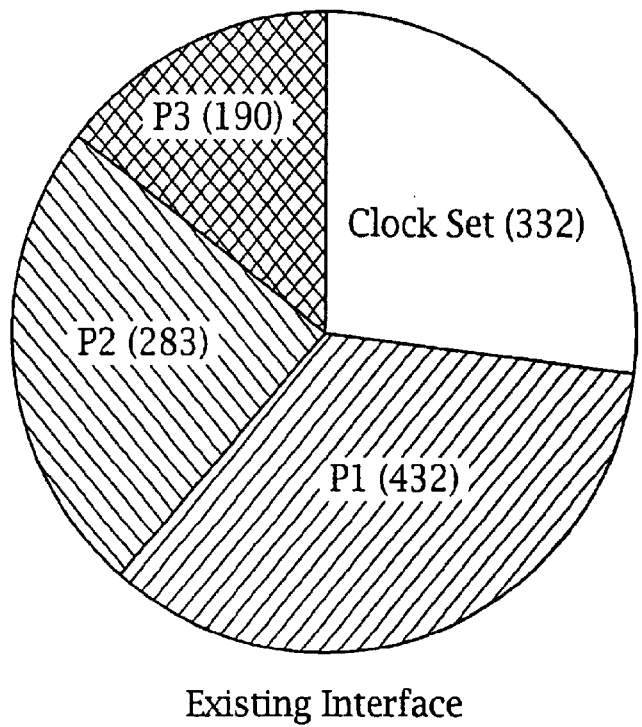
FIGS. 12a and 12b graphically compares the actual and theoretical time necessary for setting the programs in the prior art and the interface of the present invention.
Figure 12B:
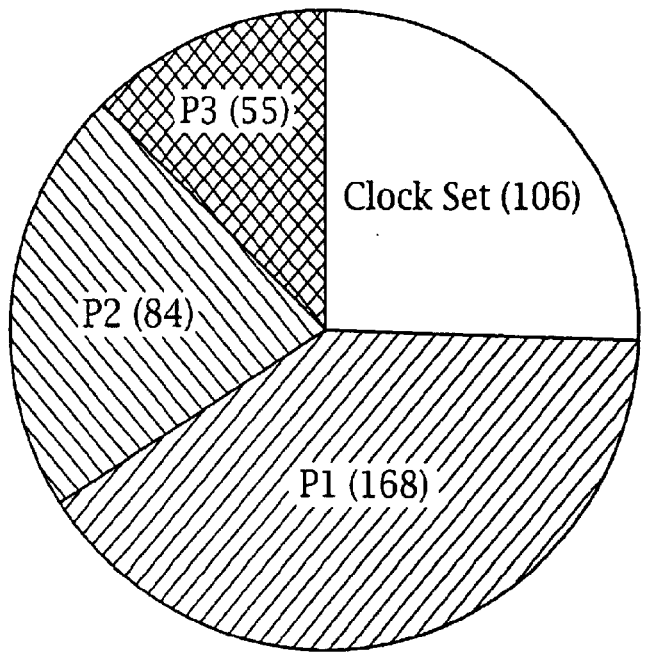
Figure 13:
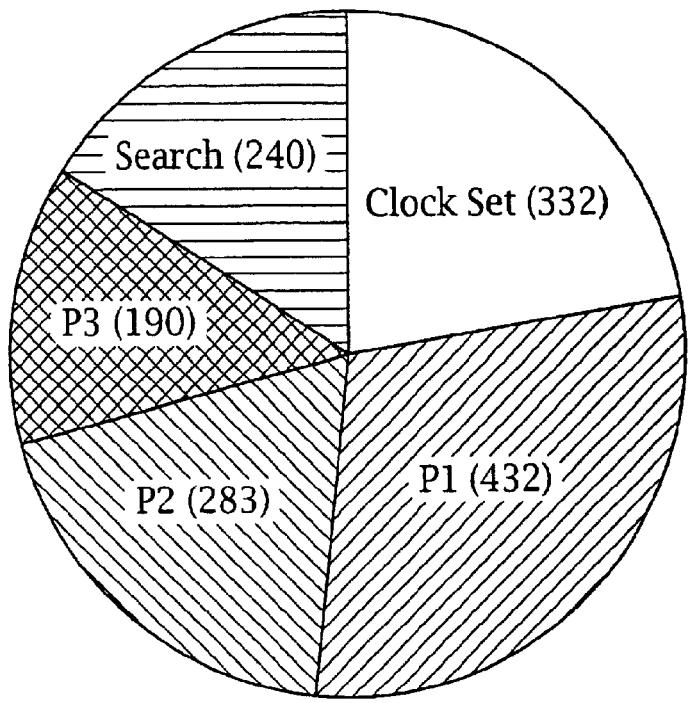
FIGS. 13 and 14 graphically show the percentage time for the critical steps in programming the prior art and the interface of the present invention.
Figure 14:
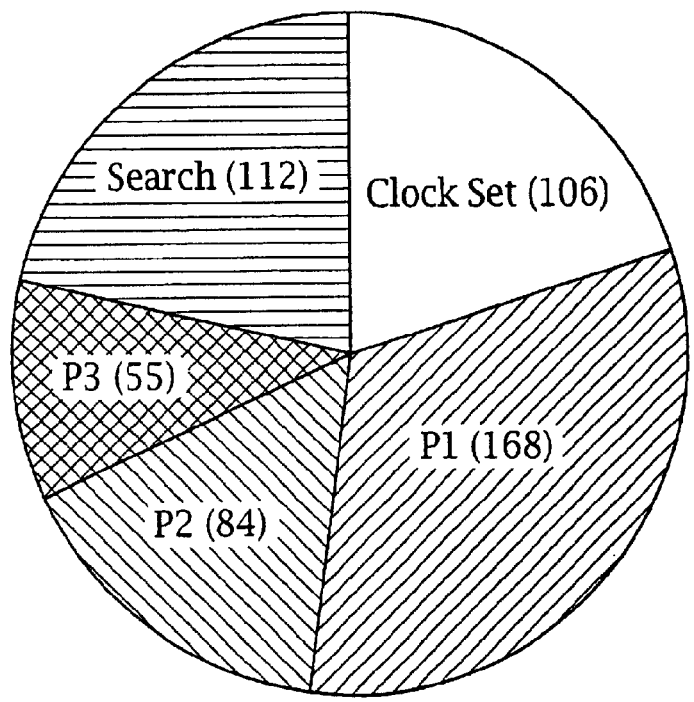

The preferred embodiments of the present invention will now be described with reference to the Figures. Identical elements in the various figures are designated with the same reference numerals.

EXAMPLE 1

VCR Interface

A preferred embodiment of the interface of the present invention, described in the present example, provides automatic sequencing of steps, leading the user through the correct sequence of actions to set a program on the screen, so that no necessary steps are omitted, and no optional steps are accidentally or unintentionally omitted. These steps are shown diagrammatically in FIG. 15 of the present invention. In addition, such a system does not burden the user with the necessity of inputting superfluous information, nor overwhelm the user with the display of unnecessary data. See, Hoffberg, Linda I., "AN IMPROVED HUMAN FACTORED INTERFACE FOR PROGRAMMABLE DEVICES: A CASE STUDY OF THE VCR", Master's Thesis, Tufts University; Hoffberg, Linda I., "Designing User Interface Guidelines For Time-Shift Programming of a Video Cassette Recorder (VCR)", Proc. of the Human Factors Soc. 35th Ann. Mtg. pp. 501–504 (1991); and Hoffberg, Linda I., "Designing a Programmable Interface for a Video Cassette Recorder (VCR) to Meet a User's Needs", Interface 91 pp. 346–351 (1991). See also, U.S. patent application Ser. No. 07/812,805, incorporated herein by reference in its entirety, including appendices and incorporated references.

Many design considerations were found to be important in the improved interface of the present invention:

The interface should preferably employ only minimal amounts of abbreviations and the use of complete words is especially preferred, except where a standard abbreviation is available or where an "iconic" or symbolic figure or textual cue is appropriate. Thus, standard abbreviations and symbols are acceptable, and displayed character strings may be shortened or truncated in order to reduce the amount of information that is to be displayed, where necessary or desirable. An option may be provided to the user to allow full words, which may decrease the information which may be conveyed on each screen and increase the number of screens that must be displayed, or abbreviations and symbols, which may minimize the number of displayed screens of information, thus allowing the user to make the compromise. This aspect of the system may also be linked to the adaptive user level function of the present invention, wherein abstract symbols and abbreviations are presented to advanced users, while novices are presented with full words, based on an implicit indication of user level. These abstract symbols and abbreviations may be standard elements of the system, or user designated icons. Of course, the user could explicitly indicate his preference for the display type, thus deactivating the automatic adaptive user level function.

If multiple users use the device, then the device identifies the relevant users. This may be by explicit identification by keyboard, bar code, magnetic code, smart card (which may advantageously include a user profile for use with a number of devices), an RF-ID or IR-ID transponder, voice recognition, image recognition, or fingerprint identification. It is noted that smart cards or other intelligent or data-containing identifications systems may be used with different types of devices, for example video, audio, home appliances, HVAC and automobile systems.

Where a new user is identified to the system, an initial query may be made to determine an optimum initial user level. This allows further identification of the user and preference determination to occur more efficiently.

In applications in which a user must program an event on a certain date, at a certain time, a built-in calendar menu screen is preferably employed so that the user cannot set the device with a program step that relies on a non-existent date. Technology that will help eliminate the human problem of setting the wrong (yet existing) date may also be employed. Such technology might include accessing an on-line or other type of database containing media programming information, and prompting the user regarding the selected choice. In situations where it is applicable, the interface should indicate to the user the number of characters the interface is expecting, such as when entering the year.

Figure 16:
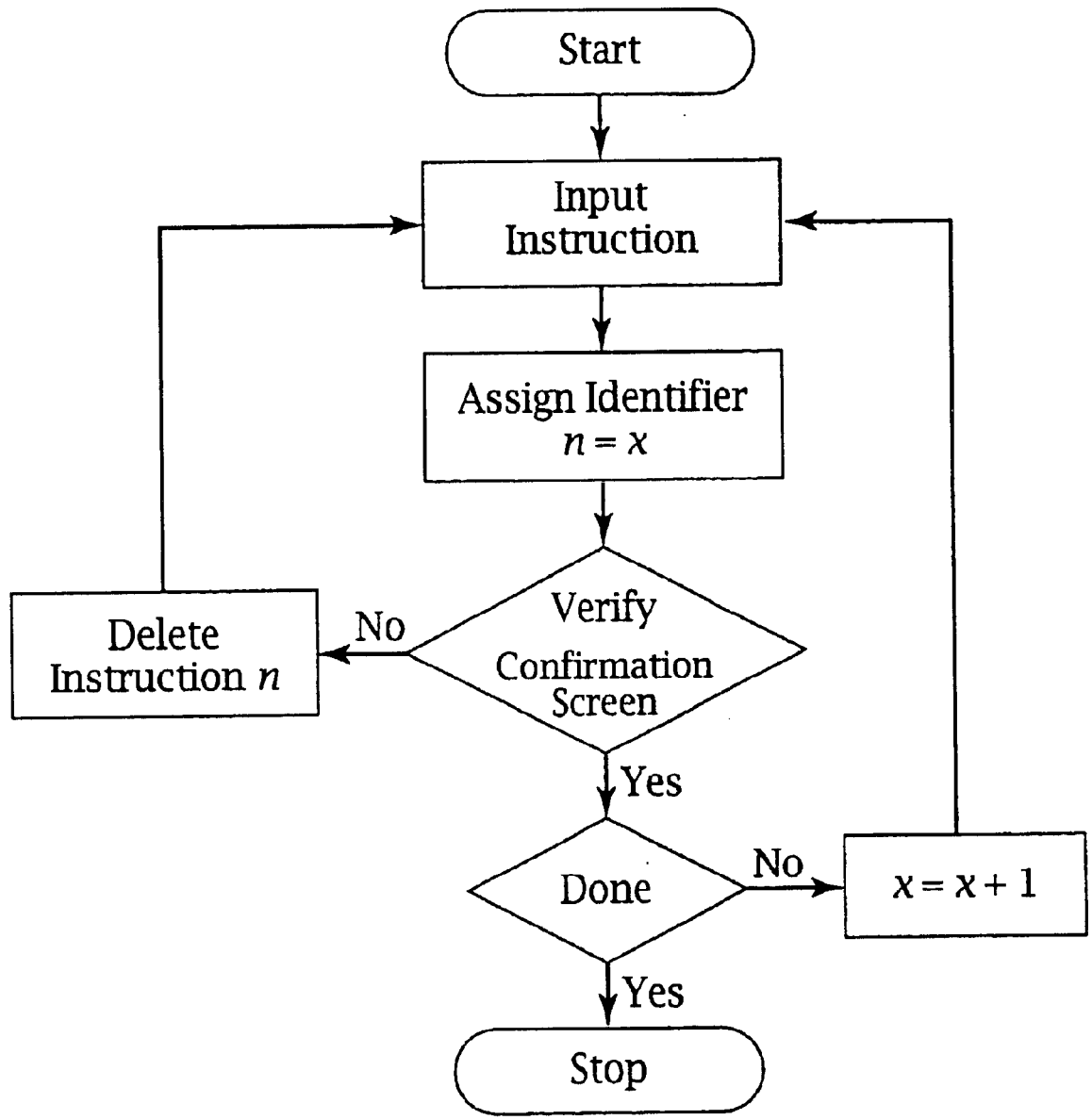
FIG. 16 is a flow diagram of the program input verification system of the present invention.

The interface system provides an easily accessible CHANGE, CANCEL or UNDO (single or multiple level) feature, which facilitates backtracking or reprogramming the immediately previously entered information rather than forcing the user to repeat all or a substantial portion of the programming steps. A method of the type described is shown in FIG. 16 of the present invention. User input is also facilitated by the provision of frequently used settings as explicit choices, such as, referring to the VCR example, "Record today," "Record tomorrow," "Noon," and "Midnight," so that the user does not have to specify a date in these cases. This will eliminate extra keypresses, and reduce the programming time. In addition, this could eliminate user errors. Frequently used choices for program selections are also provided to the user to reduce the number of programming steps necessary and provide the user with all the frequently used selections. The especially preferred choices are "Once On.", "Once a Week on ", "Monday–Friday at.", "Everyday at.". These redundant, complex instructions reduce the number of keystrokes required for data entry, and reduce the amount of programming time required.

The presently described interface system also provides, in the event that a color screen is available, conservatively used color coding, which allows the user to effectively and quickly acknowledge the function of each aspect of the screen. When programming, the preferred colors are royal blue for "help," red for mistakes, light blue for information previously entered, and yellow for current information being entered. Of course, other colors could be used, according to the user's or designer's preference, cultural differences, and display parameters.

When viewing, it is preferable that screen colors change to indicate status changes, such as viewed/unviewed, or to categorize the shows.

Figure 15:
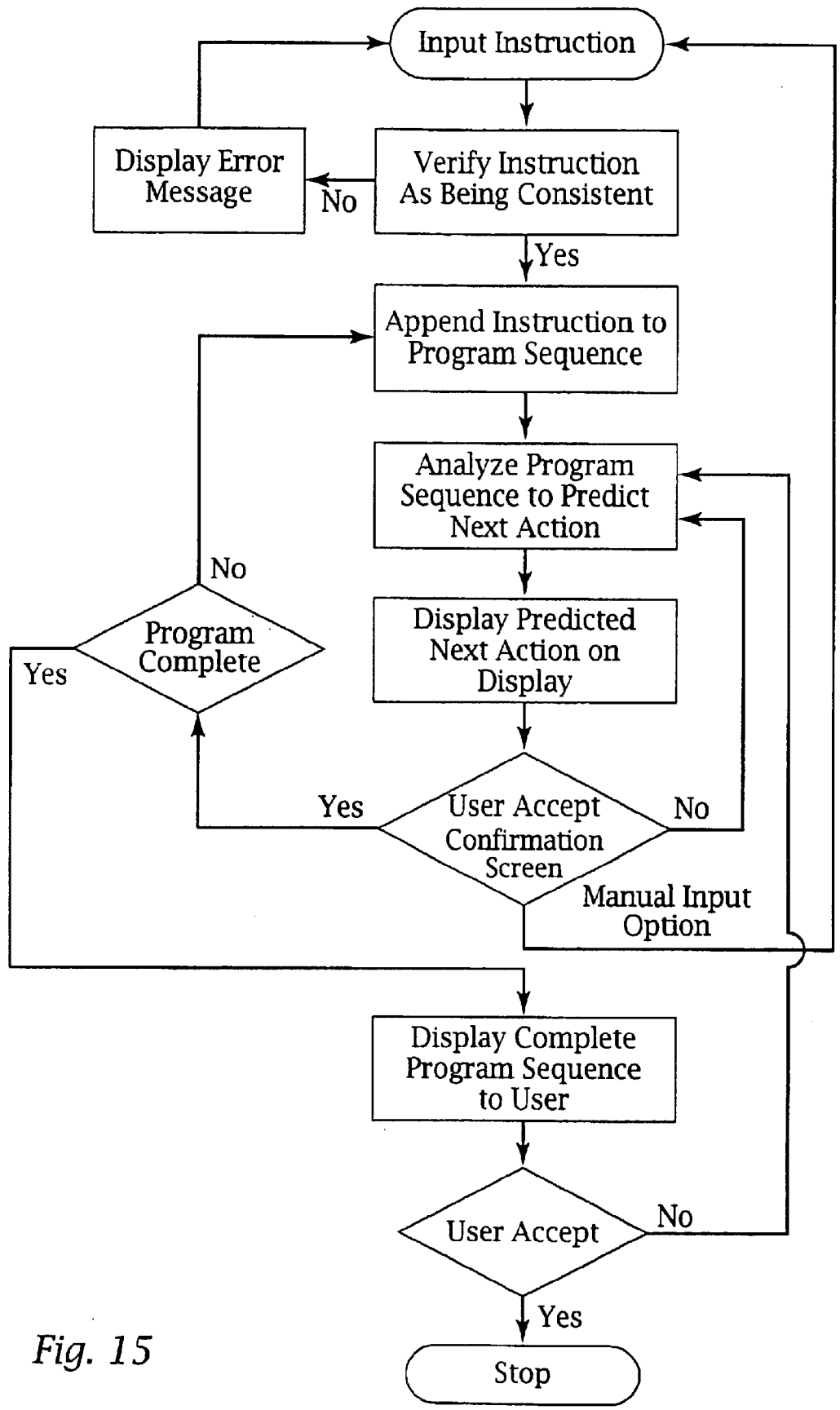
FIG. 15 is a flow diagram of a predictive user interface of the present invention.

The interface includes a confirmation screen which displays to the user all of the categories and selections previously explicitly entered or otherwise inferred, and should be easily understandable. This is shown in FIG. 15 of the present invention. All of the necessary information is displayed on this screen, in addition to the change and cancel options, if possible.

The entering of information on each screen is preferably consistent throughout the various interface options and levels. All of the screens preferably have similar layouts. "Buttons" or screen locations which are keyed to a particular function, which appear on multiple screens, should appear in approximately the same location on all screens. However, in certain cases, relatively more important information on a given screen may be displayed more prominently, and possibly in a different screen location, in order to reduce the search time. Further, when other factors dictate, each screen may be independently optimized for the prescribed function. For example, a representation of an analog clock dial may be used to set time information. However, even if the format does change, a standard scheme should be maintained, such as the use of a particular color to indicate that a particular program aspect has been changed.

The interface should display data consistent with standards and conventions familiar to users. For, e.g., when entering dates, users are most familiar with calendars. However, this type of presentation of choices does not eliminate the human problem of entering incorrect information, e.g., setting a wrong, but existing, date. The problem of ensuring the accuracy of user input may be addressed by an intelligent interface which stores data concerning programming, user preferences, and by means of some logical method, such as Boolean logic, fuzzy logic, neural network theory, or any other system which may be used to generate a prediction, to determine if an entry is likely in error, by comparing the prediction with the entry. Of course, these predictive systems would also provide an initial default entry, so that an *a priori* most probably action or actions may be initially presented to the user.

In addition to following conventions of information presentation to the user, the interface of the present invention may also provide emulations of other user interfaces of which a particular user may be familiar, even if these are not optimized according to the presently preferred embodiments of the present invention, or not otherwise well known. These emulations need not even be of the same type of device, so that a broad based standard for entry of information into a programmable controls, regardless of their type, may be implemented. By allowing emulation, the interface could provide compatibility with a standard or proprietary interface, with enhanced functionality provided by the features of the present interface.

These enhanced functional intelligent aspects of the controller may be implemented by means of software programming of a simple microcomputer, or by use of more specialized processors, such as a Fuzzy Set Processor (FSP) or Neural Network Processor to provide real-time responsiveness, eliminating delays associated with the implementation of complex calculations on general purpose computing devices.

In the various embodiments according to the present invention, various control strategies are employed. Depending on the application, fuzzy set processors (FSP's) may be preferred because they have the advantage of being easier to program through the use of presumptions or rules for making the fuzzy inferences, which may be derived by trial and error or the knowledge of experts, while Neural Networks are less easily explicitly programmed and their network weighing values are not easily understood in the abstract, but these systems may be applied to learn appropriate responses from test data. Thus, neural networks tend to require extensive "training", while Fuzzy Set Processors may be explicitly programmed without the need of duplicating or simulating actual operating conditions, but may require "fine tuning".

The most frequently used choices preferably should be displayed as the default setting. The screen cursor preferably appears at the "accept" screen button, when the screen is displayed. This default can either be set in advance, or acquired by the system. In the case of acquired defaults, these may be explicitly set by the user or adaptively acquired by the system through use. The interface of the present invention may be taught, in a "teach" mode, the preferences of the user, or may also acquire this information by analyzing the actual choices made by the user during operation of the interface and associated controller. This type of operation is shown schematically in FIG. 15 of the present invention. The options of "Midnight" (12:00 AM) and "Noon" (12:00 PM) should preferably be present, as some people often become confused when distinguishing between them. Icons, such as those indicative of the "sun" and the "moon", may also be used to facilitate data entry for AM and PM. The interface should preferably utilize an internal clock and calendar so that the user cannot set the time or program to record on a nonexistent date. Such a system could also compensate for daylight-savings time seasonal adjustments.

The cursor is preferably distinctive and readily distinguished from other parts of the screen. This may be by color, attribute (i.e. blinking), size, font change of underlying text, or by other means.

The user can preferably exit the programming sequence at any time by selecting a "Main Menu" button which may exist on the lower left-hand corner of every screen. The user is preferably provided with an adequate amount of feedback, and error messages should be directive in nature. Some form of an acknowledgement is preferably displayed after each entry. The user should preferably not be able to go to the next programming step until the current step has been completed. A message to convey why the user can not continue should appear when an attempt to prematurely continue is recognized.

The "help" function is available for when the user does not know what to do. The "help" screen(s) preferably explains the functions of each of the available buttons or functions, but may also be limited to those that are ambiguous. The "help" screen may also be used to indicate a current status of the interface and the controller. Further, the "help" function may also provide access to various other functions, such as advanced options and configurations, and thus need not be limited to merely providing information on the display. The help system may incorporate a hypertext-type system, wherein text or information relating to concepts that are conceptually linked may be easily accessed by indicating to the interface system that the related information is desired. To eliminate the possibility of the user trying to make selections on merely informative help screens, the cursor, in these cases, should be locked to a choice which returns the user to where they left off in the programming sequence, and this choice should be highlighted.

The "help" function may also comprise "balloon help" similar to the system adopted by Apple Computer, Inc. in Macintosh Operating System, e.g., 7.0, 7.1, 7.5, etc.

The interface preferably initiates the programming sequence where the user wants to be, so that the interface has so-called "smart screens". For example, when a VCR is first powered up or after an extended power failure, and the time and date are not stored in the machine, the "set date" and "set time" screens should appear. The sequence of screens may also vary depending on the system predicted requirements of the user and various aspects of the improved interface of the present invention. This is shown schematically in FIG. 17 of the present invention.

The preferable input device for the interface of the present invention provides as few buttons as possible to achieve the required functionality, thus reducing potential user intimidation, focusing the user's attention on the interactive display screen, where the available choices are minimized to that number necessary to efficiently allow the user to program the discrete task presented. Such a minimization of discrete inputs facilitates a voice recognition input, which may be used as an alternative to mechanical input devices. The preferred embodiment includes a direct-manipulation type interface, in which a physical act of the user causes a proportionate change in the associated interface characteristic, such as cursor position. A computer mouse, e.g. a two dimensional input device, with 1 to 3 buttons is the preferred input device, for use with a general purpose computer as a controller, while a trackball on a remote control device is especially preferred for limited purpose controllers because they do not require a flat surface for operation. Other stationary or movement sensitive input devices may, of course be used, such as joysticks, gyroscopes, sonic echo-location, magnetic or electrostatic location devices, RF phase location devices, Hallpots (joystick-like device with magnets that move with respect to Hall effect transducers), etc. The present interface minimizes the number of necessary keys present on an input device, while maintaining the functionality of the interface. It is noted that a strict minimization without consideration of functionality, might lead to inefficiency. For example, in a VCR device, if the user wants to record a program which airs Monday through Friday, he would have to set five separate programs, rather than one program if a "weeknights" choice is made available.

The interface preferably should be easy to learn and should not require that a user have prior knowledge of the interface in order to use it. An attempt has been made to minimize the learning curve, i.e., to minimize the time it takes to learn how to use the device.

Menu options are preferably displayed in logical order or in their expected frequencies. Research has shown that a menu-driven interface is best for applications involving new users and does not substantially hinder experienced users. Menu selection is preferably used for tasks which involve limited choices. They are most helpful for users with little or no training. Each menu should preferably allow only one selection at a time. Most of the information is preferably entered using a numeric keypad (entry method), rather than using up and down arrow keys (selection method). In addition, no leading zeros are required for entry. If there is more than one keystroke required, the user must then select an "OK" button to continue in the programming sequence. However, if the selection method is used, all of the choices are displayed on the screen at once. The number of steps required to complete the task through a sequence of menus should be minimized. The choice of words used to convey information should not be device specific, i.e., computer terms, but rather normal, everyday terms which are easy to understand. In addition, very few abbreviations should be used. All necessary information which the user needs should preferably be displayed at once. A user preferably should not have to rely on his memory or his previous experience, in order to find the correct choice, at least at the lower user levels. If all selections cannot be displayed at once, a hierarchical sequence is preferably used. A main menu should preferably provide a top level to which the user can always return and start over.

Searching and learning times should be kept to a minimum in order to obtain a subjectively better interface. The system's logic should reflect the users' expectations, offer visual clues and feedback, and stay within human memory limits. For example, the VCR should turn on not only with the "Power" button, but also when inserting a tape into the device. In addition, the sequence of steps for setting the machine to record, if the user does not indicate implicitly or explicitly that he knows how to use the device, should assume that the user is a novice, and fully prompt the user for elemental items of information. Nothing should be taken for granted. By developing an improved interface, an attempt is made to: reduce the searching time; reduce the learning time; simplify the entering of data; and, reduce the intimidation experienced by certain persons when using electronic devices.

Tests by an inventor hereof show that people do not program their VCRs often, and they often forget the sequence of steps between recording sessions. Thus, the present invention preferably incorporates an adaptive user level interface, wherein a novice user is presented with a simpler interface with fewer advanced features initially available, so that there is reduced searching for the basic functions. A more advanced user is presented with more advanced choices and functions available initially, as compared to a novice user.

Figure 17:
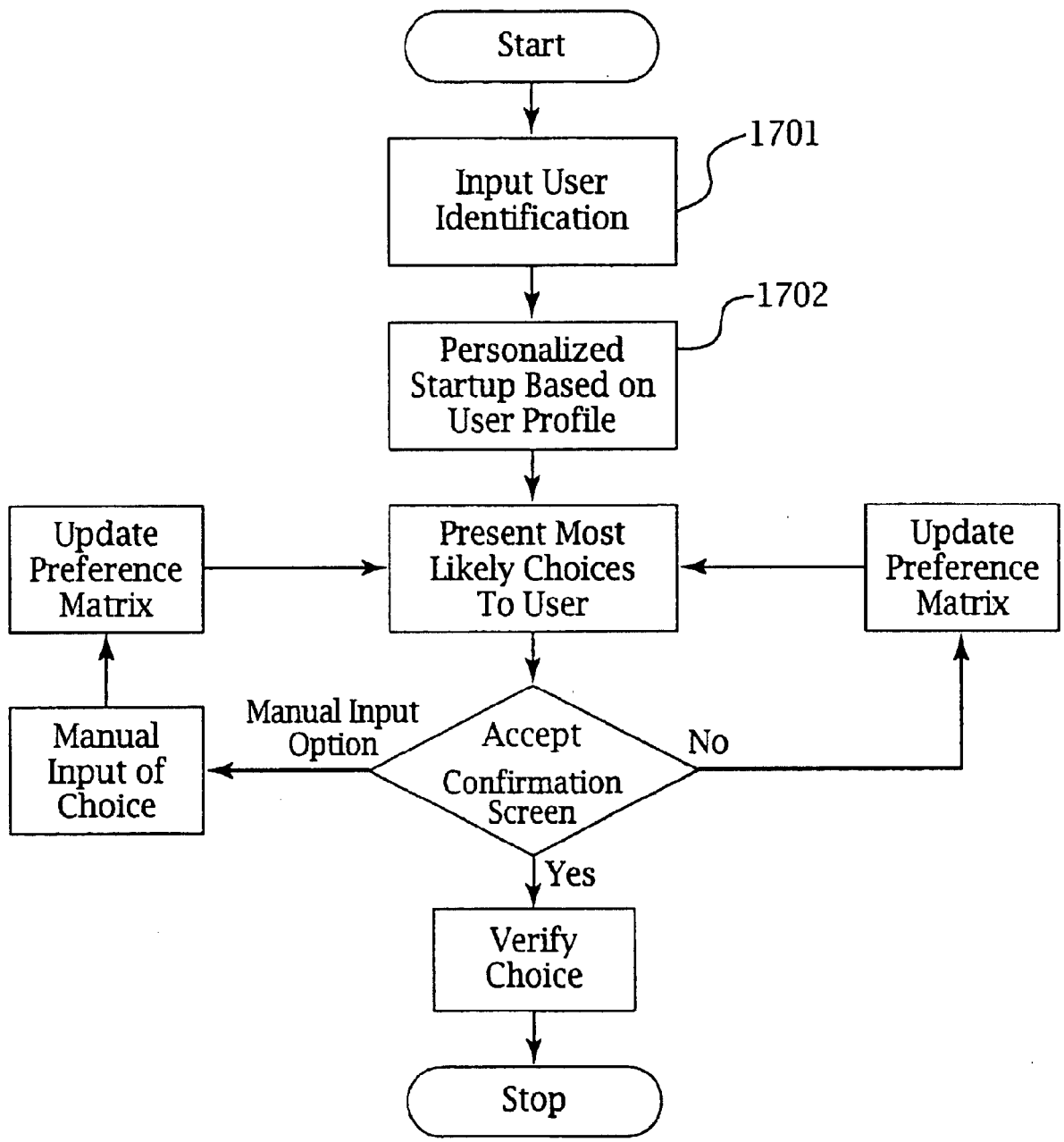
FIG. 17 is a flow diagram of a predictive user preference aware interface of the present invention.

Thus, as shown in FIG. 17, the user identifies himself to the controller in block 1701. The controller 1806 of FIG. 18 thereafter uses a stored profile of the identified user in controlling the interaction with the user, as shown in block 1702 of FIG. 17, from information stored in the database 1807 of FIG. 18 of the present invention. It has been found that in the case of novice users, a greater number of simple instructions may be more quickly and easily input rather than a potentially fewer number of a larger set of more complex instructions. It has further been found that, even if presented with a set of instructions which will allow a program to be entered with a fewer number of inputs, a novice user may choose to input the program using the simple instructions exclusively, thus employing an increased number of instructions and being delayed by an increased search time for those instructions that are used, from the larger set.

Other characteristics of this interface include color coding to help prompt the user as to which data must be entered. Red text signifies instructions or errors, yellow text represents data that must be entered or has not been changed, and blue text shows newly entered program data or status information. Blue buttons represent buttons that should normally be pressed during the programming sequence. Red buttons signify an erratic pattern in the data entry, such as the "cancel" and "return to main menu" buttons. Of course, these colors can be replaced by other display attributes, such as intensity, underline, reverse video, blinking and pixel dithering pattern, in addition to the use of various fonts. Such a situation would include a monochrome monitor or display.

The date may be entered in the form of a calendar rather than as numbers (i.e., "Sep. 6, 1991"). This calendar method is advantageous because users may wish to input date data in one of three ways: day of the week, day relative to the present, and day of the month. The present method allows the current date to be highlighted, so that the calendar may be used to easily enter the absolute day, absolute date, and relative day. Further, the choices "today" and "tomorrow", the most frequently used relative recording times, are included in addition to a month-by-month calendar. This information is provided to avoid an unnecessary waste of time and user frustration. Thus, another aspect of the present invention is to provide a partially redundant interactive display input system which allows, according to the highest probability, the choices to be prominently displayed and easily available, in addition to allowing random access to all choices.

The present device allows common user mistakes to be recognized and possibly addressed, such as the confusion between 12:00 PM and 12:00 AM with midnight and noon, respectively. Therefore, the options of "noon" and "midnight" are provided in addition to a direct numeric clock input. When entering time information, leading zeros need not be entered, and such information may be entered in either fashion.

The criteria for system acceptance of input depends on how many keystrokes are required on the screen. If only one keystroke is required to complete input of the information, upon depressing the key, the programming sequence will continue. If more than one keypress is required, the user must depress the "OK" button to continue programming. This context sensitive information entry serves to avoid unnecessary input.

An on-line "help" system and on-line feedback is preferably provided to the user throughout various aspects of the interface. Other features include minimizing the number of keypresses required to program the device. These features, together with other aspects of the present invention allow the user to achieve a greater efficiency with the input device than with prior art devices.

The interface of the present invention applied to a VCR control preferably comprises a virtual keypad entry device (i.e. a representation of an array of choices), a directional input control for a cursor on a display screen, and selection buttons. The input device has an input corresponding to a direction of movement relative to the cursor position. Thus, since the present input device seeks to minimize the physical control elements of the human interface device, the display elements for a preferred embodiment of the present interface include:

1. number keys 0–9.
2. enter key.
3. cancel key.
4. status indicator.
5. return to menu option button.
6. program type indicator: program once, program once a week, program Monday–Friday, program everyday.
7. Day indicators: 7 week days, today, tomorrow.
8. Noon and midnight choices.
9. Help button.
10. Main menu options: Review, Enter new recording time, Set time, Set date.
11. Timer button.
12. Power button.
13. AM/PM choices.
14. 31 day calendar.
15. 12 month Choices.
16. 3 tape speed choices.

User dissatisfaction is generally proportionate to the length of "search time," the time necessary in order to locate and execute the next desired function or instruction. Search time may be minimized by the inclusion of up to a maximum of 4–8 choices per screen and by use of consistent wording and placement of items on the display.

The present invention proceeds from the understanding that there are a number of aspects of a programmable interface that are desirable:

First, users should be able to operate the system successfully, without wide disparities in time. It should take, e.g., a normal person interacting with a VCR interface, less than seven minutes to set the time and two programs. Searching time spent in setting the clock, programming, getting into the correct mode, and checking whether or not the VCR is set correctly should be kept to a minimum through the appropriate choices of menu layout and the presentation of available choices.

Second, programming should be a stand-alone process, and not require an instruction manual. A help system should be incorporated in the interface. Word choices should be understandable, with a reduction in the use of confusing word terminology. Error messages should be understandable. The system should provide the ability to cancel, change or exit from any step.

Third, the system should provide on-screen understandable information, with adequate visual feedback. The displays should be consistent. Color coding should be employed, where applicable, using, e.g. blue—new input; red—error condition; yellow—static, unchanged value. Layouts should be logical, and follow a predictable pattern. There should be a maximum of 4–8 choices per screen to minimize searching time. Keys should be labeled with text rather than with ambiguous graphics. However, a combination of both may be preferable in some cases.

Fourth, steps required to complete tasks should be simple, require a short amount of time and not create user frustration. The system should guide the user along a decision path, providing automatic sequencing of steps. The most frequently used choices should be provided as defaults, and smart screens may be employed. The learning curve should be minimized through the use of easily understandable choices. As a user becomes more sophisticated, the interface may present more advanced choices.

Fifth, there should be a reminder to set the timer and to insert the tape once the programming information is entered. This reminder may also be automated, to eliminate the commonly forgotten step of setting the timer, so that the VCR automatically sets the timer as soon as the necessary information is entered and a tape is inserted. Once the program is set in memory, a message should appear if a tape is not inserted. If the VCR is part of a "jukebox" (automatic changer), the tape may be automatically loaded. The VCR should preferably turn on when a tape is inserted. In addition, users should also be able to control the VCR with a Power button.

Sixth, the VCR should be programmable from both the remote device and the control panel.

Seventh, each operation should require only one keypress, if possible, or otherwise reduce the number of keypresses required. There should be a 12 hour clock, not a 24 hour clock. There should be an on-screen keypad with entry keys, not "up" and "down" selector keys, allowing for the choice of specific day or time entry. There should be a "start" and a "stop" recording time, rather than "start" time and "length of program" or duration exclusively. The number of buttons on the remote control should be minimized so that as few buttons as are required are provided. The input device should provide for the direct manipulation of screen elements. A menu driven interface should be provided.

The interface of the present invention provides an automatic sequencing of steps which does not normally let the user think the previous step is complete. This is shown schematically in FIG. 16. In this manner, important steps will not be inadvertently omitted. Upon entering the programming sequence, if the current date or time is not set, the interface will prompt the user to enter this information. Thereafter, the interface will normally default to the main menu, the most frequently used first screen. Thus, the interface of the present invention is adaptive, in that its actions depend on the current state of the device, including prior programming or use of the device by the user. It can be appreciated that this adaptive behavior can be extended to include extended "intelligence". For example, if the device is similarly programmed on a number of occasions, then the default setup may be adapted for a new "normal" program mode. Further, the apparatus could provide multiple levels of user interface, e.g. beginner, intermediate, and advanced, which may differ for various functions, based on the behavior of the user. This user interface level determining feature extraction system is shown diagrammatically in FIG. 18. In contrast, prior art interfaces that have different user interface levels, allow the user to explicitly choose the interface level, which will then be used throughout the system until reset.

The present system allows discrete tasks to be conducted more quickly, more efficiently, with reduced search time and with fewer errors than prior art systems.

EXAMPLE 2

Serial Recording Medium Index

Figure 19:
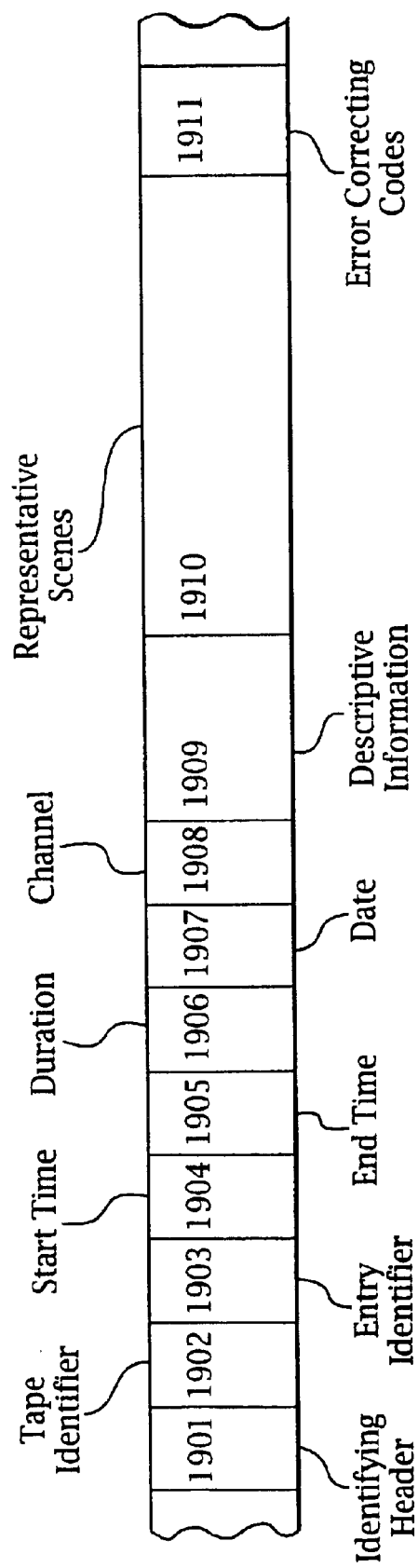
FIG. 19 is a diagram of a block of information for a catalog entry of the present invention.

In a preferred embodiment of the present invention, in a VCR, in order to track the content of the tape, a directory or a catalog is recorded, preferably digitally, containing the programming information, as well as additional information about the recorded programs, in a header, i.e., at the beginning of the tape, or at other locations on the tape. The device may also catalog the tape contents separately, and based on an identification of the tape, use a separately stored catalog. A preferred format for storing information is shown in FIG. 19.

Thus, if there are a number of selections on the tape, the entire contents of the tape could be accessible quickly, without the need for searching the entire tape. In a sequential access medium, the tape transport apparatus must still shuttle to the location of the desired material, but it may do so at increased speeds, because there is no need to read the tape once the location is determined; after the tape transport nears the desired spot, the tape may be slowed or precisely controlled to reach the exact location.

Figure 20:
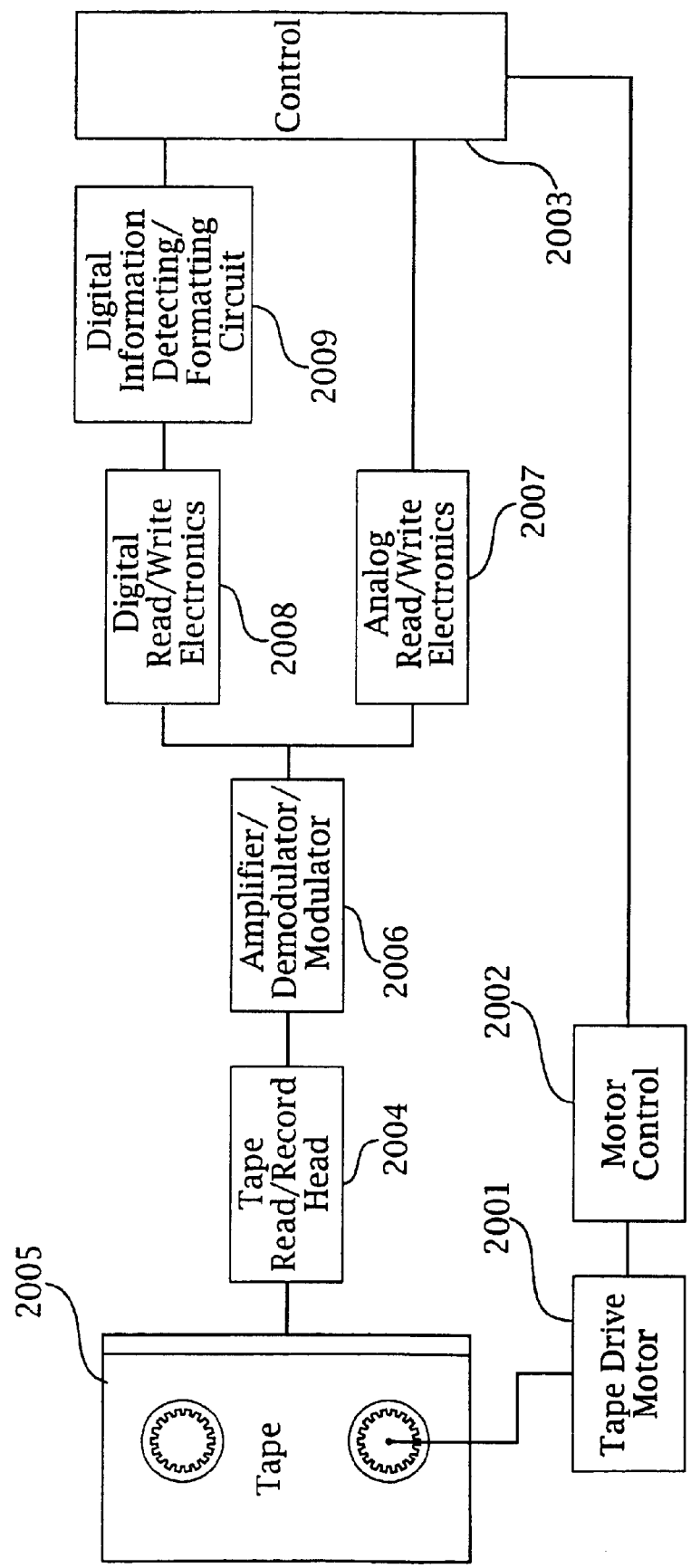
FIG. 20 is a block diagram of a digital information and analog signal reading/recording apparatus.

The tape read and drive system is shown schematically in FIG. 20. The algorithm used in the final stage of approach to the desired portion of the tape or other recording medium may incorporate a control employing Fuzzy logic, Neural Networks, mathematical formulae modeling the system (differential equations) in a Model-based system, a Proportional-Differential-Integral (PID) system, or a controller employing an algorithm of higher order, or other known control methods.

If a selection is to be recorded over, the start and stop locations would be automatically determined from the locations already indicated on the tape. Further, this information could be stored in memory device (which reads a catalog or index of the tape when a new tape is loaded) or non-volatile memory device (which stores information relating to known tapes within the device) or both types of memory in the VCR, so that an index function may be implemented in the VCR itself, without the need to read an entire tape. Optionally, a printer, such as a thermal label printer (available from, e.g. Seiko Instruments, Inc.), attached to the device, could be available to produce labels for the tapes, showing the index, so that the contents of a tape may be easily indicated. A label on the tape may also include a bar code or two-dimensional coding system to store content or characterization information. The stored identification and index information is thus stored in a human or machine readable form.

These contents, or a list of contents, need not necessarily be manually entered by the user or created by the apparatus, rather, these may be derived from published data or a database, data transmitted to the control, and/or data determined or synthesized by the control itself. For example, broadcast schedules are available in electronic or machine readable form, and this information may be used by the apparatus.

EXAMPLE 3

Serial Data Medium Index

Another aspect of the present invention relates to the cataloging and indexing of the contents of a storage medium. While random access media normally incorporate a directory of entries on a disk, and devices such as optical juke boxes normally are used in conjunction with software that indexes the contents of the available disks, serial access mass storage devices, such as magnetic tape, do not usually employ an index: therefore, the entire tape must be searched in order to locate a specific selection.

In the present invention, an area of the tape, preferable at the beginning of the tape or at multiple locations therein, is encoded to hold information relating to the contents of the tape. This encoding is shown in FIG. 19, which shows a data format for the information. This format has an identifying header 1901, a unique tape identifier 1902, an entry identifier 1903, a start time 1904, an end time 1905 and/or a duration 1906, a date code 1907, a channel code 1908, descriptive information 1909 of the described entry, which may include recording parameters and actual recorded locations on the tape, as well as a title or episode identifying information, which may be a fixed or variable length entry, optionally representative scenes 1910, which may be analog, digital, compressed form, or in a form related to the abstract characterizations of the scenes formed in the operation of the device. Finally, there are error correcting codes 1911 for the catalog entry, which may also include advanced block encoding schemes to reduce the affect of non-Gaussian correlated errors which may occur on video tape, transmission media and the like. This information is preferably a modulated digital signal, recorded on, in the case of Hi-Fi VHS, one or more of the preexisting tracks on the tape, including the video, overscan area, Audio, Hi-Fi stereo audio, SAP or control tracks. It should be noted that an additional track could be added, in similar fashion to the overlay of Hi-Fi audio on the video tracks of Hi-Fi VHS. It is also noted that similar techniques could be used with Beta format, 8 mm, or other recording systems, to provide the necessary indexing functions.

Digital data may also be superimposed as pseudonoise in the image information, or as other information intermixed or merged with the video information.

The recording method is preferable a block encoding method with error correction within each block, block redundancy, and interleaving. Methods are known for reducing the error rate for digital signals recorded on unverified media, such as videotape, which are subject to burst errors and long term non-random errors. Such techniques reduce the effective error rate to acceptable levels. These are known to those skilled in the art and need not be discussed herein in detail. A standard reference related to this topic is *Digital Communications* by John G. Proakis, McGraw-Hill (1983).

The digital data recording scheme is best determined according to the characteristics of the recording apparatus. Therefore, if an, e.g. Sony Corporation helical scan recording/reproducing apparatus was employed, one of ordinary skill in the art would initially reference methods of the Sony Corporation initially for an optimal error correcting recording scheme, which are available in the patent literature, in the U.S., Japan, and internationally, and the skilled artisan would also review the known methods used by other manufacturers of digital data recording equipment. Therefore, these methods need not be explained herein in detail.

The catalog of entries is also preferably stored in non-volatile memory, such as hard disk, associated with the VCR controller. This allows the random selection of a tape from a library, without need for manually scanning the contents of each tape. This also facilitates the random storage of recordings on tape, without the requirement of storing related entries in physical proximity with one another so that they may be easily located. This, in turn, allows more efficient use of tape, because of reduced empty space at the end of a tape. The apparatus is shown schematically in FIG. 20, in which a tape drive motor 2001, controlled by a transport control 2002, which in turn is controlled by the control 2003, moves a tape 2005 past a reading head 2004. The output of the reading head 2004 is processed by the amplifier/demodulator 2006, which produces a split output signal. One part of the output signal comprises the analog signal path 2007, which is described elsewhere. A digital reading circuit 2008 transmits the digital information to a digital information detecting circuit 2009, which in turn decodes the information and provides it to the control 2003.

In order to retrieve an entry, the user interacts with the same interface that is used for programming the recorder functions; however, the user selects different menu selections, which guide him to the available selections. This function, instead of focusing mainly on the particular user's history in order to predict a selection, would analyze the entire library, regardless of which user instituted the recording. Further, there would likely be a bias *against* performing identically the most recently executed function, and rather the predicted function would be an analogous function, based on a programmed or inferred user preference. This is because it is unlikely that a user will perform an identical action repeatedly, but a pattern may still be derived.

It is noted that the present library functions differ from the prior art VHS tape index function, because the present index is intelligent, and does not require the user to mark an index location and explicitly program the VCR to shuttle to that location. Rather, the index is content based. Another advantage of the present library function is that it can automatically switch media and recording format, providing an adaptive and/or multimode recording system. Such a system might be used, for example, if a user wishes to record, e.g., "The Tonight Show With Johnny Carson" in highly compressed form, e.g. MPEG-2 at 200:1 compression, except during the performance of a musical guest, at which time the recording should have a much lower loss, e.g., MPEG-2 at 20:1, or in analog format uncompressed. A normal VCR could hardly be used to implement such a function even manually, because the tape speed (the analogy of quality level) cannot generally be changed in mid recording. The present system could recognize the desired special segment, record it as desired, and indicate the specific parameters on the information directory. The recorded information may then be retrieved sequentially, as in a normal VCR, or the desired selection may be preferentially retrieved. If the interface of the present invention is set to automatically record such special requests, the catalog section would then be available for the user to indicate which selections were recorded based upon the implicit request of the user. Because the interface has the ability to characterize the input and record these characterizations in the index, the user may make an explicit request different from the recording criteria, after a selection has been recorded. The controller would then search the index for matching entries, which could then be retrieved based on the index, and without a manual search of the entire tape. Other advantages of the present system are obvious to those of ordinary skill in the art.

A library system is available from Open Eyes Video, called "Scene Locator", which implements a non-intelligent system for indexing the contents of a videotape. See NewMedia, November/December 1991, p. 69.

It is noted that, if the standard audio tracks are used to record the indexing information, then standard audio frequency modems and recording/receiving methods are available, adapted to record or receive data in half-duplex mode. These standard modems range in speed from 300 baud to about 64 kilobits per second, e.g. v.29, v.17, v.32, v.32bis, v.34, v.90, v.91, etc. While these systems are designed for dial-up telecommunications, and are therefore are designed for the limited data rates available from POTS. These are limited to a slower speed than necessary and incorporate features unnecessary for closed systems, they require a minimum of design effort and the same circuitry may be multiplexed and also be used for telecommunication with an on-line database, such as a database of broadcast listings, discussed above. It should be noted that a full-duplex modem should be operated in half duplex mode when reading or recording on a media, thus avoiding the generation of unnecessary handshaking signals. Alternatively, a full duplex receiver may be provided with the resulting audio recorded. A specially programmed receiver may extract the data from the recording. DTMF codes may also be employed to stored information.

The Videotext standard may also be used to record the catalog or indexing information on the tape. This method, however, if used while desired material is on the screen, makes it difficult (but not impossible) to change the information after it has been recorded, without re-recording entire frames, because the videotext uses the video channel, during non-visible scan periods thereof. The video recording system according to the present invention preferably faithfully records all transmitted information, including SAP, VAR, close caption and videotext information, which may be used to implement the various functions.

The use of on-line database listings may be used by the present interface to provide information to be downloaded and incorporated in the index entry of the library function, and may also be used as part of the intelligent determination of the content of a broadcast. This information may further be used for explicitly programming the interface by the user, in that the user may be explicitly presented with the available choices available from the database.

EXAMPLE 4

Controlled Encryption and Accounting System

The present invention also allows for scrambling, encryption and locking of source material, and the receiving device selectively implements an inverse process or a partial inverse process for descrambling, decryption or unlocking of the material, much as the Videocipher series systems from General Instruments, and the fractal enciphering methods of Entertainment Made Convenient[2] Inc. (EMC[2], and related companies, e.g., EMC[3], and Iterated Systems, Inc.) The present invention, however, is not limited to broadcasts, and instead could implement a system for both broadcasts and prerecorded materials. In the case of copying from one tape to another, such a system could not only provide the herein mentioned library functions of the present invention according to Example 2, it could also be used to aid in copy protection, serial copy management, and a pay-per-view royalty collection system.

Figure 18:
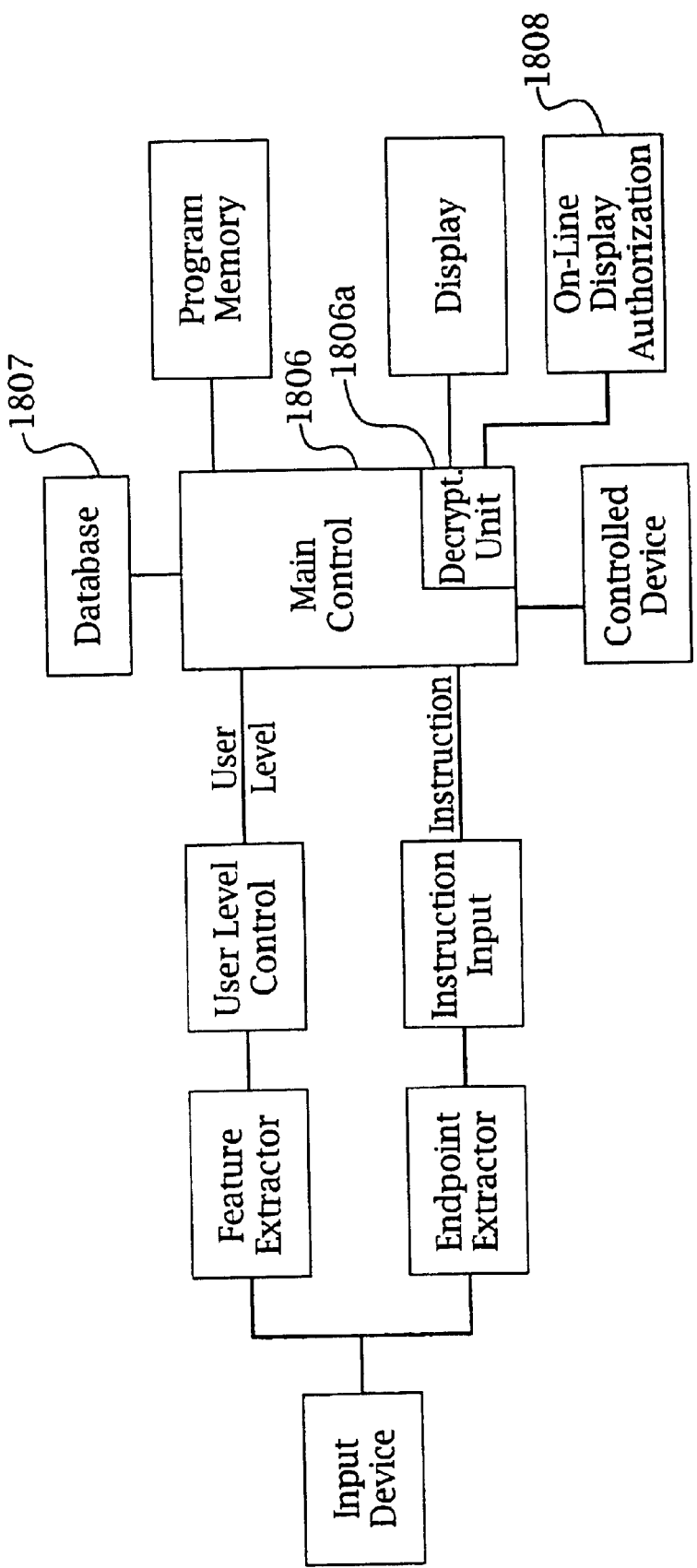
FIG. 18 is a block diagram of a non-program information feature extraction circuit of the present invention.

Such a system could be implemented by way of a telecommunication function incorporated in the device, shown as block 1808 of FIG. 18, or an electronic tag which records user activity relating to a tape or the like. Such tags might take the form of a smart card, PCMCIA device, or other type of storage device. A royalty fee, etc. could automatically be registered to the machine either by telecommunication or registry with the electronic tag, allowing new viewer options to be provided as compared with present VCR's.

Numerous digital data encryption and decryption systems are known. These include DES. "Clipper", elliptic key algorithms, public key/private key (RSA, etc.), PGP, and others. Digital encryption allows a sender to scramble a message so that, with an arbitrary degree of difficulty, the message cannot be determined without use of a decryption key.

An encrypted tape or other source material may be decrypted with a decryption key available by telecommunication with a communication center, remote from the user, in a decryption unit, shown schematically as the decrypt unit 1806*a* of FIG. 18. Such an encryption/decryption scheme requires special playback equipment, or at least equipment with decryption functionality, and thus any usage or decrypted data may be registered as a result of the requirement to receive a decryption key. The decryption unit may be part of an addressable remote unit for control of the unit remotely.

During acquisition of the electronic decryption key, a VCR device of an embodiment of the present invention would indicate its identity or electronic address, and an account is charged a fee for such use. The negotiation for the electronic key is also preferably encrypted. In addition, the decryption key may be specific for a particular decoder. Such a system could also be used for controlled access software, for example for a computer, wherein a remote account is charged for use of the software. Information communication may be through the Internet or through an on-line service such as America Online or Compuserve.

Such a system differs from the normal hardware "key" or "dongle" (device which attaches to standard hardware port for authentication and usage limitation) because it requires on-line or electronic access for an encryption key, which may offer different levels of use. It also differs from a call-in registration, because of the automatic nature of the telecommunication. This presently described system differs from normal pay-per-view techniques because it allows, in certain instances, the user to schedule the viewing. Finally, with an encryption function implemented in the VCR, the device allows a user to create and distribute custom "software" or program material. In addition, the present controller could then act as the "telecommunication center" and authorize decryption of the material.

If the source signal is in digital form, a serial copy management scheme system is preferably implemented.

The present invention is advantageous in this application because it provides an advanced user interface for creating a program (i.e. a sequence of instructions), and it assists the user in selecting from the available programs, without having presented the user with a detailed description of the programs, i.e., the user may select the choice based on characteristics rather than literal description.

In the case of encrypted program source material, it is particularly advantageous if the characterization of the program occurs without charging the account of the user for such characterization, and only charging the account if the program is viewed by the user. The user may make a viewing decision based on the recommendation of the interface system, or may review the decision based on the title or description of the program, or after a limited duration of viewing. Security of the system could then be ensured by a two level encryption system, wherein the initial decryption allows for significant processing, but not comfortable viewing, while the second level of decryption allows viewing, and is linked to the accounting system. Alternatively, the decryption may be performed so that certain information, less than the entirety, is available in a first decryption mode, while other information comprising the broadcast information is available in a second decryption mode.

The transmission encryption system may be of any type, but for sensitive material, i.e. where mere distortion of the material (e.g., loss of synchronization information and phase distortion) would be insufficient, an analog multiple subband transform, with spread spectrum band hopping and digital encryption of various control signals, would provide a system which would be particularly difficult for the user to view without authorization, and could be effectively implemented with conventionally available technology. The fractal compression and encryption of the $EMC^2$ and Iterated Systems, Inc. system is also possible, in instances where the broadcast may be precompressed prior to broadcast and the transmission system supports digital data. Of course, if a digital storage format is employed, a strict digital encryption system of known type may be used, such as those available from RSA. The implementation of these encryption systems is known to those skilled in the art. These may include the National Bureau of Standards (NBS), Verifiable Secret Sharing (VSS) and National Security Agency (NSA) encryption standards, as well as various proprietary standards.

EXAMPLE 5

User Interface

In one embodiment of the present invention, the apparatus comprises a program entry device for a VCR or other type of media recording system. The human interface element has an infrared device to allow wireless communication between the human interface device and the VCR apparatus proper. The human interface device also includes a direct-manipulation type input device, such as a trackball or joystick. Of course it is understood that various known or to be developed alternatives can be employed, as described above.

It is noted that many present devices, intended for use in computers having graphic interfaces, would advantageously make use of an input device which is accessible, without the necessity of moving the user's hands from the keyboard. Thus, for example, Electronic Engineering Times (EET), Oct. 28, 1991, p. 62, discloses a miniature joystick incorporated into the functional area of the keyboard. This technique is directed at a different aspect of user interaction with a programmable device than certain preferred embodiments of the present invention, in that the input device does not have a minimal number of keys. While the device disclosed in EET is intended for use in a full function keyboard, the preferred embodiment of the present invention is directed towards the minimization of the number of keys and avoidance of superfluous keys by provision of a pointing device. Of course, the present invention could be used with a full function input device, where appropriate, and the joystick of EET (Oct. 28, 1991, p. 62) would be suitable in this case.

The interface of the present invention studies the behavior and moods of the user, in context, during interactions to determine the expected user level of that user as well as the preferences of the user. These user characteristics may change over time and circumstances. This means that the system studies the interaction of the user to determine the skill of the user or his or her familiarity with the operation and functionality of the system. By determining the skill of the user, the system may provide a best compromise. The purpose of this feature is to provide a tailored interface adapted to the characteristics of the user, thus adaptively providing access to various features in a hierarchical manner such that a most likely feature to be used is more easily accessible than an unlikely feature, but that features can generally be accessed from all or most user levels. The user level analysis also allows the system to teach the user of the various functions available, particularly when it becomes apparent that the user is being inefficient in the use of the system to perform a given task. Therefore, the menu structure may also be adaptive to the particular task being performed by the user. When combined with the user level analysis feature, the user efficiency feature will provide a preferable interface, with reduced learning time and increased usability for a variety of users.

Thus, an important concept is that the system has at least one object having a plurality of functions, certain of which are unnecessary or are rarely used for various applications or in various contexts, while these are used with greater frequency in other contexts. Further, based upon predetermined protocols and learned patterns, it is possible to predict which functions will be used and which will not be used.

Therefore, the system, upon recognizing a context, will reconfigure the availability or ease of availability of functions and allow various subsets to be used through "shortcuts". Thus, to some extent, the interface structure may vary from time to time based upon the use of the system. The prior art apparently teaches away from this concept, because it is believed to prevent standardization, limits the "recordability" of macros and/or instruction sheets for casual users and limits the availability of technical support. Each of these can be addressed, to some extent by the availability of a default mode (so that users can access all information), and because the interface is self-simplifying in case of difficulty. However, forcing all users to always work in a default mode limits the improvements in productivity that may be gained by a data-sensitive processing system, and hence this standardization for its own sake is rejected by the present invention.

The improvements to be gained by using an intelligent data analysis interface for facilitating user control and operation of the system are more than merely reducing the average number of keystrokes or time to access a given function. Initial presentation of all available information to a new user might be too large an information load, leading to inefficiency, increased search time and errors. Rather, the improvements arise from providing a means for access of and availability to functions not necessarily known to the user, and to therefore improve the perceived quality of the product.

The system to determine the sophistication of the user includes a number of storage registers, for storing an analysis of each act for each user. A given act is represented in a plurality of the registers, and a weighting system to ensure that even though an act is represented in a number of registers, it is not given undue emphasis in the analysis. Thus, each act of the user may be characterized in a number of ways, and each characteristic stored in an appropriate register, along with a weighting representing an importance of the particular characteristic, in relation to other identified characteristics and in relation to the importance of the act as a whole. The act is considered in context, and therefore, the stored information relates to the act, the sequence of acts prior to the act, acts of the user occur after the act, the results of the sequence of acts which include the act, and characteristics of the user which are not "acts", but rather include timing, mouse path efficiency, and an interaction with other users.

Figure 21:
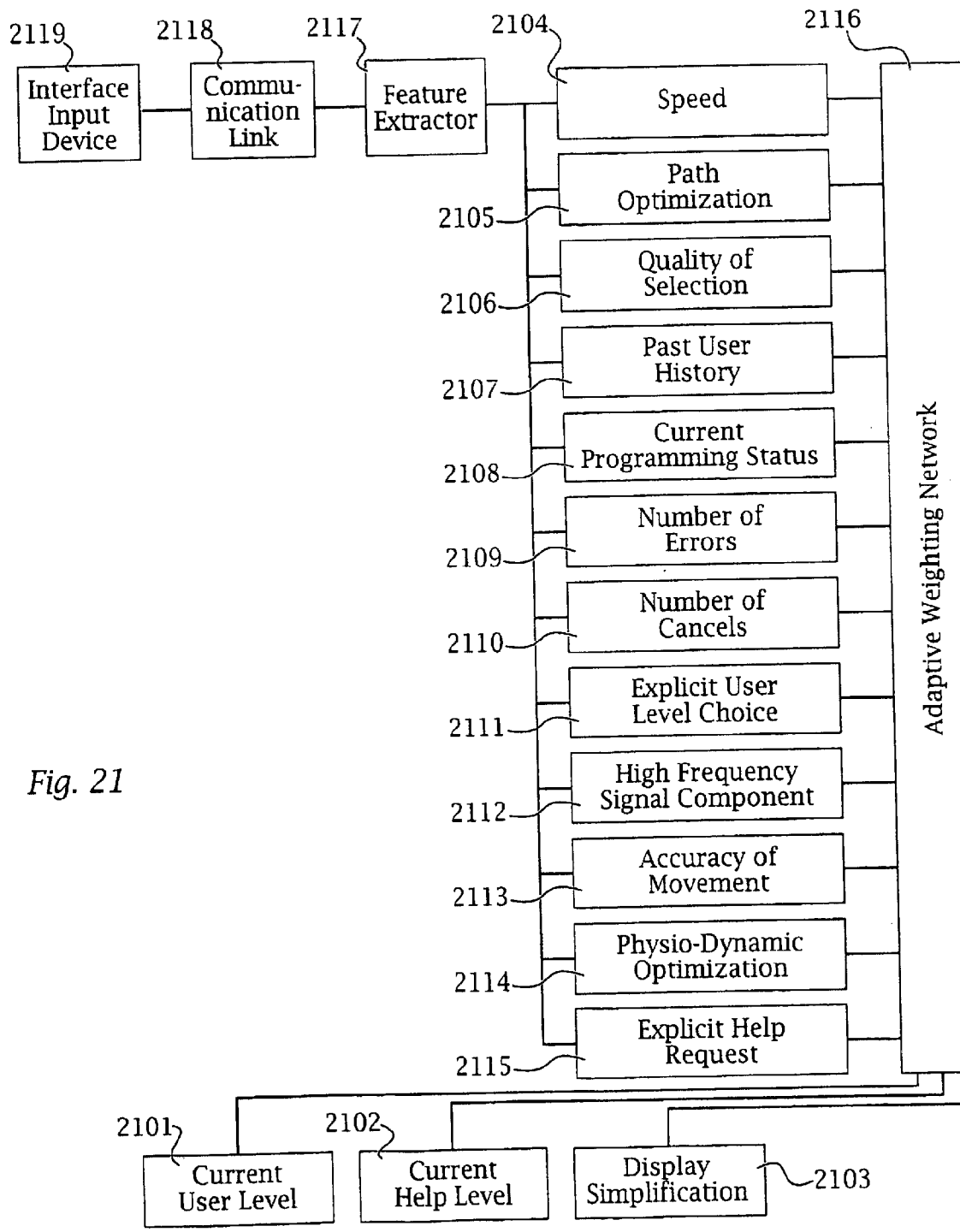
FIG. 21 is a block diagram of a user level determining system of the present invention.

An apparatus for performing a path information or efficiency determining function is shown schematically in FIG. 18, and in more detain in FIG. 21. Thus, for example, if a characteristic of the user is an unsteady hand while using the cursor control device, e.g. mouse, producing a high frequency or oscillating component, the existence of this characteristic is detected and quantified by the high frequency signal component detector 2112, and, depending on the amplitude, frequency and duration (e.g. path length), may also be detected by the path optimization detector 2105. Once this characteristic is detected and quantified, an adaptive filter may be applied by the main control 1806 to selectively remove the detected component from the signal, in order to improve the reliability of the detection of other characteristics and to determine the intended act of the user.

It should be noted that the various characteristic filters preferably act in "parallel" at each stage of the characteristic recognition, meaning that one characteristic is defined simultaneously with the detection of other characteristics, which assists in resolving ambiguities, allows for parallel processing by a plurality of processing elements which improves real-time recognition speed, and allows a probability-based analysis to proceed efficiently. Such a "parallel" computation system is included in a neural net computer, and a hardware-implementation of a neural net/fuzzy logic hybrid computer is a preferred embodiment, which allows fuzzy rules to be programmed to provide explicit control over the functioning of the system. It is preferred that a human programmer determine the basic rules of operation of the system, prior to allowing a back-propagation of errors learning algorithm to improve and adapt the operation of the system.

The adaptive system implemented according to the present invention, by detecting a user level, allows a novice user to productively interact with the system while not unnecessarily limiting the use of the adaptive interface by an advanced user, who, for example, wishes to move the cursor quickly without the limiting effects of a filter which slows cursor response.

Another example of the use of an adaptive user interface level is a user who repeatedly requests "help" or user instructions, through the explicit help request detector 2115, which causes an output from the current help level output 2102; such a user may benefit from an automatic context-sensitive help system, however such a system may interfere with an advanced user, and is unnecessary in that case and should be avoided. This adaptive user interface level concept is not limited to a particular embodiment of the present invention, such as a VCR, and in fact, may be broadly used wherever a system includes an interface that is intended for use by both experienced and inexperienced users. This differs from normal help systems which must be specifically requested, or "balloon help" (Apple Computer, Macintosh System 7.0, 7.1, 7.5) which is either engaged or disengaged, but not adaptive to the particular situation based on an implicit request or predicted need. In the case of a single user or group of users, the interface could maintain a history of feature usage for each user, as in the past user history block 2107, and provide a lower user interface level for those features which are rarely used, and therefore less familiar to the user, through the current user level output 2101.

It should be noted that the present system preferably detects an identity of a user, and therefore differentiates between different users by an explicit or implicit identification system. Therefore, the system may accumulate information regarding users without confusion or intermingling.

EXAMPLE 6

VCR Programming Preference Prediction

The device according to the present invention is preferably intelligent. In the case of a VCR, the user could also input characteristics of the program material that are desired, and characteristics of that program material which is not desired. The device would then, over time, monitor various broadcast choices, and determine which most closely match the criteria, and thus be identified. For example, if the user prefers "talk-shows", and indicates a dislike for "situation comedies" ("sitcoms"), then the device could scan the various available choices for characteristics indicative of one or the other type of programming, and perform a correlation to determine the most appropriate choice(s). A sitcom, for example, usually has a "laugh track" during a pause in normal dialogue. The background of a sitcom is often a confined space (a "set"), from different perspectives, which has a large number of "props" which may be common or unique. This set and the props, however, may be enduring over the life of a show.

A talk-show, on the other hand, more often relies on actual audience reaction (possibly in response to an "applause" sign), and not prerecorded or synthesized sounds. The set is simple, and the broadcast often shows a head and neck, or full body shot with a bland background, likely with fewer enduring props. A signal processing computer, programmed for audio and/or video recognition, is provided to differentiate between at least the two types with some degree of efficiency, and with a possibly extended sampling time, have a recognition accuracy, such that, when this information is integrated with other available information, a reliable decision may be made. The required level of reliability, of course, will depend on the particular application and a cost-benefit analysis for the required system to implement the decision-making system.

Since the system according to the present invention need not display perfect accuracy, the preferred embodiment according to the present example applies general principles to new situations and receives user or other feedback as to the appropriateness of a given decision. Based on this feedback, subsequent encounters with the same or similar data sets will produce a result which is "closer" to an optimal decision. Therefore, with the aid of feedback, the search criterion would be improved. Thus, a user could teach the interface through trial and error to record the desired broadcast programs. Thus, the presently described recognition algorithms may be adaptive and learning, and need not apply a finite set of predetermined rules in operation. For such a learning task, a neural network processor may be implemented, as known in the art.

Figure 22:
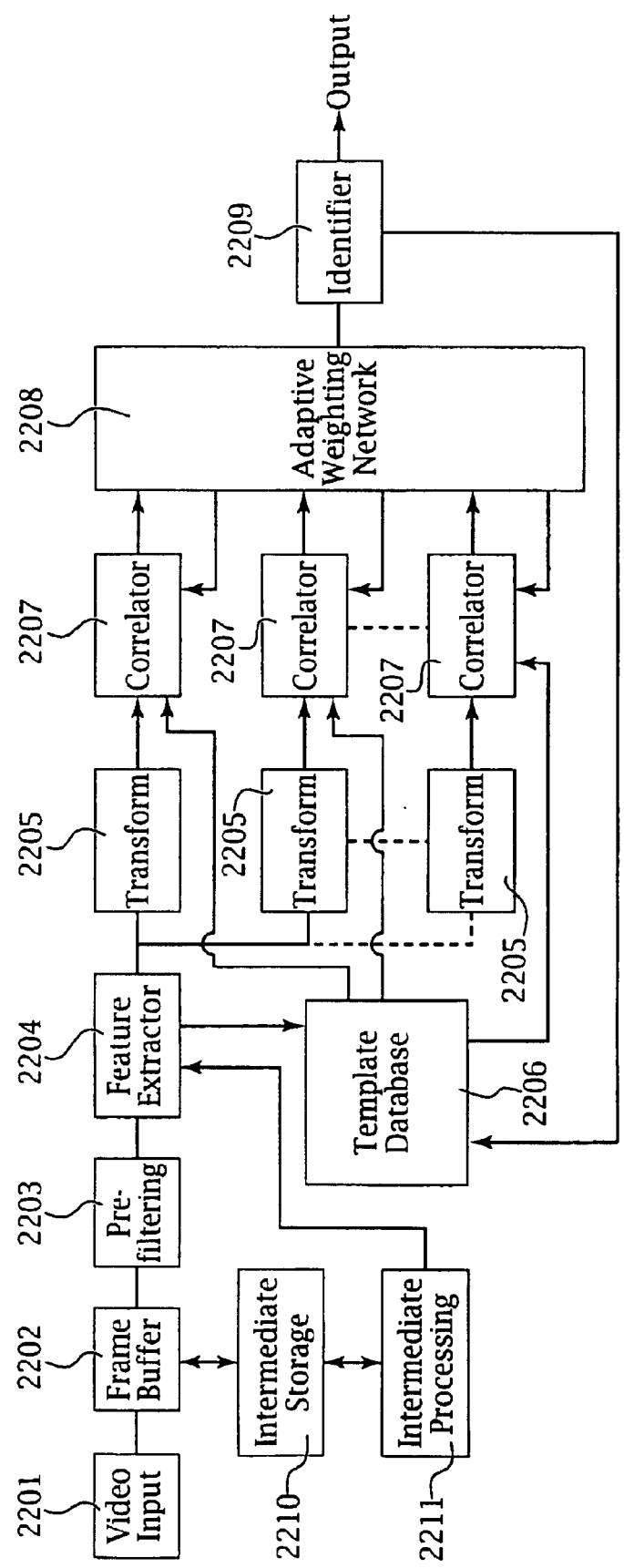
FIG. 22 is a block diagram of a template-based pattern recognition system of the present invention.

The feature extraction and correlation system according to the present invention is shown in FIG. 22. In this figure, the multimedia input, including the audio signal and all other available data, are input in the video input 2201. The video portion is transferred to a frame buffer 2202, which temporarily stores all of the information. All other information in the signal, including audio, VIR, videotext, close caption, SAP (second audio program), and overscan, is preferably stored in a memory, and analyzed as appropriate. The frame buffer 2202 may have an integral or separate prefiltering component 2203. The filtered signal(s) are then passed to a feature extractor 2204, which divides the video frame into a number of features, including movement, objects, foreground, background, etc. Further, sequences of video frames are analyzed in conjunction with the audio and other information, and features relating to the correlation of the video and other information, e.g., correlation of video and audio, are extracted. Other information is also analyzed and features extracted, e.g., audio and close caption. All extracted features relating to the multimedia input are then passed to a transform engine or multiple engines in parallel, 2205. These transform engines 2205 serve to match the extracted features with exemplars or standard form templates in the template database 2206.

It should be noted that even errors or lack of correlation between certain data may provide useful information. Therefore, a mismatch between audio and close caption or audio and SAP may be indicative of useful information. For non-video information, exemplars or templates are patterns which allow identification of an aspect of the signal by comparing the pattern of an unidentified signal with the stored pattern. Thus, the voice patterns of particular persons and audio patterns of particular songs or artists may be stored in a database and employed to identify a source signal.

The transformed extracted features and the templates are then correlated by a correlator or correlators 2207. The parallelization of implementation of the transforms and correlators serves to increase the recognition speed of the device. It should be understood that appropriate systems for parallelization are known in the art. For example, the TMS 320C80, also known as the TI MVP (Texas Instruments multimedia video processor) contains four DSP engines and a RISC processor with a floating point unit on a single die. A board including a TMS 320C80 is available from General Imaging Corp., Billerica Mass., the S/IP80, which may be programmed with ProtoPIPE. In addition, a board including a TMS 320C80 is also available from Wintriss Engineering Corp., San Diego, Calif. Multiple MVP processors may also be parallelized for additional computing power. The MVP may be used to analyze, in parallel, the multimedia input signal and correlate it with stored patterns in a database. In this context, correlation does not necessarily denote a strict mathematical correlation, but rather indicates a comparison to determine the "closeness" of an identified portion of information with an unidentified portion, preferably including a reliability indicator as well. For neural network-based processing, specific hardware accelerators also available, such as from Nestor, Inc. and Intel. Therefore, since there may be multiple recognizable aspects of the unidentified data, and various degrees or genericness of the characteristic recognized, it is preferred that at this initial stage of the recognition process the output of the correlators 2207 be a data set, e.g. a matrix, series of pointers, or other arrangement, so that sufficient information is available for higher level processing to allow application of an appropriate decision process. Of course, if the characteristic to be detected is simple and well defined, and the decision-making process may be implemented with a simple correlation result, then a complex data set output is not required. In fact, the output of the correlator may have a number of different forms, based on the context of the recognition process.

If, for example, an exact match to an entire frame is sought, partial match information is not particularly useful, and is ignored in this process. (Of course, since the system is "self-learning", the processing results may be maintained and analyzed for other purposes). If the system, on the other hand, is analyzing novel data, a full analysis would likely be necessary including partial results and low correlation results.

The outputs of the correlators are input into an adaptive weighing network 2208, to produce a probability of a match between a given feature and a given template. The recognition is completed in an identifier 2209, which produces a signal identifying one or more objects in the video frame input. The identifier 2209 also has an output to the template database 2206, which reinforces the recognition by providing feedback; therefore, if the same object appears again, it will be more easily recognized. The template database 2206 therefore also has an input from the feature extractor 2204, which provides it with information regarding the features recognized. It is also noted that, in addition to allowing recognition, the parallel transform engines 2205, correlators 2207, and adaptive weighing network 2208 also allows the system to ignore features that, though complex, do not aid in recognition.

For example, during dialogue, the soundtrack voice may correlate with the mouth movements. Thus, the mouth movements aid little in recognition, and may be virtually ignored, except in the case where a particular person's mouth movements are distinctive, e.g., Jim Nabors ("Gomer Pyle"), and Tim Curry ("Rocky Horror Picture Show"). Thus, the complexity and parallelism in the intermediate recognition stages may actually simplify the later stages by allowing more abstract features to be emphasized in the analysis. Animation poses a special example where audio and image data may be separated, due to the generally non-physiologic relation between the image and soundtrack.

The pattern recognition function of the present invention could be used, in a VCR embodiment according to the present invention to, e.g., to edit commercials out of a broadcast, either by recognition of characteristics present in commercials, in general, or by pattern recognition of specific commercials in particular, which are often repeated numerous times at various times of the day, and on various broadcast channels. Therefore, the system may acquire an unidentified source signal, which may be, for example, a 30 second segment, and compare this with a database of characteristics of known signals. If the signal does not match any previously known or identified signals, it is then subject to a characterization which may be the same or different than the characterization of the identified signals. The characterizations of the unidentified signal are then compared to characteristics to be recognized. If the unidentified signal meets appropriate criteria, a presumptive generic characterization is made. This characterization is preferably confirmed by a user later, so that a positively identified signal is added to the database of identified signals; however, under certain circumstances no confirmation is required.

Certain media present a recognizable audio or video cue when a commercial break has ended. (E.g. often sports events, such as the Olympic Games, will have theme music or distinctive images). The present device need not respond immediately to such cues, and may incorporate a delay, which would store the information while a decision is being made. In the case of a video tape, the delay may be up to the time between the time of recording and the time of playback. Further, the temporary storage medium may be independent of the pattern recognition system. Thus, a system provided according to the present invention may actually include two independent or semi-independent data streams: the first serving as the desired signal to be stored, retaining visually important information, and the second providing information for storage relating to the pattern recognition system, which retains information important for the recognition process, and may discard this information after the pattern recognition procedure is complete.

A system which provides a plurality of parallel data streams representing the same source signal may be advantageous because is allows a broadcast quality temporary storage, which may be analog in nature, to be separate from the signal processing and pattern recognition stage, which may be of any type, including digital, optical, analog or other known types, which need only retain significant information for the pattern recognition, and therefore may be highly compressed (e.g. lossy compression), and devoid of various types of information which are irrelevant or of little importance to the pattern recognition functions. Further, the temporary storage may employ a different image compression algorithm, e.g. MPEG-4, MPEG-2 or MPEG1, which is optimized for retention of visually important information, while the recognition system may use a compression system optimized for pattern recognition, which may retain information relevant to the recognition function which is lost in other compression systems, while discarding other information which would be visually important. Advantageously, however, the analysis and content transmission streams are closely related or consolidated, such as MPEG-7 and MPEG-4.

In a particularly advantageous arrangement, the compression algorithm is integral to the recognition function, preparing the data for the pattern matching and characterization, and therefore is optimized for high throughput. According to this embodiment, the initial compression may include redundant or uncompressed information, if necessary in order to achieve real-time or near real-time recognition, and, thus may actually result in a larger intermediate data storage requirement than the instantaneous data presented to the recognition system; however, the term "compression", in this case, applies to the long term or steady state status of the device, and in a real-time recognition function, the amount of data stored for use in recognition is preferably less than the cumulative amount of data presented, except during the very initial stages of data acquisition and possibly rare peaks.

In the case where a high quality (low loss, e.g. broadcast quality) intermediate storage is employed, after a decision is made as to whether the data should be stored permanently or otherwise further processed or distributed, the data may be transferred to the appropriate system or subsystem of the apparatus. Alternatively, the high quality intermediate storage is retained, and no further processing is performed. In either case, the purpose of this storage is to buffer the source data until the computational latency resolves any decisions that must be made.

According to one aspect of the present invention, the source image may be compressed using the so called "fractal transform", using the method of Barnsley and Sloan, which is implemented and available as a hardware accelerator in product form from Iterated Systems, Inc., Norcross, GA, as the Fractal Transform Card (FTC) II, which incorporates eight fractal transform integrated circuit chips, 1 MByte of Random Access Memory (RAM), and an Intel i80960CA-25 □P, and operates in conjunction with P.OEM™ (Iterated Systems, Inc., Norcross, Ga.) software, which operates under MicroSoft-Disk Operating System (MS-DOS). FTC-II hardware compression requires approximately 1 second per frame, while software decompression on an Intel 80486-25 based MS-DOS computer, using "Fractal Formatter" software, can be performed at about 30 frames per second, which allows approximately real time viewing. The Fractal Video Pro 1.5 is a video codec for WIN, allowing software only playback at 15–30 fps, 70–150 Kbytes/sec. This is a non-symmetrical algorithm, requiring more processing to compress than to decompress the image. The FTC-IV Compression Accelerator Board is presently available.

This fractal compression method potentially allows data compression of upwards of 2000:1, while still maintaining an aesthetically acceptable decompressed image result. Further, since the method emphasizes structural aspects of the image, as opposed to the frequency decomposition used in DCT methods (JPEG, MPEG), elements of the fractal method could be used as a part of the image recognition system. Of course, it should be appreciated that other fractal processing methods are available and may be likewise employed.

Audio data is also compressible by means of fractal transforms. It is noted that the audio compression and image recognition functions cannot be performed on the FTC-II board, and therefore an alternate system must be employed in order to apply the pattern recognition aspects of the present invention. It should also be noted that an even more efficient compression-pattern recognition system could be constructed by using the fractal compression method in conjunction with other compression methods, which may be more efficient under certain circumstances, such as discrete cosine transform (DCT), e.g. JPEG or modified JPEG or wavelet techniques. Fractal compression systems are also available from other sources, e.g. the method of Greenwood et al., Netrologic Inc., San Diego, Calif. See also, Shepard, J. D., "Tapping the Potential of Data Compression", Military and Aerospace Electronics, May 17, 1993, pp. 25–27.

A preferred method for compressing audio information includes a model-based compression system. This system may retain stored samples, or derive these from the data stream. The system preferably also includes high-level models of the human vocal tract and vocalizations, as well as common musical instruments. This system therefore stores information in a manner which allows faithful reproduction of the audio content and also provides emphasis on the information-conveying structure of the audio signal. Thus, a preferred compression for audio signals retains, in readily available form, information important in a pattern recognition system to determine an abstract information content, as well as to allow pattern matching. Of course, a dual data stream approach may also be applied, and other known compression methods may be employed.

Because of the high complexity of describing a particular signal pattern or group of audio or image patterns, in general, the system will learn by example, with a simple identification of a desired or undesired pattern allowing analysis of the entire pattern, and extraction of characteristics thereof for use in preference determination.

Barnsley and Sloan's method for automatically processing digital image data consisting of image information, disclosed in U.S. Pat. Nos. 5,065,447 and 4,941,193, both expressly incorporated herein by reference, consists of the steps of storing the image data in the data processor, then generating a plurality of uniquely addressable domain blocks from the stored image data, each of the domain blocks representing a different portion of the image information such that all of the image information is contained in at least one of the domain blocks. A plurality of uniquely addressable mapped range blocks corresponding to different subsets of the stored image data are created, from the stored image data, with each of the subsets having a unique address. This step includes the substep of executing, for each of the mapped range blocks, a corresponding procedure upon the one of the subsets of the stored image data that corresponds to the mapped range block. Unique identifiers are then assigned to corresponding ones of the mapped range blocks, each of the identifiers specifying for the corresponding mapped range block a procedure and a address of the corresponding subset of the stored image data. For each of the domain blocks, the one of the mapped range blocks that most closely corresponds according to predetermined criteria is selected. Finally, the image information is represented as a set of the identifiers of the selected mapped range blocks. This method allows a fractal compression of image data. In particular, Drs. Barnsley and Sloan have optimized the match of the domain blocks with the mapping region by minimizing the Hausdorff distance. A decompression of the data precedes analogously in reverse order starting with the identifiers and the mapping regions to produce a facsimile of the original image. This system is highly asymmetric, and requires significantly more processing to compress than to decompress. Barnsley and Sloan do not suggest a method for using the fractal compression to facilitate image recognition, which is a part of the present invention.

Basically, the fractal method proceeds from an understanding that real images are made up of a plurality of like subcomponents, varying in size, orientation, etc. Thus, a complex block of data may be described by reference to the subcomponent, the size, orientation, etc. of the block. The entire image may thus be described as the composite of the sub-images. This is what is meant by iterative function systems, where first a largest block is identified, and the pattern mapping is repetitively performed to describe the entire image.

The Iterated Systems, Inc. FTC-II or FTC-IV board, if applied as a part of a system according to the present invention, is preferably used in conjunction with a framegrabber board, such as Matrox, Quebec, Canada, Image-LC board, or a Data Translation DT1451, DT2651, DT2862. DT2867, DT2861 or DT2871, which may perform additional functions, such as preprocessing of the image signal, and may be further used in conjunction with an image processing system, such as the Data Translation DT2878. Of course, it should be understood that any suitable hardware, for capturing, processing and storing the input signals, up to and including the state of the art, may be incorporated in a system according to the present invention without exceeding the scope hereof, as the present invention is not dependent on any particular subsystem, and may make use of the latest advances. For example, many modern systems provide appropriate functionality for digital video-capture, either uncompressed, mildly compressed, or with a high degree of compression, e.g., MPEG-2.

The Texas Instruments TMS320C80 provides a substantial amount of computing power and is a preferred processor for certain computationally intensive operations involving digital signal processing algorithms. A system employing a parallel TMS 320C40 processors may also be used. The Intel Pentium series (or related processors from AMD. National Semiconductor, or other companies), DEC/Compaq Alpha, SPARC, or other processors intended for desktop computing may, either individually or in multiprocessor configurations, be used to process signals.

A pattern recognition database system is available from Excalibur Technologies, San Diego, Calif. Further, IBM has had pattern recognition functionality available for its DB/2 database system, and has licensed Excalibur's XRS image retriever recognition software for DB/2. See, Lu, C., "Publish It Electronically", Byte, September 1993, pp. 94–109. Apple Computer has included search by sketch and search by example functions in PhotoFlash 2.0. See also, Cohen, R., "FullPixelSearch Helps Users Locate Graphics", MacWeek, Aug. 23, 1993, p. 77.

Image processing hardware and systems are also available from Alacron, Nashua N.H.; Coreco, St. Laurent, Quebec; Analogic, and others.

A fractal-based system for real-time video compression, satellite broadcasting and decompression is also known from Iterated Systems, Inc. and Entertainment Made Convenient$^2$, Inc. (EMC$^2$). In such a system, since the compressed signal is transmitted, the remote receiving system need not necessarily complete decompression prior to the intelligent pattern recognition function of the present invention. This system also incorporates anti-copy encryption and royalty and accounting documentation systems. It is noted that the EMC$^2$ system does not incorporate the intelligent features of the present invention.

A preferred fractal-based system according to the present information provides the source data preprocessed to allow easy and efficient extraction of information. While much precharacterization information may be provided explicitly, the preferred system allows other, unindexed information to also be extracted from the signal. Further, the preferred system provides for an accounting system that facilitates pay-per-view functions. Thus, the interface of the present invention could interact with the standard accounting system to allow royalty-based recording or viewing, and possibly implement a serial-copy recording prevention system. Prior art systems also require a user to explicitly select a program, rather than allow an intelligent system to assist in selection and programming of the device. The EMC$^2$ system is described in "EMC$^2$ Pushes Video Rental By Satellite", Electronic Engineering Times, Dec. 2, 1991, p. 1, p. 98. See also. Yoshida, J., "The Video-on-demand Demand", Electronic Engineering Times, Mar. 15, 1993, pp. 1, 72.

Fractal techniques may be used to store images on a writable mass storage medium, e.g. CD-ROM compatible. The present system may thus be used to selectively access data on the CD-ROM by analyzing the images, without requiring full decompression of the image data.

Wavelets hold promise for efficiently describing images (i.e., compressing the data) while describing morphological features of the image. However, in contrast to wavelet transforms that are not intended to specifically retain morphological information, the selection of the particular wavelet and the organization of the algorithm will likely differ. In this case, the transform will likely be more computationally complex and therefore slower, while the actual compression ratios achieved may be greater.

Thus, one embodiment of the device according to the present invention may incorporate a memory for storing a program, before being transferred to a permanent storage facility, such as tape. Such a memory may include a hard disk drive, magnetic tape loop, a rewritable optical disk drive, or semiconductor memories, including such devices as wafer scale memory devices. This is shown diagrammatically as the intermediate storage 2210 of FIG. 22. The capacity of such a device may be effectively increased through the use of image data compression, which may be proprietary or a standard format, i.e. MPEG-1, MPEG-2 (Motion Picture Experts Group standard employing DCT encoding of frames and interframe coding), MPEG-4 (Motion Picture Experts Group standard employing DCT encoding of frames and interframe coding, as well as model-based encoding methods) JPEG (Joint Photographic Experts Group standard employing DCT encoding of frames), Px64 (Comité Consultatif International des Telegraph et telephone (International telegraph and telephone consultative committee) (CCITT) standard H.261, videoconferencing transmission standard), DVI (Digital Video Interactive), CDI (Compact Disk Interactive), etc.

Standard devices are available for processing such signals, available from 8×8, Inc., C-Cube, Royal Philips Electronics (TriMedia), and other companies. Image processing algorithms may also be executed on general purpose microprocessor devices.

Older designs include the Integrated Information Technology, Inc. (IIT, now 8×8, Inc.) Vision Processor (VP) chip, Integrated Information Technology Inc., Santa Clara, Calif., the C-Cube CL550B (JPEG) and CL950 (MPEG decoding), SGS-Thompson ST13220, STV3200, STV3208 (JPEG, MPEG, Px64), LSI Logic L64735, L64745 and L64765 (JPEG) and Px64 chip sets, and the Intel Corp. i750B DVI processor sets (82750PB, 82750 DB). Various alternative image processing chips have been available as single chips and chip sets; in board level products, such as the Super Motion Compression and Super Still-Frame Compression by New Media Graphics of Billerica, Mass., for the Personal Computer-Advanced technology (PC-AT, an IBM created computer standard) bus; Optibase, Canoga Park, Calif. (Motorola Digital Signal Processor (DSP) with dedicated processor for MPEG); NuVista+ from Truevision (Macintosh video capture and output); New Video Corp. (Venice, Calif.) EyeQ Delivery board for Macintosh NuBus systems (DVI); Intel Corp. ActionMedia II boards for Microsoft Windows and IBM OS/2 in Industry Standard Adapter (ISA, the IBM-PC bus standard for 8 (PC) or 16 bit (PC-AT) slots); Micro Channel Architecture (MCA) (e.g., Digital Video Interactive (DVI), Presentation Level Video (PLV) 2.0, Real Time Video (RTV) 2.0) based machines; and as complete products, such as MediaStation by VideoLogic.

Programmable devices, including the Texas Instruments TMS320C80 MVP (multimedia video processor) may be used to process information according to standard methods, and further provide the advantage of customizability of the methods employed. Various available DSP chips, exemplary board level signal processing products and available software are described in more detail in "32-bit Floating-Point DSP Processors", EDN, November 7, 1991, pp. 127–146. The TMS320C80 includes four DSP elements and a RISC processor with a floating point unit.

It is noted that the present interface does not depend on a particular compression format or storage medium, so that any suitable format may be used. The following references describe various video compression hardware: Kim, Y., "Chips Deliver Multimedia", Byte, December 1991, pp. 163–173; and Donovan, J., "Intel/IBM's Audio-Video Kernel", Byte, December, 1991, pp. 177–202.

It should also be noted that the data compression algorithm applied for storage of the received data may be lossless or lossy, depending on the application. Various different methods and paradigms may be used. For example, DCT (discrete cosine transform) based methods, wavelets, fractals, and other known methods may be used. These may be implemented by various known means. A compressed image may also be advantageously used in conjunction with the image recognition system of the present invention, as described above. In such a case, the compression system would retain the information most important in the recognition function, and truncate the unimportant information.

A further method of performing pattern recognition, especially of two dimensional patterns, is optical pattern recognition, where an image is correlated with a set of known image patterns represented on a hologram, and the product is a pattern according to a correlation between the input pattern and the provided known patterns. Because this is an optical technique, it is performed nearly instantaneously, and the output information can be reentered into an electronic digital computer through optical transducers known in the art. Such a system is described in Casasent, D., Photonics Spectra, November 1991, pp. 134–140. See also references cited therein.

These optical recognition systems are best suited to applications where an uncharacterized input signal frame is to be compared to a finite number of visually different comparison frames (i.e., at least one, with an upper limit generally defined by the physical limitations of the optical storage media and the system for interfacing to the storage media), and where an optical correlation will provide useful information. Thus, if a user wished to detect one of, e.g., "David Letterman", "Jay Leno", or "David Koppel", a number of different planar views, or holograms in differing poses, of these persons would be formed as a holographic correlation matrix, which could be superimposed as a multiple exposure, stacked in the width dimension, or placed in a planar matrix, side by side. The detection system produces, from the uncharacterized input image and the holographic matrix, a wavefront pattern that is detectable by photonic sensors.

It is preferred that if multiple holographic images of a particular characterization are employed, that they each produce a more similar resulting wavefront pattern than the holographic images of other characterizations, in order to enhance detection efficiency. The optical pattern recognition method is limited in that a holographic image must be prepared of the desired pattern to be detected, and that optically similar images might actually be of a different image, if the differences are subtle. However, this method may be used in conjunction with electronic digital pattern recognition methods, to obtain the advantages of both. Methods are also known to electronically write an image to a holographic storage medium, thereby facilitating its use in a general-purpose image recognition system. Of course, the system may also be used to identify talk show guests, such as "Richard Gere" or "Cindy Crawford", or these same individuals in other contexts. The system may also be used for censoring, for example, to prevent minors from viewing adult-oriented material. This system may allow partial censoring, based on the actual viewed or spoken content, rather than the entire show.

If image compression is used, once an image is compressed, it need not be decompressed and returned to pixel, NTSC or other standard transmission or format for storage on tape, and thus the compressed image information may be stored in the same format as is present in the temporary storage medium. Thus, the block labeled intermediate processing 2211 of FIG. 22 shows that the intermediate storage need not retain the information as received from the frame buffer 2202, and in fact, may prepare it for the feature extractor 2204. In addition, the storage medium itself need not be normal videotape (S-VHS, VHS, Beta, 8 mm, Hi-8) and may be an adapted analog storage technique or a digital storage technique. Various magneto-optical recording techniques are known, which can store between 128 MB (3½") and around 5 GB (11"), uncompressed, which might be suitable for storing compressed digital or analog information. Multilayer CD-ROM and short wavelength (e.g., blue) laser systems allow storage densities of about 3.5 to 10 Gbytes per disk, allowing storage of over two hours of MPEG-2 encoded video.

It is also noted that the present technology could also be applied to any sort of mass storage, such as for a personal computer. In such a case, a characteristic of the computer file, which is analogous to the broadcast program in temporary storage of a VCR, is classified according to some criteria, which may be explicit, such as an explicit header or identifying information, or implicit, such as a document in letter format, or a memorandum, as well as by words and word proximity. In particular, such a recognition system could differentiate various clients or authors based on the content of the document, and these could be stored in different manners. The text analysis system of a text-based computer storage system is analogous to the program classification system of the VCR embodiment of the present invention. However, there is a further analogy, in that the VCR could incorporate optical character recognition of text displayed in the program material, employ voice recognition, or directly receive text information as a part of a closed caption or videotext system. Thus, the VCR device according to the present invention could recognize and classify programs based on textual cues, and make decisions based on these cues. This might also provide a simple method of discriminating program material, for example, if a commercial does not include close caption or Second Audio Program (SAP), while the desired program does, or vice versa, then a commercial could be discriminated from a program with very little computational expenditure.

EXAMPLE 7

VCR Interface

A particular VCR interface system according to one aspect of the present invention includes an internal clock, four program memory, and the capability to display a graphical color interface. By providing the user with the aforementioned features, this design is a unique implementation for an instrument to be used for programming an event driven controller via an interactive display. All information that the user needs is displayed on the screen to avoid or minimize the unnecessary searching for information. This information includes the current date and current time.

A simulation of the AKAI Inc. VCR VS303U (on-screen programming) and the interface of the present invention, were tested to evaluate users' performances. The AKAI interface of the prior art, hereinafter referred to as the prior art interface, was chosen because users made the fewest errors while using this machine, and no user quit while programming, as compared to three other VCRs tested, a Panasonic (made by Matsushita, Inc.) PV4962 (Bar Coder), an RCA brand (formerly Radio Corporation of America, Inc.) VKP950 (on-screen programming), Panasonic brand (made by Matsushita Inc.) PV4700 (Display Panel).

The present embodiment was constructed and tested using HyperPAD™, a rapid prototyping package for an IBM-PC Compatible Computer. It is, of course obvious that the present embodiment could be incorporated in a commercial VCR machine by those skilled in the art, or be implemented on many types of general purpose computers with output screens which allow on-screen feedback for the programming operation. Further, the system of the present embodiment can include a remote-control device which communicates with a VCR through an infrared beam or beams, and can thus exert control over an infrared remote controlled VCR, or translate the programming information and communicate through an infrared remote control, using the standard type infrared transmitter.

An IBM PC-AT compatible (MS-DOS, Intel 80286–10 MHz) computer was used to test the two simulations. In order to simulate the use of a remote control device in programming the VCR, an infrared device made by NView™ was attached to the computer. This device came with a keyboard that was used to "teach" a Memorex™ Universal Remote so that the desired actions could be obtained. By using a universal remote, the computer could be controlled by using a remote control.

The present embodiment incorporates a mouse input device. It is understood that a small trackball with a button for selection, mounted on a remote control may also be employed, and may be preferable in certain circumstances. However, a computer mouse is easily available, and the mouse and trackball data are essentially similar for the type of task implemented by the user, with trackball performance being slightly faster. For daily use on a VCR however, a trackball would be a more preferable input device because it does not require a hard, flat surface, which is not always available to a user when programming a VCR, such as in the situation where a person is watching television while sitting in a chair or sofa.

A Genius™ Mouse was used as the input device in the prototype of the interface of the present invention. With the mouse, the user could view all of the choices at once on the display screen, and then make a selection from the items on the screen by moving the cursor and then pressing the left mouse button.

The interface of the present example focuses on attending to the user's needs, and the interface must be modified for each application. By reducing the searching, learning times, and entry times, the mental load is also minimized. Some tradeoffs are necessary as a result of subjective and objective data. Because of the difficulty in optimizing a single interface design for all levels of users, a menu system was used in an attempt to satisfy all these user types.

The interface of the present example reduced the number of incorrect recordings by 50%. The severity of the errors is unimportant here because one wrong entry will cause an irretrievable mistake and the user will not record the intended program. One study reported that faulty inputs, which lead to missing the program, can be reported by almost every present day owner of a VCR.

EXAMPLE 8

Programmable Device Interface

It is also noted that the interface of the present invention need not be limited to audio-visual and multimedia applications, as similar issues arise in various programmable controller environments. Such issues are disclosed in Carlson, Mark A., "Design Goals for an Effective User Interface", Electro/82 Proceedings, Mar. 2001–Mar. 1, 2004; Kreifeldt, John, "Human Factors Approach to Medical Instrument Design", Electro/82 Proceedings, Mar. 3, 2001–Mar. 3, 2006; Wilke, William, "Easy Operation of Instruments by Both Man and Machine", Electro/82 Proceedings, Mar. 2, 2001–Mar. 2, 2004; Green, Lee, "Thermo Tech: Here's a common sense guide to the new thinking thermostats", Popular Mechanics, October 1985, 155–159; Moore, T. G. and Dartnall, "Human Factors of a Microelectronic Product: The Central Heating Timer/ Programmer", Applied Ergonomics, 1983, Vol. 13, No. 1, 15–23; and "The Smart House: Human Factors in Home Automation", Human Factors in Practice, December 1990, 1–36.

Figure 23:
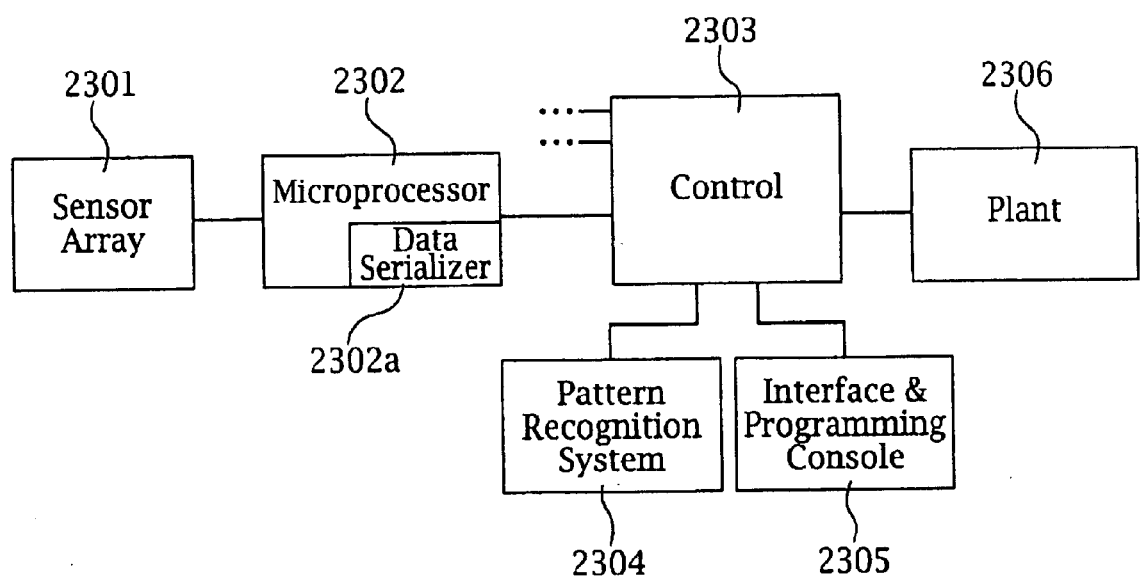
FIG. 23 is a block diagram of a control system of the present invention incorporating a pattern recognition element and an interface.

This generalized system is shown in FIG. 23, in which the sensor array 2301 interfaces with a microprocessor 2302 with a serial data port 2302a, which transmits sensor data to a control 2303. The control 2303 further interfaces or includes a data pattern recognition system 2304 and an interface and programming console 2305 according to the present invention, using the aforementioned intelligent features and adaptive pattern recognition techniques. The control 2203 controls the plant 2306, which includes all the controlled actuators, etc.

EXAMPLE 9

Adaptive Graphic Interface

A "smart screen" aspect according to the present invention is further explored in the present example. This aspect of the present invention allows the interface to anticipate or predict the intent of the user, to provide, as a default user choice, the most likely action to be taken by the user of the programmable device as a default, which may be either accepted or rejected by the user, without inordinate delay to the user. The intelligent selection feature may also automatically choose an option and execute the selected option, without further intervention, in cases where little or no harm will result. Examples of such harm include a loss of data, a substantial waste of the user's time and an inappropriate unauthorized allocation of computational resources.

When a user regularly applies the VCR device, for example, to record a particular television show which appears weekly on a given television channel, at a given time, on a given channel, such an action could be immediately presented to the user as a first option, without forcing him to explicitly program the entire sequence. Likewise, if the user has already entered such a command, the presented choices could include a second most likely selection, as well as the possibility of canceling the previously entered command.

Further, if an entire television programming guide for a week or month is available as a database, the interface could actively determine whether the desired show is preempted, a repeat (e.g., one which has been previously recorded by the system), changed in time or programming slot, etc. Thus, the interface could present information to the user, of which he might not be aware, and/or predict an action based on that information. Such a device could, if set in a mode of operation that allows such, automatically execute a sequence of instructions based on a predicted course of action. Thus, if a user is to be absent for a period, he could set the machine to automatically record a show, even if the recording parameters are not known with precision at the time of setting by the user. Of course, this particular embodiment depends on the availability of a database of current broadcast schedules, however, such a database may generally be available, e.g., in an on-line database or broadcast data stream.

Such an on-line database system of known type may be used and need not be described in detail herein. Alternately, a printed schedule of broadcasts may be scanned into a computer and the printed information deciphered (e.g., OCR) to gain access to a database. Other methods may also be used to access scheduling information, e.g. access channels on cable systems, as well as other broadcast information identifying future and imminent programming. Together, these methods allow semiautonomous operation, guided by programming preferences rather than explicit programs, where such explicit instruction is absent.

The smart screens according to the present invention may be implemented as follows. The controller may be, for example, an Apple Power Macintosh 8100/110 AV computer, operating under Macintosh 7.5 operating system. The Hypercard™ 2.3 software may be used to implement the screen interface, which incorporates the above-described features, which is generally compatible with the Hyperpad software described above. HyperCard™ is mentioned due to its capabilities to reference external programs, thus allowing interfacing to various software and hardware devices. A more global scripting language, such as Frontier by UserLand Software Inc., may also be used, especially where low level hardware control of interfaced devices, such as a VCR, multimedia adapter, or the like is desired. Apple Applescript may also be used. The Quicktime format may be used to store and recall data, however, many acceptable formats exist. The input device is an Apple Desktop Bus (ADB) mouse (Apple Computer Inc., Cupertino, Calif.), and the output display is an 8 bit or 24 bit graphics color adapter connected to, e.g., a 14" color monitor. In addition, various parameters concerning the use of the interface are stored in the computer's memory, and a non-volatile mass storage device, such as a hard disk drive, or Electrically Erasable Programmable read Only Memory (EEPROM) or Erasable Programmable Read Only Memory (EPROM), as well as battery backed Random Access Memory (RAM) could also be used.

A more modern implementation might employ, for example, a single or dual Pentium II 450 MHz workstation, running Microsoft Windows NT 4.0 (or Windows 2000, when available). The hardware is a matter of choice, including memory, monitor, pointing device, graphic display card, video capture card, mass storage options, and the like. Preferably, a hardware codec is provided, for example a Media 100, Inc. Broadway device. The software may be, for example, Microsoft Visual Basic 5.0 or other suitable development language.

Intel Pentium-based platforms may also be used, preferably in IBM-PC compatible implementations. Intel 80860 and/or Intel 80960 processor platforms may also be used.

Alternatively, other Apple Power PC, Macintosh (MC680X0 series) or IBM Power PC implementation may be used, providing the advantage of increased processing power over Motorola 680X0 derivatives. The specific Power PC employed may be any version, including desktop system versions available from Apple and IBM and embedded versions from IBM and Motorola. These Power PC processors may also be provided in a parallel processing implementation. Further, custom implementations of Power PC hardware optimized for the relevant computational tasks may be employed.

Of course, other systems, including DEC Alpha and HP 9000 systems may also be employed, as well as SPARC, MIPS, and other available RISC systems. While RISC systems, possibly supplemented with DSP hardware, are presently preferred because of their efficiency in executing the pattern recognition tasks, Complex Instruction Set Computer (CISC)., hybrid and other known processing systems may be employed. The Texas Instruments TMS320C80 combines a Reduced Instruction Set Computer (RISC) processor, Arithmetic logoc Unit (ALU) and four DSP processors on a single chip, and is therefore a preferred processor for implementing various aspects of the system, especially mathematical processing including DCT and correlations.

According to the present invention, the interface may perform comparatively simple tasks, such as standard graphic user interface implementation with optimized presentation of screen options, or include more complex functionality, such as pattern recognition, pattern matching and complex user preference correlations. Therefore, hardware requirements will range from basic 68040, 80486, Pentium, Power PC, MIPS, SPARC, Digital Equipment Corp. (DEC, now Compaq Computer Corp.) Alpha, or other microprocessors that are used to perform visual or audio interface functions, to much special purpose processors for implementation of complex algorithms, including mathematical, neural network, fuzzy logic, and iterated function systems (fractals).

It should be noted that, while many aspects of the intelligent interface according to the present invention do not require extremely high levels of processing power, and therefore may be provided with inexpensive and commonly available computing hardware, other aspects involve complex pattern recognition and advantageously employ powerful processors to achieve a short processing latency. Both simple and complex interface systems, however, are included within the scope of the present invention. Processing may be distributed in different fashions, so that complex functionality may be implemented with relatively simple local hardware, with a substantial amount of required processing for a high level of functionality performed centrally, and for a large number of users.

From the stored information regarding the prior use of the interface by the user, including prior sessions and the immediate session, and a current state of the machine (including a received data stream and information relating to the data stream previously stored), a predicted course of action or operation may be realized. This predicted operation is, in the context of the current user interface state, the most probable next action to be taken by the user.

The predicted operation is based on: the identity of the user, if more than one user operates the interface and machine, the information already entered into the interface during the present programming session, the presently available choices for data entry, settings for the use of the machine, which may be present as a result of a "setup" operation, settings saved during a prior session, and a database of programming choices. In the case of a Hyper-Card script, the interface software calls another program that has access to the necessary data in the memory, as well as access to any remote database that may be necessary for implementation of the function. Using a predictive technology, such as Boolean logic, fuzzy logic, neural network logic, or other type of artificial intelligence, a most probable choice may be presented to the user for his approval, or another alternative choice may be selected. Further, a number of most probable choices may be presented simultaneously or in sequence, in order to improve the probability that the user will be immediately or quickly presented with an acceptable choice. If multiple choices are presented, and there is limited room on the display, two (or more) similar choices may be merged into a single menu selection, which may be resolved in a secondary menu screen. e.g. a submenu or dialog box.

Figure 24:
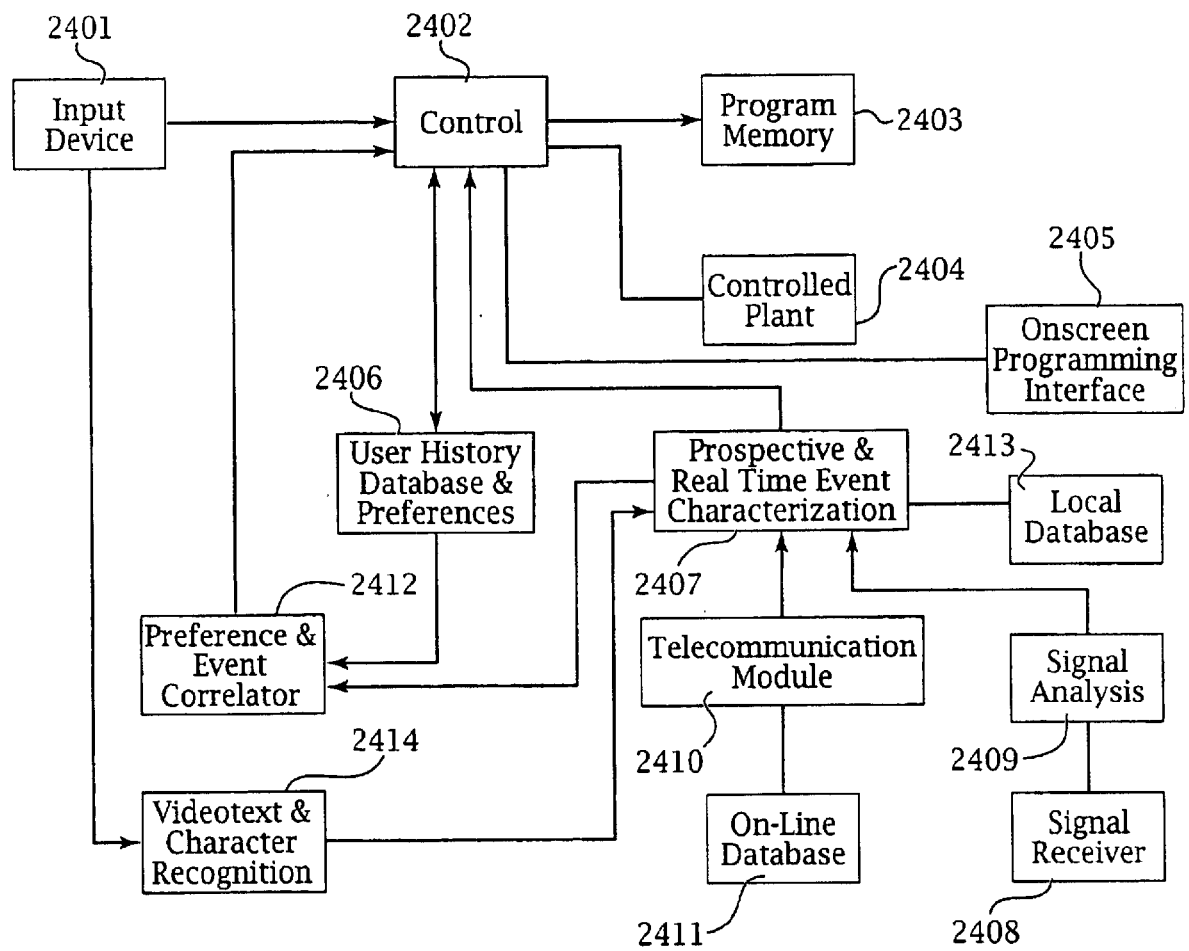
FIG. 24 is a block diagram of a control system for characterizing and correlating a signal pattern with a stored user preference of the present invention.
Figure 25:
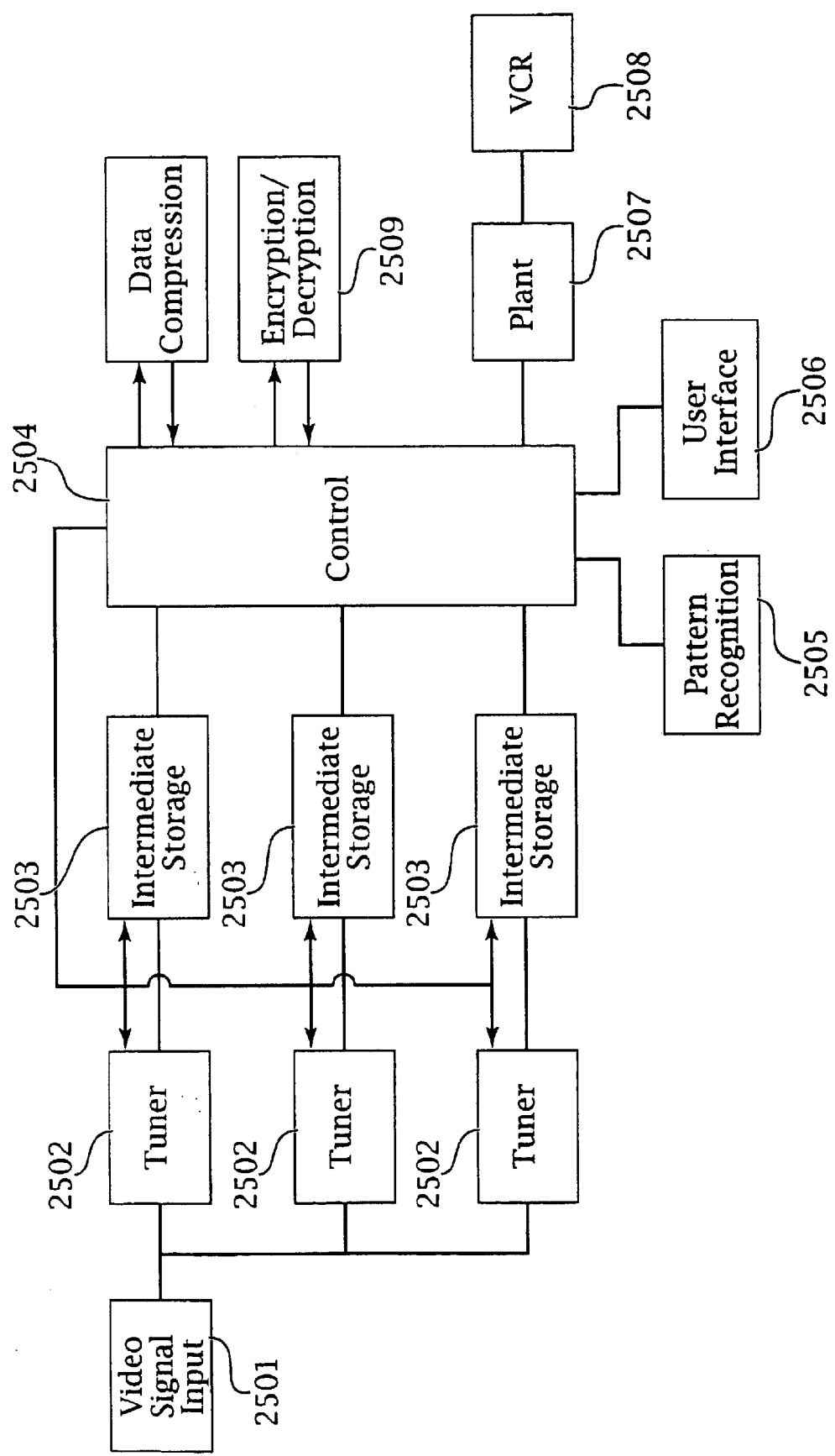
FIG. 25 is a block diagram of a multiple video signal input apparatus, with pattern recognition, data compression, data encryption, and a user interface of the present invention.

FIG. 24 shows a system for correlating a user's preferences with a prospective or real-time occurrence of an event. The input device 2401, which is a remote control with a pointing device, such as a trackball, provides the user's input to the control 2402. The program is stored in a program memory 2403, after it is entered. The control 2402 controls a plant 2404, which is a VCR. The control also controls an on-screen programming interface 2405, through which the user interactively enters the program information. Each program entry of the user is submitted to the user history database and preferences module 2406, which may also receive explicit preference information, input by the user through the input device 2401. The prospective and real time event characterization unit 2407 uses any and/or all relevant information available in order to determine the character of a signal input, which is a video signal, from the signal receiver 2408. A signal analyzer 2409 provides a preliminary analysis and characterization of the signal, which is input to the prospective and real time event characterization unit 2407. The prospective and real time event characterization unit 2407 also interacts and receives an input from a telecommunication module 2410, which in turn interacts and receives information from an on-line database 2411. A user preference and event correlator 2412 produces an output relating to a relatedness of an event or prospective event and a user preference. In the event of a high correlation or relatedness, the control 2402 determines that the event or prospective event is a likely or most likely predicted action. The prospective event discussed above refers to a scheduled event, which is likely to occur in the future. The characterization unit also has a local database 2413 for storing schedule information and the like.

In the particular context of a videotape, one consideration of the user is the amount of time remaining on the tape. Generally, users wish to optimally fill a tape without splitting a program, although the optimization and non-splitting parameters may vary between users. Therefore, the length of the tape and the amount and character of other items on the tape are also factors to be employed in determining a most desired result. With respect to this issue, the interface may maintain a library function that allows the identification of a partially filled tape for recording under given circumstances. The interface may also optimize a playback by selecting a tape containing a desired sequence of materials.

The intelligent interface may also be used as a part of an educational system, due to its ability to adapt to the level of the user and dynamically alter an information presentation based on the "user level", i.e. the training status of the user, and its ability to determine areas of high and low performance. Likewise, the intelligent interface according to the present invention may also be used in a business environment for use by trained individuals who require relatively static software interface design for consistence and "touch typing" with memorized keystroke or mouse click sequences. In this case, the intelligent functionality is segregated into a separate user interface structure, such as an additional "pull down menu" or other available screen location. While the interface always monitors user performance, the impact of the analysis of the user is selectively applied. User analysis may also be used for performance evaluation according to an objective criteria, based on continuous monitoring. In a network environment, user profile and evaluation may be made portable, stored so as to be accessible from any networked device the user may interact with, from office computers to thermostats to photocopying machines to coffee machines.

EXAMPLE 10

Intelligent Adaptive VCR Interface

A user interacting with the device intends to record a particular program, "Married With Children" (Fox, Sunday, 9:00 p.m., etc.) on its ever occurrence. This intent, however, is to provide a full library of episodes, and not to duplicate episodes. The particular program is subject to the occurrence of reruns, syndicated distribution, time shifting of performance, preview scenes and advertisements. Further, various actors appearing in the particular program also appear in other capacities and roles on television. Therefore, after this intent is elucidated, the interface scans available directories of programming to determine when "Marries With Children" will be broadcast. In addition, to the extent possible, all channels may be monitored, in the event that the directories or erroneous or incomplete.

It is noted that the interface may be quite effective if it is used for a number of applications, such as television, radio, desktop computer, and even kitchen and HVAC system. For example, preferences for processing MTV or other music video information may be directly relevant to processing of radio or other music reproduction devices, and vice versa.

At some point in the process, preferably prior to substantive programming input, the interface performs a self-diagnostic check to determine whether the machine is set up and operating correctly. This would include a determination of whether the clock has been set and thereafter operating continuously. Of course, the clock could have, in practice, a battery to minimize the occurrence of problems relating to clock function. The interface would then, if the clock is not properly set, and if there is no telecommunication or other external means for automatically determining the exact time, present the user with a menu selection to set the proper time. Of course, if the correct time is available to the apparatus in some form, this could be automatically obtained, and the internal clock updated, without intervention. These same sources may be used to verify the accuracy of an internal clock. Further, if a reliable external clock system is available, an internal clock may be dispensed with or ignored. Time may also be inferred based on the regular schedules of broadcasts, e.g., the 11:00 p.m. news begins at 11:00 p.m. If the user does not have access to a source of the exact time, the step of correcting the time may be deferred, although at some point the user should be reminded to verify the clock information. The user may thus be able to override a machine-generated request or attempt to correct the time data.

If the machine has access to an external source of the exact time, it would then preferably access this source first. Such sources of exact time include a telephone connection to a voice line that repeats the time. The computer would then perform a speech recognition algorithm that would be used to determine the time. Such a speech recognition algorithm could also be used as a part of the user interface for other purposes, i.e. a speech recognition system is not supplied solely for obtaining time information. Alternatively, a modem or communication device could be used to obtain the time in digitally coded form over a network, which would alleviate the need for speech recognition capabilities for this function. An on-line connection could also be used in order to obtain information concerning television scheduling.

A further method for obtaining accurate time information is to access a video signal that contains the desired time information. For example, many cable broadcasting systems have a channel that continuously broadcasts the time in image form. The interface tunes this channel, and acquires a representation of the screen image, thereafter performing a character recognition algorithm to capture the time information. This character recognition algorithm could also be used to obtain or capture information regarding programming schedules, stock prices, and other text information that may appear on certain cable broadcast channels.

Thus, the interface, in obtaining necessary information, employs such available data source access methods as speech recognition, character recognition, digital telecommunication means, radio wave reception and interpretation, and links to other devices.

In interacting with the apparatus, the user first identifies himself/herself to the machine, which can occur in a number of ways. This step may be dispensed with, or at least trivialized, if only one user regularly interacts with the apparatus. Otherwise, such identification may be important in order to maintain the integrity of the user profiles and predictive aspects of the interface. A radio frequency transponder (RF-ID), infrared transponder (IR-ID) system may automatically determine the user based on a devices, which may be concealed in a piece of jewelry or wristwatch. The user may also be identified by voice pattern recognition, speaker independent voice recognition, video pattern recognition, fingerprint, retinal scan, or other biometric evaluation. An explicit entry of the user identity may also be employed, wherein the user types his/her name on a keyboard or selects the name or unique identifier from a "pick-list". The interface, upon identifying the user, retrieves information regarding the user, which may include past history of use, user preferences, user sophistication, patterns of variation of user, which may be based on, e.g., time, mood, weather, lighting, biometric factor or other factors.

Thus, after completing system diagnostics, including the time-check function referred to above, the system next determines or predicts the desired function of the user. In this regard, if more than one user has access to the system, the user identifies himself to the interface, in a user identification step 1701 or an analogous action, which may be a coded entry, or a selection from the menu. If the interface has voice recognition capability, then the user may be recognized by his voice pattern, or merely by stating his name. The interface then accesses the memory for a profile of the past use of the machine by the user, which may include the entire prior history, relevant abstracts of the history, or derived user preferences, as shown in the personalized startup based on user profile step 1702, which information is also stored and used in the past user history determining element 2107. These choices differ in the amount of storage necessary in order to retain the desired information.

Thus, if the user has only used the VCR to record, e.g., the National Broadcasting Company (NBC) 11 o'clock news, i.e., record all days from 11:00 p.m. to 11:30 p.m. on NBC, in the past, the most likely current predicted choice would be the NBC 11 o'clock news. If the interface were to present a number of choices, having lower probability, then it interprets the recording history to be "news" based on a database of broadcast information. Therefore, a prediction of lower probability would be American Broadcasting Company (ABC) or Central Broadcasting Company (CBS) news at, e.g., 11:00 p.m., and the NBC news at, e.g., 5:00 p.m. In a cable television system, there may be a number of NBC affiliated news alternatives, so that these alternatives may be investigated first before other networks or the like are presented as likely choices. In addition, where a video feed is unavailable, a text feed from the Internet or an on-line service may be acquired as a probable alternative.

Thus, a number of likely choices, based on intelligently determined alternatives, as well as adaptation based on determined user preferences, are initially presented to the user, along with a menu selection to allow rejection of these predicted choices. In this case, the user selects the "reject" selection, and the system presents the user with a next predicted desired menu choice. Since the user history, in this case, does not provide for another choice of particularly high probability, the user is prompted to explicitly choose the program sequence by day, time, channel, and duration. The user then enters the starting time for recording according to the methods described above. The interface then searches its databases regarding the user and broadcast listings to present a most likely choice given that parameter, as well as all available alternatives. In this case, the user history is of little help, and is not useful for making a prediction. In other cases, the system uses its intelligence to "fill in the blanks", which could, of course, be rejected by the user if these are inaccurate or inappropriate. The most likely choices are then those programs that begin at the selected time. If the user had input the channel or network, instead of starting time, then the presented choices would be the broadcast schedule of the channel, e.g. channel 5 or Fox, for the selected day.

The user then selects one of the available choices, which completes the programming sequence. If no database of broadcasts is available, then the user explicitly defines all parameters of the broadcast. When the programming is completed, the interface then updates its user database, prompts the user to set the VCR to record, by, e.g., inserting a blank or recordable tape.

If the predicted desire of the user is of no help, or the user seeks to explicitly program the system, a manual program entry system is available. Where there is no useful prediction of the user, the interface may request a training session, which may be a general inquiry, or specifically directed to immediately forthcoming broadcasts, or both.

In this case, after a failure to predict a desired program, the user then proceeds to explicitly program the VCR interface to record "Married with Children" on Fox at 9:00 p.m. on Sunday evening. If a database is available, it might also show that "Married with Children" is also syndicated in re-runs, and therefore various episodes may be available on other channels at other times. Thus, during the subsequent session, both the premier showing and re-run of "Married With Children" would be available predicted choices, along with the 11 o'clock News on NBC.

The user having demonstrated a preference for "Married with Children", the interface then characterizes the program. This includes, for example, a characterization of the soundtrack, the background, foreground, actors and actresses present, credits, etc. The interface then attempts to correlate the features present in the reference selection with other available selections. This comparison may be with a preformed database, providing immediate results, or prospectively, after entry of the reference selection. Of course, a number of correlation functions may proceed simultaneously, and various choices may be merged to form a compound reference selection, any ambiguity in which to be later resolved. Further, as various "episodes" of the reference selection occur, the system appends and integrates the most recent occurrence with the stored reference information, thus updating the reference database.

When an occurrence is identified, it is immediately buffered, until such time as the particular episode may be compared against previously stored episodes. If two identical broadcasts occur simultaneously, one may be selected. i.e., the one with the best reception. When the episode is identified, if it is new, the buffered broadcast information is permanently stored; if it is previously stored, the buffer is flushed and the occurrence is further ignored as a "hit". Since the apparatus is now not responding to a direct request, it may then perform various housekeeping functions, including updating databases of broadcasts and the like. This is because, although the apparatus is preferably highly trained upon manufacture, a large number of new broadcasts are always being created and presented, so that the apparatus must constantly maintain its "awareness" of data types and trends, as well as update its predicted preferences of the user(s). Hoffberg Based on input from the user, other programming including the same actors and/or actresses may be processed, e.g., recorded. For example, Katey Segal periodically appears on "Jay Leno" as a musical guest, and therefore may be recorded in these appearances.

EXAMPLE 11

Intelligent Adaptive VCR Interface

Another example of the use of the present programming system allows a hybrid request which does not correspond to any single broadcast schedule entry. In this case, if the user instead wishes to record weather reports on all channels, the interface may be of further help. The interface controls a plurality of tuner elements 2502 of a video signal reception device 2501, so that a plurality of broadcasts may be simultaneously received. Using the mass storage and possibly image data compression described above, a plurality of broadcasts may also be recorded simultaneously in the intermediate storage 2503. The mass storage may be multiple VCRs, optical storage, magnetooptical storage, magnetic storage including disk (e.g. single disks, multimedia compatible disks, RAID, etc.) tape (QIC, 8 mm, 4 mm, etc.). Preferably, the archival recording medium is recordable DVD or possibly recordable CD-ROM.

The optical recording tape produced by ICI. Inc., or other card or tape optical storage medium might also be a useful storage medium for large volumes of data, as might be generated by recording multiple video signals. The known implementations of the ICI product system best suited for commercial or industrial use and not for individual consumer use.

In any case, the interface 2506 accesses its associated database 2413 to determine, at a given time, which channels are broadcasting "news". The interface system might also randomly or systematically monitor or scan all or a portion of the available broadcasts for "special reports". The interface system then monitors these channels for indicia of a "weather" information content broadcast. For example, the newscaster who appears to report the weather on a given show is usually the same, so that a pattern recognition system 2505 of the video frame could indicate the presence of that newscaster. In addition, the satellite photographs, weather radar, computer generated weather forecast screens, etc. are often similar for each broadcast. Finally, news segments, such as "weather" often appear at the same relative time in the broadcast. Using this information, the interface system selects certain broadcast segments for retention.

This retention begins at a beginning of a news segment, such as "weather", stop recording during commercials, and continues after return from break, on all selected channels.

In order to assist in making accurate decisions, the monitored broadcasts may be stored in a temporary storage medium until a decision is made, and thereafter transfer the recording to a more permanent storage medium if that be appropriate. It is noted that the system of the present invention is intelligent, and may therefore "learn" either explicitly, or through training by example. Therefore, if the system made an error during the process, the user may define the error of the system, e.g., a substitute newscaster or rearrangement of news segments, so that the interface system has a reduced likelihood of making the same error again. Thus, while such a system is inherently complex, it poses significant user advantages. Further, while the interface system itself is sophisticated, it provides simplicity, with inductive reasoning and deductive reasoning for the user.

Thus, a minimum of user interaction is required even for complex tasks, and nearly full automation is possible, as long as the user and apparatus are able to communicate to convey a preference. As a further embodiment according to the present invention, the interface system will stored transmitted data, and subsequently review that data, extracting pertinent information. The stored data may then be deleted from the storage medium. In this regard, the system may be self learning.

It is noted that various algorithms and formulae for pattern recognition, correlation, data compression, transforms, etc., are known to those skilled in the art, and are available in compendiums, such as Netravali, Arun N., and Haskell, Barry G., "Digital Pictures Representation and Compression", Plenum Press, New York (1988); Baxes, Gregory A., "Digital Signal Processing, A Practical Primer". Prentice-Hall, Englewood Cliffs, N.J. (1984); Gonzalez, Rafael C., "Digital Image Processing", Addison-Wesley, Reading, Mass. (1987), and, of a more general nature, Press, William H. et al, "Numerical Recipes in C The Art of Scientific Computing", Cambridge University Press, 1988.

EXAMPLE 12

Intelligent Adaptive VCR Interface

A further example of the use of the advanced intelligent features of the present invention is the use of the system to record, e.g., "live" musical performances. These occur on many "talk" shows, such as "Tonight Show" (NBC, 11:30 p.m. to 12:30 p.m., weeknights), "Saturday Night Live" (NBC 11:30 p.m. to 1:00 a.m. Saturday-Sunday), and other shows or "specials" such as the "Grammy Awards". The interface, if requested by the user to record such performances, then seeks to determine their occurrence by, e.g., analyzing a broadcast schedule; interacting with the on-line database 2411; and by reference to the local database 2413. When the interface determines with high probability that a broadcast will occur, it then monitors the channel(s) at the indicated time(s), through the plurality of tuners 2502. The system may also autonomously scan broadcasts for unexpected occurrences.

In the case of pay-per-view systems and the like, which incorporate encrypted signals, an encryption/decryption unit 2509 is provided for decrypting the transmitted signal for analysis and viewing. This unit also preferably allows encryption of material in other modes of operation, although known decryption systems without this feature may also be employed with the present system. During the monitoring, the interface system acquires the audio and video information being broadcast, through the signal receiver 2408, and correlates this information with a known profile of a "live musical performance", in the preference and event correlator 2412. This must be distinguished from music as a part of, e.g., a soundtrack, as well as "musicals" which are part of movies and recorded operas, if these are not desired by the user. Further, music videos may also be undesirable. When the correlation is high between the broadcast and a reference profile of a "live musical performance", the system selects the broadcast for retention. In this case, the information in the intermediate storage 2503 is transferred to the plant 2507, which includes a permanent storage device 2508. The intermediate storage 2503 medium is used to record a "buffer" segment, so that none of the broadcast is lost while the system determines the nature of the broadcast. This, of course, allows an extended period for the determination of the type of broadcast, so that, while real-time recognition is preferred, it is not absolutely necessary in order to gain the advantages of the present invention. The buffer storage data, if not deleted, also allows a user to select a portion for retention that the interface system has rejected.

Thus, while it is preferable to make a determination in real time, or at least maintain real time throughput with a processing latency, it is possible to make an ex post facto determination of the nature of the broadcast program. By using an available delay. e.g., about 5 to about 300 seconds, or longer, the reliability of the determination can be greatly increased as compared to an analysis of a few frames of video data, e.g., about 15 to about 300 mS. An intermediate reliability will be obtained with a delay of between about 300 to about 5000 mS. As stated above, the storage system for this determination need not be uncompressed nor lossless, so long as features necessary to determine the character of the broadcast are present. However, it is preferred that for broadcast recording intended for later viewing, the storage be as accurate as possible, so that if a compression algorithm is implemented, it be as lossless as reasonable given the various constraints. The MPEG-2 standard would be applicable for this purpose, though other video compression systems are available.

In a preferred situation, approximately 5 minutes of broadcast material is analyzed in order to make a determination of the content. This broadcast material is stored in two media. First, it is stored in a format acceptable for viewing, such as videotape in a videotape recorder, or in digital video format, e.g., uncompressed, MPEG-2. Second, it is received in parallel by the computer control, where the data is subject to a number of recognition and characterization processes. These are performed in parallel and in series, to produce a stored extracted feature matrix. This matrix may contain any type of information related to the broadcast material, including an uncompressed signal, a compressed signal, a highly processed signal relating to information contained in particular frames and abstract features, spatially and temporally dissociated from the broadcast signal, yet including features included in the broadcast which relate to the content of the broadcast.

One possible method incorporates one or more digital signal processor based coprocessor elements, which may be present on, e.g. Nubus cards in the Macintosh Quadra 950, Apple Power PC, PCI card in Pentium-based MS-DOS/Windows 3.1, 3.11, 95, 98, NT computers (or Macintosh PCI-based computers), other Power PC based computers. These elements may be based on C-Cube CL550 (JPEG compression), Analog Devices ADSP-21020, Analog Devices ADSP-21060, AT&T (formerly American Telephone and Telegraph Co.) DSP32C, AT&T DSP3210, AMD 29000 series, Motorola DSP 96000ADS, Texas Instruments TMS 320C40, TMS 320C80, IBM Mwave, or other known devices. Other devices are also available from Analog Devices, AT&T, DSP Group, Motorola, NEC, SGS-Thomson, Sharp, Texas Instruments, Zilog, Zoran, and other vendors. See, EDN, May 11, 1995, pp. 40–106; Bursky, D., "Improved DSP ICs Eye New Horizons", Electronic Design, Nov. 11, 1993, pp. 69–82. DSP systems, which generally have an architecture optimized for the efficient and rapid execution of repetitive numeric calculations, are desirable for certain pattern recognition tasks, and may be provided as a tightly coupled parallel processing array to increase throughput.

A known board containing a DSP is the MacDSP3210 by Spectral Innovations Inc., containing an AT&T digital signal processor and an MC68020 CISC processor, and which uses the Apple Real-time Operating System Executive (A/ROSE) and Visible Cache Operating System (VCOS). It is preferred that the processors employed be optimized for image processing, because of their higher throughput in the present image processing applications, to process the video signals, and more other signal processors to analyze the audio signals. Of course, general purpose processors may be used to perform all calculations. An array processor, which may be interfaced with a Macintosh is the Superserver-C available from Pacific Parallel Research Inc., incorporating parallel Inmos Transputers. Such an array processor may be suitable for parallel analysis of the image segment and classification of its attributes.

Pattern recognition processing, especially after preprocessing of the data signal by digital signal processors and image compression engines, may also be assisted by logical inference engines, such as FUTURE (Fuzzy Information Processing Turbo Engine) by The Laboratory for International Fuzzy Engineering (LIFE), which incorporates multiple Fuzzy Set Processors (FSP), which are single-instruction, multiple data path (SIMD) processors. Using a fuzzy logic paradigm, the processing system may provide a best fit output to a set of inputs more efficiently than standard computational techniques, and since the presently desired result requires a "best guess", rather than a very accurate determination, the present interface is an appropriate application of this technology.

As noted above, these processors may also serve other functions such as voice recognition for the interface, or extracting text from video transmissions and interpreting it. It is also noted that, while some of these coprocessing engines are now costly, these costs are decreasing and the present invention therefore includes the use of sophisticated present designs as well as future devices that may be used to perform the stated functions. The continued development of optical computers may also dramatically reduce the cost of implementing this aspect of the present invention; however, the present state of the art allows the basic functions to be performed. See attached appendix of references, incorporated herein by reference, detailing various optical computing designs.

A real time operating system may be employed, of which there are a number of available examples. Some older examples include SPOX DSP operating system, IBM's Mwave operating system and AT&T's VCOS operating system. These operating systems, and possibly others, are to be supported by Microsoft Inc.'s Windows 95 operating system Resource Manager function.

It is noted that various methods are available for determining a relatedness of two sets of data, such as an image or a representation of an image. These include the determination of Hausdorff distance, fuzzy correlation, arithmetic correlation, mean square error, neural network "energy" minimization, covariance, cross correlation, and other known methods, which may be applied to the raw data or after a transformation process, such as an Affine transformation, a Fourier transformation, a Gabor transformation, a warping transformation, a color map transformation, and the like. Further, it is emphasized that, in image or pattern recognition systems, there is no need that the entire image be correlated or even analyzed, nor that any correlation be based on the entirety of that image analyzed. Further, it is advantageous to allow redundancy, so that it is not necessary to have unique designations for the various aspects of the data to be recognized, nor the patterns to be identified as matching the uncharacterized input data.

The MSHELL from Applied Coherent Technology is a software system that runs on a Mercury MC3200 array processor, in conjunction with a Data Translation DT2861 or DT2862. The NDS1000 Development System from Nestor, Inc., provides image recognition software which runs on a PC compatible computer and a Data Translation DT2878.

The C-Cube CL550 is disclosed in "C-Cube CL550 JPEG Image Compression Processor", Preliminary Data Book, August 1991, and addendum dated Nov. 20, 1991, and products incorporating the CL550 include the JPEG Video Development Kit (ISA bus card with Chips and Technologies PC video 82C9001A Video Window Controller), and the C-Cube CL550 Development Board/PC for ISA Bus (CL550, for use with Truevision TARGA-16 or ATVista cards) or for NuBus (Macintosh). The so-called C-Cube "CL950" is a MPEG decoder device. Such a device as the CL950 may be particularly useful for use in the present VCR for reproducing compressed program material, which may be compressed by the present apparatus, or may be used for decompressing pre-compressed program material. Other MPEG-1 and MPEG-2 encoding and decoding devices are known.

It is noted that all functions of a VCR would also be facilitated by the use of such powerful processors, and thus it is not only these advanced functions that are enabled by these advanced processors and coprocessors. It is also noted that these image recognition functions need not necessarily all be executed local to the user, and may in fact be centralized with resultant processed data transmitted to the remote user. This would be advantageous for two reasons: first, the user need not have an entire system of hardware localized in the VCR, and second, many of the operations which must be performed are common to a number of users, so that there is a net efficiency to be gained.

EXAMPLE 13

Intelligent Adaptive VCR Interface

The interface of the present invention incorporates an intelligent user interface level determination. This function analyzes the quality of the user input, rather than its content. Thus, this differs from the normal interface user level determination that requires an explicit entry of the desired user level, which is maintained throughout the interface until explicitly changed. The present interface may incorporate the "smart screen" feature discussed above, which may, through its analysis of the past user interaction with the interface predict the most likely predicted user input function. Thus, the predictive aspects of the present invention may be considered a related concept to the intelligent user level interface of the present invention. However, the following better serves to define this aspect of the invention.

The input device, in addition to defining a desired command, also provides certain information about the user which has heretofore been generally ignored or intentionally removed. With respect to a two-dimensional input device, such as a mouse, trackball, joystick, etc., this information includes a velocity component, an efficiency of input, an accuracy of input, an interruption of input, and a high frequency component of input. This system is shown schematically in FIG. 21, which has a speed detector 2104, a path optimization detector 2105, a selection quality detector 2106, a current programming status 2108, an error counter 2109, a cancel counter 2110, a high frequency signal component detector 2112, an accuracy detector 2113 and a physio-dynamic optimization detector 2114. In addition, FIG. 21 also shows that the interface also uses a past user history 2107, an explicit user level choice 2111 and an explicit help request 2115.

This list is not exclusive, and is somewhat dependent on the characteristics of the specific input device. For a mouse, trackball, or other like device, the velocity or speed component refers to the speed of movement of the sensing element, i.e. the rotating ball. This may also be direction sensitive, i.e., velocity vector. It is inferred that, all other things being equal, the higher the velocity, the more likely that the user "knows" what he is doing.

The efficiency of input refers to two aspects of the user interface. First, it refers to the selection of that choice which most simply leads to the selection of the desired selection. For example, if "noon" is an available choice along with direct entry of numbers, then the selection of "noon" instead of "12:00 p.m." would be more efficient. The second aspect of efficiency has to do with the path taken by the user in moving a graphic user interface cursor or input device from a current position to a desired position. For example, a random curve or swiggle between locations is less efficient than a straight line. This effect is limited, and must be analyzed in conjunction with the amount of time it takes to move from one location of a cursor on the screen to another; if the speed of movement is very rapid, i.e. less than about 400 mS for a full screen length movement, or less than about 300 mS for small movements, then an inefficiency in path is likely due to the momentum of the mouse and hand, momentum of the rolling ball, or a physiological arc of a joint. This aspect is detected by the physio-dynamic optimization detector 2114. Thus, only if the movement is slow, deliberate, and inefficient, should this factor weigh heavily. It is noted that arcs of movement, as well as uncritical damping of movement around the terminal position may be more efficient, and a straight path actually inefficient, so that the interface may therefore calculate efficiency based on a complex determination, and act accordingly where indicated.

Thus, an "efficient" movement would indicate an user who may work at a high level, and conversely, an inefficient movement would indicate a user who should be presented with simpler choices. The efficiency of movement is distinguished from gestures and path dependent inputs, such as drawing and painting. These may be distinguished based on machine status or context. Further, the interface may recognize gestures in may contexts. Therefore, gesticulations must be distinguished from command inputs before further processing. Gesticulations, like path efficiency, may also be analyzed separately from the basic command input, and therefore may be provided as a separate input stream on an interface level rather than an application level, thus allowing cross application operation.

Likewise, if a movement is abrupt or interrupted, yet follows an efficient path, this would indicate a probable need for a lower user interface level. This would be detected in a number of elements shown in FIG. 21, the speed detector 2104, a high frequency signal component detector 2112, an accuracy detector 2113 and a physio-dynamic optimization detector 2114. In addition, FIG. 21 also shows the use of a past user history 2107, an explicit user level choice 2111 and an explicit help request 2115.

While the interface may incorporate screen buttons that are smart, i.e. those that intelligently resolve ambiguous end locations, the accuracy of the endpoint is another factor in determining the probable level of the user. Thus, for example, if a 14" color monitor screen is used, having a resolution of 640 by 480 pixels, an accurate endpoint location would be within a central area of a screen button of size about 0.3" by about 1.0", would be an area of about 0.25" by about 0.75". A cursor location outside this location, but inside the screen button confines would indicate an average user, while a cursor location outside the screen button may be inferred to indicate the button, with an indication that the user is less experienced in using the pointing device.

Finally, in addition to the efficiency of the path of the cursor pointing device, a high frequency component may be extracted from the pointer signal by the high frequency signal component detector 2112, which would indicate a physical infirmity of the user (tremor), a distraction in using the interface, indecision in use, or environmental disturbance such as vibration. In this case, the presence of a large amount of high frequency signal indicates that, at least, the cursor movement is likely to be inaccurate, and possibly that the user desires a lower user level. While this is ambiguous based on the high frequency signal content alone, in conjunction with the other indicia, it may be interpreted. If, for example, the jitter is due to environmental vibrations, and the user is actually a high level user, then the response of the user level adjust system would be to provide a screen display with a lowered required accuracy of cursor placement, without necessarily qualitatively reducing the implied user level of the presented choices, thus, it would have an impact on the display simplification 2103, with only the necessary changes in the current user level 2101.

Alternatively, the user may input a gesture, i.e., a stylized input having no other command input meaning, which may be detected by analyzing the input. The input may be a manual input, voice, image or the like. A number of different gestures may be recognized. These gestures are generally explicit inputs, which allow a voluntary action to be interpreted as input information to the interface.

EXAMPLE 14

Intelligent Telephone Device Interface

Likewise, the present interface could be used to control complex telecommunications functions of advanced telephone and telecommunications equipment. In such a case, the user display interface would be a video display, or a flat panel display, such as an LCD display. The interface would hierarchically present the available choices to the user, based on a probability of selection by the user. The input device would be, for example, a small track ball near the keypad. Thus, simple telephone dialing would not be substantially impeded, while complex functions, such as call diversion, automated teledictation control, complex conferencing, caller identification-database interaction, and videotel systems, could easily be performed.

EXAMPLE 16

Character Recognition of Video

The present invention may incorporate character recognition from the video broadcast for automatic entry of this information. This is shown schematically in FIG. 24, with the inclusion of the videotext and character recognition module 2414. This information is shown to be transmitted to the event characterization unit 2407, where the detected information is correlated with the other available information. This information may also be returned to the control 2402. Examples of the types of information that would be recognized are titles of shows, cast and crew from programming material, broadcast special alerts, time (from digital display on special access channels), stock prices from "ticker tape" on special access channels, etc. Thus, this technology adds functionality to the interface. In addition, subtitled presentations could be recognized and presented through a voice synthesizer, to avoid the necessity of reading the subtitle. Further, foreign language subtitles could be translated into, e.g., English, and presented. In a particular embodiment, certain game shows, such as "Wheel of Fortune" have alphanumeric data presented as a part of the programming. This alphanumeric text may be extracted from the image.

In a preferred embodiment, the character recognition is performed in known manner on a buffer memory containing a frame of video, from a device such as a Data Translation DT2851, DT2853, DT2855, DT2867, DT2861, DT2862 and DT2871. A contrast algorithm, run on, for example, a Data Translation DT2858, DT2868, or DT2878, first removes the background, leaving the characters. This works especially well where the characters are of a single color, e.g. white, so that all other colors are masked. After the "layer" containing the information to be recognized is masked, an algorithm similar to that used for optical character recognition (OCR) is employed. See, U.S. Pat. No. 5,262,860, incorporated herein by reference. These methods are well known in the art. This may be specially tuned to the resolution of the video device, e.g. NTSC, Super Video Home System (S-VHS), High Definition Television and/or Advanced Television System Committee (HDTV/ATSC-various included formats), Improved definition television (IDTV), Enhanced Definition Television (EDTV), Multiple Sideband Encoding (MUSE), Phase Alternate Line (PAL), Sequential Coleur a Memoire (SECAM), MPEG-2 digital video, or other analog or digital transmission and/or storage formats, etc. In addition, since the text normally lasts for a period in excess of one frame, a spatial-temporal image enhancement algorithm may be employed to improve the quality of the information to be recognized, if it is indistinct in a single frame.

EXAMPLE 17

Smart House Interface

The present invention may also be incorporated into other types of programmable controls, for example those necessary or otherwise used in the control of a smart house. See, "The Smart House: Human Factors in Home Automation", Human Factors in Practice, December 1990, 1–36. The user interface in such a system is very important, because it must present the relevant data to the user for programming the control to perform the desired function. A smart house would likely have many rarely used functions, so that both the data and the available program options must be presented in the simplest manner consistent with the goal of allowing the user to make the desired program choice. For example, a smart house system with appropriate sensors might be used to execute the program: "start dishwasher, if more than half full, at 9:00 p.m." This program might also include a program to load soap into the dishwasher or to check if soap is already loaded. A user who wishes to delay starting until 11:00 p.m. would be initially presented with the defaults, including start time as an option, which would be simply modified by correcting the starting time. The next time the same user wishes to program the device, an algorithm might change the predicted starting time to, e.g. 10:00 p.m., which is a compromise between the historical choices. Alternatively, the new predicted start time might be 11:00 p.m., the last actually programmed sequence. Finally, the next predicted start time might remain at 9:00 p.m. The resolution of these choices would depend on a number of factors: a preprogrammed expert system; any other prior history of the user, even with respect to other appliances or in other situations; the context, meaning any other contemporaneously programmed sequences; and an explicit input from the user as to how the inputs should be evaluated for predictive purposes.

The expert system would balance factors, including disturbing noise from the dishwasher, which might be objectionable while persons are near the dishwasher, people are sleeping, or during formal entertainment. On the other hand, if the dishwasher is full, or its cleaned contents are needed, the dishwasher should run. Some persons prefer to reshelve dishes in the evening, before sleep, so in those cases, the dishwasher should complete its cycle before bedtime. The dishwasher, on a hot water cycle, should not run during showers or baths, and preferably should not compete with a clothes washer for hot water. The dishwasher preferably does not run during peak electrical demand times, especially if electrical rates are higher. Water conserving cycles should be selected, especially during droughts or water emergencies. If dishes remain in the dishwasher for an extended period, e.g., overnight, a moistening cycle may be employed to help loosen dirt and to help prevent drying. Thus, the expert system is preprogrammed for a number of high level considerations that might be common to a large number of users of the system, thus shortening the required training time of the system to learn the preferences of the user. Such a sophisticated system may eliminate the need entirely for adaptive responses, based on weighing of considerations provided by the user. Of course, other considerations may also be included for the operation or delay of operation of the dishwasher. Further, these considerations are exemplary of the types of considerations which might be employed in an expert system in a smart house.

The prior history of the user provides an excellent source of information regarding the preferences of the user, although this is sometimes not the most efficient means, and may often include contradictory data. This historical use data is therefore analyzed in a broad context in order to extract trends, which over a number of uses may be further extracted as "rules". Often, the user history data will be applied at a high level, and will interact with preexisting rules of the expert system, rather than to create new rules. In this case, the expert system preferably includes a large number of "extra rules", i.e., those with an a priori low probability or low weighing, providing a template for future pattern matching. The past history may be evaluated in a number of ways. First, an expert system may be used to analyze the past usage pattern. Second, a neural network may be trained using the historical data along with any corrective feedback. Third, the historical data may be used to alter fuzzy logic rules or classifications, either by expert system, neural network, or by other known means.

The context of use may also be used to determine a desired or predicted action. Therefore, if on a single occasion, a number of changes are made, for example during a large house party, the standard predictions would not be altered, and thus a normal program would remain in effect. Of course, a new "house party" sequence would then be recognized and included as a new type of sequence for future evaluation. For example, a house party sequence might encompass a number of house systems. Thus, the delay of dishwasher until 11:00 p.m. allows all dishes from the party to be placed in the dishwasher before starting. An alarm system would be generally deactivated, although various zones may be provided with different protection; e.g., a master suite may be off-limits, with an alarm transmitting a signal to a user's beeper, rather than a call to police or alarm service company. During the summer, the air conditioner might run even if doors and windows are open, even if the normal program prompts for door closings before the air conditioner is turned on. Likewise, exterior lighting would be turned on at dusk, with bug lights turned on during the entire party. The user might individually make such decisions, which would be recognized as a group due to their proximity in time, or delineate the actions as a group. Thereafter, where some of these choices are made, and the profile of choices matches a "party" style, the remainder of the choices may be presented as a most likely or predicted choice. The group of choices together might also be selected from a menu of choices.

Context also relates to sensor data, which might include sensors in particular appliances or unrelated sensors. For example, infrared motion detectors may be used to estimate the number of persons present in a house. Likewise, heavy use of a bathroom, as detected by flushes, frequent light transitions or door openings, might also be useful as data to estimate a crowd size. Temperature sensors, video imaging sensors, perimeter sensors, electrical sensors relating to the status of appliances and machinery, and other types of sensors may provide data for context determination.

Of course, explicit inputs must also be accommodated, which may be atomic instructions or complex combinations of instructions which may control a single house system or a number of house systems simultaneously. The explicit input preferably comes by way of the adaptive interface described throughout the present application, or an interface incorporating particular aspects thereof.

The smart house system also controls the climate control system. Thus, it could coordinate temperatures, air flow and other factors, based on learned complex behaviors, such as individual movement within the dwelling. Since the goal of the programming of the smart house is not based on the storage of discrete information, but rather the execution of control sequences at various times and under certain circumstances, the control would differ in various ways from that of a VCR. However, the user interface system, adaptive user level, help system, and the like would be common to both types of system. This differs from the Fuzzy Logic controlled air conditioner available (in Japan) from Mitsubishi in that these prior art devices do not have an intelligent interface of the present invention. It should also be noted that the control for the VCR could be the same control as that for the smart house, so that the common elements are not redundant. Therefore, by applying a single control to many tasks, a common user interface is used, and the cost is reduced.

EXAMPLE 18

Programmable Environmental Controller

The present Example relates to a programmable environmental controller application. In this case, a sensor or sensor array is arranged to detect a change in the environment that is related to a climatic condition, such as an open door. On the occurrence of the door opening, the system would apply a pattern recognition analysis to recognize this particular sensor pattern, i.e. a mass of air at a different temperature entering the environment from a single location, or a loss of climate controlled air to a single location. These sensor patterns must be distinguished from other events, such as the action of appliances, movement of individuals in the vicinity of the sensor, a shower and other such events. It is noted that in this instance, a neural network based adaptive controller may be more efficient than a standard fuzzy logic system, because the installation and design of such a system is custom, and therefore it would be difficult to program fuzzy set associations a priori. In this case, a learning system, such as a neural network, may be more efficient in operation and produce a better result than other adaptive methods. The training procedure may be fully automated, (with manual feedback provided where necessary to adjust the control parameters) so long as sufficient sensors are provided for controlling the system, and also that an initial presumption of the control strategy is workable during the training period. In the case of an HVAC system, the initial strategy incorporated is the prior art "bang—bang" controller, which operates as a simple thermostat, or multi-zone thermostat. As a better starting point, a fuzzy logic temperature controller may be modeled and employed. Other known strategies that are not often used in environmental control include the proportional-integral-differential controller (PID).

It is noted that the HVAC system may also be of a type that is inoperable with standard type controllers: for example, the system may be such as to produce temperature oscillations, or significant temperature or pressure gradients. In this case, the default control system must be provided to compensate the system, allowing more subtle corrections and adjustments to be made based on preferences. Thus, an expert system is provided, which is updated based on user input, and which receives context information, including sensor data and other inputs. Explicit user preferences and programming are also input, preferably with an interface in accordance with the present invention or incorporating aspects thereof.

In this example, which may be described with reference to FIG. 23, sufficient sensors in a sensor array 2301 are provided, being light, temperature, humidity, pressure, air flow and possibly a sensor for determining an event proximate to the sensor, such as door opening. While a single sensor array 2301 provides input to the present control, a plurality of sensor arrays are preferably employed in complex installations, such as that described here. The sensors, with the possible exceptions of the flow sensor and event sensor, are housed in a single sensor head. Further, the temperature and pressure sensors may be combined in a single integrated circuit by known means. The light and temperature sensors are known to those skilled in the art, and need not be described herein. The pressure sensor may be a Sensym strain gage pressure transducer, a Motorola pressure transducer device, or the like, which are known in the art. Alternatively, other types of sensors may be used, for example a micromachined silicon force balance pressure transducer, similar in electrical design to the Analog Devices monolithic accelerometers, ADXL-50 or ADXL-05.

The humidity sensor is preferably an electronic type, producing an electrical signal output. It need not be internally compensated for the other measured environmental factors, as the constellation of sensors may compensate each other. The air flow sensor may be based on pressure differentials, using the electronic pressure sensor described above, or may be a mechanical vane type, which is based on flows. In most applications, a single flow axis will be sufficient, however, in some circumstances, a two or greater axis sensor will be required. Further, in the case of large volume areas, complex turbulent flow patterns may be relevant, for which known sensors exist. Laser based air flow sensors may be employed, if desired. LIDAR sensors may be used to determine flow rate, direction, and turbulence.

The event sensor may be of any type, and depends particularly on the event being measured. In the present case, where a door opening is to be detected, it is preferred that the environmental control be interfaced with a perimeter intrusion alarm system, which, for example, provides a magnet embedded in the door and a magnetic reed switch in the door frame. Individual sensors are normally wired to the alarm control panel, thus providing central access to many or all of the desired event detection sensors while minimizing the added cost. The event detector may also be an ultrasonic, infrared, microwave-Doppler, mechanical, or other type of sensor. Wireless sensors may also be used, communicating via infrared beams, acoustic, radio frequency, e.g., 46–49 MHz, 900 MHz, or other bands, using analog, digital or multilevel quantized digital AM, FM, PSK, QAM, or other modulation scheme, or a combination thereof. Spread spectrum devices may be employed, as well as time, code or frequency multiplexing or a combination thereof. Various failsafe mechanisms are preferably included, including those identifying transmitter or receiver failure, communication interference or message collision, and other conditions. A reverse communication channel may also be included, either symmetric in band, or asymmetric in band or out of band, for communication with the sensor or apparatus associated with the sensor, and as part of the failsafe system. A forward error correction protocol is preferably effected, which may detect errors and include error correcting codes for digital transmissions. Digital data may be encrypted, and the transmission modulation scheme may also include an encrypted sequence of frequency, phase, convolution, noise, or other modulation parameter.

While wireless data transmission as described above may be used, the preferred method of receiving sensor information is through a serial digital or analog (i.e., 4–20 mA transmitter) data transmission which may be multiplexed and/or part of a local area network scheme, with minimal local processing of the sensor data by the microprocessor 2302 with the serial link 2302a in the sensor head. Such serial digital protocols and physical transport layers include Echelon LON-works, BSR X-10, CEBUS, RS-232, RS-423, Apple ADB, Appletalk, Ethernet (10 base T, 10 Base 2, 10 base 5, 100 Base T, 100 base VG), ATM, USB, IEEE-1394, Homerun (Intel/Tut), etc. This system allows the central control 2303 to incorporate the desired processing, e.g., by the pattern recognition system 2304, etc., while minimizing the installation expense. A simple microprocessor device 2302 in the sensor head interfaces the sensing elements, and may provide analog-to-digital conversion, or other conversion which may be necessary, of the sensor signal. In the case of a serial digital data transmission, the local microprocessor formats the sensor data, including a code indicating the sensor serial number and type, the sensor status (i.e., operative, defective, in need of maintenance or calibration, etc.), the sensor data, and an error correcting code. In the case that the data is transmitted on a local area network, the microprocessor also arbitrates for bus usage and the messaging protocol.

The control, it must be understood, has a number of available operative systems at its disposal, comprising the plant 2306. In this case, the system is a forced air heating and cooling system. This system has a heating unit, a humidifier, blowers, a cooling unit (which also dehumidifies), ducts, dampers, and possible control over various elements, such as automated door openers.

As described above, the system is installed with a complete array of sensors, some of which may be shared with, or a part of, other control systems in the environment, and begins operation with a basic acceptable initial control protocol. The system then receives data from the sensors, and correlates data from the various sensors, including the event sensors, with the operation of the systems being controlled. In such a case, a "door open" event may be correlated with a change in other measured variables. The system then correlates the control status with the effect on the interrelation of the measured variables. Thus, the system would detect that if the blower is operating while the door is open, then there is a high correlation that air will flow out of the door, unless a blower operates to recirculate air from a return near the door. Thus, the system will learn to operate the proximate return device while the door is open and the blower is on. Once this correlation is defined, the system may further interrelate the variables, such as a wind speed and direction outside the door, effects of other events such as other open doors, the absolute and relative speeds of the blowers and the return device, the effect of various damper devices, etc. It is further noted that, under some circumstances, an exchange of air through an open door is desired, and in such instance, the system may operate to facilitate the flow through such an open door. Finally, the system must be able to "learn" that conditions may exist which produce similar sensor patterns which should be handled differently. An example is a broken, defective or inoperative sensor. In such a case, the system must be able to distinguish the type of condition, and not execute an aggressive control algorithm in an attempt to compensate for an erroneous reading or otherwise normal event. This requires the intelligent control of the present invention. In order to distinguish various events, sensors which provide overlapping or redundant information, as well as providing a full contextual overview, should be provided as a part of the system.

It is further noted that energy efficiency is a critical issue in climate control systems, and an absolute and continuous control over the internal environment may be very inefficient. Thus, the starting of large electrical motors may cause a large power draw, and simultaneous starting of such equipment may increase the peak power draw of a facility, causing a possible increase in the utility rates. Further, some facilities may operate on emergency or private power generation (co-generation) which may have different characteristics and efficiency criteria. These factors may all be considered in the intelligent control. It is also noted that a higher efficiency may also be achieved, in certain circumstances, by employing auxiliary elements of the climate control system which have a lower capacity and lower operating costs than the main elements. Thus, for example, if one side of a building is heated by the sun, it may be more efficient to employ an auxiliary device which suitably affects, i.e. compensates, only a part of the building. If such equipment is installed, the aggregate efficiency of the system may be improved, even if the individual efficiency of an element is lower. Likewise, it may be preferable to run a 2□ ton air conditioning unit continuously, rather than a 5 ton air conditioning unit intermittently. The present intelligent control allows a fine degree of control, making use of all available control elements, in an adaptive and intelligent manner.

Returning to the situation of a door opening event, the system would take appropriate action, including: interruption of normal climate control until after the disturbance has subsided and normal conditions are achieved; based on the actual climatic conditions or predicted climatic conditions begin a climate compensation control, designed to maximize efficiency and also maintain climatic conditions during the disturbance, as well as return to normal after the disturbance; optionally, during the door opening disturbance, the system would control a pressure or flow of air to counterbalance a flow through the door, by using a fan, blower or other device, or halting such a device, if necessary. It is also noted that the climatic control system could also be outfitted with actuators for opening and closing doors and windows, or an interface with such other system, so that it could take direct action to correct the disturbance, e.g., by closing the door. The climate between the internal and external ambients may differ in temperature, humidity, pollutants, or the like and appropriate sensors may be employed.

It is thus realized that the concepts of using all available resources to control an event, as well as using a predictive algorithm in order to determine a best course of action and a desired correction are a part of the present invention.

EXAMPLE 19

Remote Control Hardware

A remote control of the present invention may be constructed from, for example, a Micromint (Vernon, Conn.) RTC-LCD, RTC-V25 or RTC-HC11 or RTC180 or RTC31/52, and RTC-SIR, in conjunction with an infrared transmitter and receiver, input keys and a compatible trackball, which may provide raw encoder signals, or may employ a serial encoder and have a serial interface to the processor module. A power supply, such as a battery, is used. The use, interfacing and programming of such devices is known to those skilled in the art, and such information is generally available from the manufacturer of the boards and the individual circuit elements of the boards. The function of such a remote control is to receive inputs from the trackball and keys and to transmit an infrared signal to the controller.

The processor and display, if present, may provide added functionality by providing a local screen, which would be useful for programming feedback and remote control status, as well as compressing the data stream from the trackball into a more efficient form. In this case, certain of the extracted information may be relevant to the determination of the user level, so that information related to the user level would be analyzed and transmitted separately to the controller by the infrared transmitter. If the local LCD screen is used in the programming process, then the main controller would transmit relevant information to the remote display, by a reverse-channel infrared link. These components are known in the art, and many other types may also be used in known manner.

In known manner, available personal digital assistants ("PDAs"), available from 3Com (Palm Pilot III), Microsoft Windows CE-based devices, Apple ("Newton" model 100, 110, 120), Tandy, Poquet, Sharp, Casio, AT&T (Eo 440), Hewlett-Packard, etc. may also be employed as a human interface device.

EXAMPLE 20

Medical Device Interface

The interface and intelligent control of the present invention are applicable to control applications in medicine or surgery. This system may also be described with reference to the generic system drawings of FIGS. 23 and 24. In this case, an operator identifies himself and enters information regarding the patient, through the interface 2305. The interface 2305 automatically loads the profile 2406 of both the operator and the patient, if the device is used for more than one at a time, and is connected to a database containing such information, such as a hospital central records bureau. The interface may be connected to various sensors, of the input device 2401, such as ambient conditions (temperature, humidity, etc.), as well as data from the patient, such as electrocardiogram (EKG or ECG), electromyograph (EMG), electroencephalogram (EEG), Evoked Potentials, respirator, anesthesia, temperature, catheter status, arterial blood gas monitor, transcutaneous blood gas monitor, urinary output, intravenous (IV), intraperitoneal (IP), Intramuscular (IM), subcutaneous (SC), intragastric or other types of solutions, pharmaceutical and chemotherapy administration data, mental status, movement, pacemaker, etc. as well as sensors and data sources separate from the patient such as lab results, radiology and medical scanner data, radiotherapy data and renal status, etc. Based on the available information, the interface 2405, using the simple input device and the display screen described above, presents the most important information to the operator, along with a most probable course of action. The user then may either review more parameters, investigate further treatment options, input new data, or accept the presented option(s). The system described has a large memory in the signal analysis module 2409 for recording available patient data from the signal receiver 2408, and thus assists in medical record keeping and data analysis, as well as diagnosis. While various systems are available for assisting in both controlling medical devices and for applying artificial intelligence to assist in diagnosis, the present system allows for individualization based on both the service provider and the patient. Further, the present invention provides the improved interface for interaction with the system.

It is further noted that, analogously to the library function discussed above, medical events may be characterized in the characterization unit 2407 and recorded by the plant 2404, so that a recording of the data need not be reviewed in its entirety in order to locate a particular significant event, and the nature of this event need not be determined in advance. It is also noted that the compression feature of the recorder of the present invention could be advantageously employed with the large volume of medical data that is often generated. Medical data image data may be compressed as known in the art, by standard image compression techniques, and/or image compression techniques optimized for radiology, nuclear medicine and ultrasonography data. Other types of data may be compressed using lossless algorithms, or by various vector quantization, linear excited models, or fractal compression methods. It is finally noted that, because of its ability to store and correlate various types of medical data in the characterization unit 2407, the system could be used by the operator to create notes and discharge summaries for patients, using the database stored in the local database 2413, as well as the user history and preferences 2406. Thus, in addition to saving time and effort during the use of the device, it would also perform an additional function, that of synthesizing the data, based on medical significance.

In addition to providing the aforementioned intelligence and ease of use, the present example also comprises a control 2402, and may interface with any of the sensors and devices, performing standard control and alarm functions. However, because the present control 2402 is intelligent and has pattern recognition capability, in addition to full data integration from all available data sources, it may execute advanced control functions. For example, if the present control 2402 is interfaced to a controlled infusion pump for, e.g., morphine solution, in e.g., a terminally ill patient, then certain parameters must be maintained, while others may be flexible. For example, a maximum flow rate is established as a matter of practice as a safety measure; too high a flow rate could result in patient death. However, a patient may not need a continuous infusion of a constant dose of narcotic. Further, as the patient's status changes, the level of infusion may be advantageously altered. In particular, if the renal status of the patient were to change, the excretion of the drug may be impaired. Therefore, by providing the controller with a urinary output monitor, it could immediately suppress the morphine infusion as soon as the renal output is recognized as being decreased, and further indicate an alarm condition. Further, it may be advantageous to provide a diurnal variation in the infusion rate, to provide a "sleep" period and a period of heightened consciousness with correspondingly lower levels of narcosis. Where various tests, procedures or interviews are scheduled, an appropriate level of narcosis and/or analgesia may also be anticipatorily provided at an appropriate time.

As another example of the use of the present device as a medical controller, the control 2402 could be interfaced with a cardiac catheter monitor, as a part of the signal receiver 2408. In such a case, normally, alarms are set based on outer ranges of each sensor measurement, and possibly a simple formula relating two sensor measurements, to provide a useful clinical index. However, by incorporating the advanced interface and pattern recognition function of the present invention, as well as its ability to interface with a variety of unrelated sensors, the present device, including the present control, may be more easily programmed to execute control and alarm functions, may provide a centralized source of patient information, including storage and retrieval, if diverse sources of such information are linked, and may execute advanced, adaptive control functions. The present control 2402 is equipped to recognize trends in the sensor data from the signal receiver 2408, which would allow earlier recognition and correction of various abnormal conditions, as well as recognizing improvements in conditions, which could allow a reduction in the treatment necessary. Further, by allowing a fine degree of control, parameters may be maintained within optimal limits for a greater percentage of the time. In addition, by monitoring various sensors, various false alarms may be avoided or reduced. In particular, false alarms may occur in prior art devices even when sensors do not indicate a dangerous condition, merely as a safety precaution when a particular parameter is out of a specified range. In such a case, if a cause of such abnormal condition may be identified, such as patient movement or the normal activities of the patient's caretakers, then such condition may be safely ignored, without indicating an alarm. Further, even if a sensor parameter does in and of itself indicate a dangerous condition, if a cause, other than a health risk, may be identified, then the alarm may be ignored, or at least signaled with a different level of priority. By providing an intelligent and active filter for false alarm events, the system may be designed to have a higher level of sensitivity and specificity to real health risks, and further to provide a finer level of control based on the sensor readings, with fewer false positive readings.

EXAMPLE 21

Securities Trading Terminal Interface

The present invention is also of use in automated securities, debt, variable yield and currency trading systems, where many complex functions are available, yet often a particular user under particular circumstances will use a small subset of the functionality available at a given time. Such a situation would benefit from the present interface, which provides adaptive user levels, prioritized screen information presentation, and pattern recognition and intelligent control. A securities trading system is disclosed in U.S. Pat. No. 5,034,916, for a mouse driven Fast Contact Conversational Video System, incorporated herein by reference. The present system relates primarily to the user terminal, wherein the user must rapidly respond to external events, in order to be successful. In such a case, the advantages of the application of an interface according to the present invention are obvious, and need not be detailed herein. However, the pattern recognition functions of the present invention may be applied to correspond to the desired actions of the trader, unlike in prior intelligent trading systems, where the terminal is not individually and adaptively responsive to the particular user. Thus, the system exploits the particular strengths of the user, facilitating his actions, including: providing the desired background information and trading histories, in the sequence most preferred by the user; following the various securities to determine when a user would execute a particular transaction, and notifying the user that such a condition exists; monitoring the success of the user's strategy, and providing suggestions for optimization to achieve greater gains, lower risk, or other parameters which may be defined by the user. Such a system, rather than attempting to provide a "level playing field" to all users of like terminals, allows a user to use his own strategy, providing intelligent assistance. By enhancing the interface, a user becomes more productive with fewer errors and faster training.

EXAMPLE 22

Fractal Theory Pattern Recognition

Affine transforms are mathematical manipulations of data in two dimensions, wherein the manipulation comprises a rotation, scaling and a displacement for each of the two coordinates. Schroeder, M., *Fractals, Chaos, Power Laws*, W. H. Freeman & Co., New York (1991). Of course, Affine transforms of higher dimensionality may also be employed. In describing an image using Affine transforms, the degree of matching between an image and the mathematical description of that image may be related by a number of iterations, and the fewer the iterations, the less data used to describe the image. Of particular importance in the field of graphics is the speed of "convergence", i.e., that a relatively few iterations are necessary in order to describe an image with sufficient precision to be visually useful. Therefore, the Affine transform mathematical specifications may be far more compact than the raw image data, and these specifications compare favorably to other types of image compression, such discrete cosine transformation (DCT) compression schemes, including JPEG, depending on a number of factors.

Because the Affine transform may be used to produce a compact visual description of an image, among other reasons, the present invention applies this transform to a pattern matching system for analyzing image contents.

Pattern recognition, in this case, may proceed on an image basis, to match similar images, or on an object basis, in which portions of images are matched. It is preferred that the pattern matching system be robust, i.e., tolerant of various alterations of an image, artifacts, interference and configurational changes, while specific enough to allow object differentiation.

In the case of video images, therefore, it is preferred that various two-dimensional projections of three-dimensional objects, in various "poses", be classified the same. This therefore requires that, in analyzing a two-dimensional image, the object be extracted from a background image and separated from other objects. Further, degrees of freedom may be determined, such as through analysis of a sequence of frames to reveal relative motion or change of portions of the object with respect to other portions. Finally, the object in the image must be compared to three dimensional models, through various projections.

In the case of two dimensional image analysis, the image should be analyzed according to a robust starting criteria, so that the similarity of images may be determined by comparison of normalized Affine transformation coefficients.

Fractal analysis, the study of self-similarity, and a superset of Affine transformation, allows a compact representation of an image or an object in an image, and due to its encompassing of various spatial relationships of object parts, allows normalized transforms to be compared. In other words, assuming that the object is extracted from a background scene, and various degrees of freedom are identified, an Affine transformation may be applied, which will yield a similar result for an image of the same object in a different "pose", i.e., with different exercise of its degrees of freedom. While in general, Affine transformations are described with respect to two-dimensional images, these may also be applied to three dimensional images. Thus, if a triangular polygon is rotated, scaled and displaced in a two dimensional image, a tetrahedron is rotated, scaled and displaced in a three dimensional system. Further, analogies may also be drawn to the time dimension (although geometric forms which are rotated, scaled and displaced over time are not given trivial names). Because, in a contractive Affine transformation (one in which the scaling factor of successive iterations is less than 1), continued iterations are less significant, objects described with varying level of detail may be compared. Even images which are not normalized may still be compared, because at every level of the transform, slight changes in rotation, scale and displacement are accounted for.

According to the present invention, nonlinear self-similarity may also be used. Further, in objects having more than two dimensions, linear scaling other than rotation, scaling and displacement may be described.

It is noted that many types of optical computers, especially those including holographic elements, employ transformations similar to Affine transformations. Therefore, techniques of the present invention may be implemented using optical computers or hybrid optical-electronic computers.

Thus, according to the present invention, the fractal method employing Affine transforms may be used to recognize images. This method proceeds as follows. A plurality of templates are stored in a memory device, which represent the images to be recognized. These templates may be preprocessed, or processed in parallel with the remainder of the procedure, in a corresponding manner. Image data, which may be high contrast line image, greyscale, or having a full color map, the greyscale being a unidimensional color map, is stored in the data processor, provided for performing the recognition function.

The image is preprocessed to extract various objects from the background, and to separate objects. This preprocessing may be performed in standard manner. The method of U.S. Pat. No. 5,136,659, incorporated herein by reference, may also be used. As a part of this preprocessing, a temporal analysis of the object through a series of image frames, is performed to provide four dimensional data about the object, i.e., the two dimensions from the image, a third image imputed from differing perspective views of the object, and time. Certain objects may be immediately recognized or classified, without further processing. Further, certain objects, without full classification or identification, may be "ignored" or subjected to a lesser level of final processing. During the classification processing, various objects may be selected for different types of processing, for example, people, automobiles, buildings, plants, etc.

After classification, and temporal analysis, an object for further processing is analyzed for degrees of freedom, i.e., joints of a person, moving parts of an object, etc. These degrees of freedom may then be corrected, e.g., the object itself altered, to change the image into a standard format, or the degree of freedom information processed with the object to allow mathematical normalization without actual change of the image.

The information describing the object image is stored. A plurality of addressable domains are generated from the stored image data, each of the domains representing a portion of the image information. As noted above, the entire image need not be represented, and therefore various objects separately analyzed. Further, only those parts of the image or object necessary for the recognition, need be analyzed. While it may be unknown which image components are unnecessary, sometimes this may be determined.

From the stored image data, a plurality of addressable mapped ranges are created, corresponding to different subsets of the stored image data. Creating these addressable mapped ranges, which should be uniquely addressable, also entails the step of executing, for each of the mapped ranges, a corresponding procedure upon the one of the subsets of the stored image data which corresponds to the mapped ranges. Identifiers are then assigned to corresponding ones of the mapped ranges, each of the identifiers specifying, for the corresponding mapped range, a procedure and a address of the corresponding subset of the stored image data.

To ensure comparability, the processing treatment of the template and the image data are analogous. Of course, template data may be stored in preprocessed form, so that the image data need only be processed according to the same rules. The domains are optionally each subjected to a transform, which may be a predetermined rotation, an inversion, a predetermined scaling, and a displacement. Because of the nature of these linear superposable transforms, the earliest iterations will include data about gross morphology, later iterations will include data about configuration, and latest iterations will include data about texture.

In addition, nonlinear alterations, and frequency, Gabor or wavelet transform preprocessing may be applied. A warping or other kind of transform may also be applied. These types of transforms are generally not included in Affine transform analysis, yet judiciously applied, may produce more rapid convergence, greater data storage efficiency, computational advantages or pattern matching advantages.

This transform is used to optimize the procedure, and also to conform the presentation of the image data with the template, or vice versa. Each of the domains need not be transformed the same way, and in fact it is the transform coefficients which are stored to describe the transformed object, so that differences in coefficients relate to differences in objects.

For each of the domains or transformed domains, as may be the case, the one of the mapped ranges which most closely corresponds according to predetermined criteria, is selected. The image is then represented as a set of the identifiers of the selected mapped ranges.

Finally, from the stored templates, a template is selected which most closely corresponds to the set of identifiers representing the image information. This matching process is optimized for the data type, which is a string of iterative transform coefficients, of a contractive transform.

It is preferred that, for each domain, a most closely corresponding one of the mapped ranges be selected. By performing analogous operations on a template and an unrecognized object in an image, a correspondence between the two may be determined. Thus, libraries of template image portions may be provided, with associated transform information, which may increase the computational efficiency of the system.

In selecting the most closely corresponding one of the mapped ranges, for each domain, the mapped range is selected which is the most similar, by a method which is appropriate, and may be, for example, selecting minimum Hausdorff distance from the domain, selecting the highest cross-correlation with the domain, the minimum mean square error with the domain and selecting the highest fuzzy correlation with the domain, based on rules which may be predetermined. Neural network energy minimization may also yield the best fit, and other techniques may also be appropriate.

In particular, the step of selecting the most closely corresponding one of mapped ranges according to the minimum modified Hausdorff distance includes the step of selecting, for each domain, the mapped range with the minimum modified Hausdorff distance calculated as D[db,mrb]+D[1−db,1−mrb], where D is a distance calculated between a pair of sets of data each representative of an image, db is a domain, mrb is a mapped range, 1−db is the inverse of a domain, and 1−mrb is an inverse of a mapped range.

It is important that the selection criteria be tolerant to variations of the type seen in image data, e.g., video, so that like objects have similar transforms. Thus, the selection criteria is not particularly directed to optimal data compression, although the two criteria may coincide for some types of data.

In the case where the digital image data consists of a plurality of pixels, each having one of a plurality of associated color map values, the method includes a matching of the color map, which as stated above, encompasses a simple grey scale, natural color representation, and other color types. In such a case, the method is modified to optionally transform the color map values of the pixels of each domain by a function including at least one scaling function, for each axis of the color map, each of which may be the same or different, and selected to maximize the correspondence between the domains and ranges to which they are to be matched. For each of the domains, the one of the mapped ranges having color map pixel values is selected which most closely corresponds to the color map pixel values of the domain according to a predetermined criteria, wherein the step of representing the image color map information includes the substep of representing the image color map information as a set of values each including an identifier of the selected mapped range and the scaling functions. The correspondence method may be of any sort and, because of the added degree of complexity, may be a different method than that chosen for non-color images. The method of optimizing the correspondence may be minimizing the Hausdorff distance or other "relatedness" measurement between each domain and the selected range. The recognition method concludes by selecting a most closely corresponding stored template, based on the identifier of the color map mapped range and the scaling functions, which is the recognized image.

Color information may have less relevance to pattern recognition than, for example, edge information, and therefore may be subjected to a lesser degree of analysis. The color information may also be analyzed separately, using a different technique.

EXAMPLE 24

Image Analysis

Alternatively to the object extraction, the image as a whole may be analyzed. In the case of moving images, the aforementioned method is further modified to accommodate time varying images. These images usually vary by small amounts between frames, and this allows a statistical improvement of the recognition function by compensating for a movement vector, as well as any other transformation of the image. Th is also allows a minimization of the processing necessary because redundant information between successive frames is not subject to the full degree of processing. Of course, if the image is substantially changed, then the statistical processing ceases, and a new recognition function may be begun, "flushing" the system of the old values. The basic method is thus modified by storing delayed image data information, i.e., a subsequent frame of a moving image. This represents an image of a moving object differing in time from the image data in the data processor.

A plurality of addressable further domains are generated from the stored delayed image data, each of the further domains representing a portion of the delayed image information, and corresponding to a domain. Thus, an analogous transform is conducted so that the further domains each are corresponding to a domain. A plurality of addressable mapped ranges corresponding to different subsets of the stored delayed image data are created from the stored delayed image data. The further domain and the domain are optionally matched by subjecting a further domain to a corresponding transform selected from the group consisting of a rotation, an inversion, a scaling, and a displacement, which corresponds to a transform applied to a corresponding domain, and a noncorresponding transform selected from the group consisting of a rotation, an inversion, a scaling, a translation which does not correspond to a transform applied to a corresponding domain. For each of the further domains or transformed further domains, the one of the mapped ranges is selected which most closely corresponds according to predetermined criteria. As stated above, these domains may also be subjected to corresponding and noncorresponding frequency domain processing transforms, Gabor transforms, and wavelet transforms.

A motion vector is then computed between one of the domain and the further domain, or the set of identifiers representing the image information and the set of identifiers representing the delayed image information, and the motion vector is stored. The further domain is compensated with the motion vector and a difference between the compensated further domain and the domain is computed. For each of the delayed domains, the one of the mapped ranges is selected which most closely corresponds according to predetermined criteria. The difference between the compensated further domain and the domain is represented as a set of difference identifiers of the selected mapping ranges and an associated motion vector.

Figure 27:
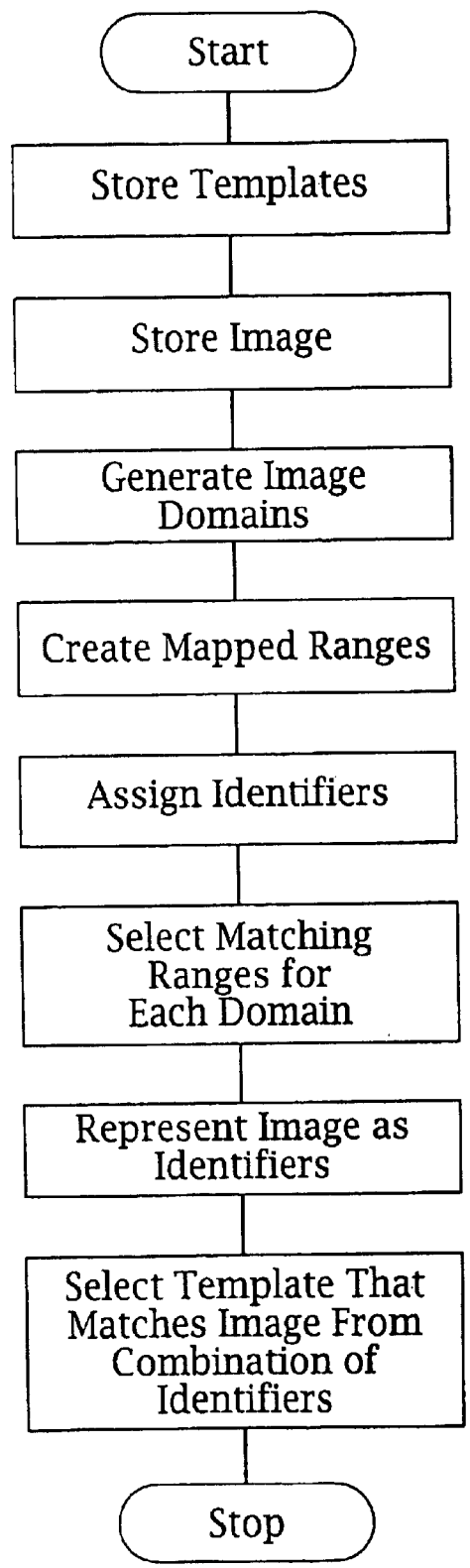
FIGS. 27, 28 and 29 are flow diagrams of an iterated function system method for recognizing a pattern according to the present invention.
Figure 28:
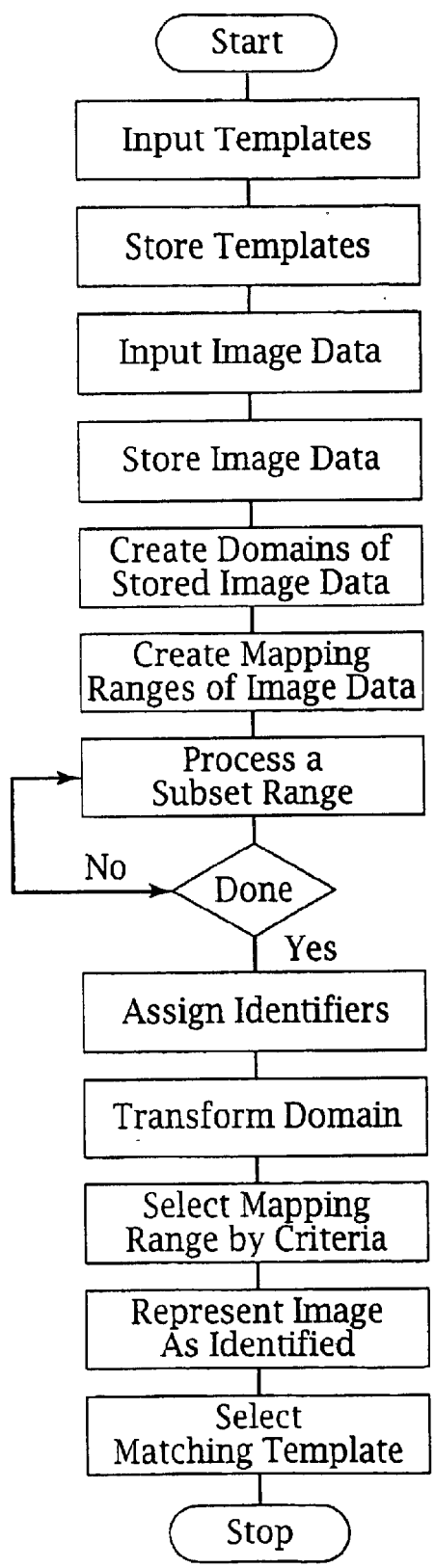
Figure 29:
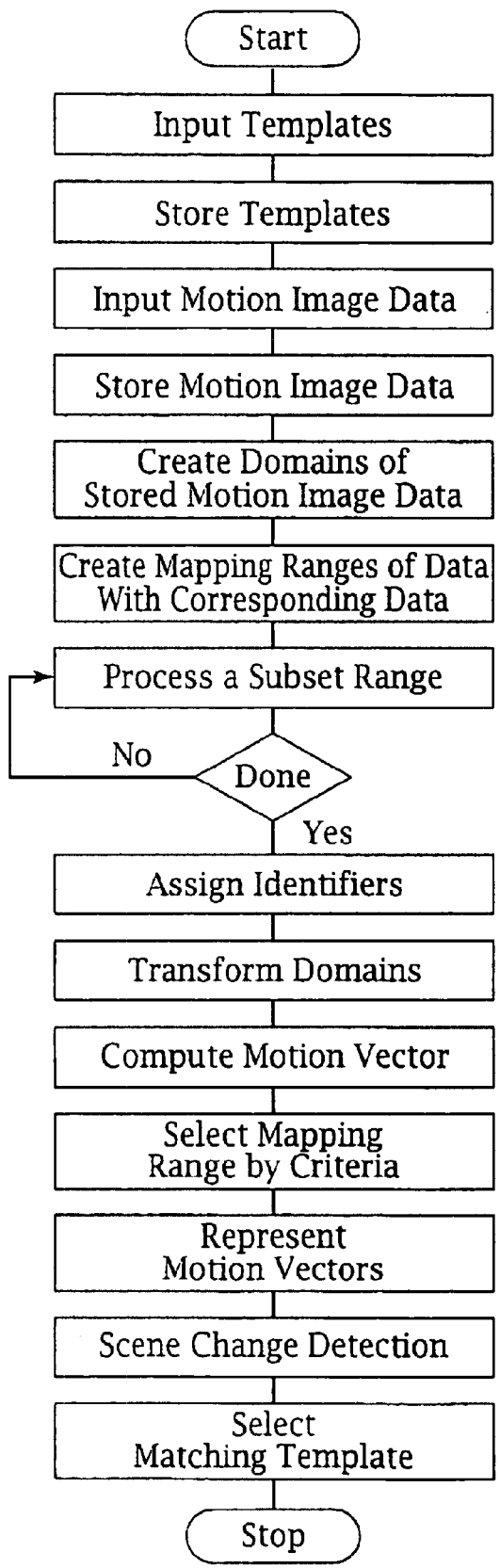

This method is described with respect to FIGS. 27, 28 and 29. FIG. 27 is a basic flow diagram of the recognition system of the present invention. FIG. 28 provides a more detailed description, including substeps, which are included in the major steps shown in FIG. 27. Basically, the image, or a part thereof, is decomposed into a compressed coded version of the scene, by a modified fractal-based compression method. In particular, this differs from the prior compression algorithms in that only a part, preferably that part containing objects of interest, need be fully processed. Thus, if a background is known (identified) or uninteresting, it may be ignored. Further, the emphasis is on matching the available templates to produce an image recognition, not achieving a high degree of compression. Therefore, the image, or domains thereof, may be transformed as required in order to facilitate the matching of the templates. As with respect to single images, the templates are represented in analogous form, having been processed similarly, so that a comparison of the relatedness of an object in an image and the templates may be performed. In particular, if an oblique view of an object is presented, then either the object may be transformed to achieve a predicted front view, or the template transformed or specially selected to correspond to the oblique view. Further, once a recognition has taken place with a high degree of certainty, the system need only ensure that the scene has not changed, and need not continually fully process the data. This has implications where multiple recognition processes are occurring simultaneously, either in a single scene or in different images, wherein the throughput of the recognition apparatus need not meet that required for de novo real time recognition of all aspects of all the objects or images.

In order to limit processing of portions of images, exclusionary criteria may be applied which allow truncation of processing when it is determined that an option is precluded or there exists a significantly higher probability alternative. The processing system may use primarily exclusionary criteria to select the best predictions, or after preselection, employ a highest probability selection system on the remaining choices.

Figure 30:
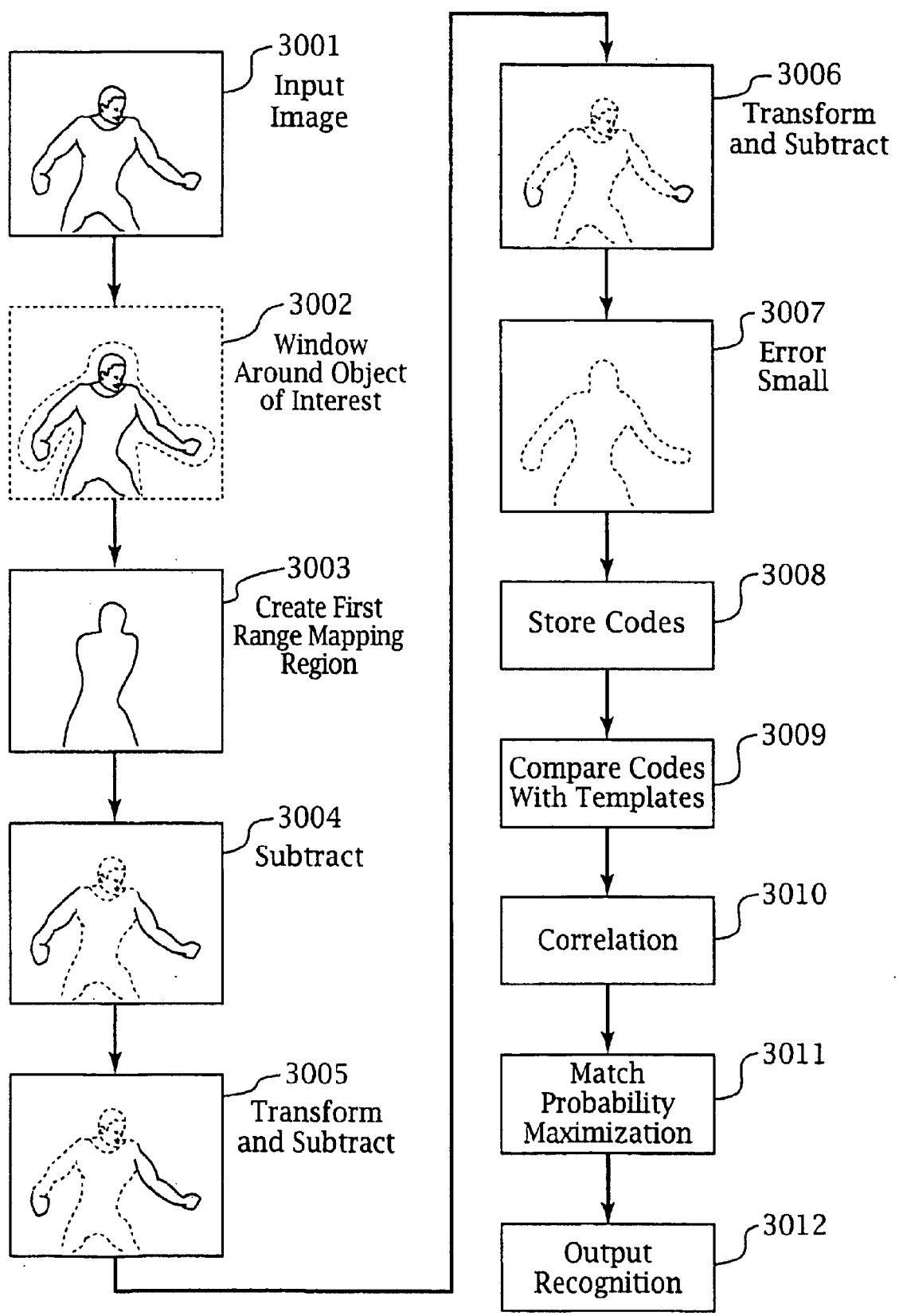
FIG. 30 is a semi-cartoon flow diagram of the object decomposition and recognition method of the present invention.
Figure 31:
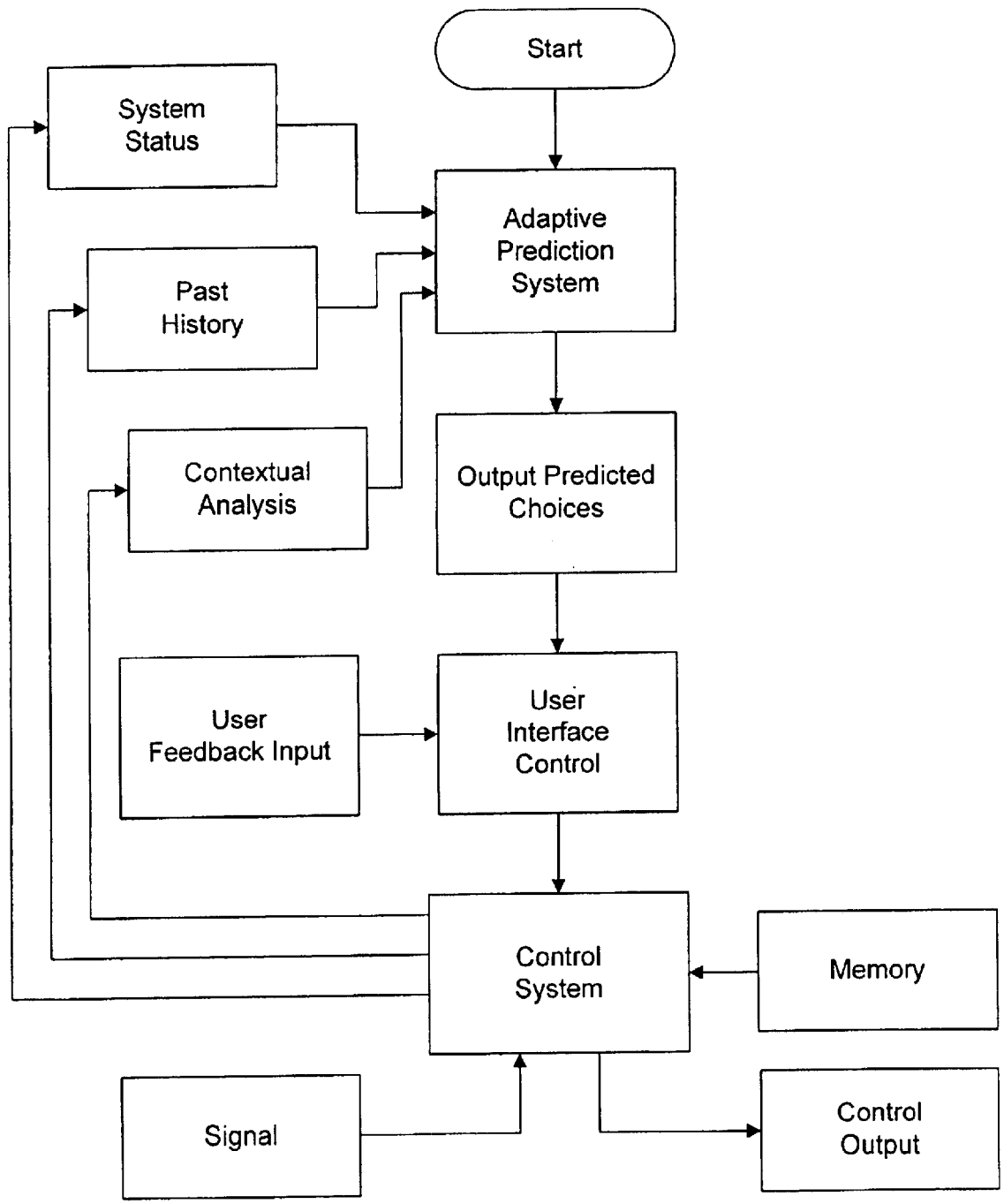
FIG. 31 is a block diagram of an adaptive interface system according to the present invention.

FIG. 30 shows a flow diagram of a cartoon-like representation of an image recognition method of the present invention. It shows initially, an input image 3001, having a degree of complexity. A windowing function 3002 isolates the object from the background. A first order approximation of the image is generated 3003, here called a mapping region. The first order approximation is then subtracted from the initial image to produce a difference 3004. The first order error is then subjected, iteratively, to successive transform and subtract operations 3005 and 3006, until the error is acceptably small, at which point the input image is characterized by a series of codes, representing the first order approximation and the successive transforms, which are stored 3008. These codes are then compared with stored templates 3009. The comparisons are then analyzed to determine which template produces the highest correlation 3010, and the match probability is maximized 3011. The recognized image is then indicated as an output 3012.

Figure 26:
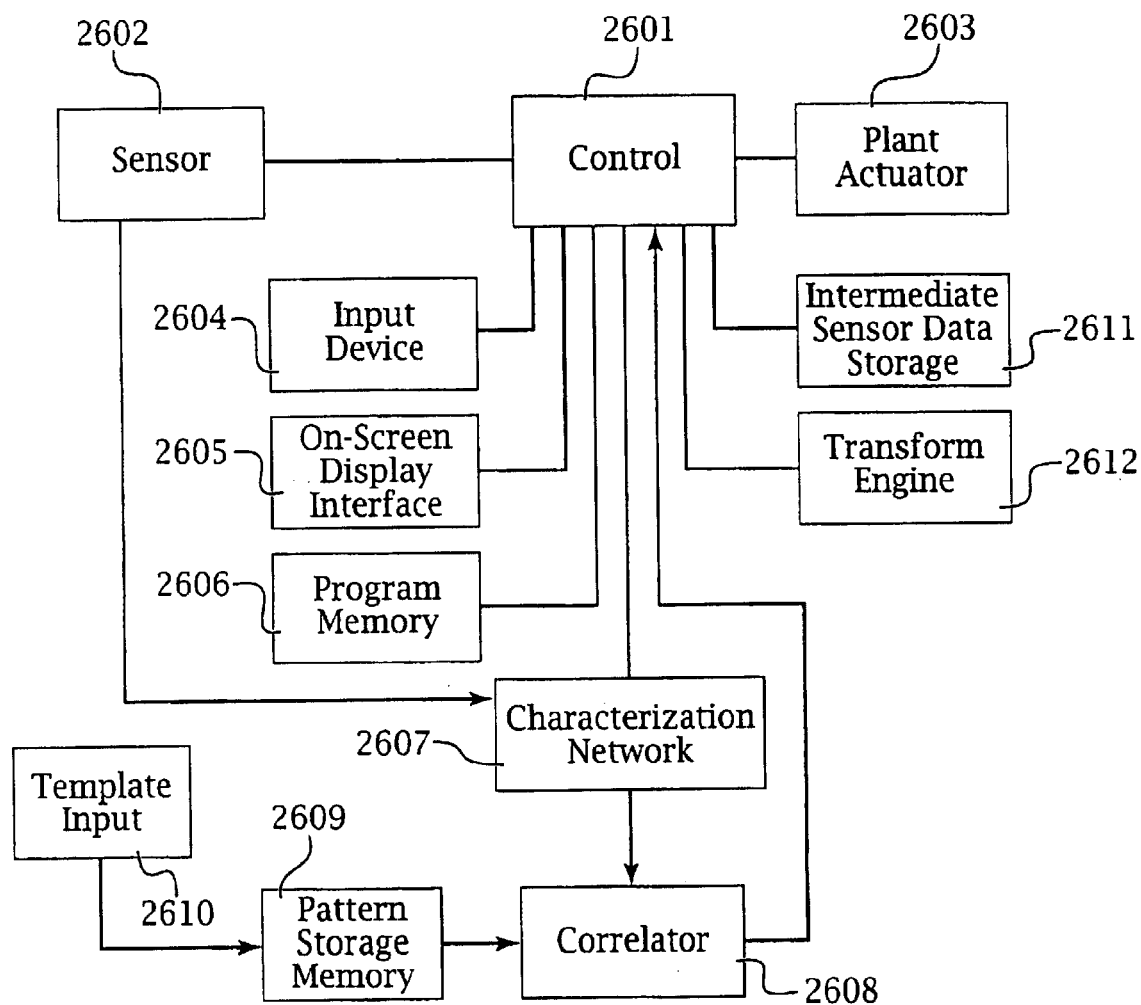
FIG. 26 is a block diagram of a control system for matching a template with a sensor input, of the present invention.

This system is shown in FIG. 26, wherein a sensor 2602 provides data, which may be image data, to a control 2601. The control 2601 serves to control the plant 2603, which has an actuator. The plant 2603 may be a VCR or the like. The control 2601 has associated with it an intermediate sensor data storage unit 2611, which may be, for example a frame buffer or the like. The control 2601 also has associated with it a transform engine 2612, which may perform a reversible or irreversible transform on the data or stored data.

The system also has a template input 2610; which may receive data from the sensor 2602, if accompanied by identifying information. Thus, the pattern storage memory 2609 stores a pattern, such as an image pattern, along with an identifier.

The control 2601 also has an input device 2604, an on-screen display interface 2605, and a program memory 2606, for inputting instructions from a user, providing feedback to the user, and recording the result of the user interaction, respectively. Finally, a characterization network 2607 characterizes the sensor 2602 data, which may be provided directly from the sensor 2602 or preprocessing circuitry, or through the control 2601. A correlator 2608 correlates the output of the characterization network with the stored patterns, representing the templates from the template input 2610. The system therefore operates to recognize sensor patterns, based on the correlator 2608 output to the control 2601.

When analyzing objects in a sequence of images, a determination is made of the complexity of the difference based on a density of representation. In other words, the error between the movement and transform compensated delayed image and the image is quantified, to determine if the compensation is valid, or whether the scene is significantly changed. When the difference has a complexity below a predetermined or adaptive threshold, a template is selected, from the stored templates, which most closely corresponds or correlates with both the set of identifiers of the image data and the set of identifiers of the delayed image data, thus improving recognition accuracy, by allowing a statistical correlation or other technique. The threshold may be set based on an error analysis of the system to determine statistical significance or using other criteria. The threshold may also be adaptively determined based on the history of use of the machine and feedback. For example, if the two images both have a high correlation with one template, while a first of the images has a slightly higher correlation with another template, while the second image has a much lower correlation with that other template, then the system would score the first template as a better match to the first image, based on this differentiation. Thus, templates may be particularly selected to best differentiate similar images of objects.

EXAMPLE 25

Pattern Recognition System

The present system allows for the use of a pattern recognition subsystem for a controller which acts in accordance with a detected pattern. In image, audio and multimedia applications, different types of image processing may take place. First, various processing algorithms may take place in parallel, with an optimum result selected from the results of the various algorithms. Further, various processing schemes may be applied in sequence, with differing sequences applied to different data streams. These processing schemes may be commutative, i.e. yield approximately the same result regardless of the processing order, or may be highly order dependent, in which case a processed data stream must include information relating to the sequence of processing for interpretation.

Various exemplars may reside in a fragment library, for comparison with unidentified data. In the case of processing path dependent systems, an exemplar may be found in multiple forms based on the processing procedure, or in a small subset of corresponding libraries. In general, both lossless compression methods and lossy compression methods employed using high fidelity parameters to minimize loss may be processed to produce a relatively or almost unique result for each unknown data set, while lossy compression or processing methods will be particularly procedure sensitive, especially if differing strategies are employed. These differing strategies may be used to emphasize different features of the unknown data set in order to facilitate comparison. This technique is especially useful when the processing procedures are run in parallel, so that the latency penalty for redundant processing is minimized. Techniques available for this processing include vectorization, fractal processing, iterated function systems, spatial frequency processing (DCT-JPEG, MPEG, etc.), wavelet processing, Gabor transforms, neural nets (static or sequence of images), and other known techniques.

In a preferred embodiment, a spatial frequency or wavelet processing step is performed first, on static image data or a sequence of images, with a fractal domain processing step performed thereafter. This allows high frequency noise to be initially filtered; with subsequent fractal-based correlated noise detection and subtraction, therefore allowing cleanup without loss of high frequency detail. Preferably, before the fractal-based processing, which may be performed by a digital computer or optical processing apparatus, standard edge detection/object separation, e.g., high frequency filtering, contour mapping, artificial intelligence, etc. may be performed. A fractal transform is then performed on the image of a portion thereof, starting in a standardized manner, e.g. at a point of lowest complexity, or the epicenter of the largest feature for beginning a contractive transform. The processed image may then be matched with one or more databases to identify all or a portion of the image. Optionally, after a match has been found and/or confirmed by an operator, using the human interface system, the method is then optimized to minimize the errors and increase the efficiency of later matches. This may be performed by modifying the database record, or related records, as well as modifying the preprocessing algorithm. In a preferred embodiment, the image is processed piecemeal, on an object-by-object basis. Therefore, after an object has been processed, it is extracted from the image so that the remaining information may be processed. Of course, multiple objects may be processed in parallel. The exemplar database is preferably adaptive, so that new objects may be added as they are identified.

The present technology may also be used with a model-based exemplar database, wherein an image object is matched, based on a two dimensional projection, or analysis of a sequence of images, with a multidimensional model of an object. For example, the model may include volume, as well as multiple degrees of freedom of movement. Further, objects may also include "morphing" characteristics, which identify expected changes in an appearance of an object. Other types of characteristics may be included in conjunction with the exemplar in the database.

In a preferred embodiment, a model contained in a database includes a three or more dimensional representation of an object. These models include information processed by a fractal-based method to encode repetitive, transformed patterns in a plane, space, time, etc., as well as to include additional degrees of freedom, to compensate for changes in morphology of the object, to allow continuous object identification and tracking. Thus, once an object is identified, an expected change in that object will not necessitate a reidentification of the object. According to one embodiment, a fractal-like processing is executed by optical elements of an optical or optical hybrid computer. Further, in order to temporarily store an optical image, optically active biological molecules, such as bacteriorhodopsins, etc. may be used. Liquid crystals or other electrophotorefractive active materials may also used. These imagers may be simple two dimensional images, holograms, or other optical storage methods. A preferred holographic storage method is a volume phase hologram, which will transform an impressed image, based on hologram to image correlation. Thus, these models would be somewhat linear transform independent, and would likely show some (planar) transform relationship. Thus, an optical computer may be advantageous because of its high computational speed as compared to digital computers for image analysis, due to inherent parallelism and high inherent speed.

Because of the present limitations in speed of writing an image to optical recording media, especially holographic images, the preferred system includes a plurality of image storage elements, which are operated in parallel. It is noted that absolute accuracy of object identification is not required for "consumer" applications, and therefore partial match results may be considered useful. A plurality of partial results, when taken together, may also increase identification reliability. Critical applications generally differ in quantitative aspects rather than qualitatively, and therefore many aspects of the present invention may be applied to mission critical and other high reliability applications.

A preferred object identification method proceeds by first classifying an object in an image, e.g., "car", "person", "house", etc. Then, based on the classification and object separation, an optimized preprocessing scheme is implemented, based on the classification. This classification preprocessing operates on the raw image data relating only to the object, separated from the background. Then, after the optimized preprocessing, a parallel recognition system would operate to extract unique features and to identify common features to be excluded from the comparison. This step could also identify variable features upon which identification should not be made because the distinctions are useless for the purpose. Thus, the object image at this point loses its relationship to the entire image, and the data reduction might be substantial, providing a compact data representation. The preferred algorithm has a tree structure, wherein the identification need only differentiate a few possibilities, and pass the result to another branch of the tree for further analysis, if necessary. Since the intermediate calculations may help in later computations, these should preferably be retained, in order to avoid duplicative analysis. Further, the order of analysis should be predetermined, even if arbitrary, so that once a useful intermediate calculation is identified, it may be passed in a regular, predictable manner to the next stage processing. Of course, one should not ignore that objects in the entire image may be correlated with one another, i.e. if one object is present, it would increase or decrease the likelihood of another object also being present. Further, temporal correlations should also be noted. Thus, the object identification need not proceed upon each object independently.

Based on time sequences of two-dimensional images, a three dimensional image representation may be constructed. Alternatively, based on various presumptions about extractable "objects" in a single or small group of two dimensional images, a hypothetical three dimensional object may be modeled, which may be later modified to reflect the actual image when an actual view of hidden surfaces is shown. Therefore, by one means or another a three dimensional model is created, having both volume and surface characteristics. Of course, since inner structure may never be seen, the model normally emphasized the surface structure, and is thus a so-called two-and-a-half dimensional surface model. Other non-integral dimension representations may also be useful, and fractal models may efficiently represent the information content of an image model.

When the source signal is an MPEG encoded datastream, it is advantageous to provide an exemplar database which does not require complete expansion of the encoded signal. Thus, the motion vector analysis performed by the MPEG encoder may form a part of the pattern recognition system. Of course, image sequence description formats other than MPEG may be better suited to pattern analysis and recognition tasks. For example, a system may transmit an interframe, by any suitable description method, as well as an object decomposed image in, e.g., fractal transform codes. The transmitted source material, other than interframes, is then transmitted as changes only, e.g. new objects, transforms of existing objects, translations of existing objects, etc.

Color coding may use even more extensive use of fractal compression technology with high compression ratios, because absolute accuracy is not necessary; rather photorealism and texture are paramount, and need not be authentic. Therefore, backgrounds with significant detail, which would require substantial data in a DCT type system, could be simply coded and decoded without loss of significant useful information. Important to the use of this method is to discriminate between background textures and foreground objects, and to encode each separately, optimizing the processing based on the type of object being processed.

EXAMPLE 26

Data Context Sensitive Computer Interface

The present example relates to a context sensitive computer interface in which a characteristic of the interface is modified based on a linguistic or informational content of a data object upon which the interface is operating. For example, a number of alternate feature sets may be made available based on the type of data which is being operated on by the user. For example, differing feature sets would be optimal for each scientific discipline, each type of financial or economic field, marketing, retail, distribution, manufacturing, administration, human resources, etc. Such an interface will make it possible to provide an extended and extensible suite of application modules customized for the user in general, and further adaptive to the particular use to which the user may be making of the apparatus. Thus, complex options particularly suited for the data at hand may be made available without inefficient interface searching, while inappropriate options are not presented. It is noted that this interface is responsive to the data, rather than the programming. Further, the data is analyzed for its meaning, rather than its type.

In a word processing environment, a document or section of a document is analyzed for the presence of particular words or phrases, or for the presence of concepts, interpretable by linguistic concepts. This context-sensitive functionality does not require an explicit definition by the user, but rather will be present even during an incidental occurrence of a recognized context. In accordance with other aspects of the present invention, each context related function may have various user levels, which are selected based on an imputed user level of the user. Thus, the interface program must actually interpret the text or context of the user document in order to select the most likely options for use.

Thus, if a user were to embed a table in a document, the available options would change to table-type options when the "active" portion of the document is at the table, i.e. within the viewable area, etc. Further, and more specifically, if the text and context of the table indicate that this is a financial table, financial options would be initially provided, and standard financial calculation functions immediately made available or performed, in contemplation of their prospective use. Similarly, if the data appears to be scientific, a different set of options would be initially available, and the standard scientific-type calculation functions be made available or performed. If the table relates to chemical or mechanical-type data, chemical or mechanical options might be made available, respectively. Embedded graphics, likewise, would be associated with graphics functions appropriate to the type of graphic. It is noted that, due to the analysis of the content of the document, software having generic functionality may present as special purpose software, based on its actual use.

Thus, in a like manner, the system could determine the "style" of the document and automatically format the data in a predetermined manner to conform with general standards of presentations relating to the desired style. This is similar to style sheets of many programs, but they are self applying, and will, within the same document, be adaptive as the data changes context. Further, since the "styles" would be applied automatically, it would be relatively easy to alter them, requiring only a small amount of manual effort. This is so because the "keys" by which the system determines style could be stored, thus allowing redeterminations to be easily made. This context sensitivity could also assist in spelling and grammar checking, where different rules may apply, depending on the context.

The data object includes information, which might be text, arrays of numbers, arrays of formulas, graphics, or other data types. The system relates parts of the object to each other by "proximity" which could be linear, in the case of a text document, or otherwise, such as in the case of a hypertext document or spreadsheet. Those parts or elements of the object closest to each other, by whatever criteria, are presumed to be topically related, regardless of data type. Thus, if a paragraph of text is proximate to a table for numbers, then the type of numbers presumed to occupy the table would relate to the content of the proximate text. If the text relates to finance, i.e. uses financial-related terms, or series of words that often occur in financial contexts, the table would be presumed to be a financial table.

Once the context of the part of the object is determined, the system then acts based upon this context. The major act is the presentation of tailored menus. This means that if the context is financial, the menus available for use with the numeric table relate to financial tables or spreadsheets. Further, the proximate text would be subject to financial oriented spellcheck and financial oriented grammar or style check. If a graphics-option is selected proximate to the text and table, the menu options would presume a financial graph and present appropriate choices. Of course, the options need not be limited to a few types, and may be hybrid and/or adaptive to the style of the user. However, it is noted that the adaptive menus could be linked to a "corporate style". Thus, communication styles could be dictated by a set of global rules for an organization. Of course, these a priori choices could be overridden.

An advantage of this system is that it allows a software system to include a wide range of functionality which remains "buried", or relatively inaccessible, based on the context of usage. Thus, feature rich software would be considered more usable, and software could be provided in modular fashion. Since the system might allow a user to have potential access to many software modules, the system could also be linked to a license manager and per use billing system for rarely used modules, while allowing these to remain available on, e.g., a CD ROM. Thus, for example, a full integrated package could employ a single, "standard" interface which would not require task-switching programs, while avoiding presentation of the full range of features to the user at each juncture.

This system provides advantages over traditional systems by providing a non-standardized interface with a variable feature set which attains usability by adapting a subset of the available functionality based on the context of the data.

EXAMPLE 27

Group Aware Adaptive Computer Interface

The adaptive interface according to the present invention may be used in group computing applications. In such a case, the predictive functionality is applied to allow the interface to apply rules from one group member to a project, even when that group member has not contributed personally to a particular aspect. This is thus a type of intelligent agent technology, which, according to the present invention includes the characteristics of abstraction and extrapolation, rather than rule based analysis which would fail based on divergent circumstances. This differs from standard rule-based expert system because the intelligence applied is not necessarily "expert", and may be applied in a relative fashion. Further, extracted user characteristics need not completely define a solution to a problem, and indeed, the use of such a technology in group situations presupposes that a contribution of a number of users is desirable, and therefore that the expertise of any given user is limited.

In order to ensure data integrity after the application or contingent application of user characteristics to a datastream, it is desirable to trace the evolution of data structures. This also allows for assistance in the organization and distribution of workgroup responsibilities. Thus, in a workgroup situation, the goal is not optimization of individual productivity, but rather optimization of the group result, including all levels of review after an initial phase is complete.

Thus, while an individual user may seek various shortcuts to achieve various results, the group would benefit by having available all information relating to the path taken to achieve that result. Further, the desired result may be modified according to the presumed actions of the group, so that the final product is pre-optimized for the group, rather than the individual. Thus, a group member may have his "rules" extracted from his actions, i.e. by neural net backpropagation of errors programming or fuzzy rule definition, to be presented for consideration by another group member. This strategy will allow "better" drafts by considering the predicted input of a member prior to review by that member. A user may further tailor the rules for a given project, and "distilled wisdom" from non-group members may also be employed, as in normal expert (AI) systems.

This rule-extraction technology as applied to workgroups is enhanced by the context sensitivity of the software, where the input of each group member may be weighted by considering the context. Again, this technique may be used to increase the efficiency of the primary author of a section of a project, as well as better defining the scope of responsibility of each member, while still respecting the input of other group members.

According to this workgroup rule extraction technology, points of conflict between group members are highlighted for resolution. As an adjunct to this resolution phase of a project, videoconferencing may be employed. Further, where a conflict of a similar type had occurred in the past, data relating to the resolution of that conflict, including recorded videoconference, may be retrieved and presented to one or more members of the workgroup. In this way, such conflicts may be resolved before it becomes adversarial. Thus, each group member may efficiently proceed independently, with only major issues requiring meetings and the like to resolve.

If a workgroup member disagrees with an imputed rule, either explicitly, by review of the rules, or implicitly, by a review of the results, the system will allow a review of all decisions influenced by that faulty rule, as well as a proposed correction. This may be addressed by any member of the group, but usually by the author of the section or the source of the rule will be the relevant reviewing individual. Rules may also be created by the group, rather than from a single individual. Such rules are more often explicitly defined, rather than derived from observation. Such group rules may also be subjected to adaptive forces, especially when overridden frequently.

EXAMPLE 28

Adaptive Interface Vehicular Control System

It is noted that, the adaptive user level interface is of use in uncontrolled environments, such as in a moving vehicle, especially for use by a driver. An intelligent system of the present invention would allow the driver of such a vehicle to execute control sequences, which may compensate for the limited ability to interact with an interface while driving. Thus, the driver need not explicitly control all individual elements, because the driver is assisted by an intelligent interface. Thus, for example, if it begins raining, the interface would predict the windshield wipers should be actuated, the windows and any roof opening closed, and the headlights activated. Thus, the driver could immediately assent to these actions, without individually actuating each control. In such a case, the screen interface, which may be a heads-up display, would provide a small number of choices, which may be simply selected. Further, under such conditions, there would likely be a large amount of mechanical jitter from the input device, which would be filtered to ease menu selection. Further, this jitter would indicate an unstable environment condition, which would cause the interface to present an appropriate display. A voice input may also be used.

EXAMPLE 29

Adaptive Interface Vehicular Control System

An integrated electronics system for an automobile is provided having control over engine, transmission, traction control, braking, suspension, collision avoidance, climate control, and audio systems. Steering and throttle may also be controlled. Based on driver preference and action patterns, the system may optimize the vehicle systems. For example, the vehicle may anticipate voluntary or road conditions based on implicit inputs of the user, thus readying vehicular systems prior to the actual encounter with certain conditions. Further, a user interface may be simplified, based on probable required functionality, thus limiting required attention by the driver in order to activate a particular control. By providing such an interface, controls normally inaccessible may be made accessible, without increasing mechanical complexity, e.g., functions normally controlled by computer may be accessed through a common user interface, rather than through dedicated manual controls.

The automobile control system may also include collision avoidance systems, which may include imaging sensors and radar or LIDAR ranging and velocity measurement. According to the present invention, a heads-up display or simplified graphic user interface in the dashboard or near the steering wheel presents predicted options to the driver. An auxiliary interface may also make certain options available for passengers.

According to another aspect of the present invention, an automobile positioning system is provided, which may be extraterrestrial, e.g., GPS, or terrestrial, e.g., cellular base station, LORAN, etc. Such a system is described in U.S. Pat. No. 5,390,125, incorporated herein by reference; see references cited therein. A controller in the automobile is provided with an itinerary for the vehicle travel. Based on position and itinerary, the vehicle may communicate with various services, such as food, fuel and lodging providers, to "negotiate" for business. The driver may be provided with customized "billboards", directed to his demographics. Reservations and discounts may all be arranged while en-route. Communication between the automobile and the services is preferably provided by CDPD services, which is a cellular based 832 MHz band digital data transmission system. Therefore, an existing cell phone system or CDPD modem system may be employed for telecommunication. Preferably, a simple display is provided for presentation of commercial messages to the driver or passenger and for interacting with the service.

As a matter of practice, the service may be subsidized by the service providers, thus reducing the cost to the consumer. The extent of the subsidy may be determined by the amount of data transmitted or by the eventual consummation of the transaction negotiated.

Because of the positioning system, any variance from the itinerary may be transmitted to the service providers, so that reservations may be cancelled, or substitute services provided in a different location or at a different time.

The telecommunication system may also be used as an emergency system, to contact emergency services and/or police in the event of accident or distress. The transponder system may also be part of an antitheft system. The transponder may also be part of a vehicular maintenance and diagnostic system to ensure proper servicing and to help determine the nature of problems. Raw or processed data may be transmitted to a centralized station for full analysis and diagnosis. Because the vehicle need not be at the repair shop for diagnosis, problems may be analyzed earlier and based on extensive, objective sensor data.

EXAMPLE 30

Intelligent Internet Appliance

A further application of the present technologies is in a so-called "Internet appliance". These devices typically are electronic devices which have a concrete function (i.e., do more than merely act as a generic server) and typically employ at least as a secondary interface, a web browser. In addition, these devices provide a TCP/IP network connection and act as a web server, usually for a limited type of data. Therefore, in addition to any real human interface on the device, a web browser may be used as a virtual interface.

According to the present invention, such an Internet Appliance is provided according to the present invention with advanced features, for example adaptivity to the user, to the environment, or intelligent algorithms which learn. In fact, a preferred embodiment provides a rather generic device which serves as a bridge between the Internet, a public packet switched network which employs TCP/IP, and a local area network, for example in a residential, industrial or office environment. The device may further abstract the interface functions for a variety of other devices as nodes on either the Internet or local area network, to provide a common control system and interface.

A preferred embodiment also encompasses certain other features which may be used as resources for the networked devices or as usable features of the device.

The Internet, or other wide area network, may be connected in any known manner, for example, X.25/ISDN D-channel, dial-up over POTS (e.g., v.34, v.90, v.91), ISDN, xDSL, ADSL, cable modem, frame relay, T1 line, ATM, or other communications system. Typically, a system is provided with either a commonly used access method, such as v.90 or ISDN, or a replaceable communications module with a generic interface. Such systems are well known.

The local area network is also well known, and may include, for example, as a physical layer, 10 Base T, 100 Base T, HomeRun (Cat. 3 twisted pair/telephone twisted pair/power line transmission, from Intel Corp., e.g., Intel 21145 device/Tut systems), Universal Serial Bus (USB), Firewire (IEEE-1394), optical fiber, or other known computer network. The protocol may be, for example, TCP/IP, IPX, ATM, USB, IEEE-1394, or other known or proprietary appropriate communications protocol.

While not required, a particular aspect of a preferred embodiment according to the present invention is the ability to interface "dumb" devices as nodes on the LAN with an intelligent device, while allowing the user to interact primarily with the intelligent device. This scheme therefore reduces redundancy and increases functionality.

Therefore, in an exemplary embodiment, an intelligent home is established, with most or all electrical appliances and electronic devices interfaced with the system, for example through the aforementioned Homerun system, using any of the supported physical layers. Each device is provided as a relatively simple control, for example, remotely controllable (or where applicable, dimmable) lights, control over normal use and peak electrical demand of heavy appliances, as well as inter-device communications for consumer electronics. Therefore, the intelligent device acts as an external communications and control node for the entire network, and may, for example, control telephony functions in addition.

Exemplary devices to be controlled in a home include household appliances, HVAC, alarm systems, consumer electronics, and the like, and/or provide for communications purposes. An alarm system embodiment, for example, may employ a video camera input for capture and analysis of images, as well as motion or irregularity detection. The intelligent device may, for example, employ neural networks or other intelligent analysis technology for analyzing data patterns indicative of particular states. An alarm output may be produced, for example, through standard alarms, as well as through a telephone interface of the system.

The system may therefore set/control/monitor the status of any home-based device oven, stove, alarm, washing machine, dryer, iron, lights, computer, oil/gas burner, thermostat, location of automobiles, camera, pump (pool, sump), sprinkler, stereo/video systems, home surveillance system. This may be especially important if the user is away from home for an extended period of time, or if he or she wants to change the schedule of something, or travel plans change. For a home surveillance system, pattern recognition may be employed to monitor all sensors, including cameras, to detect abnormal patterns or changes in condition.

Thus, since the intelligent device incorporates a web server, the physical proximity of the user is not critical for interaction with the device, and all devices on the LAN may be controlled remotely, automatically, and in synchrony.

In one embodiment, the intelligent device includes a videoconferencing/video capture system, including any or all known features for such systems, for example as described in the background of the invention. Therefore, in addition to a base level of functionality, such an embodiment would also likely include (a) telephony interface, (b) video capture, (c) video codec, (d) audio capture, (e) audio codec, (f) full duplex speakerphone, (g) video output, and (h) audio output.

In another embodiment, a speech interface is provided for interpreting human speech as an input and/or producing synthesized speech as an output. Therefore, such a device would include speech recognition and/or synthesis technologies, as well as a semantic data processor.

Preferable, the device allows use of a simplified web browser interface, such as which may be supported by personal digital assistants (PDAs) and enhanced digital data cellular telephones, e.g., handheld device markup language (HDML). This, for example, allows a remote user to communicate through wireless networks or the like, and therefore avoids the need for a full personal computer as a human interface.

Advantageously, the device may be interfaced with a telephone communication system, allowing use as a voice and/or video message recorder, and allowing remote access to the stored information, either through a dialup connection and/or through the network. In this case, the intelligent device may act as a computer telephony interface, and all communications devices logically under this device act as "net phones", i.e., voice communications devices which communicate over data networks. Therefore, all telephony control and computer telephony functions may be integrated into the device, for example, voice mail, auto-attendant, call center, and the like. Further, the Internet interface allows remote messaging and control over the telephony system, as well as virtual networking, Internet telephony, paging functions, and voice and data integration.

The intelligent device may also interface with various media electronics devices, and for example, may act as a "rights server" or other aspect of a copyright protection and royalty collection/enforcement system. Typically, these functions entail e-commerce functions, and may require X.22 and/or XML communications and translations. In addition, such functions also typically involve encryption/decryption, as well as key management, which are also preferably supported by the device. Such support may be in hardware or software.

Another aspect of the invention provides an index and/or catalog database for media information or media metadata information. Thus, data relating to a VCR tape or other recorded media may be subjected to search criteria without requiring access or contemporaneous analysis of the media content itself. Therefore, a preferred embodiment of the intelligent device includes mass storage and retrieval capability, for example, magnetic disk, RW-CD, or RW-DVD. This mass storage and retrieval capability may be used, not only for databases, but also for computer software, media and content storage and retrieval. Thus, the device may also serve as a video data recorder, capturing video data and storing it digitally, for example, employing the aforementioned video and audio codecs. In this case, it is preferable that the intelligent device also include a direct media access port, for example a broadcast TV tuner, ATSC/HDTV tuner, cable tuner, DVD reader, CD reader, satellite video decoder, NTSC composite/S-VHS, and/or other type of media content information input. With such storage, the intelligent device may also assume the standard functions of computer network servers, for example, file serving, print serving, fax serving, application serving, client/server application support, as well as traditional networking functions, such as bridging, routing, switching, virtual private network, voice-over-IP, firewall functions, remote access serving, and the like. It should also be apparent that the intelligent device may also serve as a personal computer itself, and thus does not require additional systems for basic functionality.

In a media recording system embodiment, the system preferably notifies the user if the "program", i.e., instructions, are incomplete, ambiguous, or impossible to complete. For example, if a single channel selector is provided, no more than one channel may be monitored at a time. Further, where irreversible actions are necessary, the user is preferably informed and allowed to make a choice, for example, if lack of storage space forces a choice to be made between new and archival material. A conflict management system is provided which arbitrates between the conflicting demands, for example if a second user is programming the same device (for example, the VCR) to record a show at the same time.

Thus, it is apparent that the intelligent device according to this embodiment of the present invention may incorporate many different functions, some of which are defined purely by software and processing availability, and others by particular hardware devices for performing specific functions.

Another aspect of the invention defines a special training mode of the intelligent device, which allows the user to improve the functionality of the system by ensuring that any intelligence algorithms will correctly operate in an anticipated and/or desired manner. In this mode, responses of the user are provoked which indicate user preferences, preferably in a manner which resolves ambiguities encountered with prior data sets. Thus, where the system identifies a situation where a decision is difficult, e.g., where the data analysis does not output any selected actions which will likely correspond to the user desires or preferences, or where ex post facto the user indicates that an inappropriate choice was made, the particular data structures may be stored and abstracted for later presentation to the user. In this case, such structures are presented by the system to the user, during a training session, to train the system relating to the desired response to particular data environments. In this way, the user is not necessarily burdened with training tasks during normal use of the device, and opportunities for such training are not lost. Where the system is untrained, and an "intelligent" response or mode of operation cannot be resolved, a default mode of operation may be defined. Further, such a default mode is preferably always available, at the request of the user, thus allowing-use where an adaptive system is undesired or difficult to employ.

In a television application, the Internet appliance preferably has access to an electronic program guide (EPG). Such EPG systems are known, and typically provide an efficient staring point for user programming. These EPG may be provided as an embedded signal in a broadcast stream, through a dial-up network, through the internet, or on distribution media, such as CD-ROM, OCR scanning of TV-Guide (or the like) or other known means. EPGs contain a concise semantic description of program content, which typically is both sufficient for user evaluation, and brief enough for rapid evaluation. The system may therefore analyze user preferences in this semantic space and provide adaptive presentation of elements of the EPG to the user. Of course, a media data stream analysis embodiment of the invention, as disclosed above, may be used in conjunction with or in lieu of the EPG system.

The system preferably maintains an updated index of available data. Thus, newly acquired data is added to the index, and deleted data is purged from the index. The system preferably compares new data to previously encountered data, to avoid redundant processing. For example, the system preferably recognizes events/programs that have previously been recorded, and checks to determine whether they are still in the index. In this context, the user is preferably provided with low-level file maintenance tools, for example to manually control the addition or deletion of data, which is then correctly represented in the index.

Because the Internet appliance is connected to the Internet, so-called multicasts may be monitored for correspondence with user preferences. Therefore, it is understood that the operation of the present invention is not limited to traditional television broadcasts, and that streaming video and audio, as well as stored images, sound files (e.g., MIDI, MP3, A2B, RealAudio), text, and multimedia streams may be analyzed based on the adaptive principles presented herein.

The system may also integrate Internet data with other types of data, for example providing access to stored or static data corresponding to a data stream. The retrieval and storage of such data may also be adaptively controlled in accordance with the present invention. Thus, it is expressly understood that the intelligent device may act as a "VCR" (albeit not necessarily employing a known type of videocassette tape), to record media.

The Internet appliance may also operate autonomously, capturing data which corresponds to user preferences and profiles, thus reducing latency for the user, and potentially shifting data transfers to off-peak periods. Such a system operates in this mode as a so-called "agent" system. Likewise, the device may also be linked to other intelligent devices, to provide an intelligent interaction therebetween.

The preferred user interface maintains user levels constant over long periods, i.e., not rapidly adaptive, to allow for quick accessing over a low bandwidth connection, such as a telephone, or using succinct displays, such as might be found on a personal digital assistant. Thus, the user can rely on memory of the interface functionality and layout to reduce data transmissions and reduce search time. In one embodiment, the interface may be "forced" to a particular type, as either a permanent interface, or as a starting point for adaptivity. Thus, the user may be provided with an interface design mode of operation.

The user interaction with each "device", which may be real or virtual (implemented as a software construct in a relatively general purpose computer), is preferably carefully designed for each device. A common user interface paradigm is preferably provided for corresponding functions, while the user interface is preferably optimized for dealing with the specific functions of each particular device. Thus, a similar user interface and screen layout is employed for functions that are the same across a variety of devices. In this regard, it is an aspect of an embodiment of the invention to translate user interface systems, even in a high level state, to other forms. Thus, in a multi-brand environment, related components may have native interfaces that are both well developed and distinctly different. Therefore, the present invention allows for a translation or remapping of the functionality into a common paradigm. Where aspects cannot be adequately translated, the native interface may be presented to the user.

EXAMPLE 31

Set Top Box with Electronic Commerce Capability

Known systems for accounting and payment for on-line transactions include credit and debit card transactions, direct deposit and wire transfer, Micro Payment Transfer Protocol (MPTP) (www.w3.org), Millicent (Compaq Computer Corp.), and a number of other systems. (See supra). Typically, these seek to be secure, i.e., to ensure to some degree of reliability against the risk of non-payment.

Advantageously, a micropayment scheme is implemented to credit or debit accounts of advertisers, users, service providers, and content owners, for example. By facilitating small monetary transfers, such as between about $0.05 to $5.00, the relatively small dollar values and large audience sizes may be accommodated. This, in turn, will likely make the set top box-delivered entertainment industry content efficient, and potentially allows for the close-knit integration of e-commerce. For example, instead of being linked to an Internet web site operated by a commercial provider by integration of the Internet and streaming broadband media, a complete commercial transaction may be completed. For authentication of the user, typical means may be employed, such as passwords and the like, or more sophisticated techniques such as facial recognition, which may employ common systems as video pattern recognition systems within the device and video-conferencing hardware. Thus, making an impulse purchase based on an advertisement may be as simple as pushing a single button on a remote control.

With transactions having a higher economic value, further safeguards may be implemented, and for example a written contract or receipt could be generated, executed, and returned to the vendor, all using a simple set-top box system with attached printer and scanner (or use of a video camera as image input device).

The payment or micropayment scheme may be integrated with a content management/digital watermarking/copy protection scheme, for example where the transaction purchases a limited license in an electronic audio-visual work. The system typically automatically triggers a monetary transaction to compensate the proprietary rights holder, although under certain circumstances the delivery of the work and the compensation for viewing may be decoupled. For example, as explained elsewhere herein, the content may be stored in a privileged storage medium. Thus, the accounting for use occurs upon substantial viewing, and not upon mere downloading to a "buffer". Alternately, the privileged store is encrypted, and the decryption key is provided only upon payment. Thus, in the case, the payment transaction may be relatively simple, and not require a complete download of a massive audio-visual work.

Typically, a pay-per-view work will be downloaded in a push process to multiple set top boxes using a common encryption key. Once received by an individual addressable box, the work will be re-encrypted based on the identity or identifier of the hardware, using a public key-private key system. Thus, using the public key of the identified hardware, a private key transmitted for decrypting the work and accounting transaction may be performed to compensate the content provider. This system may also work to subsidize the viewing of content. If a viewer is willing to receive certain commercials (which may be stored in mass storage on the hardware or streamed using broadband or packet technology), a payment in favor of the viewer may be received. If the hardware has viewer sensing technology, the compensation may be based on the individuals watching the commercial. If the commercial is time shifted, compensation may be arranged depending on the time of viewing and a formula, which for example may account for staleness of the commercial.

The value may also depend on the correspondence of the commercial to one or more user preference profiles of the respective viewers. Typically, the compensation model will not be the simple aggregate sum of the values for each user. This is because typically, the purchases of the group are not uncorrelated, and therefore the aggregate sum of the values would tend to overestimate the commercial potential of the group. Likewise, the values for any one individual would tend to underestimate the potential of the group. Therefore, a more sophisticated demographic and group (typically family or communal group) analysis should be employed.

In order to register the viewers present, a number of methods may be employed, for example video observation, voice verification, fingerprint or retinal scan technologies, voluntary identification, or the like. Preferably, little additional hardware is employed and the registration process employs hardware otherwise provided for other purposes; however, fingerprint scanners and retinal scanners are useful, even if they incur an additional hardware cost.

The types of content delivered may include images, video, multimedia clips, music, text content, templates, software and applets, and any other sort of information.

The micropayment and rights accounting system may be provided by the system operator, i.e., a broadband cable system operator, or by a third party. Thus, a communications system outside the cable (or satellite) network may be provided. The hardware system according to the present invention may, for example, be integrated with a known cable modem or DSL system, or employ a separate analog POTS modem. By providing such an open communication system, it is possible to maximize the flexibility and the value of communications, essentially allowing completely customized communications. With an intelligent set top box, having a video storage facility, it is possible to create customized presentations by directly addressing the box with a preformed communication, directing a common presentation to the box which is then customized by an individually addressed customization, or by allowing the box to automatically customize based on stored data, which need never leave the box. The system therefore supports various levels of user privacy. In order to support some functions, user information might be required to be transmitted to a cable operator, information aggregator or commercial vendor, for other functions, a fully customized presentation may be generated without any outside transmission of data. The accounting system may also accommodate various levels of privacy. At one end of the spectrum, a commercial vendor has a complete identification of the viewer, at the other, neither the commercial vendor nor the transmission system operator has information as to the viewer or any activities thereof.

In practice, some waiver of anonymity may be required for effective auditing. However, the Nielsen and Arbitron rating systems are built on a user reporting or observation platform, and thus user acceptance is not likely to be difficult. On the other hand, direct advertiser feedback of viewer information, except by voluntary action, such as direct contact, contest entry, purchase, and the like, is likely to be strongly resisted. Thus, an effective proxy filter is preferred to separate accounting issues from advertiser feedback.

EXAMPLE 32

User Input of Preferences

The system according to the present invention accommodates at least two different means of user definition of preferences. In a first mode, a user specifically or explicitly makes choices, much as in a questionnaire, to define explicit preferences. Alternately, a demographic profile may be obtained, which is then correlated with likely user preference based on collaborative filtering principles. These principles may, in turn, be explicitly defined as a set of rules or fuzzy rules, or derived from observation of persons with like demographic profiles. Typically, the questionnaire will be presented as a series of one or more screens, which may be part of a graphic user interface or character mode on screen display interface. The data will typically be stored locally in the hardware, and not transmitted, in order to preserve user privacy, but in certain circumstances transmission to a server may be acceptable. In order to avoid transmitting the user information to the server, the client appliance (e.g., set top box) must filter and select available content that meets the user criteria or corresponds to the user preference profile.

The user preference profile may also be derived implicitly by monitoring of the user's activities. These may include not only the selected content, but also the time of viewing, other persons with whom viewed, explicit feedback from the user, e.g., a binary like/dislike or a more fine-grained or multivariate evaluation.

Where the system employs content-based analysis of a media stream, it is also possible to rate temporal portions of the media stream, much as political analysts rate politician's performance during long speeches or debates. Therefore, rather than an analysis of the whole, user preference may be applied to particular scenes of a movie, for example. This, in turn, may be used to adaptively edit content. Thus, typical movies are edited for a showing time of 1.5 to 2 hours. Often, longer versions are available with additional scenes deemed non-critical for the performance, but otherwise meritorious. Therefore, a longer version of a movie may be streamed to a plurality of viewers or potential viewers, along with a scene list and description, which may be automatically or manually generated. The client device may then correlate the user preferences with individual scenes, potentially selecting longer or shorter sequences, or editing out portions entirely.

Similar technology allows interactive or immersive presentations, in which the user input controls the presentation in the manner of an immersive story video game.

The user profile(s) may also be provided using both explicit and implicit data. Further, extrinsic data may be submitted to the system, such as information contained in typical credit reports and other private mass archives of person information. This may include income and spending data, geographical demographic data, credit card and usage information, and the like.

EXAMPLE 33

Electronic Program Guide and Content Analysis System

In seeking to best make decisions relating to the content of a media stream, an electronic program guide or EPG is generally useful as a source of human editorial information relating to a media stream. This information is generally accurate, and properly parsed into standardized fields, making it easily searchable. On the other hand, such EPGs typically define the content of a "program" as a whole, and must be prepared in advance of the transmission, and thus have little detail relating to live or near live broadcasts, such as sports, television news, talk shows, news feeds, and the like. On the other hand, automated content analysis, while available for real time or near real time media streams, are limited by the reliability of the algorithms employed, which are typically substantially less than 100%. Content analysis algorithms also provide the ability to characterize individual scenes or even frames of a media stream, which may represent totally distinct concepts than those indicated in an EPG describing the program as a whole. Therefore, the present invention also provides a system that employs both EPGs and content analysis of media streams seeking to best characterize a media stream for action thereon. In such as system, the EPG is mostly relied upon for defining candidate programs, while the content analysis subsystem is relied upon for filtering the programs. The criteria used by each system may differ markedly, or be defined by a unified user preference profile or artificial agent scheme.

For example, in a business setting, an intelligent agent may be provided to screen broadcasts for news reports relating to certain stocks or companies. In this case, the EPG first defines news reports being broadcast. After determining which broadcasts are news, the content filter then analyses the content, for example by OCR of screen alphanumeric characters, speech recognition, and monitoring of closed caption text, if available. News stories that meet the desired characteristics are then stored for later viewing or immediately presented, for example. After defining stories of potential interest, the content may then be analyzed for significant core concepts, which may then be used to filter other stories that might be related. Thus, an intelligent and iterative process may be defined to filter and present information which meets certain criteria, which may be explicitly defined, such as by stock ticker symbol, or implicitly defined, such as by an indication of "track similar stories" by the user.

EXAMPLE 34

Advanced Set Top Box

An embodiment of the present invention provides an advanced set top box incorporating various features to facilitate user interaction and provide advanced functionality. A set top box generally has access to one or more broadband streams, meaning that audio or video media is delivered in essentially real time. Presently, there are a number of ways for a set top box to communicate with a remote computer system. For receipt of data, the set top box can extract data from a media stream, extract data from a special data-centric component of the media stream (both of which might be considered "in band" techniques), receive data through the same physical transport system, e.g., cable, satellite receiver, digital subscriber line (xDSL), etc. (which might be considered "out of band" techniques), or through a separate transport medium, such as the Internet, a dial-up analog modem over POTS, wireless link, paging network, or other known media. For transmission of data from the set top box to a remote computer through an uplink, in band techniques are unavailable, except in videoconference-type systems. Thus, cable modem (e.g., DOCSIS), xDSL, POTS, wireless link, bi-directional paging network, or the like may be employed. It is noted that, in some instances, a real-time uplink communication is not necessary, and therefore physical transport of computer storage media is possible, such as smart cards.

Within a local environment, greater flexibility is available for communication with nearby devices. Thus, in addition to techniques suitable for arbitrary distance computer networking (including "sneaker networks", i.e., physical medium transport), infrared, Bluetooth, wireless Ethernet (IEEE 802.11, 802.11a, 802.11b), powerline communications, HAVI-type systems, and other techniques are generally available.

Typically, it is desired from a consumer standpoint that the set top box integrate all functions associated with the (a) receipt of broadband data; and (b) presentation of the media stream to an output device. Thus, the device preferably encompasses data stream separation, e.g., separating audio streams, video streams, and data streams, presenting these to appropriate interfaces to other systems; archiving and time shifting; and selection and management of media programs. Further, it is preferred that various functions relating to management of data streams, such as those related to broadband data, be integrated within the set top box for convenience and to avoid unnecessary redundancy. Thus, for example, the set top box preferably incorporates a server, i.e., a system which provides a set of functionality for potentially remote clients, through a standard interface. Further, firewall functionality may also be integrated.

The set top box may also integrate functions desired by the content provider or network operator, e.g., the multiple service operator (MSO). For example, video-on-demand, pay-per view accounting, digital rights management and enforcement, and the like. Further, the set top box may perform various economic accounting functions, such as accounting for commercial (targeted or otherwise) viewing or listening, e-commerce portal functions.

For example, an Internet or broadband connection to the set top box may include proprietary media content, subject to usage restrictions. This may include music, movies, or the like. These are transmitted to the set top box in a format that is difficult for the human to directly perceive, i.e., scrambled or encrypted. Preferably, this stream is watermarked, i.e., includes an in band data stream identifying the media, which is difficult to filter from the stream. The set top box may then store the media or present it in real time, subject to the application of access rules and conditions, such as payment. Preferably, each set top box is separately addressable, and is in regular, though not necessarily continuous communication with a remote digital rights management server. For example, the defunct DiVx system provided one example of access limitations, which indeed raised issues with consumers.

In fact, media consumers in the U.S. have come to accept commercialism of the media, and thus have adopted and accepted the model of commercial subsidy of media content based on advertising. A new trend, indeed, seeks to subsidize media not only on the basis of advertisement presentations, but of actual "conversions", or responses of the consumer to the commercial opportunity. Thus, the set top box preferably implements a commercial subsidy or incentive system to compensate media proprietors for use of the media, to charge commercial sponsors and affiliates for presenting their opportunities to consumers, and provide a revenue stream to the service provider, such as the MSO. The consumer is typically in a neutral position, though it is possible to have a net accounting with the consumer for usage versus subsidy.

Therefore, proprietary media is transmitted or available to the set top box. The set top box may include various lock-out mechanisms, to ensure that accounting is current and to prevent "hacking". Thus, in a video on demand system, the stream may be encrypted based on a decryption key private to the targeted box, and which is subject to change or expiration. Thus, in order to remain operable, the set top box must be periodically reauthorized, typically in conjunction with an accounting information exchange.

Even where the media stream is not targeted to a particular set top box, techniques remain available to provide selective decryption or unscrambling of a public encrypted stream. For example, the public stream may be missing a small, though critical portion of the datastream. This portion may be determined based on visually (or audibly) significant data, or based on a complex algorithm. The missing data is then separately transmitted to each set top box. Thus, by transmitting only a small percentage of the data individually, targeting is possible.

For example, a MPEG 2 video stream is broadcast in encrypted format, with the decryption key known the population of set top boxes generally authorized. The MPEG 2 stream is missing a small percentage of data, macroblocks scrambled, or other distortion. The set top box, through, for example, a targeted transmission embedded in the broadband stream, a physical data token delivered to the user, or other data transmission pathway, is provided with the missing data or the descrambling algorithm. While the net result will generally be the same for each set top box, with the possible inclusion of watermarking, the deduction of the proper output modification requires the use of a unique identifier for each set top box in conjunction with the private data transmission.

This complex two-part (or multiple part) data transmission technique will therefore pose a significant impediment to circumvention. Where a bi-directional communication stream is present, the various codes may be changed frequently, asynchronously, and randomly. If the encryption system becomes compromised, preferably the algorithms and codes may preferably be updated through remote communications, without requiring hardware modification or exchange.

In order to provide hardware level security, preferably at least one custom application-specific integrated circuit (ASIC) with a unique or quasi-unique identifier is employed in the set top box for the decryption or descrambling, and a separately packaged, and securely encased and tamper resistant volatile memory device with the decryption codes or algorithm, keyed to the custom ASIC. The set top box has a clock, based on an embedded device or a network transmission.

Therefore, the set top box cannot be readily replicated, meaning that a hacker must have access to an authentic box. The separately packaged tamper resistant memory, e.g., a smart card, therefore becomes the weak link. In order to abate this risk, the memory preferably includes an automatic expiration. Thus, compromise of one card does not necessarily invalidate security of the entire system, and cracking of a scheme during one period does not necessarily crack the scheme of a subsequent period. Note that the present system is more secure than the Content Scrambling System (CSS) employed in DVDs, since multiple levels of dynamic and individualized security are provided.

This security system may also be used to protect user data, such as "wallet" information, which may be stored in the set top box, to facilitate e-commerce transactions.

The commercial subsidy accounting scheme may be conducted on line, or periodically, or using micropayment technology with typical non-real time data transfers.

While a present trend is toward higher quality media reproduction systems, content owners are typically wary about permitting distribution or broadcast of "master" digital recordings. One way to compromise between user desire for a perceived high quality presentation and a content owner desire to limit piracy possibility is to "enhance" the output in such manner as to improve, or at least not perceptibly impair the output, while changing the output in an irreversible manner. For example, many listening environments include noise, reverb, or non-uniform equalization. Therefore, a microphone or microphone array may be used to sense acoustic feedback for the set top box, and apply an inverse process or masking signal to the output. The result, therefore, is a perceptibly improved output, while producing an imperfect replica of the original.

In video presentation, ambient conditions can be compensated for. Further, presentation device distortion may also be compensated. Particular dithering patterns may be applied to map a compressed digital signal to an RGB, CMY or other type raster display. Edge enhancement techniques may be applied, based on perceptual models and/or models of the hardware device.

In order to prevent circumvention, if the feedback signals are "null" or provide insufficient data to distort (predistort) the signal to desired minimum levels, then a minimum distortion may be applied, for example seeking to mask certain known digital compression artifacts. Preferably, the distortion signal includes an audio or video watermark unique to the particular system, which is resistant to filtering and/or removal, without loss of image or audio fidelity. This watermark may be, for example, a pseudorandom imposed signal or other complex alteration of the source signal within the audio or video reproduction bandwidth, and preferably present throughout the presentation. This function may be selectively operable, to avoid distortion of authorized content or unprotected content.

If the monetary incentive to the consumer is reduced by providing zero net commercial subsidy for premium content, then the risks will be relatively low.

It is presently believed by network broadcasters that the advertising content of their broadcasts cannot properly be automatically stripped or replaced. While the veracity of this claim is as yet unverified, it is possible to apply rules both on a content-segment basis. Thus, it is possible to identify commercials, either through metadata coding or content-based analysis, to selectively preserve or eliminate this content. In this sense, the commercial broadcaster may be treated like any other content provider.

The user, in fact, may receive a significant benefit, by having greater control over content, commercial interruption, and costs.

According to the present invention, the set top box preferably operates in conjunction with user profiles, which may be expressly or implicitly defined.

In order to define an express user profile, for example, the user completes a survey or questionnaire, selects options from a pick list, etc. Typically, the user is provided with a set of choices, which may be binary, scalar or non-parametric, which are aligned with a set of categorizations of media data. Thus, by comparing a predetermined categorization of the media data, such as through an EPG, or by analyzing a media stream to ascertain certain predetermined characteristics, a correlation for each factor may be determined. The set of correlation factors are then weighted, to produce a composite score. Typically, higher scores lead to higher priority for the selected action, which might be, for example, recording or viewing. The weightings for various factors may be manually input by the user, determined empirically, or predetermined.

The user preferences may also be determined automatically. Typically, this is based on passive observation of habits, or feedback assisted, with user scoring of content. Typically, a feedback assisted algorithm will converge faster and more accurately than a passive observation algorithm. Further, with feedback available, the system may prompt the user to resolve an ambiguity or otherwise expressly define a decision that might otherwise be difficult based on the available data. In this case, the media content is associated with content metadata, which may be an EPG, automatically generated data set (either locally or remotely). MPEG 7 data, or editorial description. The data set vector or signature for each media program consumed is then recorded or captured. Over time and exposure, a plurality of vectors or signatures may be aggregated, by a process which may include training of a neural network, summation, or other technique, to a composite, which represents a user model. This user model is then applied to new media content, to determine a correspondence. A high correspondence infers a preference, while a low correspondence infers a low preference.

According to the present invention, different users may be segregated, and diurnal, weekly, monthly, seasonal, yearly, etc. preference attributes may be segregated.

Preferably, the system is capable of segmenting content into scenes or "pieces", based on content-independent criteria, such as fades, image change intensity (e.g., color or luminance histograms), or the like, content dependent criteria, such as intelligent image, audio, closed caption text analysis, or metadata. For example, in variety shows, different entertainers may be isolated. In news broadcasts, different types of news may be segregated.

In movies, various scenes may be identified, and based on user instruction, selectively accelerated, slowed, or eliminated. Thus, the user is provided with a degree of editorial control. It is typically difficult in movies and the like to automatically alter the segments, since one must defer, at least initially, to the original integral presentation. However, as metadata is provided for such types of content, automated processing and alteration of presentation style may be accomplished. For example, a movie may be provided with a variety of optional or alternate material. Based on the user preferences or profile, the move may be presented differently to different viewers. Likewise, commercial sponsorship may play a role in controlling a presentation, for example controlling commercial interruptions, and regular and premium content presentations. Using this metadata, films may also be edited on-the-fly to comply with parental controls, such as scenes involving sex, violence, adult language, etc. In a pretransmitted film, alternate scenes may be provided to avoid elimination of plot lines and to fulfill the desires of the filmmaker(s). The source of the media stream may be a broadband interface, a local persistent storage device, such as a hard disk, a digital video disk (DVD), a VCR, or other source.

In the event that alternate material is unavailable, or the scene is critical to the performance, or information is unavailable, or otherwise, the content analysis aspects of the present invention may be employed to "censor" the content. For example, a "nudity" detector may be employed to monitor broadcasts for visual depictions of nudity, which would then be eliminated, and replaced with blurs or otherwise obscured. The semantic content (audio or textual) may also be monitored for profane language and eliminated. (This same type of semantic content analyzer may also provide language translation functionality, using a speech recognition system, with either a close caption translation or synthetic speech translation). In the case of less discrete objectionable content, such as violence or adult themes, such discrete censorship would be less effective. However, using artificial intelligence and/or metadata streams (including but not limited to EPG, MPEG 7, V-chip ratings, or the like) the system may be able to block presentation on a less granular basis. The system may also provide a reporting system, wherein the controlling entity may define processing rules for common circumstances, either prospectively in the abstract or based on actual events stored in a buffer. Thus, the system may learn desired strategies for handling content issues, without requiring predefined deterministic algorithms.

The set top box preferably has a general purpose operating system, meaning that it is extensible and capable of supporting arbitrary software. For media processing, a degree of real time performance is required. This may be achieved by providing hardware determinism, e.g., hardware support which may be dedicated or reconfigurable, for the various features, or by providing an operating system capable of providing deterministic performance. Preferably, a combination of hardware and software support is provided. Thus, for example, principle functions of the video encoder and decoder are preferably implemented in hardware. Ancillary codec functions may optionally execute on a general purpose processor or reconfigurable processor. Thus, a DCT processor may be separate from a motion estimation processor. In addition, in order to support advanced and changing compression standards, a reconfigurable code algorithm or set of algorithms is preferably supported. These reconfigurable algorithms, by their nature, are executed on a non-preprogrammed processor, although a coprocessor arrangement dedicated to codec algorithm processing may be provided.

A separate hardware codec is preferred for two reasons. First, it potentially allows higher performance functioning, on a cost-comparable basis. Second, it frees a general purpose processor for other simultaneous functions, which may be unknown at the time of design. Thus, during normal media processing, only a small portion of the capacity of the main general purpose processor is consumed. Further, the normal media processing capability preferably includes receipt, through a broadband connection, of at least one media program. In some instances, these will be received in digital format, and thus do not necessarily require interaction with a codec. The received streams are arbitrated by an I/O processor, which may be an intelligent peripheral or require processing by the general purpose processor. Received media streams may be routed to a persistent storage device, a codec, a presentation device, or to a communications network. A preferred minimum capacity includes simultaneous and asynchronous or isosynchronous receipt of at least one analog broadcast, presentation of at least one broadcast in analog format, digital storage of at least one broadcast, and digital retrieval of at least one broadcast. Thus, the encoder and decoder are preferably separately operable, and the persistent storage media is preferably capable of full duplex operation.

One characteristic of a set top box is that it is often present within the media consumption environment, i.e., on top of a television set. Therefore, any noise generated by the set top box is potentially disruptive. Such noises include hard disk noise and fan noise. Preferably, the noise generating elements are isolated from the external housing of the set top box, so that primary noise emissions are though ventilation ports. Typically, a high functionality set top box consumes power, for the drive, processors, media drivers, etc., and thus requires cooling through such ports. According to the present invention, a single pair of ports is provided, an inlet and an outlet. A feedback-controlled audio transducer is provided at each port, generating a phase-inverted signal (antinoise) to reduce or eliminate the externally transmitted noise from the system. Further, certain noise-generating events may be predicted, for example by disk drive head transitions. These may be modeled, and thus the transducer preemptively driven to counteract the noise. Likewise, the transducer need not be an air-transducer. Thus, the an acoustic transducer may be mounted on a mechanical support which transmits a vibration. Thus, in contrast to existing disk drive technologies, for example from Quantum and Seagate, which seek to address the noise issue by eliminating vibrations, this aspect of the invention allows a direct elimination of propagation of the vibrations. Therefore, instead of spreading the vibrational energy over a broad band, to generate pink noise, the present invention may operate on narrow band vibrational signals, and indeed this may be preferred. Thus, it is preferred that the noise sources, and especially the hard drive, be isolated through resonant structures with a high Q factor, and indeed that the devices be constructed to generate vibrations in a narrow frequency band, corresponding to the resonant frequency. Thus, the antinoise transducers need not be broadband emitters, and may themselves operate efficiently at the design frequency.

Since the fan is only required to cool the enclosure, it may be operated adaptively depending on the presence of masking noises, and generally the temperature within the enclosure. Thus, instead of running the fan at a constant or temperature dependent speed, the fan speed is also dependent on the environmental noise and/or audio signal loudness. Since the acoustic signature of the fan is a general noise source, this noise may be subtracted from the normal audio output for compensation. The noise characteristics of the fan may be modeled, and therefore the speed of the fan adjusted to produce the desired noise spectrum. During quiet passages, for example, the fan may be turned off, until the temperature rises to an unacceptable level. Typically, when running, the fan will be run at an excess speed, in order to provide a thermal margin for extended duration quiet passages.

The controlled may also analyze future acoustic characteristics of stored media (or receive upcoming signature patterns in broadcasts), to optimize the control algorithm to maintain system performance. Thus, during an extended quiet passage, some noise may be unavoidable, while during a brief silent passage, all noises may be eliminated by stopping all mechanical noise sources.

For example, the drive head servo may be controlled to produce a vibration having a controlled characteristic. Likewise, variable speed spindle motors may be controlled to produce narrow-band emissions. Drive bearings, to the extend audible, may also be tuned. These various components need not be tuned to the same frequency, and indeed multiple transducers may be provided. Transducer may also be provided to generate waves of various types, for example Rayleigh or Lamb waves, horizontally polarized shear waves or various orders, and the like. The transducers will typically be piezoelectric crystals or electromagnetic devices operating on an existing portion of the structure or a specially provided element, such as an armature or solenoid. Compensating transducers may be mounted directly or indirectly to an acoustically transmissive structure in the path of a vibrational wave, with the goal of either negating the vibration, or distributing its energy into acoustically imperceptible or acoustically acceptable modes, or both. While it may be possible to predict all vibrations emitted by the drive, and therefore provide a predetermined compensating signal, often a feedback transducer or transducer signal will be required. In order to sense the acoustic signature, a microphone or vibrational transducer is provided, for example, near either the source of vibration, the compensating transducer, or the acoustic exit port. It may be required to provide feedback transducers sensitive to various vibrational modes, although this is not necessary in all cases. The compensation transducer drive control may employ a number of techniques. Initially, a general model of the noise source and noise propagation characteristics of the system is employed. This model may be tuned through a neural network, fuzzy-neural network, genetic algorithm, or advanced modeling techniques. The model receives inputs from either the disk control system, acoustic feedback transducer(s) or both. The model is then used to driver compensating transducers, to reduce or eliminate the noise. Advantageously, the system may employ multiple stages of noise reduction; for example, different mechanical supporting structures may have different characteristics in terms of receipt of vibrations, propagation of vibrations, resonance, and/or accessibility for compensating transducers. Thus, the control, feedback and plant operate as a single system.

It is also noted that the compensation system may be a passive tunable device, for example a controllable (tunable) hydraulic damper, to selectively absorb vibrations.

Similar techniques may be applied to various subsystems within the set top box, for example removable storage media drives, fans, or other dynamic mechanical components. Indeed, these techniques may also be applied to appliances other than set top boxes, such as general purpose personal computers and a variety of appliances. While the maximum complexity of the active noise reduction system is unlimited, often the principal audible components propagated external to the housing may be compensated by a relatively simple system, which for example includes a controller, which may be integral with a component control, and a compensating transducer system, which, for example, includes an electromechanical actuator with a dynamic armature to counteract relatively high amplitude, low frequency impulses, and a relatively broadband piezoelectric transducer, mounded to the housing, to eliminate a residual acoustic signature. The system may operate without feedback, using a predetermined component model, or include a feedback transducer. The control typically includes a digital signal processor, to calculate an optimal noise-control strategy, which will involve both control of the noise-generating components and the noise abatement components. Since acoustically optimal control of the component may require limiting a performance envelope, it is possible to provide multiple modes of operation, e.g., quite and high performance.

It is also noted that the intrinsic noise of the set top box may be included in the acoustic signature to be compensated by a digital rights management/watermarking system. Thus, the acoustic output signal from the system may include compensation and/or masking components for the intrinsic noise of the system. Further, the control may be operated to be synchronized with the intended output signature, so that the acoustically emissive components become part of the speaker system, and indeed the audio output signal is compensated for these components. Thus, the electronic audio output signal will be distorted from its original state.

In order to provide the ability to time-synchronize mechanical events, preferably relatively large non-mechanical memory buffers are provided for the media signal. For example, 1–60 seconds. These buffers may support trick play functions as well, and allow more efficient disk drive access schemes to be implemented. For example, see WO 00/73368 and U.S. Ser. No. 09/126,071 (30 Jul. 1998), WO 99/52279 and U.S. Ser. No. 09/054,604 (3 Apr. 1998), WO 00/18108 and U.S. Ser. No. 09/135,753 (18 Aug. 1998), expressly incorporated herein by reference.

In formulating a user history and preference profile, preferably the actual user habits and actions during the performance are monitored, rather than simply the performance itself. Therefore, if viewing of a film is interrupted for a period, viewing may be recommenced at the beginning of the scene or segment. Thus, a subatomic usage history is preferably stored in association with each content segment, and indeed may be stored even if the content is not accessible, for future use. Thus, if a library of DVDs is provided, even if the DVD is not in the drive, a memory of the usage pattern may be preserved.

The set top box may also incorporate a variety of telecommunications functions. For example, the box may serve as a hub and/or router or switch for POTS (modem) or broadband digital communications, such as cable modem, xDSL, satellite downlink, or the like. Likewise, the box may provide a gateway for telephony, including POTS, voice over Internet Protocol, voice over DSL, wireless telephony and cellular (49 MHz, 900 MHz, 2.4 GHz, 5.8 GHz, DECT, MAPS, IS-95, IS-95a, IS-136, CDM, TDM, PCS, GSM, Bluetooth, wireless Ethernet [IEEE 802.11, 802.11a, 802.11b, etc.], H.320, H.323, H.324), satellite, and the like. The telephone functions may include, for example, known call center functions, private branch exchange functions, auto-attendant and voice mail functions, music-on-hold, video-on-hold (for video conferencing and/or broadband connections), voice over data communications, and the like. The key purposes of integrating telecommunications with the box are (a) use of existing hardware and software; (b) proximity of the box to broadband interface; (c) likely need in the same user environment; and (d) use of telecommunications control channels to and from the box.

The set top box typically also provides a jukebox function for audio and/or video programs, preferably under control of the DRM system. Thus, MPEG 2, Audio Level 3 (MP3) files, Windows Media (WMA) files, and a broad range of other known media format files may be supported by the system. Further, the system preferably either includes a receiver or interfaces to a receiver for broadcast media, such as FM radio. Therefore, the system can record and manage broadcast streams, which may be excluded from DRM scope. However, for example, in a commercial environment, the system may support automated accounting and payment of royalties to artists for public performance. This can be accomplished by accessing a program guide for the broadcast, analyzing embedded watermarks within the broadcast, such as Digimarc for images and various schemes, such as proposed by Arbitron, Verance, and others for audio. Further, the broadcast can be analyzed and a signature compared to a known signature for a work, thus identifying the broadcast. Fir example, a MIDI file may be stored for various works. An incoming signal is captured and digitized, and analyzed for musical content. The musical content may then be compared with the MIDI file, which provides, in efficient digital form, the musical content, to identify the song. The signature file need not include the entire song, and indeed may include only a small portion or periodic and characteristic segments. Further, the categorization need not be pure musical content, and may include a host of parameters that may be derived automatically from the content.

The jukebox may then present to the user or group of user an optimized presentation, which may differ significantly from the source broadcast or available library. This presentation will depend on the user or group composite profile, and may be user feedback directed. The selection, ordering, and repetition of content are subject to control, in addition to volume, frequency equalization, reverb, and other characteristics.

In a passive data user profile data acquisition system, the techniques may include those disclosed in WO 00/33224 and U.S. Ser. No. 60/110,301 (30.11.98), WO 00/49801 and US Ser. No. 60/120,722 (17.02.99) and U.S. Ser. No. 09/449,887 (30.11.99), WO 99/65237 and U.S. Ser. No. 09/096,592 (12.06.98), WO 99/43111, WO 00/36836 and U.S. Ser. No. 09/216,688 (16.12.98), WO 99/46719 and U.S. Ser. No. 09/038,380 (11.03.98), WO 99/51031 and U.S. Ser. No. 09/049,884 (27.03.908), WO 99/66726 and U.S. Ser. No. 09/098,726 (17.06.98), WO 00/36775 and U.S. Ser. No. 09/211,541 (15.12.98), U.S. Pat. No. 6,119,101, each of which is expressly incorporated herein by reference. Active (feedback dependent) user data profiling techniques may include those disclosed in WO 99/45701 and U.S. Ser. No. 09/034,934 (04.03.98), WO 99/45709, WO 00/27117 and U.S. Ser. No. 09/183,732 (30.10.98), WO 00/30345 and U.S. Ser. No. 60/107,949 (12.11.98), WO 00/30350, WO 00/40017 and U.S. Ser. No. 60/113,967 (28.12.98), WO 00/45319 and U.S. Ser. No. 60/117,828 (29.01.99), each of which is expressly incorporated herein by reference.

It should be understood that the preferred embodiments and examples described herein are for illustrative purposes only and are not to be construed as limiting the scope of the present invention, which is properly delineated only in the appended claims.

REFERENCES

"32-bit Floating-Point DSP Processors". EDN, Nov. 7, 1991, pp. 127–14.

"A New Class of Markov Processes for Image Encoding", School of Mathematics, Georgia Inst. of Technology (1988), pp. 14–32.

"A show and tell of the QBIC technology—Query By Image Content (QBIC)", IBM QBIC Almaden web site, pp. 1–4.

"ABI WHAP, Web Hypertext Applications Processor," http://alphabase.com/abi3/whapinfo.html#profiling, (1996, Jul. 11).

"AdForce Feature Set", http://www.imgis.com/index.html/core/p2—2html (1997, Apr. 11).

"Bar Code Programs VCR", Design News, Feb. 1, 1988, 26.

"C-Cube CL550 JPEG Image Compression Processor", Preliminary Data Book, August 1991, and addendum dated Nov. 20, 1991.

"Chaos & Non-Linear Models in Economics".

"Chaos Theory in the Financial Markets. Applying Fractals, Fuzzy Logic, Genetic Algorithms".

"Construction of Fractal Objects with Iterated Function Systems", Siggraph '85 Proceedings, 19(3):271–278 (1985).

"Data Compression: Pntng by Numbrs", The Economist, May 21, 1988.

"EMC² Pushes Video Rental By Satellite", Electronic Engineering Times, Dec. 2, 1991, p.1, p. 98.

"Evolutionary Economics & Chaos Theory".

"Finger Painting", Information Display 12, p. 18, 1981.

"Four Eyes", MIT Media Lab web site; pp. 1–2.

"Fractal Geometry-Understanding Chaos", Georgia Tech Alumni Magazine, p. 16 (Spring 1986).

"Fractal Modelling of Biological Structures", Perspectives in Biological Dynamics and Theoretical Medicine, Koslow, Mandell, Shlesinger, eds., Annals of New York Academy of Sciences, vol. 504, 179–194 (date unknown).

"Fractal Modelling of Real World Images, Lecture Notes for Fractals: Introduction, Basics and Perspectives", Siggraph (1987).

"Fractals Yield High Compression"; Electronic Engineering Times; Sep. 30, 1991; p. 39.

"Fractals—A Geometry of Nature", Georgia Institute of Technology Research Horizons; p. 9 (Spring 1986).

"Frequently asked questions about visual information retrieval", Virage Incorporated web site; pp. 1–3.

"How to find the best value in VCRs", Consumer Reports, March 1988, 135–141.

"IBM Ultimedia Manager 1.1 and Clinet Search", IBM software web site, pp. 1–4.

"Image Compression Using Fractals and Wavelets", Final Report for the Phase II Contract Sponsored by the Office of Naval Research, Contract No. N00014-91-C-0117, Netrologic Inc., San Diego, Calif. (Jun. 2, 1993).

"Image Detection and Registration", Digital Image Processing, Pratt, Wiley, N.Y., 1991.

"IPRO," http://www.ipro.com/, Internet profiles Corporation Home and other Web Pages (1996, Jul. 11).

"Jacob Methodology" @ http://WWCSAI.diepa.unipa.it/research/projects/jacob/jacob-method.html.

"Low-Cost VCRs: More For Less", Consumer Reports, March 1990, 168–172.

"Machine Now Reads, enters Information 25 Times Faster Than Human Keyboard Operators", Information Display 9, p. 18 (1981).

"Market Analysis. Applying Chaos Theory to Investment & Economics".

"Media Planning is Redefined in a New Era of Online Advertising," PR Newswire, (1996, Feb. 5).

"MPEG: A Video Compression Standard for Multimedia Applications", Le Gall, Communications of the ACM, vol. 34, No. 4, April 1991, pp. 47–58.

"My Yahoo! news summary for My Yahoo! Quotes", http://my.yahoo.con, (1997, Jan. 27).

"NetGravity Announces Adserver 2.1", http://www.netgravity.com/news/pressrel/launch21.html (1997, Apr. 11).

"Netscape & NetGravity: Any Questions?", http://www.netgravity.com/, (1996, Jul. 11).

"Network Site Main", http://www.doubleclick.net/frames/general/nets2set.htm (1997, Apr. 11).

"New Beetle Cursor Director Escapes All Surface Constraints", Information Display 10, p. 12, 1984.

"Nielsen Views VCRs", Television Digest, Jun. 23, 1988, 15.

"Photobook", MIT Media Lab web site; Aug. 7, 1996; pp. 1–2.

"Profiting from Chaos. Using Chaos Theory for Market Timing, Stock Selection & Option".

"Real Media," http://www.realmedia.com/index.html, (1996, Jul. 11).

"Scanner Converts Materials to Electronic Files for PCs", IEEE CG&A, December 1984, p. 76.

"Shape Analysis", Digital Image Processing, Pratt, Wiley, N.Y., 1991.

"The Front Page", http://live.excite.com/?aBb (1997, Jan. 27) and (1997, Apr. 11).

"The Highs and Lows of Nielsen Homevideo Index", Marketing & Media Decisions, November 1985, 84–86+.

"The Pointcast Network," http:/www.pointcast.com/, (1996, Spring).

"The Power of PenPoint", Can et al., 1991, p. 39, Chapter 13, pp. 258–260.

"The QBIC Project", IBM QBIC Almaden web site, home page.

"The Quest for 'User Friendly'", U.S. News & World Report. Jun. 13, 1988, 54–56.

"The Smart House: Human Factors in Home Automation", Human Factors in Practice, December 1990, 1–36.

"VCR, Camcorder Trends", Television Digest, Vol. 29, Mar. 20, 1989, 16.

"VCR's: A Look At The Top Of The Line". Consumer Reports, March 1989, 167–170.

"VHS Videocassette Recorders", Consumer Guide, 1990, 17–20.

"Virage—Visual Information Retrieval", Virage Incorporated, home page.

"Virage Products", Virage Incorporated web site; pp. 1–2.

"Visual Information Retrieval: A Virage Perspective Revision 3", Virage Incorporated web site; 1995; pp. 1–13.

"Visual Pattern Recognition by Moment Invariants", IRE Trans. Inform. Theory, vol. 8, February 1962, pp. 179–187.

"Voice Recognition and Speech Processing", Elektor Electronics, September 1985, pp. 56–57.

"Welcome to Lycos," http://www.lycos.com, (1997, Jan. 27).

"Workshop Report: NSF—ARPA Workshop on Visual Information Management Systems", Virage Incorporated web. site; pp. 1–15.

"WWW.amazon.com".

"WWW.firefly.com".

Abadi, M., et al, "Authentication and Delegation with Smart-cards", Oct. 22, 1990, revised Jul. 30, 1992 Report 67, Systems Research Center, Digital Equipment Corp., Palo Alto, Calif.

Abatemarco, Fred, "From the Editor", Popular Science, September 1992, p. 4

Abe, S., Y. Tonomura, Systems and Computers in Japan, vol. 24, No. 7, "Scene Retrieval Method Using Temporal Condition Changes", pp. 92–101, 1993.

Abedini, Kamran, "An Ergonomically-improved Remote Control Unit Design", Interface '87 Proceedings, 375–380.

Abedini, Kamran, and Hadad, George, "Guidelines For Designing Better VCRs", Report No. IME 462, Feb. 4, 1987.

Advertisement for "TV Decision," CableVision, Aug. 4, 1986.

Aleksander, I., "Guide to Pattern Recognition Using Random-Access Memories", Computers and Digital Techniques, 2(1):29–40 (February 1979).

American National Standard, "Financial Institution Retail Message Authentication", ANSI X9.19 1986.

American National Standard, "Interchange Message Specification for Debit and Credit Card Message Exchange Among Financial Institutions", ANSI X9.2-1988.

Anderson, F., W. Christiansen, B. Kortegaard, "Real Time, Video Image Centroid Tracker". Apr. 16–20, 1990.

Anderson, Ross J., "UEPS—A Second Generation Electronic Wallet", Proc. of the Second European Symposium on Research in Computer Security (ESORICS), Toulouse, France, pp. 411–418, Toulouse, France.

Anderson, Ross, "Why Cryptosystems Fail", Proc. 1st Conf. Computer and Comm. Security, pp. 215–227, November 1993.

Anson, L., "Fractal Image Compression", Byte, October 1993, pp. 195–202; "Fractal Compression Goes On-Line", Byte, September 1993.

Anson, L., M. Barnsley; "Graphics Compression Technology"; SunWorld; pp. 43–52 (October 1991).

Antonofs, M., "Stay Tuned for Smart TV," Popular Science, November 1990, pp. 62–65.

Appriou, A., "Interet des theories de l'incertain en fusion de donnees", Colloque International sur le Radar Paris, 24–28 avril 1989.

Appriou, A., "Procedure d'aide a la decision multi-informateurs. Applications a la classification multi-capteurs de cibles", Symposium de l'Avionics Panel (AGARD) Turquie, 25–29 avril 1988.

Arman et al., "Feature Management for Large Video Databases", 1993. (Abstract Only).

Arman et al., "Image Processing on Compressed Data for Large Video Databases", Proc. of First ACM Int. Conf. on Multimedia, Anaheim, Calif., 1–6 August 1993, pp. 267–272.

Arman et al., "Image Processing on Encoded Video Sequences", ACM Multimedia Systems Journal, to appear 1994.

Arndt, T., "A Survey of Recent Research in Image Database Management", IEEE Publication No. TH0330-1/90/0000/0092, pp. 92–97, 1990.

Arrow, K. J., "Social choice and individual valves", John Wiley and Sons Inc. (1963).

Arrowsmith, D K & C M Place: "An Introduction to Dynamical Systems", Cambridge University Press, Cambridge, 1990.

Asian Technology Information Program (ATIP) Report: ATIP95.65: Human Computer Interface International. July 1995 Yokohama.

Astrom, K. J., and B. Wittenmark, "Adaptive Control", Addison-Wesley Publishing Company (1989) pp. 105–215.

Astrom, K. J., T. Hagglund, "Automatic Tuning of PID Controllers", Instrument Society of America, Research Triangle Park, N.C. (1988) pp. 105–132.

Atkinson, Terry, "VCR Programming: Making Life Easier Using Bar Codes".

Bach, J. R., C. Fuller, A. Gupta, A. Hampapur, B. Horowitz, R. Humphrey, R. C. Jain, and C. Shu. Virage image search engine: an open framework for image management. In Symposium on Electronic Imaging: Science and Technology—Storage & Retrieval for Image and Video Databases IV, pages 76–87. IS&T/SPIE, 1996.

Bagley, H. & Sloan, J., "Optical Processing: Ready For Machine Vision?", Photonics Spectra, August 1993, pp. 101–106.

Bains, S., "Trained Neural Network Recognizes Faces", Laser Focus World, June, 1993, pp. 26–28.

Baker, Gregory L., & Jerry P Gollub: "Chaotic Dynamics: An Introduction", Cambridge University Press, Cambridge, 1990.

Baldwin, William, "Just the Bare Facts, Please", Forbes Magazine, Dec. 12, 1988.

Ballard, D. H., and Brown, C. M., Computer Vision, Prentice Hall, Englewood Cliffs, N.J. (1982); Optical Engineering 28:5 (May 1988) (Special Issue on product inspection).

Barber et al. "Ultimedia Manager: Query by Image Content and it's Applications" IEE, 1994, pp. 424–429, January 1994.

Barnsley et al., "A Better Way to Compress Images". Byte, January 1988, pp. 213–225.

Barnsley et al., "Chaotic Compression", Computer Graphics World, November 1987.

Barnsley et al., "Harnessing Chaos For Images Systhesis", Computer Graphics, 22(4):131–140 (August, 1988).

Barnsley et al., "Hidden Variable Fractal Interpolation Functions", School of Mathematics, Georgia Institute of Technology, Atlanta, Ga. 30332, July, 1986.

Barnsley, M., L. Anson, "Graphics Compression Technology, SunWorld, October 1991, pp. 42–52.

Barnsley, M. F., A. Jacquin, F. Malassenet, L. Reuter & A. D. Sloan, 'Harnessing chaos for image synthesis', Computer Graphics, vol 22 no 4 pp 131–140, (August, 1988).

Barnsley, M. F., A. E. Jacquin, 'Application of recurrent iterated function systems to images'. Visual Comm. and Image Processing, vol SPIE-1001, 1988.

Barnsley, M. F., "Fractals Everywhere", Academic Press, Boston, MA, 1988.

Barnsley, M. F., and Demko, S., "Iterated Function Systems and The Global Construction of Fractals", Proc. R. Soc. Lond., A399:243–275 (1985).

Barnsley, M. F., Ervin, V., Hardin, D., Lancaster, J., "Solution of an Inverse Problem for Fractals and Other Sets", Proc. Natl. Acad. Sci. U.S.A., 83:1975–1977 (April 1986).

Barros, et al. "Indexing Multispectral Images for Content-Based Retrieval", Proc. 23rd AIPR Workshop on Image and Information Retrieval, Proc. 23rd Workshop, Washington, D.C., October 1994, pp. 25–36.

Batchelor, B. G., "Pattern Recognition, Ideas in Practice", Plenum Press, London and New York, (1978).

Batchelor, B. G., "Practical Approach to Pattern Classification", Plenum Press, London and New York, (1974).

Baxes, Gregory A., "Digital Signal Processing, A Practical Primer", Prentice-Hall, Englewood Cliffs, N.J. (1984).

Beaumont J M, "Image data compression using fractal techniques ", British Telecom Technological Journal 9(4) :93–108 (1991).

Belkin, N.J., Croft, W. B., "Information Filtering And Information Retrieval: Two Sides of the Same Coin?", Communications of the ACM, December 1992, vol. 35, No. 12, pp. 29–38.

Bellman, R. E., L. A. Zadeh, "Decision making in a fuzzy environment", Management Science, 17(4) (December 1970).

Bender, M., "EFTS: Electronic Funds Transfer Systems", Kennikat Press, Port Washington, N.Y., pp. 43–46 1975.

Bensch, U., "VPV—VIDEOTEXT PROGRAMS VIDEORECORDER", IEEE Transactions on Consumer Electronics, Vol. 34, No. 3, 788–792 (1988)*.

Berger, Ivan, "Secrets of the Universals", Video, February 1989, 45–47+.

Beringer, D. B., "A Comparative Evaluation of Calculator Watch Data Entry Technologies: Keyboards to Chalkboards", Applied Ergonomics, December 1985, 275–278.

Bemiker, M., "Nielsen plans Internet Service," Broadcasting & Cable, 125(30):34 (1995, Jul. 24).

Berry, Deanne, et al. In an Apr. 10, 1990 news release, Symantec announced a new version of MORE (TM).

Berry, Jonathan, "A Potent New Tool for Selling Database Marketing". Business Week, Sep. 5, 1994, pp. 34–40.

Berry, M V, I C Persival & N O Weiss: "Dynamical Chaos". The Royal Society. London, 1987, Proceedings of a Royal Society Discussion Meeting held on 4 & 5 Feb. 1987.

Bestler, Caitlin: Flexible Data Structures and Interface Rituals For Rapid Development of OSD. Applications; 93 NCTA Tech. Papers; Jun. 6, 1993; pp. 223–236.

Betts, M., "Sentry cuts access to naughty bits," Computers and Security, vol. 14, No. 7, p. 615 (1995).

Bhatnagar, R. K., L. N. Kamal, "Handling uncertain information: a review of numeric and non-numeric methods", Uncertainty in Artificial Intelligence, L. N. Kamal and J. F. Lemmer, Eds. (1986).

Bier, E. A. et al. "MMM: A User Interface Architecture for Shared Editors on a Single Screen," Proceedings of the ACM Symposium on User Interface Software and Technology, Nov. 11–13, 1991, p. 79.

Bimbo et al., "Sequence Retrieval by Contents through Spatio Temporal Indexing", IEEE on CD-ROM, pp. 88–92, Aug. 24, 1993.

Bimbo, A. D., et al, "3-D Visual Query Language for Image Databases", Journal Of Visual Languages & Computing, 1992, pp. 257–271.

Binaghi, E., et al, "Indexing and Fuzzy Logic Based Retrieval of Color Images", Visual Database Systems, II, 1992, pp. 79–92.

Binaghi, E., et al., "A Knowledge-Based Environment for Assessment of Color Similarity", Proc. 2nd Annual Conference on Topics for A1, pp. 268–285 (1990).

Bishop, Edward W., and Guinness, G. Victor Jr., "Human Factors Interaction with Industrial Design", Human Factors, 8(4):279–289 (August 1966).

Blair, D., R. Pollack, "La logique du choix collectif" Pour la Science (1983).

Bolot, J.; Turletti, T. & Wakeman, I.; "Scalable Feedback Control for Multicast Video Distribution In the Internet", Computer Communication Review, vol. 24, No. 4 Oct. 1994, Proceedings of SIGCOMM 94, pp. 58–67.

Bos et al., "SmartCash: a Practical Electronic Payment System", pp. 1–8; August 1990.

Boy, Guy A., Intelligent Assistant Systems, Harcourt Brace Jovanovich, 1991, uses the term "Intelligent Assistant Systems".

Bristol, E. H., & T. W. Kraus, "Life with Pattern Adaptation", Proceedings 1984 American Control Conference, pp. 888–892, San Diego, Calif. (1984).

Brown, Edward, "Human Factors Concepts For Management", Proceedings of the Human Factors Society. 1973, 372–375.

Brown, Robert: "Statistical Forecasting for Inventory Control", McGraw-Hill Book Co., New York, 1958.

Bruce, J W, & P J Giblin: "Curves and Singularities", Cambridge University Press, Cambridge, 1992.

Brugliera, Vito, "Digital On-Screen Display—A New Technology for the Consumer Interface", Symposium Record Cable Sessions. Jun. 11, 1993, pp. 571–586.

Bulkeley, Debra, "The Smartest House in America", Design News, Oct. 19, 1987, 56–61.

Burk et al, "Value Exchange Systems Enabling Security and Unobservability", Computers & Security, 9 1990, pp. 715–721.

Burr, D. J., "A Neural Network Digit Recognizer", Proceedings of the 1986 IEEE International Conference of Systems, Man and Cybernetics, Atlanta. Ga., pp. 1621–1625.

Bursky, D., "Improved DSP ICs Eye New Horizons", Electronic Design, Nov. 11, 1993, pp. 69–82.

Bussey, H. E., et al., "Service Architecture, Prototype Description, and Network Implications of a Personalized Information Grazing Service," IEEE Multiple Facets of Integration Conference Proceedings, vol. 3, No. Conf. 9, Jun. 3, 1990, pp. 1046–1053. Byte Magazine, January 1988.

Caffery, B., "Fractal Compression Breakthrough for Multimedia Applications", Inside, Oct. 9, 1991.

Card, Stuart K., "A Method for Calculating Performance times for Users of Interactive Computing Systems", IEEE, 1979, 653–658.

Carlson, Mark A., "Design Goals for an Effective User Interface", Human Interfacing with Instruments, Electro/82 Proceedings, Mar. 1, 2001–Mar. 1, 2004.

Carpenter, G. A., S. Grossberg, "The Art of Adaptive Pattern Recognition by a Self-Organizing Neural Network", IEEE Computer, March 1988, pp. 77–88.

Carroll, Paul B., "High Tech Gear Draws Cries of "Uncle", Wall Street Journal, Apr. 27, 1988. 29.

Casasent, D., and Tescher, A., Eds., "Hybrid Image and Signal Processing II", Proc. SPIE Technical Symposium, April 1990, Orlando Fla. 1297 (1990).

Casasent, D., et al., "General I and Q Data Processing on a Multichannel AO System", Applied Optics, 25(18):3217–24 (Sep. 15, 1986).

Casasent, D., Photonics Spectra, November 1991, pp. 134–140.

Casdagli, Martin, & Stephen Eubank: "Nonlinear Modelling and Forecasting", Addison-Wesley Publishing Co., Redwood City, 1992.

Case Study: The CIRRUS Banking Network, Comm. ACM 8, 28 pp. 7970–8078, August 1985.

Caudill, M., "Neural Networks Primer-Part III", AI Expert, June 1988, pp. 53–59.

Cawkell, A. E., "Current Activities in Image Processing Part III: Indexing Image Collections", CRITique, vol. 4, No. 8, May 1992, pp. 1–11, ALSIB, London.

Chalmers, M., Chitson, P., "Bead: Explorations In Information Visualization", 15th Ann. Int'l SIGIR 92/Denmark—June 1992, pp. 330–337.

Chang et al., "Image Information Systems: Where Do We Go From Here?", IEEE Transactions on Knowledge and Data Engineering, vol. 4, No. 5, October 1992, pp. 431–442.

Chang et al., "Intelligent Database Retrieval by Visual Reasoning", PROC Fourteenth Annual International Computer Software and Application Conference, 31 Oct.–1 November 1990, pp. 459–464.

Chang, C., "Retrieving the Most Similar Symbolic Pictures from Pictorial Databases", Information Processing & Management, vol. 28, No. 5, 1992.

Chang, C., et al, "Retrieval of Similar Pictures on Pictorial Databases", Pattern Recognition, vol. 24, No. 7, 1991, pp. 675–680.

Chang, N. S., et al., "Picture Query Languages for Pictorial Data-Base Systems", Computer vol. 14, No. 11, pp. 23–33 (November 1981).

Chang, N. S., et al., "Query-by-Pictorial Example", IEEE Transactions on Software Engineering, vol. SE-6, No. 6, pp. 519–524 (November 1980).

Chang, S., et al, "An Intelligent Image Database System", IEEE Transactions On Software Engineering, vol. 14, No. 5, May 1988, pp. 681–688.

Chang, S.-F, Compressed-domain techniques for image/video indexing and manipulation. In Proceedings, I.E.E.E. International Conference on Image Processing, Washington, D.C., October 1995. invited paper to the special session on Digital Library and Video on Demand.

Chang, S.-K., Principles of Pictorial Information Systems Design. Prentice Hall, 1989.

Chang, S.-K., Q. Y. Shi, and C. Y. Yan. "Iconic indexing by 2-D strings". IEEE Trans. On Pattern Analysis And Machine Intelligence, vol. 9, No. 3, May 1987, pp. 413–428.

Chang, Yuh-Lin, Zeng, Wenjun, Kamel, Ibrahim, Alonso, Rafael, "Integrated Image and Speech Analysis for Content-Based Video Indexing".

Chao, J. J., E. Drakopoulos, C. C. Lee, "An evidential reasoning approach to distributed multiple hypothesis detection", Proceedings of the 20th Conference on decision and control, Los Angeles, Calif., December 1987.

Chao, T.-H.; Hegblom, E.; Lau, B.; Stoner, W. W.; Miceli, W. J., "Optoelectronically implemented neural network with a wavelet preprocessor", *Proceedings of the SPIE—The International Society for Optical Engineering*, 2026:472–82(1993).

Chapra, Steven C, & Raymond P Canale: "Numerical Methods for Engineers", McGraw-Hill Book Co., New York, 1988.

Charles, S., et al, "Using Depictive Queries to Search Pictorial Databases", Human Computer Interaction, 1990, pp. 493–498.

Chassery, J. M., et al., "An Interactive Segmentation Method Based on Contextual Color and Shape Criterion", IEEE Transactions on Pattern Analysis and Machine Intelligence, vol. PAMI-6, No. 6, (November 1984).

Chaum et al, "Untraceable Electronic Cash", Advances in Cryptology, 1988, pp. 319–327.

Chaum et al; "Achieving Electronic Privacy", Scientific American, pp. 319–327; 1988.

Chaum, D. "Security without Identification: Card Computers to Make Big Brother Obsolete", Communications of the ACM, 28(10), October 1985, pp. 1030–1044.

Chaum, D. "Untraceable Electronic Mail, Return Addresses, and Digital Pseudonyms", Communications of the ACM, vol. 24, No. 2, Feb., 1981.

Chaum, D., "Achieving Electronic Privacy", Scientific American, August 1992, pp. 96–101.

Chaum, D. L. et al.; "Implementing Capability-Based Protection Using Encryption"; Electronics Research Laboratory, College of Engineering, University of California, Berkeley, Calif.; Jul. 17, 1978.

Chen et al., "Adaptive Coding of Monochrome and Color Images", November 1977, pp. 1285–1292.

Chen. Z., et al, "Computer Vision for Robust 3D Aircraft Recognition with Fast Library Search", Pattern Recognition, vol. 24, No. 5, pp. 375–390, 1991, printed in Great Britain.

Cheong, C. K.; Aizawa, K.; Saito, T.; Hatori, M., "Adaptive edge detection with fractal dimension", *Transactions of the Institute of Electronics, Information and Communication Engineers D-II*, J76D-II(11):2459–63 (1993).

Child, Jeff. "H.324 Paves Road For Mainstream Video Telephony", *Computer Design*, January 1997, pp. 107–110.

Chua, T.-S., S.-K. Lim, and H.-K. Pung. Content-based retrieval of segmented images. In Proc. ACM Intern. Conf. Multimedia, October 1994.

Cobb, Nathan, "I don't get it", Boston Sunday Globe Magazine, Mar. 25, 1990, 23–29.

Cohen, Danny; "Computerized Commerce"; ISI Reprint Series ISI/RS-89/243; October, 1989; Reprinted from Information Processing 89, Proceedings of the IFIP World Computer Congress, held Aug. 28–Sep. 1, 1989.

Cohen, Danny; "Electronic Commerce"; University of Southern California, Information Sciences Institute, Research Report ISI/RR-89-244; October, 1989.

Cohen, R., "FullPixelSearch Helps Users Locate Graphics", MacWeek, Aug. 23, 1993, p. 77.

Commaford, C., "User-Resonsive Software Must Anticipate Our Needs", PC Week, May 24, 1993.

Common European Newsletter, Multimedia Content manipulation and Management, http://ww.esat.kuleuven.ac.be/~konijin/ . . . .

CompuServe Information Service Users Guide, CompuServe International, 1986, pp. 109–114.

Computer Shopper, November 1994, "Internet for Profit", pp. 180–182, 187, 190–192, 522–528, 532, 534.

Computer Visions, Graphics, and Image Processing 1987, 37:54–115.

Computer, Vol. 28(9), September 1995.

Computers and Biomedical Research 5, 388–410 (1972).

Compuvid Sales Manual (date unknown).

Consumer Digest advertisement: Xpand Your TV's Capability: Fall/Winter 1992; p. 215.

Cooper, L. N., "A Possible Organization of Animal Memory and Learning", Nobel 24, (1973), Collective Properties of Physical Systems, pp. 252–264.

Corporate Overview, Virage Incorporated web site; pp. 1–4.

Corripio, A. B., "Tuning of Industrial Control Systems", Instrument Society of America, Research Triangle Park, N.C. (1990) pp. 65–81.

Cox, Ingemar J., et al., "PicHunter: Bayesian Relevance Feedback for Image Retrieval," Proc. of the ICPR '96, IEEE, pp. 361–369.

Crawford et al., "Adaptive Pattern Recognition Applied To An Expert System For Fault Diagnosis In Telecommunications Equipment", pp. 10/1–8 (Inspec. Abstract No. 86C010699, Inspec IEE (London) & IEE Coll. on "Adaptive Filters", Digest No. 76, Oct. 10, 1985).

Cutting, D. R.; Karger, D. R.; Pedersen, J. O. & Tukey, J. W. "Scatter/Gather: A Cluster-based Approach to Browsing Large Document Collections", 15 Ann. Int'l SIGIR '92, ACM, 1992, pp. 318–329.

Cvitanovic, Predrag: "Universality in Chaos", Adam Hilger, Bristol, 1989.

Daly, Donal: "Expert Systems Introduced", Chartwell-Bratt, Lund, 1988.

Damashek, M., Gauging Similarity via N-Grams: Language-Independent Sorting, Categorization, and Retrieval of Text, pp. 1–11, Jan. 24, 1995.

Danielsson, Erik, et al.; "Computer Architectures for Pictorial Inf. Systems"; IEEE Computer, November, 1981; pp. 53–67.

Data Partner 1.0 Simplifies DB Query Routines, PC Week, Sep. 14, 1992, pp. 55 & 58.

Davis, Andrew W., "Hi Grandma!: Is It Time for TV Set POTS Videoconferencing?", *Advanced Imaging*, pp. 45–49 (March 1997).

Davis, Andrew W., "The Video Answering Machine: Intel ProShare's Next Step", *Advanced Imaging*, pp. 28–30 (March 1997).

Davis, Fred, "The Great Look-and-Feel Debate", A+, 5:9–11 (July 1987).

Deering, S.; Estrin, D.; Farinacci, D.; Jacobson, V.; Liu, C.; Wei, L; "An Architecture for Wide-Area Multicast Routing", Computer Communication Review, vol. 24, No. 4, October 1994, Proceedings of SIGCOMM 94, pp. 126–135.

Dehning, Waltraud, Essig Heidrun, and Maass, Susanne, The Adaptation of Virtual Man-Computer Interfaces to User Requirements in Dialogs, Germany: Springer-Verlag, 1981.

Dempster, A. P., "A generalization of Bayesian inference", Journal of the Royal Statistical Society, Vol. 30, Series B (1968).

Dempster, A. P., "Upper and lower probabilities induced by a multivalued mapping", Annals of mathematical Statistics, no. 38 (1967).

Denker; 1984 International Test Conf., October 1984, Philadelphia, Pa.; pp. 558–563.

Derra, Skip, "Researchers Use Fractal Geometry,.", Research and Development Magazine, March 1988.

Diggle, Peter J: "Time Series: A Biostatistical Introduction", Clarendon Press, Oxford, 1990.

DivX standard.

Donnelley, J. E., "WWW media distribution via Hopewise Reliabe Multicast," Computer Networks and ISDN Systems, vol. 27, No. 6, pp. 81–788 (April, 1995).

Donovan, J., "Intel/IBM's Audio-Video Kernel", Byte, December, 1991, pp. 177–202.

Drazin, P G: "Nonlinear System", Cambridge University Press, Cambridge, 1992.

Dubois, D., "Modeles mathematiques de l'imprecis et de l'incertain en vue d'applications aux techniques d'aide a la decision", Doctoral Thesis, University of Grenoble (1983).

Dubois, D., N. Prade, "Combination of uncertainty with belief functions: a reexamination", Proceedings 9th International Joint Conference on Artificial Intelligence, Los Angeles (1985).

Dubois, D., N. Prade, "Fuzzy sets and systems-Theory and applications", Academic Press, New York (1980).

Dubois, D., N. Prade, "Theorie des possibilites: application a la representation des connaissances en informatique", Masson, Paris (1985).

Dubois, D.; "Modeles mathematiques de l'imprecis et de l'incertain en vue d'applications aux techniques d'aide a la decision"; Doctoral Thesis, University of Grenoble (1983).

Duda, R. O., P. E. Hart, M. J. Nilsson, "Subjective Bayesian methods for rule-based inference systems", Technical Note 124-Artificial Intelligence Center-SRI International.

Dukach, Semyon, "SNPP: A Simple Network Payment Protocol", MIT Laboratory for Computer Science, Cambridge, Mass., 1993.

Dukach, Seymon; Prototype Implementation of the SNPP Protocol; allspic.lcs.mit.edu; 1992.

Dunning, B. B., "Self-Learning Data-Base For Automated Fault Localization", IEEE, 1979, pp. 155–157.

EDN, May 11, 1995, pp. 40–106.

Edwards, John R., "Q&A: Integrated Software with Macros and an Intelligent Assistant", Byte Magazine, January 1986, vol. 11, Issue 1, pp. 120–122, critiques the Intelligent Assistant by Symantec Corporation.

Ehrenreich, S. L., "Computer Abbreviations—Evidence and Synthesis", Human Factors, 27(2):143–155 (April 1985).

Ekeland, Ivar: "Mathematics and the Unexpected", The University of Chicago Press, Chicago, 1988

Falconer, Kenneth: "Fractal Geometry", John Wiley & Sons, Chichester, 1990.

Electronic Engineering Times (EET), Oct. 28, 1991, p. 62.

Electronic Engineering Times, Oct. 28, 1991, p. 62, "IBM Points a New Way".

Elliott, "Watch-Grab-Arrange-See: Thinking with Motion Images via Streams and Collages", Ph.D. Thesis, MIT, February 1993.

Elofson, G. and Konsynski, B., "Delegation Technologies: Environmental Scanning with Intelligent Agents", Journal of Management Information Systems, Summer 1991, vol. 8, Issue 1, pp. 37–62.

Elton, J., "An Ergodic Theorem for Iterated Maps", Journal of Ergodic Theory and Dynamical Systems, 7 (1987).

Even et al; "Electronic Wallet", pp. 383–386;1983.

Faloutsos, C., et al, "Efficient and Effective Querying by Image Content", Journal of Intelligent Information Systems:Integrating Artificial Intelligence and Database Technologies, vol.3–4, No. 3, July 1994, pp. 231–262.

Farrelle, Paul M. and Jain, Anil K., "Recursive Block Coding—A New Approach to Transform Coding", IEEE Transactions on Communications, Corn. 34(2) (February 1986).

Fassihi, Theresa & Bishop, Nancy, "Cable Guide Courting National Advertisers," Adweek, Aug. 8, 1988.

Fisher Y, "Fractal image compression ", Siggraph 92.

Fitzpatrick, J. M., J. J. Grefenstette, D. Van Gucht, "Image Registration by Genetic Search". Conf. Proc., IEEE Southeastcon 1984, pp. 460–464.

Flickner, et al. "Query by Image and Video Content, the QBIC System", IEEE Computer 8(9); 23–32, 1995.

Foley, J. D., Wallace, V. L., Chan, P., "The Human Factor of Computer Graphics Interaction Techniques", IEEE CG&A, November 1984, pp. 13–48.

Foltz, P. W., Dumais, S. T., "Personalized Information Delivery: An Analysis Of Information Filtering Methods", Communications of the ACM, December 1992, vol. 35, No. 12, pp. 51–60.

Fractal Image Compression Michael F. Barnsley and Lyman P. Hurd ISBN 0-86720-457-5, ca. 250 pp.

Fractal Image Compression: Theory and Application, Yuval Fisher (ed.), Springer Verlag, N.Y., 1995. ISBN number 0-387-94211-4.

Fractal Modelling of Biological Structures, School of Mathematics, Georgia Institute of Technology (date unknown).

Franklin, Gene F, J David Powell & Abbas Emami-Naeini: "Feedback Control of Dynamic Systems", Addison-Wesley Publishing Co. Reading, 1994.

Freeman, W. T., et al, "The Design and Use of Steerable Filters", IEEE Transactions on Pattern Analysis and Machine Intelligence, vol. 15, No. 9, September 1991, pp. 891–906.

Friedman, M. B., "An Eye Gaze Controlled Keyboard", Proceedings of the 2nd International Conference on Rehabilitation Engineering, 1984, 446–447.

Fu, *Sequential Methods in Pattern Recognition and Machine Learning*, Academic, NY, N.Y. 1968.

Fua, P. V., "Using probability density functions in the framework of evidential reasoning Uncertainty in knowledge based systems", B. Bouchon, R. R. Yager, Eds. Springer Verlag (1987).

Garretson, R., "IBM Adds 'Drawing Assistant' Design Tool to Graphics Series", PC Week, Aug. 13, 1985, vol. 2, Issue 32, p. 8.

Gautama, S. D'Haeyer, J., "Learning Relational Models of Shape: A Study of the Hypergraph Formalism".

Gautama, S., D'Haeyer, J. P. F., "Context Driven Matching in Structural Pattern Recognition".

Gellert, W, H Kustner, M Hellwich & H Kastner: "The VNR Concise Encyclopedia of Mathematics", Van Nostrand Reinhols Co., New York, 1975.

Gelman, A. D., et al.: A Store-And-Forward Architecture For Video-On-Demand Service; ICC 91 Conf.; June 1991; pp. 842–846.

George E P Box & Gwilym M Jenkins: "Time Series Analysis: Forecasting and Control", Holden Day, San Francisco, 1976.

Gessler, S. and Kotulla A., "PDAs as mobile WWW browsers," Computer Networks and ISDN Systems, vol. 28, No. 1–2, pp. 53–59 (December 1995).

Gevers, T., et al, "Enigma: An Image Retrieval System", IEEE 11th IAPR International Conference On Pattern Recognition, 1992, pp. 697–700.

Gevers, T., et al, "Indexing of Images by Pictorial Information", Visual Database Systems, II, 1992 IFIP, pp. 93–101.

Gifford, D., "Notes on Community Information Systems", MIT LCS TM-419, December 1989.

Gifford, David K.; "Cryptographic Sealing for Information Secrecy and Authentication"; Stanford University and Xerox Palo Alto Research Center; Communication of the ACM; vol. 25, No. 4; April, 1982.

Gifford, David K.; "Digital Active Advertising"; U.S. patent application Ser. No. 08/168,519; filed Dec. 16, 1993.

Gilfoil, D., and Mauro, C. L., "Integrating Human Factors and Design: Matching Human Factors Methods up to Product Development", C. L. Mauro Assoc., Inc., 1–7.

Gleick, James, "Chaos—Making a New Science", Heinemann, London, 1988.

Gligor, Virgil D. et al.; "Object Migration and Authentication"; IEEE Transactions on Software Engineering; vol. SE-5, No. 6; November, 1979.

Glinert-Stevens, Susan, "Microsoft Publisher: Desktop Wizardry", PC Sources, February, 1992, vol. 3, Issue 2, p. 357.

Goble, C., et al, "The Manchester Multimedia Information System", Proceedings of IEEE Conference, Eurographics Workshop, April, 1991, pp. 244–268.

Gogoussis et al., Proc. SPIE Intl. Soc. Opt. Eng., November 1984, Cambridge, Mass., pp. 121–127.

Goldberg, Cheryl. "IBM Drawing Assistant: Graphics for the EGA", PC Magazine, Dec. 24, 1985, vol. 4, Issue 26, p. 255.

Gong et al, "An Image Database System with Content Capturing and Fast Image Indexing Abilities", PROC of the International Conference on Multimedia Computing and Systems, pp. 121–130 May 19, 1994.

Gong et al. "An Image Database System with Content Capturing and Fast Image Indexing Abilities" IEEE. 1994, pp. 121–130, May 1994.

Gonzalez et al., *Digital Image Processing*, Addison-Wesley, Reading, Mass., 1977.

Gonzalez, Rafael C., "Digital Image Processing", Addison-Wesley, Reading, Mass. (1987).

Gonzalez, Rafael C., "Digital Image Processing", Addison-Wesley, Reading, Mass. (1987).

Gould, John D., Boies, Stephen J., Meluson, Antonia, Rasammy, Marwan, and Vosburgh, Ann Marie, "Entry and Selection Methods For Specifying Dates". Human Factors, 32(2):199–214 (April 1989).

Graf S, "Barnsley's Scheme for the Fractal Encoding of Images ", Journal Of Complexity, V8, 72–78 (1992).

Great Presentations advertisement: Remote, Remote; 1987; p. 32H.

Green, Lee, "Thermo Tech: Here's a common sense guide to the new thinking thermostats", Popular Mechanics, October 1985, 155–159.

Grosky, W., et al, "A Pictorial Index Mechanism for Model-based Matching", Data 7 Knowledge Engineering 8, 1992, pp. 309–327.

Grosky, W., et al, "Index-based Object Recognition in Pictorial Data Management", Computer Vision, 1990, pp. 416–436.

Grossberg, S., G. Carpenter, "A Massively Parallel Architecture for a Self-Organizing Neural Pattern Recognition Machine." Computer Vision, Graphics, and Image Processing (1987, 37, 54–115), pp. 252–315.

Grudin, Jonathan, "The Case Against User Interface Consistency", MCC Technical Report Number ACA-HI-002-89, January 1989.

Gudivada, V. N., and V. V. Raghavan. Design and evaluation of algorithms for image retrieval by spatial similarity. ACM Trans. on Information Systems, 13(2), April 1995.

Gudivada, V., et al, "A Spatial Similarity Measure for Image Database Applications", Technical Report 91-1, Department of Computer Science, Jackson, Miss., 39217, 1990–1991.

Guenther, O., and A. Buchmann. Research issues in spatial databases. In ACM SIGMOD Record, volume 19, December 1990.

Gullichsen E., E. Chang, "Pattern Classification by Neural Network: An Experiment System for Icon Recognition," ICNN Proceeding on Neural Networks, March 1987, pp. IV-725–32.

Gupta, Amarnath; Weymount, Terry & Jain, Ramesh, "Semantic Queries With Pictures: The VIMSYS Model", Proceedings of the 17th International Conference on Very Large Data Bases, pp. 69–79, Barcelona, September, 1991.

Hafner, J., H. S. Sawhney, W. Equitz, M. Flickner, and W. Niblack. Efficient color histogram indexing for quadratic form distance functions. IEEE Trans. Pattern Anal. Machine Intell., July 1995.

Haines, R. W., "HVAC Systems Design Handbook", TAB Professional and Reference Books, Blue Ridge Summit, Pa. (1988) pp. 170–177.

Harris, C. J., & S. A. Billings, "Self-Tuning and Adaptive Control: Theory and Applications", Peter Peregrinus LTD (1981) pp. 20–33.

Harty et al., "Case Study: The VISA Transaction Processing System," 1988.

Haruki, K. et al., "Pattern Recognition of Handwritten Phonetic Japanese Alphabet Characters", International Joint Conference on Neural Networks, Washington, D.C., January 1990, pp. II-515 to II-518.

Harvey, Michael G., and Rothe, James T., "VideoCassette Recorders: Their Impact on Viewers and Advertisers", Journal of Advertising, 25:19–29 (December/January 1985).

Hasegawa, J., et al, "Intelligent Retrieval of Chest X-Ray Image Database Using Sketches", System And Computers In Japan, 1989, pp. 29–42.

Hawkins, William J., "Super Remotes", Popular Science, February 1989, 76–77.

Hayashi, Y., et al., "Alphanumeric Character Recognition Using a Connectionist Model with the Pocket Algorithm", Proceedings of the International Joint Conference on Neural Networks, Washington, D.C. Jun. 18–22, 1989, vol. 2, pp. 606–613.

Hayes, H. I.; Solka, J. L.; Priebe, C. E.; "Parallel computation of fractal dimension", *Proceedings of the SPIE—The International Society for Optical Engineering*, 1962:219–30 (1993).

Hendrix, Gary G. and Walter, Brett A., "The Intelligent Assistant: Technical Considerations Involved in Designing Q&A's Natural-language Interface", Byte Magazine, December 1987, vol. 12, Issue 14, p. 251.

Henke, Lucy L., and Donohue, Thomas R., "Functional Displacement of Traditional TV Viewing by VCR Owners", Journal of Advertising Research, 29:18–24 (April–May 1989).

Hinton et al., "Boltzmann Machines: Constraint Satisfaction Networks that Learn", Tech. Report CMU-CS-85–119, Carnegie-Mellon Univ, May, 1984.

Hirata, et al. "Query by Visual Example, Content Based Image Retrieval" Advance in Database Technology-EDBT '92, Springer-Verlag, Berlin 1992, pp. 56–71

Hirata, K., et al, "Query by Visual Example Content Based Image Retrieval", Advances In Database Technology, March, 1992, pp. 57–71.

Hirzalla et al., "A Multimedia Query User Interface", IEEE on CD-ROM, pp. 590–593, Sep. 5, 1995.

Hirzinger, G., Landzettel, K., "Sensory Feedback Structures for Robots with Supervised Learning", IEEE Conf. on Robotics and Automation, St. Louis, March 1985.

Hoare, F.; de Jager, G., "Neural networks for extracting features of objects in images as a pre-processing stage to pattern classification". Proceedings of the 1992 South African Symposium on Communications and Signal Processing. COMSIG '92 (Cat. No.92TH0482-0). Inggs, M. (Ed.), p. 239–42 (1992).

Hoban, Phoebe, "Stacking the Decks", New York, Feb. 16, 1987, 20:14.

Hoffberg, Linda I, "AN IMPROVED HUMAN FACTORED INTERFACE FOR PROGRAMMABLE DEVICES: A CASE STUDY OF THE VCR" Master's Thesis, Tufts University (Master of Sciences in Engineering Design. November, 1990).

Hoffberg, Linda I., "Designing a Programmable Interface for a Video Cassette Recorder (VCR) to Meet a User's Needs", Interface 91 pp. 346–351 (1991).

Hoffberg, Linda I., "Designing User Interface Guidelines For Time-Shift Programming of a Video Cassette Recorder (VCR)", Proc. of the Human Factors Soc. 35th Ann. Mtg. pp. 501–504 (1991).

Hoffman, D. L. et al., "A New Marketing Paradigm for Electronic Commerce," (1996, Feb. 19), http://www2000.ogsm.vanderbilt.edu novak/new.marketing.paradigm.html.

Hollatz, S. A., "Digital image compression with two-dimensional affine fractal interpolation functions ", Department of Mathematics and Statistics. University of Minnesota-Duluth, Technical Report 91-2.

Hong Kong Enterprise advertisement: Two Innovative New Consumer Products From SVI; November 1988; p. 379.

Hongjiang, et al., Digital Libraries, "A Video Database System for Digital Libraries", pp. 253–264, May 1994.

Hooge, Charles, "Fuzzy logic Extends Pattern Recognition Beyond Neural Networks", Vision Systems Design, January 1998, pp. 32–37.

Hopfield et al., "Computing with Neural Circuits: A Model", Science, 233:625–633 (8 Aug. 1986).

Hopfield, "Neural Networks and Physical Systems with Emergent Collective Computational Abilities", Proc. Natl. Acad. Sci. USA, 79:2554–2558 (April 1982).

Hopfield, "Neurons with graded response have collective computational properties like those of two-state neurons", Proc. Natl. Acad. Sci. USA, 81:3088–3092 (May 1984).

Hopfield; "Neural Networks and Physical Systems with Emergent Collective Computational Abilities"; Proc. Natl. Acad. Sci. USA; 79:2554–2558 (April 1982).

Horgan, H., "Medical Electronics", IEEE Spectrum, January 1984, pp. 90–93.

Hou et al., "Medical Image Retrieval by Spatial Features", IEEE on CD-ROM, pp. 1364–1369, Oct. 18, 1992.

Howard, Bill, "Point and Shoot Devices", PC Magazine, 6:95–97 (August 1987).

Hsu et al., "Pattern Recognition Experiments in the Mandala/Cosine Domain", IEEE Transactions on Pattern Analysis and Machine Intelligence, vol. PAMI-5, No. 5, September 1983, pp. 512–520.

Hu et al., "Pattern Recognition by Moment Invariants", Proc. IRE, vol. 49, 1961, p. 1428.

Hunter, Jane, "The Application of Metadata Standards to Video Indexing" http://www.dtsc.edu.au/RDU/staff/jane-hunter/EuroDL/final.html (<Dec. 24, 1998).

Hurtgen, B.; Buttgen, P., "Fractal approach to low rate video coding", *Proceedings of the SPIE—The International Society for Optical Engineering*, 2094(pt. 1):120–31 (1993).

Hutheesing, H., "Interactivity for the passive", Forbes magazine Dec. 6, 1993 (@ Forbes Inc. 1993) (2 pages).

IEEE Communications Magazine; vol. 32, No. 5, May 1994 New York, N.Y., US, pp. 68–80, XP 000451097 Chang et al "An Open Systems Approach to Video on Demand".

IEEE-1394.

Iino et al., "An Object-Oriented Model for Spatio-Temporal Synchronization of Multimedia Information", May, 1994.

Information describing BroadVision One-to-One Application System: "Overview," p. 1; Further Resources on One-To-One Marketing, p. 1; BroadVision Unleashes the Power of the Internet with Personalized Marketing and Selling, pp. 1–3; Frequently Asked Questions, pp. 1–3; Products, p. 1; BroadVision One-To-One(.TM.), pp. 1–2; Dynamic Command Center, p. 1; Architecture that Scales, pp. 1–2; Technology, pp. 1; Creating a New Medium for Marketing and Selling BroadVision One-To-One and the World Wide Web a White Paper, pp. 1–15; http://www.broadvision.com (1996, January–March).

Information Network Institute, Carnegie Mellon University, Internet Billing Server, Prototype Scope Document, Oct. 14, 1993.

Information Processing 71, North-Holland Publishing Company (1972) pp. 1530–1533.

Ingemar J. Cox et al., "Target Testing and the Pic Hunter Bayesian Multimedia Retrieval System," Proc. of the 3d Forum on Research and Technology Advances in Digital Libraries, ADL '96, IEEE, pp. 66–75.

Intel Corporation, iPower Technology, Marketing Brochure, date unknown.

Intuit Corp. Quicken User's Guide, "Paying Bills Electronically", pp. 171–192; undated.

Ioka, M., "A Method of Defining the Similarity of Images on the Basis of Color Information", Bulletin Of The National Museum Of Ethnology Special Issue, pp. 229–244, No. 17, Nov. 1992.

Irven, Judith H., et al., "Multi-Media Information Services: A Laboratory Study", IEEE Communications Magazine, vol. 26, No. 6, June, 1988, pp. 24–44.

Ishizuka, M., "Inference methods based on extended Dempster and Shafer's theory for problems with uncertainty/fuzziness", New Generation Computing, 1:159–168 (1983), Ohmsha, Ltd., and Springer Verlag.

Ishizuka, M., "Inference methods based on extended Dempster and Shafer's theory for problems with uncertainty/fuzziness", New Generation Computing, 1:159–168 (1983), Ohmsha, Ltd., and Springer Verlag.

ISO/IEC JTC1/SC29/WG11 N1733, MPEG97, July 1997, "MPEG-7 Context and Objectives (v.4— Stockholm)".

ISO/IEC JTC1/SC29/WG11 N1735, MPEG97, July 1997— Stockholm, "MPEG-7 Applications Document".

ISO/IEC JTC1I/SC29/WG11 N1920, MPEG97, October 1997 "MPEG-7 Context and Objectives (v.5— Fribourg) ".

ISO/IEC JTC1/SC29/WG11 N2460, MPEG98, October 1998 "MPEG-7 Context and Objectives (v.10— Atlantic City)".

ISO/IEC JTC 1/SC29/WG 11 N2461, MPEG98, October 1998— Atlantic City, "MPEG-7 Requirements".

ISO/IEC JTC1/SC29/WG11 N2462, MPEG98, October 1998—Atlantic City, "MPEG-7 Applications".

ISO/IEC JTC1/SC29/WG11 N2467, MPEG98, October 1998—Atlantic City, "MPEG-7 Content Set".

Iyengar et al., "Codes Designs for Image Browsing", 1994.

Jackel, L. D., H. P. Graf, J. S. Denker, D. Henderson and I. Guyon, "An Application of Neural Net Chips: Handwritten Digit Recognition," ICNN Proceeding, 1988, pp. II-107–15.

Jacobs, Charles E., Finkelstein, Adam, Satesin, David H., "Fast Multiresolution Image Querying", Department of Computer Science, University of Washington, Seattle Wash.

Jacobs, E. W., Y. Fisher and R. D. Boss. "Image Compression: A study of the Iterated Transform Method." *Signal Processing* 29, (1992) 25–263.

Jacquin, A., "Image Coding Based on a Fractal Theory of Iterated Contractive Image Transformations" p.18, January 1992 (Vol 1 Issue 1) of IEEE Trans on Image Processing.

Jacquin, A., "A Fractal Theory of Iterated Markov Operators with Applications to Digital Image Coding", PhD Thesis, Georgia Tech, 1989.

Jacquin, A., 'Fractal image coding based on a theory of iterated contractive image transformations', Proc. SPIE Visual Communications and Image Processing, 1990, pages 227–239.

Jacquin, A. E., 'A novel fractal block-coding technique for digital images', Proc. ICASSP 1990.

Jane Pauley Special, NBC TV News Transcript, Jul. 17, 1990, 10:00 PM.

Jean, J. S. N., et al., "Input Representation and Output Voting Considerations for Handwritten Numeral Recognition with Backpropagation", International Joint Conference on Neural Networks, Washington, D.C., January 1990, pp. I-408 to I-411.

Jeffrey, R. J., "The logic of decision", The University of Chicago Press, Ltd., London (1983)(2nd Ed.).

Jim Binkley & Leslie Young, Rama: An Architecture for Internet Information Filtering, Journal of Intelligent Information Systems: Integrating Artificial Intelligence and Database Technologies, vol. 5, No. 2, September 1995, pp. 81–99.

Jones, R., "Digital's World-Wide Web server: A case study," Computer Networks and ISDN Systems, vol. 27, No. 2, pp. 297–306 (November 1994).

JPL New Technology Report NPO-20213, Nasa Tech Brief Vol. 22, No. 4, Item #156 (April 1998).

Kato, T., "A Sketch Retrieval Method for Full Color Image Database-Query by Visual Example", IEEE, Publication No. 0-8186-2910-X/92, 1992, pp. 530–533.

Kato, T., "Intelligent Visual Interaction with Image Database Systems Toward the Multimedia Personal Interface", Journal Of Information Processing, vol. 14, No. 2, 1991, pp. 134–143.

Kato, T., et al, "A Cognitive Approach Interaction", International Conference Of Multimedia Information Systems, January, 1991, pp. 109–119.

Kato, T., et al, "Trademark: Multimedia Database with Abstracted Representation on Knowledge Base", Proceedings Of The Second International Symposium On Interoperable Information Systems, pp. 245–252, November 1988.

Kato, T., et al, "Trademark: Multimedia Image Database System with Intelligent Human Interface", System And Computers In Japan, 1990, pp. 33–46.

Kaufmann, A., "Introduction a la theorie des sous-ensembles flous", Vol. 1, 2 et 3-Masson-Paris (1975).

Kaye, Brian H: "A Random Walk Through Fractal Dimensions", VCH Verlagsgesellschaft, Weinheim, 1989.

Keeney, R. L., B. Raiffa, "Decisions with multiple objectives: Preferences and value tradeoffs". John Wiley and Sons, New York (1976).

Kellman, P., "Time Integrating Optical Signal Processing", Ph. D. Dissertation, Stanford University, 1979, pp. 51–55.

Kelly et al. "Efficiency Issues Related to Probability Density Function Comparison", SPIE vol. 2670, pp. 42–49 January 1996.

Kelly, P. M., et al. "Candid Comparison Algorithm for Navigating Digital Image Databases", Proceedings 7th International Working Conference on Scientific and Statistical Database Management, pp. 252–258, 1994.

Kim, D. H.; Caulfield, H. J.; Jannson, T.; Kostrzewski, A.; Savant, G, "Optical fractal image processor for noise-embedded targets detection", *Proceedings of the SPIE—The International Society for Optical Engineering*, Vol: 2026 p. 144–9 (1993) (SPIE Conf: Photonics for Processors, Neural Networks, and Memories 12–15 July 1993, San Diego, Calif., USA).

Kim, Y., "Chips Deliver Multimedia", Byte, December 1991, pp. 163–173.

Knowlton, K., "Virtual Pushbuttons as a Means of Person-Machine Interaction", Proc of Conf. Computer Graphics, Pattern Recognition and Data Structure, Beverly Hills, Calif., May 1975, pp. 350–352.

Koch, H., "Ergonomische Betrachtung von Schreibtastaturen", Humane Production, 1, pp. 12–15 (1985).

Kohonen, "Self-Organization & Memory", Second Ed., 1988, Springer-Verlag, pp. 199–209.

Kolson, Ann, "Computer wimps drown in a raging sea of technology", The Hartford Courant, May 24, 1989, B1.

Kortegaard, B. L., "PAC-MAN, a Precision Alignment Control System for Multiple Laser Beams Self-Adaptive Through the Use of Noise", Los Alamos National Laboratory, date unknown.

Kortegaard, B. L., "Superfine Laser Position Control Using Statistically Enhanced Resolution in Real Time", Los Alamos National Laboratory, SPIE-Los Angeles Technical Symposium, Jan. 23–25, 1985.

Kraiss, K. F., "Alternative Input Devices For Human Computer Interaction", Forschunginstitut Für Anthropotecahnik, Werthhoven, F. R. Germany.

Kraiss, K. F., "Neuere Methoden der Interaktion an der Schnittstelle Mensch-Maschine", Z. F. Arbeitswissenschaft, 2, pp. 65–70, 1978.

Krajewski, M. et al, "Applicability of Smart Cards to Network User Authentication", Computing Systems, vol. 7, No. 1, 1994.

Krajewski, M., "Concept for a Smart Card Kerberos", 15th National Computer Security Conference, October 1992.

Krajewski, M., "Smart Card Augmentation of Kerberos, Privacy and Security Research Group Workshop on Network and Distributed System Security", February 1993.

Kraus, T. W., T. J. Myron, "Self-Tuning PID Controller Uses Pattern Recognition Approach", Control Engineering, pp. 106–111, June 1984.

Kreifeldt, J. G., "A Methodology For Consumer Product Safety Analysis", The 3rd National Symposium on Human Factors in Industrial Design in Consumer Products, August 1982, 175–184.

Kreifeldt, John, "Human Factors Approach to Medical Instrument Design", Electro/82 Proceedings, Mar. 1, 2001–Mar. 3, 2006.

Ksienski et al., "Low Frequency Approach to Target Identification", Proc. of the IEEE, 63(12):1651–1660 (December 1975).

Kuo, C.-C. J. (ed), "Multimedia Storage and Archiving Systems", SPIE Proc. Vol. 2916 (Nov. 18–Nov. 22, 1996).

Kuocheng, Andy Poing, and Ellingstad, Vernon S., "Touch Tablet and Touch Input", Interface '87, 327.

Kurokawa, M., "An Approach to Retrieving Images by Using their Pictorial Features", IBM Research, Japan, September 1989.

Kyburg, H. E., "Bayesian and non Bayesian evidential updating", Artificial Intelligence 31:271–293 (1987).

Lampson, Butler; Abadi, Martin; Burrows, Michael; and Wobber, Edward; "Authentication in Distributed Systems: Theory and Practice"; ACM Transactions on Computer Systems; vol. 10, No. 4; November, 1992; pp. 265–310.

Landis, Sean, "Content-Based Image Retrieval Systems for Interior Design", http://www.tc.cornell.edu/Visualization/Education/cs718/fall 1995/landis/index.html.

Langton C G (ed): Artificial Life; Proceedings of the first international conference on Artificial life, Redwood City: Addison-Wessley (1989).

Lauwerier, Hans: "Fractals—Images of Chaos", Penguin Books, London, 1991.

LeCun, Y. et al., "Handwritten Digit Recognition: Applications of Neural.", IEEE Comm. Magazine, November 1989, pp. 41–46.

LeCun, Y., "Connectionism in Perspective", in R. Pfeifer, Z. Schreter, F. Fogelman, L. Steels (Eds.), 1989, "Generalization and Network Design Strategies", pp. 143–155.

Ledgard, Henry, Singer, Andrew, and Whiteside, John, Directions in Human Factors for Interactive Systems, New York, Springer-Verlag, 1981.

Lee et al., "Video Indexing—An Approach based on Moving Object and Track", Proceedings of Storage and Retrieval for Image and Video Databases, pp. 25–36. Feb. 1993.

Lee, Denis, et al. "Query by Image Content Using Multiple Objects and Multiple Features: User Interface Issues," 1994 Int'l Conf. on Image Processing, IEEE, pp. 76–80.

Lee, E., "Similarity Retrieval Techniques". Pictorial Information Systems, Springer Verlag, 1980 pp. 128–176.

Lee, Eric, and MacGregor, James, "Minimizing User Search Time Menu Retrieval Systems", Human Factors. 27(2):157–162 (April 1986).

Lee, S., et al, "2D C-string: A New Spatial Knowledge Representation for Image Database Systems", Pattern Recognition, vol. 23, 1990, pp. 1077–1087.

Lee, S., et al, "Similarity Retrieval of Iconic Image Database", Pattern Recognition, vol. 22, No. 6 1989, pp. 675–682.

Lee, S., et al, "Spatial Reasoning and Similarity Retrieval of Images Using 2D C-string Knowledge Representation", Pattern Recognition, 1992, pp. 305–318.

Lendaris, G. G., and Stanely, G. L., "Diffraction Pattern Sampling for Automatic Target Recognition", Proc. IEEE 58:198–205 (1979).

Leon, Carol Boyd, "Selling Through the VCR", American Demographics, December 1987, 40–43.

Li, H. Y., Y. Qiao and D. Psaltis, Applied Optics (April, 1993).

Liepins, G. E., M. R. Hilliard, "Genetic Algorithms: Foundations & Applications", Annals of Operations Research, 21:31–58 (1989).

Lin, H. K., et al., "Real-Time Screen-Aided Multiple-Image Optical Holographic Matched-Filter Correlator", Applied Optics, 21(18):3278–3286 (Sep. 15, 1982).

Liou, "Overview of the px64 kbit/s Video Coding Standard". Communications of the ACM, vol. 34, No. 4, April 1991, pp. 60–63.

Lippmann, R. P., "An Introduction to Computing with Neural Nets", IEEE ASSP Magazine, 4(2):4–22 (April 1987).

Liu, Y., "Extensions of fractal theory", Proceedings of the SPIE—The International Society for Optical Engineering, 1966:255–68(1993).

Liu, Y., "Pattern recognition using Hilbert space". Proceedings of the SPIE—The International Society for Optical Engineering, 1825:63–77 (1992).

Ljung, Lennart, & Torsten Soderstrom: "Theory and Practice of Recursive Identification", The MIT Press, Cambridge, Mass., 1983.

Ljung, Lennart: "System Identification; Theory for the User", Prentice-Hall Englewood Cliffs, N.J., 1987.

Lloyd, Sheldon G., & Gerald D Anderson: "Industrial Process Control", Fisher Controls Co., Marshalltown, 1971.

Loeb, S., "Architecting Personalized Delivery of Multimedia Information", Communications of the ACM, December 1992, vol. 35, No. 12, pp. 39–50.

Long, John, "The Effect of Display Format on the Direct Entry of Numerical Information by Pointing", Human Factors, 26(1):3–17 (February 1984).

Lu, C., "Computer Pointing Devices: Living With Mice", High Technology, January 1984, pp. 61–65.

Lu, C., "Publish It Electronically", Byte, September 1993, pp. 94–109.

Mackay et al., "Virtual Video Editing in Interactive Multimedia Applications", 1989.

Mahalanobis, A., et al., "Minimum Average Correlation Energy Filters", Applied Optics, 26(17):3633–40 (Sep. 1, 1987).

Makridakis, Spyros, & Steven Wheelwright: "The Handbook of Forecasting", John Wiley, New York, 1982.

Mandelbrot, Benoit: "Fractal Geometry of Nature", W H Freeman and Co., New York, 1983 (orig ed 1977).

Mandelbrot, Benoit: "Fractals—Form, Chance and Dimensions", W H Freeman and Co., an Francisco, 1977.

Manners, George, "Smart Screens; Development of Personal Navigation Systems for TV Viewers," Video Magazine, December 1993.

Mannes, G., "Smart Screens", Video Magazine, December 1993) (2 Pages).

Mantei, Marilyn M., and Teorey, Toby J., "Cost/Benefit Analysis for Incorporating Human Factors in the Software Lifecycle", Association for Computing Machinery, 1988.

Maragos, P., "Tutorial Advances in Morphological Image Processing" Optical Engineering 26:7:623–632 (1987).

Mardia, K V, J T Kent & J M Bibby: "Multivariate Analysis", Academic Press, London, 1979.

Martin, G. L. et al., "Recognizing Hand-Printed Letters and Digits Using Backpropagation Learning", Technical Report of the MCC, Human Interface Laboratory, Austin, Tex., January 1990, pp. 1–9.

Martinez et al. "Imagenet: A Global Distribution Database for Color Image Storage and Retrieval in Medical Imaging Systems" IEEE, 1992, 710–719, May 1992.

Masahiro Morita & Yoichi Shinoda, Information Filtering Based on User Behavior Analysis and Best Match Text Retrieval, Proceedings of the Seventeenth Annual International ACM-SIGIR Conference on Research and Development in Information Retrieval, Dublin, Jul. 3–6, 1994, Pages Title Page (272)-281.

Mazel, D. S., "Fractal Modeling of Time-Series Data", PhD Thesis, Georgia Tech, 1991. (One dimensional, not pictures).

McAulay, A. D., J. C. Oh, "Image Learning Classifier System Using Genetic Algorithms", IEEE Proc. of the National Aerospace & Electronics Conference, 2:705–710 (1989).

McCauley, Joseph L.: "Chaos, Dymanics, and Fractals", Cambridge University Press, Cambridge, 1993.

McFadden, M., "The Web and the Cookie Monster," Digital Age, (1996, August).

Meads, Jon A., "Friendly or Frivolous", Datamation, April 1, 1988, 98–100.

Medvinsy et al, "NetCash: A Design for Practical Electronic Currency on the Internet", Proc. 1st ACM Conf. on Comp. and Comm. Security, November 1993.

Medvinsy et al., "Electronic Currency for the Internet", Electronic Markets, pp. 30–31, September 1993.

Mehrotra, R., et al, "Shape Matching Utilizing Indexed Hypotheses Generation and Testing", IEEE Transactions On Robotics, vol. 5, No. 1, February 1989, pp. 70–77.

Meyer, J. A., Roitblat, H. L., Wilson, W. (eds.): From Animals to Animats, Proceedings of the Second International Conference on Simulation of Adaptive Behaviour. Cambridge, Mass: MIT Press. (1991).

Middleton, G. V. ed., 1991, Nonlinear Dynamics, Chaos and Fractals, with Applications to Geological Systems. Geol. Assoc. Canada Short Course Notes Vol. 9 (available from the GAC at Memorial University of Newfoundland, St. John's NF A1B 3X5).

Miller et al., "News On-Demand for Multimedia Networks", ACM International Conference on Multimedia, Anaheim, Calif., 1–6, Aug. 1993, pp. 383–392.

Miller, R. K., Neural Networks ((c) 1989: Fairmont Press, Lilburn, Ga.), pp. 2–12 and Chapter 4, "Implementation of Neural Networks", pp. 4-1 to 4-26.

Mills et al., "A Magnifier Tool for Video Data", Proceedings of ACM Computer Human Interface (CHI), May 3–7, 1992, pp. 93–98.

Mills, "Media Composition for Casual Users", 1992.

Minka, T., "An Image Database Browser that Learns from User Interaction", Masters Thesis, Massachusetts Institute of Technology; 1996; also appears as MIT Media Laboratory Technical Report 365.

Minneman et al., "Where Were We: making and using near-synchronous, pre-narrative video", Multimedia'93, pp. 1–11. December 1993.

Molley, P., "Implementing the Difference-Squared Error Algorithm Using An Acousto-Optic Processor", SPIE, 1098:232–239, (1989).

Molley, P., et al., "A High Dynamic Range Acousto-Optic Image Correlator for Real-Time Pattern Recognition", SPIE, 938:55–65 (1988).

Moloney, Daniel M.: Digital Compression in Todays Addressable Enviroment; 1993 NCTA Technical Papers; Jun. 6, 1993; pp. 308–316.

Monro D M and Dudbridge F, "Fractal block coding of images ", Electronics Letters 28(11):1053–1054 (1992).

Monro D. M. & Dudbridge F. 'Fractal approximation of image blocks', Proc ICASSP 92, pp. III: 485–488.

Monro D. M. 'A hybrid fractal transform', Proc ICASSP 93, pp. V: 169–72.

Monro D. M., Wilson D., Nicholls J. A. 'High speed image coding with the Bath Fractal Transform', IEEE International Symposium on Multimedia Technologies Southampton, April 1993.

Moore, T. G. and Dartnall, "Human Factors of a Microelectronic Product: The Central Heating Timer/Programmer", Applied Ergonomics, 1983, 13(1):15–23.

Mori, "Towards the construction of a large-scale neural network". Electronics Information Communications Association Bulletin PRU 88-59, pp. 87–94.

Nadoli, Gajanana and Biegel, John, "Intelligent Agents in the Simulation of Manufacturing Systems", Proceedings of the SCS Multiconference on AI and Simulation, 1989.

Nagasaka et al., "Automatic Video indexing and Full-Video Search for Object Appearances", Proceedings of the IFIP TC2/WG2.6 Second Working Conference on Visual Database Systems, North Holland, (Knuth et al., eds.), Sep. 30–Oct. 3, 1991, pp. 113–127, January 1992.

Naik et al., "High Performance Speaker Verification.", ICASSP 86, Tokyo, CH2243-4/86/0000-0881, IEEE 1986, pp. 881–884.

National Westminster Bank Group Brochure; pp. 1–29; undated.

Needham, Roger M. and Schroeder, Michael D.; "Using Encryption for Authentication in Large Networks of Computers"; Communications of the ACM; vol. 21, No. 12; December, 1978; pp. 993–999.

Needham, Roger M.; "Adding Capability Access to Conventional File Servers"; Xerox Palo Alto Research Center; Palo Alto, Calif.

Negahdaripour, S., et al "Challenges in Computer Vision: Future Research Direction", IEEE Transactions On Systems, Man And Cybernetics, pp. 189–199, 1992, at Conference on Computer Vision and Pattern Recognition.

Netravali, Arun N., and Haskell, Barry G., "Digital Pictures Representation and Compression", Plenum Press, New York (1988).

Newman, B. C., "Proxy-Based Authorization and Accounting for Distributed Systems", Proc. 13th Int. Conf. on Dist. Comp. Sys., May 1993.

NewMedia, November/December 1991, p. 69.

Ney, H., et al., "A Data Driven Organization of the Dynamic Programming Beam Search for Continuous Speech Recognition", Proc. ICASSP 87, pp. 833–836, 1987.

Niblack, W. et al., "The QBIC Project: Querying Images by Content Using Color, Texture, and Shape". IBM Computer Science Research Report, pp. 1–20 (Feb. 1, 1993).

Niblack, W., et al, "Find me the Pictures that Look Like This: IBM'S Image Query Project", Advanced Imaging, April 1993, pp. 32–35.

Niblack, W., R. Barber, W. Equitz, M. Flickner, E. Glasman, D. Petkovic, P. Yanker, and C. Faloutsos. The QBIC project: Querying images by content using color, texture, and shape. In Storage and Retrieval for Image and Video Databases, volume SPIE Vol. 1908, February 1993.

Nilsson, B. A., "Microsoft Publisher is an Honorable Start for DTP Beginners", Computer Shopper, February 1992, vol. 12, Issue 2, p. 426, evaluates Microsoft Publisher and Page Wizard.

Nilsson, N. J., The Mathematical Foundations of Learning Machines ((c) 1990: Morgan Kaufmann Publishers, San Mateo, Calif.) and particularly section 2.6 "The Threshold Logic Unit (TLU)", pp. 21–23 and Chapter 6, "Layered Machines" pp. 95–114.

Norman, D. A., Fisher, D., "Why Alphabetic Keyboards Are Not Easy To Use: Keyboard Layout Doesn't Much Matter", Human Factors 24(5), pp. 509–519 (1982).

Norman, Donald A., "Infuriating By Design", Psychology Today, 22(3):52–56 (March 1988).

Norman, Donald A., The Psychology of Everyday Things, New York, Basic Book, Inc. 1988.

Novak et al., "Anatomy of a Color Histogram", Proceeding of Computer Vision and Pattern Recognition, Champaign, Ill., June 1992, pp. 599–605.

Nussbaumer et al., "Multimedia Delivery on Demand: Capacity Analysis and Implications", Proc 19th Conference on Local Computer Networks, 2–5 October 1994, pp. 380–386.

O'Connor, Rory J., "Apple Banking on Newton's Brain", San Jose Mercury News, Wednesday, Apr. 22, 1992.

O'Docherty, M. H., et al, "Multimedia Information System—The Management and Semantic Retrieval of all Electronic Data Types", The Computer Journal, vol. 34, No. 3, 1991.

Ohsawa, I. and Yonezawa, A., "A Computational Model of an Intelligent Agent Who Talks with a Person", Research Reports on Information Sciences, Series C, April 1989, No. 92, pp. 1–18.

Ohsuga et al, "Entrainment of Two Coupled van der Pol Oscillators by an External Oscillation", Biological Cybernetics, 51:225–239 (1985).

Oien, G. E., S. Lepsoy & T. A. Ramstad, 'An inner product space approach to image coding by contractive transformations', Proc. ICASSP 1991, pp 2773–2776.

Okada, Y., et al., "An Image Storage and Retrieval System for Textile Pattern Adaptable to Color Sensation of the Individual", Trans. Inst. Elec. Inf. Comm. vol. J70D, No. 12, pp. 2563–2574, December 1987 (Japanese w/English Abstract).

Okamoto et al; "Universal Electronic Cash", pp. 324–337; 1991.

Omata et al, "Holonic Model of Motion Perception", IEICE Technical Reports, Mar. 26, 1988, pp. 339–346.

O'Neal et al., "Coding Isotropic Images", November 1977, pp. 697–707.

Ono, Atsushi, et al., "A Flexible Content-Based Image Retrieval System with Combined Scene Description Keyword," Proc. of Multimedia '96, IEEE, pp. 201–208.

Optical Engineering 28:5 (May 1988) (Special Issue on product inspection).

Page, G F, J B Gomm & D Williams: "Application of Neural Networks to Modelling and Control", Chapman & Hall, London, 1993.

Pandit, S. M., & S. M. Wu, "Timer Series & System Analysis with Applications", John Wiley & Sons, Inc., NY (1983) pp. 200–205.

Pawlicki, T. F., D. S. Lee, J. J. Hull and S. N. Srihari, "Neural Network Models and their Application to Handwritten Digit Recognition," ICNN Proceeding, 1988, pp. II-63–70.

Pazzani, M. et al., "Learning from hotlists and coldlists: Towards a WWW Information Filtering and Seeking Agent," Proceedings International Conference on Tools with Artificial Intelligence, January 1995, pp. 492–495.

Pecar, Branko: "Business Forecasting for Management", McGraw-Hill Book Co., London, 1994.

Peitgen, Heinz-Otto, & Deitmar Saupe: "The Science of Fractal Images", Springer-Verlag, New York, 1988.

Peitgen, Heinz-Otto, Hartmut Jurgens & Deitmar Saupe: "Fractals for the Classroom", Springer-Verlag, 1992.

Perry et al., "Auto-Indexing Storage Device", IBM Tech. Disc. Bulletin, 12(8):1219 (January 1970).

Perspectives: High Technology 2, 1985.

Peters: "Chaos and Order in the Capital Markets", Wiley, 1991.

Gershenfeld & Weigend: "The Future of Time Series", Addison-Wesley, 1993.

Peterson, Ivars, "Packing It In-Fractals.", Science News, 131(18):283–285 (May 2, 1987).

Peterson, Ivars: "The Mathematical Tourist", W H Freeman, New York, 1988.

Petrakis, E. G. M., and C. Faloutsos. Similarity searching in large image databases. Technical Report 3388, Department of Computer-Science, University of Maryland, 1995.

Pettit, Frank: "Fourier Transforms in Action", Chartwell-Bratt, Lund, 1985.

Pfitzmann et al; "How to Break and Repair a Provably Secure Untraceable Payment System"; pp. 338–350; 1991.

Phillips, "MediaView: a general multimedia digital publication system", Comm. of the ACM, v. 34, n. 7, pp. 75–83. July 1991.

Picard et al. "Finding Similar Patterns in Large Image Databases", IEEE, 1993, pp. 161–164, April 1993.

Picard, R. W., et al, "finding Similar Patterns in Large Image Databases", IEEE ICASSP, Minneapolis, Minn., vol. V, pp. 161–164, April 1993; also appears in MIT Media Laboratory Technical Report No. 205.

Pickover, Cliff, Visions of the Future: Art, Technology, and Computing in the 21st Century (St. Martin's Press).

Pickover, Cliff, Chaos in Wonderland: Visual Adventures in a Fractal World (St. Martin's Press).

Pickover, Cliff, Computers and the Imagination (St. Martin's Press).

Pickover, Cliff, Computers, Pattern, Chaos, and Beauty (St. Martin's Press).

Pickover, Cliff, Frontiers of Scientific Visualization (Wiley).

Pickover, Cliff, Mazes for the Mind: Computers and the Unexpected (St. Martin's Press).

Pickover, Cliff, Spiral Symmetry (World Scientific).

Pizano, A., et al, "Communicating with Pictorial Databases", Human-Machine Interactive Systems, pp. 61–87, Computer Science Dept, UCLA, 1991.

Platte, Hans-Joachim, Oberjatzas, Gunter, and Voessing, Walter, "A New Intelligent Remote Control Unit for Consumer Electronic Device", IEEE Transactions on Consumer Electronics, Vol. CE-31(1):59–68 (February 1985).

Poor, Alfred, "Microsoft Publisher", PC Magazine, Nov. 26, 1991, vol. 10, Issue 20, p. 40, evaluates Microsoft Publisher.

Port, Otis, "Wonder Chips-How They'll Make Computing Power Ultrafast and Ultracheap", Business Week, Jul. 4, 1994, pp. 86–92.

Press, William H. et al, "Numerical Recipes in C The Art of Scientific Computing", Cambridge University Press, 1988.

Price, R., et al., "Applying Relevance Feedback to a Photo Archival System", Journal of Information Science 18, pp. 203–215 (1992).

Priebe, C. E.; Solka, J. L.; Rogers, G. W., "Discriminant analysis in aerial images using fractal based features", *Proceedings of the SPIE—The International Society for Optical Engineering*, 1962:196–208(1993).

PRNewswire, information concerning the PointCast Network (PCN) (1996, Feb. 13) p. 213.

Proakis, John G., *Digital Communications*, McGraw-Hill (1983).

Proceedings of the IEEE, vol. 82, No. 4, April 1994 New York, N.Y., US, pp. 585–589, XP 000451419 Miller "A Scenario for the Deployment of Interactive Multimedia Cable Television Systems in the United States in the 1990's".

Proceedings, 6th International Conference on Pattern Recognition 1982, pp. 152–136.

Psaltis, D., "Incoherent Electro-Optic Image Correlator", Optical Engineering, 23(1):12–15 (January/February 1984).

Psaltis, D., "Two-Dimensional Optical Processing Using One-Dimensional Input Devices", Proceedings of the IEEE, 72(7):962–974 (July 1984).

Quinell, Richard A., "Web Servers in embedded systems enhance user interaction", EDN, Apr. 10, 1997, pp. 61–68.

Raggett, D., "A review of the HTML+document format," Computer Networks and ISDN Systems, vol. 27, No. 2, pp. 35–145 (November 1994).

Rahmati, M.; Hassebrook, L. G., "Intensity- and distortion-invariant pattern recognition with complex linear morphology", *Pattern Recognition*, 27 (4):549–68(1994).

Rampe, Dan, et al. In a Jan. 9, 1989 news release, Claris Corporation announced two products, SmartForm Designer and SmartForm Assistant, which provide "Intelligent Assistance", such as custom help messages, choice lists, and data-entry validation and formatting.

Rangan et al., "A Window-based Editor for Digital Video and Audio", January 1992.

Rao et al., *Discrete Cosine Transform—Algorithms, Advantages, Applications*, Academic Press, Inc., 1990.

Ratcliffe, Mitch and Gore, Andrew, "Intelligent Agents take U.S. Bows.", MacWeek, Mar. 2, 1992, vol. 6, No. 9, p. 1.

Ravichandran, G. and Casasent, D., "Noise and Discrimination Performance of the MINACE Optical Correlation Filter", Proc. SPIE Technical Symposium, April 1990, Orlando Fla., 1471 (1990).

Reimer, "Memories in my Pocket", Byte, pp. 251–258, February 1991.

Reiss, "The Revised Fundamental Theorem of Moment Invariants"; IEEE Transactions on Pattern Analysis and Machine Intelligence, vol. 13, No. 8, August 1991. pp. 830–834.

Reitman, Edward: "Exploring the Geometry of Nature", Windcrest Books, Blue Ridge Summit, 1989.

Reusens, E., "Sequence coding based on the fractal theory of iterated transformations systems", *Proceedings of the SPIE—The International Society for Optical Engineering*, 2094(pt. 1):132–40(1993).

Rhodes, W., "Acousto-Optic Signal Processing: Convolution and Correlation", Proc. of the IEEE, 69(1):65–79 (January 1981).

Richards et al., "The Interactive Island", IEE Revies, July/August 1991 pp. 259–263.

Richards J., and Casasent, D., "Real Time Hough Transform for Industrial Inspection" Proc. SPIE Technical Symposium, Boston 1989 1192:2–21 (1989).

Rivest, R.; "The MD5 Message-Digest Algorithm"; MIT Laboratory for Computer Science and RSA Data Security, Inc.; April, 1992.

Rivest, R. L. et al., "A Method for Obtaining Digital Signatures and Public-Key Cryptosystems," Laboratory for Computer Science, Massachusetts Institute of Technology, Cambridge, Mass.

Rivest; Shamir, "PayWord and MicroMint: Two Simple Micropayment Schemes" (May 7, 1996).

Rivest, R. L.; Shamir, A. & Adleman, L.; "A Method for Obtaining Digital Signatures and Public-Key Cryptosystems", Communications of the ACM, February 1978, vol. 21, No. 2, pp. 120–126.

Robinson, G., and Loveless, W., "Touch-Tone' Teletext—A Combined Teletext-Viewdata System," IEEE Transactions on Consumer Electronics, vol. CE-25, No. 3, July 1979, pp. 298–303.

Rogus, John G. and Armstrong, Richard, "Use of Human Engineering Standards in Design", Human Factors, 19(1):15–23 (February 1977).

Rohrer, C., & Clay Nesler, "Self-Tuning Using a Pattern Recognition Approach", Johnson Controls, Inc., Research Brief 228 (Jun. 13, 1986).

Roizen, Joseph, "Teletext in the USA," SMPTE Journal, July 1981, pp. 602–610.

Rosch, Winn L., "Voice Recognition: Understanding the Master's Voice", PC Magazine, Oct. 27, 1987, 261–308.

Rose, D. E. Mander, R.; Oren, T., Ponceleon, D. B.; Salomon, G. & Wong, Y. Y. "Content Awareness in a File System Interface Implementing the 'Pile' Metaphor for Organizing Information", 16 Ann. Int'l SIGIR '93, ACM, pp. 260–269.

Rosenfeld, Azriel and Avinash C. Kak, Digital Picture Processing, Second Edition, Volume 2, Academic Press, 1982.

Roy, B., "Classements et choix en presence de points de vue multiples", R.I.R.O.-2eme annee-no. 8, pp. 57–75 (1968).

Roy, B., "Electre III: un algorithme de classements fonde sur une representation floue des preferences en presence de criteres multiples", Cahiers du CERO, 20(1):3–24 (1978).

Rui, Yong, Huang, Thomas S., Chang, Shih-Fu, "Image Retrieval: Past Present and Future".

Rui, Yong, Huang, Thomas S., Mehotra, Sharad, "Browsing and retrieving Video Content in a Unified Framework".

Rui, Yong, Huang, Thomas S., Ortega, Michael, Mehotra, Sharad, "Relevance Feedback: A Power Tool for Interactive Content-Based Image Retrieval".

Rumelhart, D. E., & James L McClelland, Parallel Distributed Processing, Explorations in Microstructure of Cognition, vol. 1, (1986: MIT Press, Cambridge, Mass.), and specifically Chapter 8 thereof, "Learning Internal Representations by Error Propagation", pp. 318–362.

Rutherford, H. G., F. Taub and B. Williams, "Object Identification and Measurement from Images with Access to the Database to Select Specific Subpopulations of Special Interest", May 1986.

Rutter et al., "The Timed Lattice—A New Approach To Fast Converging Equalizer Design", pp. VIII/1–5 (Inspec. Abstract No. 84C044315, Inspec IEE (London) & IEE Saraga Colloquium on Electronic Filters, May 21, 1984).

Sadjadi, F., "Experiments in the use of fractal in computer pattern recognition", *Proceedings of the SPIE—The International Society for Optical Engineering*, 1960:214–22 (1993).

Sakoe, H., "A Generalization of Dynamic Programming Based Pattern Matching Algorithm Stack DP-Matching", Transactions of the Committee on Speech Research, The Acoustic Society of Japan, p. S83-23, 1983.

Sakoe, H., "A Generalized Two-Level DP-Matching Algorithm for Continuous Speech Recognition", Transactions of the IECE of Japan, E65(11):649–656 (November 1982).

Salomon et al, "Using Guides to Explore Multimedia Databases", PROC of the Twenty-Second Annual Hawaii International Conference on System Sciences, vol. IV, 3–6 Jan. 1989, pp. 3–12 vol. 4. Jan. 6, 1989.

Salton, G., "Developments in Automatic Text Retrieval", Science, vol. 253, pp. 974–980, Aug. 30, 1991.

Samet, H., The quadtree and related hierarchical data structures. ACM Computing Surveys, 16(2):187–260, 1984.

Sarver, Carleton, "A Perfect Friendship", High Fidelity, 39:42–49 (May 1989).

Schamuller-Bichl, I., "IC-Cards in High-Security Applications", in Selected Papers from the Smart Card 2000 Conference, Springer Verlag, 1991, pp. 177–199.

Scharlic, A., "Decider sur plusieurs criteres. Panorama de l'aide a la decision multicritere" Presses Polytechniques Romandes (1985).

Schied, Francis, "Shaum's Outline Series—Theory & Problems of Numerical Analysis", McGraw-Hill Book Co., NY (1968) pp. 236, 237, 243, 244, 261.

Schmitt, Lee, "Let's Discuss Programmable Controllers", Modern Machine Shop, May 1987, 90–99.

Schniederman, Ben, Designing the User Interface: Strategies for Effective Human-Computer Interaction, Reading, Mass., Addison-Wesley, 1987.

Schroeder, M., *Fractals, Chaos, Power Laws*, W. H. Freeman & Co., New York (1991).

Schurmann, J., "Zur Zeichen und Worterkennung beim Automatischen Anschriftenlesen", Wissenschaftlichl, Berichte, 52(1/2) (1979).

Scientific American; "Not Just a Pretty Face"; March 1990, pp. 77–78.

Seborg, D. E., T. F. Edgar, & D. A. Mellichamp, "Process Dynamics and Control", John Wiley & Sons, NY (1989) pp. 294–307, 538–541.

Shafer, G., "A mathematical theory of evidence", Princeton University Press, Princeton, N.J. (1976).

Shann et al. "Detection of Circular Arcs for Content-Based Retrieval from an Image Database" IEE Proc.—Vis. Image Signal Process, vol. 141, No. 1, February 1994, pp. 49–55.

Shardanand, Upendra, "Social Information Filtering for Music Recommendation" September 1994, pp. 1–93, Massachusetts Institute of Technology, Thesis.

Sharif Heger, A. and Koen, B. V., "KNOWBOT: an Adaptive Data Base Interface", Nuclear Science and Engineering, February 1991, vol. 107, No. 2, pp. 142–157.

Sharpless, "Subscription teletext for value-added services", August 1985.

Shepard, J. D., "Tapping the Potential of Data Compression". Military and Aerospace Electronics, May 17, 1993, pp. 25–27.

Sheth et al., "Evolving Agents for Personalized Information Filtering", 1–5 Mar. 1993, pp. 345–352.

Sheth, B. & Maes, P. "Evolving Agents For Personalized Information Filtering", Proc. 9th IEEE Conference, 1993 pp. 345–352.

Shimizu et al, "Principle of Holonic Computer and Holovision", Journal of the Institute of Electronics, Information and Communication, 70(9):921–930 (1987).

Shinan et al., "The Effects of Voice Disguise.", ICASSP 86. Tokyo, CH2243-4/86/0000-0885, IEEE 1986, pp. 885–888.

Silverston et al., "Spectral Feature Classification and Spatial Pattern Rec.", SPIE 201:17–26, Optical Pattern Recognition (1979).

Simpson, W. R., C. S. Dowling, "WRAPLE: The Weighted Repair Assistance Program Learning Extension", IEEE Design & Test, 2:66–73 (April 1986).

Sincoskie, W. D. & Cotton C. J. "Extended Bridge Algorithms for Large Networks", IEEE Network, January 1988-vol. 2, No. 1, pp. 16–24.

Sirbu, Marvin A.; Internet Billing Service Design And Prototype Implementation; pp. 1–19; An Internet Billing Server.

Smith et al., "A New Family of Algorithms for Manipulating Compressed Images", IEEE Computer Graphics and Applications, 1993.

Smith, J. et al., "Quad-Tree Segmentation for Texture-Based Image Query" Proceeding ACM Multimedia 94, pp. 1–15, San Francisco, 1994.

Smith, J. R., and S.-F. Chang. Querying by color regions using the VisualSEEk content-based visual query system. In M. T. Maybury, editor, Intelligent Multimedia Information Retrieval. IJCAI, 1996.

Smith, J. R., and S.-F. Chang. Tools and techniques for color image retrieval. In Symposium on Electronic Imaging: Science and Technology—Storage & Retrieval for Image and Video Databases IV, volume 2670, San Jose, Calif., February 1996. IS&T/SPIE.

Smith, Sidney J., and Mosier, Jane N., Guidelines for Designing User Interface Software, Bedford, Mass., MITRE, 1986.

Smoliar, S. et al., "Content-Based Video Indexing and Retrieval", IEEE Multimedia, pp. 62–72 (Summer 1994).

Society for Worldwide Interbank Financial Telecommunications S.C., "A.S.W.I.F.T. Overview", undated.

Soffer, A., and H. Samet. Retrieveal by content in symbolic-image databases. In Symposium on Electronic Imaging: Science and Technology—Storage & Retrieval for Image and Video Databases IV, pages 144–155. IS&T/SPIE, 1996.

Soviero, Marcelle M., "Your World According to Newton", Popular Science, September 1992, pp. 45–49.

Specht, IEEE Internatl. Conf. Neural Networks, 1:1525–1532 (July 1988), San Diego, Calif.

Sperling, Barbara Bied, Tullis Thomas S., "Are You a Better 'Mouser' or 'Trackballer'? A Comparison of Cursor—Positioning Performance", An Interactive/Poster Session at the CHI+GI'87 Graphics Interface and Human Factors in Computing Systems Conference.

Sprageu, R. A., "A Review of Acousto-Optic Signal Correlators", Optical Engineering, 16(5):467–74 (September/October 1977).

Sprinzak, J.; Werman, M., "Affine point matching", Pattern Recognition Letters, 15(4):337–9(1994).

Stanchev, P., et al, "An Approach to Image Indexing of Documents", Visual Database Systems, II, 1992, pp. 63–77.

Stanley R. Sternberg, "Biomedical Image Processing", IEEE Computer, 1983, pp. 22–34.

Stark, J., "Iterated function systems as neural networks ", Neural Networks, Vol 4, pp 679–690, Pergamon Press, 1991.

Stevens, "Next Generation Network and Operating System Requirements for Continuous Time Media", in Herrtwich (Ed.), Network and Operating System Support for Digital Audio and Video, pp. 197–208, November 1991.

Stewart, R. M., "Expert Systems For Mechanical Fault Diagnosis", IEEE, 1985, pp. 295–300.

Streeter, L. A., Ackroff, J. M., and Taylor, G. A. "On Abbreviating Command Names", The Bell System Technical Journal, 62(6):1807–1826 (July/August 1983).

Stricker, M., and A. Dimai. Color indexing with weak spatial constraints. In Symposium on Electronic Imaging: Science and Technology—Storage & Retrieval for Image and Video Databases IV, pages 29–41. IS&T/SPIE, 1996.

Stricker, M., and M. Orengo. Similarity of color images. In Storage and Retrieval for Image and Video Databases III, volume SPIE Vol. 2420, February 1995.

Sugeno, M., "Theory of fuzzy integrals and its applications". Tokyo Institute of Technology (1974).

Svetkoff et al.; Hybrid Circuits (GB), No. 13, May 1987: pp. 5–8.

Swain et al., "Color Indexing", International Journal of Computer Vision, vol. 7, No. 1, 1991, pp. 11–32.

Swanson, David, and Klopfenstein, Bruce, "How to Forecast VCR Penetration", American Demographic, December 1987, 44–45.

Tak W. Yan & Hector Garcia-Molina, SIFT—A Tool for Wide-Area Information Dissemination, 1995 USENIX Technical Conference, New Orleans, La., Jan. 16–20, pp. 177–186.

Tamura, H., et al, "Image Database Systems: A Survey", Pattern Recognition, vol. 17, No. 1, 1984, pp. 29–34.

Tamura, H., et al., "Textural Features Corresponding to Visual Perception," IEEE Transactions on System, Man, and Cyb., vol. SMC-8, No. 6, pp. 460–473 (1978).

Tanaka, S., et al, "Retrieval Method for an Image Database based on Topological Structure", SPIE, vol. 1153, 1989, pp. 318–327.

Tanton, N. E., "UK Teletext—Evolution and Potential," IEEE Transactions on Consumer Electronics, vol. CE-25, No. 3, July 1979, pp. 246–250.

TCC Tech Facts, Vols. 1–4, (www.wgbh.org, rev. September 1995).

Television Decoder Circuitry Act of 1990, and Section 305 of the Telecommunications Act of 1996, and FCC regulations.

Tello, Ernest R., "Between Man And Machine", Byte, September 1988, 288–293.

Tenenbaum, Jay M. and Schiffman, Allan M.; "Development of Network Infrastructure and Services for Rapid Acquisition"; adapted from a white paper submitted to DARPA by MCC in collaboration with EIT and ISI.

Thomas, John, C., and Schneider, Michael L., Human Factors in Computer Systems, New Jersey, Ablex Publ. Co., 1984.

Thomas, William L., "Electronic Program Guide Applications—The Basics of System Design", 1994 NCTA Technical Papers, pp. 15–20.

Tonomura et al., "Content Oriented Visual Interface Using Video Icons for Visual Database Systems", Journal of Visual Languages and Computing (1990) 1, pp. 183–198.

Tonomura et al. "VideoMAP and VideoSpaceIcon: Tools for Anatomizing Video Content", Inter CHI'93 Conference Proceedings, Amsterdam, The Netherlands, 24–29 Apr., 1993, pp. 131–136.

Tortora, G., et al, "Pyramidal Algorithms", Computer Vision, Graphics and Images Processing, 1990, pp. 26–56.

Trachtenberg, Jeffrey A., "How do we confuse thee? Let us count the ways", Forbes, Mar. 21, 1988, 159–160.

Training Computers To Note Images, New York Times, Apr. 15, 1992.

Turcotte, Donald L., 1992, Fractals and Chaos in Geology and Geophysics. Cambridge U.P.

TV Communications Advertisement for MSI Datacasting Systems, January 1973.

Tyldesley, D. A., "Employing Usability Engineering in the Development of Office Products", The Computer Journal", 31(5):431–436 (1988).

Udagawa, K., et al, "A Parallel Two-Stage Decision Method for Statistical Character Recognition.", Electronics and Communications in Japan (1965).

Ueda et al., "Automatic Structure Visualization for Video Editing", InterCHI'93 Conference Proceedings, Amsterdam, The Netherlands, 24–29 Apr. 1993, pp. 137–141.

Ueda et al., "Impact: An Interactive Natural-Motion-Picture Dedicated Multimedia Authoring System", Proceedings of Human Factors in Computing Systems (CHI 91), New Orleans, La., Apr. 27–May 2, 1991, pp. 343–350.

van den Boom, Henrie: An Interactive Videotex System for Two-Way CATV Networks; AEU, Band 40; 1986; pp. 397–401.

Vander Lugt, A., "Practical Considerations for the Use of Spatial Carrier-Frequency Filters", Applied Optics, 5(11):1760–1765 (November 1966).

Vander Lugt, A., "Signal Detection By Complex Spatial Filtering", IEEE Transactions On Information Theory, IT-10, 2:139–145 (April 1964).

Vander Lugt, A., et al.; "The Use of Film Nonlinearites in Optical Spatial Filtering"; Applied Optics; 9(1):215–222 (January 1970).

Vannicola et al, "Applications of Knowledge based Systems to Surveillance", Proceedings of the 1988 IEEE National Radar Conference, 20–21 Apr. 1988, pp. 157–164.

Varela, F. J., and P. Bourgine (eds.): Proceedings of the first European Conference on Artificial Life. Cambridge, Mass: MIT Press. (1991).

Verplank, William L., "Graphics in Human-Computer Communication: Principles of Graphical User-Interface Design", Xerox Office Systems.

Vitols, "Hologram Memory for Storing Digital Data", IBM Tech. Disc. Bulletin 8(11):1581–1583 (April 1966).

Vittal, J., "Active Message Processing: Message as Messengers", pp. 175–195; 1981.

Voydock, Victor et al.; "Security Mechanisms in High-Level Network Protocols"; Computing Surveys; vol. 15, No. 2; June 1981.

Voyt, Carlton F., "PLC's Learn New Languages", Design News, Jan. 2, 1989, 78.

Vrscay, Edward R. "Iterated Function Systems: Theory, Applications, and the Inverse Problem. " *Fractal Geometry and Analysis*, J. Belair and S. Dubuc (eds.) Kluwer Academic, 1991.405–468.

Wachman, J., "A Video Browser that Learns by Example", Masters Thesis, Massachusetts Institute of Technology; 1996; also appears as MIT Media Laboratory Technical Report No. 383.

Wakimoto, K., et al, "An Intelligent User Interface to an Image Database using a Figure interpretation Method", IEEE Publication No. CH2898-5/90/0000/0516, 1990, pp. 516–520.

Wald; Sequential Analysis; Dover Publications Inc., 1947; pp. 34–43.

Wallace, "The JPEG Still Picture Compression Standard", Communications of the ACM, vol. 34, No. 4, April 1991, pp. 31–44.

Wasserman, Philip D., "Neural Computing—Theory & Practice", 1989, pp. 128–129.

Weber et al., "Marquee: A Tool for Real-Time Video Logging", CHI '94. April 1994.

Weber, Thomas E., "Software Lets Marketers Target Web Ads," The Wall Street Journal, Apr. 21, 1997 Weiman, Liza and Moran, Tom, "A Step toward the Future", Macworld, August 1992, pp. 129–131.

Weshsler, H. Ed., "Neural Nets For Human and Machine Perception", Academic Press, New York (1991).

Whitefield, A. "Human Factors Aspects of Pointing as an Input Technique in Interactive Computer Systems", Applied Ergonomics, June 1986, 97–104.

Wiedenbeck, Susan, Lambert, Robin, and Scholtz, Jean, "Using Protocol Analysis to Study the User Interface". Bulletin of the American Society for Information Science, June/July 1989, 25–26.

Wilf, Itzhak, "Computer, Retrieve For Me the Video Clip of the Winning Goal", Advanced Imaging, August 1998, pp. 53–55.

Wilke, William, "Easy Operation of Instruments by Both Man and Machine". Electro/82 Proceedings, Mar. 2, 2001–Mar. 2, 2014.

Willett, P., "Recent Trends in Hierarchic Document Clustering: A Critical Review", Information Processing & Management, vol. 24, No. 5, pp. 557–597, 1988

Willshaw et al., "Non-Holographic Associative Memory", Nature, 222:960–962 (Jun. 7, 1969).

Woolsey, K., "Multimedia Scouting", IEEE Computer Graphics And Applications, Jul. 991 pp. 26–38.

Yager, R. R., "Entropy and specificity in a mathematical theory of Evidence", Int. J. General Systems, 9:249–260 (1983).

Yamada et. al., "Character recognition system using a neural network", Electronics Information Communications Association Bulletin PRU 88-58, pp. 79–86.

Yamamoto, A., et al, "Extraction of Object Features from Image and its Application to Image Retrieval", IEEE 9th International Conference On Pattern Recognition, vol. 2, 1988, 988–991.

Yamamoto, A., et al, "Image Retrieval System Based on Object Features", IEEE Publication No. CH2518-9/87/0000-0132, 1987, pp. 132–134.

Yamamoto, A., et al., "Extraction of Object Features and Its Application to Image Retrieval", Trans. of IEICE, vol. E72, No. 6, 771–781 (June 1989).

Yamane et al., "An Image Data Compression Method Using Two-Dimensional Extrapolative Prediction-Discrete Sine Transform", Oct. 29–31, 1986, pp. 311–316.

Yan et al., "Index Structures for Information Filtering Under the Vector Space Model", PROC the 10th International Conference on Data Engineering, pp. 14–18 of DRD203RW User's Manual relating to the DSS Digital System.

Yan, T. W. and Garcia-Molina, H., "SIFT—A Tool for Wide-Area Information Dissemination," Paper presented at the USENIX Technical Conference, New Orleans, La. (1995, January), pp. 177–186.

Yoder, Stephen Kreider, "U.S. Inventors Thrive at Electronics Show", The Wall Street Journal, Jan. 10, 1990, B1.

Yoshida, J., "The Video-on-demand Demand", Electronic Engineering Times, Mar. 15, 1993, pp. 1, 72.

Yoshida, Y., et al, "Description of Weather Maps and Its Application to Implementation of Weather Map Database", IEEE 7th International Conference On Pattern Recognition, 1984, pp. 730–733.

Zadeh, L. A., "Fuzzy sets as a basis for a theory of possibility", Fuzzy sets and Systems 1:3–28 (1978).

Zadeh, L. A., "Fuzzy sets", Information and Control, 8:338–353 (1965).

Zadeh, L. A., "Probability measures of fuzzy events", Journal of Mathematical Analysis and Applications, 23:421–427 (1968).

Zeisel, Gunter, Tomas, Philippe, Tomaszewski, Peter, "An Interactive Menu-Driven Remote Control Unit for TV-Receivers and VC-Recorders", IEEE Transactions on Consumer Electronics, 34(3):814–818.

Zenith Starsight Telecast brochure, (1994).

Zhang et al., "Developing Power Tools for Video Indexing and Retrieval", Proceedings of SPIE Conference on Storage and Retrieval for Image and Video Databases, San Jose, Calif., 1994.

Zhang, X., et al, "Design of a Relational Image Database Management System: IMDAT", IEEE Publication No. TH0166-9/87/0000-0310, 1987, pp. 310–314.

Zhi-Yan Xie; Brady, M., "Fractal dimension image for texture segmentation", ICARCV '92. Second International Conference on Automation, Robotics and Computer Vision, p. CV-4.3/1–5 vol. 1, (1992).

Zhu, X., et al., "Feature Detector and Application to Handwritten Character Recognition". International Joint Conference on Neural Networks, Washington, D.C., January 1990, pp. II-457 to II-460.

Zhuang, Yueting, Rui, Yong, Huang, Thomas S., Mehotra, Sharad, "Applying Semantic Association to Support Content-Based Video Retrieval".

Akoulchina, Irina, and Jean-Gabriel Ganascia (1997) SATELIT-Agent: An Adaptive Interface Based on Learning Interface Agents Technology. In Proceedings of the Sixth International Conference on User Modeling. http://www.cs.mu.oz.au/agentlab/VL/ps/AkoulchinaI.ps Ambrosini, Leonardo., Vincenzo Cirillo, and Alessandro Micarelli (1997). A Hybrid Architecture for User-Adapted Information Filtering on the World Wide Web. In Proceedings of the Sixth International Conference on User Modeling. http://www.cs.mu.oz.au/agentlab/VL/ps/AmbrosiniL.ps Arocena, Gustavo O., Alberto O. Mendelzon, George A. Mihaila (1996). Applications of a Web query language. In Hyper Proceeding of the Sixth International World Wide Web Conference. http://www.cs.mu.oz.au/agentlab/VL/html/PAPER267.html.

Benaki, Eftihia., Vangelis A. Karkaletsis, and Constantine D. Spyropoulos (1997) Integrating User Modeling Into Information Extraction: The UMIE Prototype. In Proceedings of the Sixth International Conference on User Modeling. http://www.cs.mu.oz.au/agentlab/VL/ps/BenakiE.ps Jeffrey M. Bradshaw, Peter D. Holm, John H. Boose, Douglas Skuce, Timothy C. Lethbridge (1992) Sharable Ontologies as a Basis for Communication and Collaboration in Conceptual Modeling. In Proceedings of the Seventh Knowledge Acquisition for Knowledge-Based Systems Workshop, Banff. http://www.cs.mu.oz.au/agentlab/VL/html/KAW92SharableOntologies.html Jeffrey M. Bradshaw, Kenneth M. Ford, Jack R. Adams-Webber, John H. Boose (1993) Beyond the Repertory Grid: New Approaches to Constructivist Knowledge Acquisition Tool Development. In K. M. Ford & J. M. Bradshaw (Ed.) Knowledge Acquisition as Modeling. Wiley. http://www.cs.mu.oz.au/agentlab/VL/html/BeyondtheRepGrid.html.

Bradshaw, Jeffrey M.; John H. Boose (1991) Mediating Representations for Knowledge Acquisition. In Proceedings of the AAAI '92 Knowledge Acquisition: From Science to Techniques to Tools Workshop Anaheim, Calif., July, 1991. http://www.cs.mu.oz.au/agentlab/VL/html/MediatingRepsforKA.html Boose, John H.; Brian R. Gaines (1989) Knowledge Acquisition for Knowledge-Based Systems: Notes on the State-of-the-Art. In Machine Learning Journal, 4, pp. 377–394. http://www.cs.mu.oz.au/agentlab/VL/html/MLJEditorialNotes.html.

Boose, John H. (1990) Knowledge Acquisition Tools, Methods, and Mediating Representations. In John H. Boose. In Motoda, H., Mizoguchi, R., Boose, J. H., and Gaines, B. R. (Eds.) Knowledge Acquisition Tools, Methods, and Mediating Representations (1990). Proceedings of the First Japanese Knowledge Acquisition for Knowledge-Based Systems Workshop: JKAW-90, Ohmsha, Ltd: Japan http://www.cs.mu.oz.au/agentlab/VL/html/JKAW90KATechsMedReps.html Chekuri, Chandra, Michael H. Goldwasser, Prabhakar Raghaven & Eli Upfal (1996) Web search using automatic classification. In Report to Computer Science Department, Stanford University. http://www.cs.mu.oz.au/agentlab/VL/html/WebSearch.html De Carolis, Berardina & Sebastiano Pizzutilo (1997) From Discourse Plans to User-Adapted Hypermedia. In Proceedings of the Sixth International Conference on User Modeling. http://www.cs.mu.oz.au/agentlab/VL/ps/DeCarolisB.ps Fink, Josef, Alfred Kobsa, and Andreas Nill (1997) Adaptable and Adaptive Information Access for All Users, Including the Disabled and the Elderly. In Proceedings of the Sixth International Conference on User Modeling. http://www.cs.mu.oz.au/agentlab/VL/ps/FinkJ.ps Gaines, Brian R.; Mildred L G Shaw (1992) Integrated Knowledge Acquisition Architectures. In Journal for Intelligent Information Systems 1(1) 9–34, 1992. http://www.cs.mu.oz.au/agentlab/VL/ps/IntegArchKA.ps Gaines, Brian R.; Mildred L G Shaw (1993) Eliciting Knowledge and Transferring it Effectively to a Knowledge-Based System. In IEEE Transactions on Knowledge and Data Engineering 5(1) 4–14, 1993, http://www.cs.mu.oz.au/agentlab/VL/ps/KSS0.ps Gaines, Brian R.; Mildred L G Shaw (1993) Knowledge Acquisition Tools based on Personal Construct Psychology. In Knowledge Engineering Review, 8(1) 49–85, 1993. http://www.cs.mu.oz.au/agentlab/VL/ps/KER93.ps Gaines, Brian R.; Mildred L G Shaw (1995) Concept Maps as Hypermedia Components. In International Journal of Human-Computer Studies, 1995. http://www.cs.mu.oz.au/agentlab/VL/ps/ConceptMaps.ps Gaines, Brian R. (1991) An Interactive Visual Language for Term Subsumption Languages. In IJCAI91: Proceedings of the Twelfth International Joint Conference on Artificial Intelligence, pp. 817–823 San Mateo, Calif.: Morgan Kaufmann, 1991. http://www.cs.mu.oz.au/agentlab/VL/ps/IJCAI91.ps Gaines, Brian R. (1994) The Collective Stance in Modeling Expertise in Individuals and Organizations. In (short version in—International Journal of Expert Systems 7(1) 21–51, 1994). http://www.cs.mu.oz.au/agentlab/VL/ps/Collective.ps Gaines, Brian R. Between Neuron, Culture and Logic: Explicating the Cognitive Nexus. In ICO: Intelligence Artificielle et Sciences Cognitives au Quebec, 3(2) 47–61, 1991. http://www.cs.mu.oz.au/agentlab/VL/ps/ICO91.ps Gori, Marco., Marco Maggini, and Enrico Martinelli (1997) Web-Browser Access Through Voice Input and Page Interest Prediction. In Proceedings of the Sixth International Conference on User Modeling. http://www.cs.mu.oz.au/agentlab/VL/ps/GoriM.ps Guarino, Nicola (1994) The Ontological Level. In R Casati, B. Smith; G. White (eds.) Philosophy and the Cognitive Sciences, Vienna: Hulder-Pichler-Tempsky.

Harmelen van, Frank, Ramon Lopez de Mantaras, Jacek Malec, Jan Treur (1993) Comparing Formal Specification Languages for Complex Reasoning Systems. In Jackson, Peter (1990) Introduction to expert systems—2nd ed. Wokingham: Addison-Wesley.

Maglio, Paul P. and Rob Barrett (1997) How to Build Modeling Agents to Support Web Searchers. In Proceedings of the Sixth International Conference on User Modeling. http://www.cs.mu.oz.au/agentlab/VL/ps/MaglioP.ps Marchiori, Massimo (1996) The quest for correct information on the Web: hyper search engines. In Hyper Proceeding of the Sixth International World Wide Web Conference. http://www.cs.mu.oz.au/agentlab/VL/html/PAPER222.html Mills, Timothy, Ken Moody, Kerry Rodin (1997) Cobra: A new approach to IR system design. In Proceedings of RIAO '97, pp425–449. http://www.cs.mu.oz.au/agentlab/VL/ps/Cobra-riao.ps Mukherjea, Sougata, Kyoji Hirata: Yoshinori Hara (1996) Towards a multimedia world-wide web information retrieval engine. In Hyper Proceeding of the Sixth International World Wide Web Conference. http://www.cs.mu.oz.au/agentlab/VL/html/PAPER3.html Newell, A. (1982) The Knowledge Level. In Artificial Intelligence, vol. 18, no. 1, pp. 87–127.

Prerau, David S. (1990) Developing and managing expert systems: proven techniques for business and industry. Mass: Addison-Wesley.

Ramscar, Michael., Helen Pain, and John Lee (1997) Do We Know What the User Knows, and Does It Matter? The Epistemics of User Modelling. In Proceedings of the Sixth International Conference on User Modeling. http://www.cs.mu.oz.au/agentlab/VL/ps/RamscarM.ps Saracevic, Tefko., Amanda Spink, and Mei—Mei Wu (1997) Users and Intermediaries in Information Retrieval: What Are They Talking About? In Proceedings of the Sixth International Conference on User Modeling. http://www.cs.mu.oz.au/agentlab/VL/ps/SaracevicT.ps Seta, Kazuhisa., Mitsuru Ikeda, Osamu Kakusho, and Riichiro Mizoguchi (1997) Capturing a Conceptual Model for End-User Programming: Task Ontology as a Static User Model. In Proceedings of the Sixth International Conference on User Modeling. http://www.cs.mu.oz.au/agentlab/VL/ps/SetaK.ps Shakes, Jonathan, Mark Langheinrich; Oren Etzioni (1996) Dynamic reference shifting: a case study in the homepage domain. In Hyper Proceeding of the Sixth International World Wide Web Conference. http://www.cs.mu.oz.au/agentlab/VL/html/PAPER 39.html Shaw, Mildred L. G.; Brian R Gaines (1992) Kelly's Geometry of Psychological Space and its Significance for Cognitive Modeling. In The New Psychologist, October 1992, 23–31. http://www.cs.mu.oz.au/agentlab/VL/ps/NewPsych92.ps Shaw, Mildred L. G.; Brian R Gaines (1995) Comparing Constructions through the Web. In Proceedings of CSCL95: Computer Supported Cooperative Learning. Bloomington, October, 1995. http://www.cs.mu.oz.au/agentlab/VL/ps/CSCL95WG.ps Simons, Joel (1997) Using a Semantic User Model to Filter the World Wide Web Proactively. In Proceedings of the Sixth International Conference on User Modeling. http://www.cs.mu.oz.au/agentlab/VL/ps/SimonsJ.ps Spertus, Ellen (1996) ParaSite: mining the structural information on the Web. In Hyper Proceeding of the Sixth International World Wide Web Conference. http://www.cs.mu.oz.au/agentlab/VL/html/PAPER206.html Staff, Christopher (1997) HyperContext: A Model for Adaptive Hypertext. In Proceedings of the Sixth International Conference on User Modeling. http://www.cs.mu.oz.au/agentlab/VL/ps/StaffC.ps Stefik, Mark (1995) Introduction to Knowledge Systems. San Francisco: Morgan Kaufmann.

Vassileva, Julita (1997) A New View of Interactive Human-Computer Environments. In Proceedings of the Sixth International Conference on User Modeling. http://www.cs.mu.oz.au/agentlab/VL/ps/VassilevaJ.ps Weber, Gerhard.; Marcus Specht (1997) User Modeling and Adaptive Navigation Support in WWW-Based Tutoring Systems. In Proceedings of the Sixth International Conference on User Modeling. http://www.cs.mu.oz.au/agentlab/VL/ps/WeberG.ps

What is claimed is:

1. A digital rights management method, comprising the steps of:

(a) receiving media having visual or audio content;

(b) analyzing a physical environment of presentation to a user;

(c) predistorting the media in accordance with a state of the analyzed physical environment to at least partially compensate for the physical environment while altering the visual or audio content from its state as received;

(d) presenting the predistorted media to the user in the physical environment; and (e) restricting access to the received media in an undistorted form, to thereby manage rights in the media.

2. The method according to claim 1, further comprising the steps of:

defining a minimum level of predistortion; and predistorting the media to a level of distortion in excess of said minimum level of distortion.

3. The method according to claim 1, further comprising the step of introducing a watermark into the media, rendering the predistorted media traceable.

4. The method according to claim 1, wherein said predistorting comprises introducing a pseudorandom component into the media in a manner resistant to filtering.

5. The method according to claim 1, wherein said method is performed within an apparatus within the environment of operation, the apparatus forming a part of and perceptually influencing the analyzed environment of presentation.

6. The method according to claim 5, wherein the apparatus produces intrinsic acoustic emissions.

7. The method according to claim 5, wherein an intrinsic acoustic emission from the apparatus is controlled in accordance with the media.

8. The method according to claim 5, wherein the apparatus comprises:

(a) an actuator, producing an acoustic emission; and (b) a controllable noise abatement transducer;

the method further comprising the step of controlling said actuator and said transducer, to reduce a perceived effect of an acoustic emission from the apparatus, with respect to the received media.

9. The method according to claim 8, wherein the apparatus comprises a rotating data storage medium and a positionable data read head on said actuator.

10. The method according to claim 8, wherein the apparatus comprises a rotating magnetic disk storage system.

11. The method according to claim 8, wherein the apparatus comprises a rotating optical disk storage system.

12. The method according to claim 8, wherein said controllable noise abatement transducer comprises a low frequency, high amplitude, narrowband transducer and a broadband, low amplitude transducer.

13. The method according to claim 8, further comprising the step of controlling said actuator to produce an acoustic signature corresponding to a compensation capability of said noise abatement transducer.

14. The method according to claim 8, further comprising the step of controlling said actuator and said noise abatement transducer simultaneously based on a model of said data storage device.

15. The method according to claim 5, wherein the predistortion of the media compensates for the perceptual influences of the apparatus in the environment of the presentation.

16. A method for securing against undistorted copying media presented by an apparatus within physical environment of presentation, comprising:

(a) receiving media;

(b) producing an acoustic emission from the apparatus, the acoustic emission not being defined by the media;

(c) analyzing a physical environment of presentation to a user, comprising at least measuring the acoustic emission from the apparatus;

(d) predistorting the media in accordance with the analyzed physical environment of presentation to at least partially compensate for the physical environment while altering the media from its state as received;

(e) outputting the predistorted media in the physical environment of presentation to the user; and (f) restricting access to the received media in an undistorted form, to thereby manage rights in the media.

17. The method according to claim 16, wherein the acoustic emission is generated by a fan.

18. The method according to claim 16, wherein the acoustic emission is generated by an electromechanical actuator.

19. An apparatus for securing against undistorted copying of media, comprising:

(a) an input for receiving media;

(b) means, associated with the apparatus, for producing an acoustic emission in a physical environment, not defined by the media;

(c) a processor for analyzing ad a physical environment of presentation to a user, comprising at least measuring the acoustic emission and predistorting the media in accordance with the analyzed physical environment of presentation to the user, to at least partially compensate for the physical environment while altering the media from its state as received at the input, and for restricting access to the received media in undistorted form;

(d) an output for presenting the predistorted media user.

20. The apparatus according to claim 19, wherein the received media is encrypted, and remains secure until after distortion.

21. The apparatus according to claim 19, wherein the predistorted media comprises a media watermark identifying said apparatus.

22. The apparatus according to claim 20, wherein said apparatus further comprises a transducer for sensing environment of presentation, predistorting the media including compensation for the acoustic emission from said apparatus and sensed external conditions.

* * * * *